US006563049B2

(12) United States Patent
May

(10) Patent No.: US 6,563,049 B2
(45) Date of Patent: May 13, 2003

(54) MODULAR ELECTRICAL SYSTEM

(76) Inventor: Lindy Lawrence May, 2762 N. Farm Rd. 237, Strafford, MO (US) 65757

(*) Notice: Subject to any disclaimer, the term of this patent is extended or adjusted under 35 U.S.C. 154(b) by 0 days.

(21) Appl. No.: 09/729,117

(22) Filed: Dec. 4, 2000

(65) Prior Publication Data

US 2001/0020534 A1 Sep. 13, 2001

Related U.S. Application Data

(63) Continuation of application No. 09/029,480, filed as application No. PCT/US96/13727 on Aug. 22, 1996, now Pat. No. 6,156,971.

(51) Int. Cl.[7] .................................................. H02G 3/18

(52) U.S. Cl. ............................ 174/59; 174/50; 220/3.2

(58) Field of Search .............................. 174/49, 48, 51, 174/65 R, 50, 59; 220/3.2, 3.3, 3.94, 241; 439/436, 418, 425; 361/42

(56) References Cited

U.S. PATENT DOCUMENTS

| | | | |
|---|---|---|---|
| 2,397,688 A | 4/1946 | Osinski | |
| 2,410,287 A | 10/1946 | Jaberg | |
| 2,433,917 A | 1/1948 | McCartney | |
| 2,908,743 A | 10/1959 | Premoshis | |
| 2,920,303 A | 1/1960 | Johnson | |
| 2,934,590 A | 4/1960 | Thompson et al. | |
| 3,013,109 A | 12/1961 | Gorman et al. | |
| 3,022,485 A * | 2/1962 | Buchanan | 439/436 |
| 3,038,141 A | 6/1962 | Chiuchiolo | |
| 3,110,753 A | 11/1963 | Witort | |
| 3,157,732 A | 11/1964 | Richards | |
| 3,185,760 A | 5/1965 | Despard | |
| 3,489,981 A | 1/1970 | Curl et al. | |
| 3,510,822 A | 5/1970 | Patterson | |
| 3,609,647 A | 9/1971 | Castellano | |
| 3,679,988 A | 7/1972 | Haydon | |
| 3,680,031 A | 7/1972 | Schumacher | |
| 3,716,651 A | 2/1973 | Werner | |
| 3,858,161 A | 12/1974 | Champion et al. | |
| 3,868,161 A | 2/1975 | Frantz | |
| 3,922,478 A | 11/1975 | Perkey | |

(List continued on next page.)

*Primary Examiner*—Dean A. Reichard
*Assistant Examiner*—Angel R. Estrada
(74) *Attorney, Agent, or Firm*—Polster, Lieder, Woodruff & Lucchesi, L.C.

(57) ABSTRACT

An electrical system comprised of modular components which quickly assemble to create common lighting and general utility electrical circuits. All wiring is completed in the electrical box prior to installing the electrical devices such as switches and receptacles, thereby eliminating the need for extra length wires in the electrical boxes and the timely, cumbersome wiring practices associated with conventional residential electrical circuits. The electrical devices plug into the prewired electrical box, thereby providing quick and easy removal and replacement of the device in the event of failure. The common residential lighting and general utility circuits are automatically configured by simply selecting the proper electrical components. A dedicated earth ground is automatically carried to each electrical component with no effort on the part of the installer, thereby providing safer electrical circuits. The cables have a specific exterior profile to insure proper connection with the electrical boxes, thereby assuring proper configuration of the electrical circuits. The electrical system also eliminates the need for wire nuts. The modular electrical components include the following: a wallbox (1), a receptacle module (2), a ganging module (3), a 2-way-switch module (4), a 3-way-switch module (5), a 4-way-switch module (6), a dimmer switch module (7), a fan-control switch module (8), a timer switch module (9), a GICI-receptacle module (10), a 240-volt receptacle module (11), a junction box (12), a light box (13), a 2-wire jumper (14), a 4-wire jumper, (15), a wallbox jumper (16), a 3-conductor cable (17), a 4-conductor cable (18), and a 5-conductor cable (19).

16 Claims, 201 Drawing Sheets

U.S. PATENT DOCUMENTS

| | | | | | |
|---|---|---|---|---|---|
| 3,931,601 | A | | 1/1976 | Anderson | |
| 4,001,527 | A | | 1/1977 | Hulshizer | |
| 4,010,431 | A | | 3/1977 | Virani et al. | |
| 4,010,432 | A | * | 3/1977 | Klein et al. | 335/18 |
| 4,025,139 | A | | 5/1977 | Martucci | |
| 4,079,344 | A | | 3/1978 | Lauben et al. | |
| 4,117,258 | A | | 9/1978 | Shanker | |
| 4,165,443 | A | | 8/1979 | Figart et al. | |
| 4,166,934 | A | | 9/1979 | Marrero | |
| 4,247,840 | A | * | 1/1981 | Cooper et al. | 335/18 |
| 4,260,849 | A | | 4/1981 | Kirby | |
| 4,272,689 | A | | 6/1981 | Crosby | |
| 4,295,018 | A | | 10/1981 | Borrelli | |
| 4,487,997 | A | | 12/1984 | Ditchfield | |
| 4,591,658 | A | | 5/1986 | Bauer et al. | |
| 4,595,894 | A | | 6/1986 | Doyle et al. | |
| 4,627,675 | A | | 12/1986 | Taylor et al. | |
| 4,842,551 | A | * | 6/1989 | Heimann | 174/58 |
| 4,875,871 | A | | 10/1989 | Booty, Sr. et al. | |
| 4,918,258 | A | | 4/1990 | Ayer | |
| 4,924,032 | A | | 5/1990 | Akins | |
| 4,958,048 | A | | 9/1990 | Bell | |
| 5,015,203 | A | | 5/1991 | Furrow | |
| 5,117,122 | A | | 5/1992 | Hogarth et al. | |
| 5,155,304 | A | | 10/1992 | Gossett et al. | |
| 5,178,555 | A | | 1/1993 | Kilpatrick et al. | |
| 5,180,886 | A | | 1/1993 | Dierenbach et al. | |
| 5,180,890 | A | | 1/1993 | Pendergrass et al. | |
| 5,238,424 | A | * | 8/1993 | Vindum | 439/425 |
| 5,281,154 | A | | 1/1994 | Comerci et al. | |
| 5,363,269 | A | | 11/1994 | McDonald | |
| 5,413,501 | A | | 5/1995 | Munn | |
| 5,525,754 | A | | 6/1996 | Akins | |
| 5,567,173 | A | * | 10/1996 | Franckx | 439/418 |
| 5,573,382 | A | | 11/1996 | Girard | |
| 5,595,491 | A | | 1/1997 | May | |
| 5,712,450 | A | * | 1/1998 | Chan et al. | 174/66 |
| 5,934,930 | A | * | 8/1999 | Camps et al. | 439/425 |
| 6,156,971 | A | * | 5/2000 | May | 174/59 |
| 6,252,407 | B1 | * | 6/2001 | Gershen | 324/509 |
| 6,288,882 | B1 | * | 9/2001 | DiSalvo et al. | 361/42 |
| 6,309,248 | B1 | * | 10/2001 | King | 361/42 |

* cited by examiner

MODULAR ELECTRICAL SYSTEM

This application is a continuation of Ser. No. 09/029,480 filed Feb. 24, 1998, which is a 371 of PCT/US96/13727 filed Aug. 22, 1996 U.S. Pat. No. 6,156,971.

TECHNICAL FIELD

The present invention relates to the field of electrical components and more particularly to those electrical components which constitute common residential electrical circuits.

BACKGROUND ART

Conventional residential electrical circuits consist of components such as electrical receptacles, various types of light switches, electrical boxes, and electrical cables. These conventional components require time-consuming, cumbersome wiring practices. The electrical devices such as receptacles and switches must be wired prior to inserting them into their respective electrical box. This requires that the wires be of extra length to facilitate this wiring practice. This excess wire must then be stuffed into the electrical box as the electrical device is installed. These conventional electrical circuits often require the use of wire nuts to connect several wires together in the electrical boxes. These wires must also be of extra length to facilitate wiring and then stuffed into the electrical box as well.

These inherent characteristics of the conventional electrical circuits result in timely electrical installations with electrical boxes that are often over-stuffed with excess wire. The process of stuffing the wires and the electrical device into the electrical box results in the wires exerting a pulling force on their points of termination, creating the possibility of wires coming loose from the electrical device or the wire nuts. This contributes to faulty circuits and potential fire hazards.

Because of these cumbersome characteristics of the conventional electrical circuits, good wiring practices such as connecting a dedicated earth ground to each electrical component is often neglected. This also contributes to a potential fire hazard as well as a risk of electrical shock to people who use these circuits.

DISCLOSURE OF INVENTION

It is thus a principal object of this invention to provide an electrical system which utilizes modular electrical components in which the wire conductors of the electrical cables are terminated in the electrical boxes prior to the electrical devices such as receptacles, switches, and light fixtures being installed; thereby eliminating the need for the extra length wires and the cumbersome wiring practices associated with conventional residential electrical circuits.

Another object of the present invention is to provide an electrical system which utilizes modular components which assemble quickly and easily in a specific manner so as to self-configure the common residential lighting and general utility circuits by simply selecting the proper components.

It is a further object of this invention is to provide an electrical system which self-distributes a dedicated earth ground to each electrical component with little or no effort on the part of the installer, thereby eliminating negligence in this wiring practice and reducing potential fire hazards and risk of electrical shock to users of these circuits.

A still further object of this invention is to provide an electrical system which utilizes modular electrical components in which the replaceable components such as the receptacles and switches simply plug into the prewired electrical box, thereby permitting easy removal and replacement.

Another object of this invention is to provide an electrical system which does not utilize wire nuts. A still further object is to provide an electrical system which is conducive to electrical circuit expansions and modifications after the initial installation is complete.

These and other objects will become apparent hereinafter.

BRIEF DESCRIPTION OF DRAWINGS

FIG. 120 is a plan view of FIG. 119.

FIG. 121 is a vertical section view taken along line 121—121 of FIG. 119.

FIG. 122 is a horizontal section view taken along line 122—122 of FIG. 119.

FIG. 123 is a horizontal section view taken along line 123—123 of FIG. 119.

FIG. 124 is a horizontal section view taken along line 124—124 of FIG. 119.

FIG. 125 is a front elevation view of the ganging module and 3-conductor cables installed in the wallbox.

FIG. 126 is a plan view of FIG. 125.

FIG. 127 is a vertical section view taken along line 127—127 of FIG. 125.

FIG. 128 is a horizontal section view taken along line 128—128 of FIG. 125.

FIG. 129 is a horizontal section view taken along line 129—129 of FIG. 125.

FIG. 130 is a horizontal section view taken along line 130—130 of FIG. 125.

FIG. 131 is a front elevation view of two wallboxes connected with the wallbox jumper.

Figure 131:
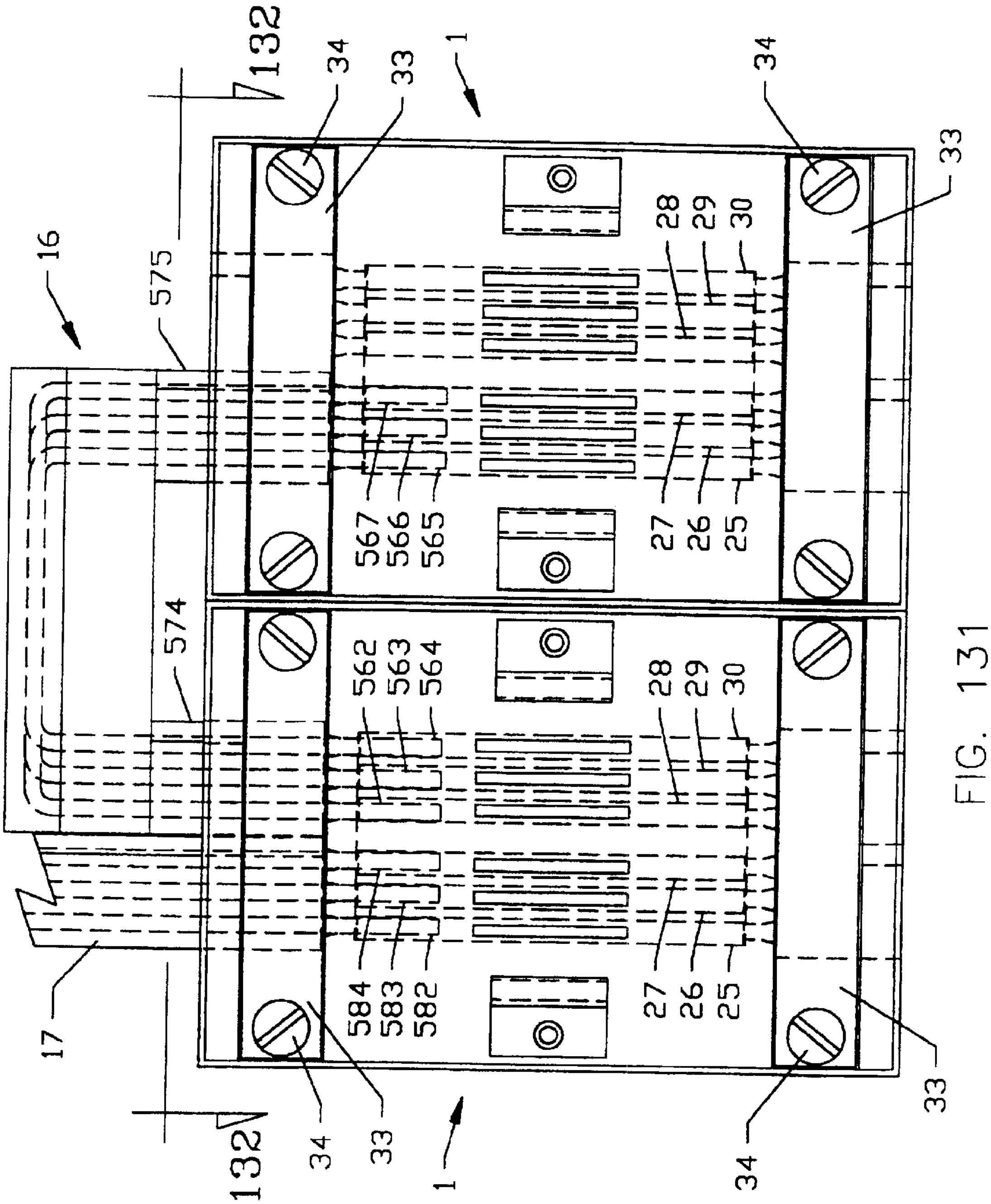
Figure 132:
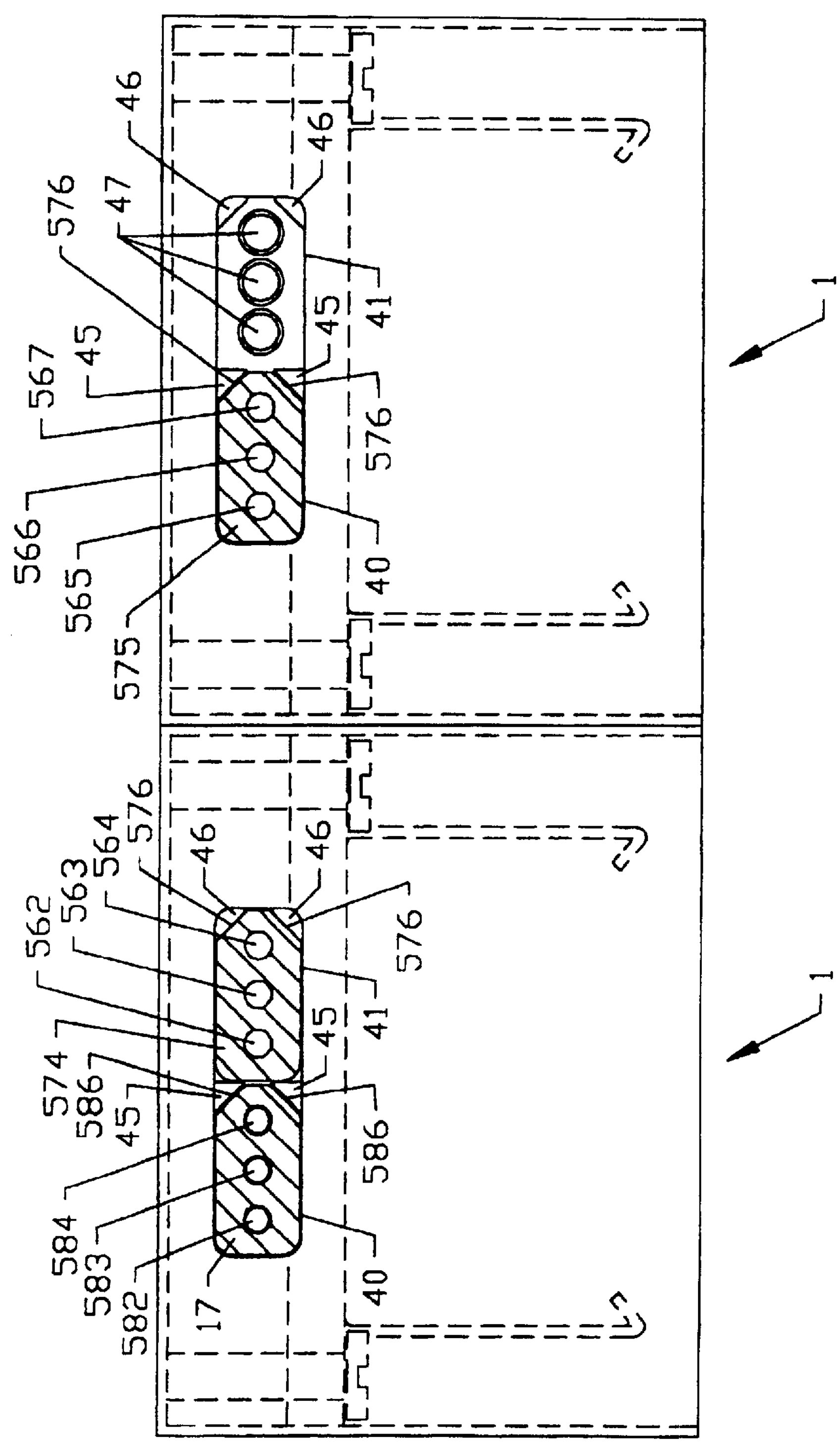

FIG. 132 is a horizontal section view taken along line 132—132 of FIG. 131.

Figure 133:
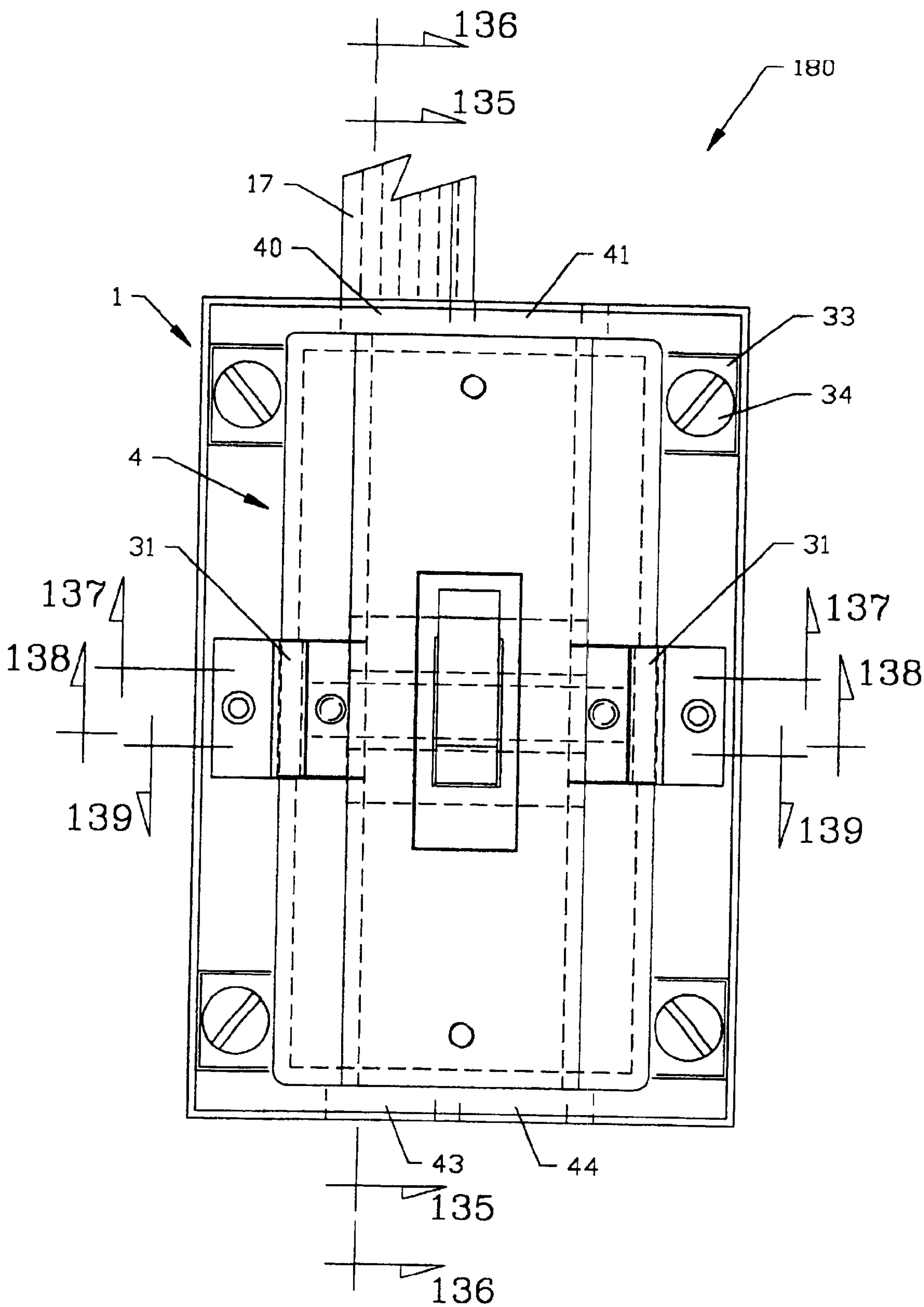

FIG. 133 is a front elevation view of the 2-way-switch module and 3-conductor cable installed in the wallbox.

Figure 134:
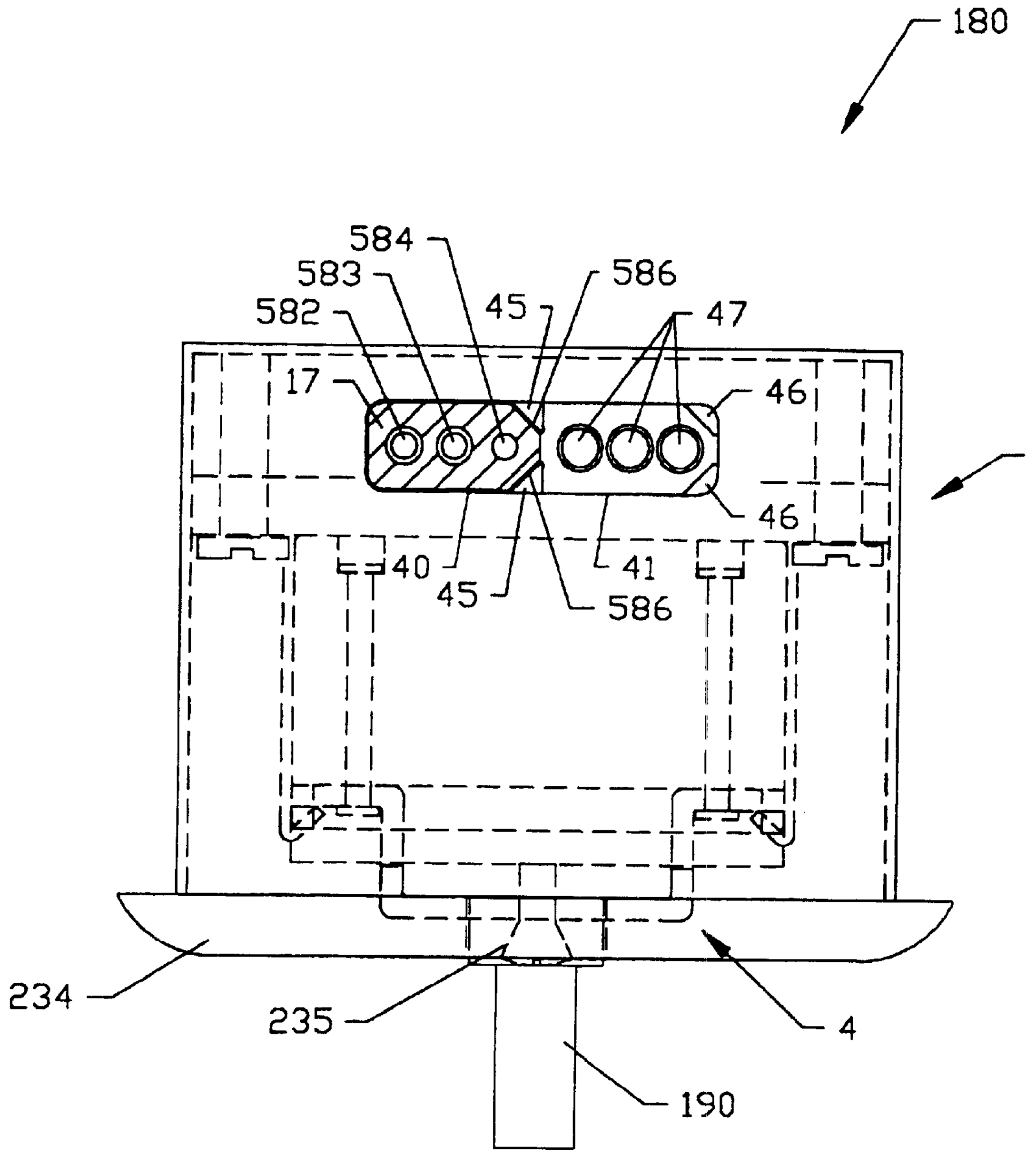

FIG. 134 is a plan view of FIG. 133.

Figure 135:
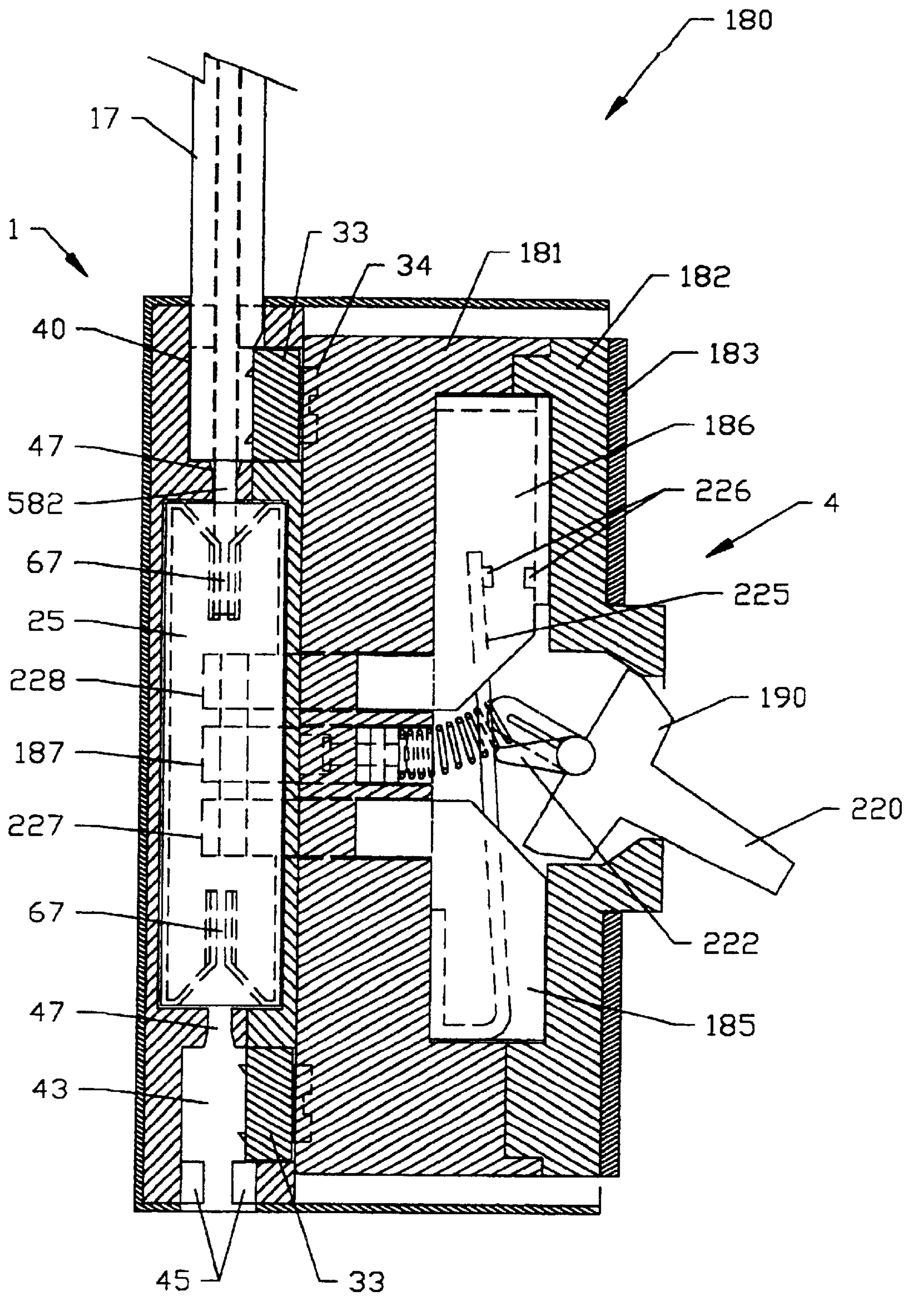

FIG. 135 is a vertical section view taken along line 135—135 of FIG. 133 with the lever in the down position.

Figure 136:
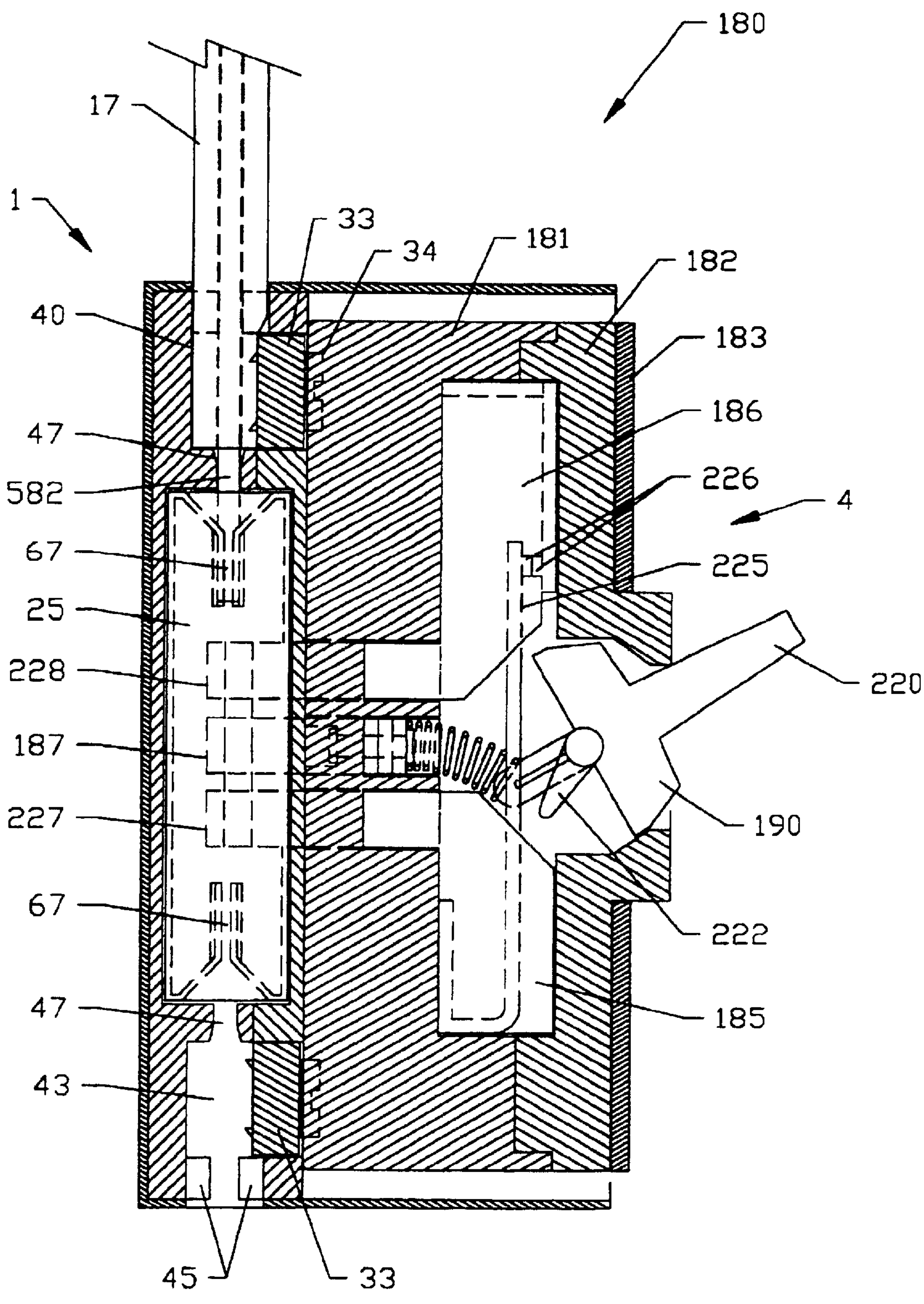

FIG. 136 is a vertical section view taken along line 136—136 of FIG. 133 with the lever in the up position.

Figure 137:
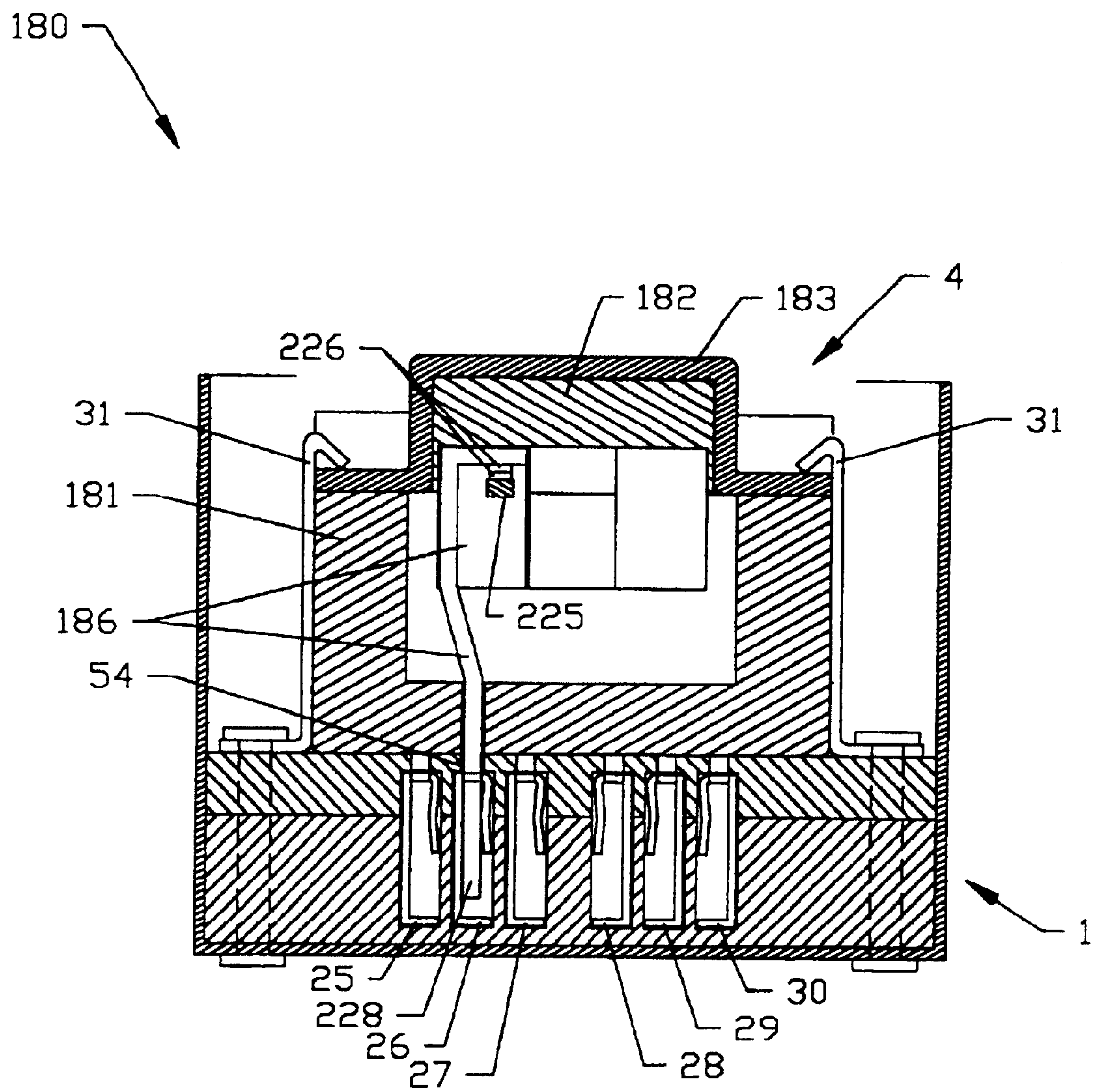

FIG. 137 is a horizontal section view taken along line 137—137 of FIG. 133.

Figure 138:
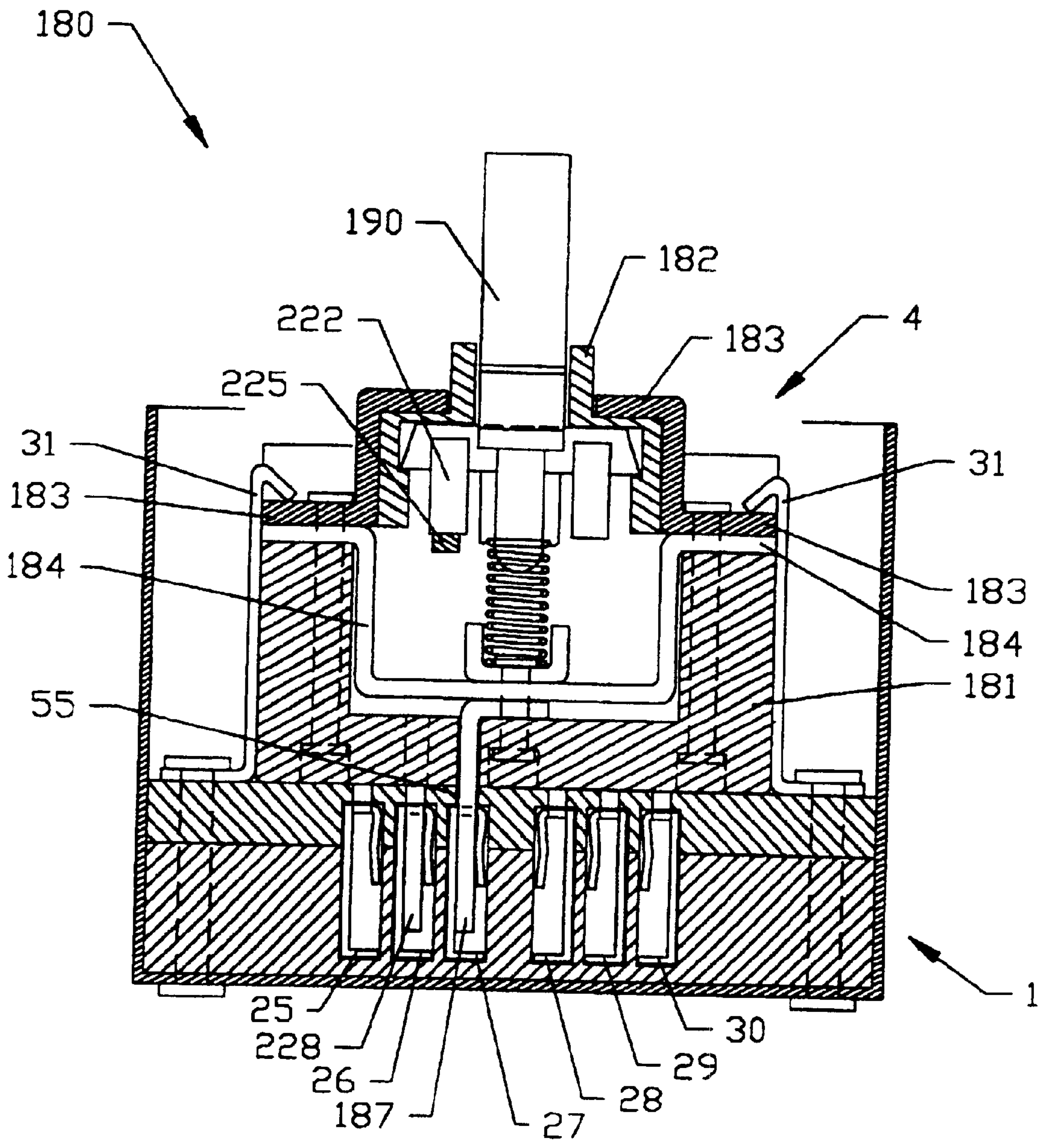

FIG. 138 is a horizontal section view taken along line 138—138 of FIG. 133.

Figure 139:
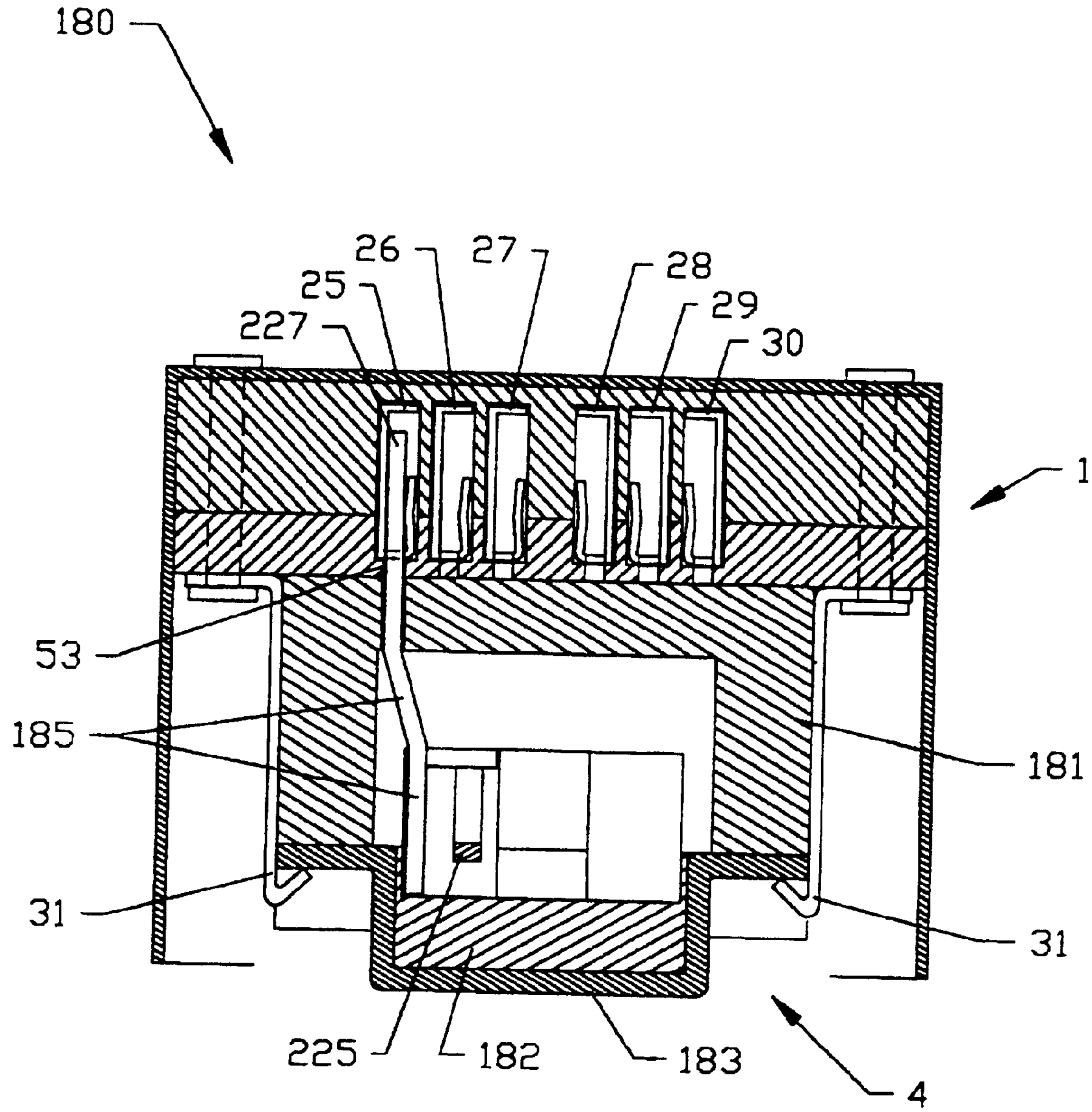

FIG. 139 is a horizontal section view taken along line 139—139 of FIG. 133.

Figure 140:
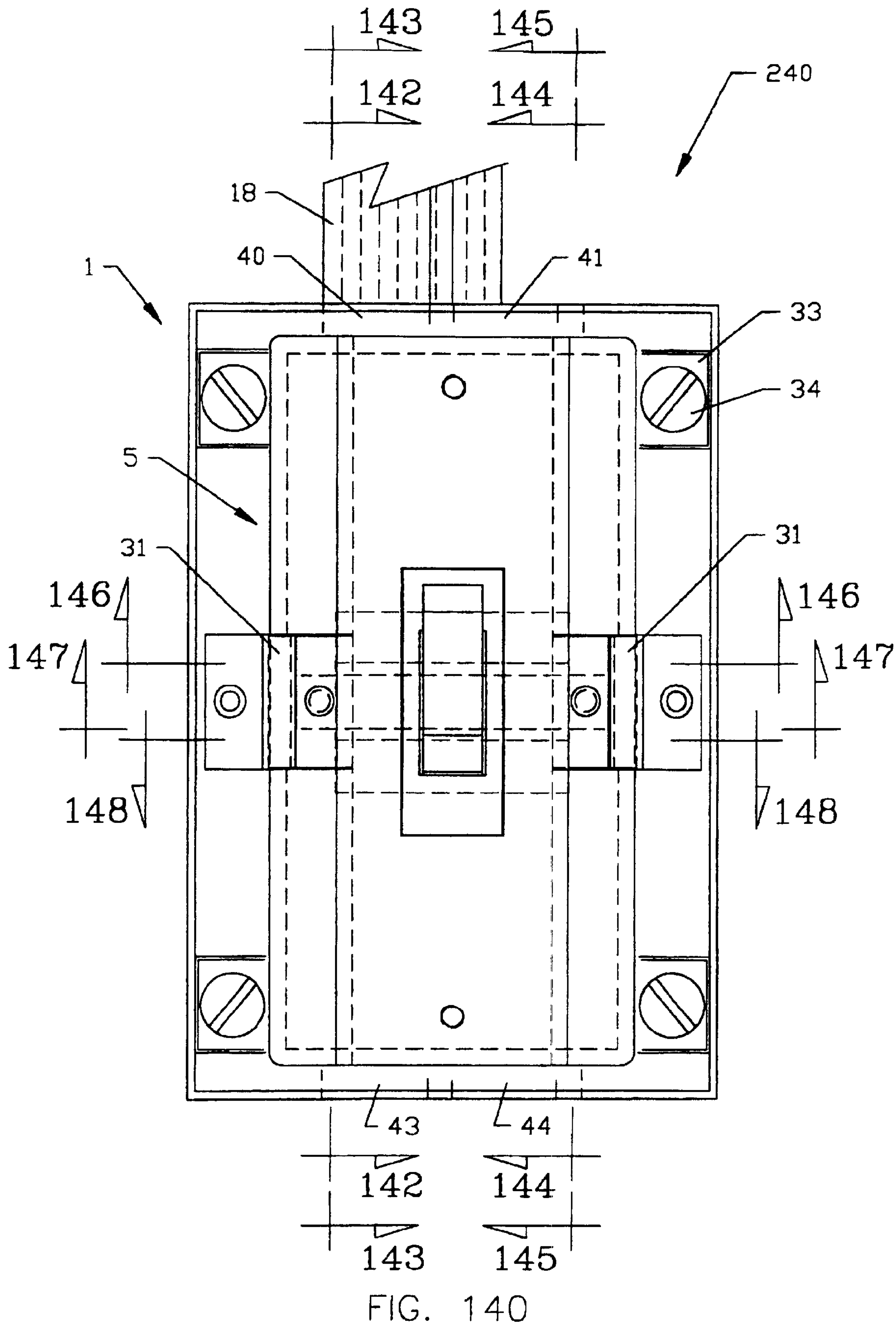

FIG. 140 is a front elevation view of the 3-way-switch module and 4-conductor cable installed in the wallbox.

Figure 141:
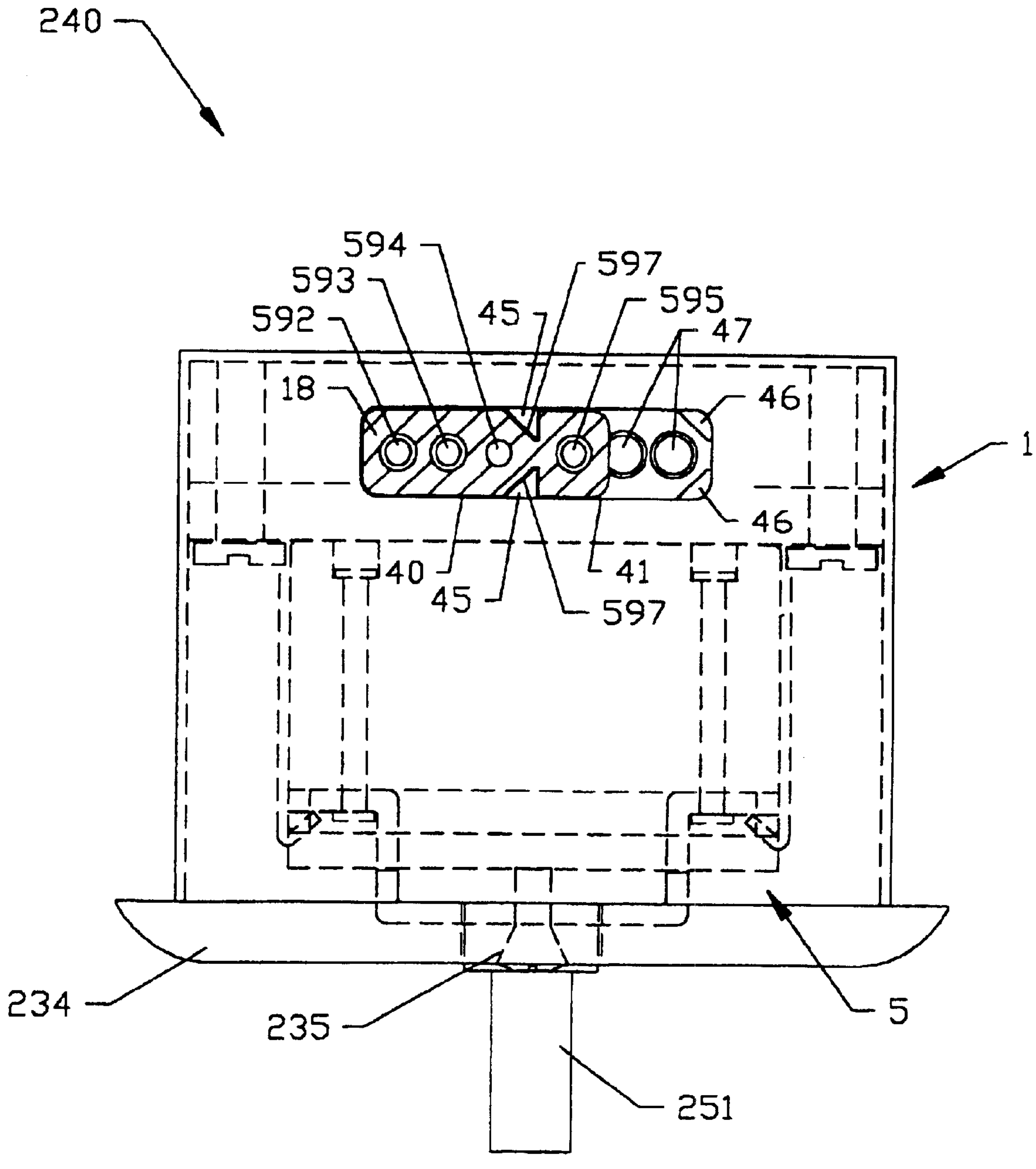

FIG. 141 is a plan view of FIG. 140.

Figure 142:
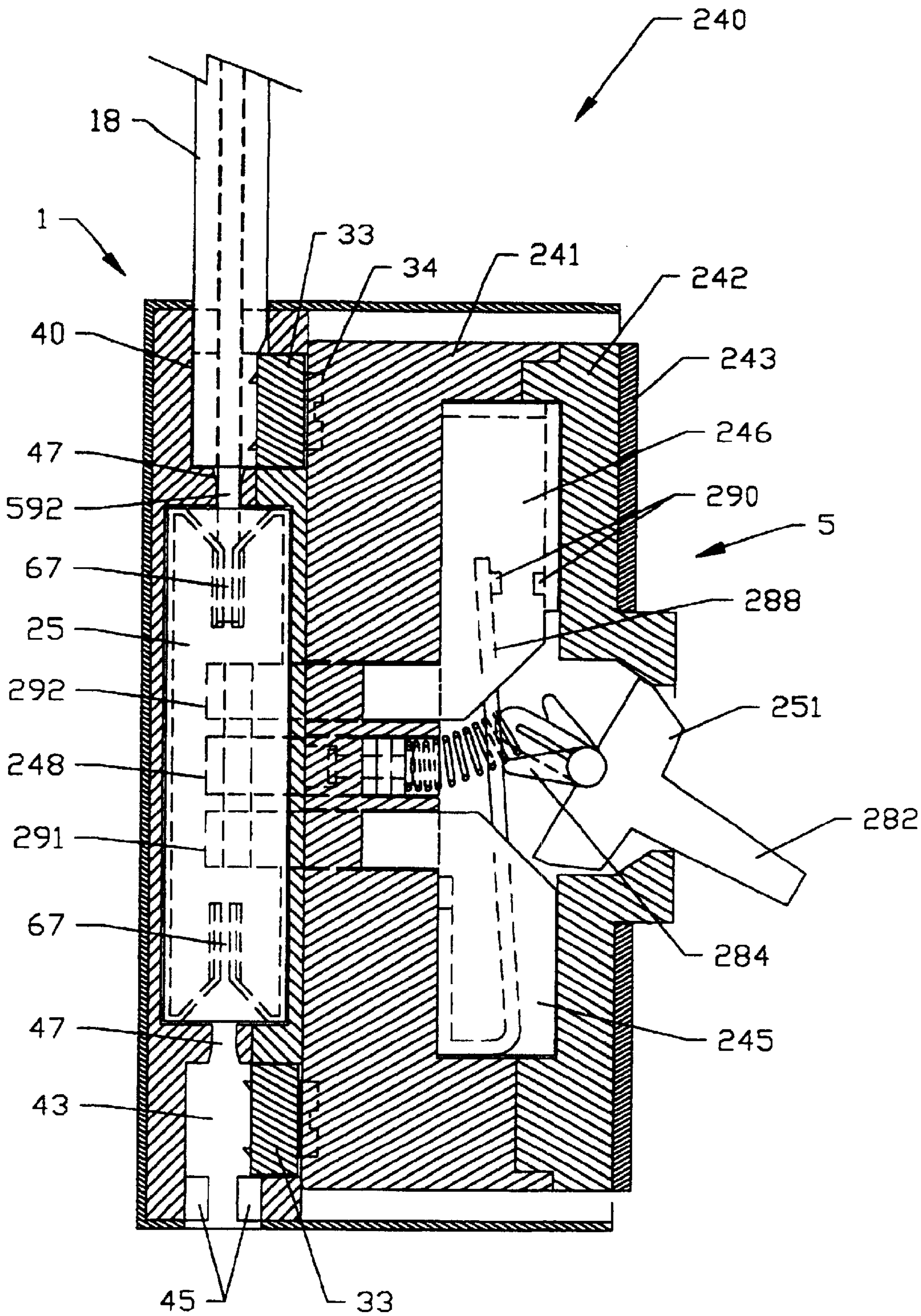

FIG. 142 is a vertical section view taken along line 142—142 of FIG. 140 with the lever in the down position.

Figure 143:
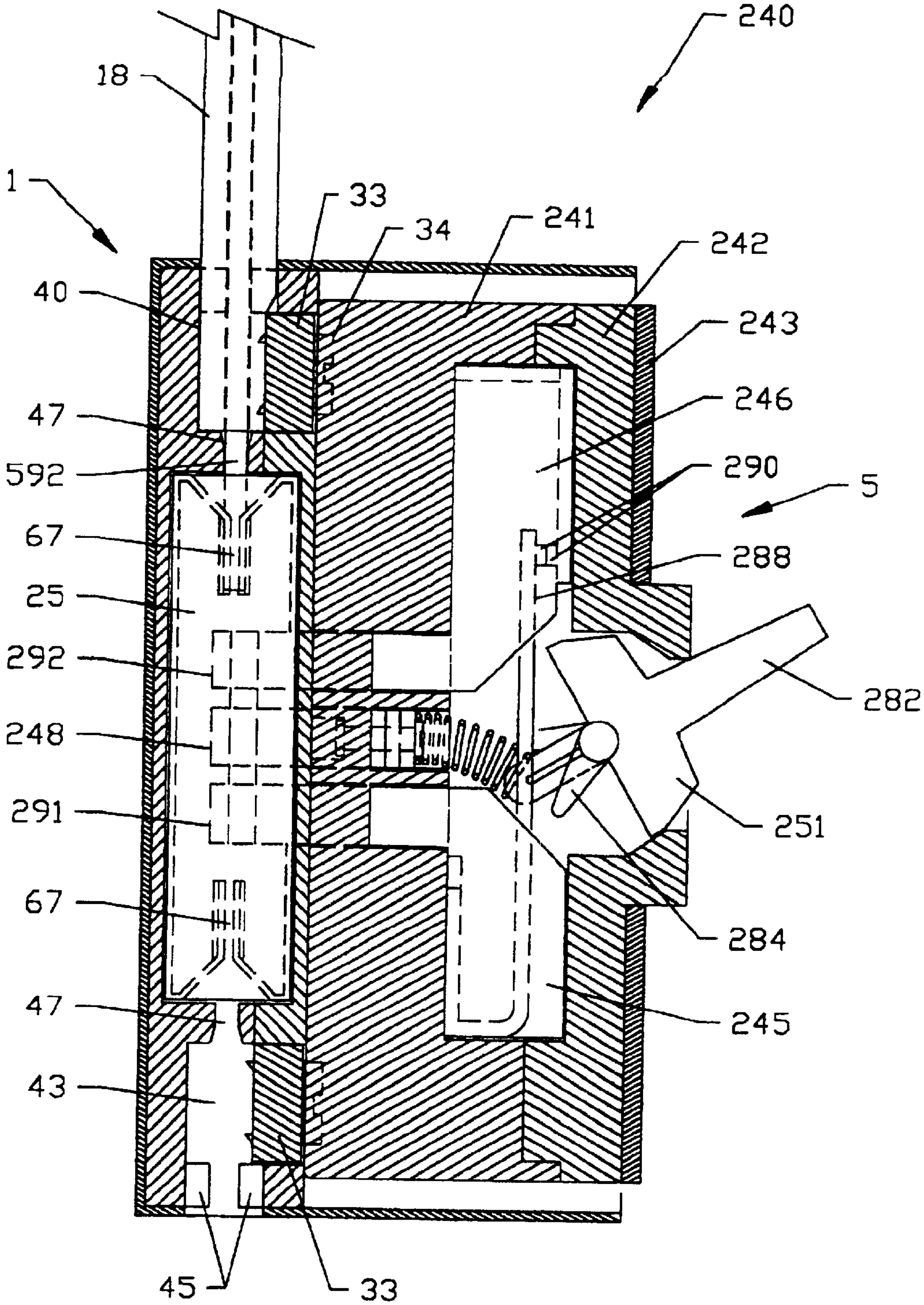

FIG. 143 is a vertical section view taken along line 143—143 of FIG. 140 with the lever in the up position.

Figure 144:
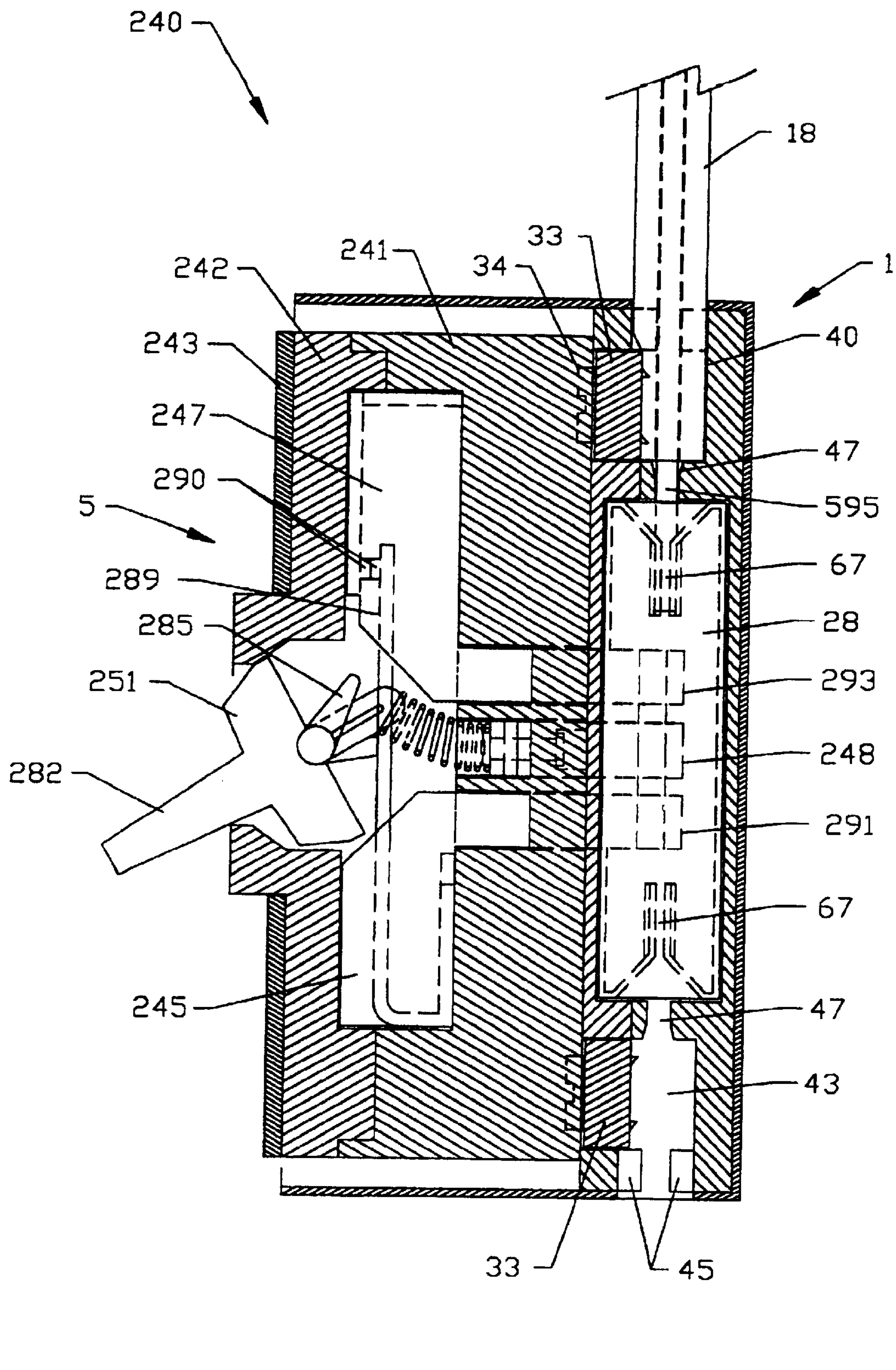

FIG. 144 is a vertical section view taken along line 144—144 of FIG. 140 with the lever in the down position.

Figure 145:
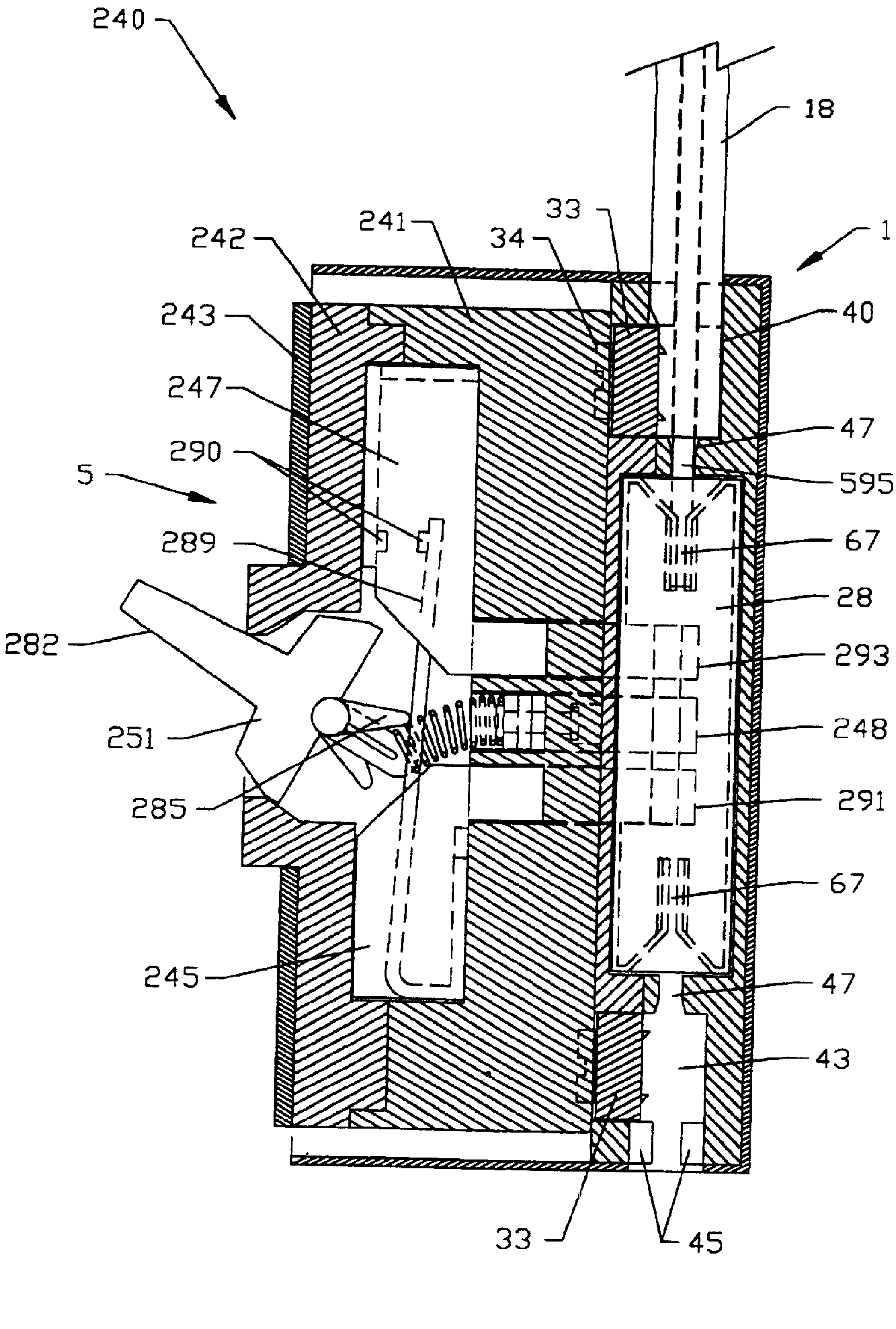

FIG. 145 is a vertical section view taken along line 145—145 of FIG. 140 with the lever in the up position.

Figure 146:
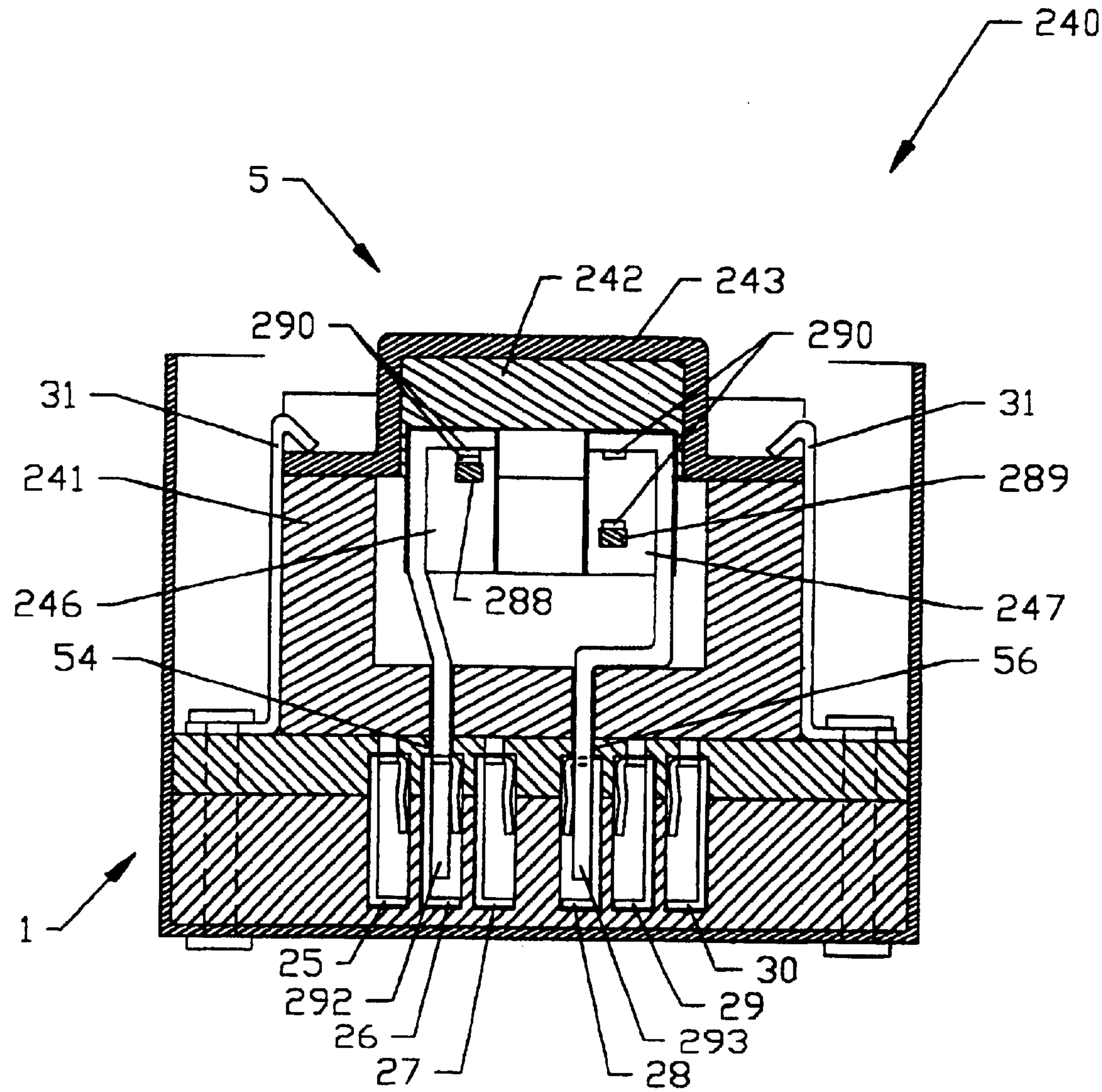

FIG. 146 is a horizontal section view taken along line 146—146 of FIG. 140.

Figure 147:
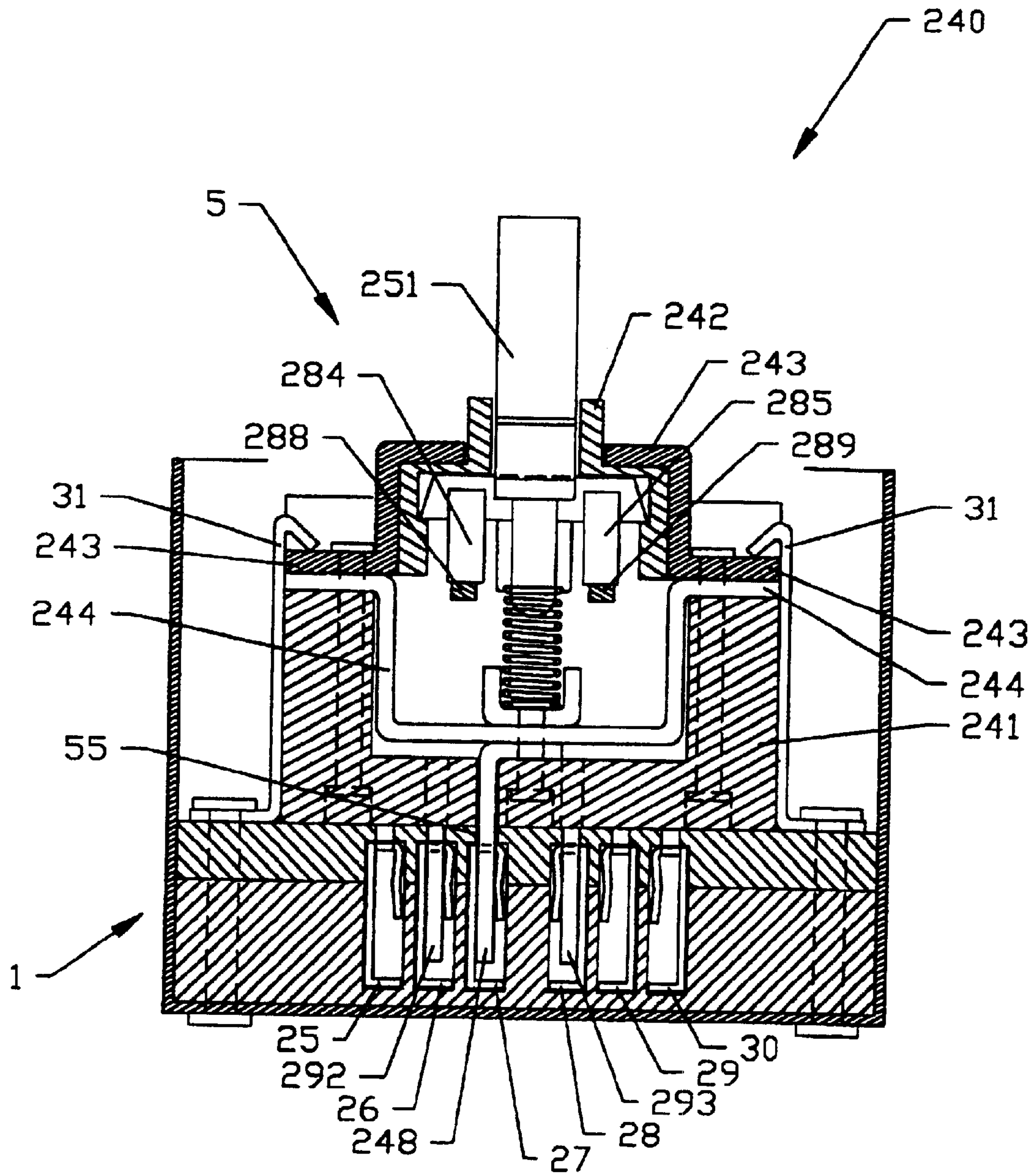

FIG. 147 is a horizontal section view taken along line 147—147 of FIG. 140.

Figure 148:
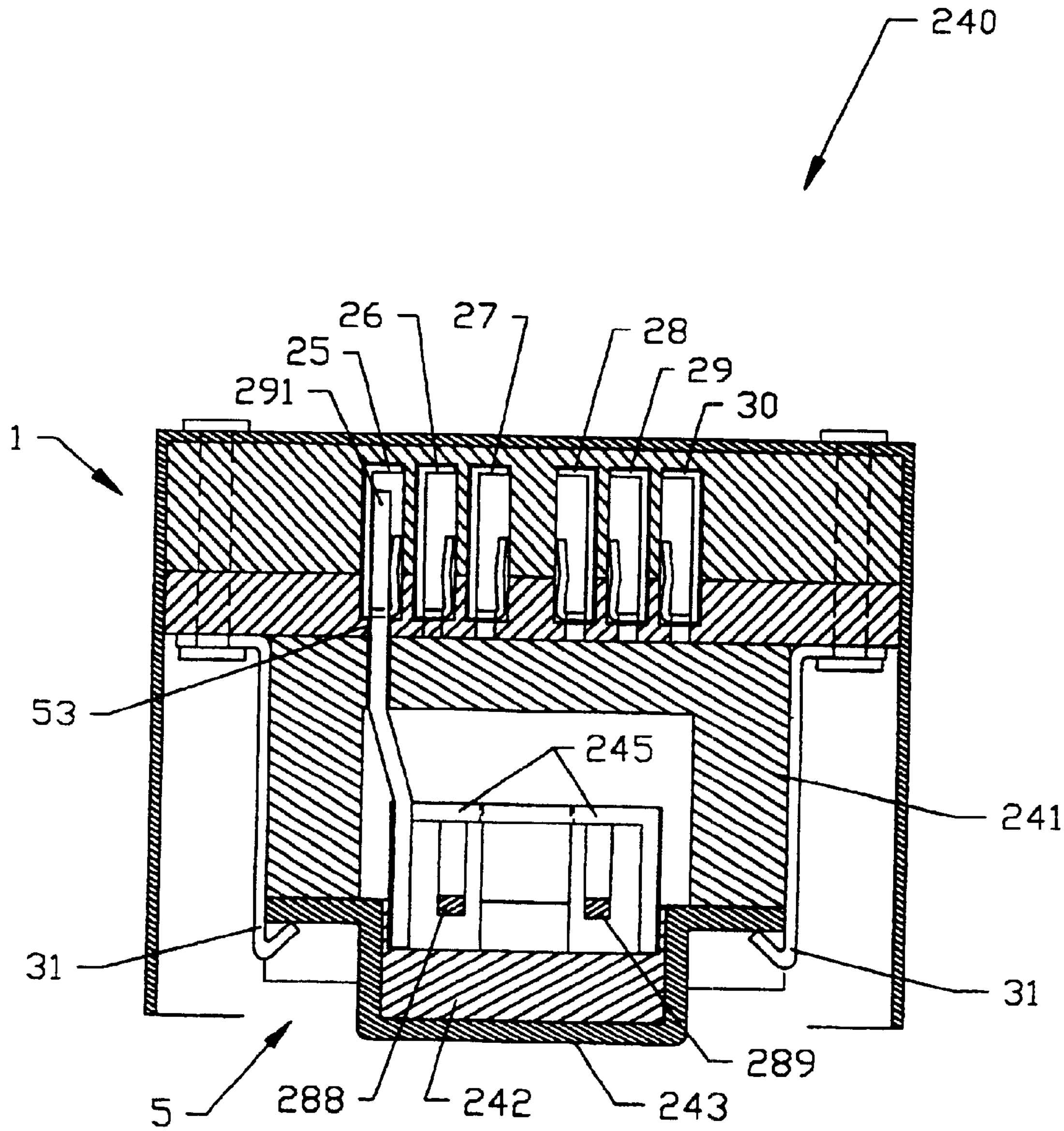

FIG. 148 is a horizontal section view taken along line 148—148 of FIG. 140.

Figure 149:
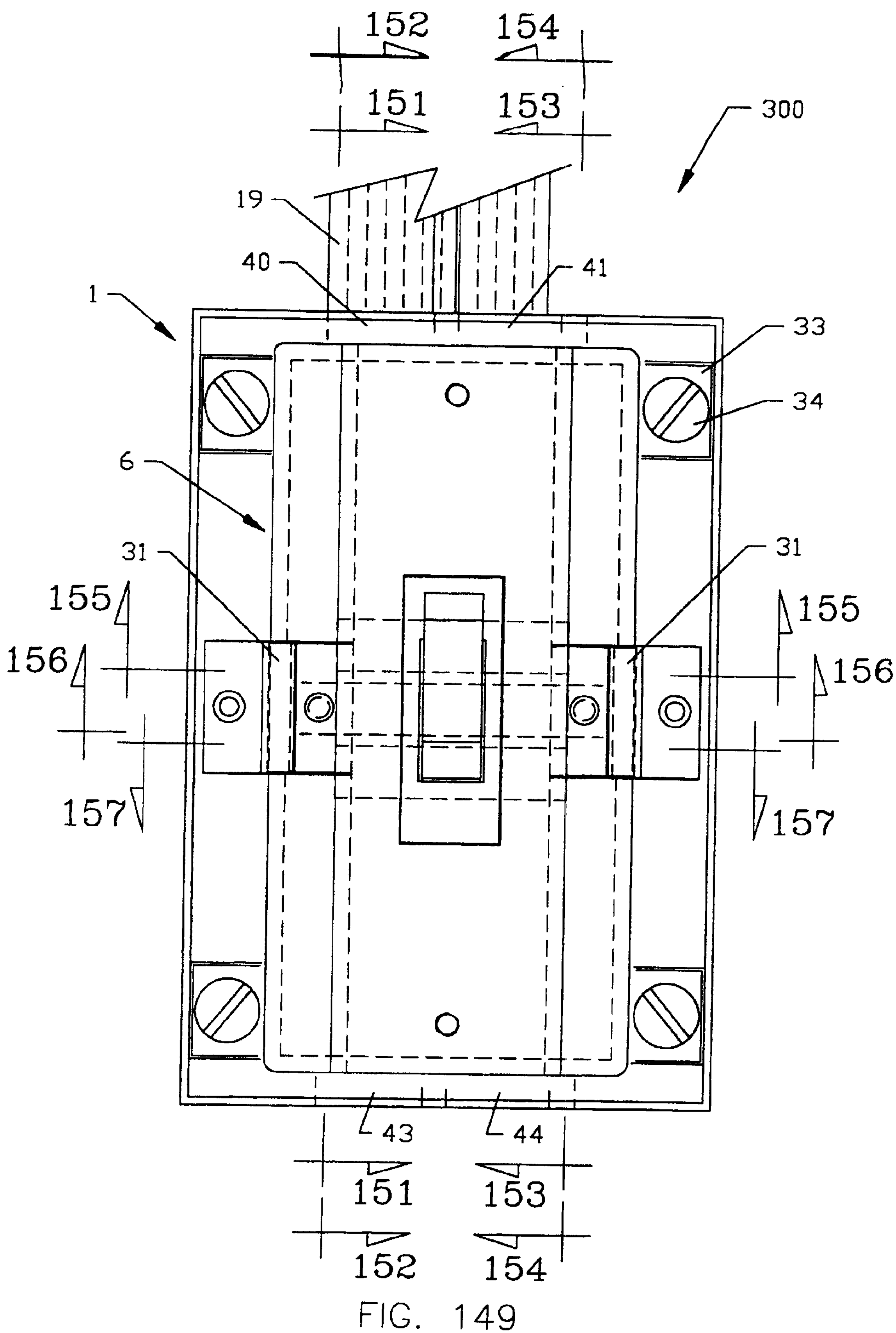

FIG. 149 is a front elevation view of the 4-way-switch module and 5-conductor cable installed in the wallbox.

Figure 150:
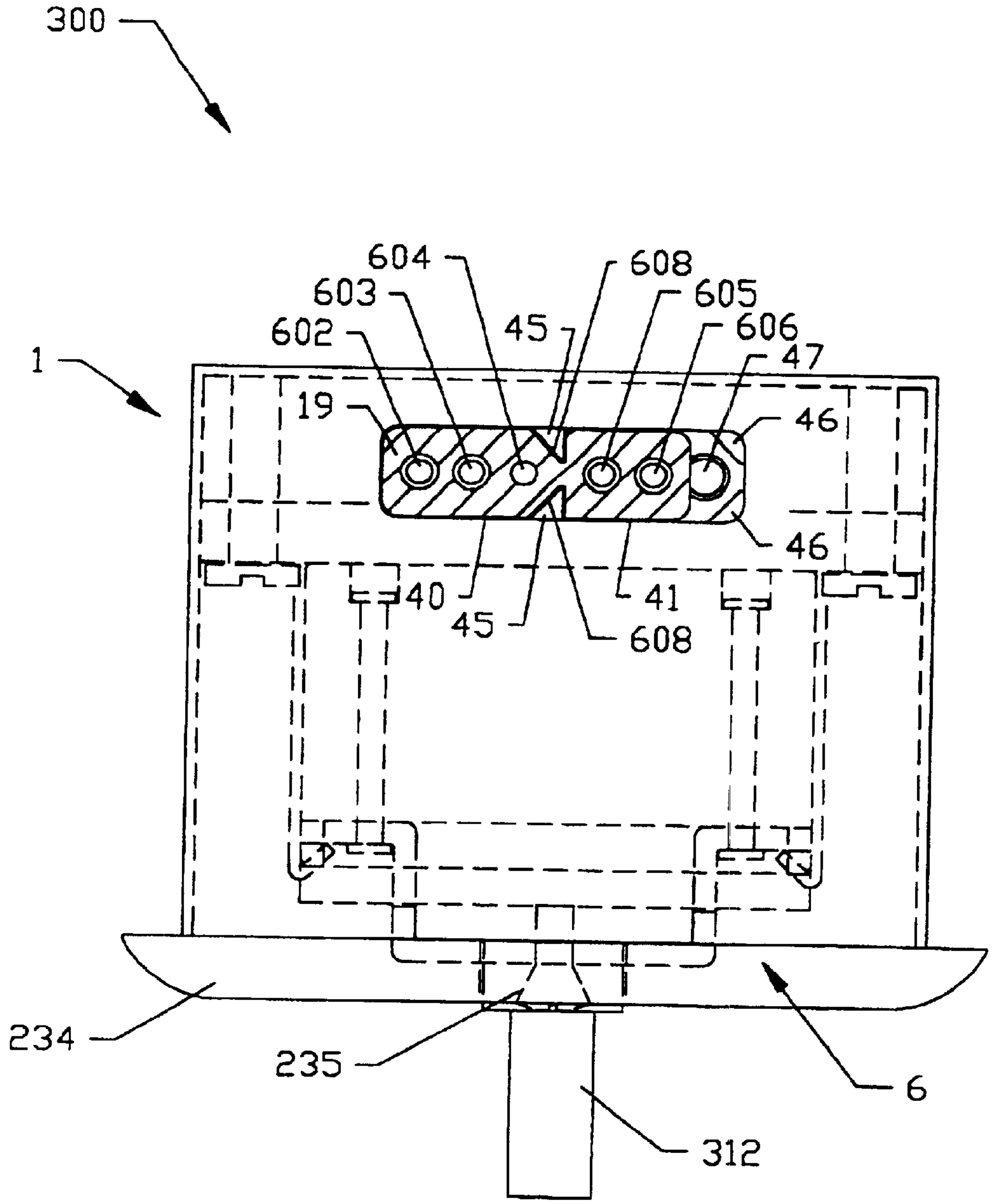

FIG. 150 is a plan view of FIG. 149.

Figure 151:
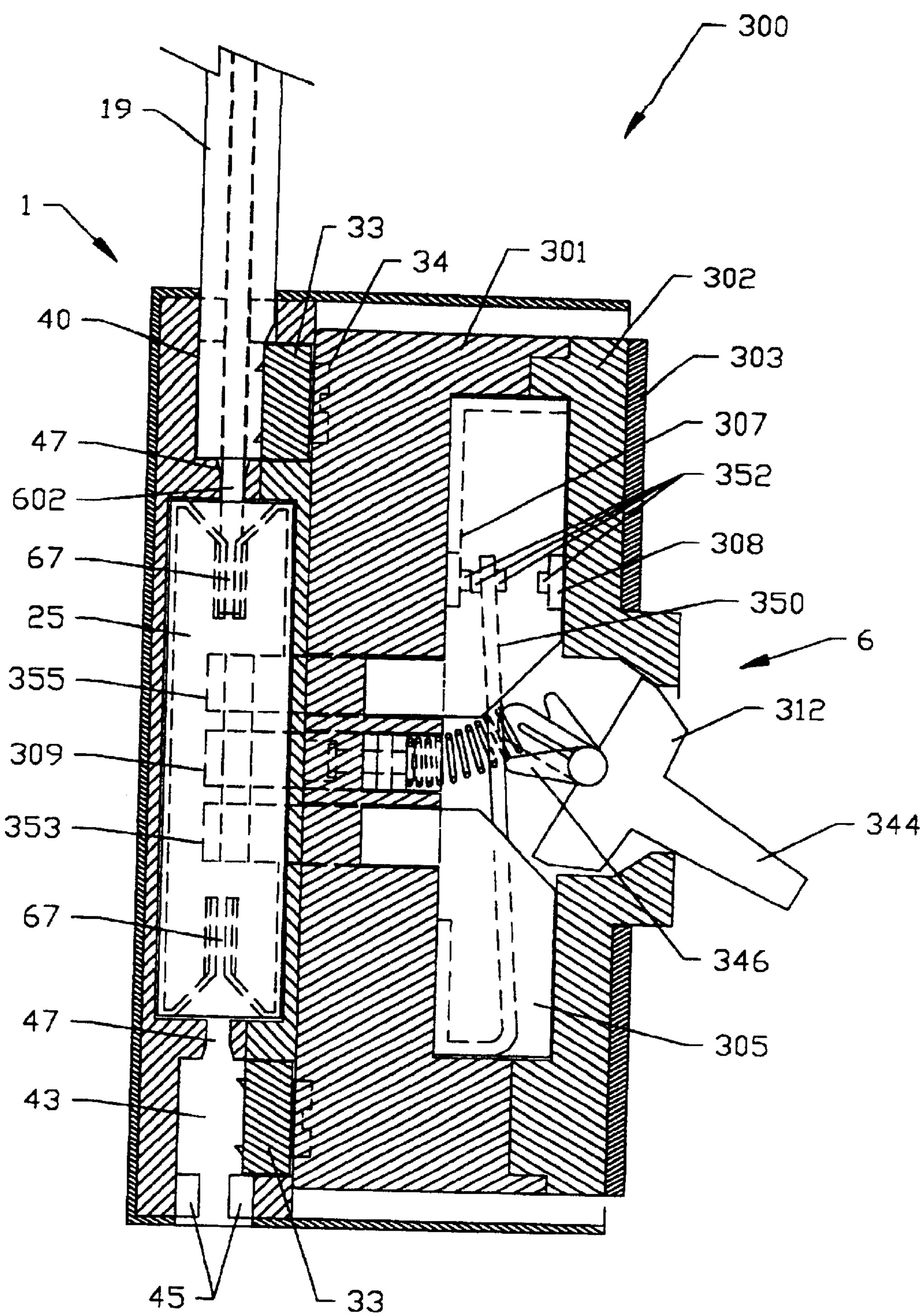

FIG. 151 is a vertical section view taken along line 151—151 of FIG. 149 with the lever in the down position.

Figure 152:
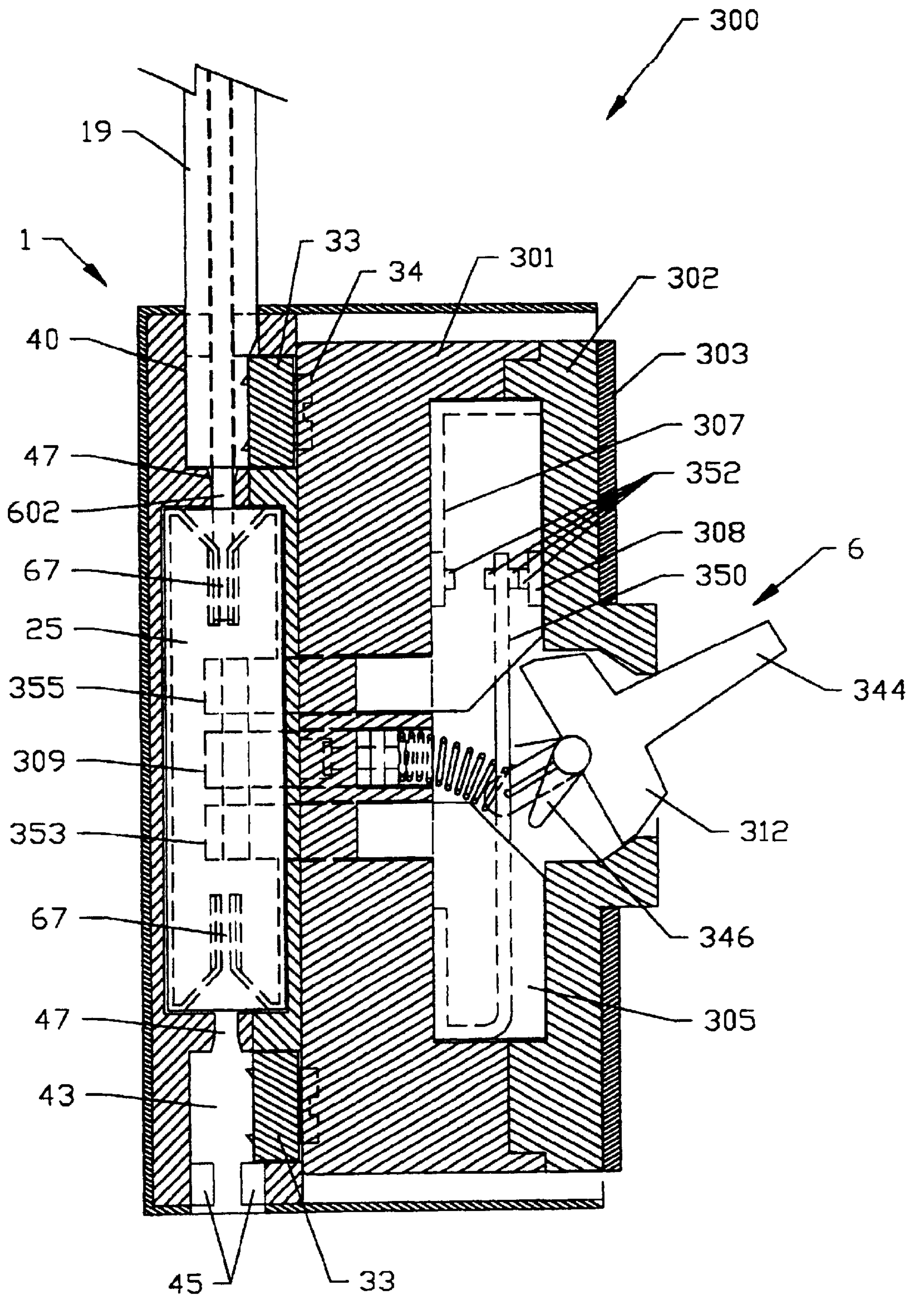

FIG. 152 is a vertical section view taken along line 152—152 of FIG. 149 with the lever in the up position.

Figure 153:
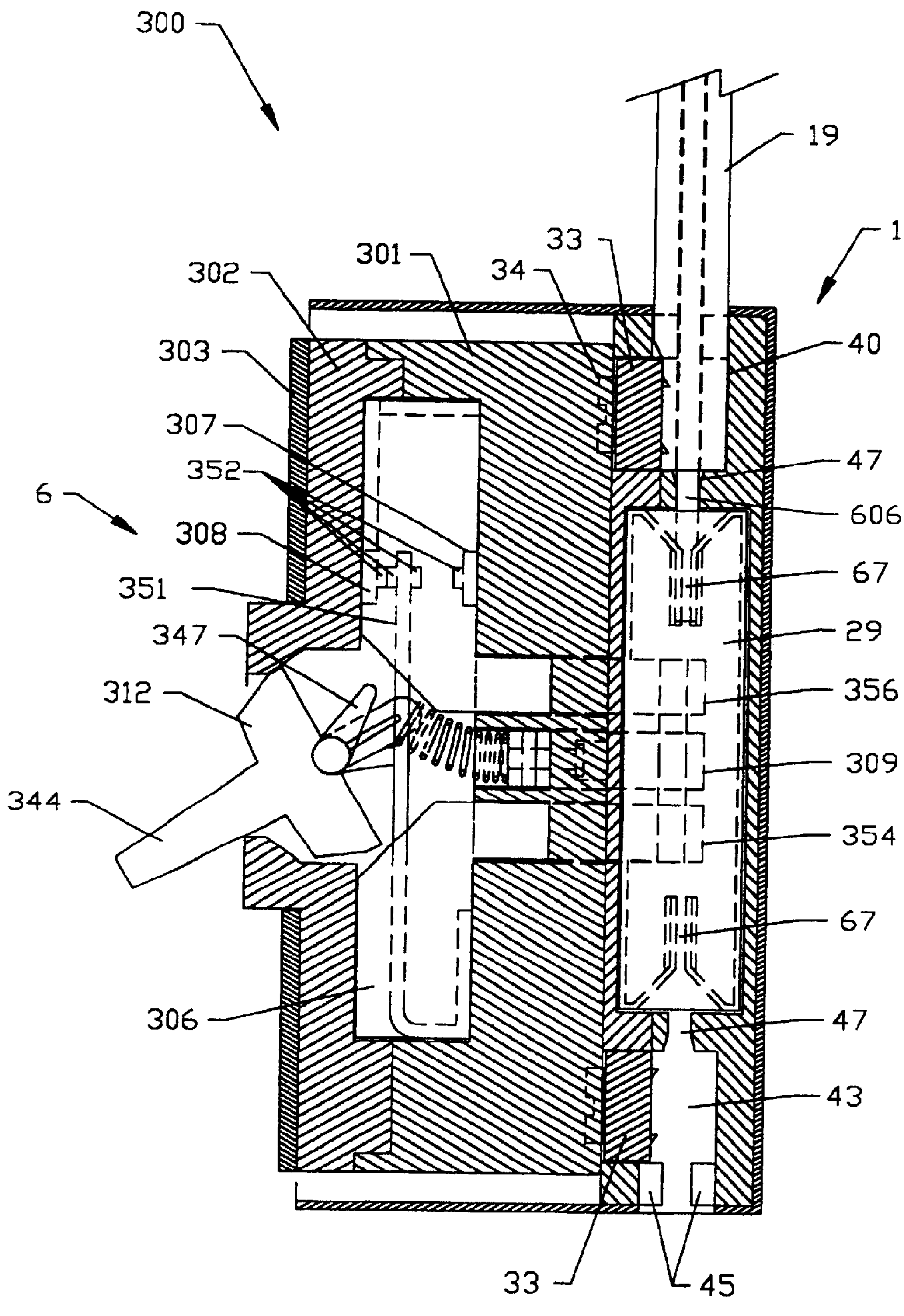

FIG. 153 is a vertical section view taken along line 153—153 of FIG. 149 with the lever in the down position.

Figure 154:
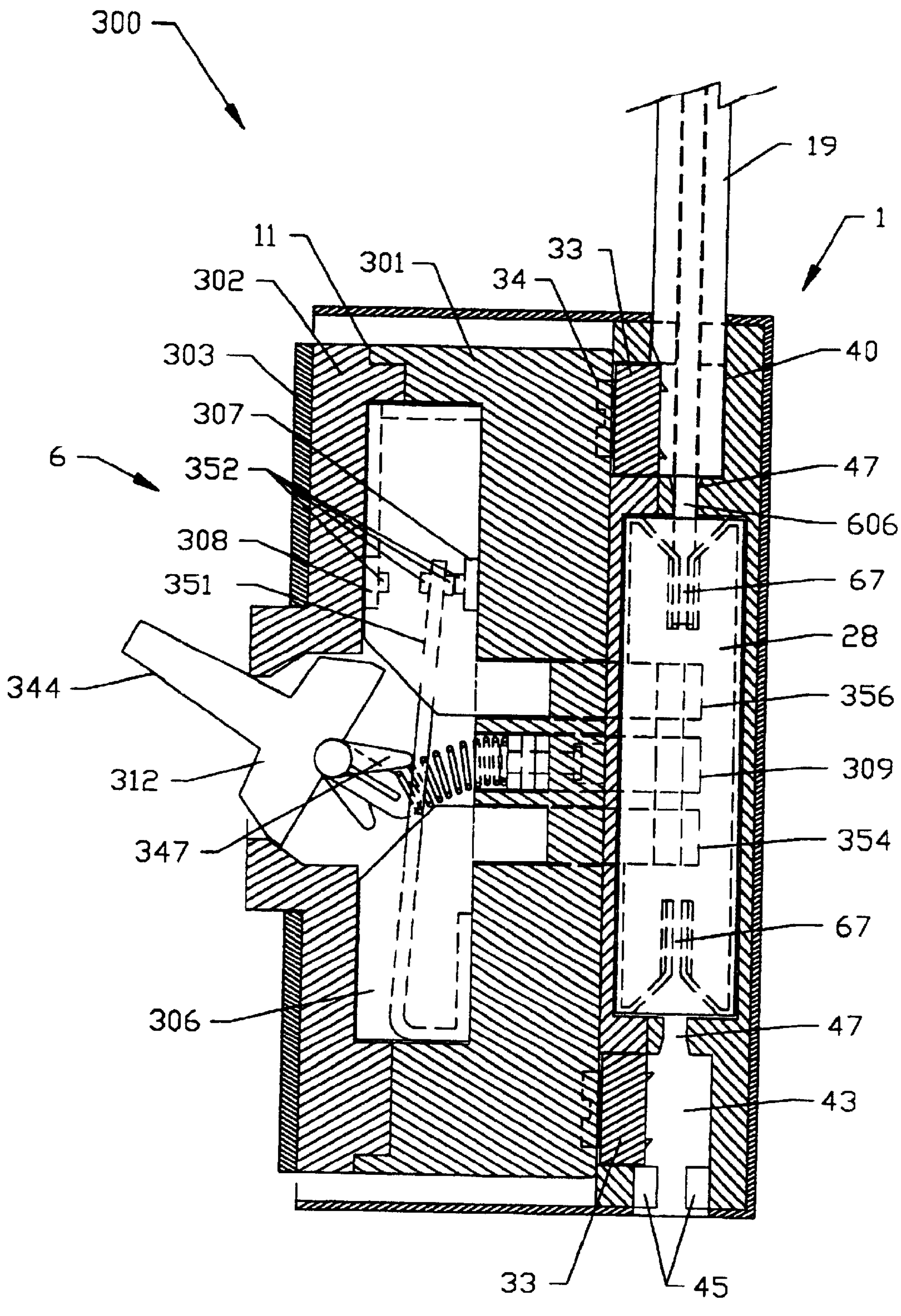

FIG. 154 is a vertical section view taken along line 154—154 of FIG. 149 with the lever in the up position.

Figure 155:
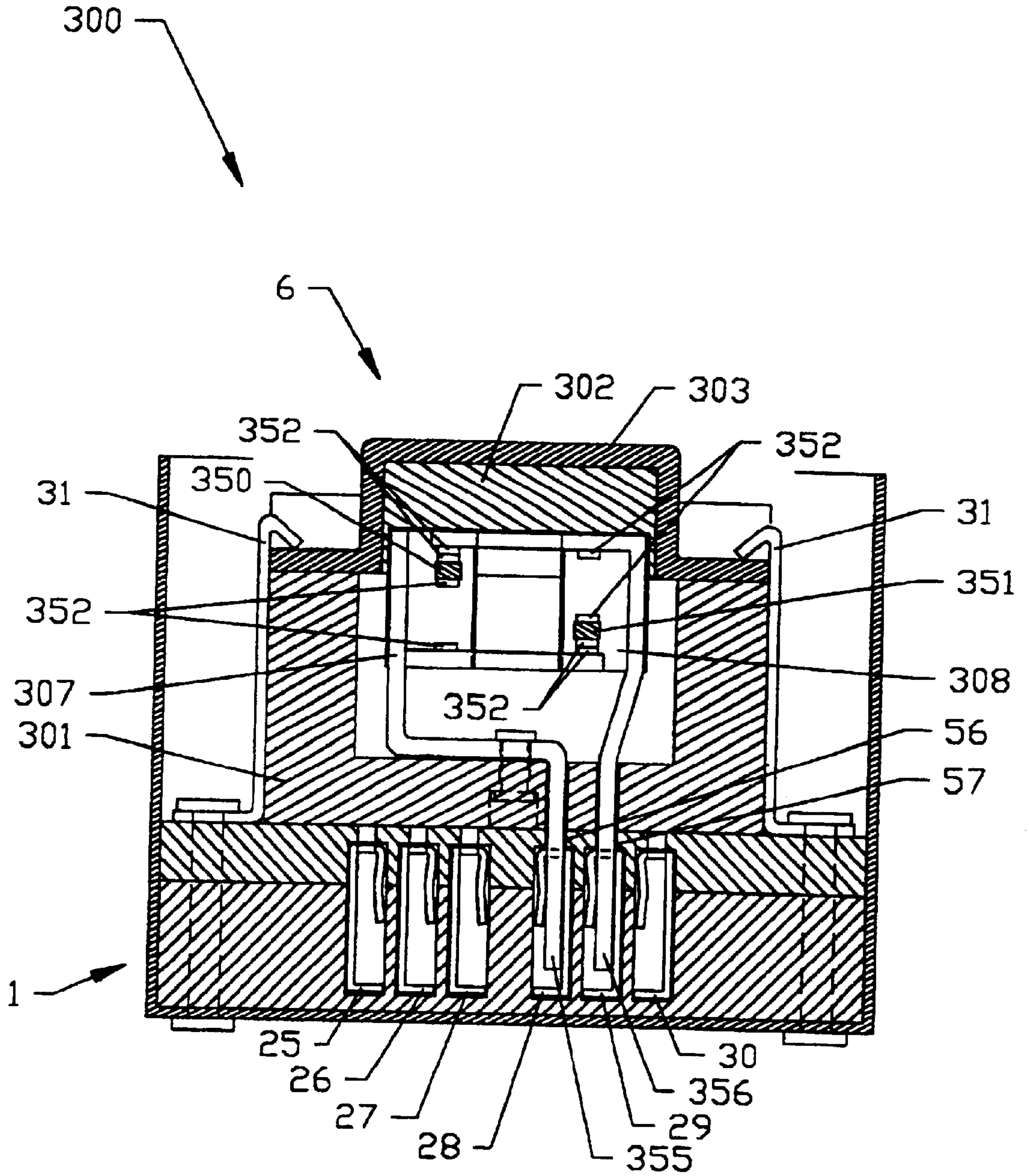

FIG. 155 is a horizontal section view taken along line 155—155 of FIG. 149.

Figure 156:
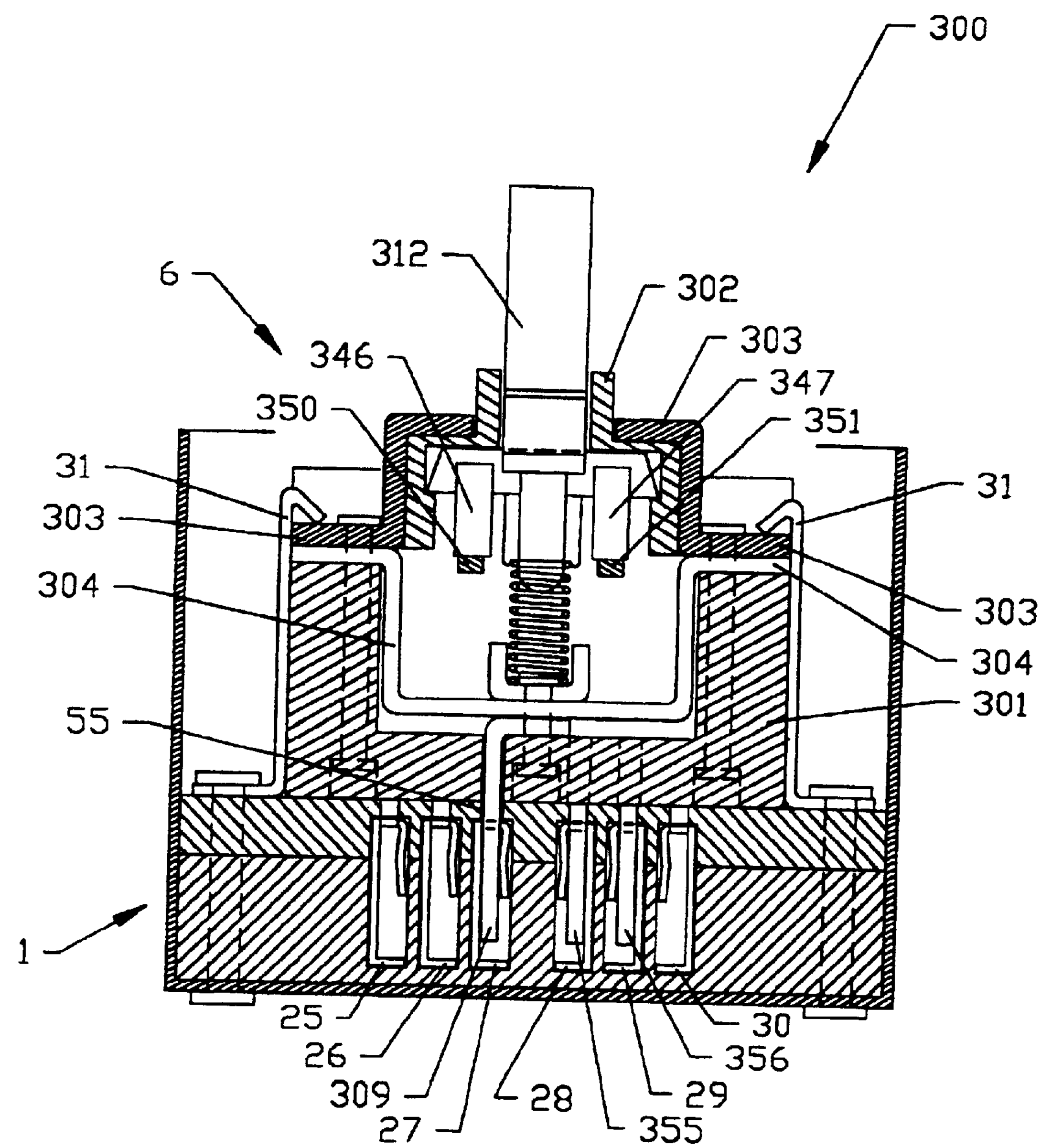

FIG. 156 is a horizontal section view taken along line 156—156 of FIG. 149.

Figure 157:
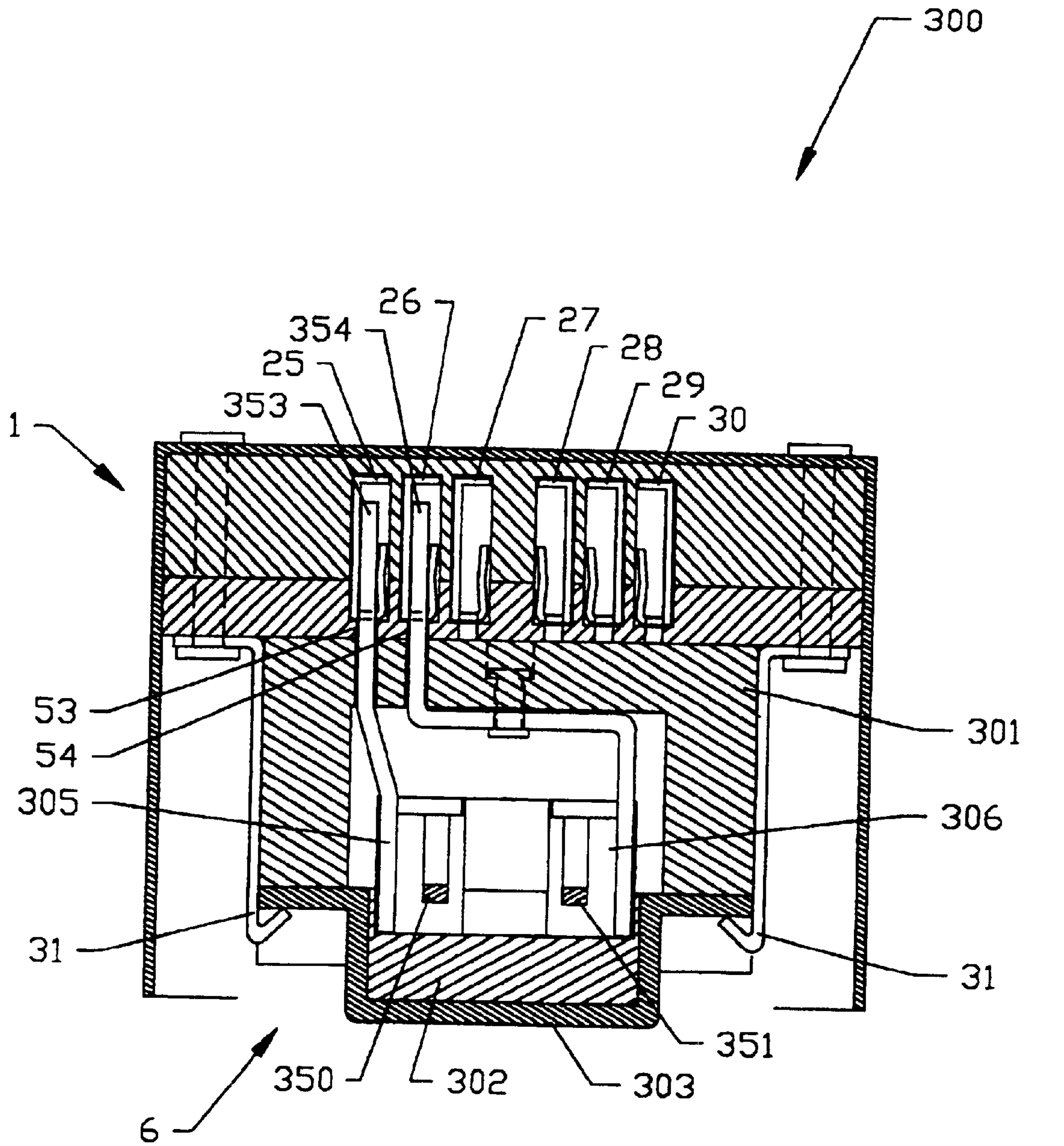

FIG. 157 is a horizontal section view taken along line 157—157 of FIG. 149.

Figure 158:
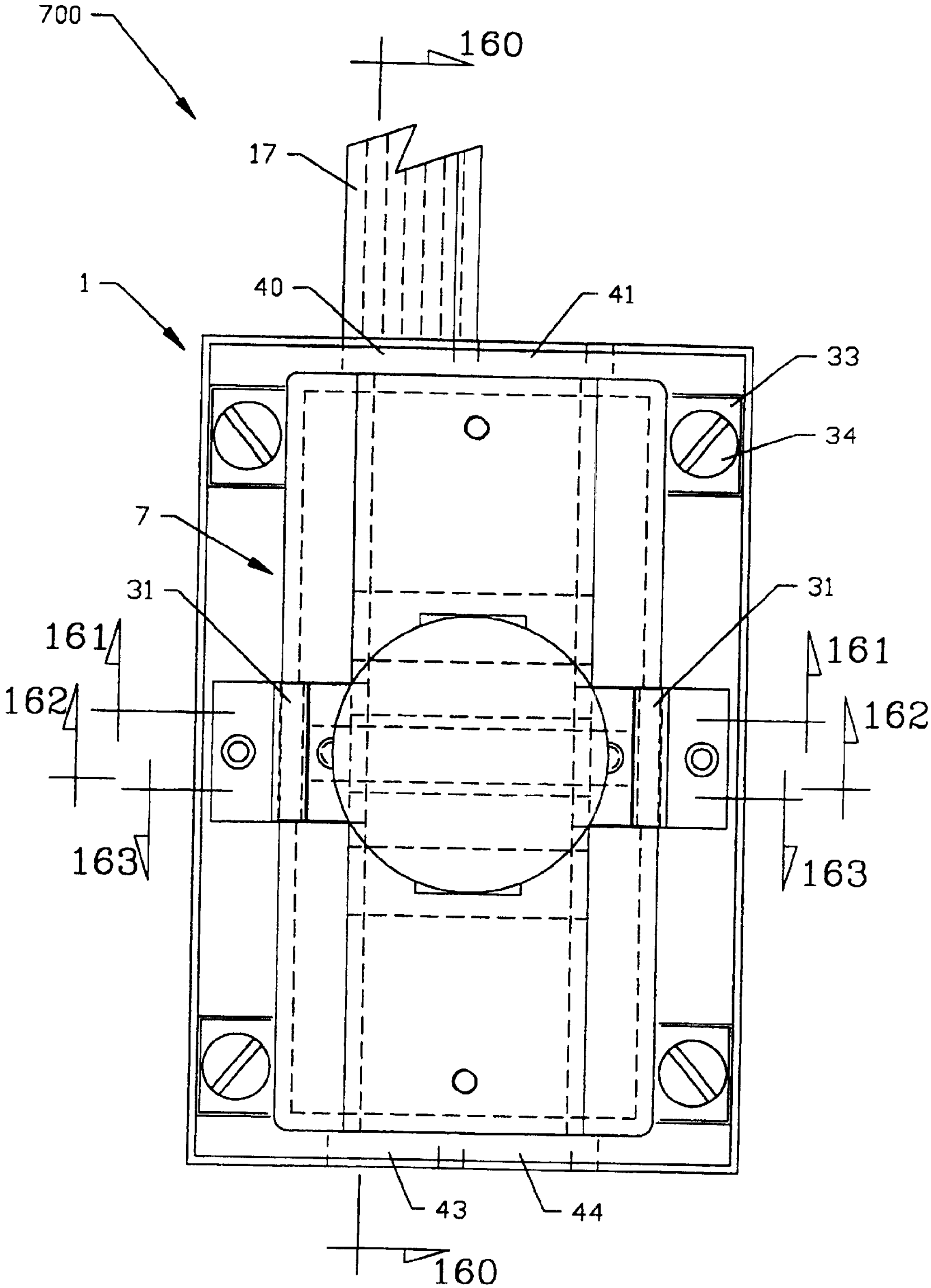

FIG. 158 is a front elevation view of the dimmer switch module and 3-conductor cable installed in the wallbox.

Figure 159:
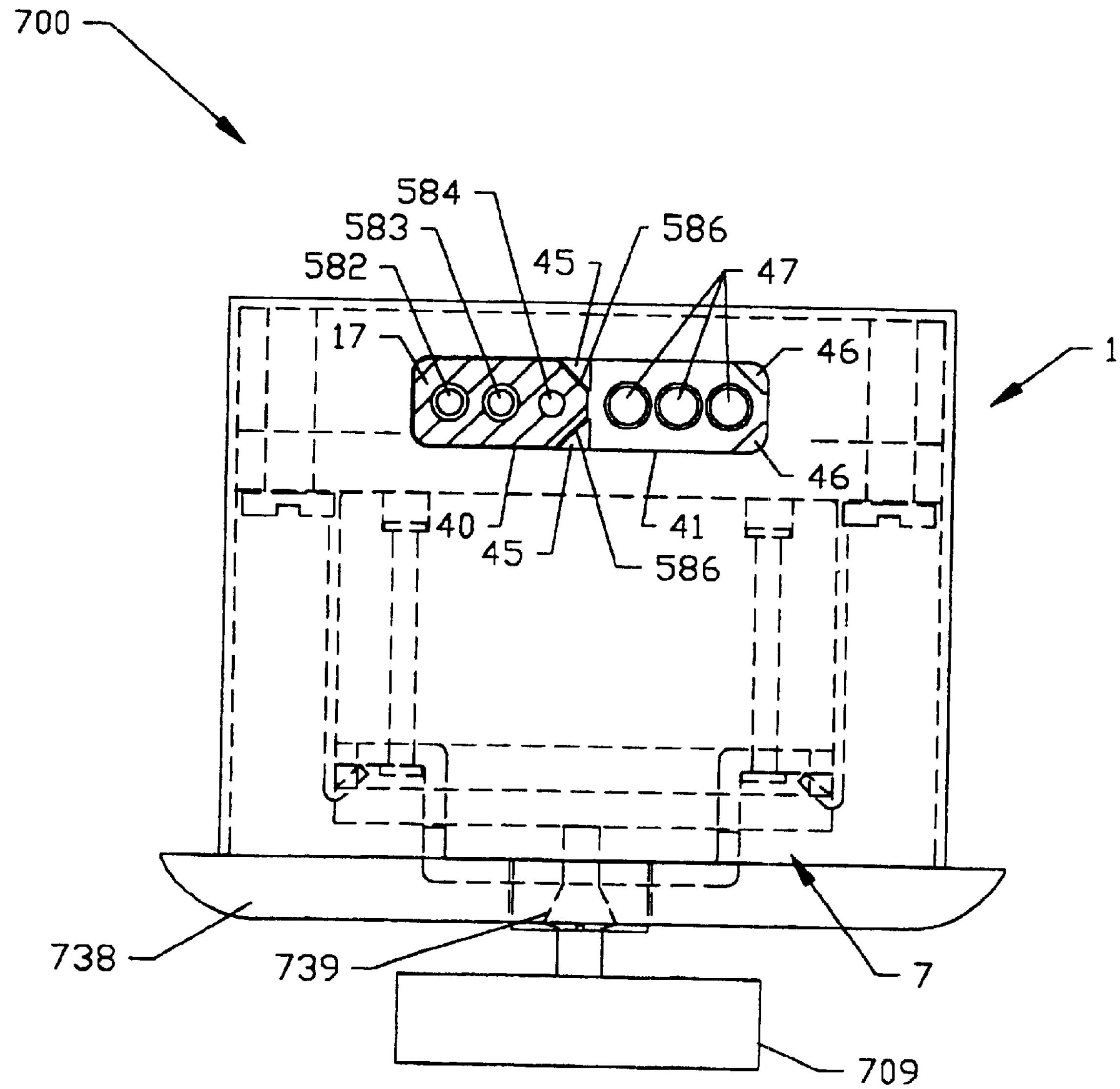

FIG. 159 is a plan view of FIG. 158.

Figure 160:
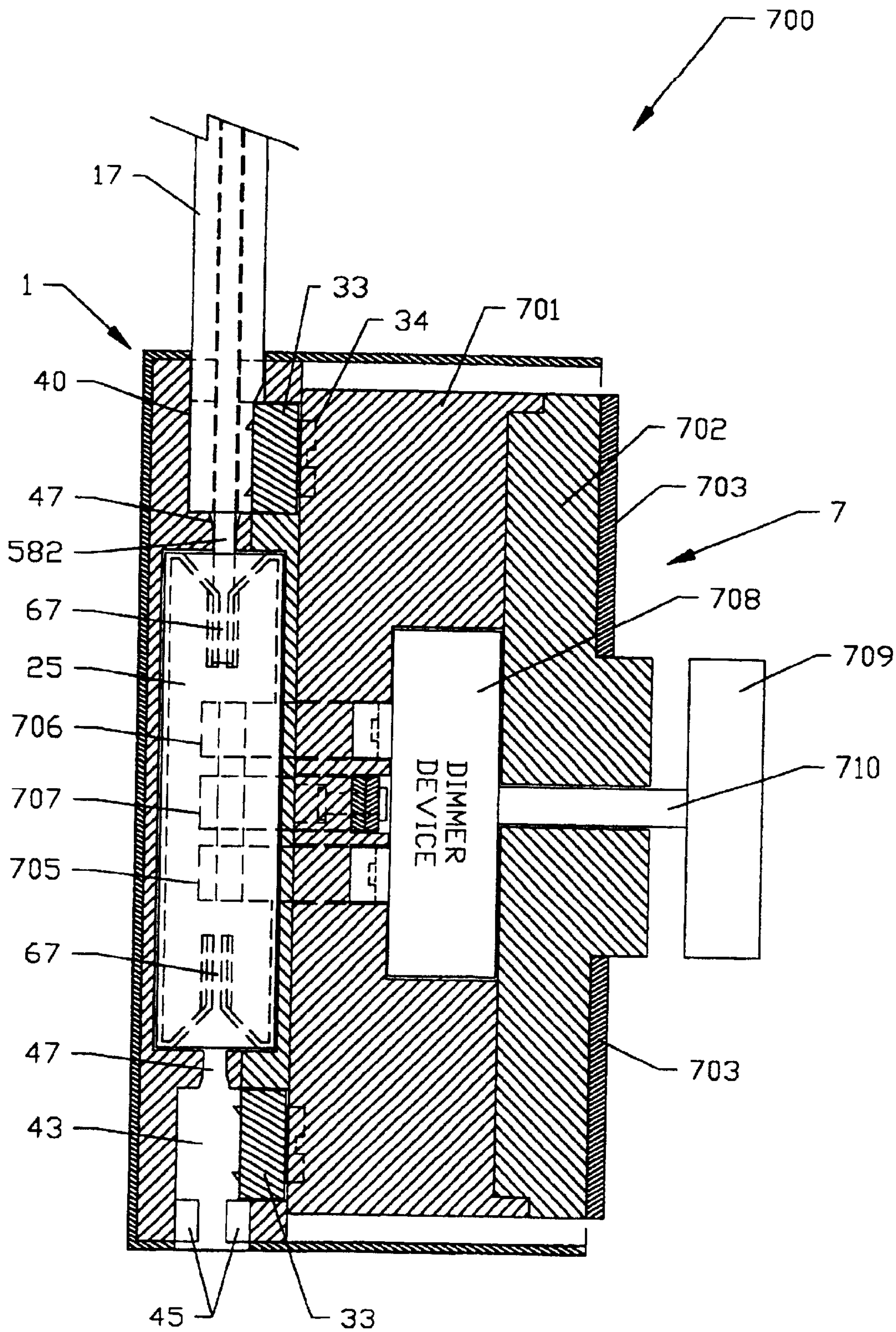

FIG. 160 is a vertical section view taken along line 160—160 of FIG. 158.

Figure 161:
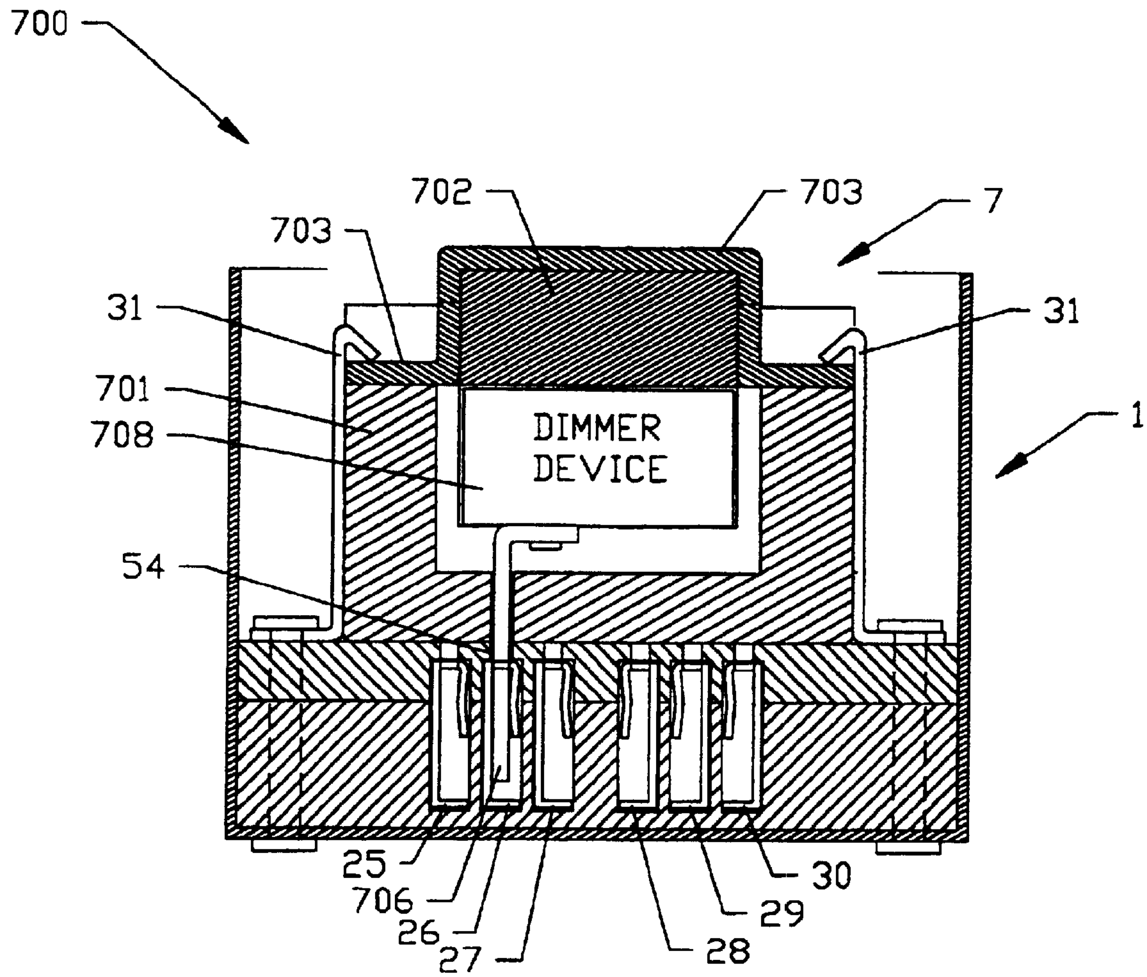

FIG. 161 is a horizontal section view taken along line 161—161 of FIG. 158.

Figure 162:
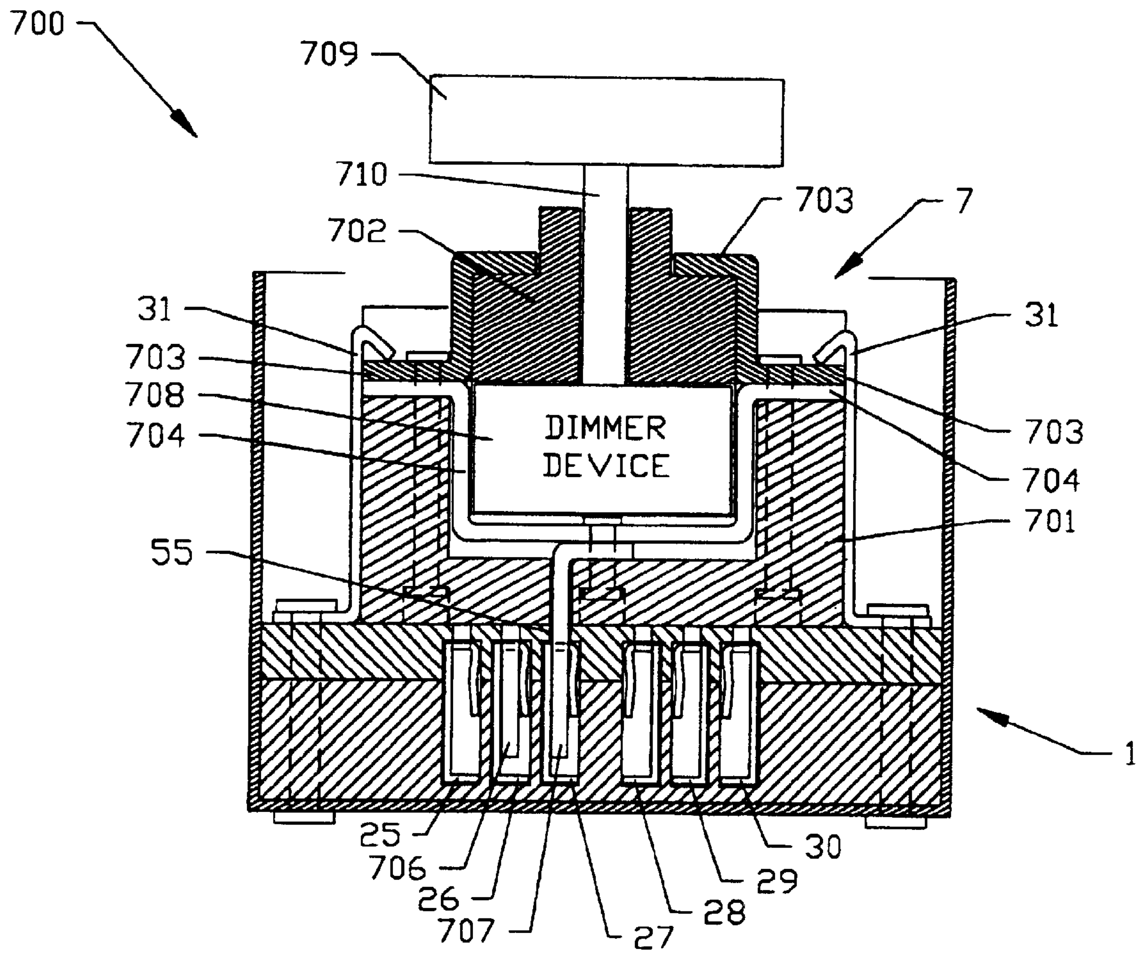

FIG. 162 is a horizontal section view taken along line 162—162 of FIG. 158.

Figure 163:
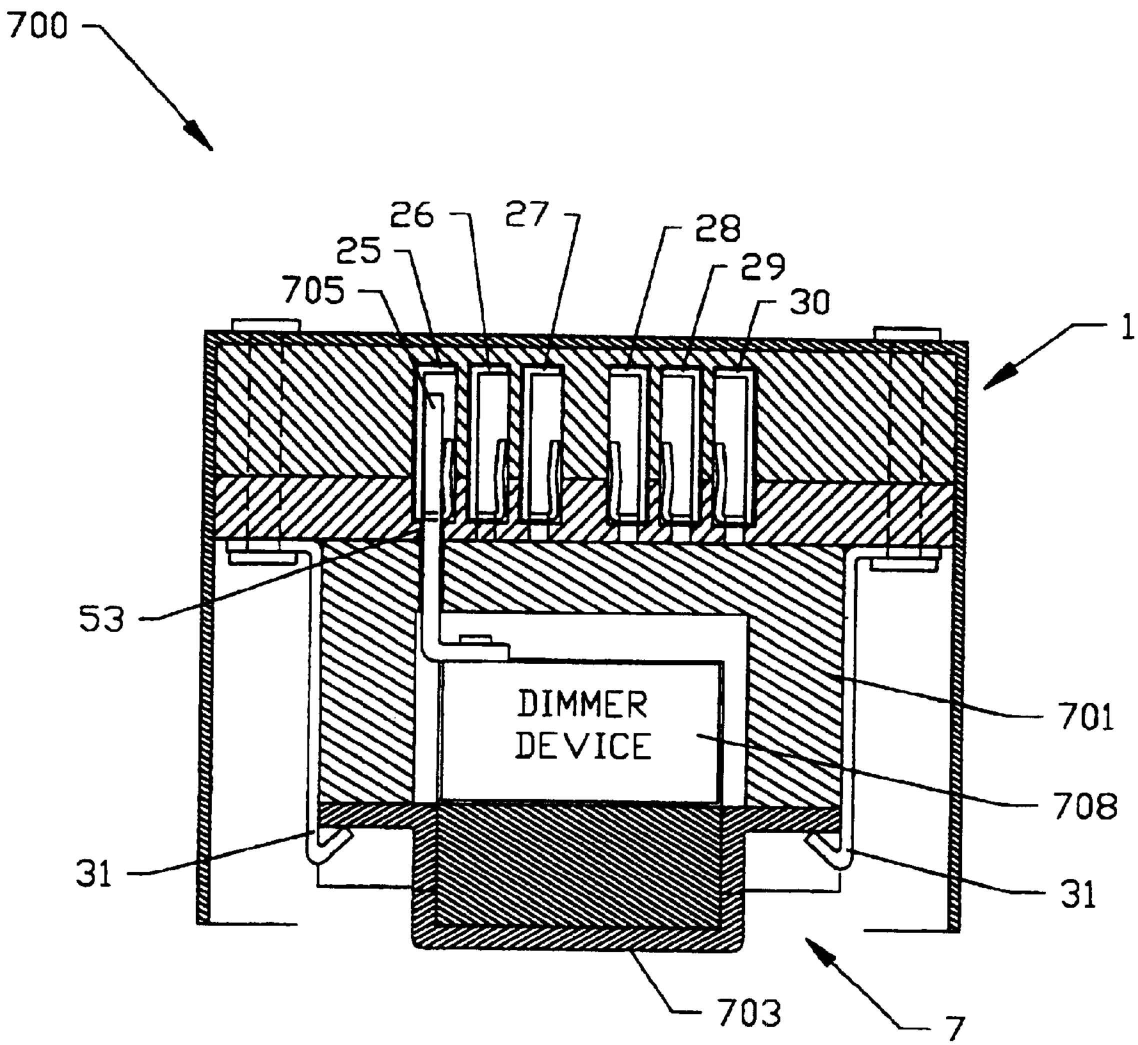

FIG. 163 is a horizontal section view taken along line 163—163 of FIG. 158.

Figure 164:
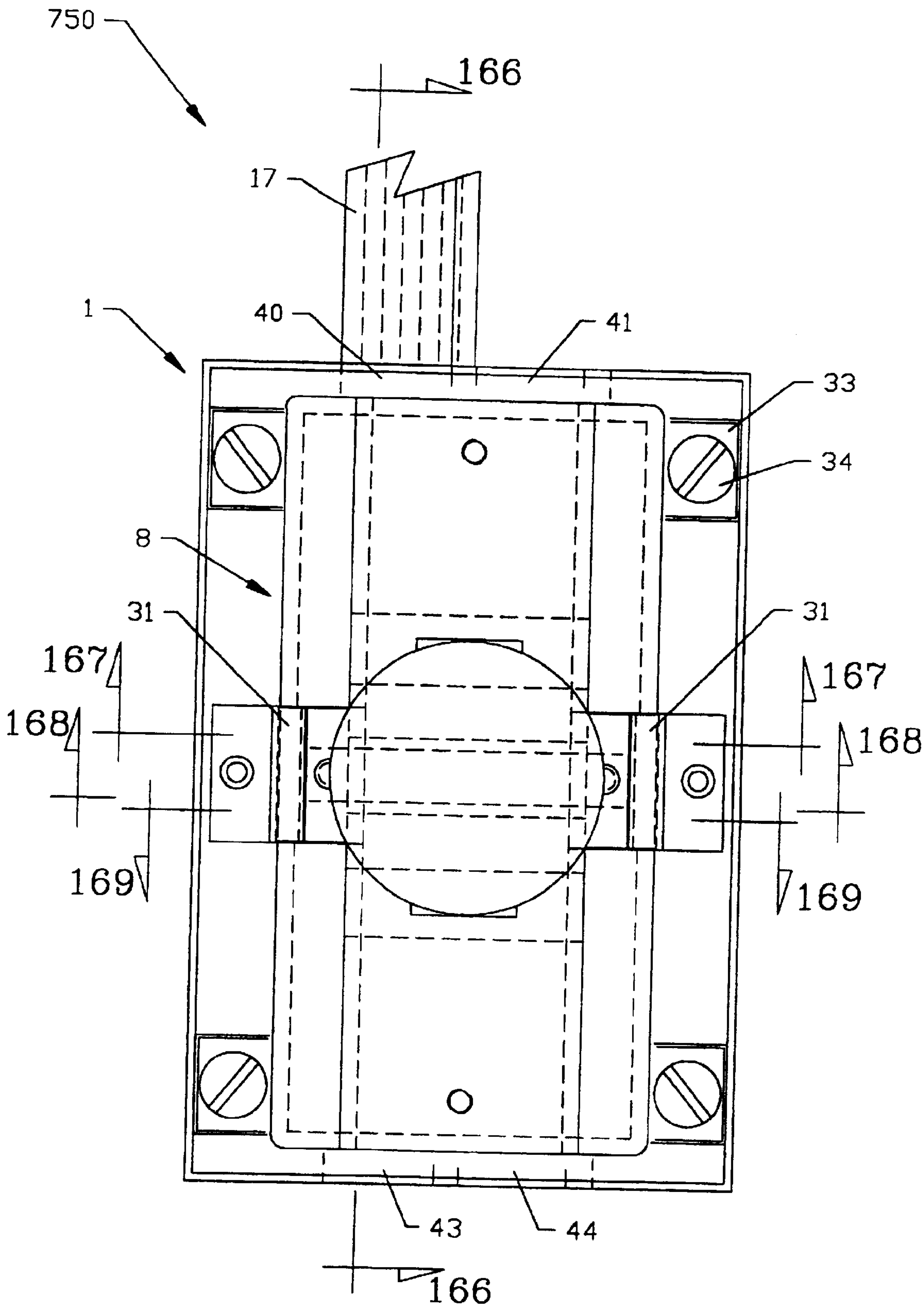

FIG. 164 is a front elevation view of the fan-control switch module and 3-conductor cable installed in the wallbox.

Figure 165:
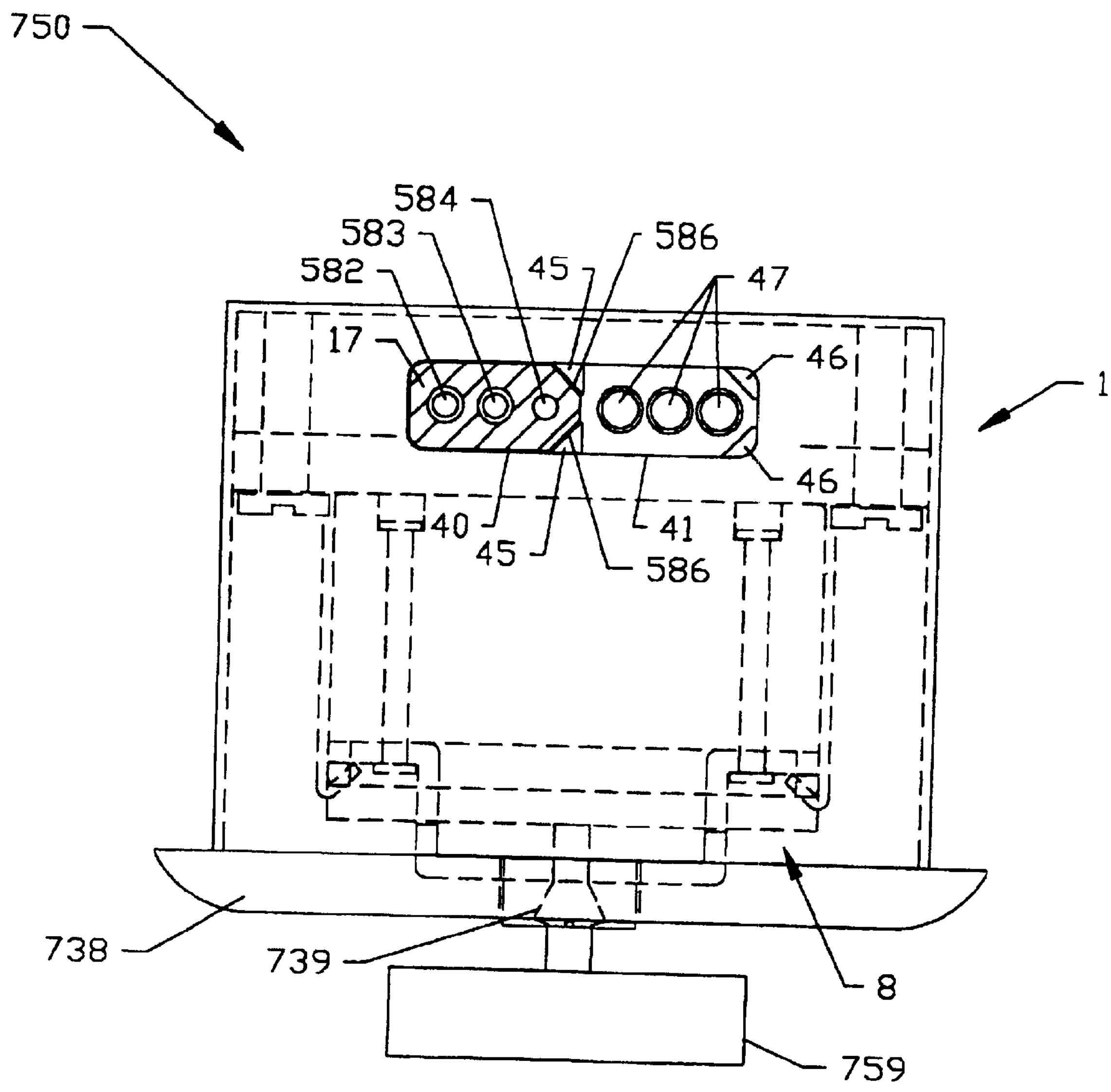

FIG. 165 is a plan view of FIG. 164.

Figure 166:
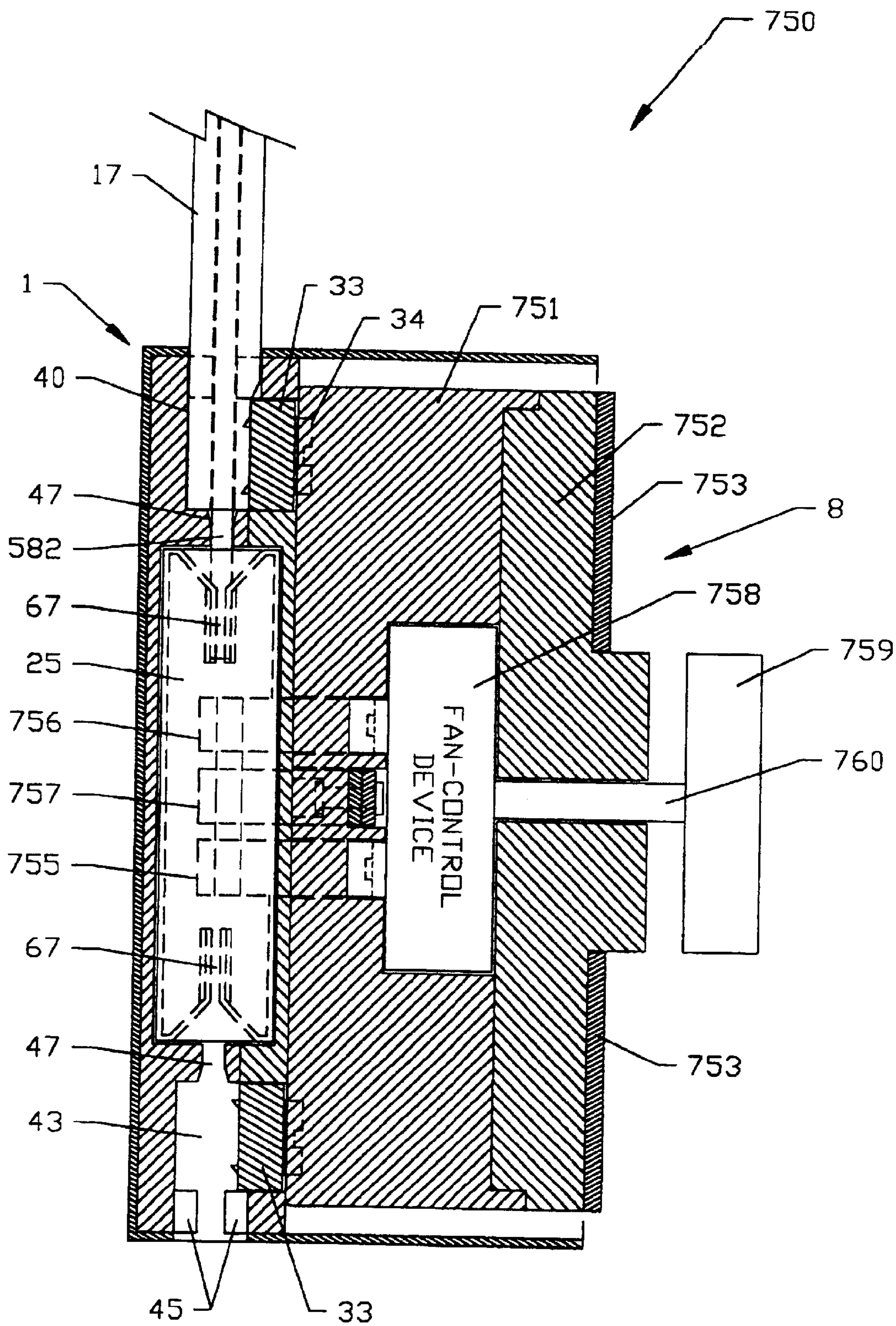

FIG. 166 is a vertical section view taken along line 166—166 of FIG. 164.

Figure 167:
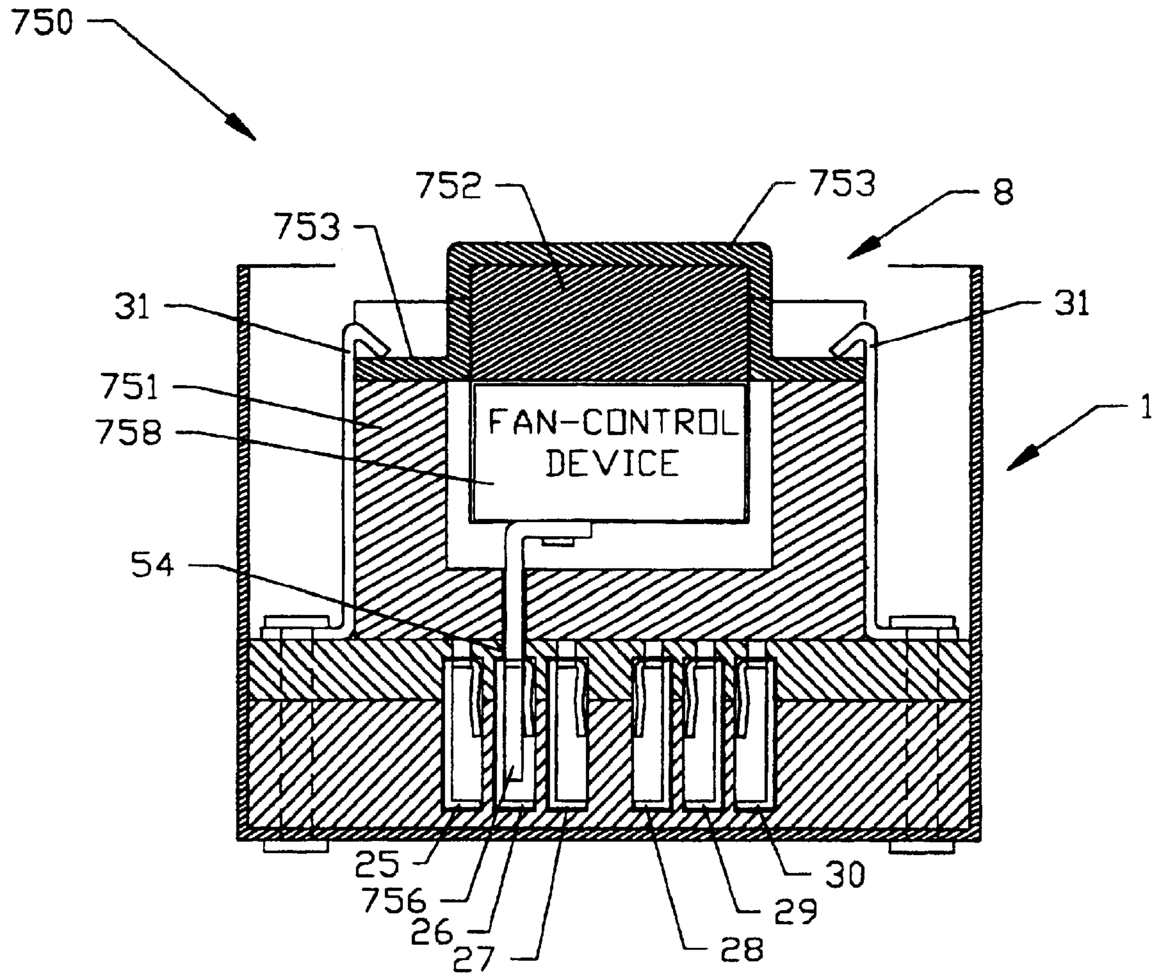

FIG. 167 is a horizontal section view taken along line 167—167 of FIG. 164.

Figure 168:
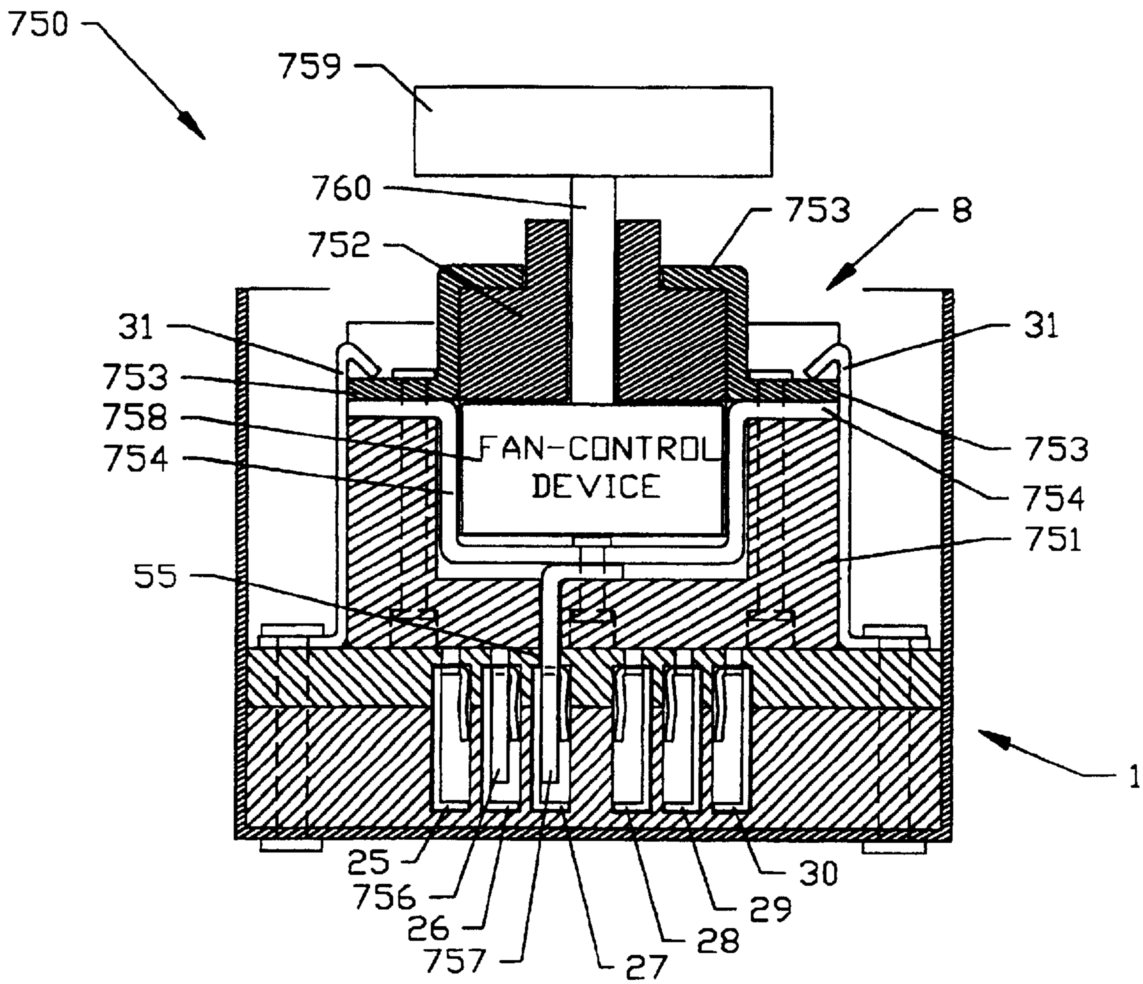

FIG. 168 is a horizontal section view taken along line 168—168 of FIG. 164.

Figure 169:
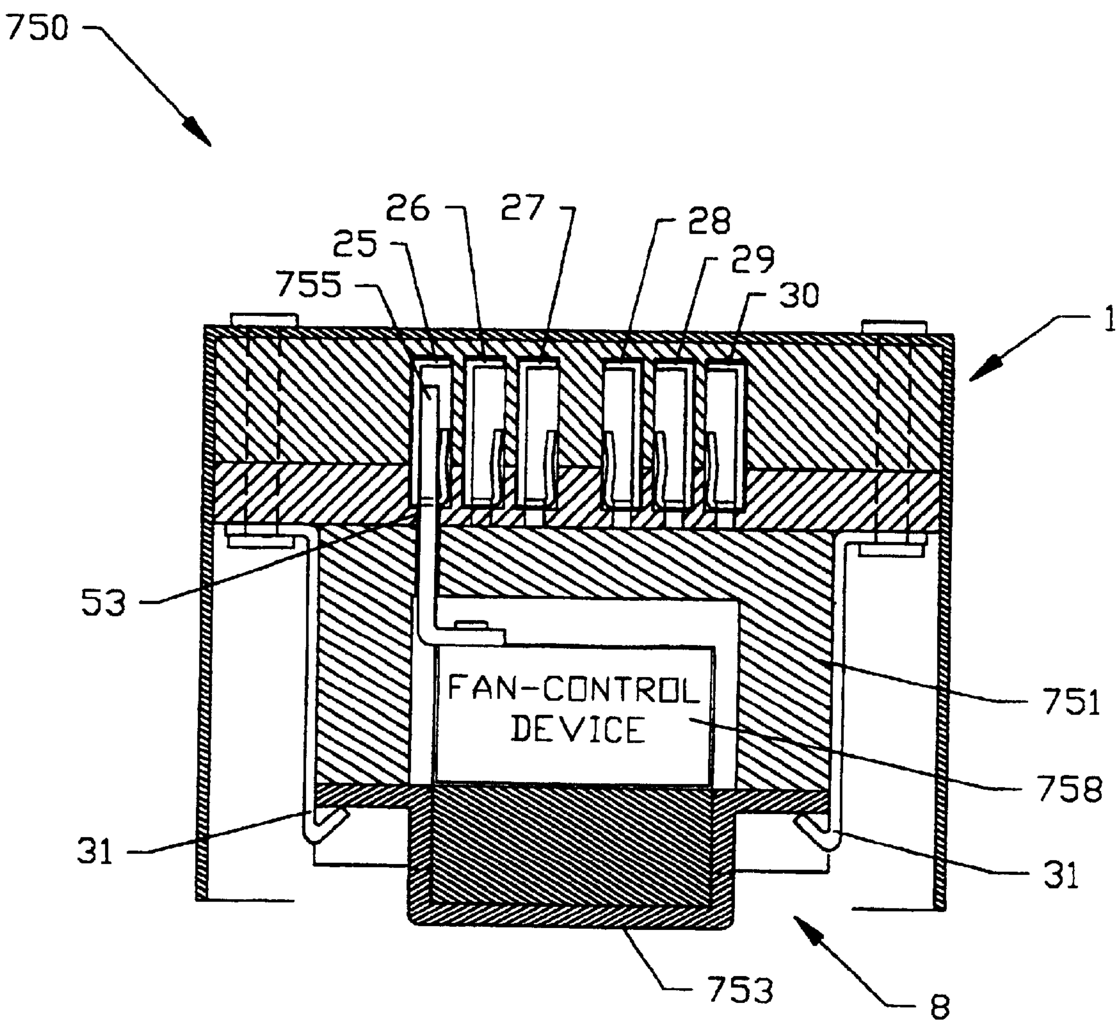

FIG. 169 is a horizontal section view taken along line 169—169 of FIG. 164.

Figure 170:
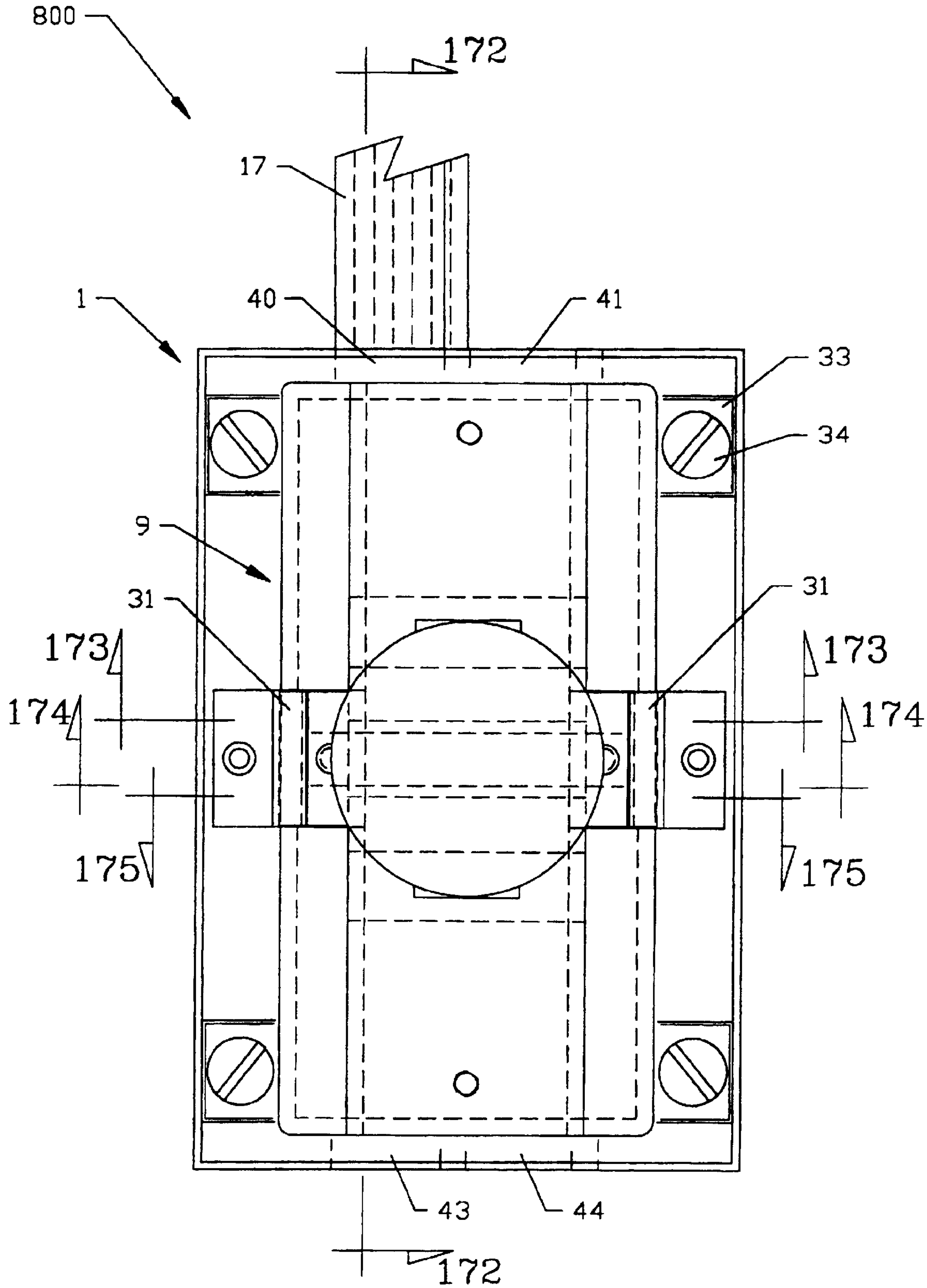

FIG. 170 is a front elevation view of the timer switch module and 3-conductor cable installed in the wallbox.

Figure 171:
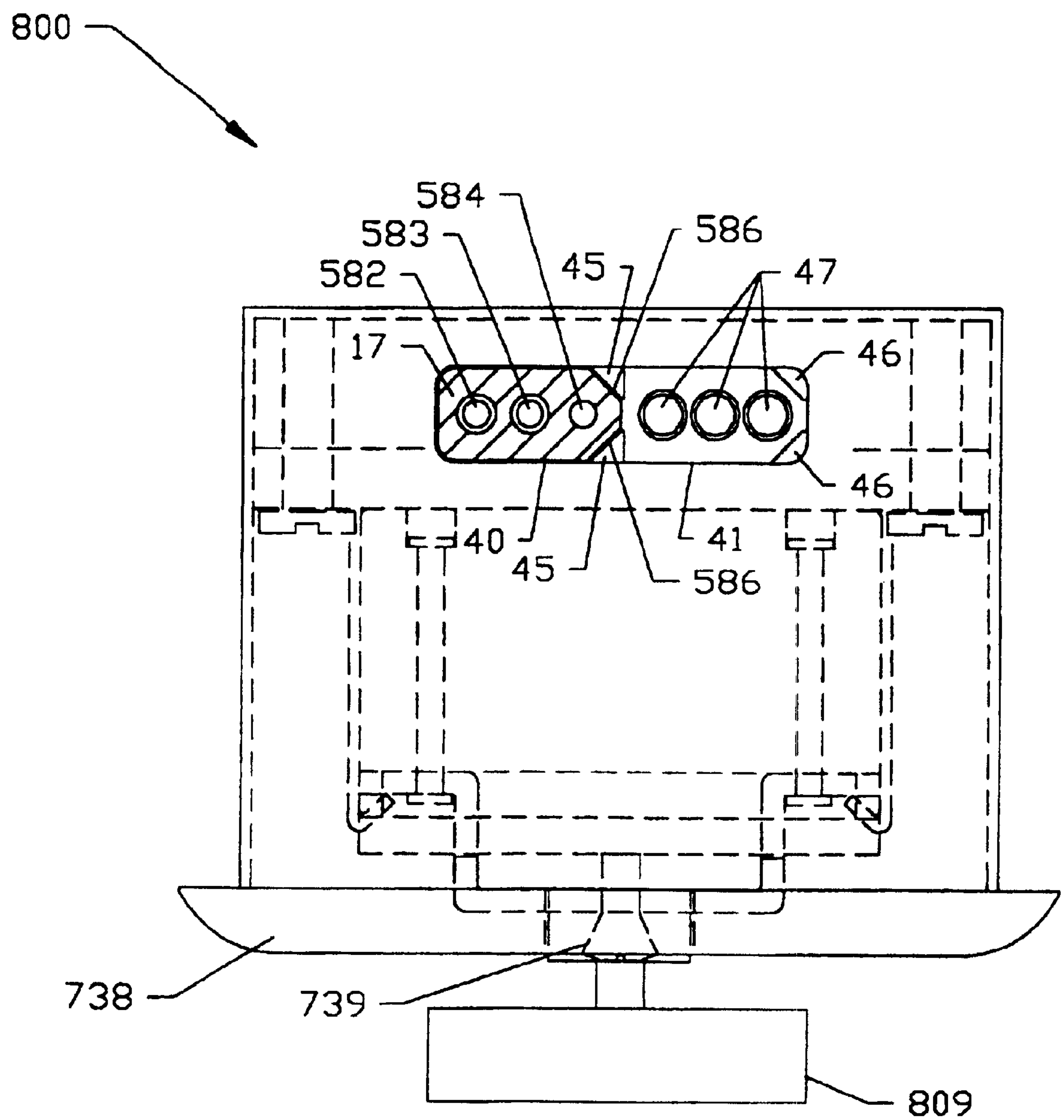

FIG. 171 is a plan view of FIG. 170.

Figure 172:
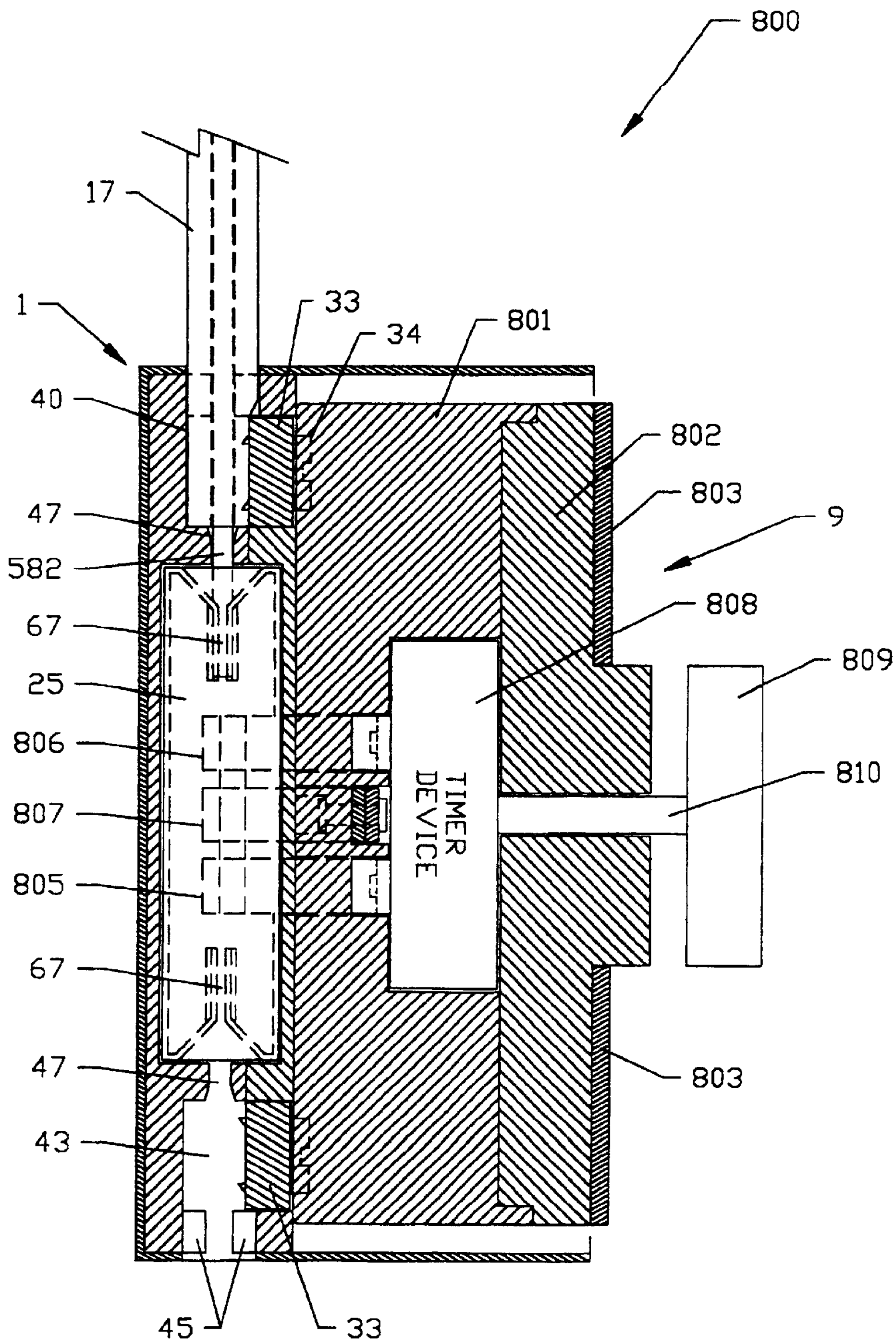

FIG. 172 is a vertical section view taken along line 172—172 of FIG. 170.

Figure 173:
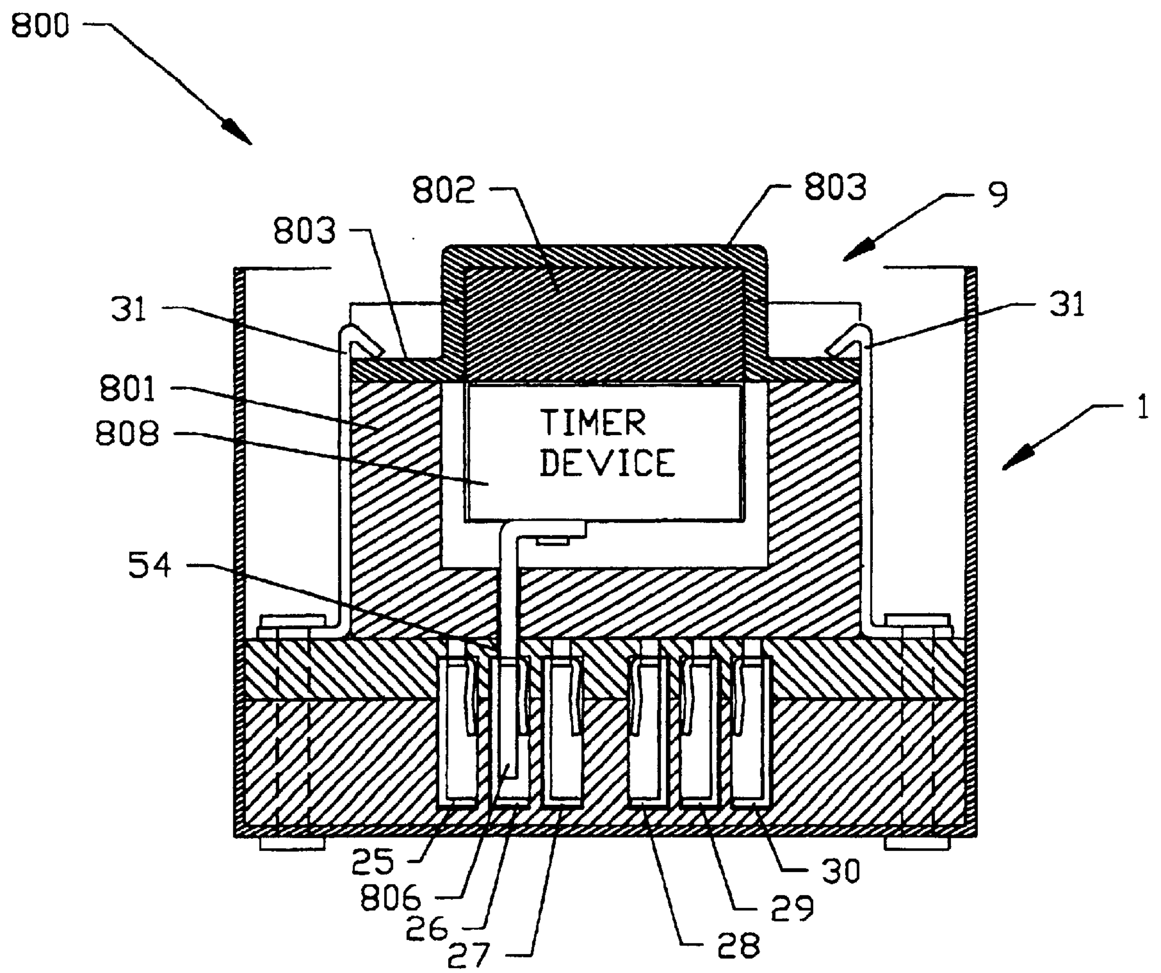

FIG. 173 is a horizontal section view taken along line 173—173 of FIG. 170.

Figure 174:
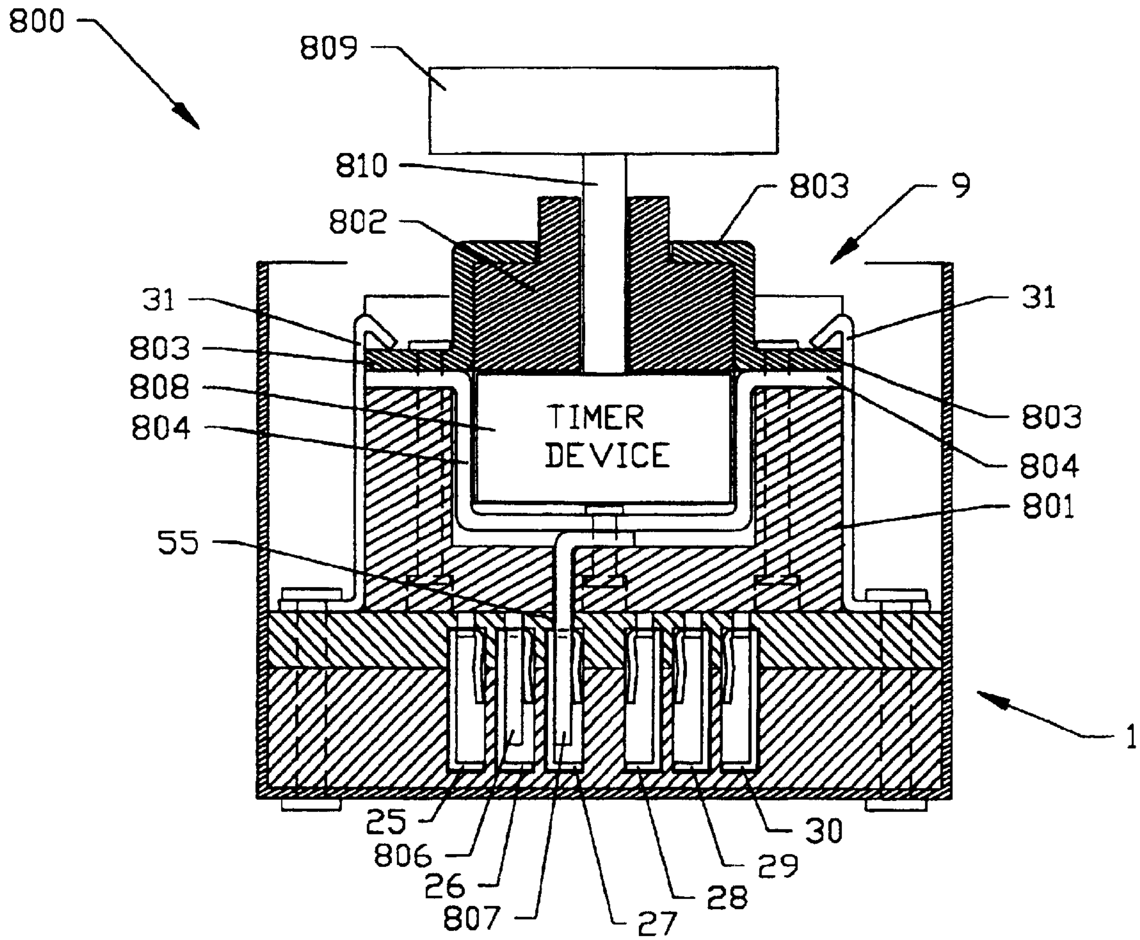

FIG. 174 is a horizontal section view taken along line 174—174 of FIG. 170.

Figure 175:
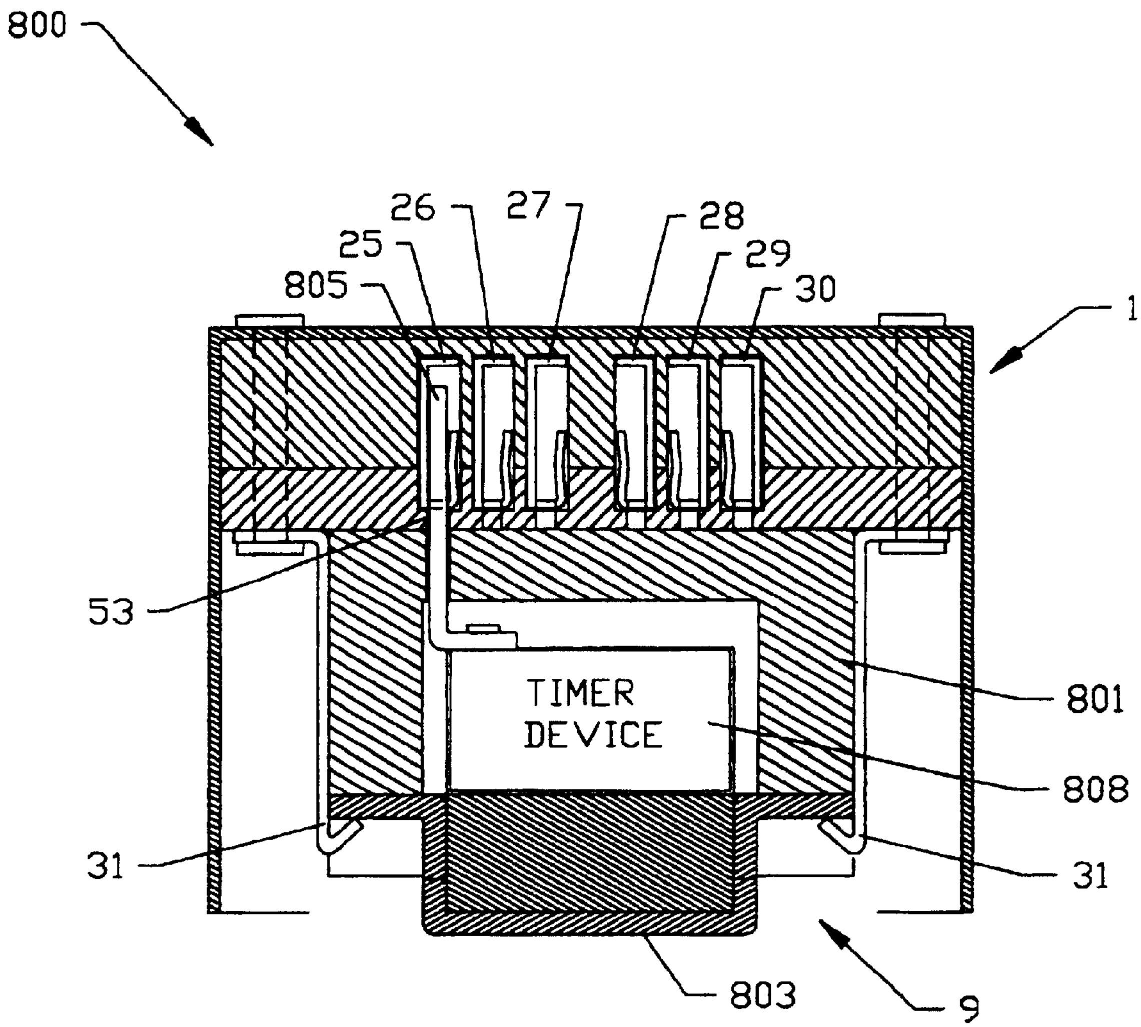

FIG. 175 is a horizontal section view taken along line 175—175 of FIG. 170.

Figure 176:
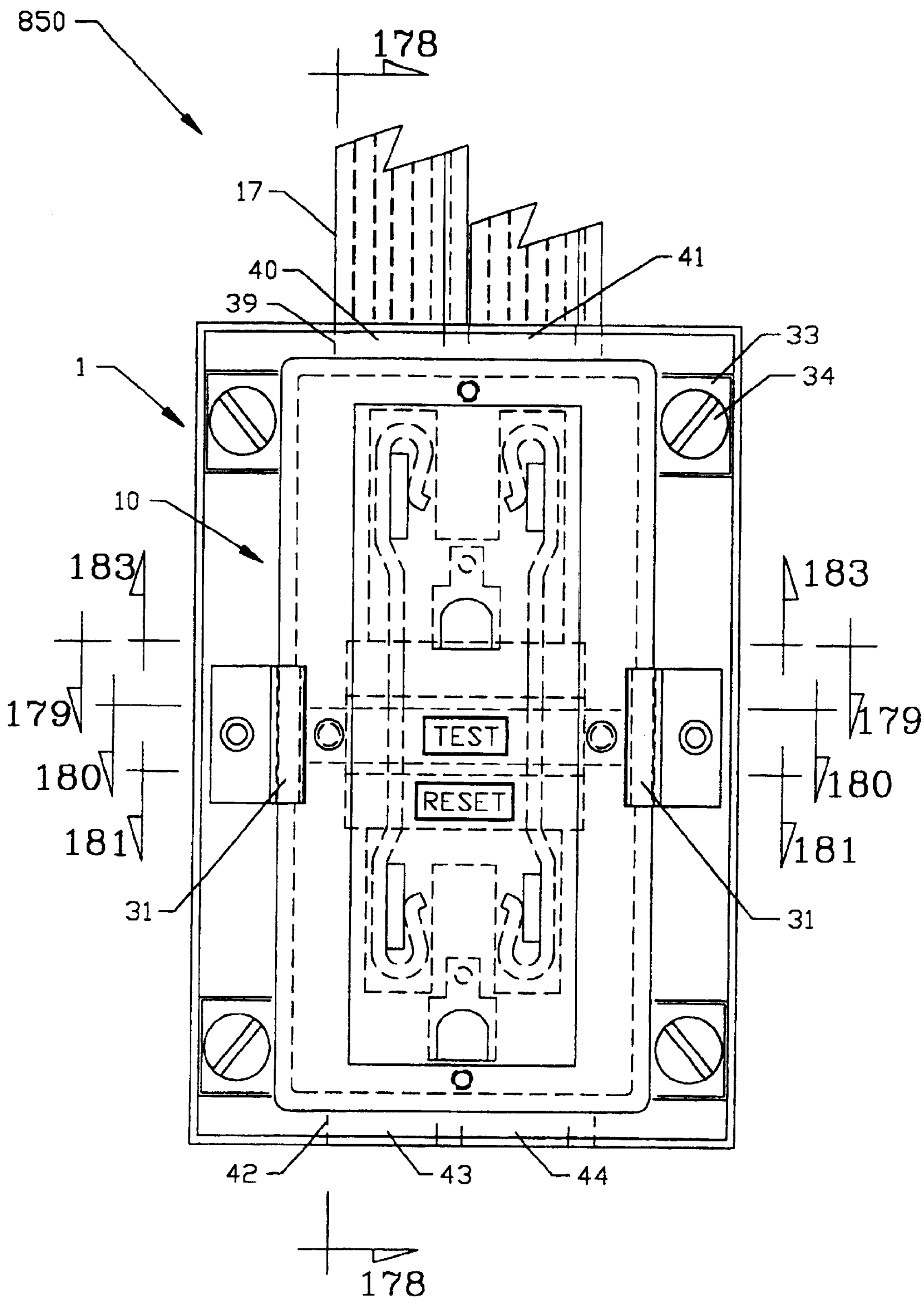

FIG. 176 is a front elevation view of the GFCI receptacle module and 3-conductor cables installed in the wallbox.

Figure 177:
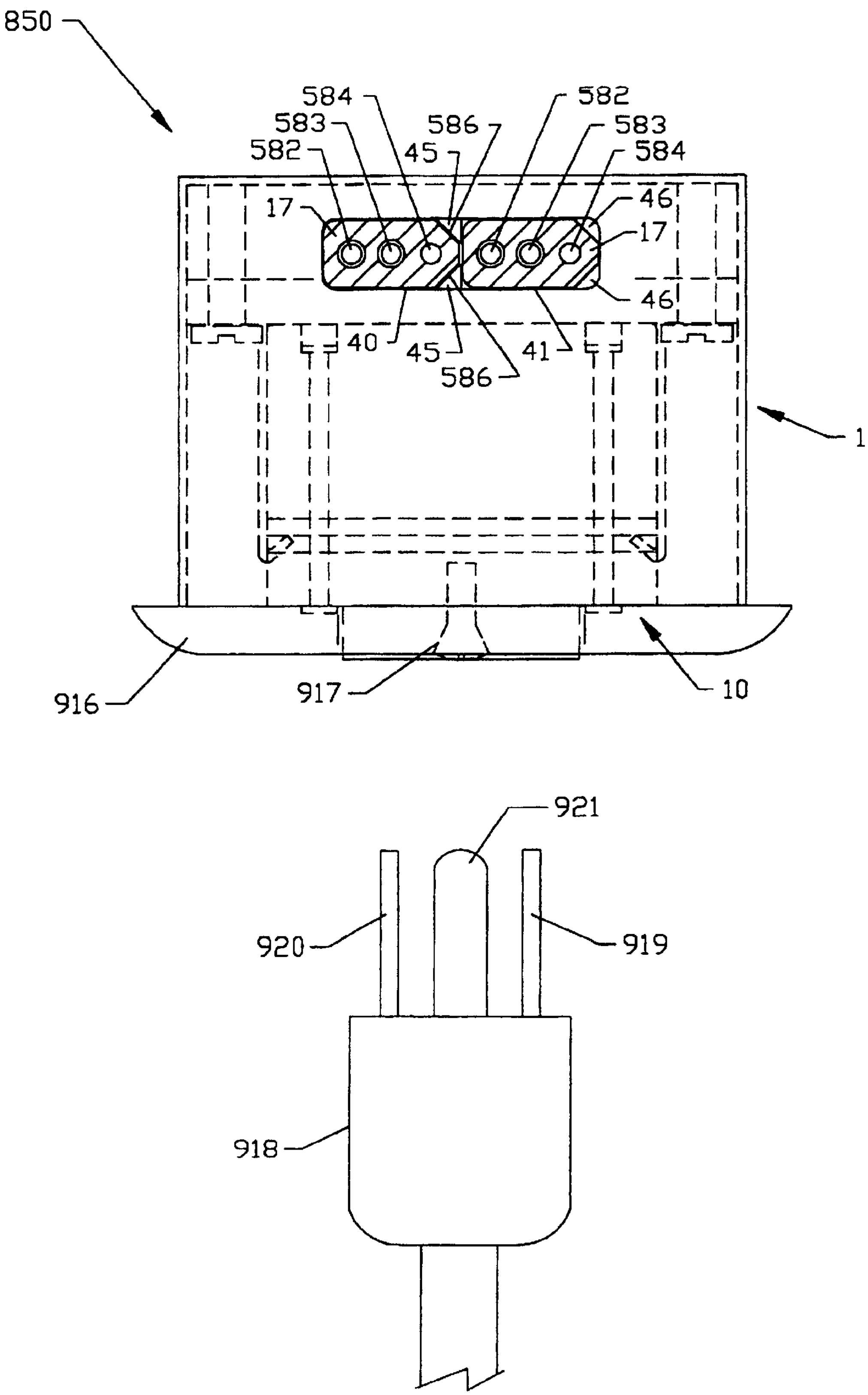

FIG. 177 is a plan view of FIG. 176.

Figure 178:
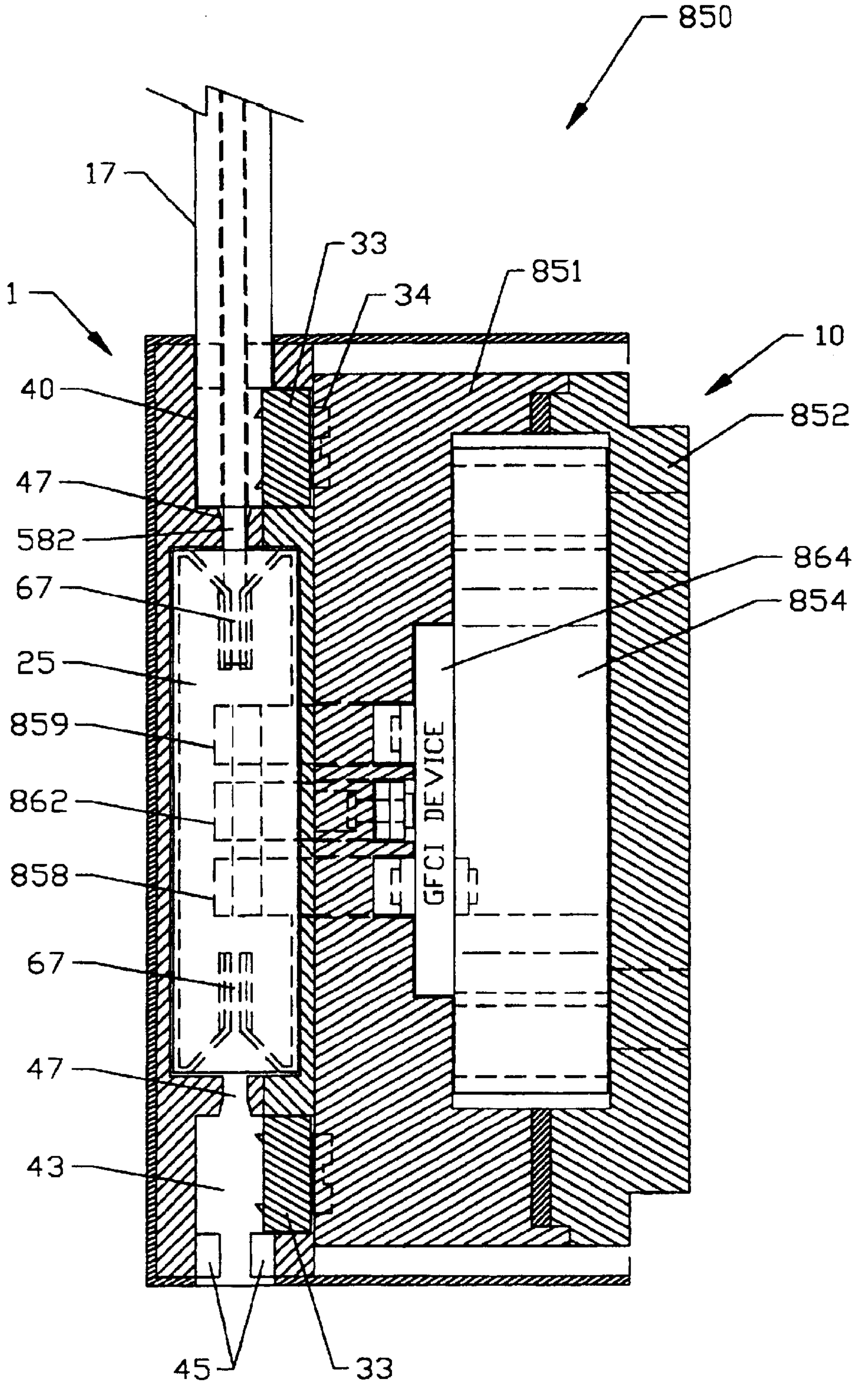

FIG. 178 is a vertical section view taken along line 178—178 of FIG. 176.

Figure 179:
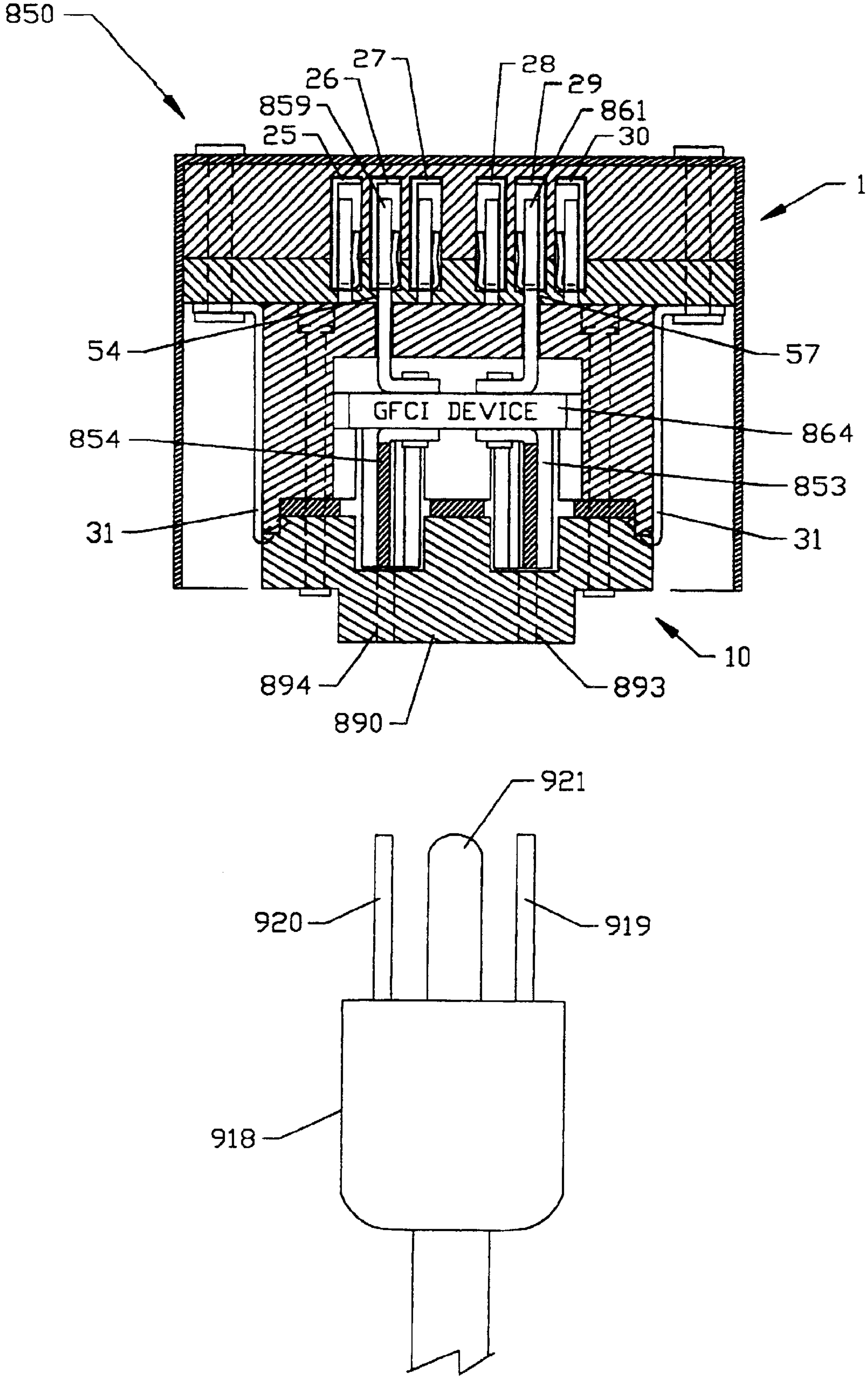

FIG. 179 is a horizontal section view taken along line 179—179 of FIG. 176.

Figure 180:
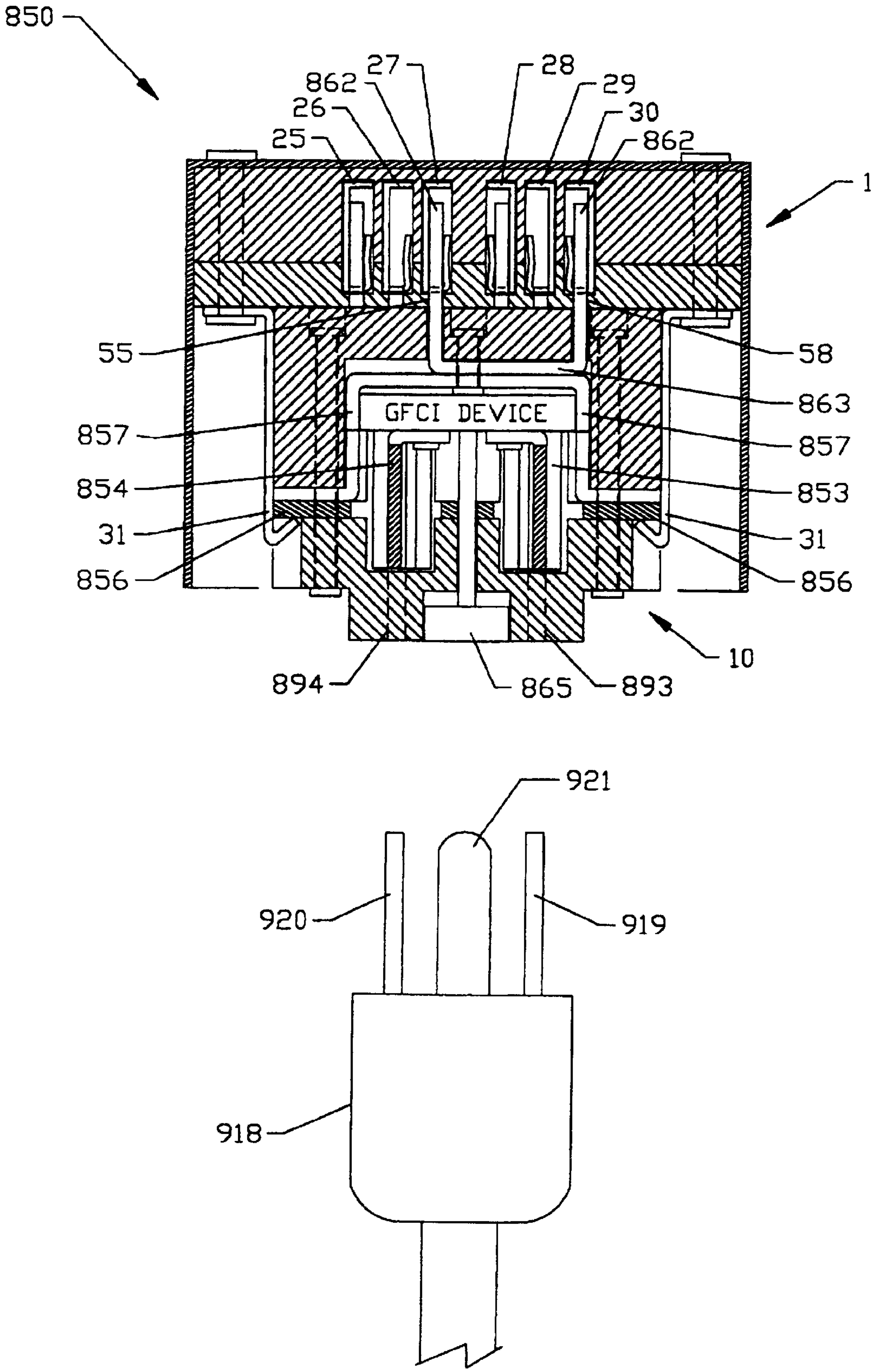

FIG. 180 is a horizontal section view taken along line 180—180 of FIG. 176.

Figure 181:
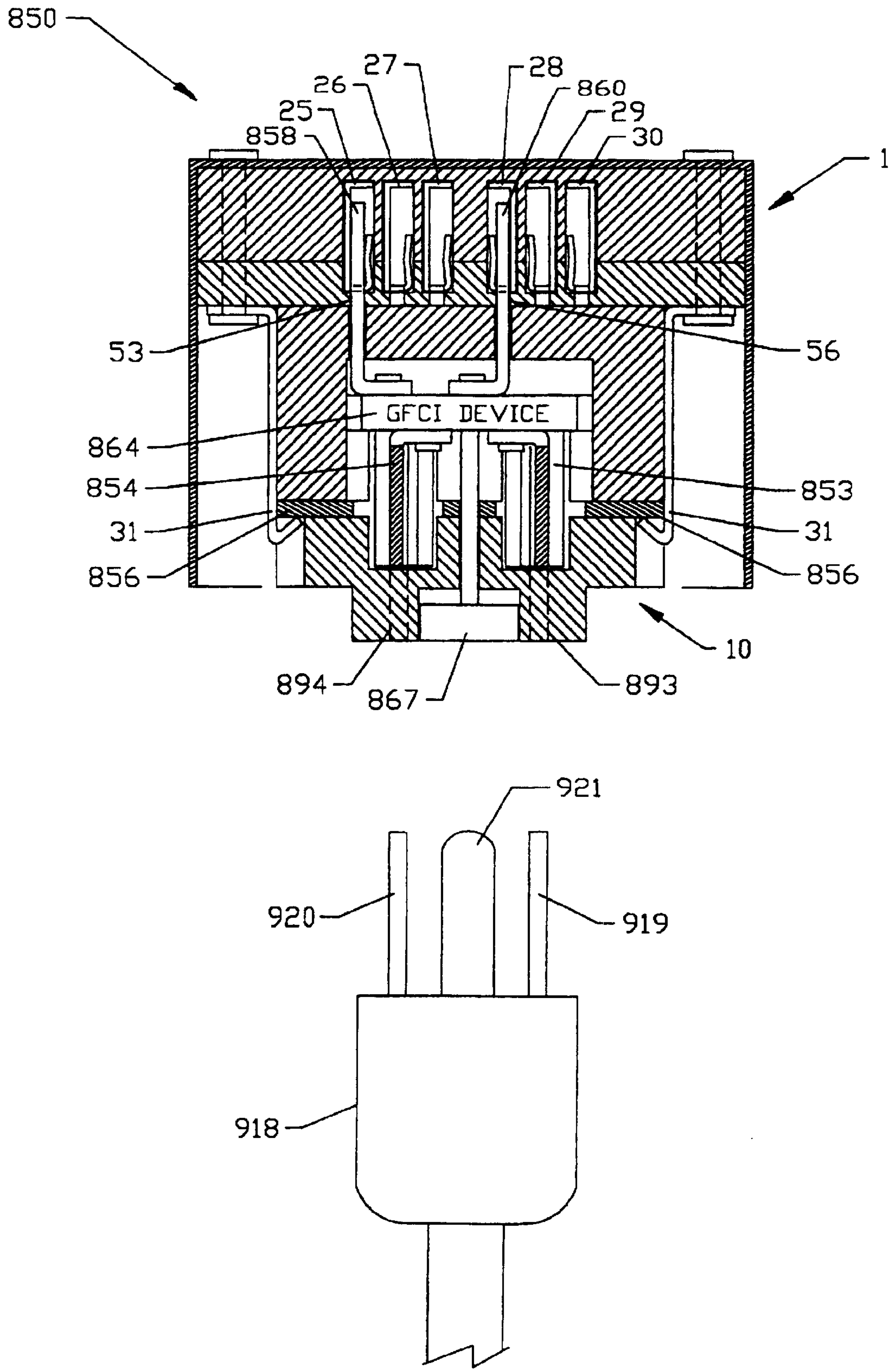

FIG. 181 is a horizontal section view taken along line 181—181 of FIG. 176.

Figure 182:
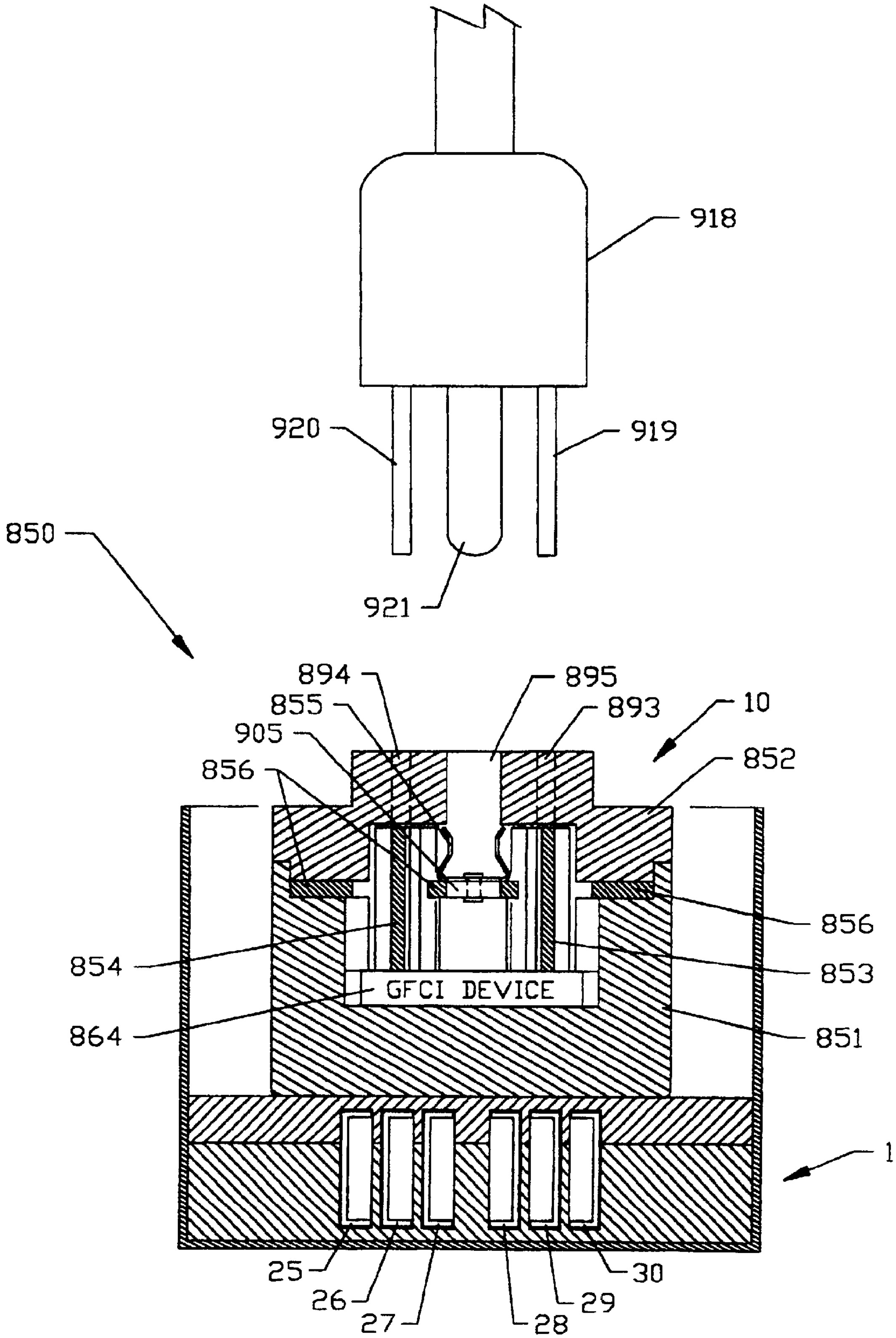

FIG. 182 is a horizontal section view taken along line 182—182 of FIG. 176.

Figure 183:
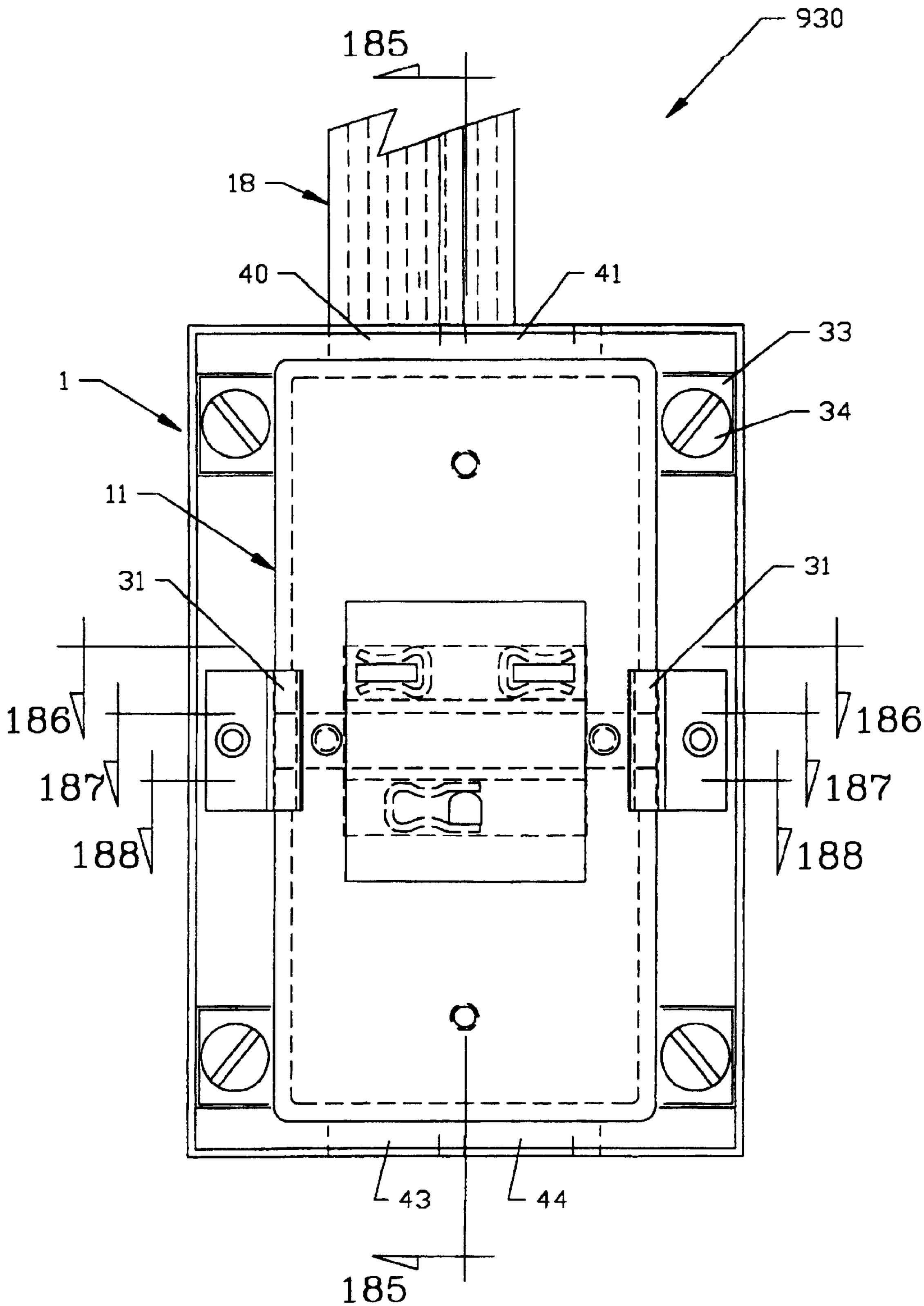

FIG. 183 is a front elevation view of the 240 volt receptacle module and 4-conductor cable installed in the wallbox.

Figure 184:
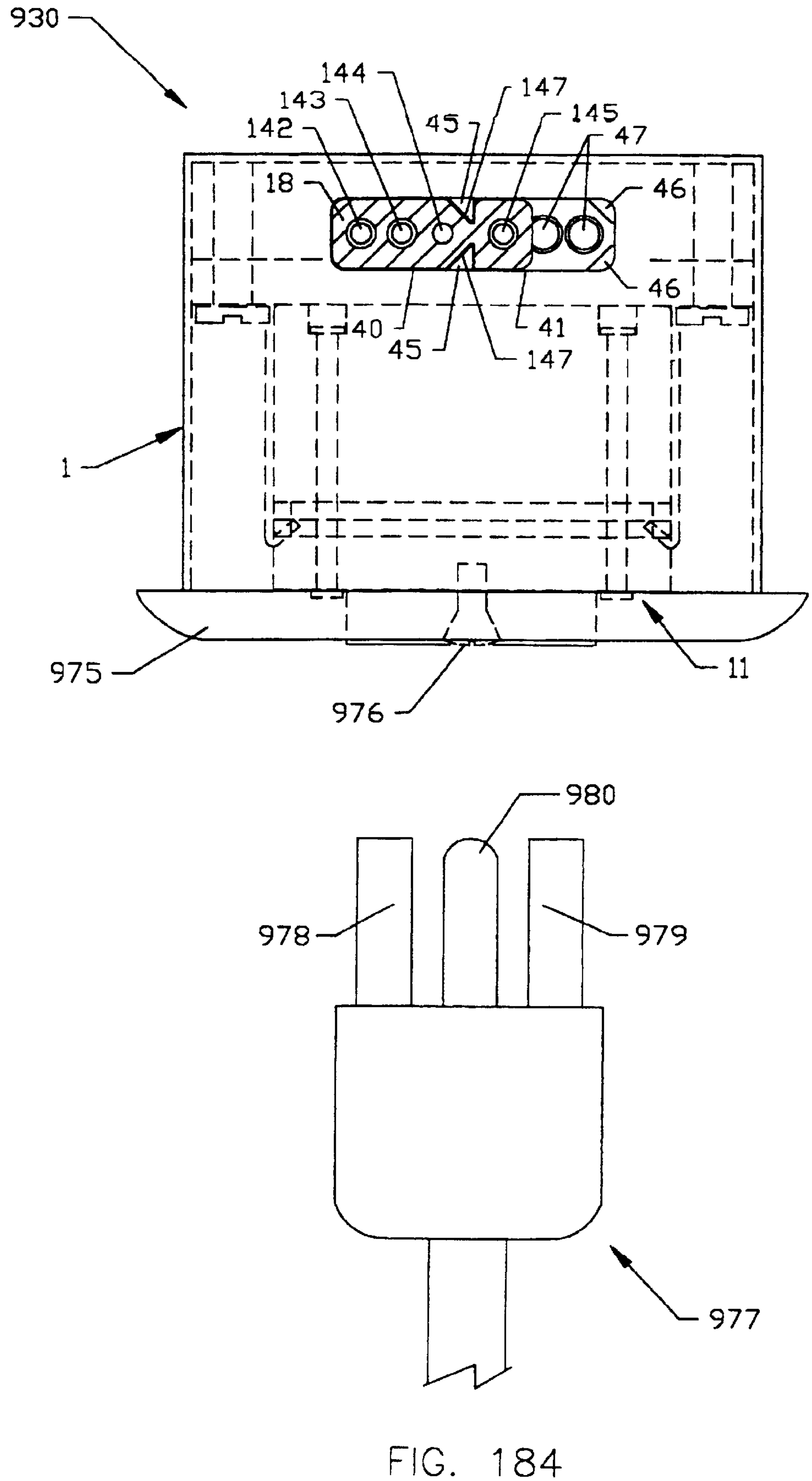

FIG. 184 is a plan view of FIG. 183.

Figure 185:
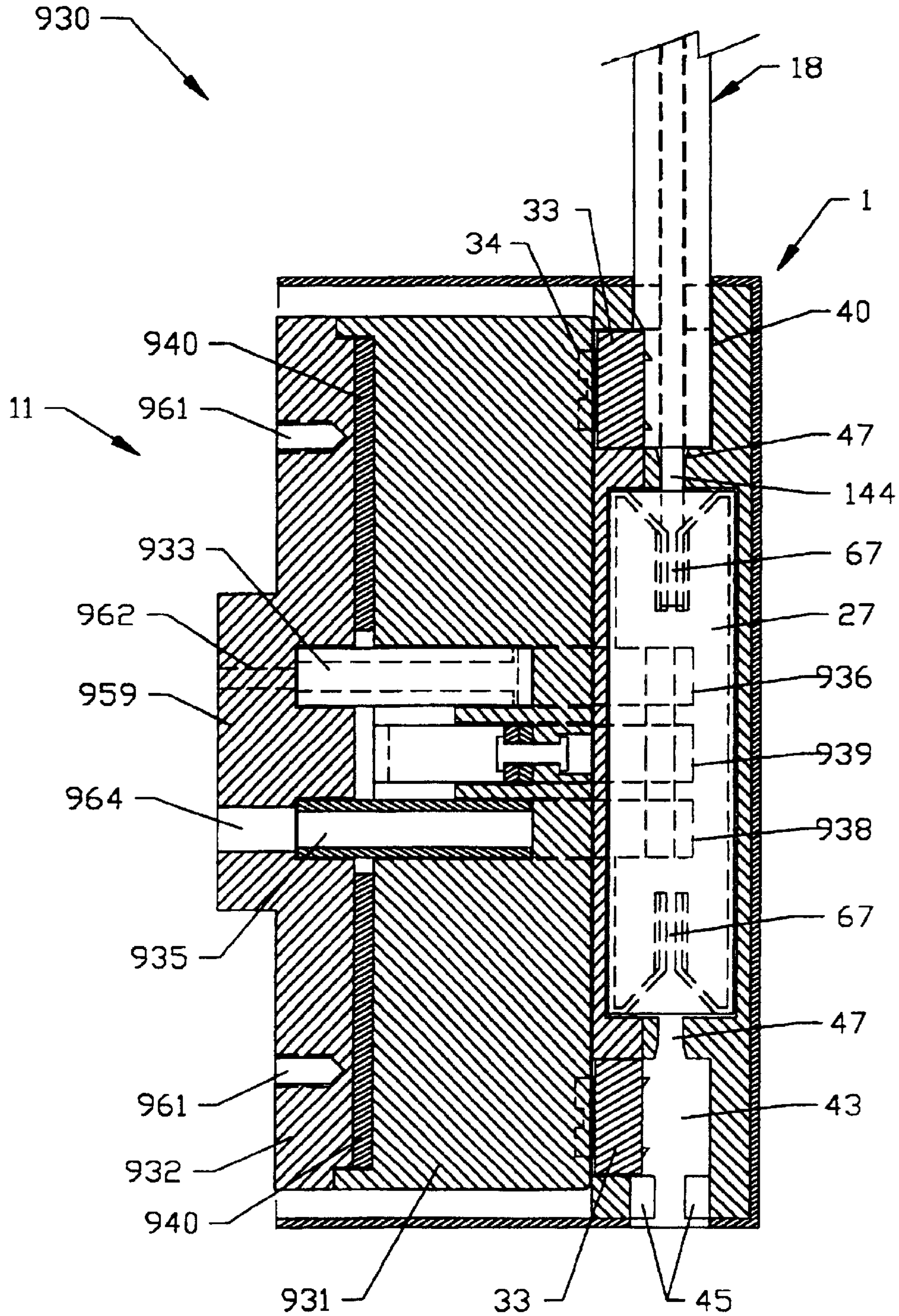

FIG. 185 is a vertical section view taken along line 185—185 of FIG. 183.

Figure 186:
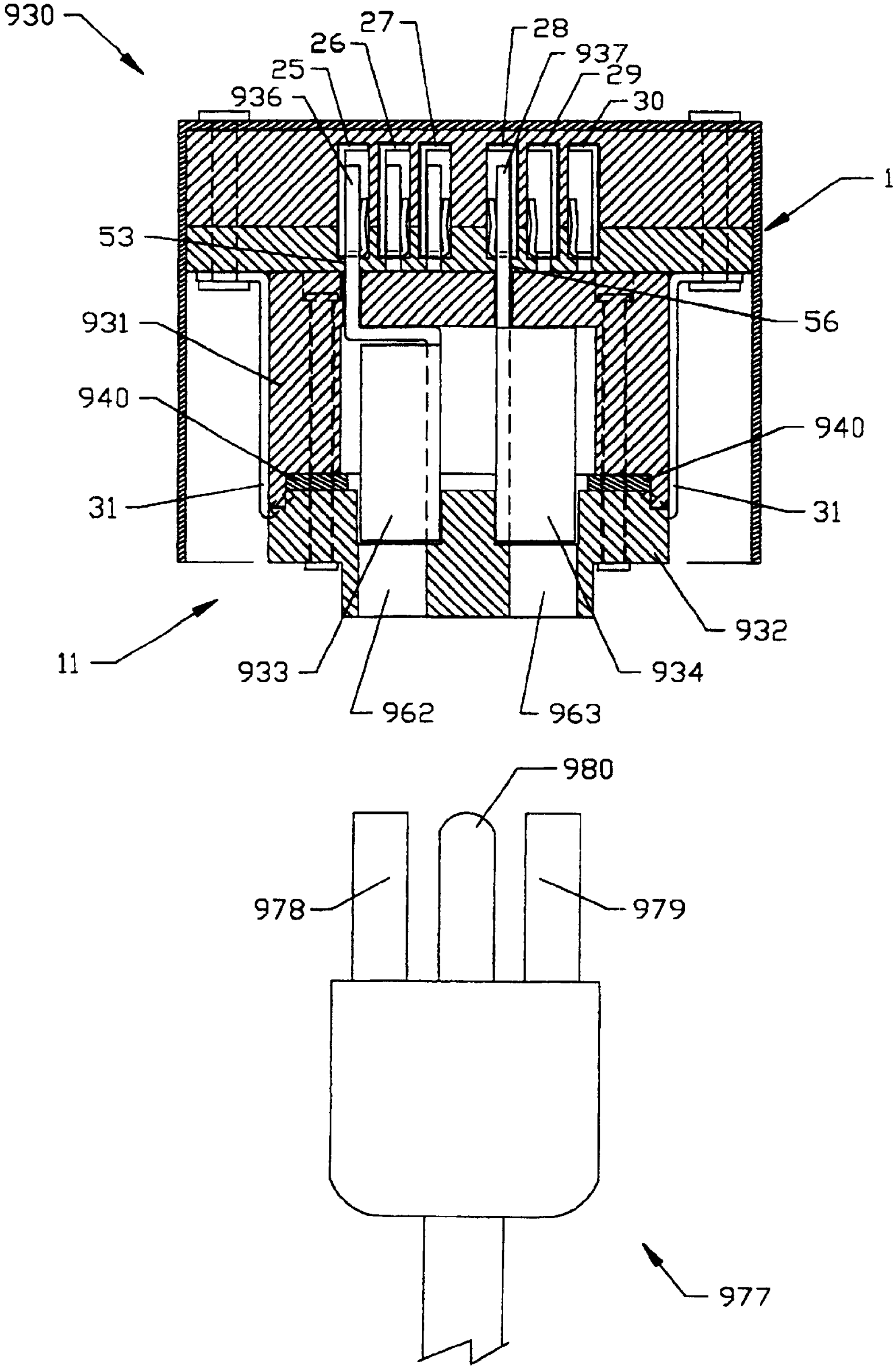

FIG. 186 is a horizontal section view taken along line 186—186 of FIG. 183.

Figure 187:
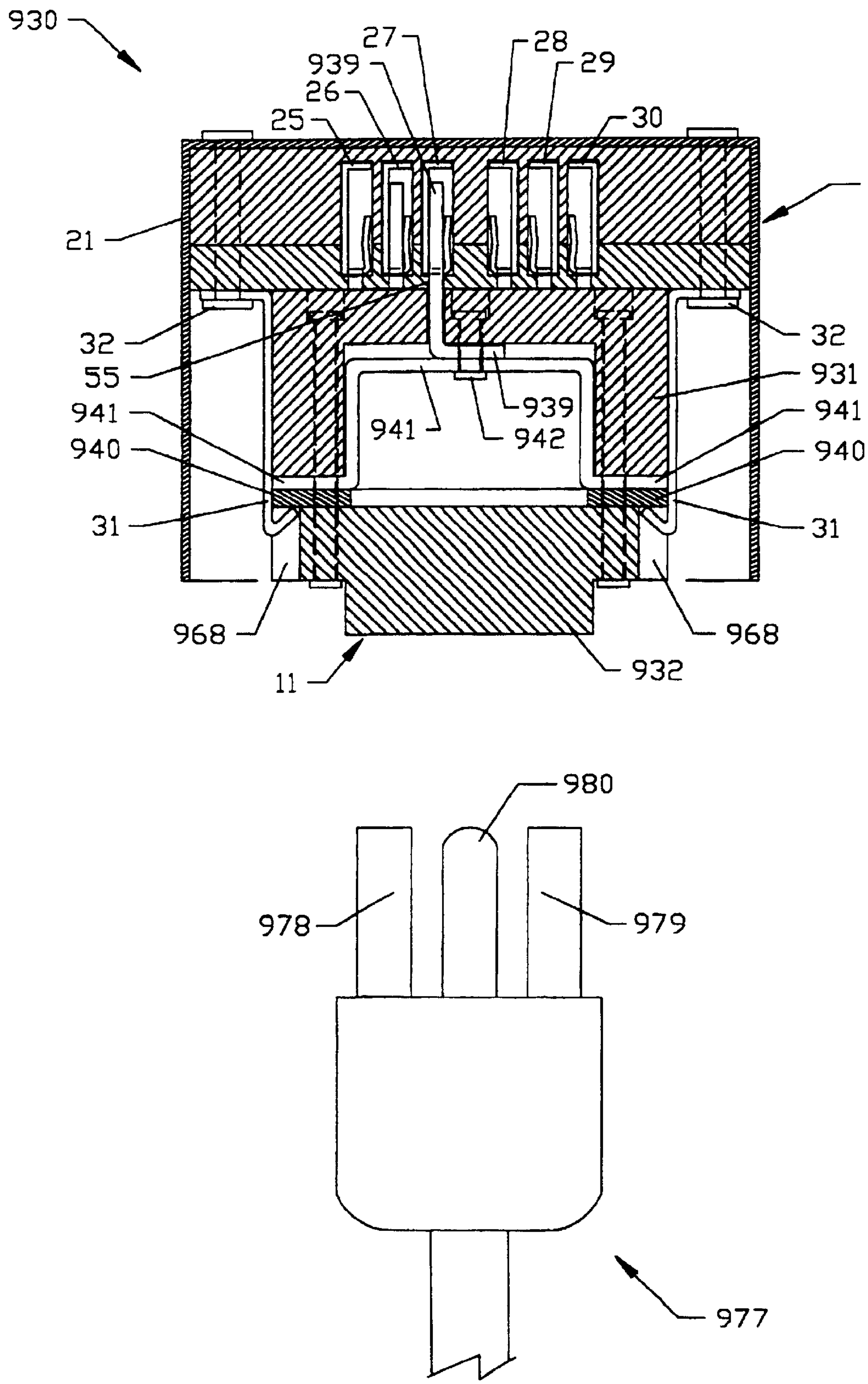

FIG. 187 is a horizontal section view taken along line 187—187 of FIG. 183.

Figure 188:
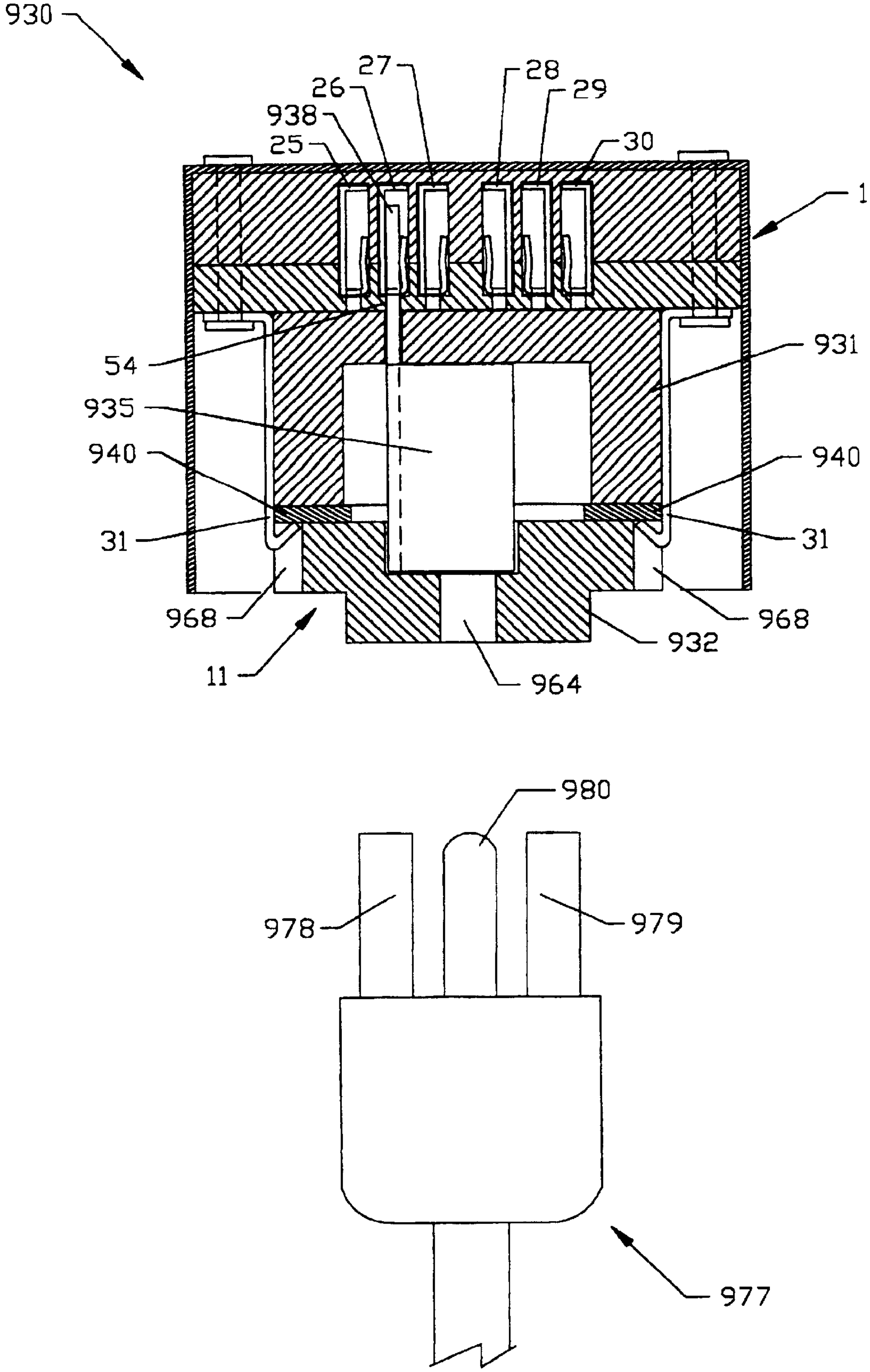

FIG. 188 is a horizontal section view taken along line 188—188 of FIG. 183.

Figure 189:
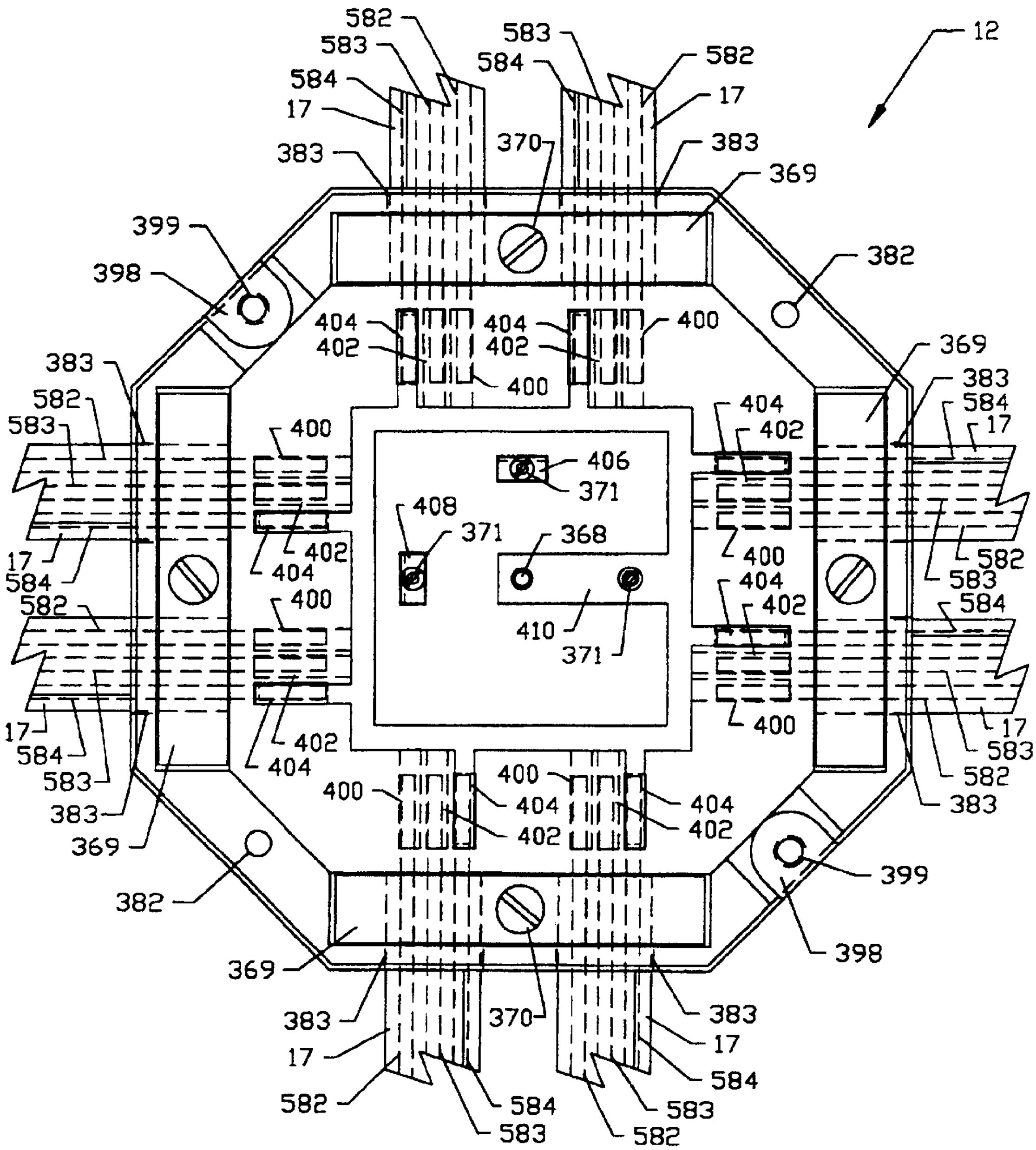

FIG. 189 is a front elevation view of the junction box with the 3-conductor cables installed.

Figure 190:
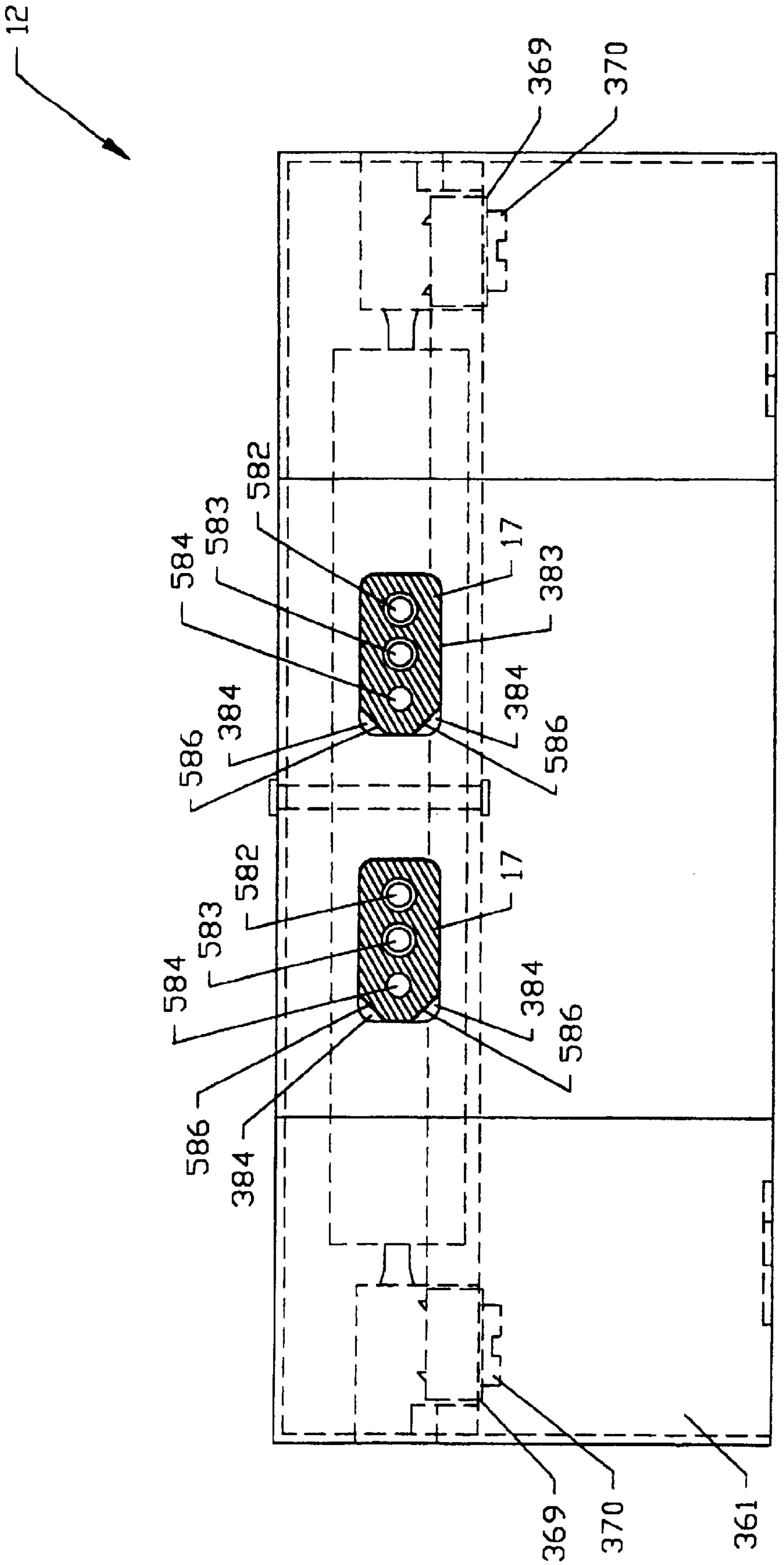

FIG. 190 is a plan view of FIG. 189.

Figure 191:
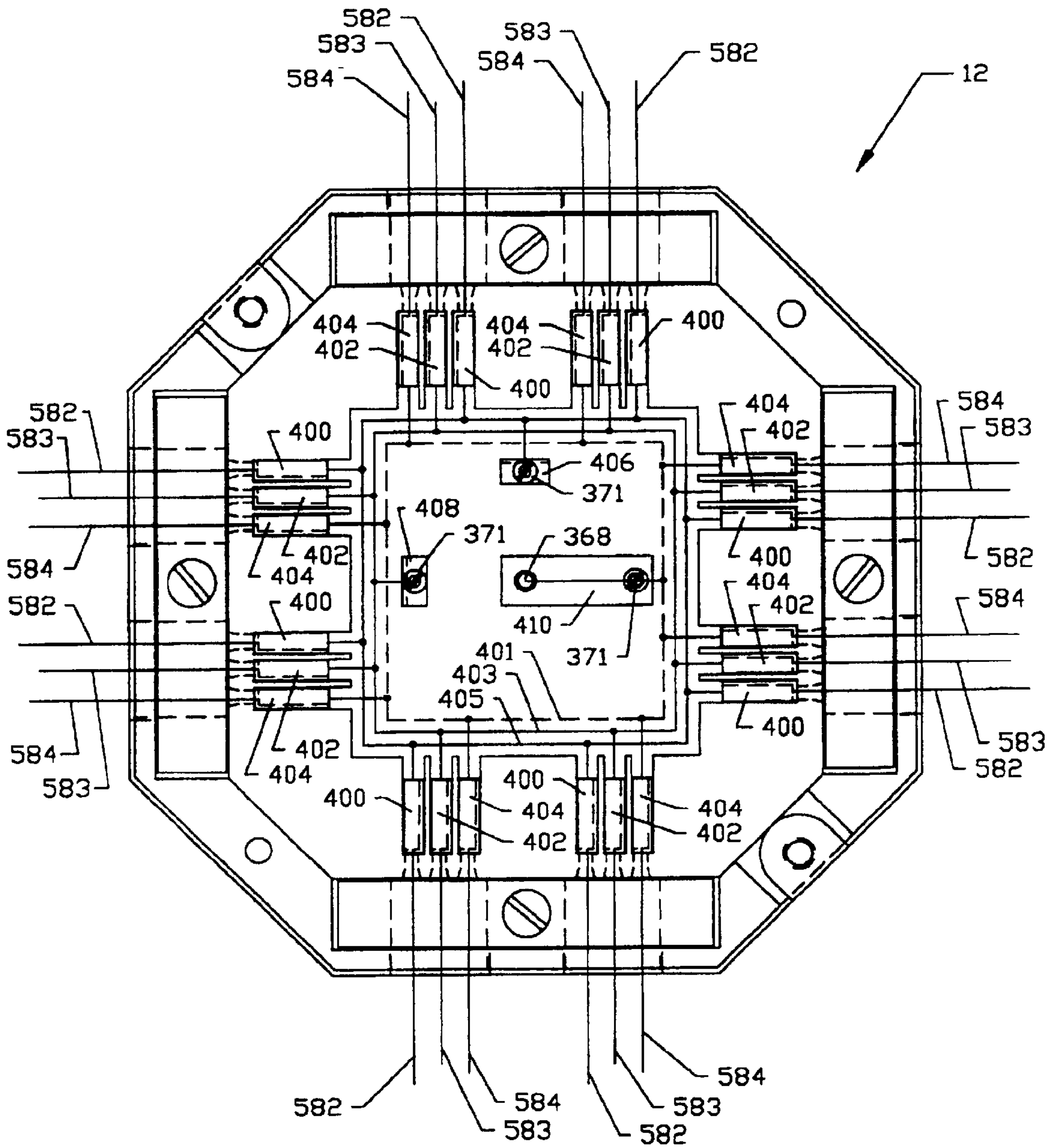

FIG. 191 is a front elevation view of FIG. 189, shown in line-schematic form.

Figure 192:
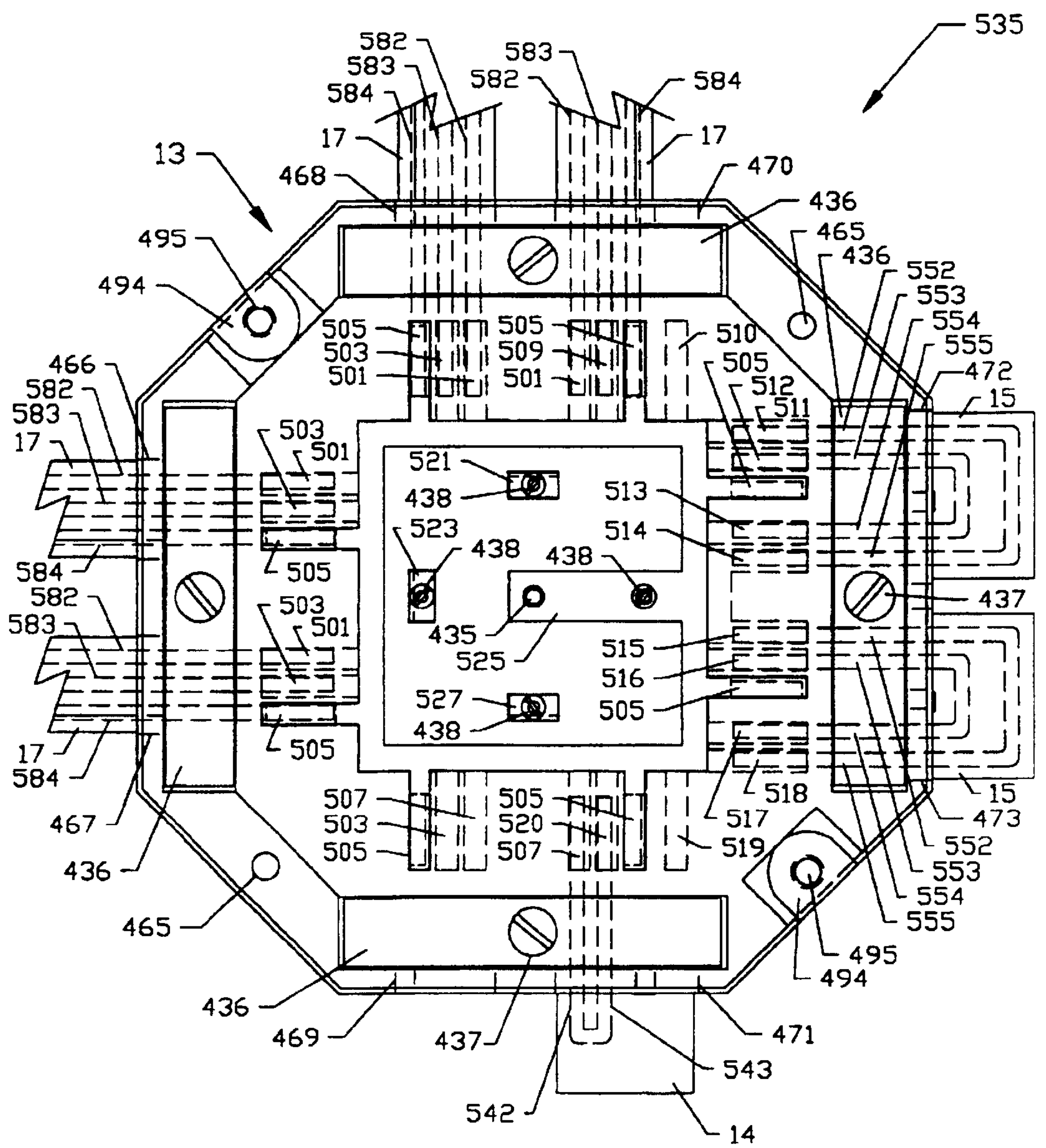

FIG. 192 is a front elevation view of the light box wired for a 2-way lighting circuit.

Figure 193:
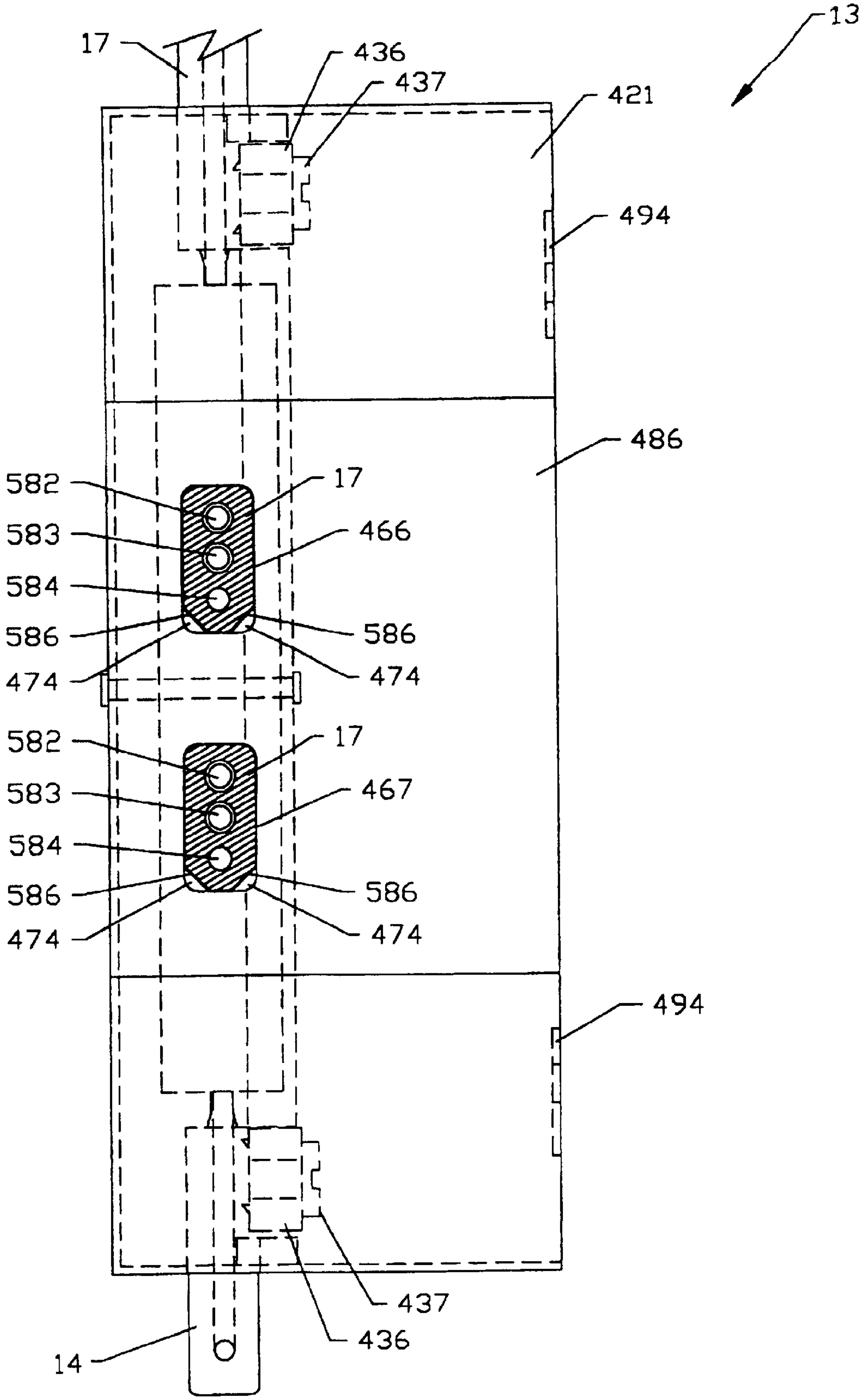

FIG. 193 is a left-side view of FIG. 192.

Figure 194:
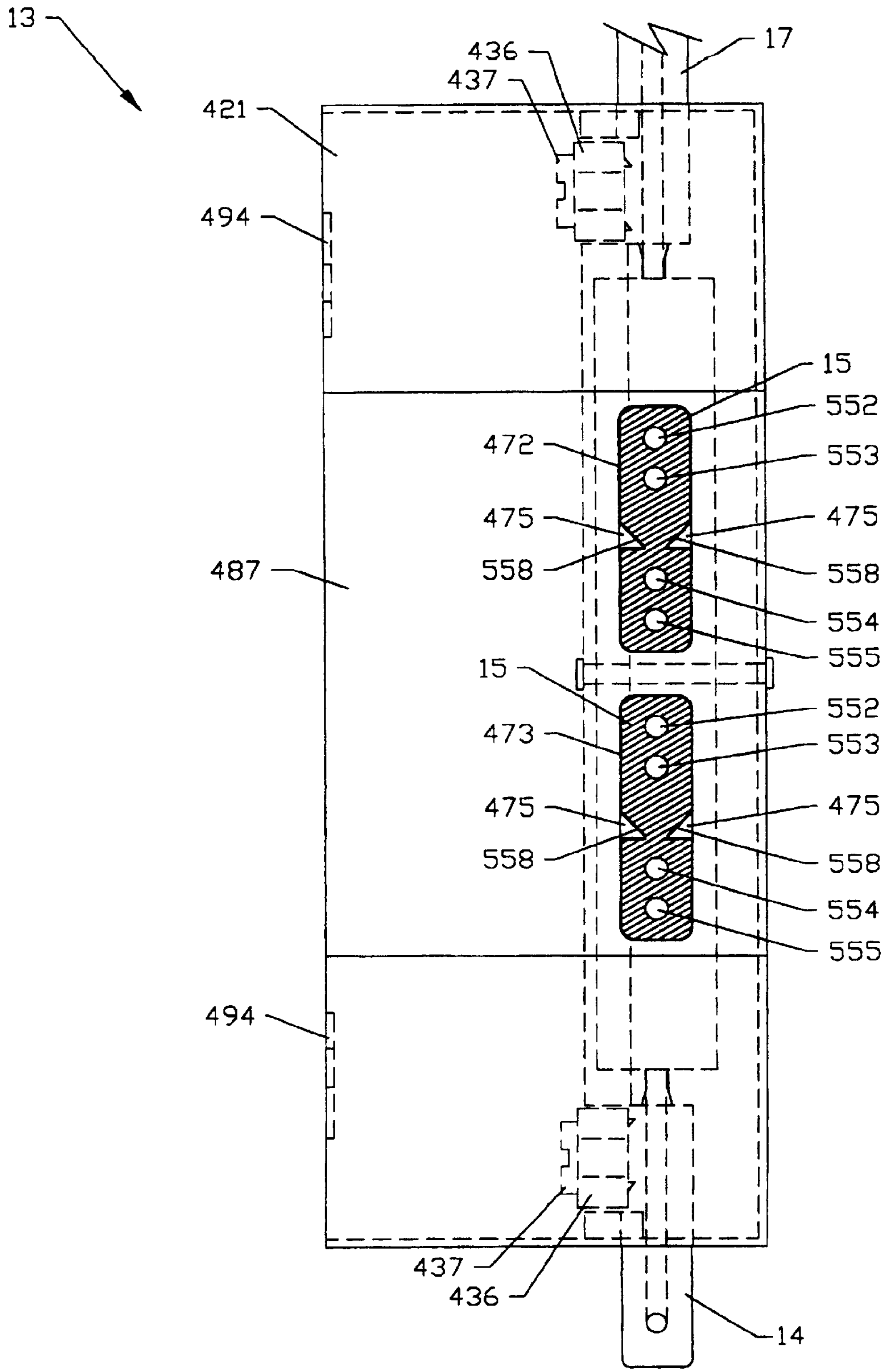

FIG. 194 is a right-side view of FIG. 192.

Figure 195:
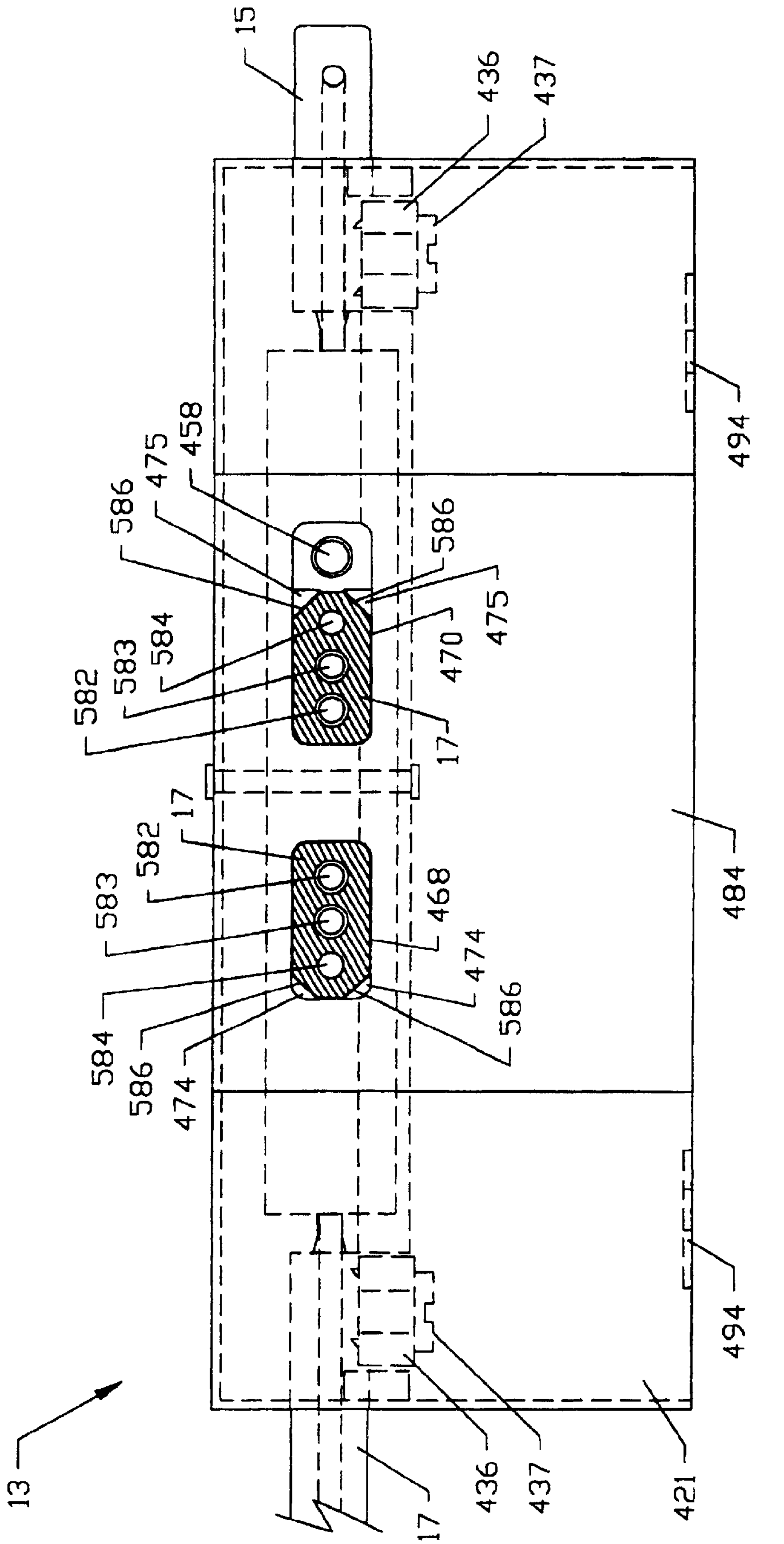

FIG. 195 is a plan view of FIG. 192.

Figure 196:
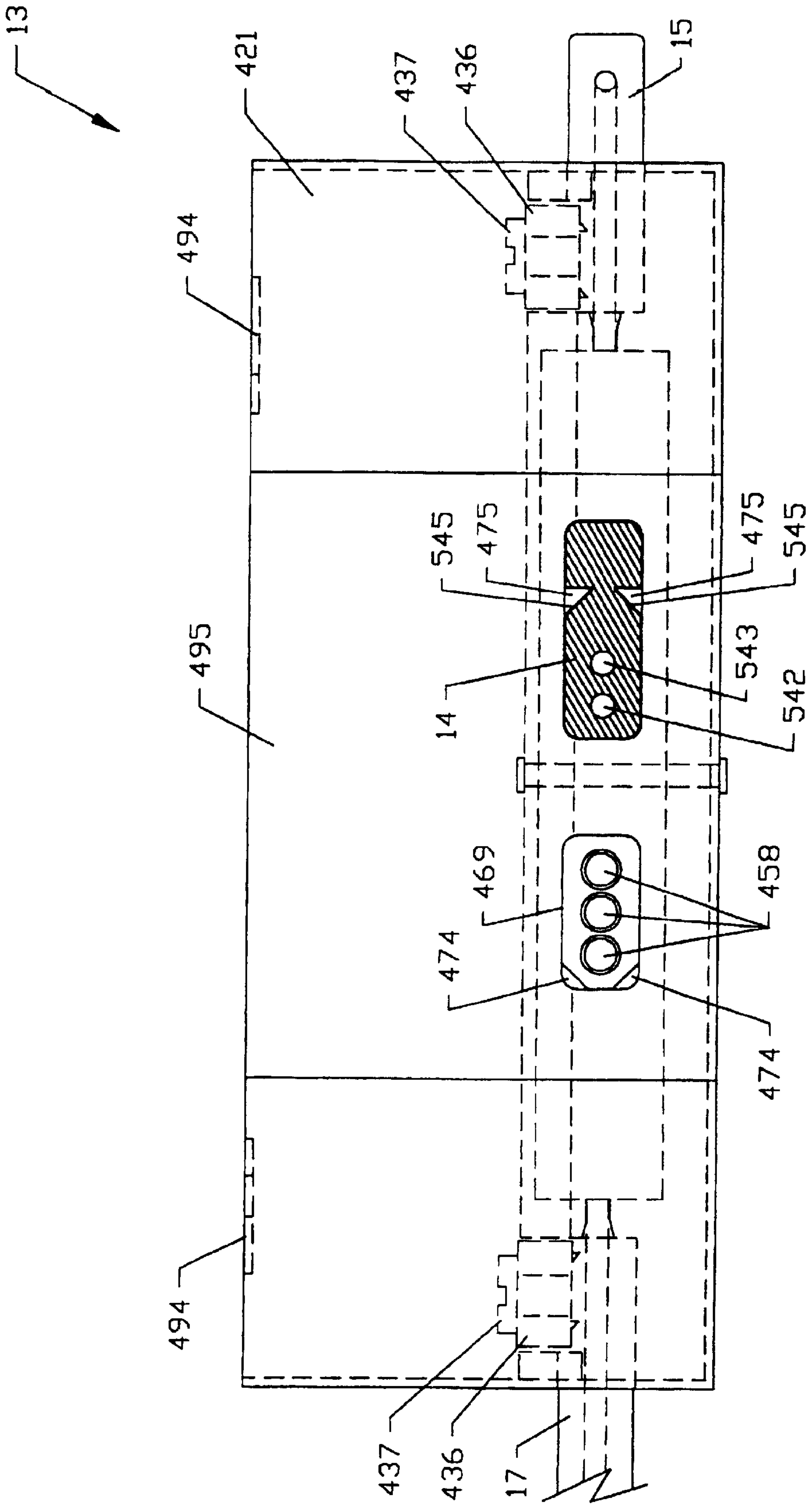

FIG. 196 is a bottom view of FIG. 192.

Figure 197:
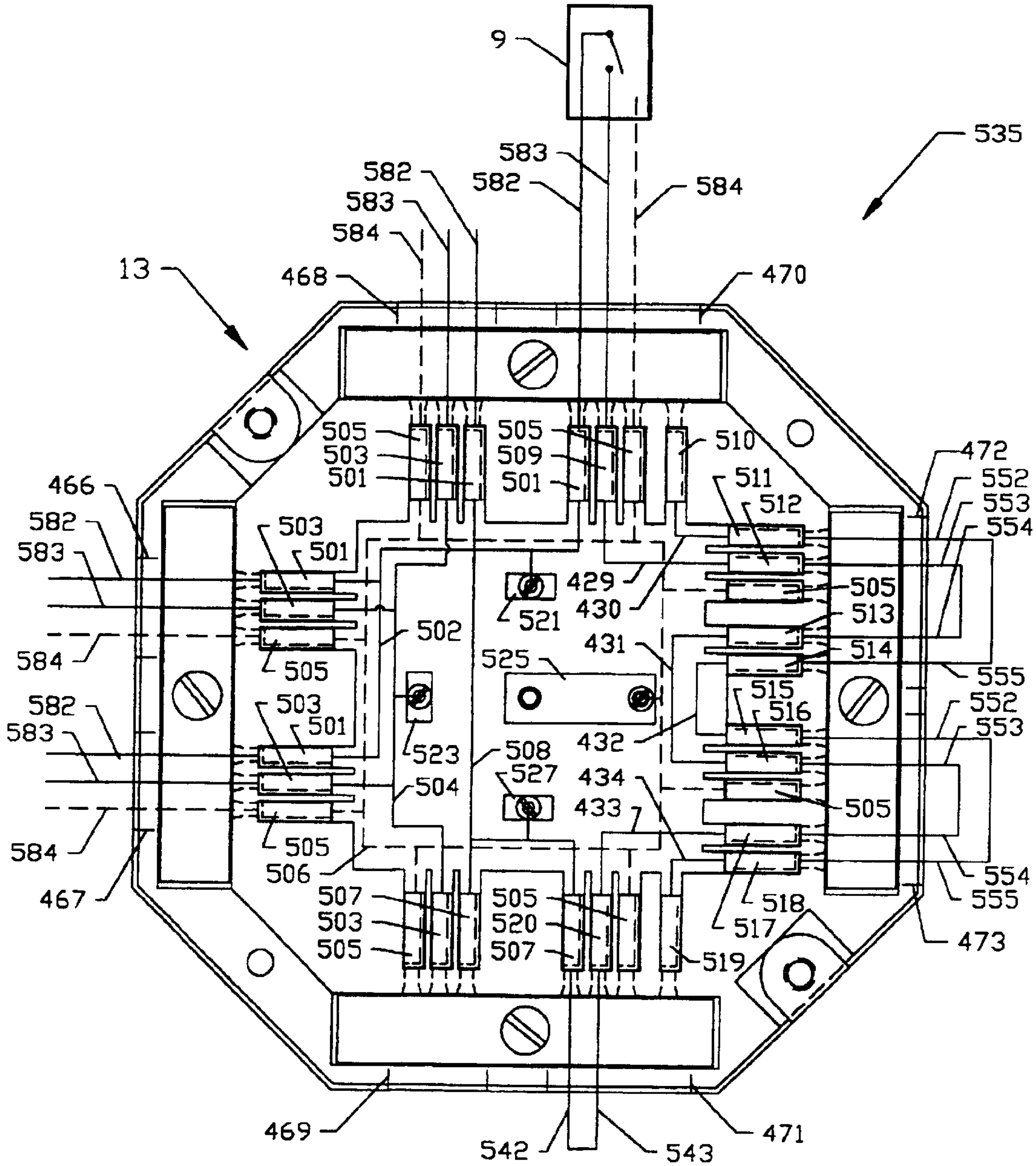

FIG. 197 is a front elevation view of FIG. 192, shown in line-schematic form.

Figure 198:
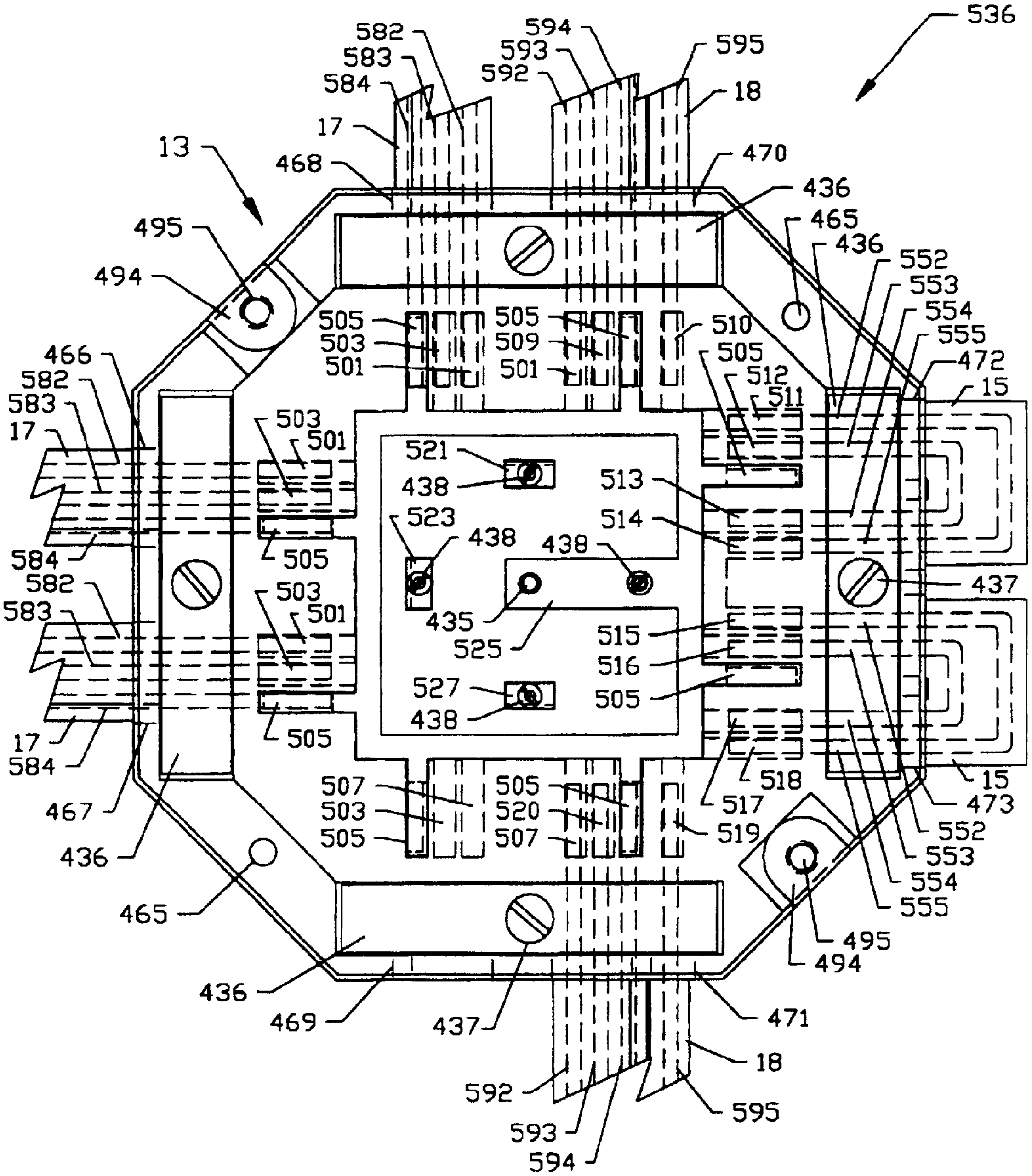

FIG. 198 is a front elevation view of the light box wired for a 3-way lighting circuit.

Figure 199:
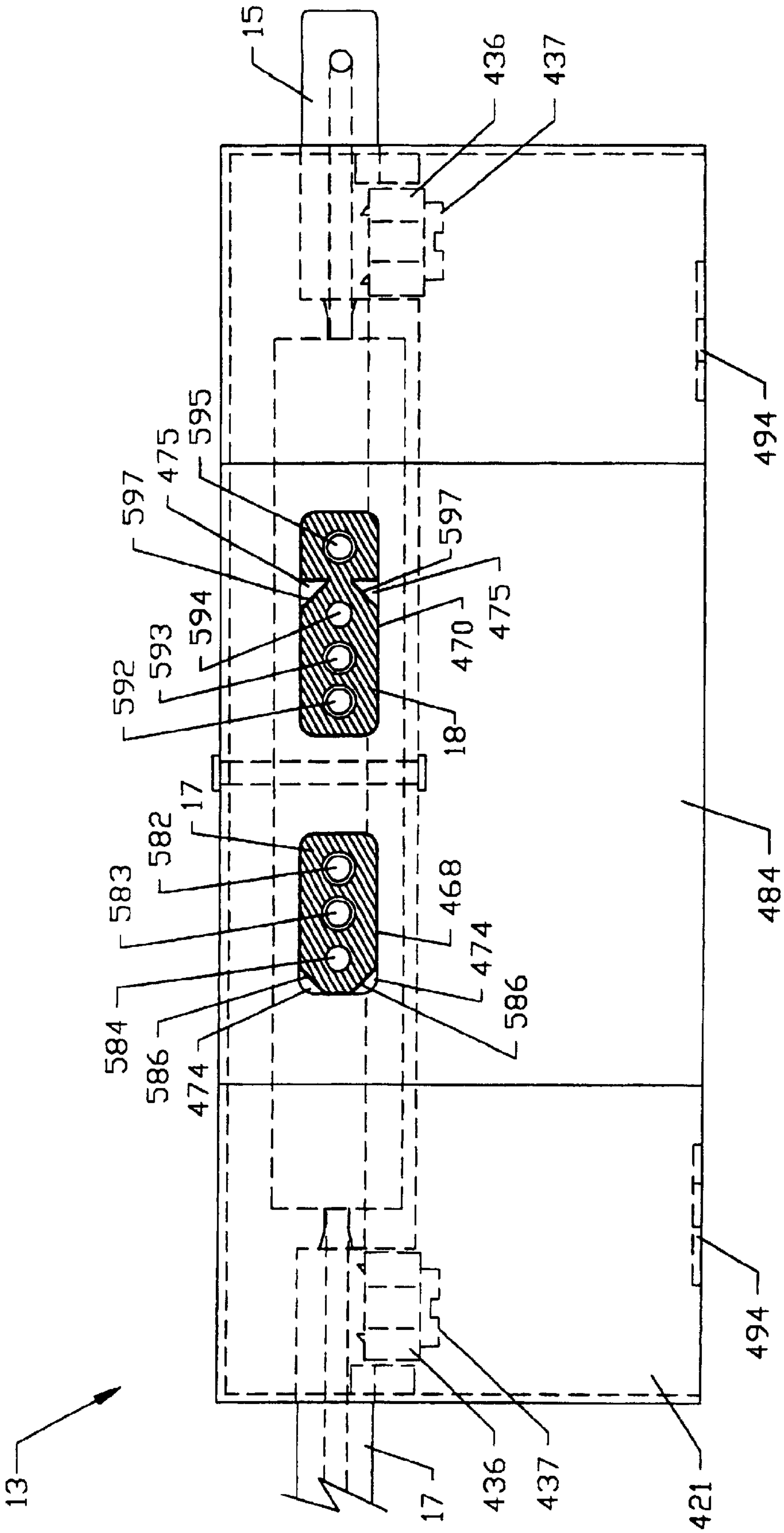

FIG. 199 is a plan view of FIG. 198.

Figure 200:
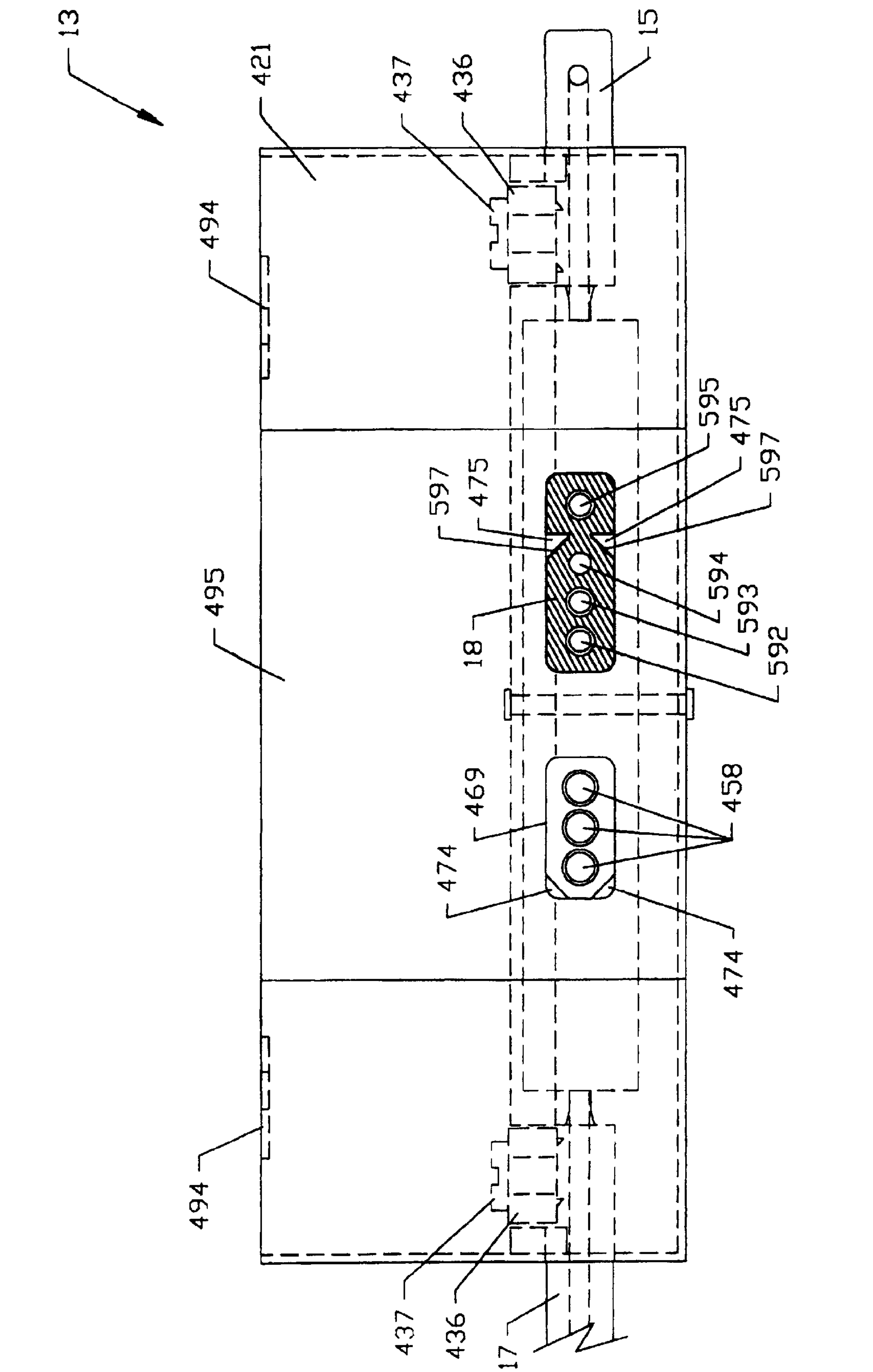

FIG. 200 is a bottom view of FIG. 198.

Figure 201:
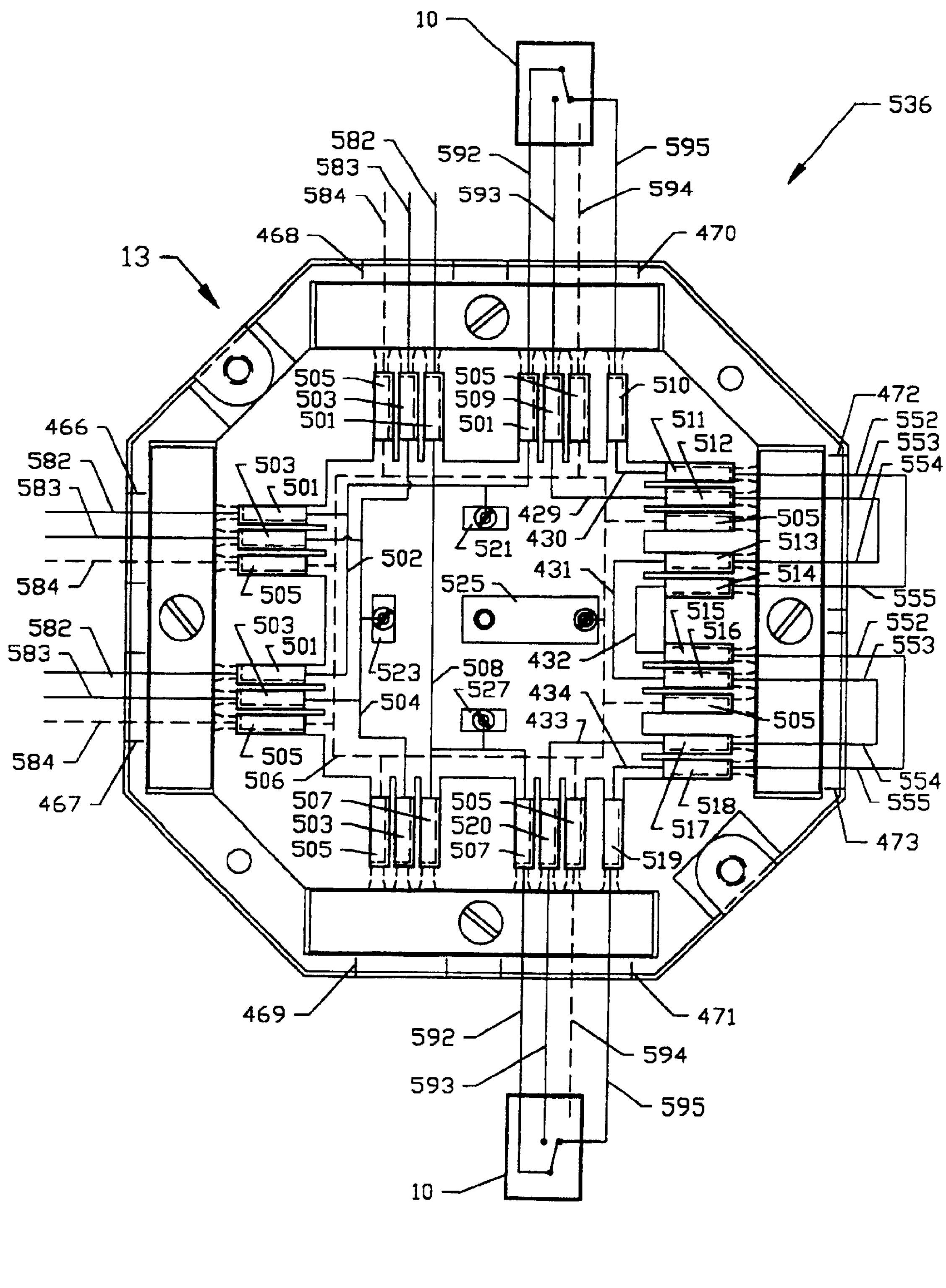

FIG. 201 is a front elevation view of FIG. 198, shown in line-schematic form.

Figure 202:
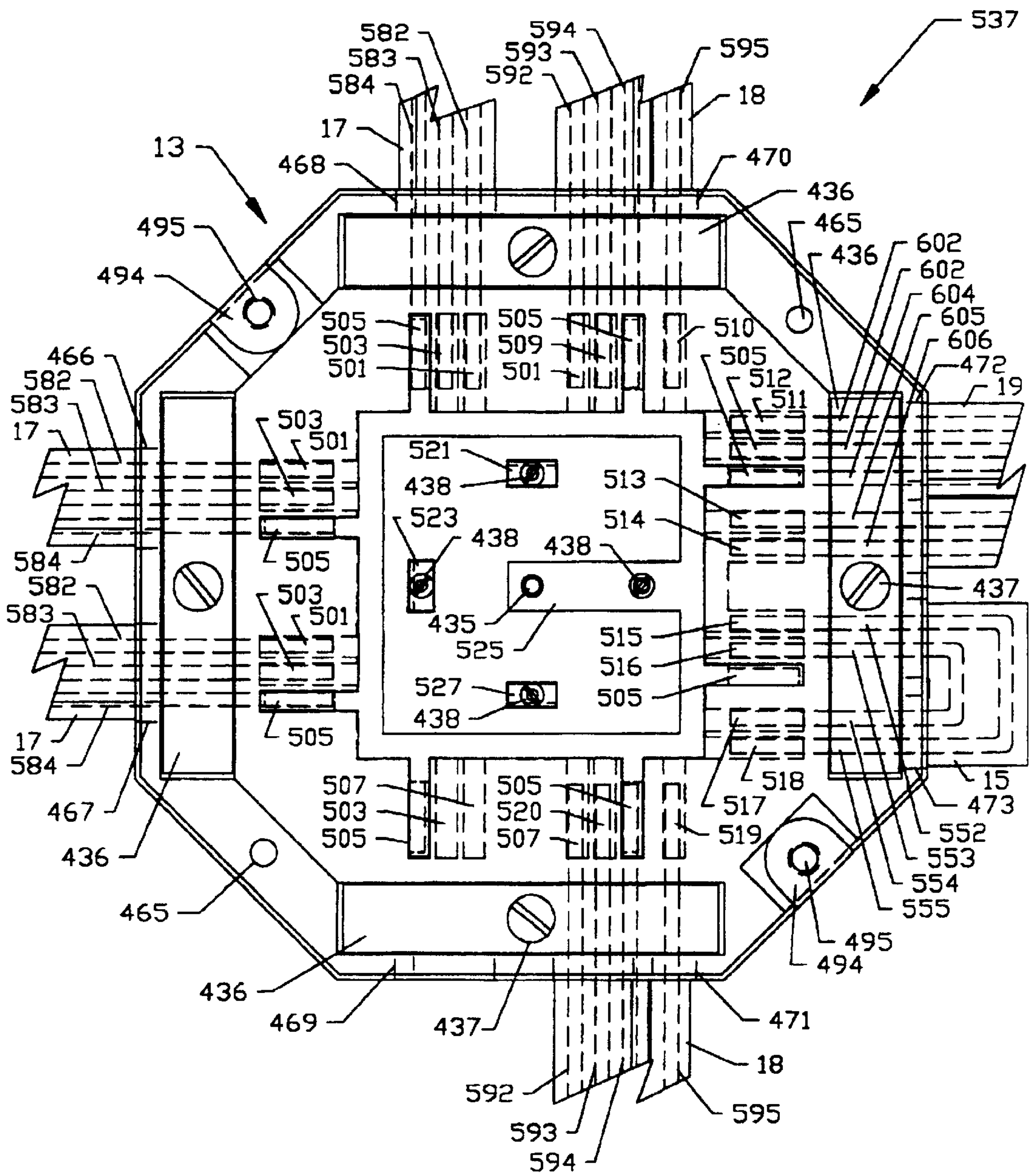

FIG. 202 is a front elevation view of the light box wired for a 4-way lighting circuit with one 4-way-switch circuit.

Figure 203:
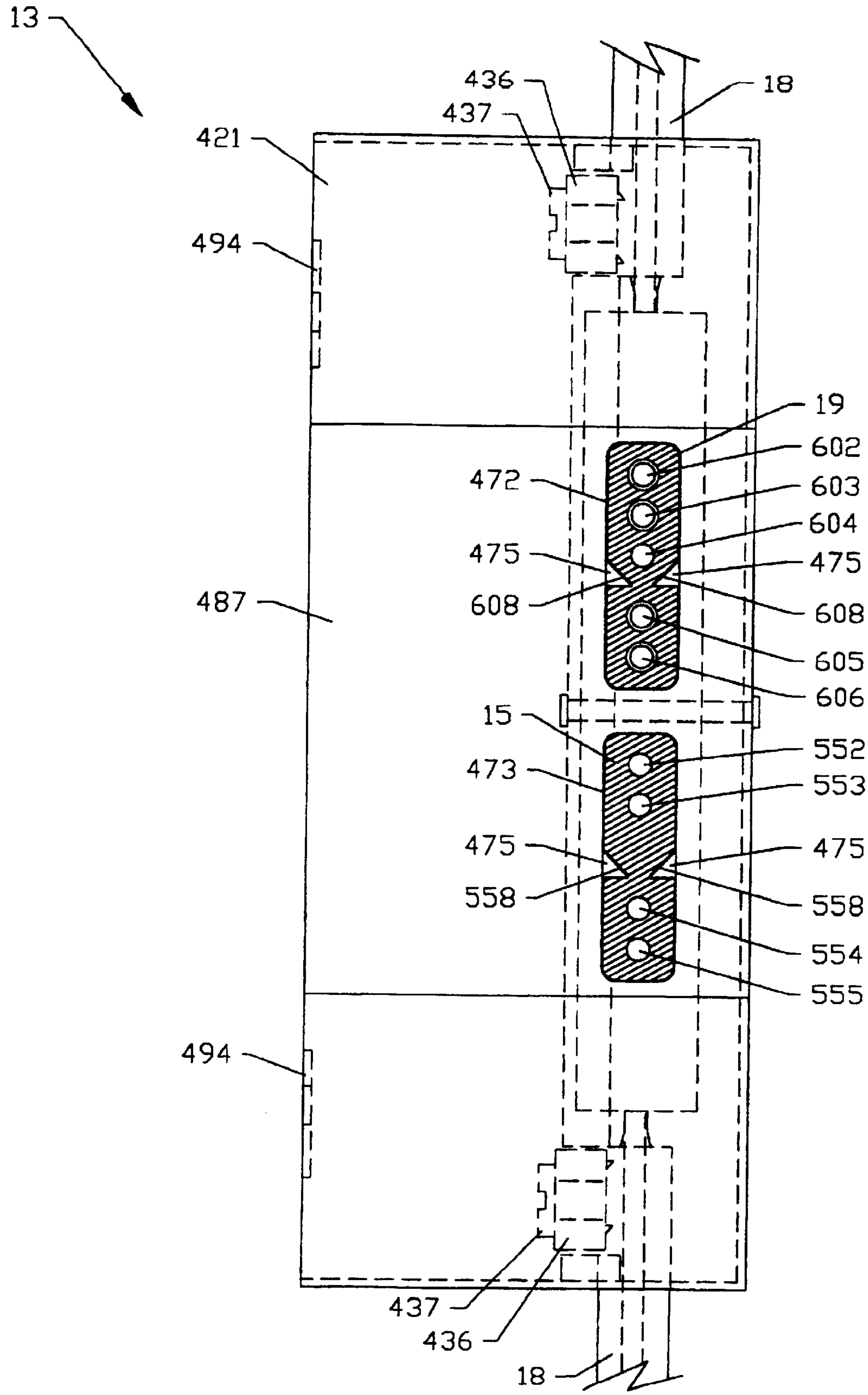

FIG. 203 is a right-side view of FIG. 202.

Figure 204:
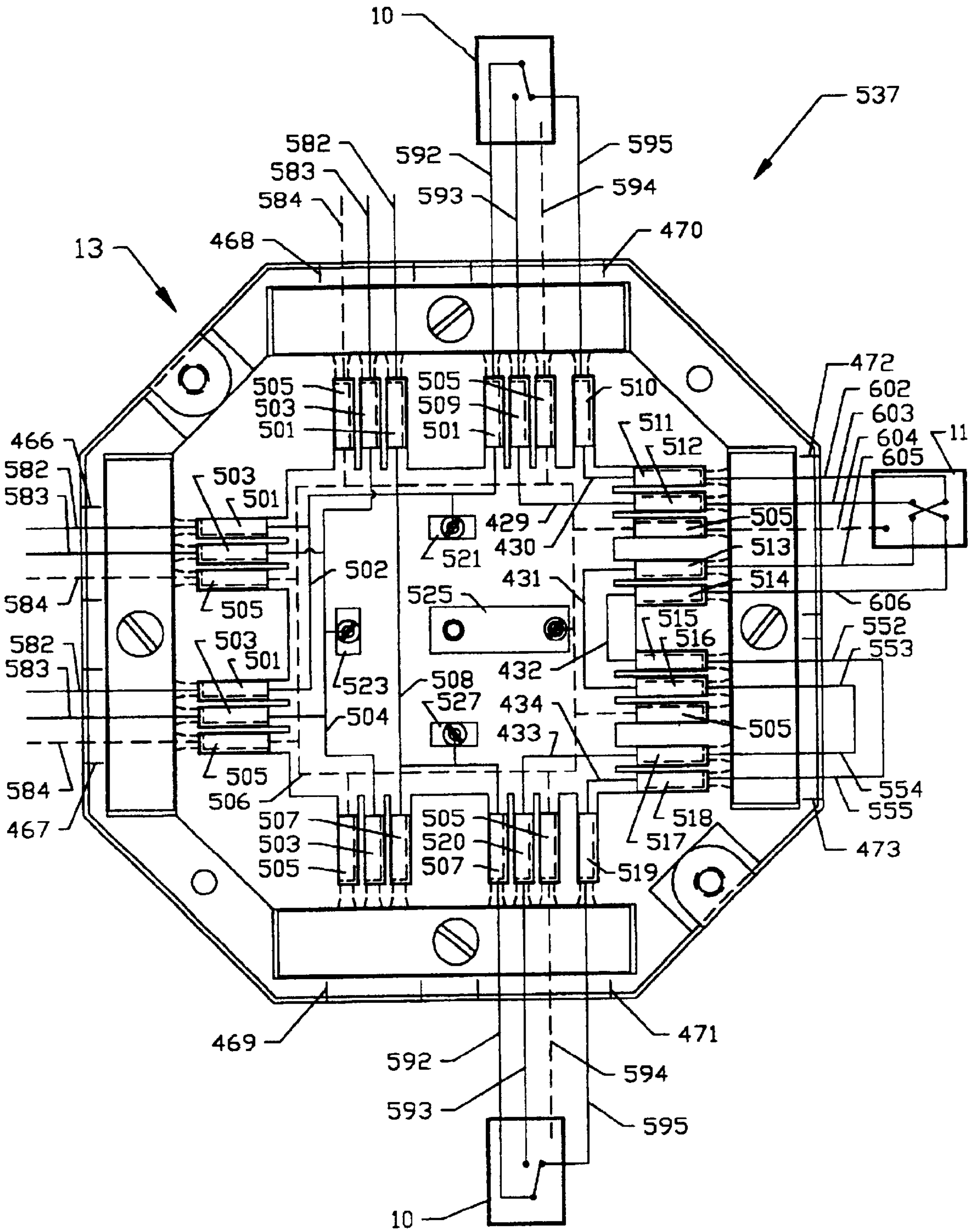

FIG. 204 is a front elevation view of FIG. 202, shown in line-schematic form.

Figure 205:
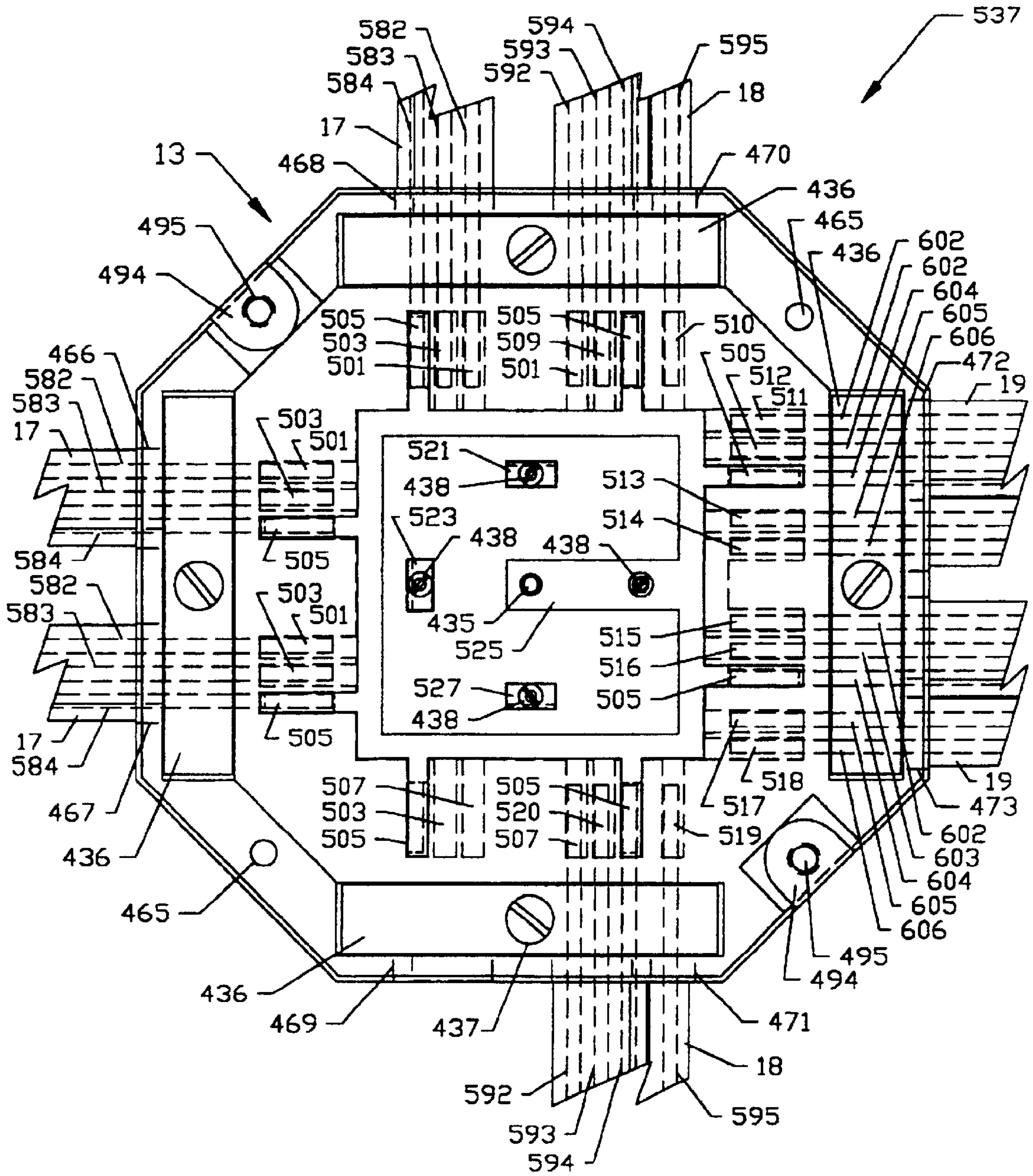

FIG. 205 is a front elevation view of the light box wired for a 4-way lighting circuit with two 4-way-switch circuits.

Figure 206:
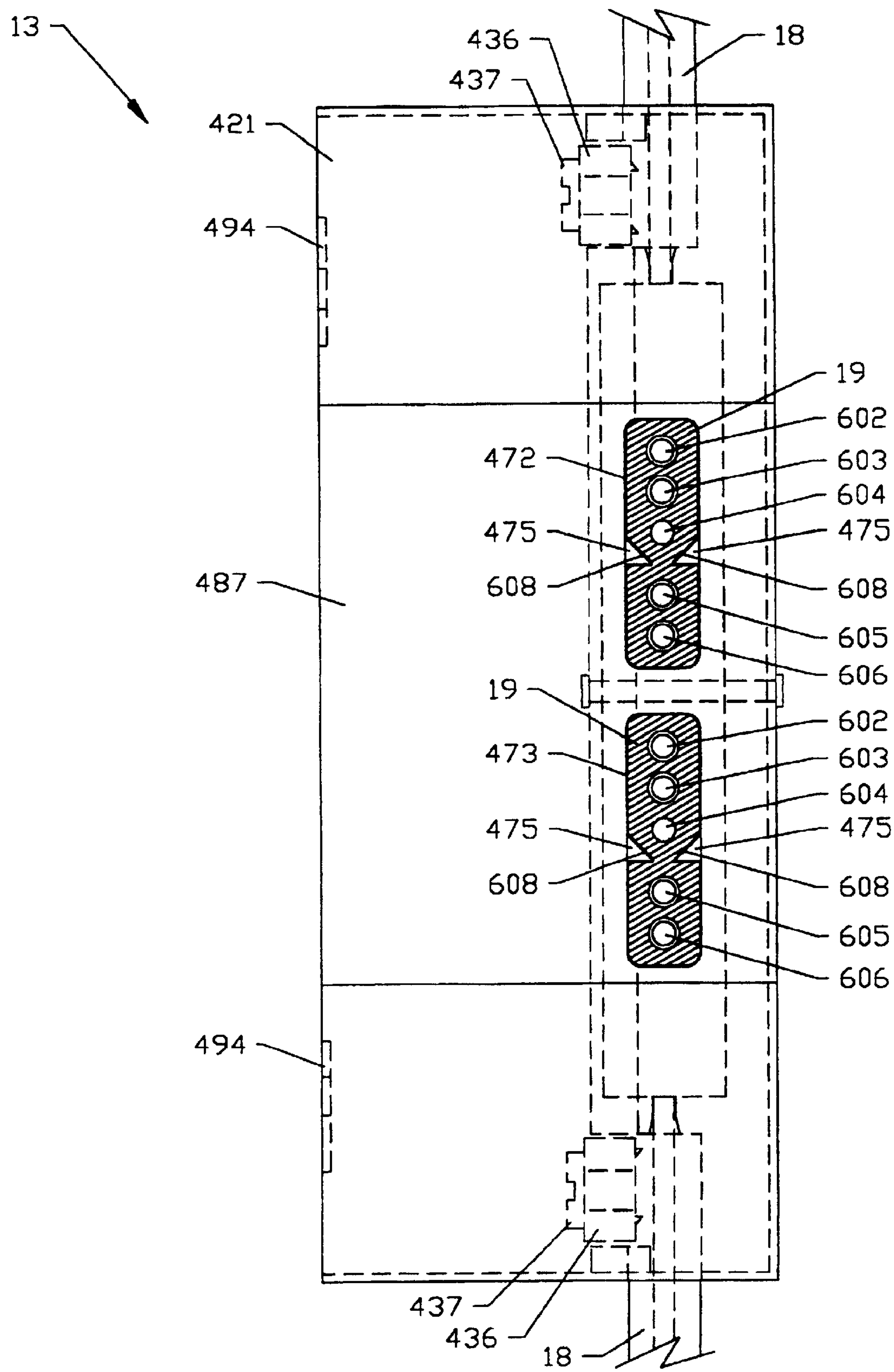

FIG. 206 is a right-side view of FIG. 205.

Figure 207:
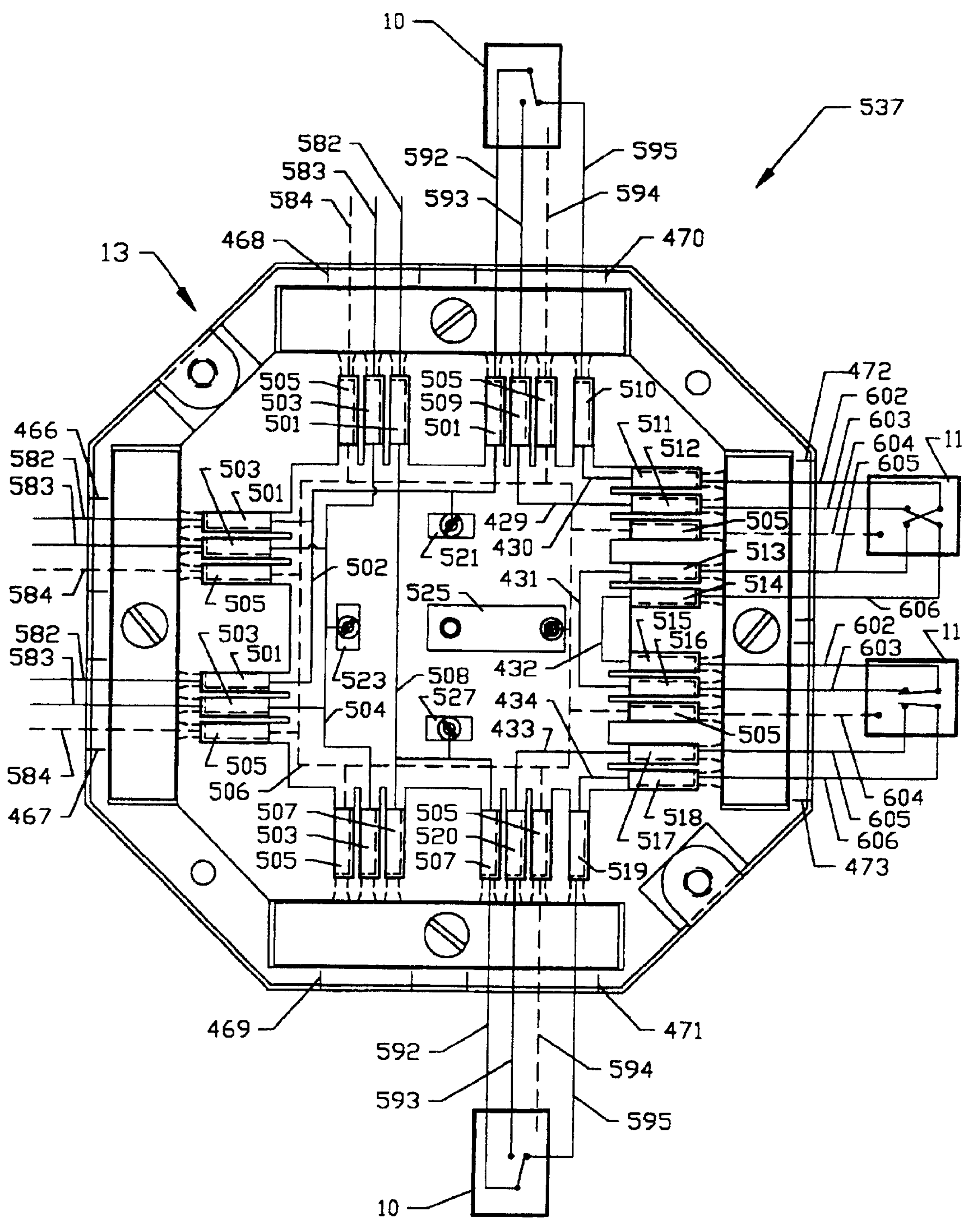

FIG. 207 is a front elevation view of FIG. 205, shown in line-schematic form.

Figure 208:
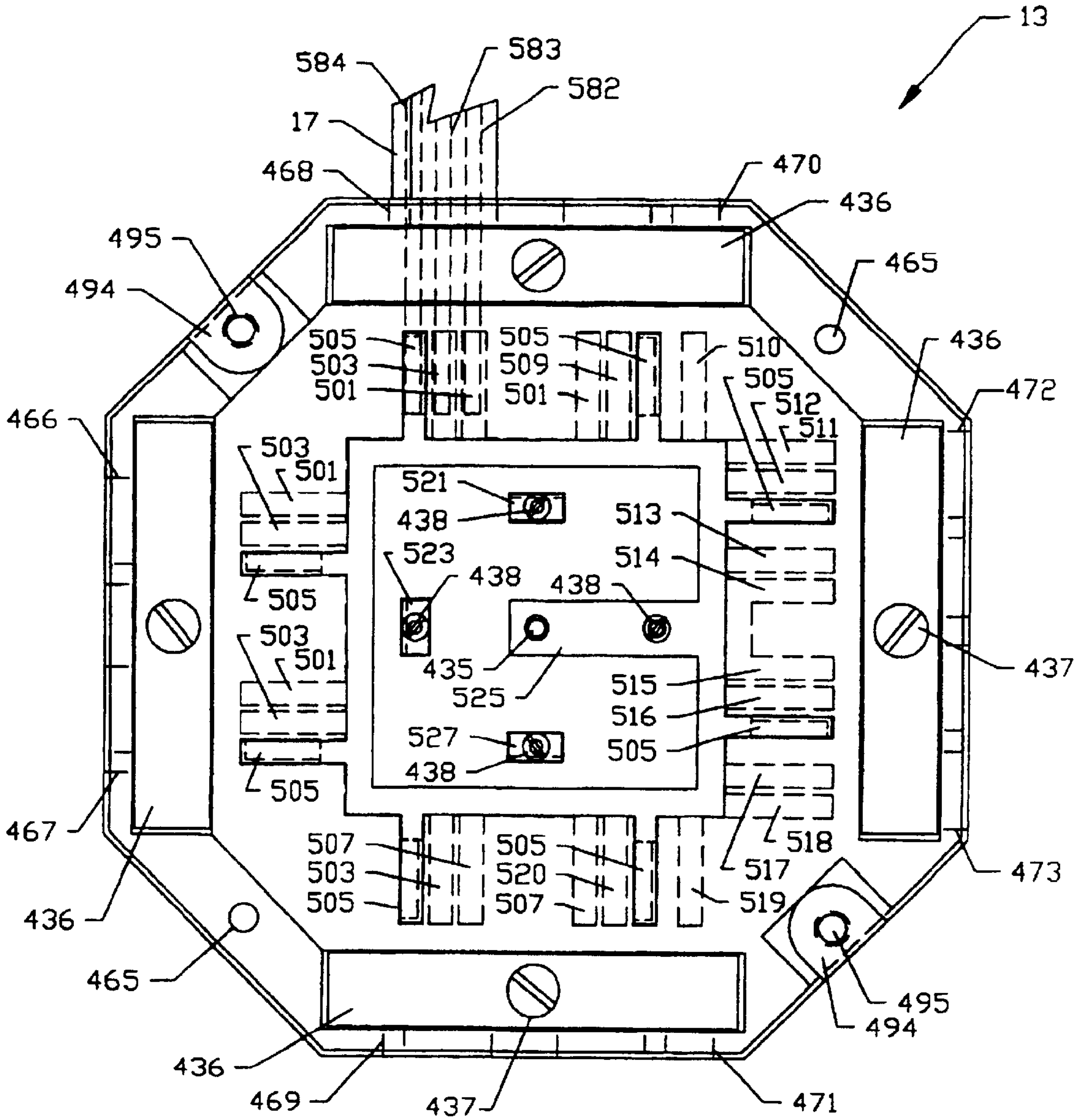

FIG. 208 is a front elevation view of the light box wired for operation from another light box.

Figure 209:
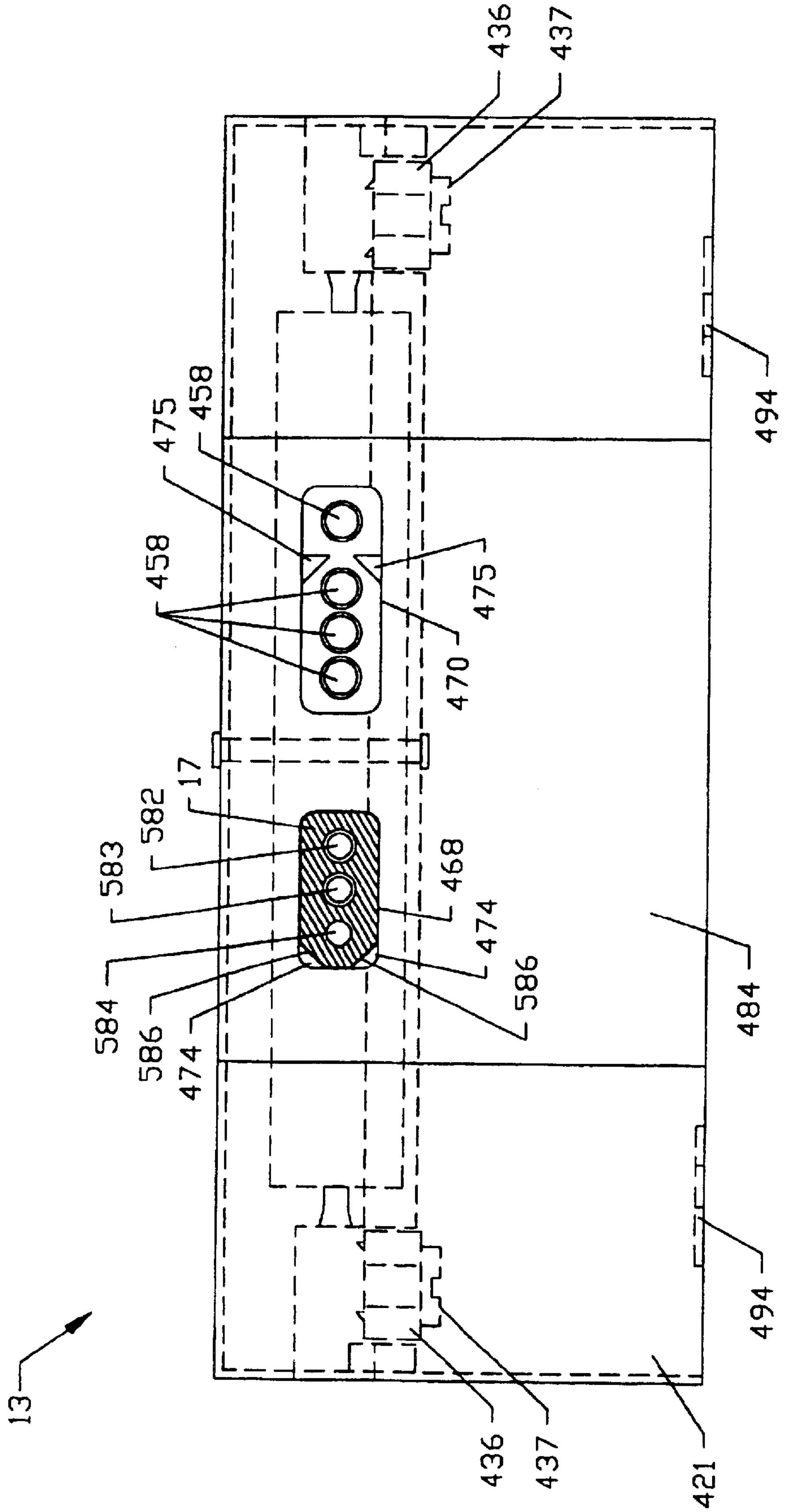

FIG. 209 is a plan view of FIG. 208.

Figure 210:
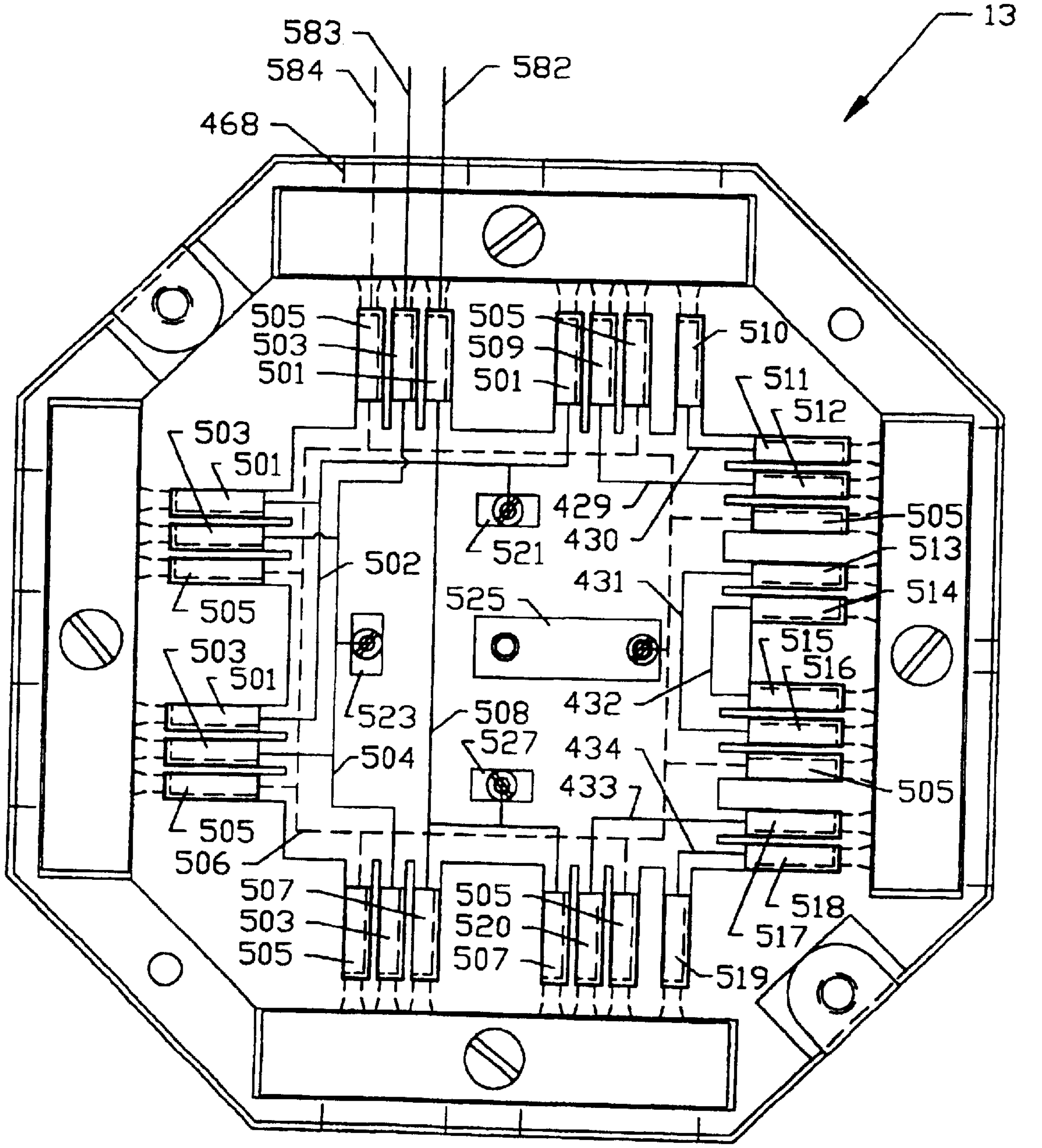

FIG. 210 is a front elevation view of FIG. 208, shown in line-schematic form.

Figure 211:
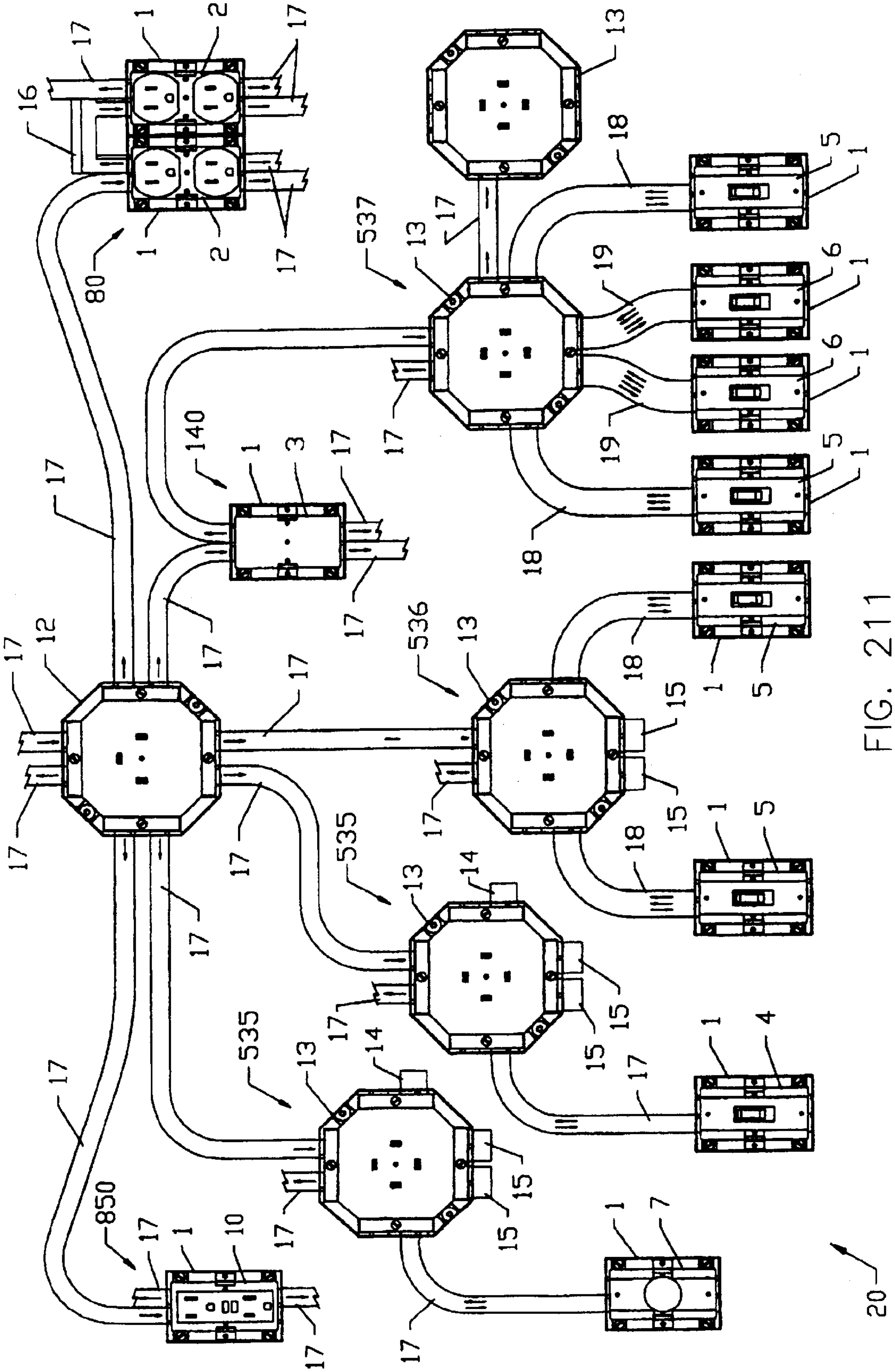

FIG. 211 is an example electrical circuit.

BEST MODE FOR CARRYING OUT THE INVENTION

Figure 1:
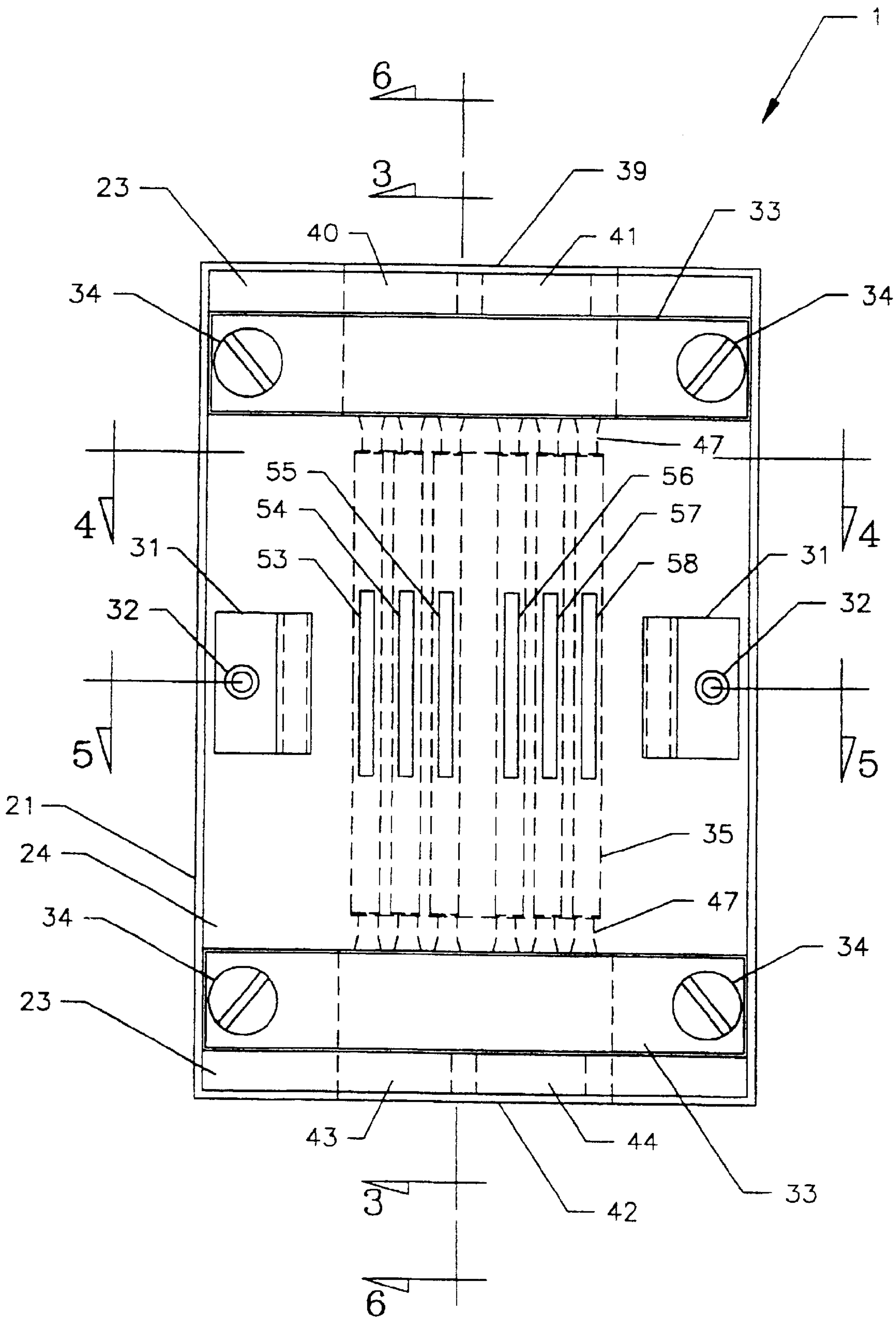
FIG. 1 is a front elevation view of the wallbox.
Figure 2:
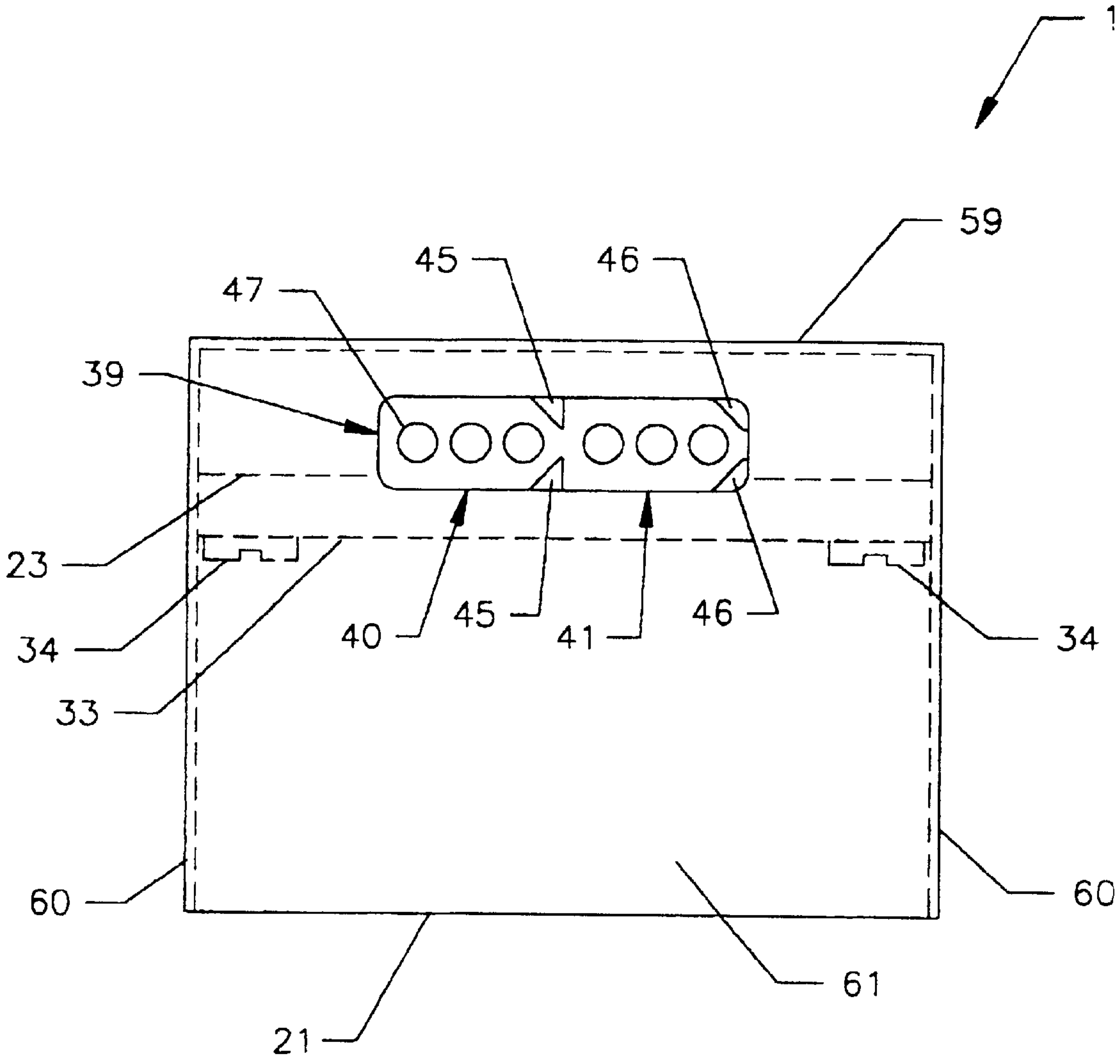
FIG. 2 is a plan view of the wallbox
Figure 118:
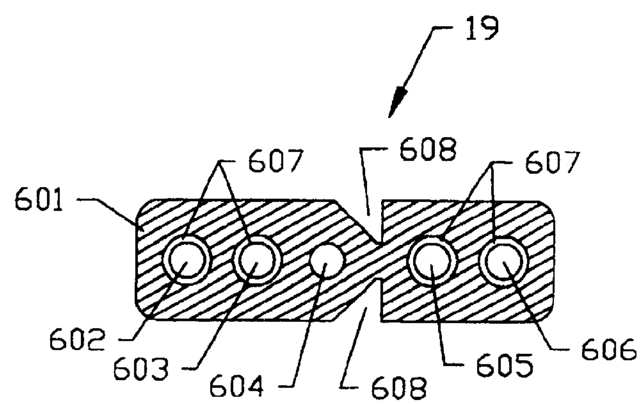
FIG. 118 is a cross-section view of the 5-conductor cable.
Figure 119:
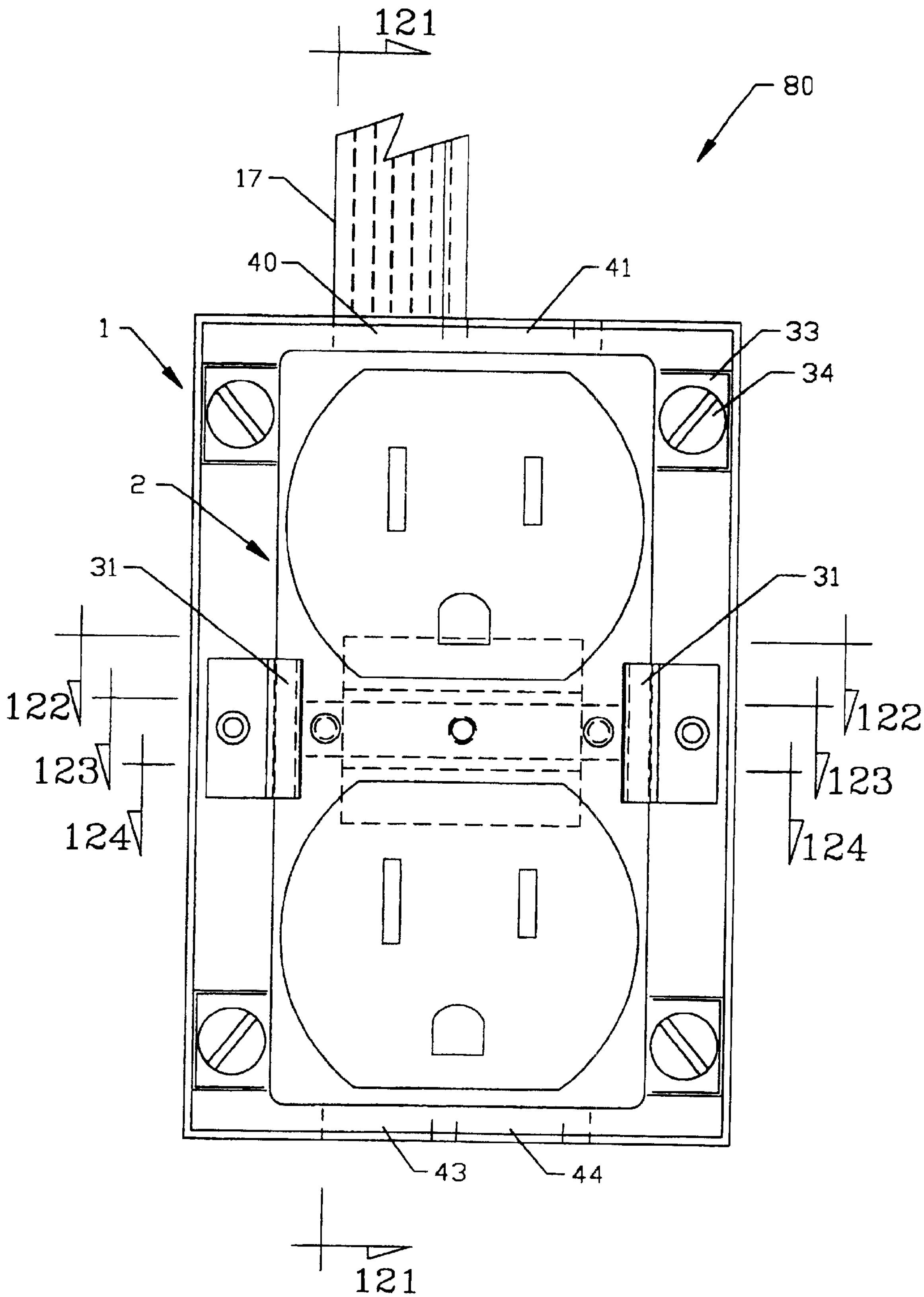
FIG. 119 is a front elevation view of the receptacle module and 3-conductors cables installed in the wallbox.

The present invention comprises a modular electrical system in which the modular components easily assemble in a manner so as to self-configure common lighting and general utility electrical circuits for residential and commercial buildings. The modular electrical components include the following: a wallbox 1, a receptacle module 2, a ganging module 3, a 2-way-switch module 4, a 3-way-switch module 5, a 4-way-switch module 6, a dimmer switch module 7, a fan-control switch module 8, a timer switch module 9, a GFCI-receptacle module 10, a 240-volt receptacle module I 1, a junction box 12, a light box 13, a 2-wire jumper 14, a 4-wire jumper 15, a wallbox jumper 16, a 3-conductor cable 17, a 4-conductor cable 18, and a 5-conductor cable 19. The individual components which comprise the present invention are illustrated in FIGS. 1 through 118. FIGS. 119 through 211 illustrate the use and operation of these components.

Referring to FIGS. 1 through 6, there is provided a wallbox 1. The two principal components of the wallbox 1 are the electrical box 21 and the wiring module 22. The wiring module 22 is comprised of a base 23, six wire adapters 25, 26, 27, 28, 29, 30; a cover 24; two spring clips 31; two rivets 32; two cable clamps 33; and four cable clamp screws 34.

The wiring module base 23 is constructed of plastic, or otherwise non-conductive material. A cable port 39, 42 is provided at the top end 37 and the bottom end 38 of the wiring module base 23. Each cable port 39, 42 is rectangular shaped and contains two center projections 45 and two end-projections 46 to create a specific interior profile. The two center projections 45 divide the cable port 39, 42 into a left half 40, 43 and a right half 41, 44. The wiring module base 23 provides six cavities 35 which contain and separate the six wire adapters 25, 26, 27, 28, 29, 30. A wire entrance hole 47 is provided at each end 36 of each wire adapter cavity 35. The wiring module base 23 also provides two rivet holes 48 and four threaded holes 49 to accommodate the rivets 32 and the cable clamp screws 34, respectively.

The wire adapters 25, 26, 27, 28, 29, 30 are each of a one-piece formed construction and constructed of a copper alloy, or otherwise a conductive material. Each wire adapter 25, 26, 27, 28, 29, 30 provides a wire pressure-socket 67 at each end and a blade pressure-socket 70 in the center. The wire pressure-sockets 67 are created by two opposing tabs 68 which are formed closely together. The tabs 68 flex as they exert pressure on a wire that is larger than the space between the tabs 68, as the wire is inserted. The tabs 68 are each provided with an indentation 69 to provide maximum contact with the wire. The blade pressure-sockets 70 are created by a tab 71 which is formed opposing and closely together with the wire adapter sidewall 66. A slot 72 is provided in the wire adapters 25, 26, 27, 28, 29, 30 to permit a conductor blade to be inserted between the tab 71 and the wire adapter sidewall 66. The tab 71 flexes as it exerts pressure on a conductor blade that is larger than the space between the tab 71 and the wire adapter sidewall 66 as the conductor blade is inserted.

The wiring module cover 24 is constructed of plastic, or otherwise a non-conductive material. The back side 51 of the wiring module cover 24 provides six cavities 50 which contain and separate the six wire adapters 25, 26, 27, 28, 29, 30. The wiring module cover 24 has six blade slots 53, 54, 55, 56, 57, 58 located in alignment with the slots 72 in the six wire adapters 25, 26, 27, 28, 29, 30. The wiring module cover 24 also provides two rivet holes 52 to accommodate the rivets 32.

The two spring clips 31 are constructed of spring steel to provide a flexible nature and are provided with one rivet hole 73. The two cable clamps 33 may be constructed of aluminum or plastic and are provided with ridges 76 to increase the clamping effectiveness.

Figure 6:
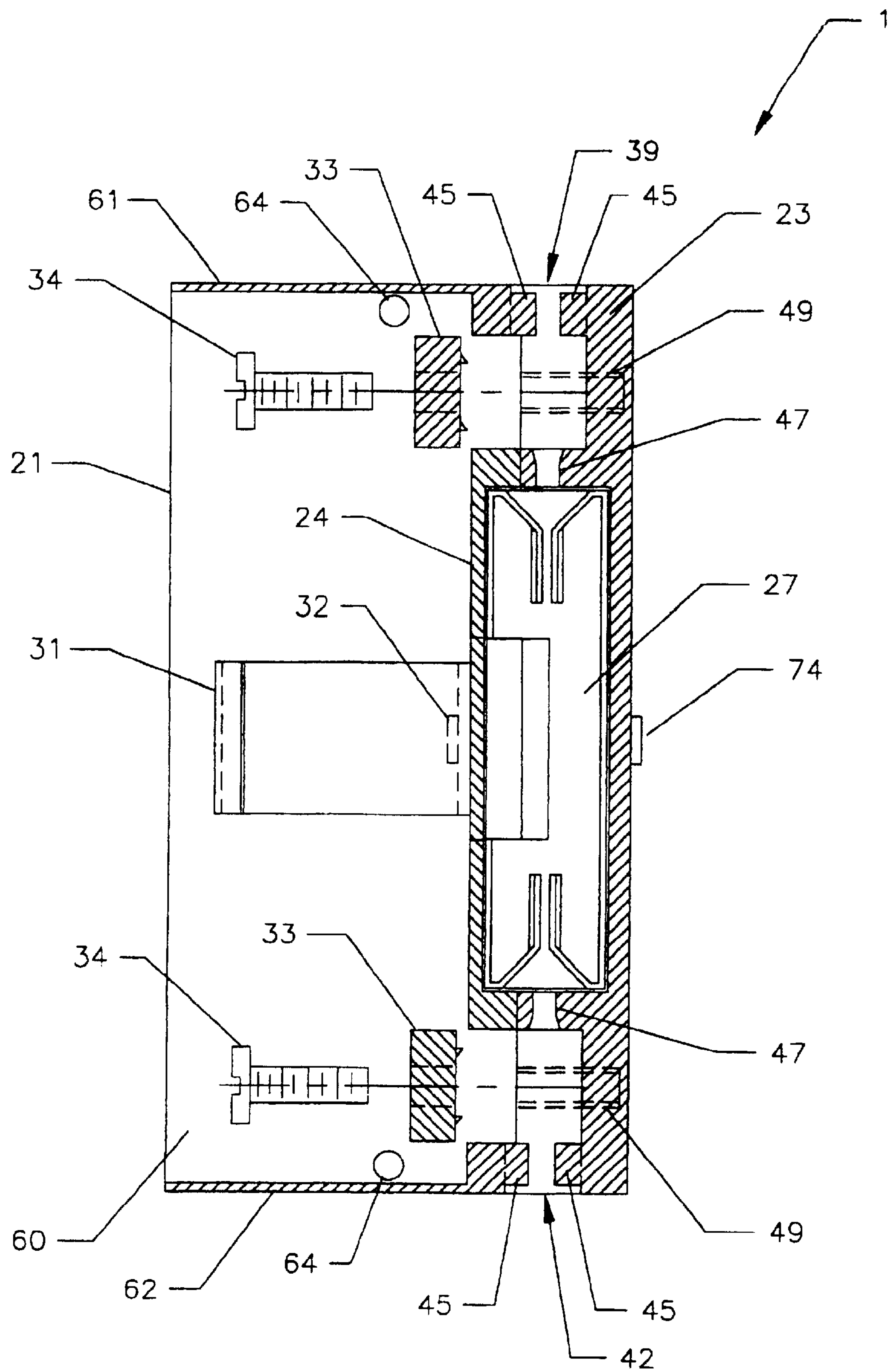
FIG. 6 is a vertical section view taken along line 6—6 of FIG. 1 shown with the electrical box molded with the wiring module base as one piece.
Figure 7:
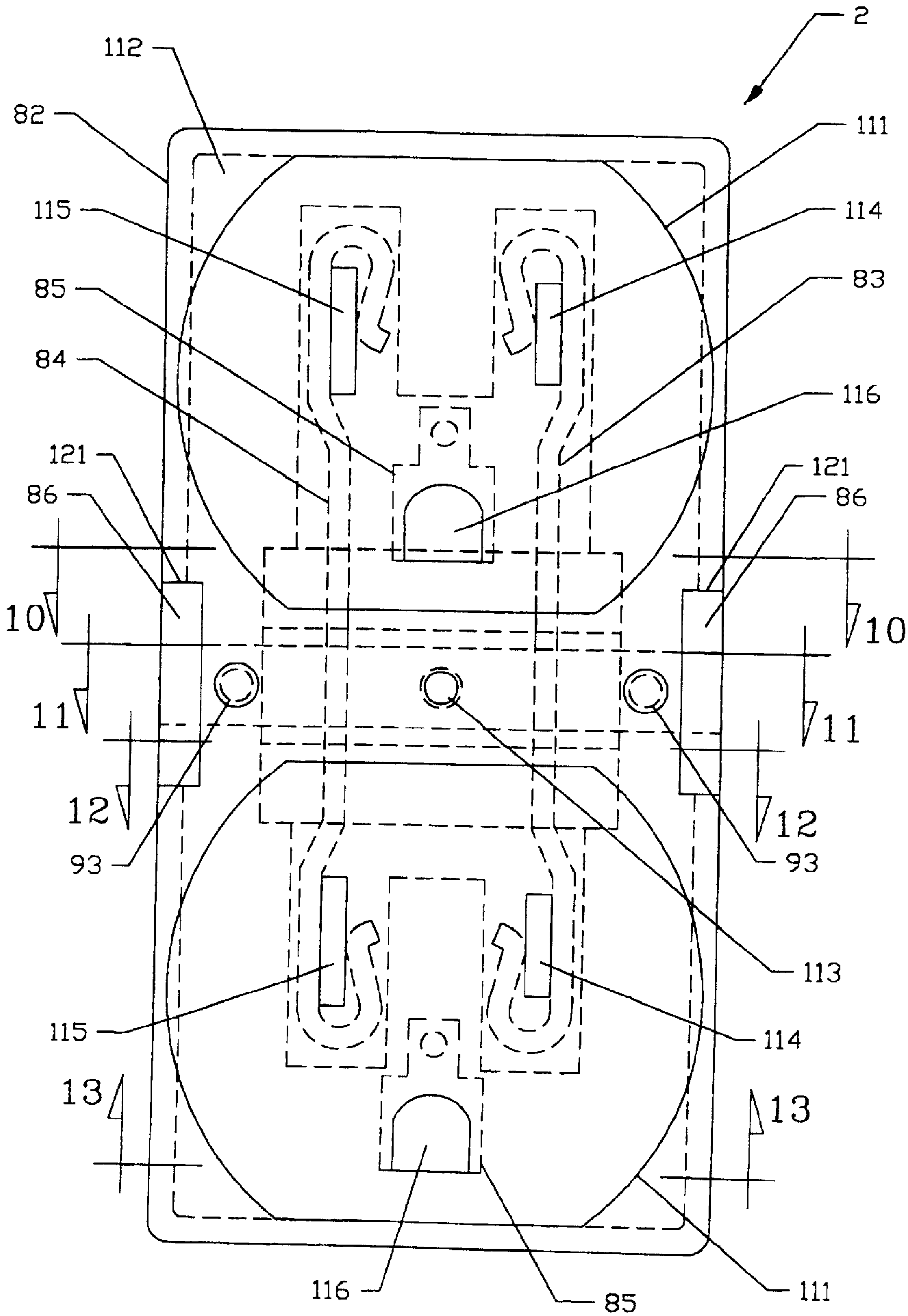
FIG. 7 is a front elevation view of the receptacle module.
Figure 8:
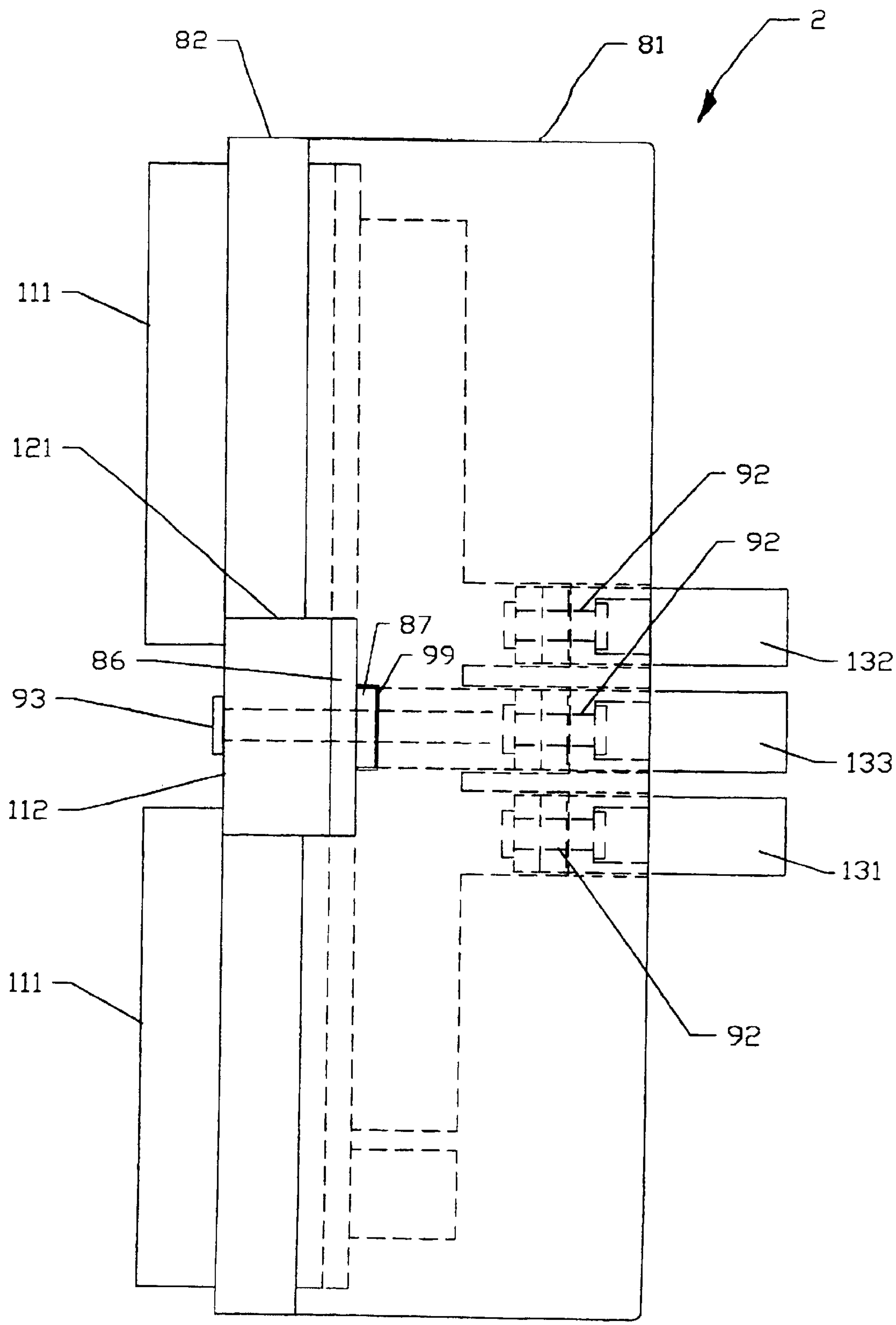
FIG. 8 is a side elevation view of the receptacle module.
Figure 9:
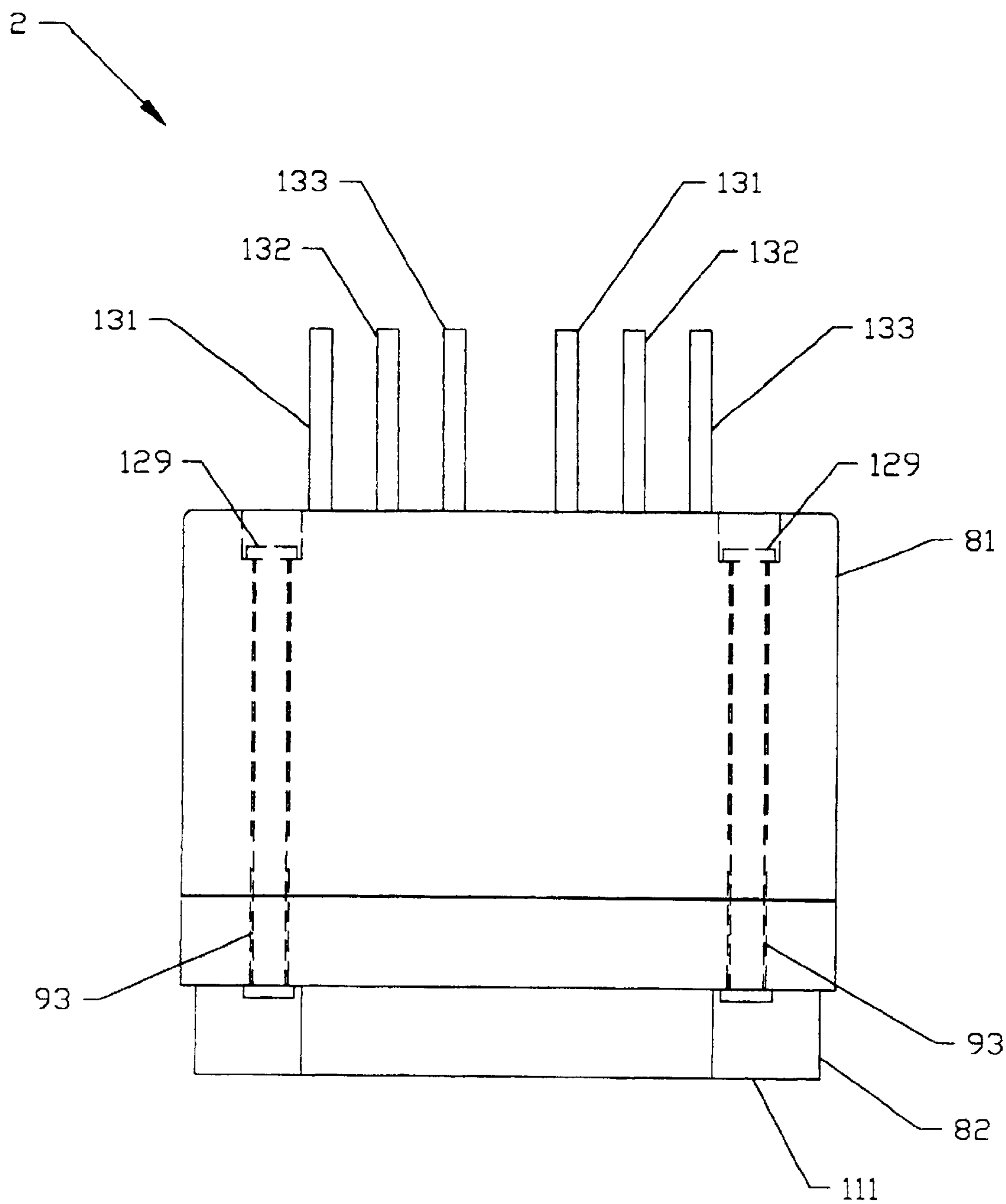
FIG. 9 is a plan view of the receptacle module.
Figure 10:
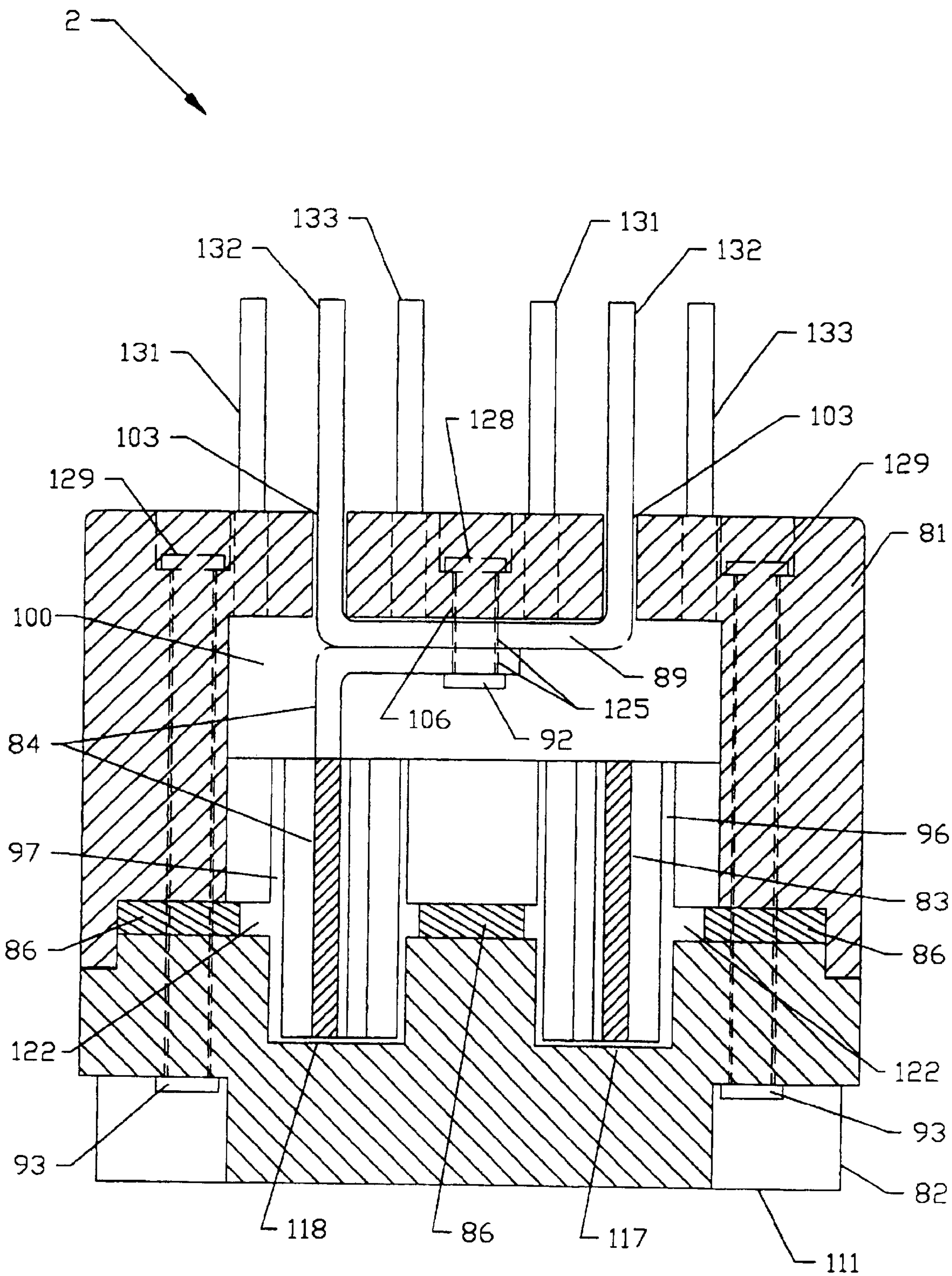
FIG. 10 is a horizontal section view taken along line 10—10 of FIG. 7.
Figure 11:
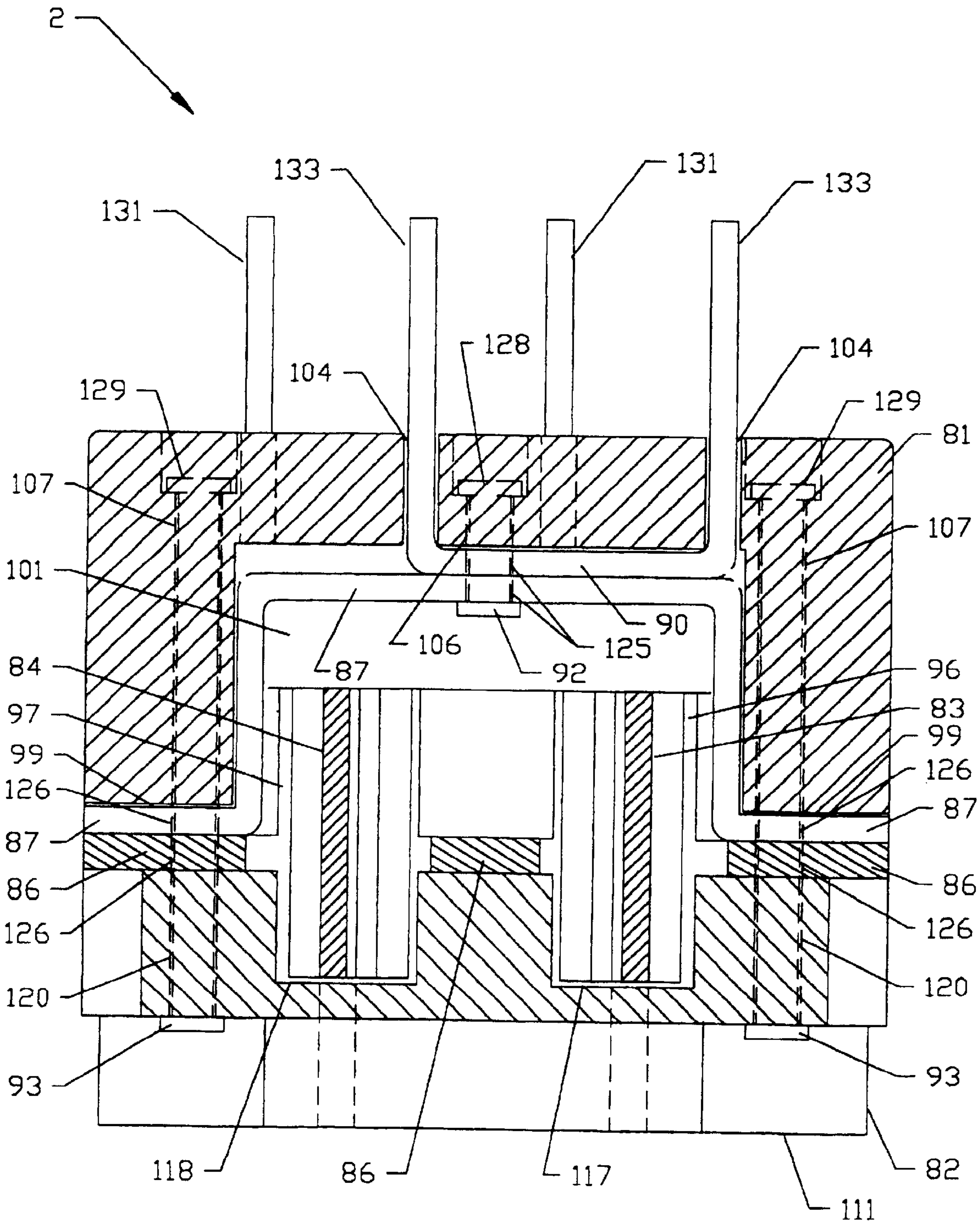
FIG. 11 is a horizontal section view taken along line 11—11 of FIG. 7.
Figure 12:
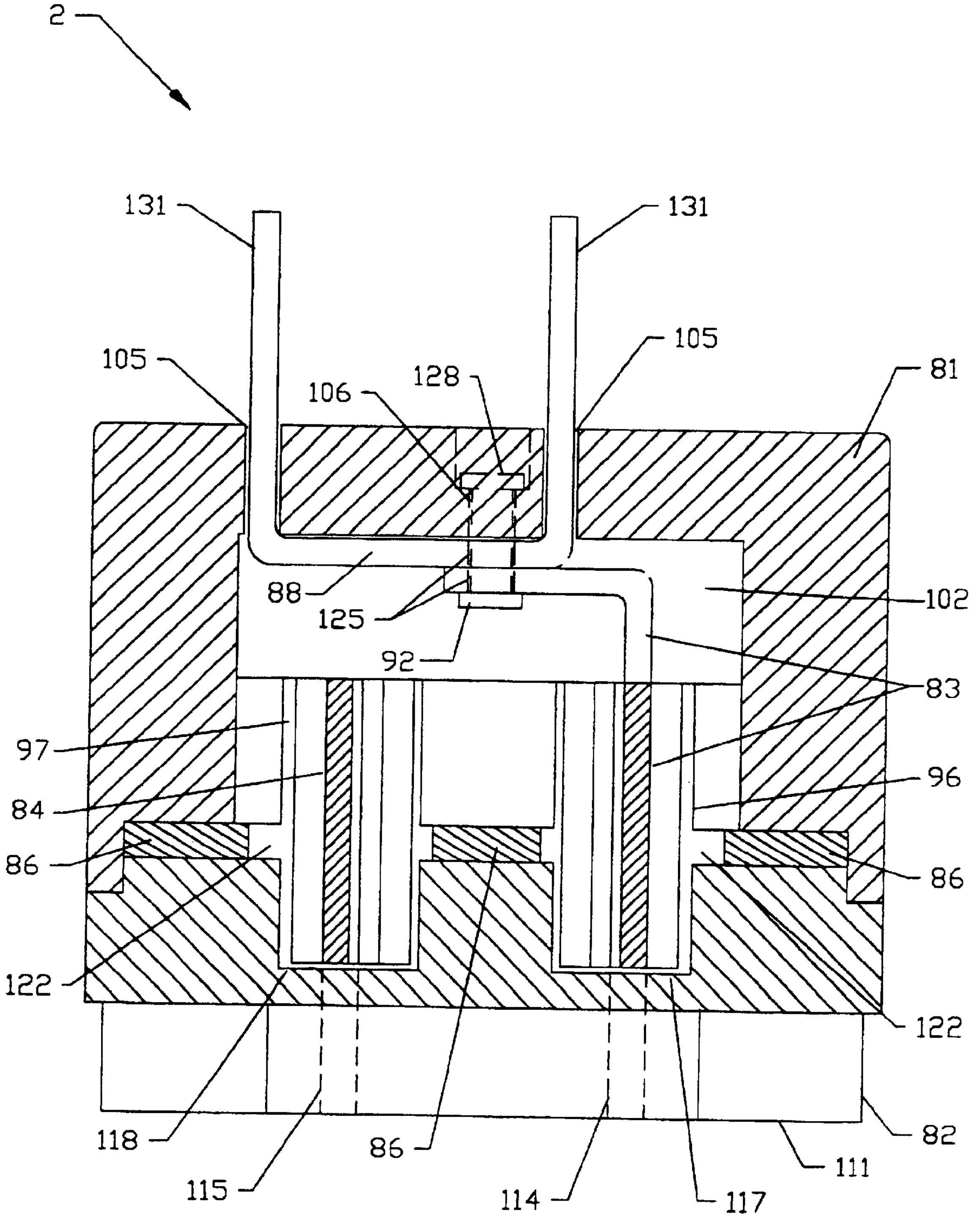
FIG. 12 is a horizontal section view taken along line 12—12 of FIG. 7.
Figure 13:
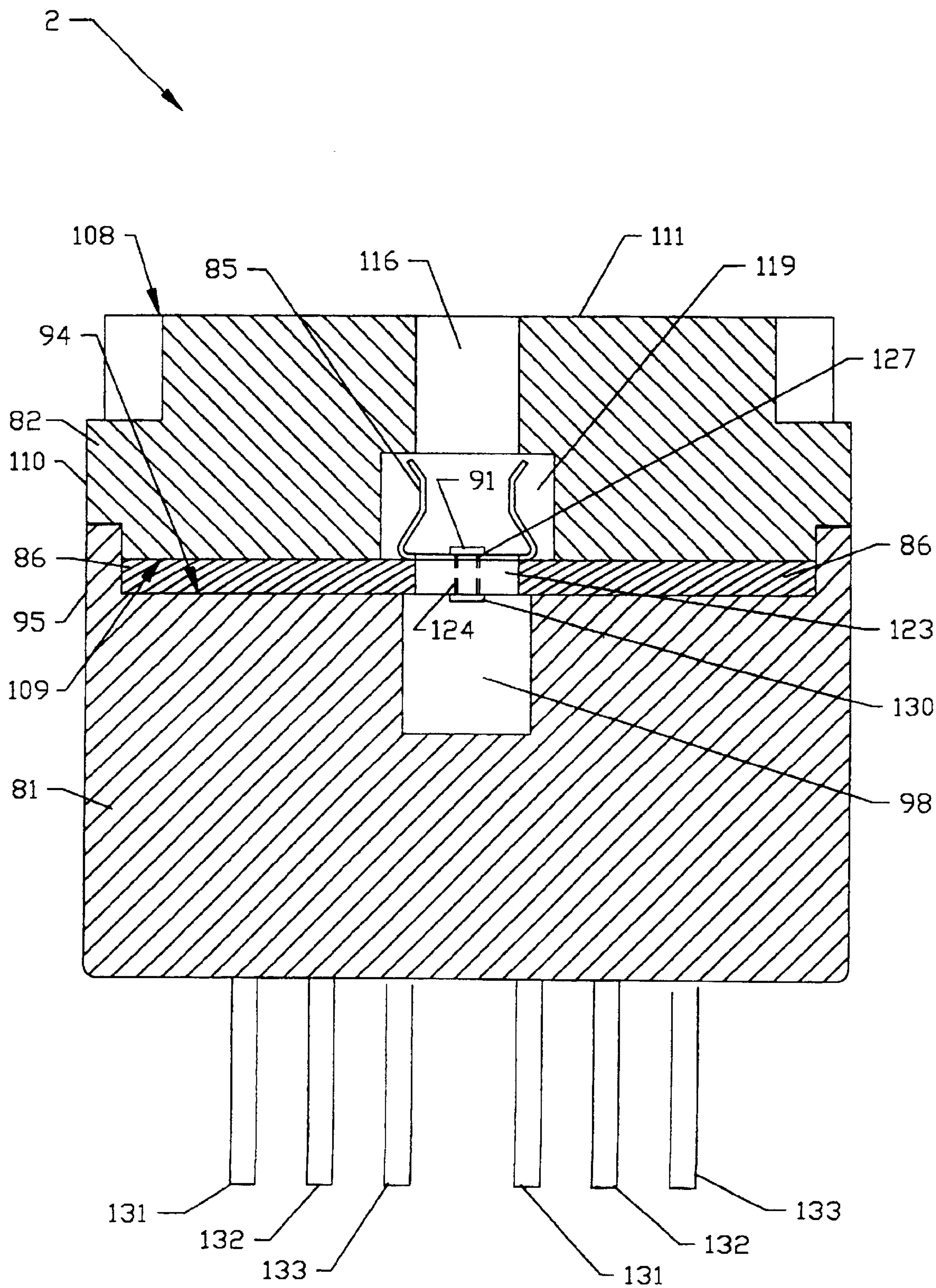
FIG. 13 is a horizontal section view taken along line 13—13 of FIG. 7.
Figure 14:
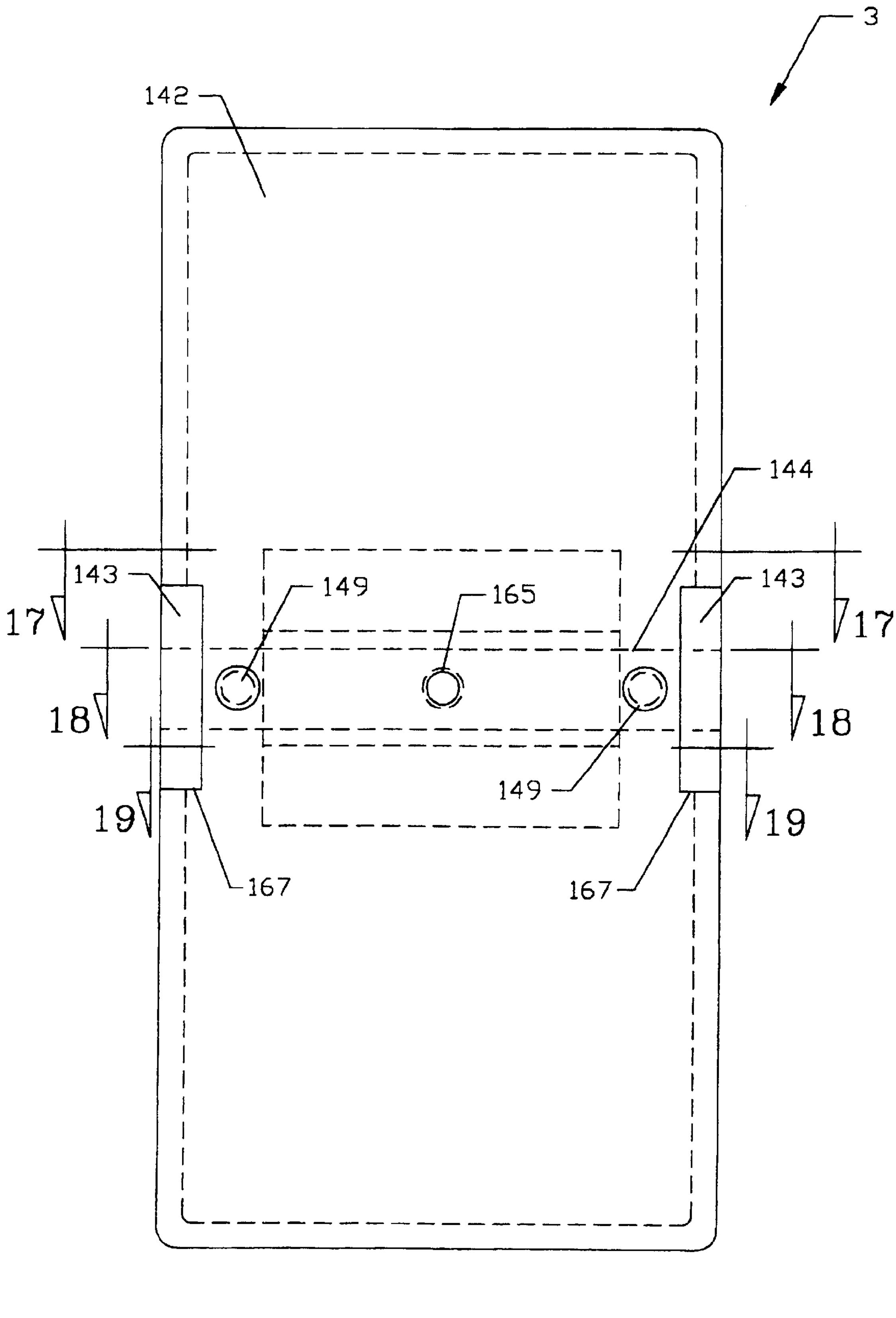
FIG. 14 is a front elevation view of the ganging module.
Figure 15:
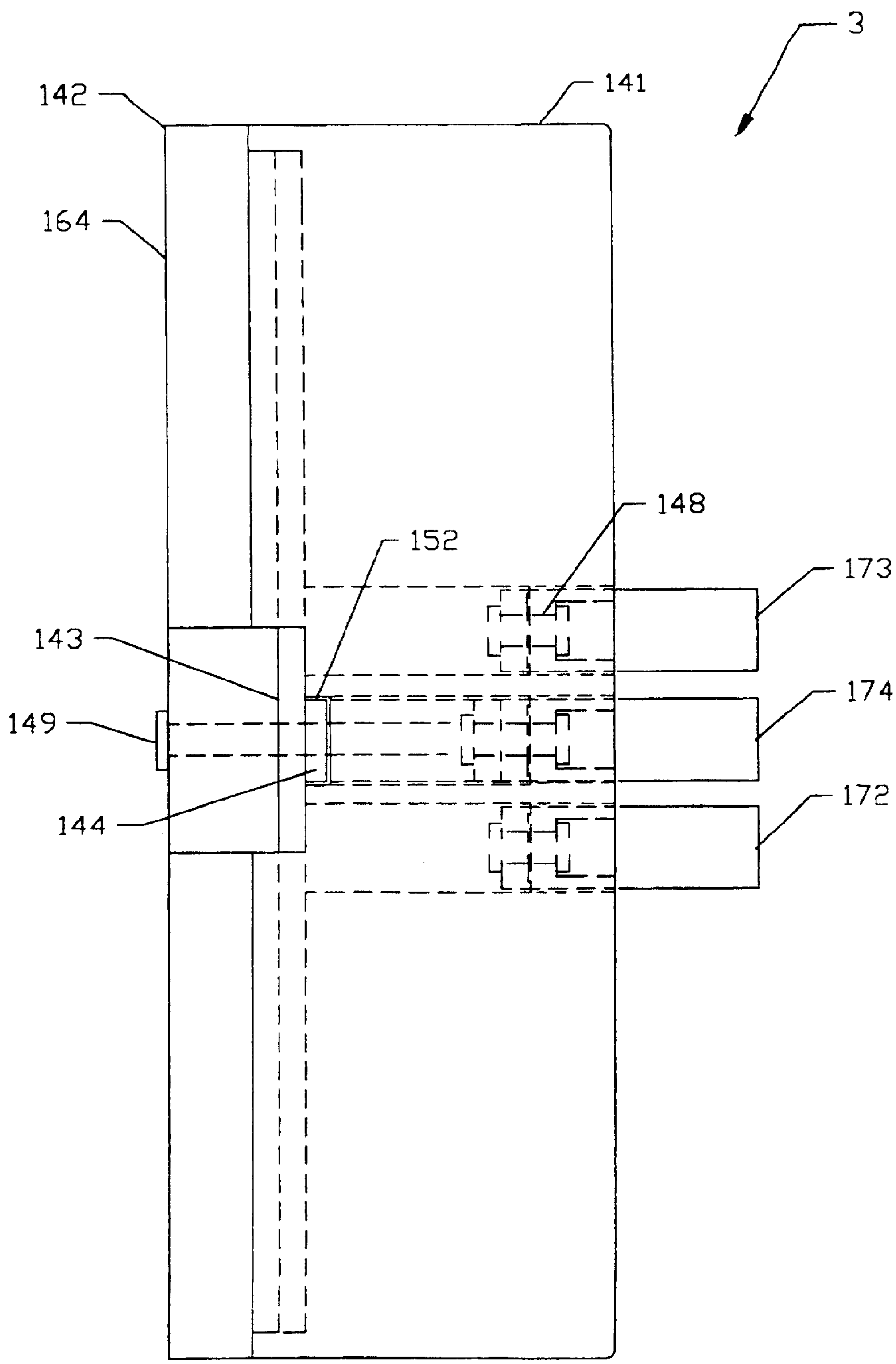
FIG. 15 is a side elevation view of the ganging module.
Figure 16:
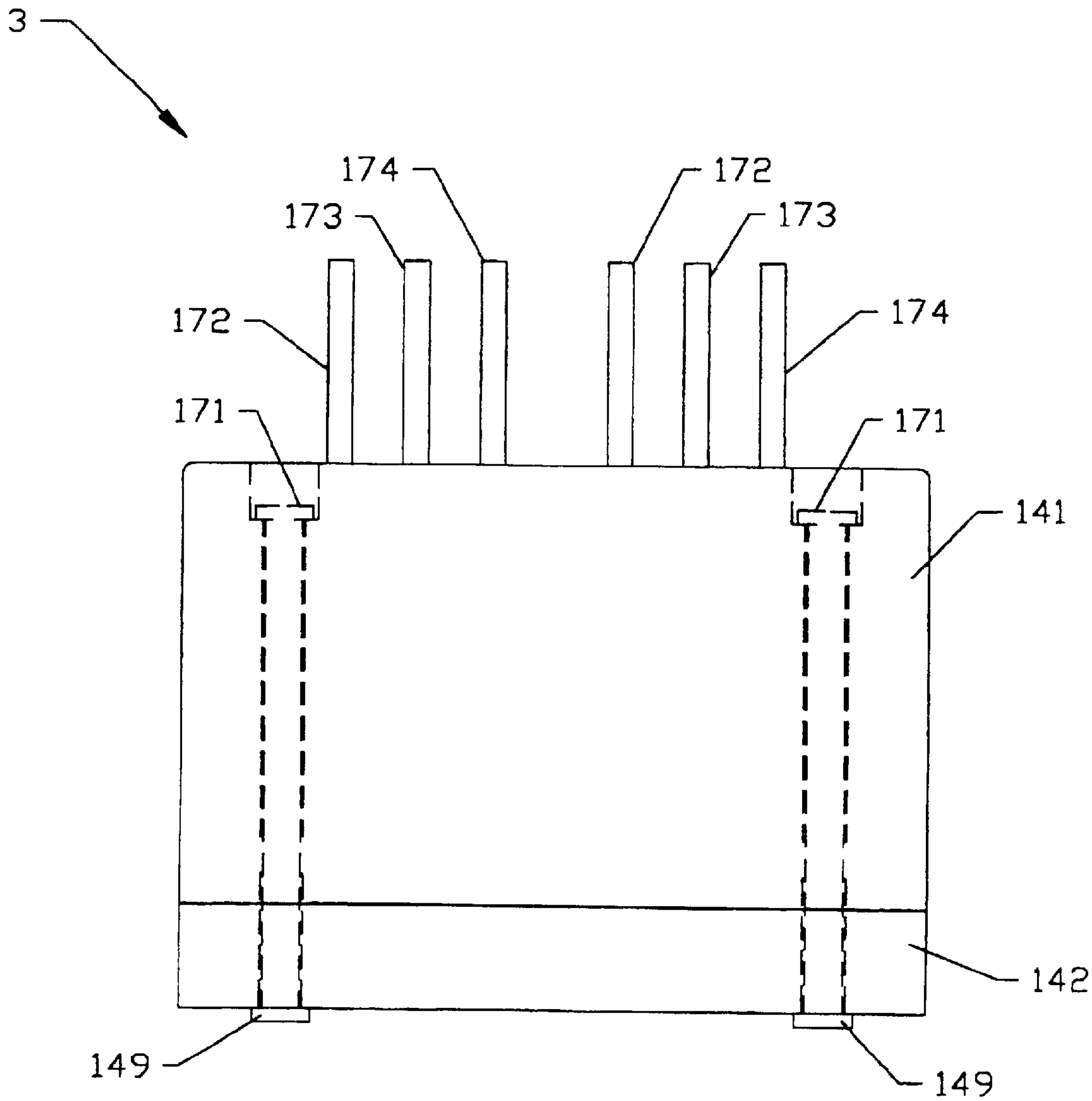
FIG. 16 is a plan view of the ganging module.
Figure 17:
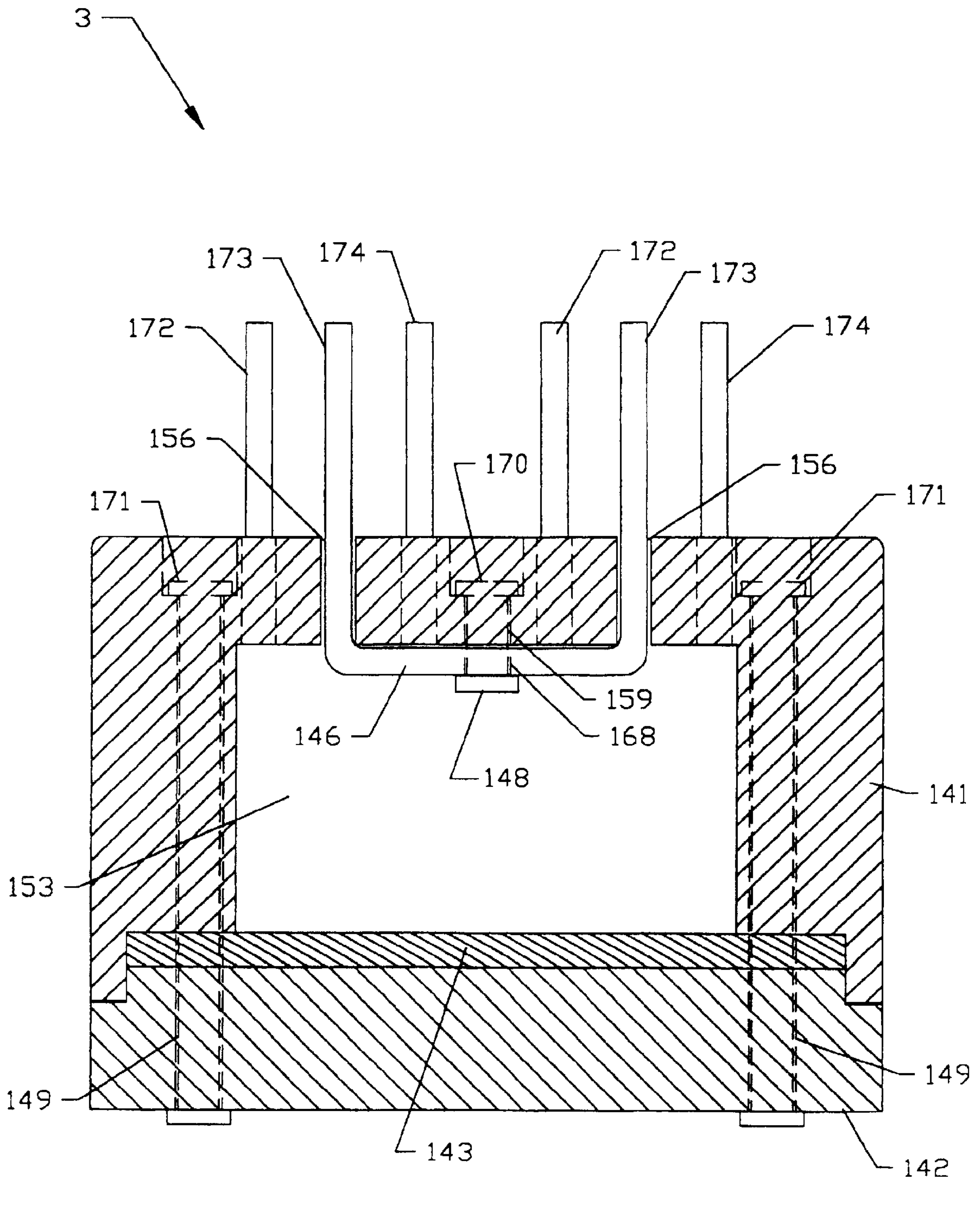
FIG. 17 is a horizontal section view taken along line 17—17 of FIG. 14.
Figure 18:
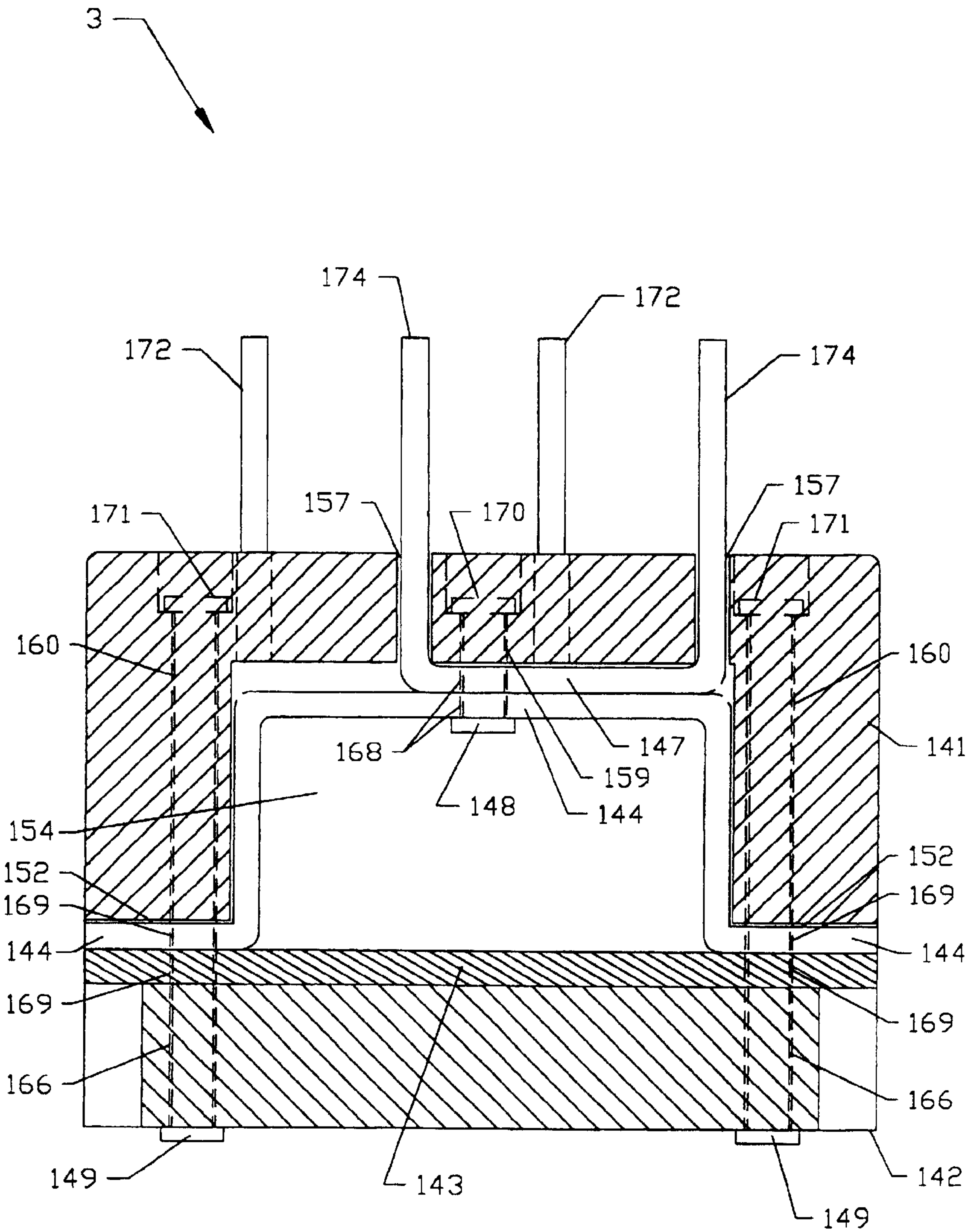
FIG. 18 is a horizontal section view taken along line 18—18 of FIG. 14.
Figure 19:
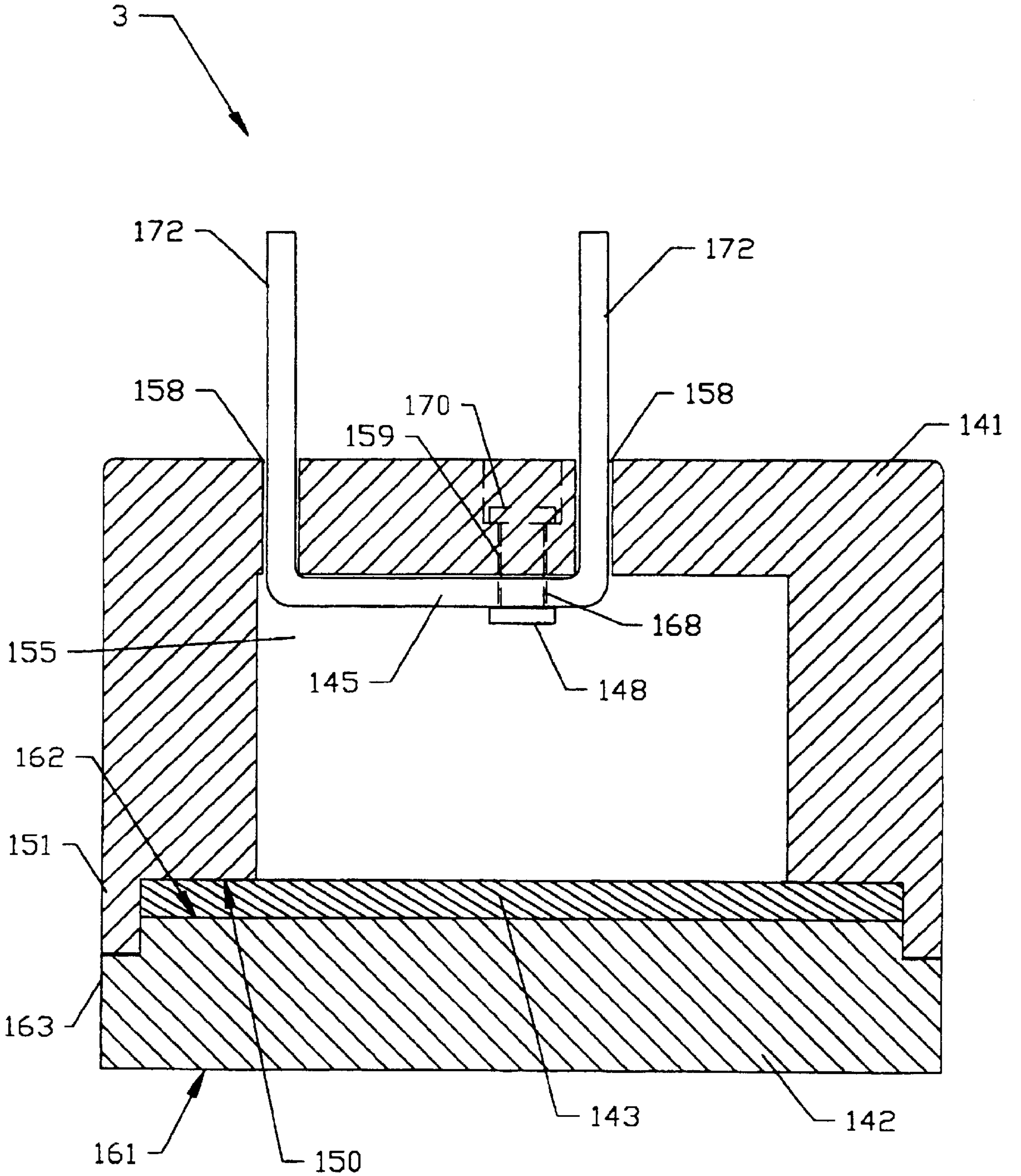
FIG. 19 is a horizontal section view taken along line 19—19 of FIG. 14.
Figure 20:
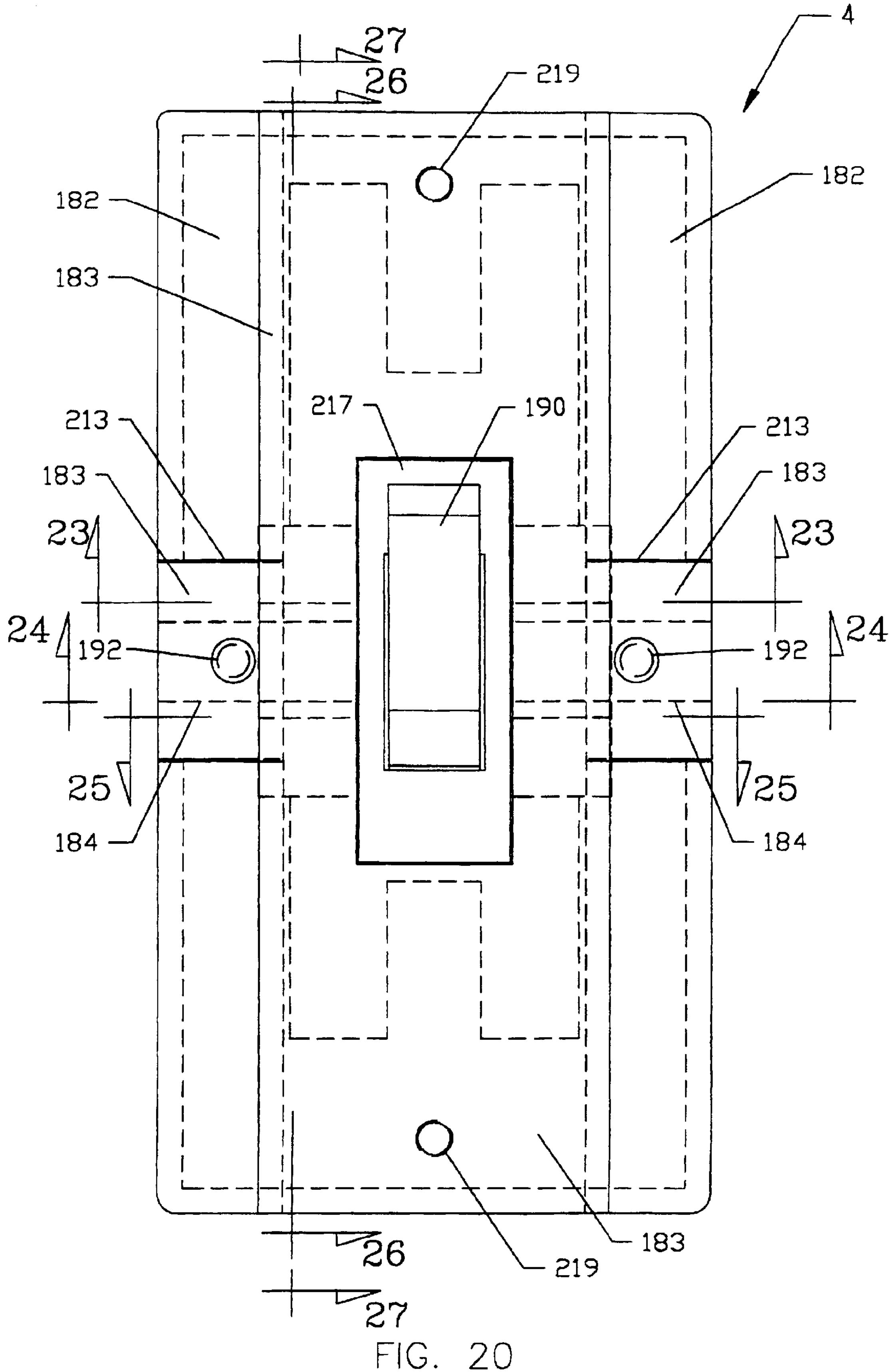
FIG. 20 is a front elevation view of the 2-way-switch module.
Figure 21:
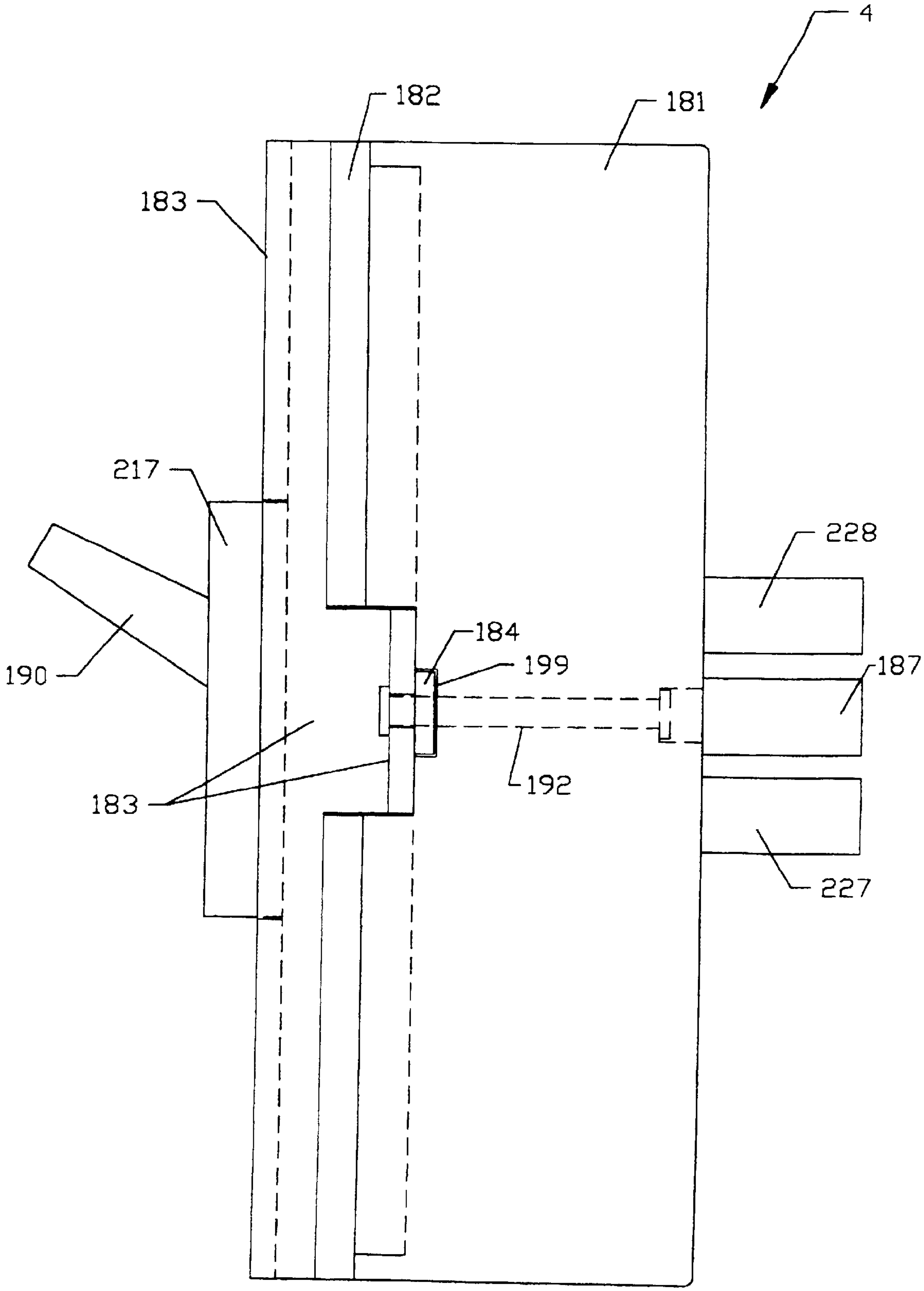
FIG. 21 is a side elevation view of the 2-way-switch module.
Figure 22:
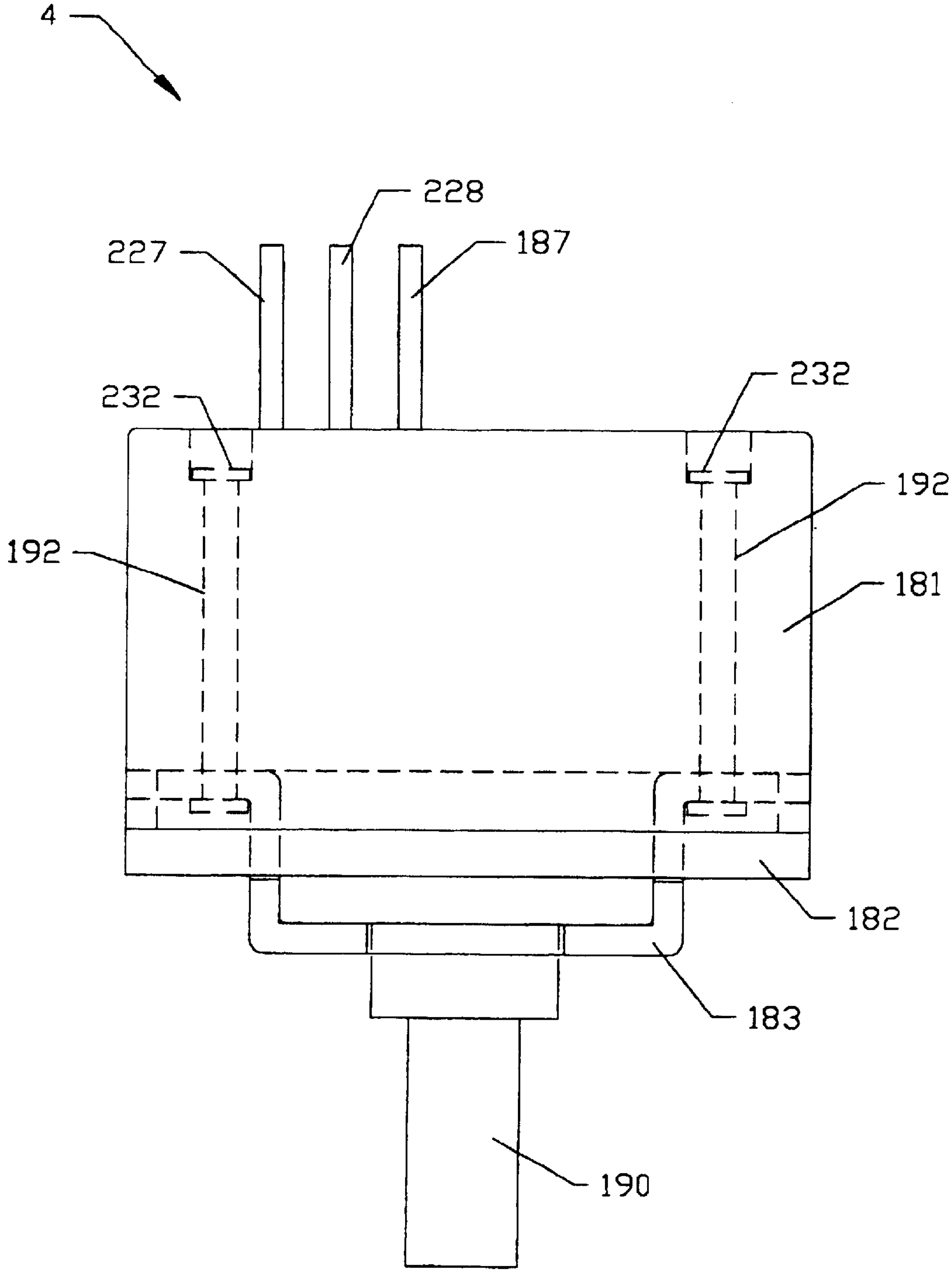
FIG. 22 is a plan view of the 2-way-switch module.
Figure 23:
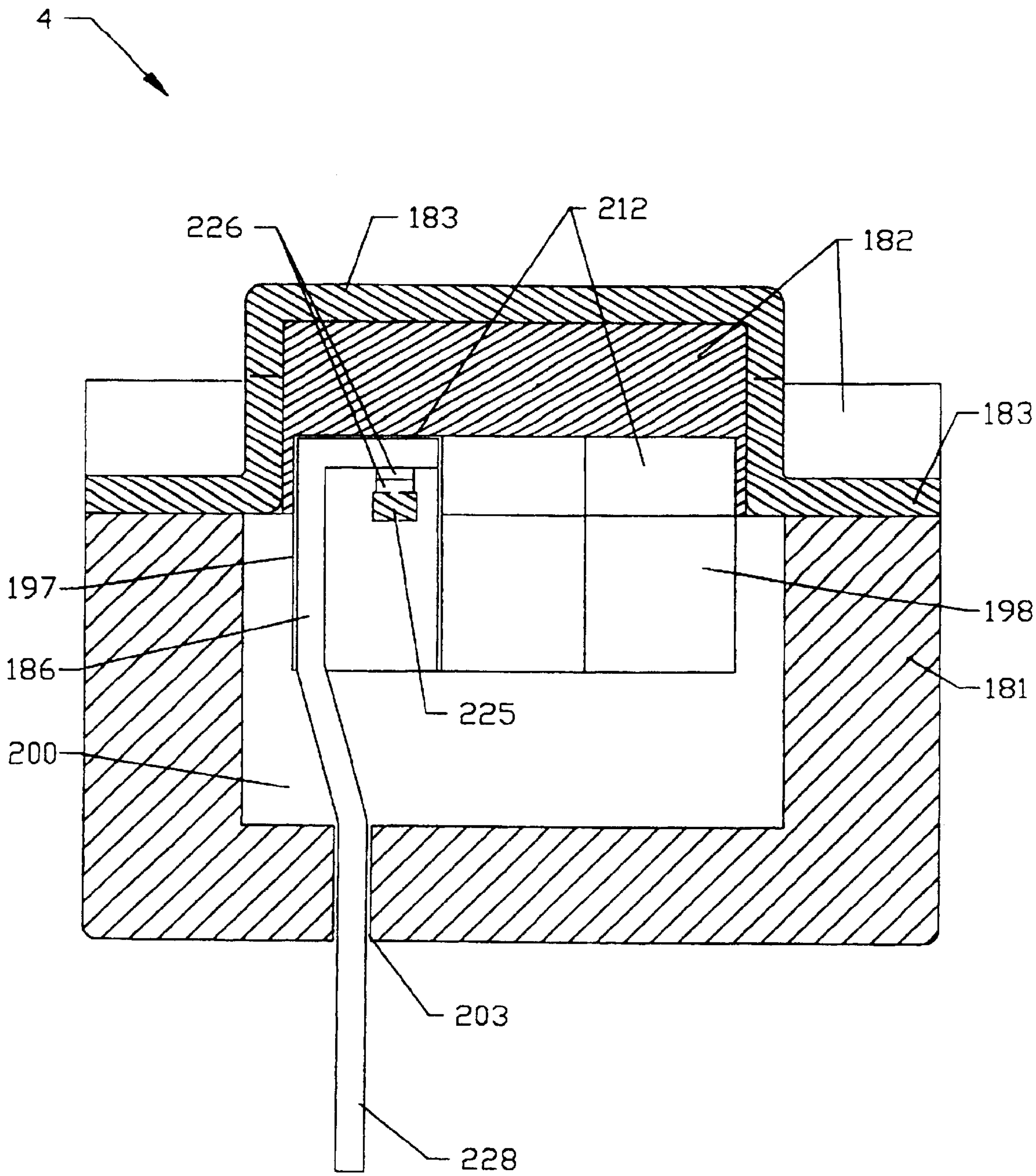
FIG. 23 is a horizontal section view taken along line 23—23 of FIG. 20.
Figure 24:
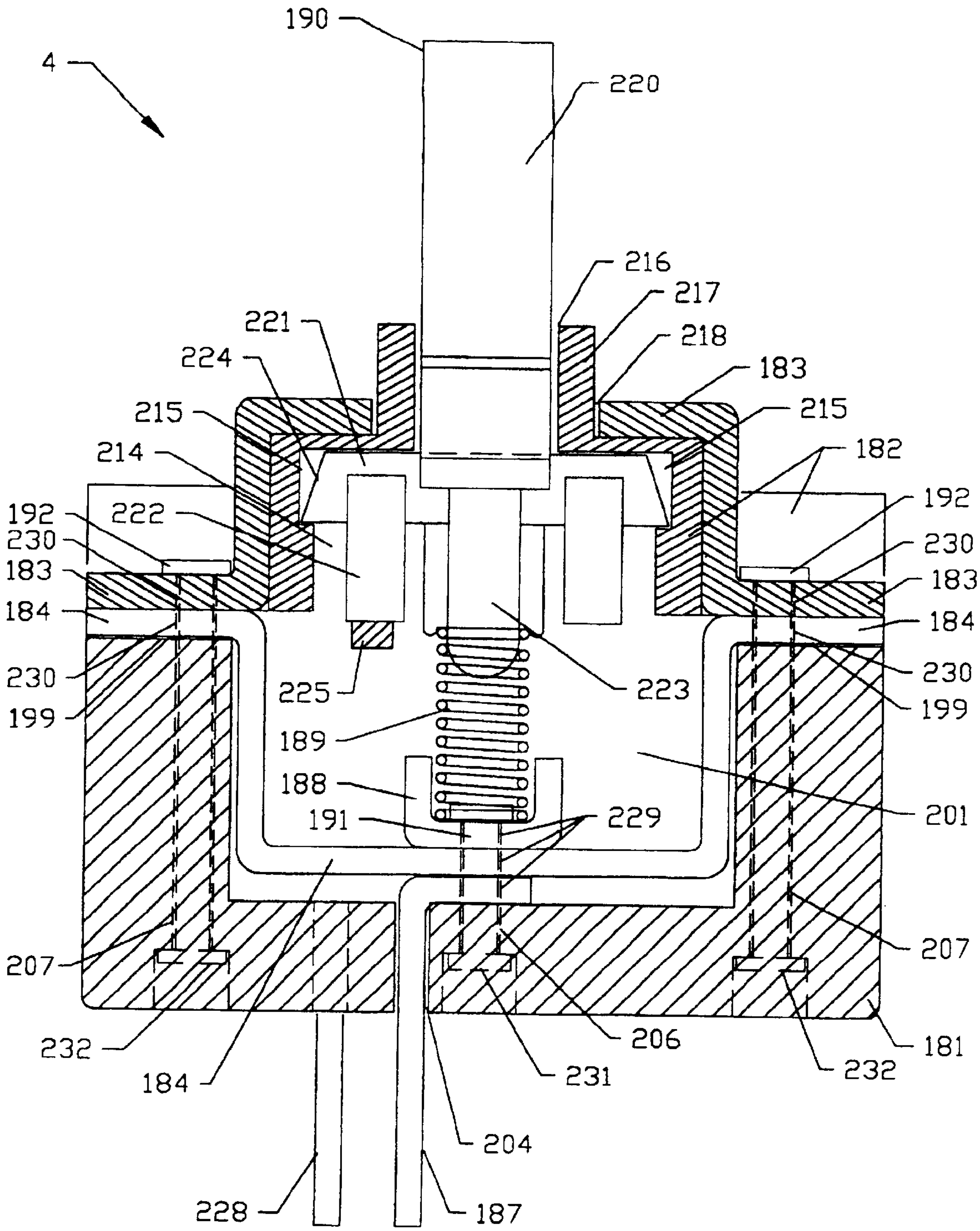
FIG. 24 is a horizontal section view taken along line 24—24 of FIG. 20.
Figure 25:
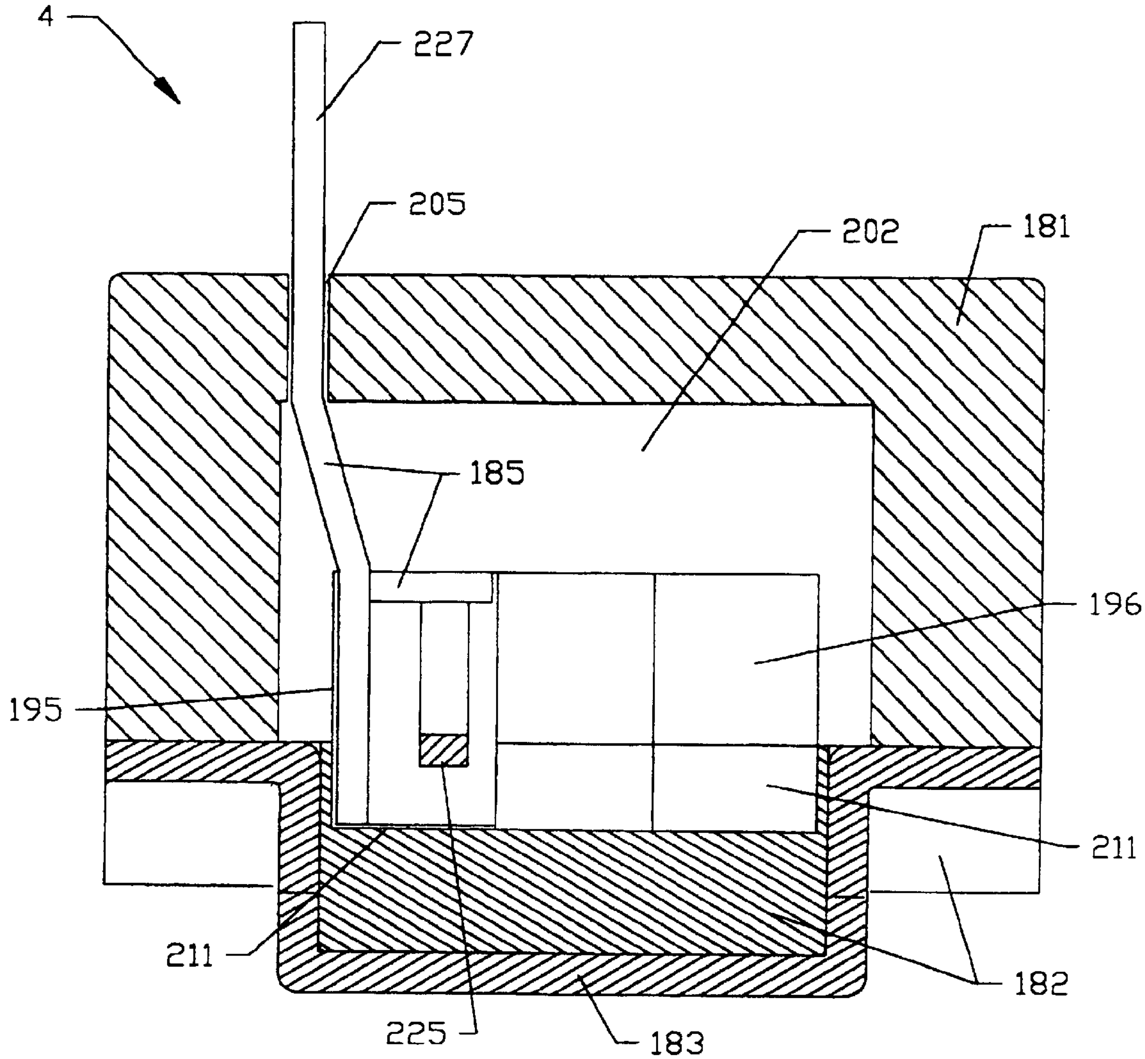
FIG. 25 is a horizontal section view taken along line 25—25 of FIG. 20.
Figure 26:
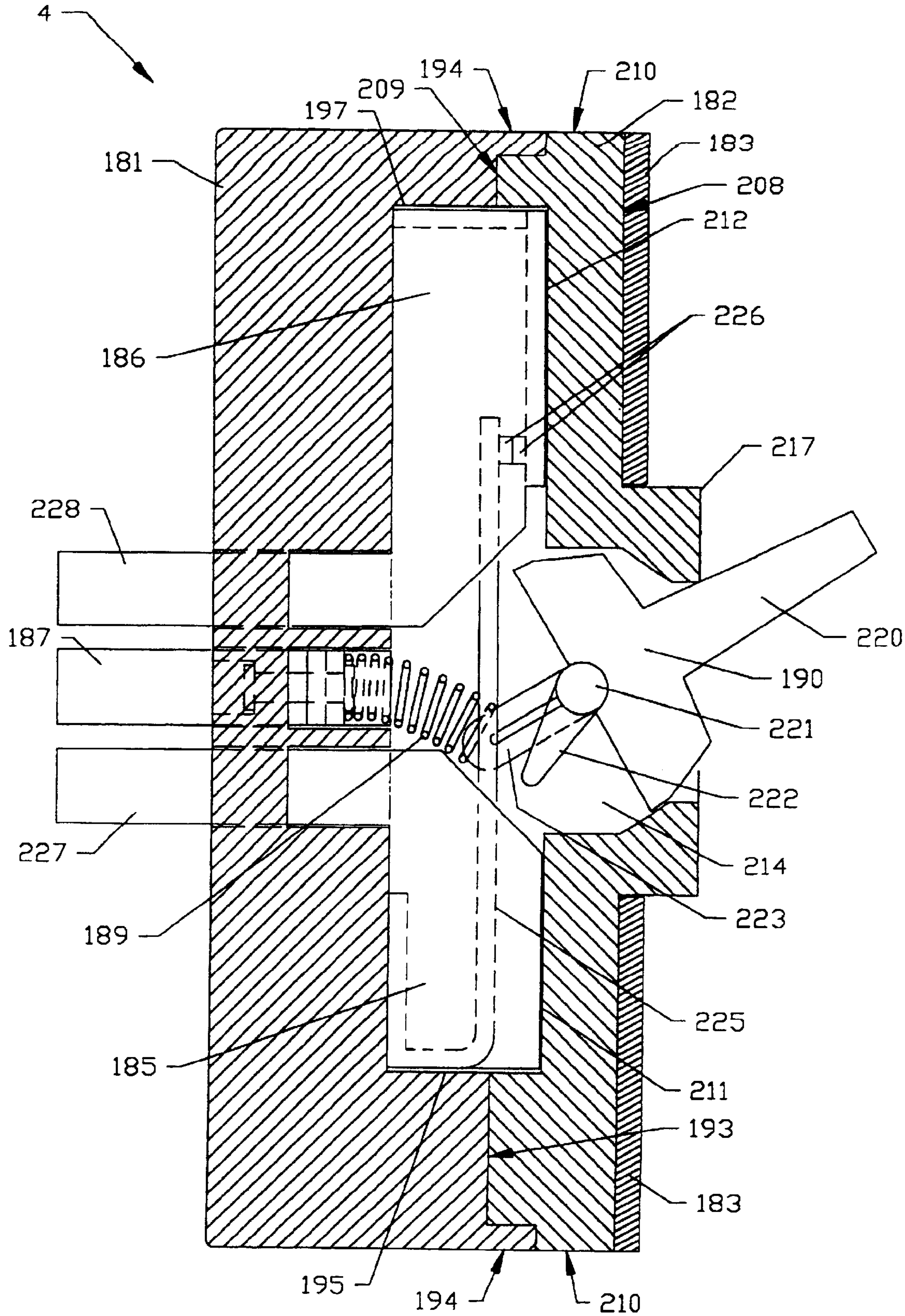
FIG. 26 is a vertical section view taken along line 26—26 of FIG. 20 with the lever in the up position.
Figure 27:
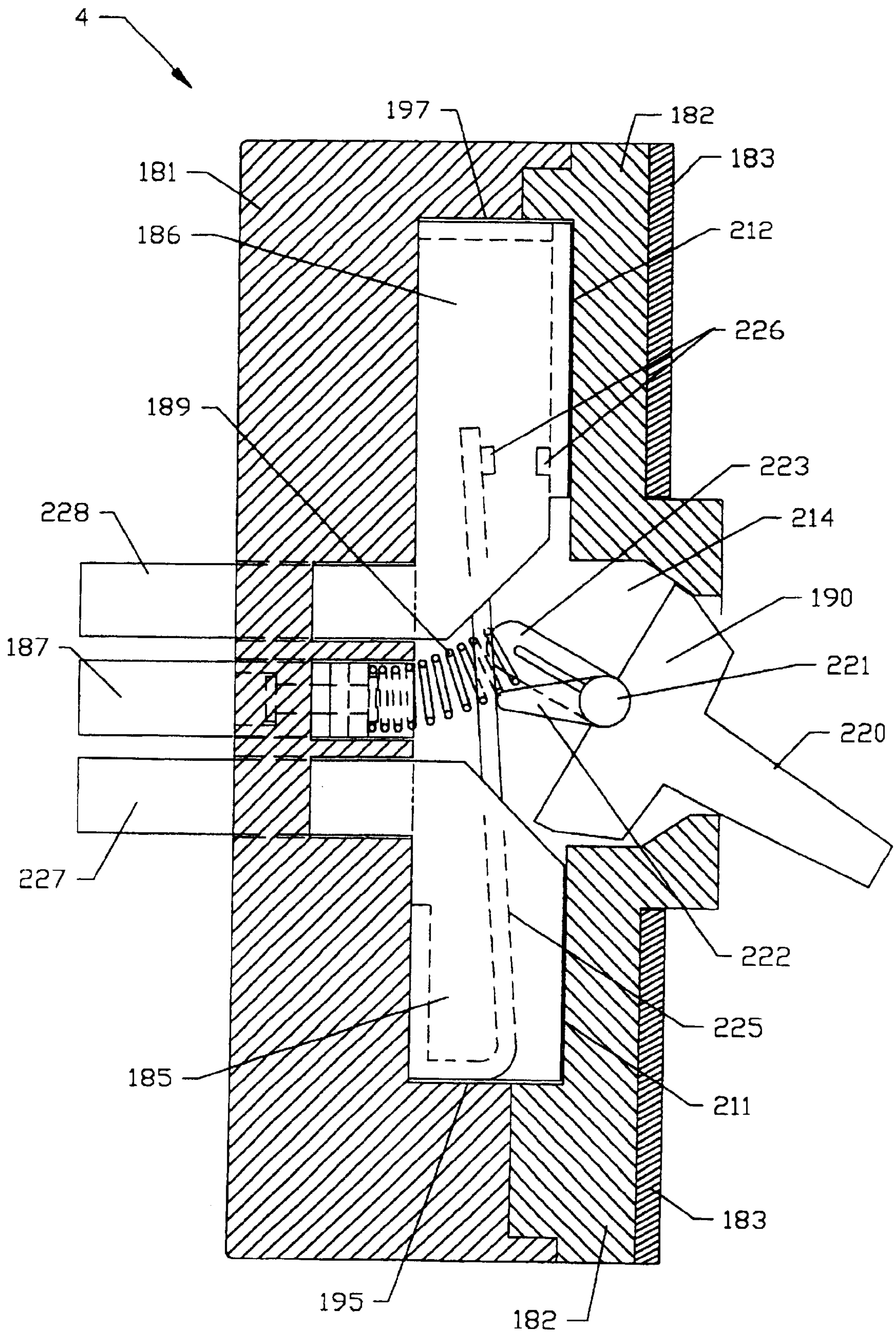
FIG. 27 is a vertical section view taken along line 27—27 of FIG. 20 with the lever in the down position.
Figure 28:
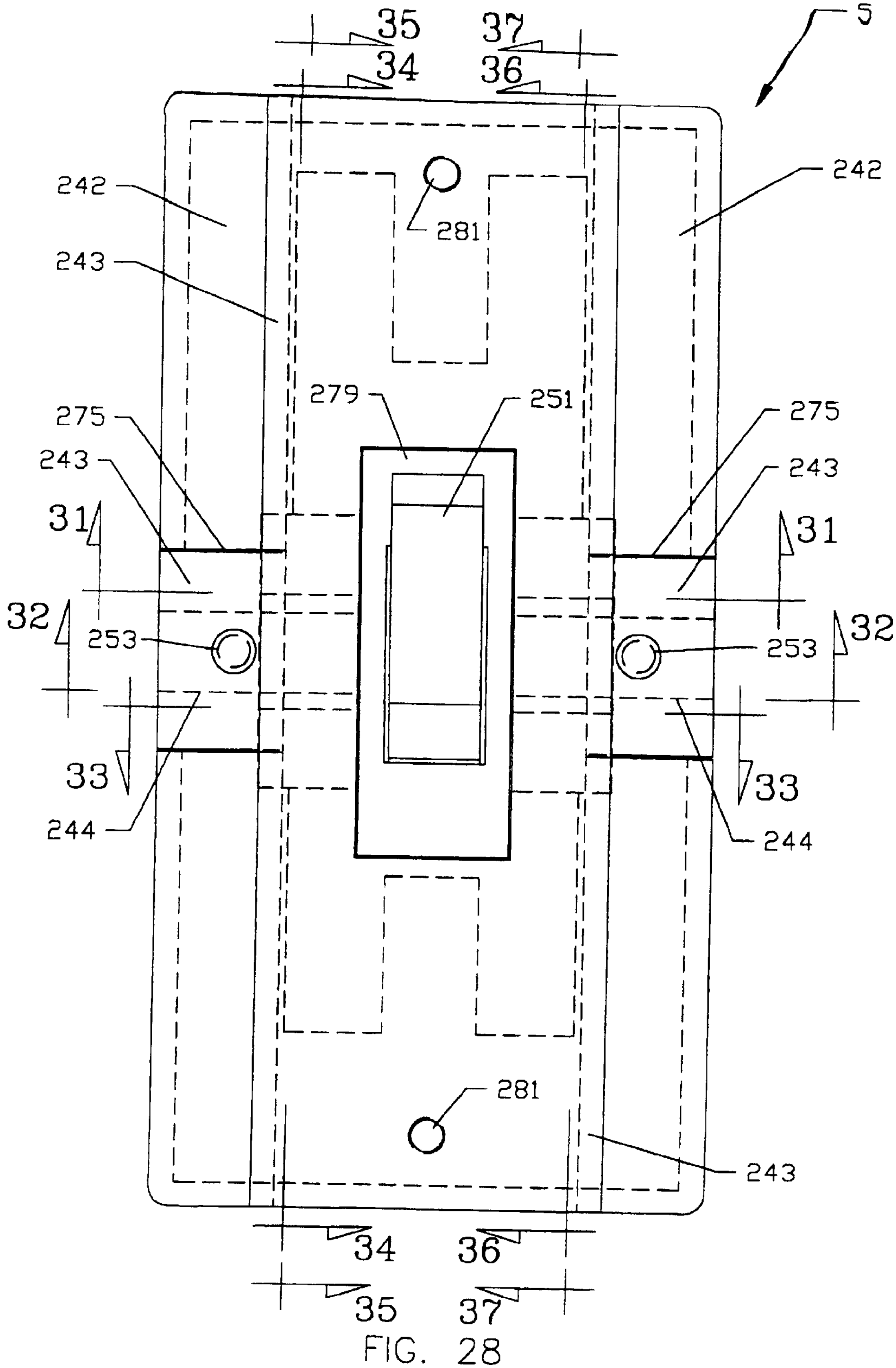
FIG. 28 is a front elevation view of the 3-way-switch module.
Figure 29:
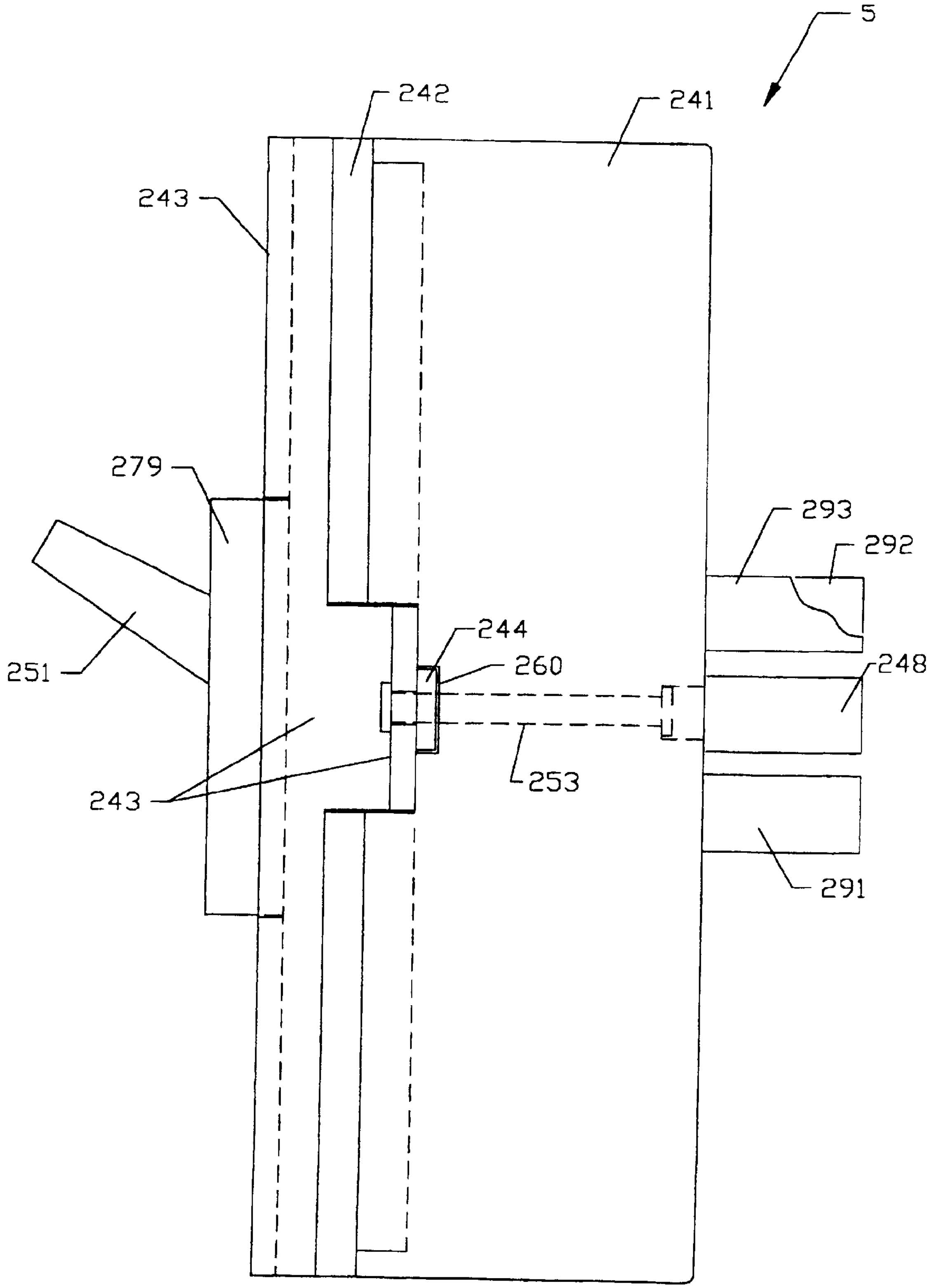
FIG. 29 is a side elevation view of the 3-way-switch module.
Figure 30:
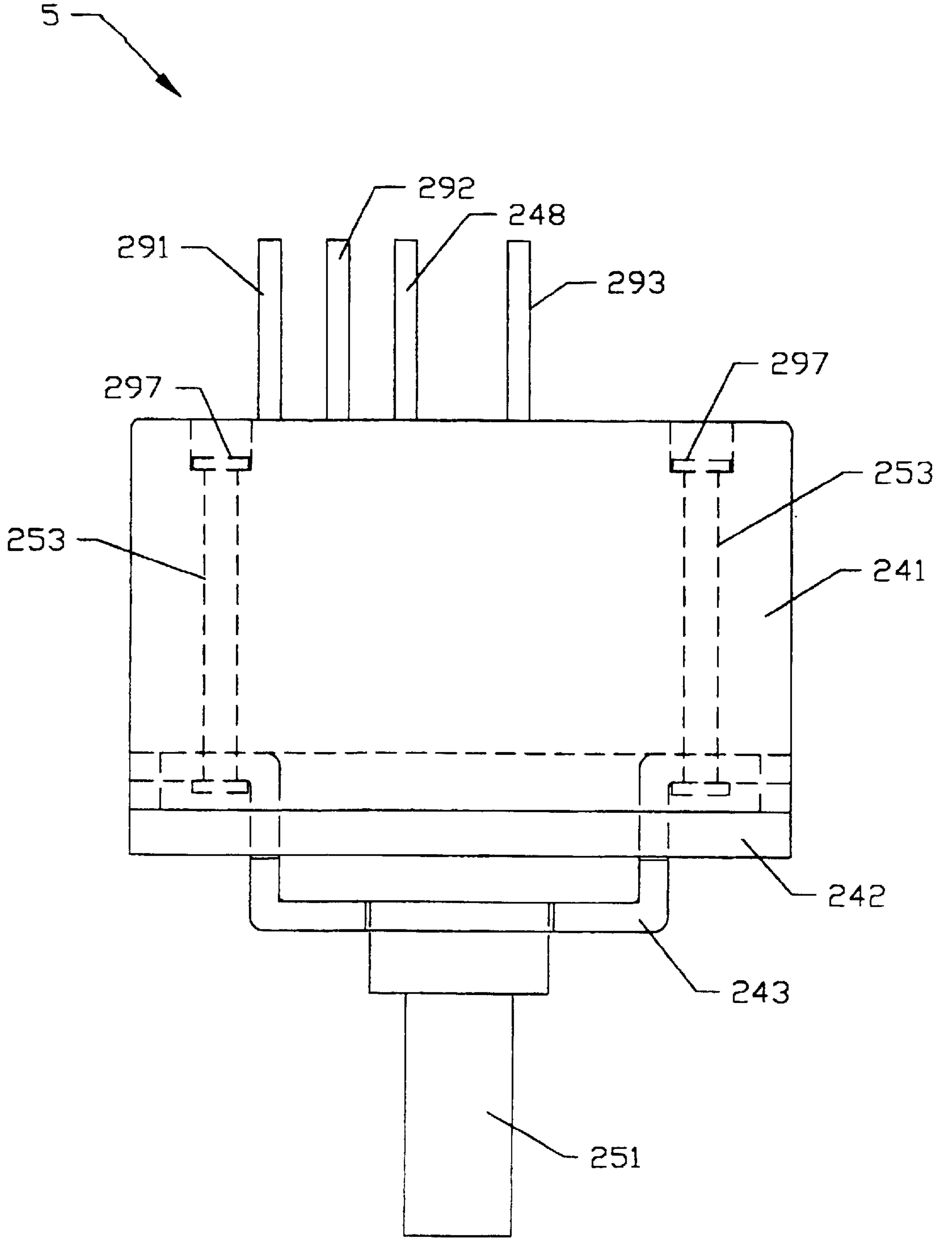
FIG. 30 is a plan view of the 3-way-switch module.
Figure 31:
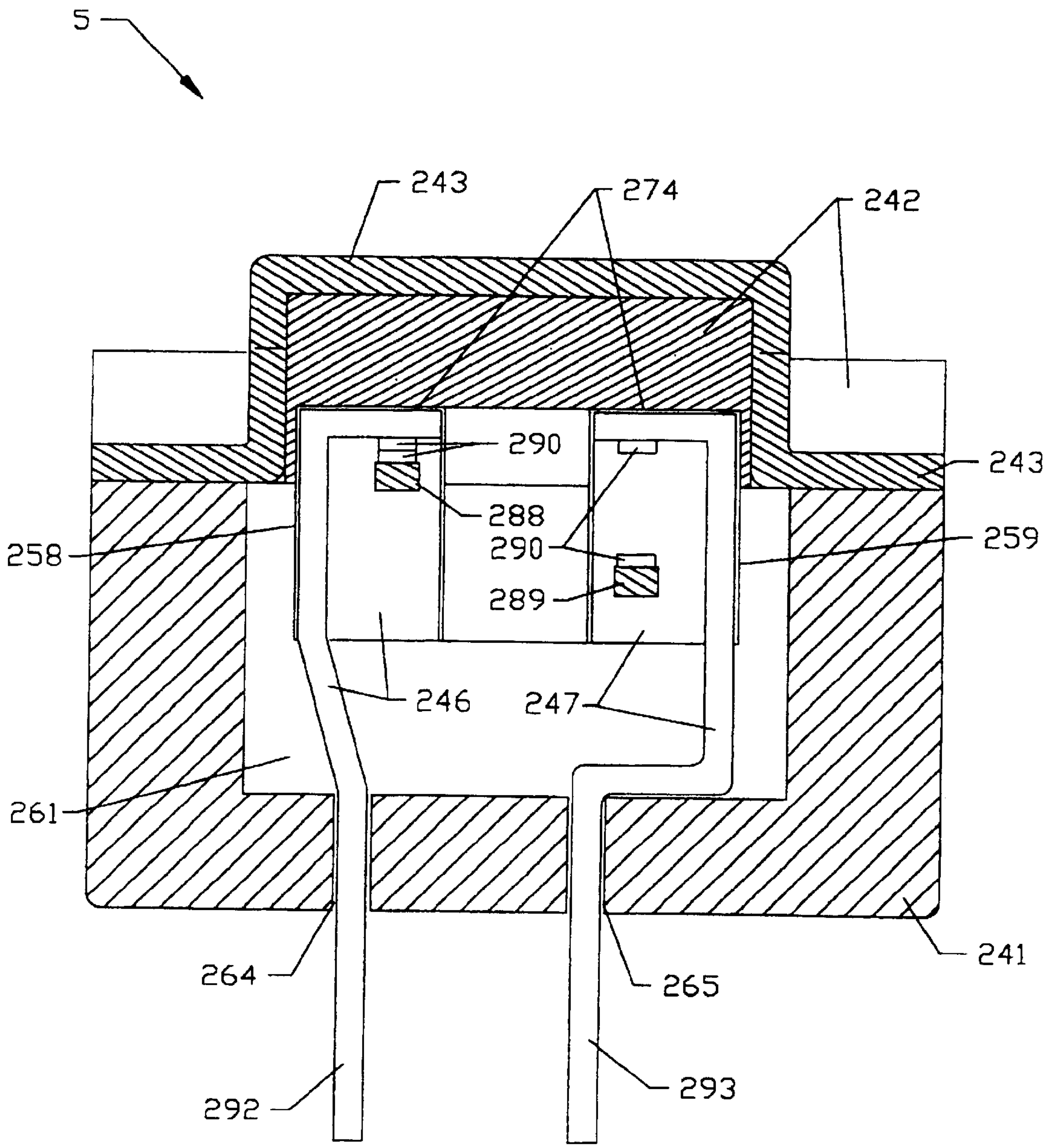
FIG. 31 is a horizontal section view taken along line 31—31 of FIG. 28.
Figure 32:
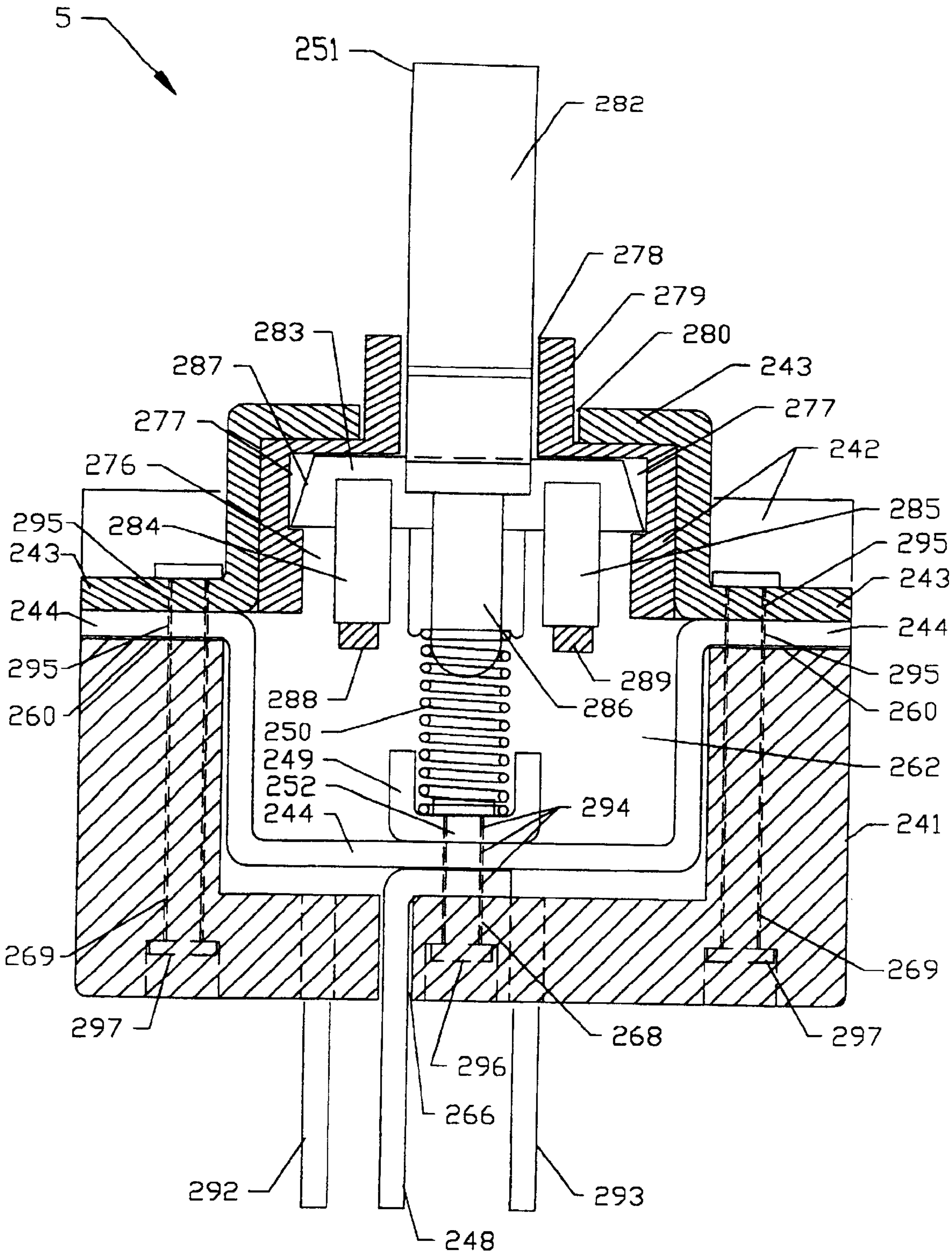
FIG. 32 is a horizontal section view taken along line 32—32 of FIG. 28.
Figure 33:
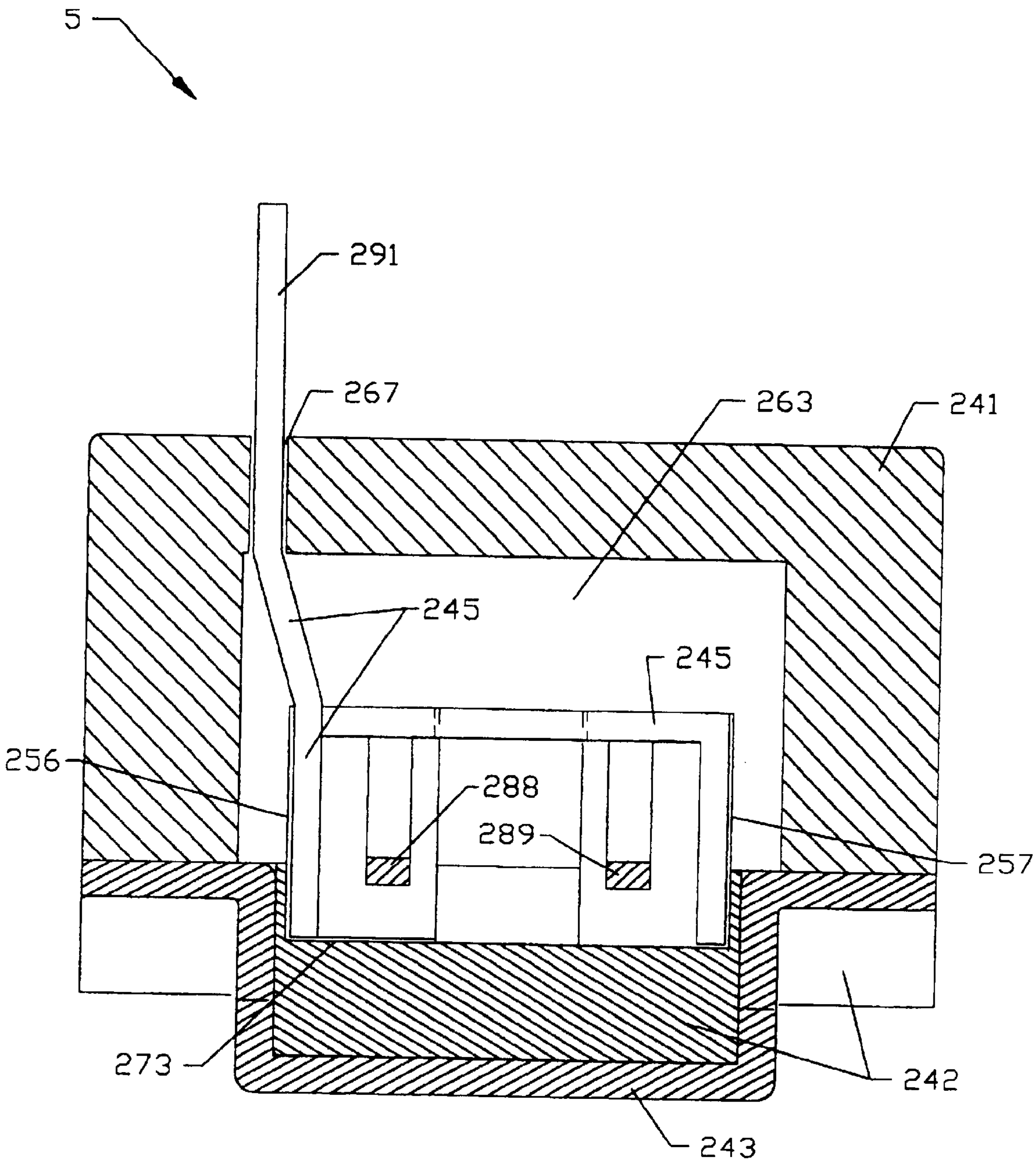
FIG. 33 is a horizontal section view taken along line 33—33 of FIG. 28.
Figure 34:
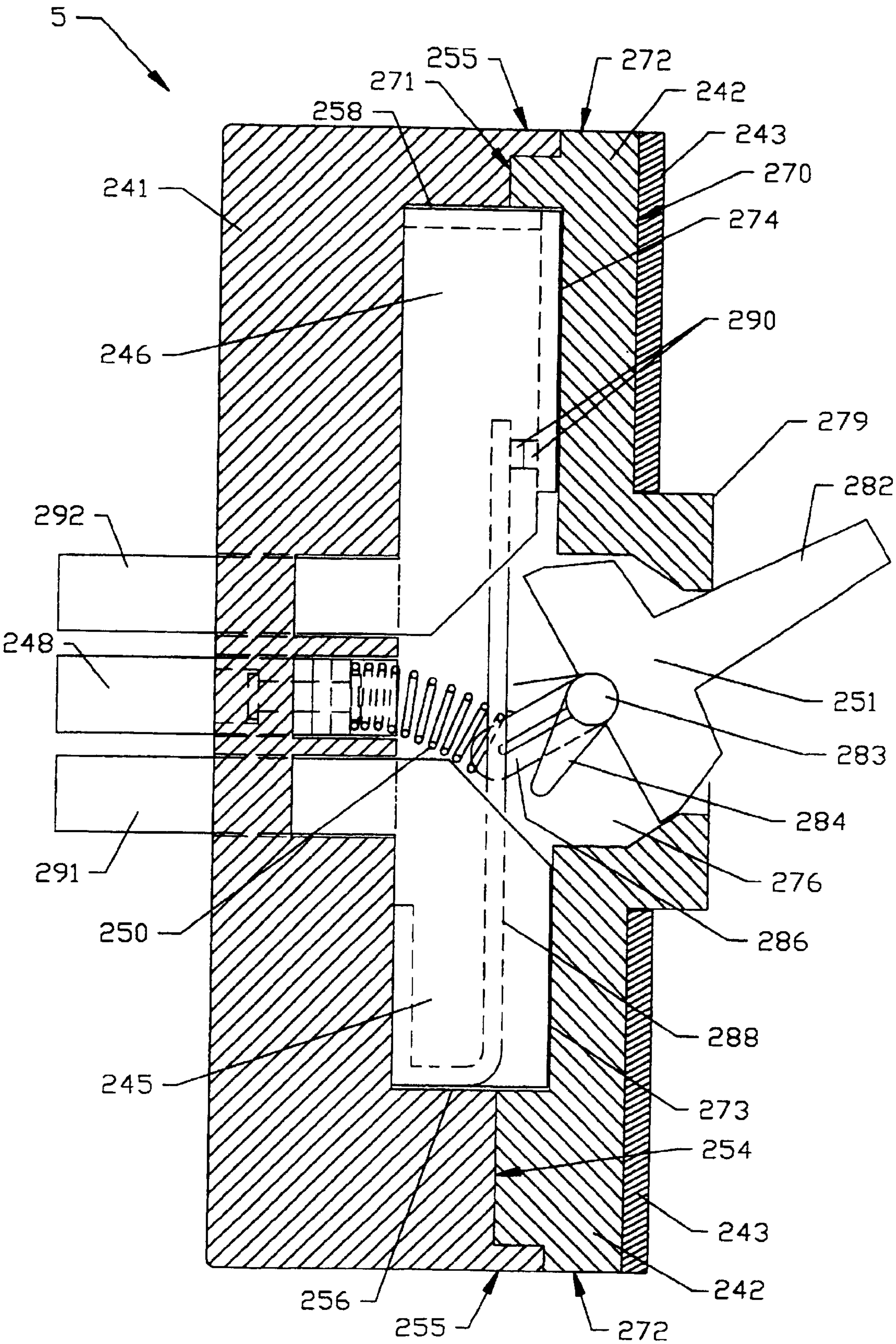
FIG. 34 is a vertical section view taken along line 34—34 of FIG. 28 with the lever in the up position.
Figure 35:
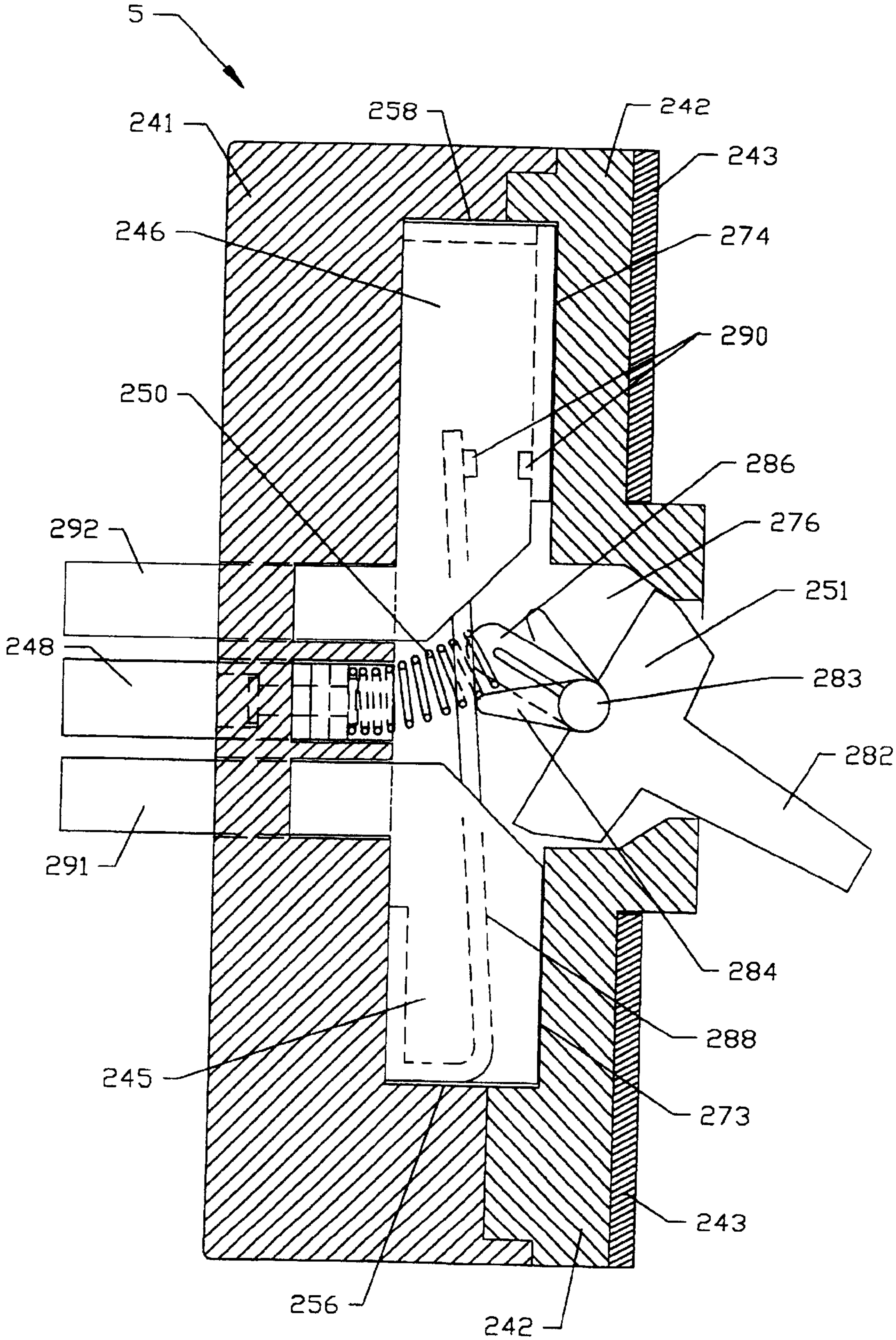
FIG. 35 is a vertical section view taken along line 35—35 of FIG. 28 with the lever in the down position.
Figure 36:
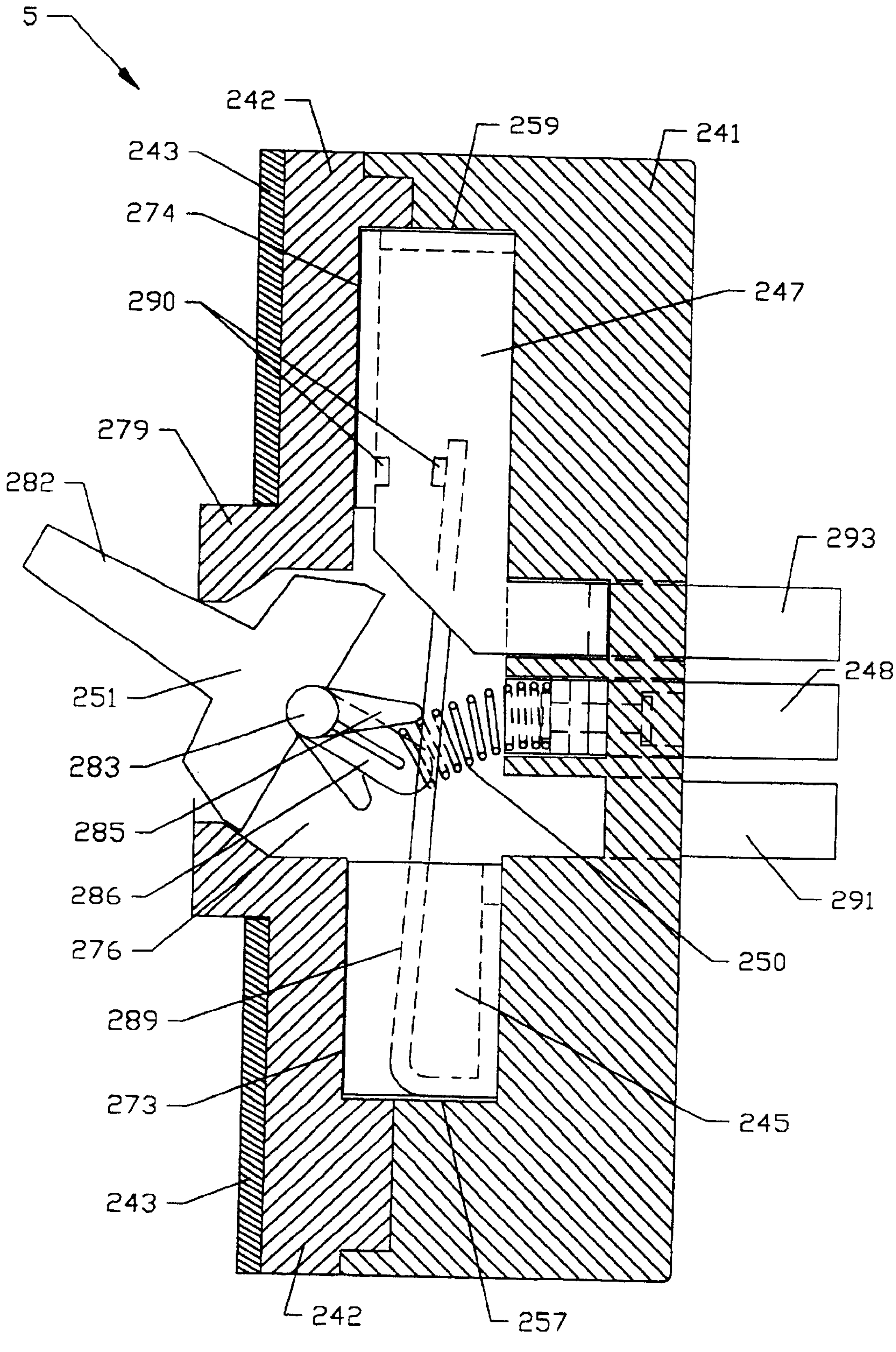
FIG. 36 is a vertical section view taken along line 36—36 of FIG. 28 with the lever in the up position.
Figure 37:
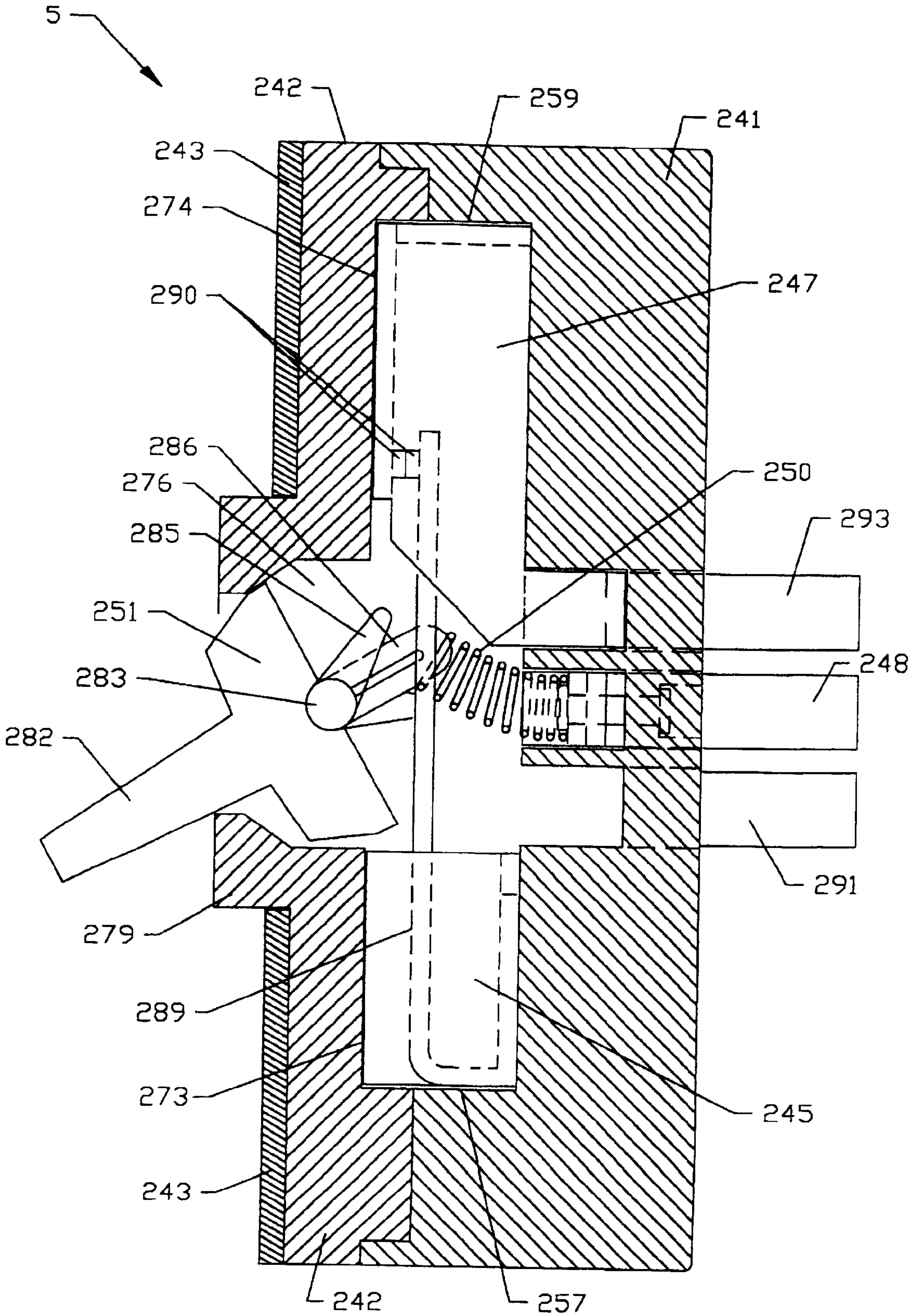
FIG. 37 is a vertical section view taken along line 37—37 of FIG. 28 with the lever in the down position.
Figure 38:
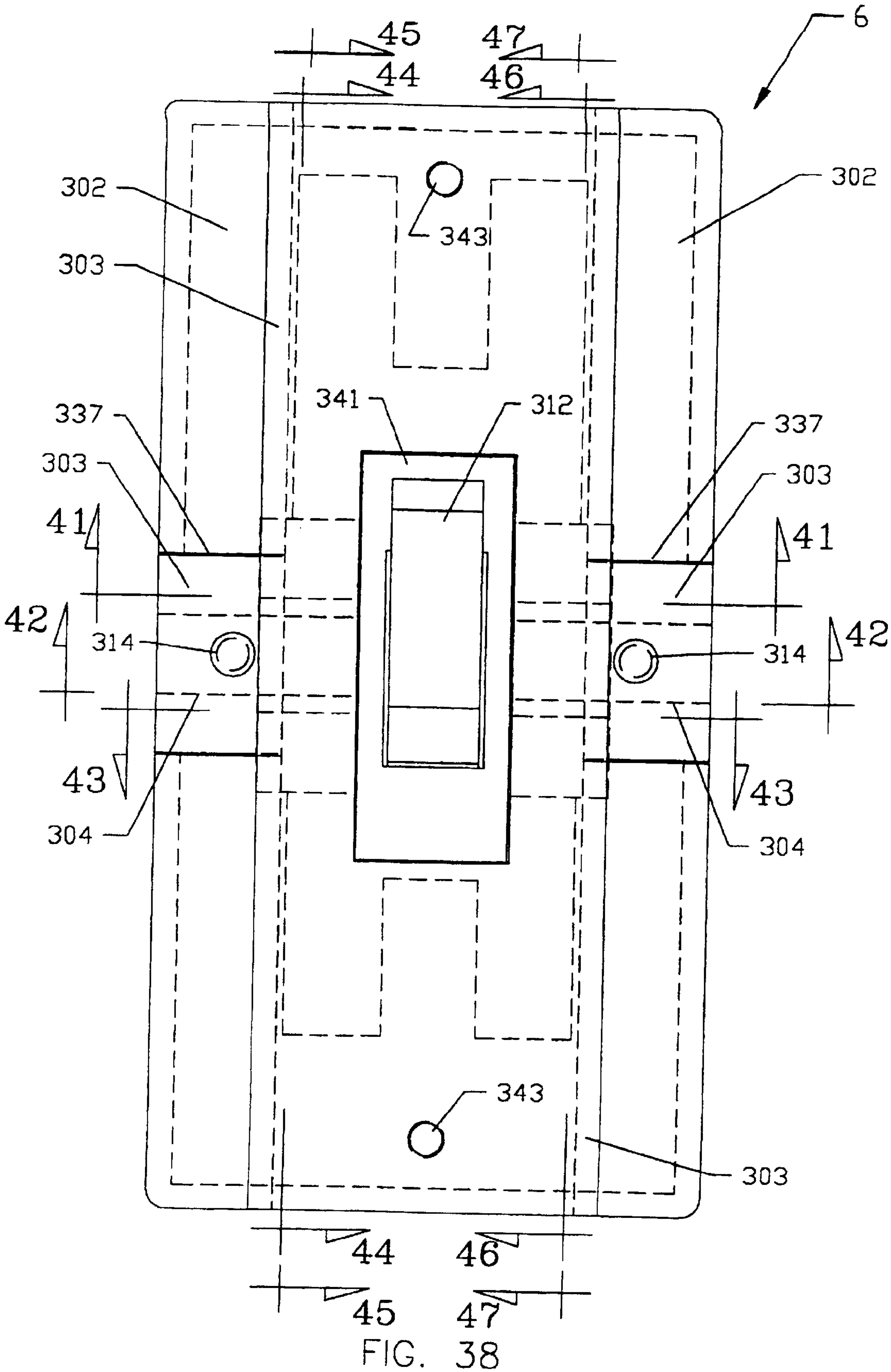
FIG. 38 is a front elevation view of the 4-way-switch module.
Figure 39:
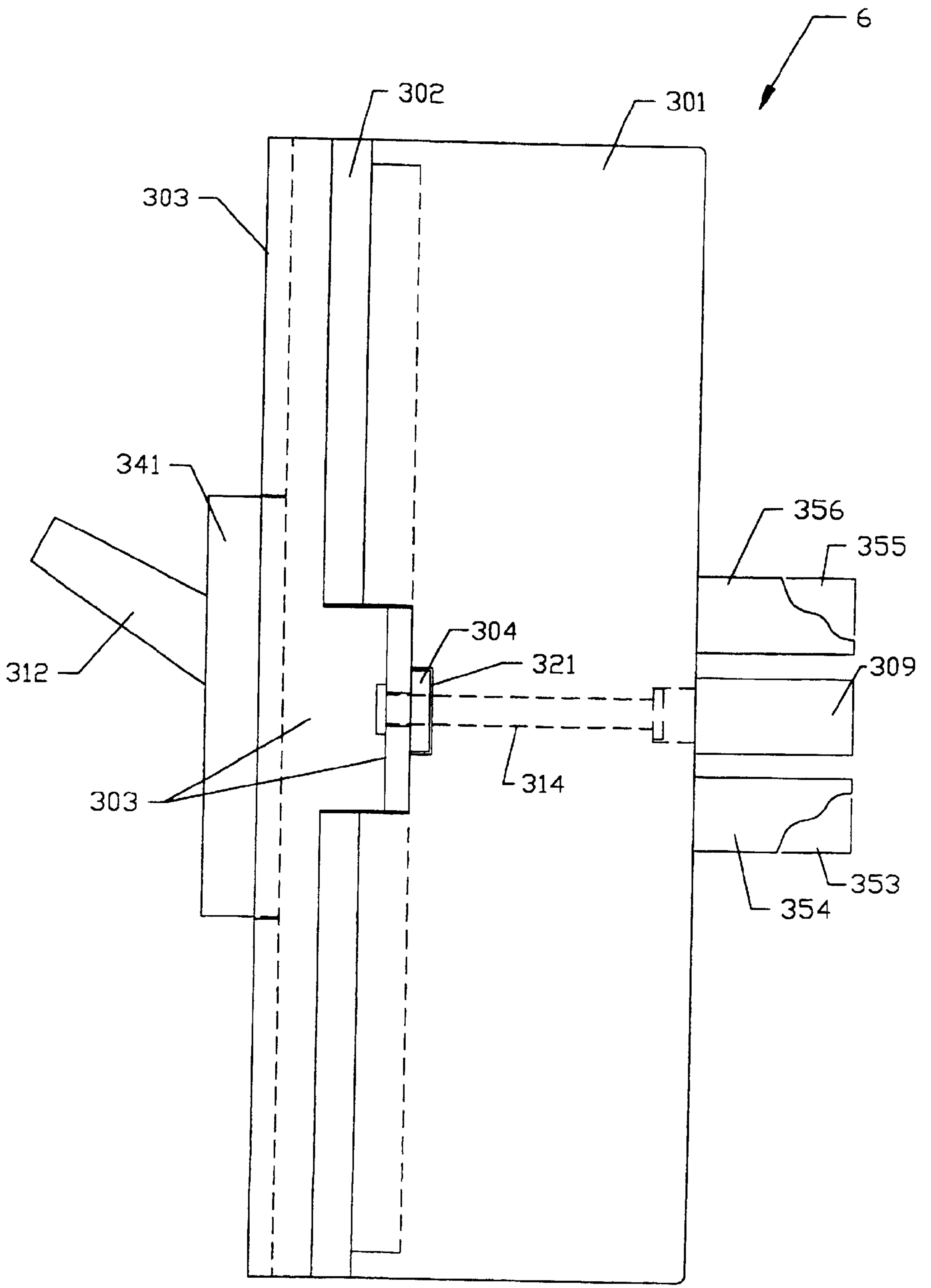
FIG. 39 is a side elevation view of the 4-way-switch module.
Figure 40:
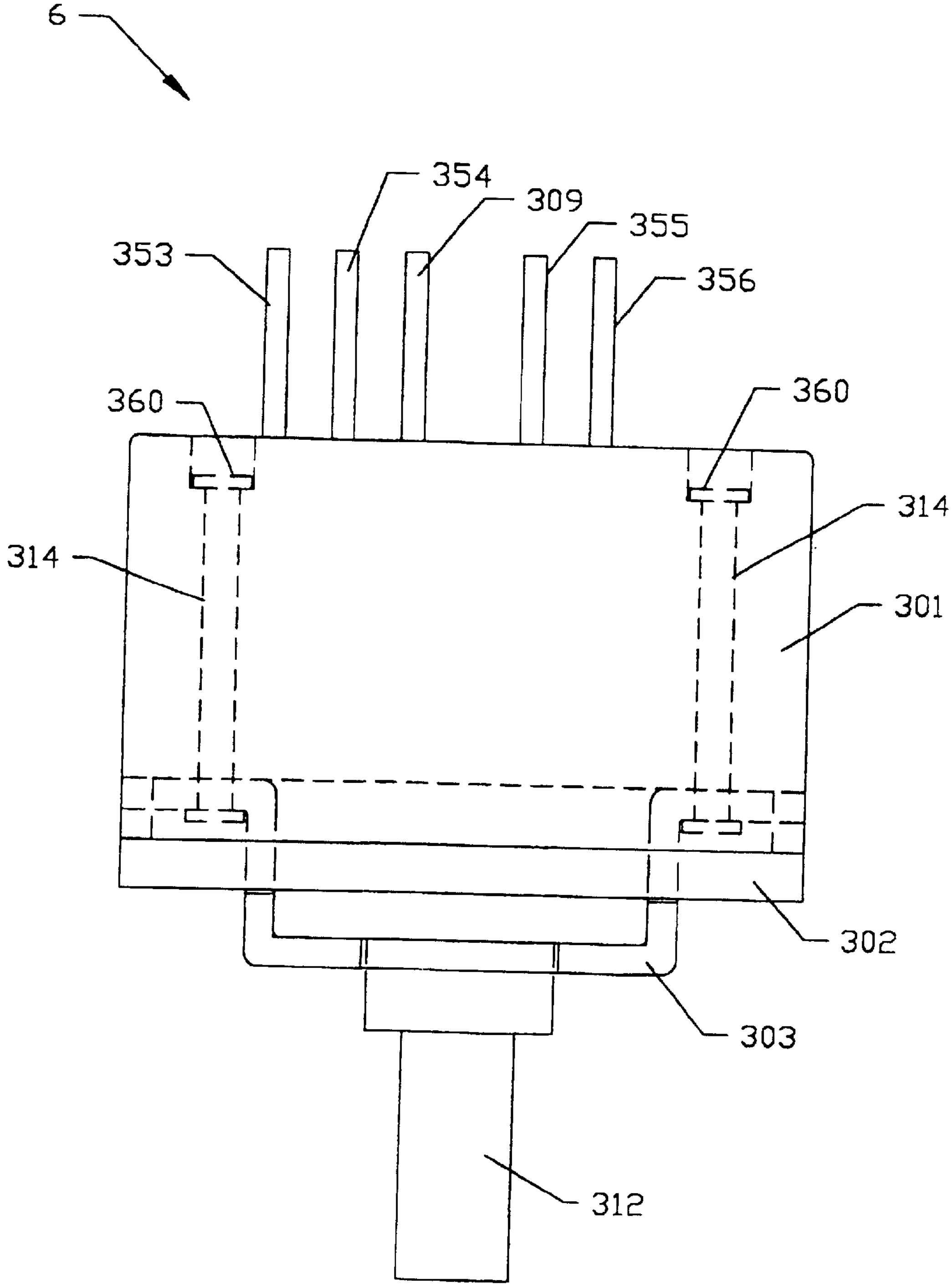
FIG. 40 is a plan view of the 4-way-switch module.
Figure 41:
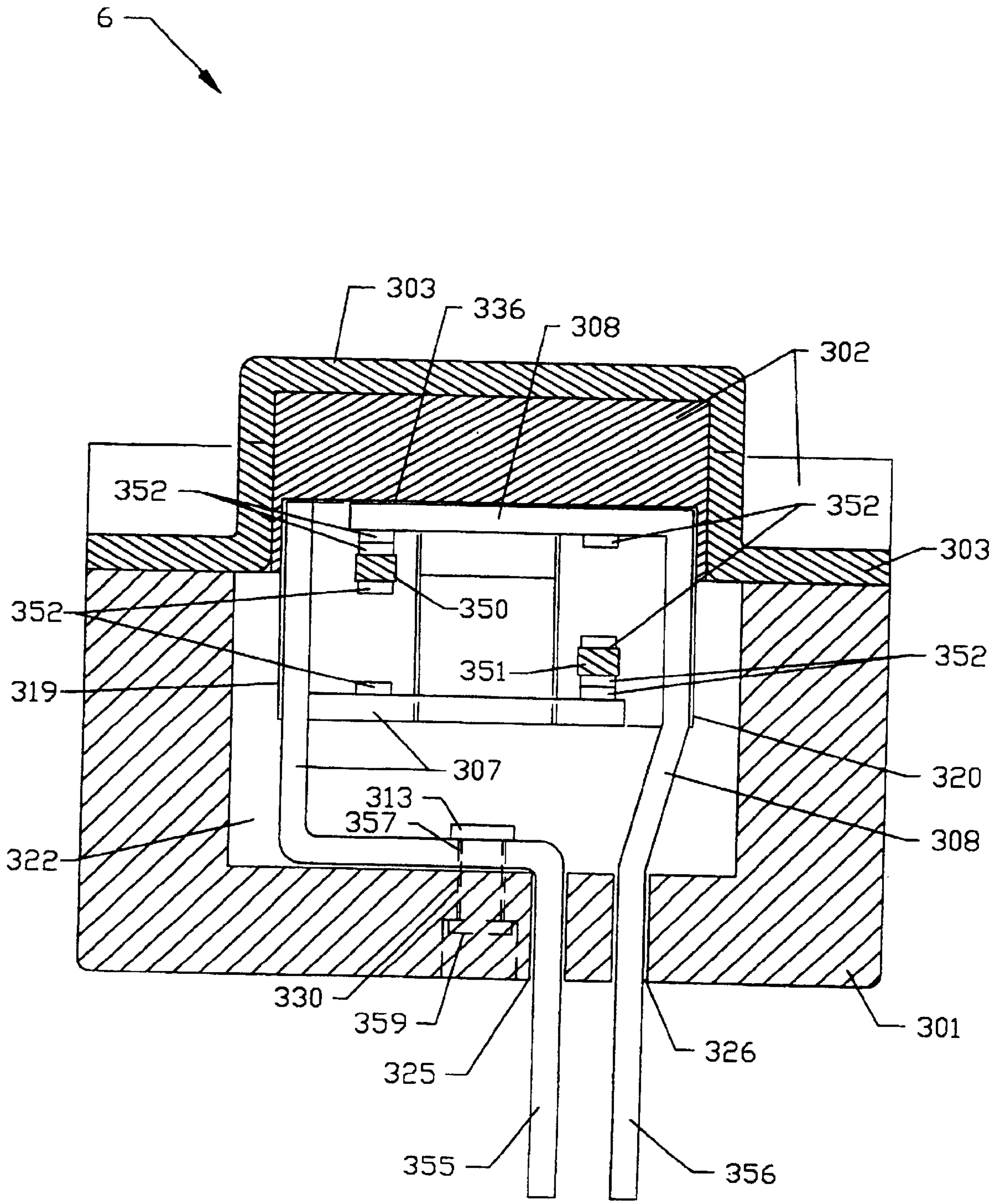
FIG. 41 is a horizontal section view taken along line 41—41 of FIG. 38.
Figure 42:
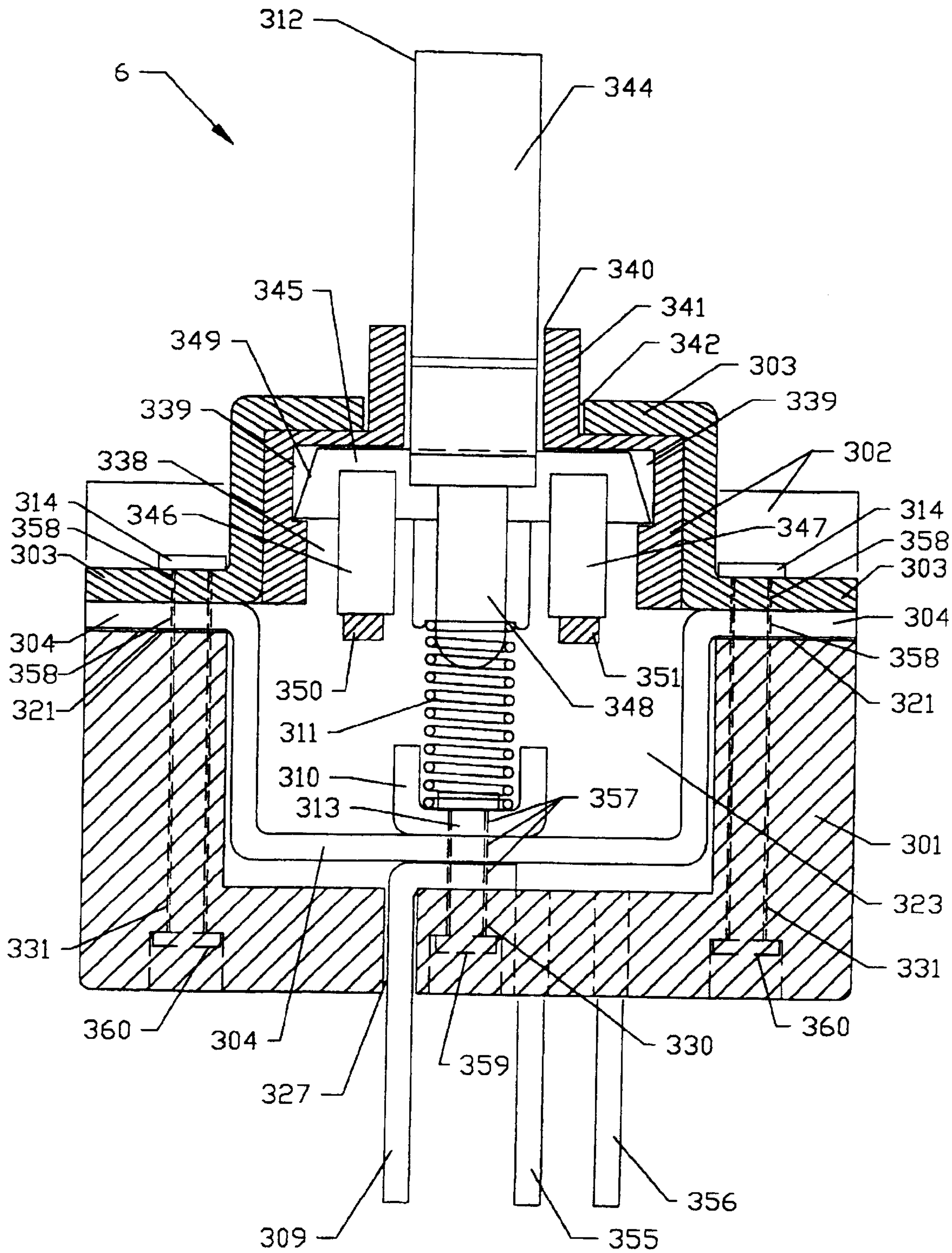
FIG. 42 is a horizontal section view taken along line 42—42 of FIG. 38.
Figure 43:
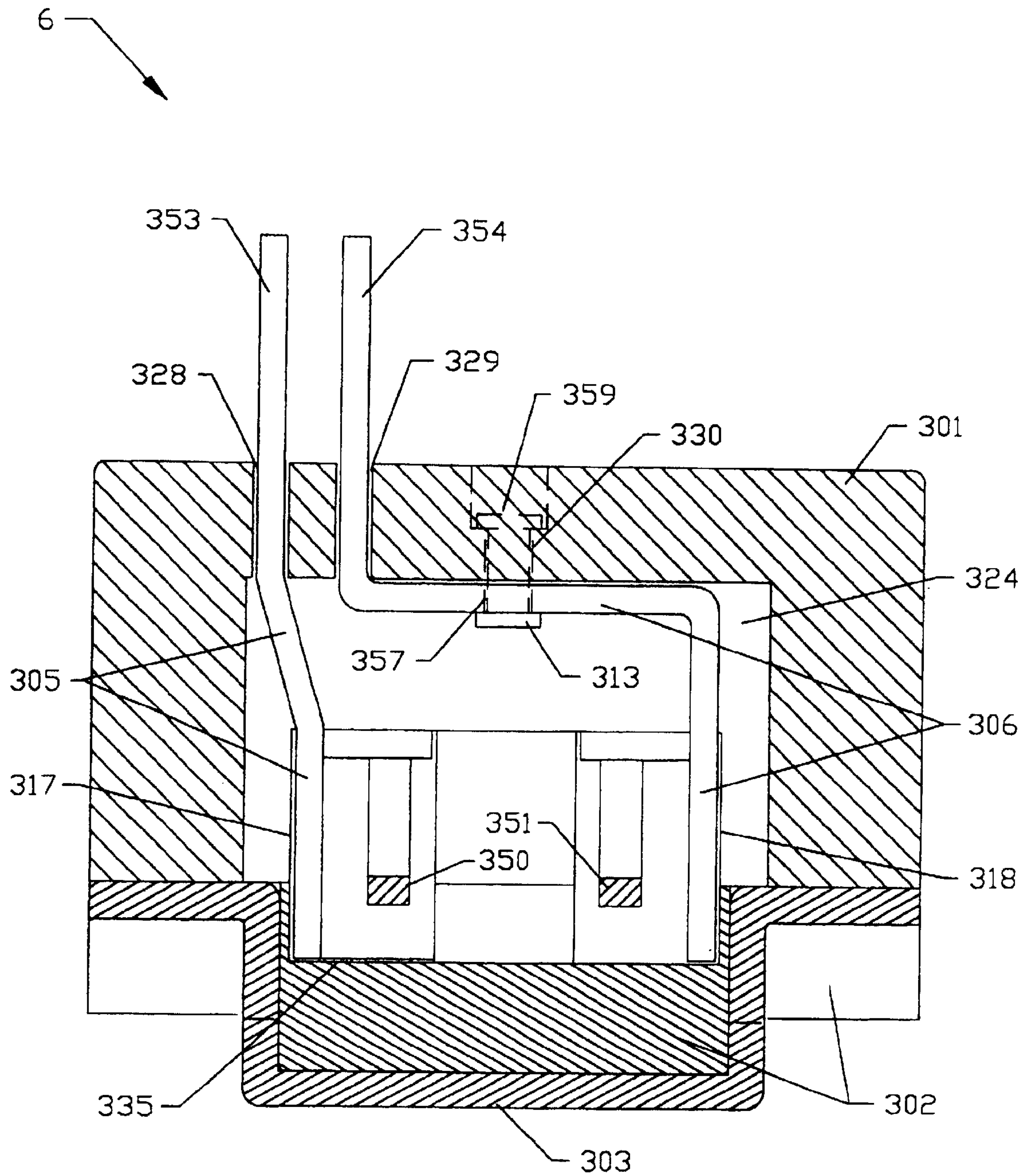
FIG. 43 is a horizontal section view taken along line 43—43 of FIG. 38.
Figure 44:
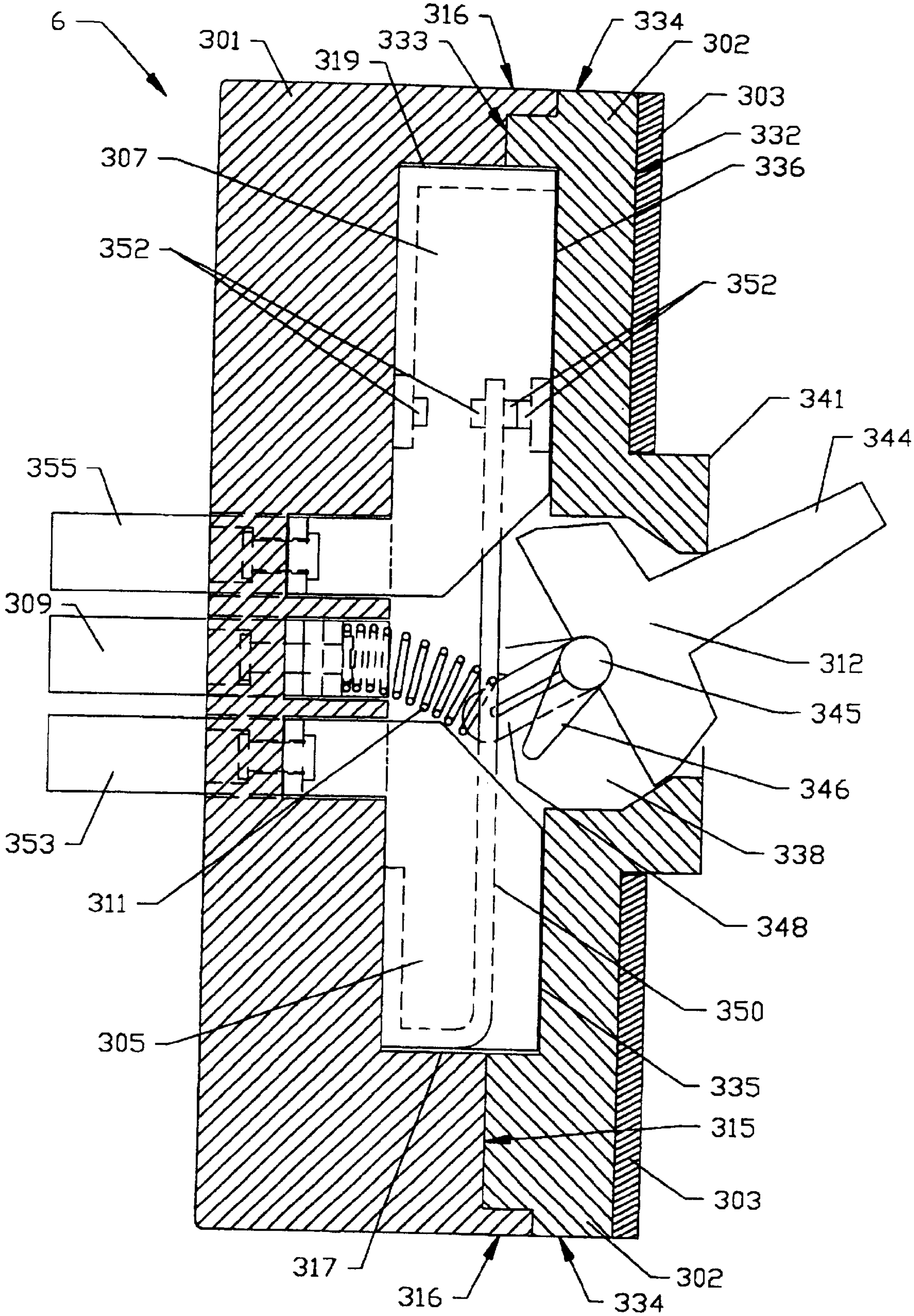
FIG. 44 is a vertical section view taken along line 44—44 of FIG. 38 with the lever in the up position.
Figure 45:
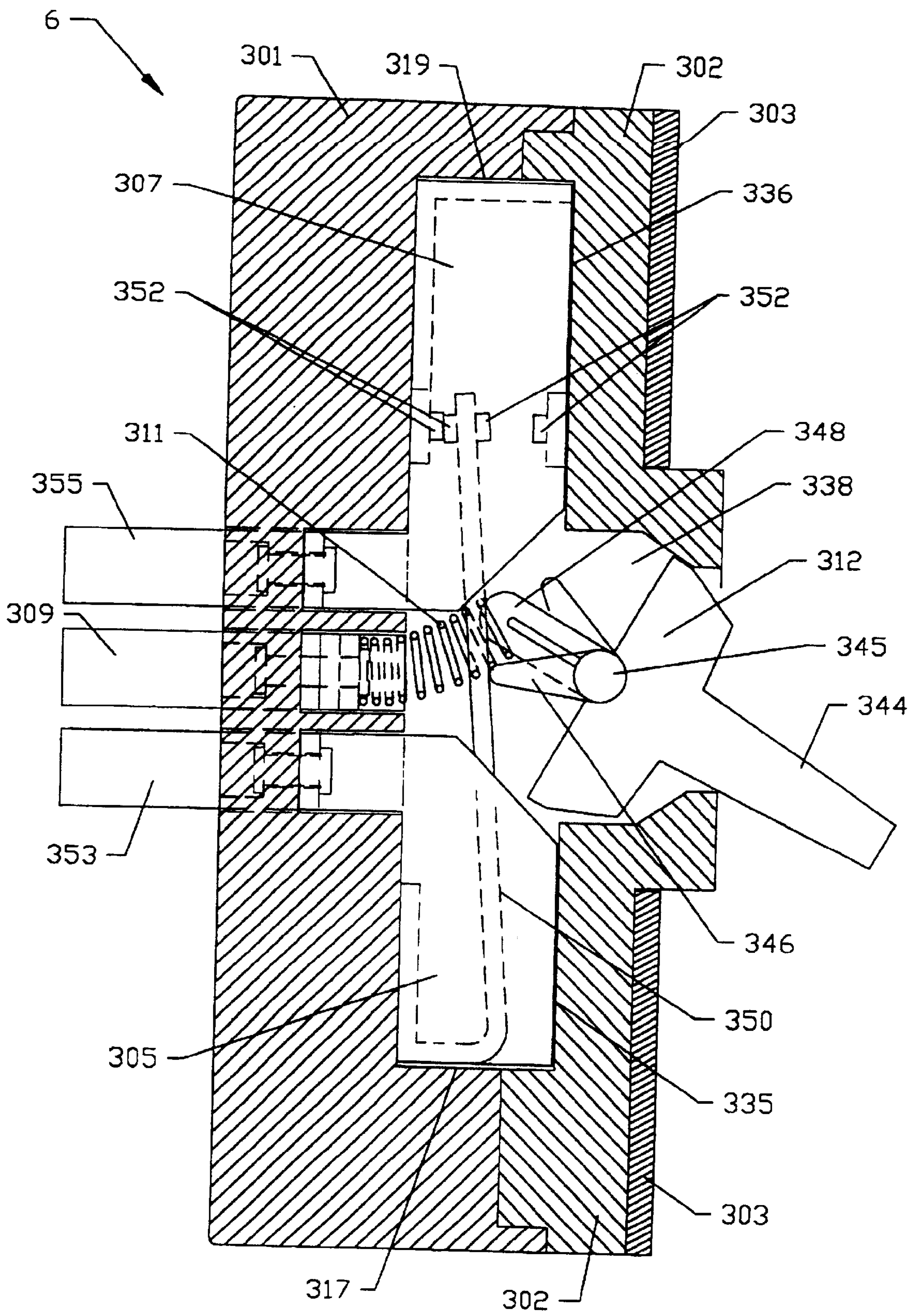
FIG. 45 is a vertical section view taken along line 45—45 of Fig, 38, with the lever in the down position.
Figure 46:
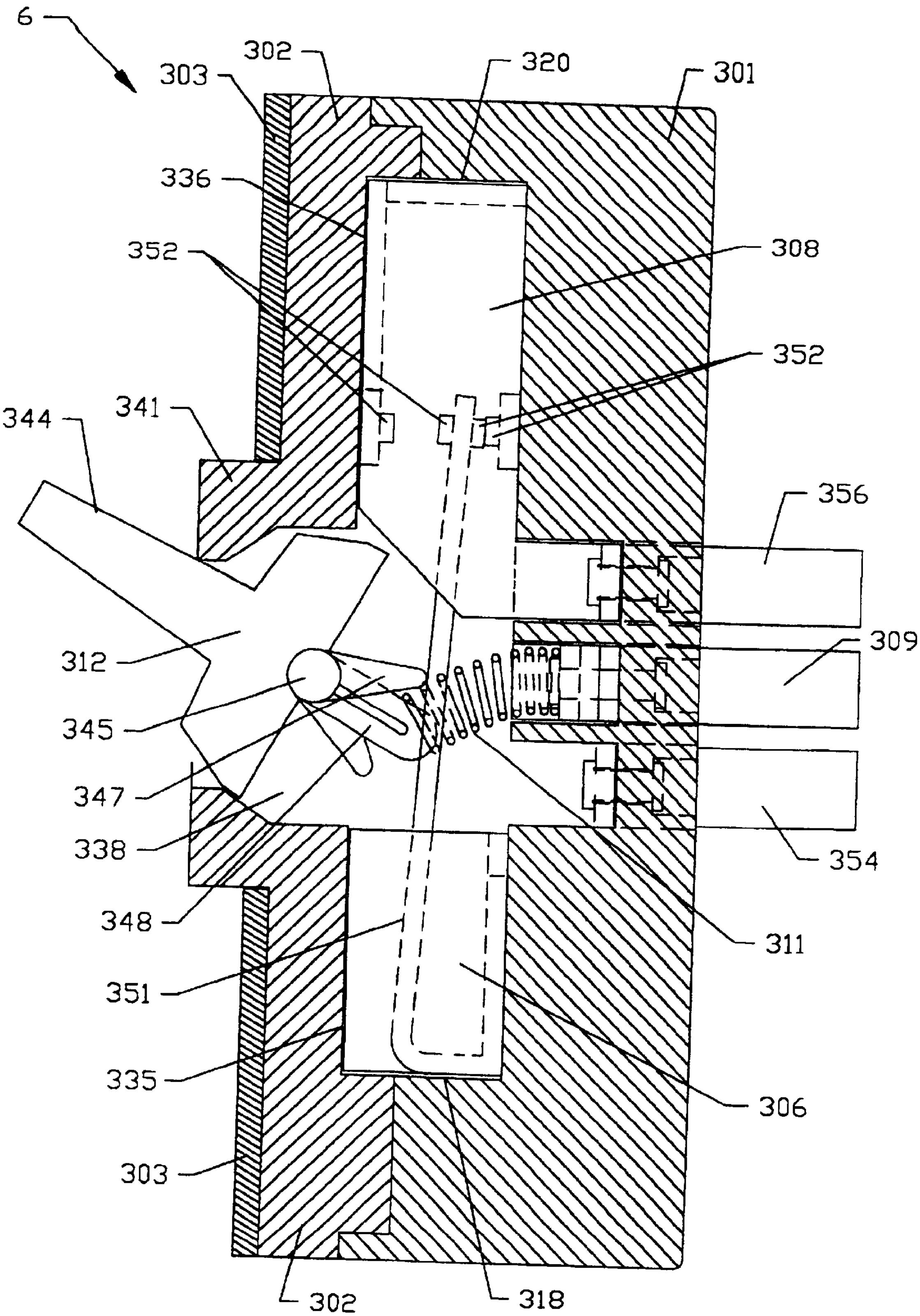
FIG. 46 is a vertical section view taken along line 46—46 of FIG. 38 with the lever in the up position.
Figure 47:
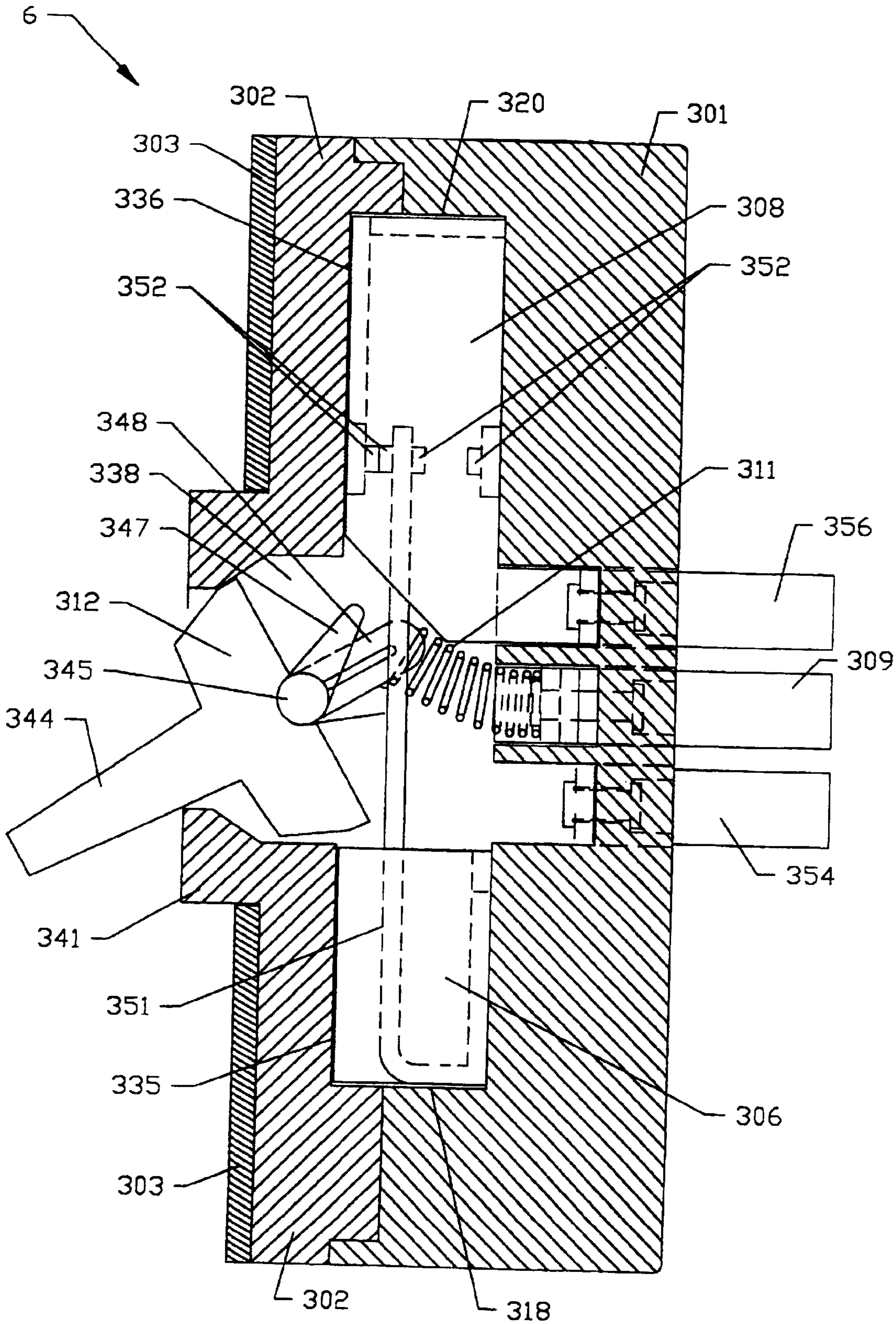
FIG. 47 is a vertical section view taken along line 47—47 of FIG. 38 with the lever in the down position.
Figure 48:
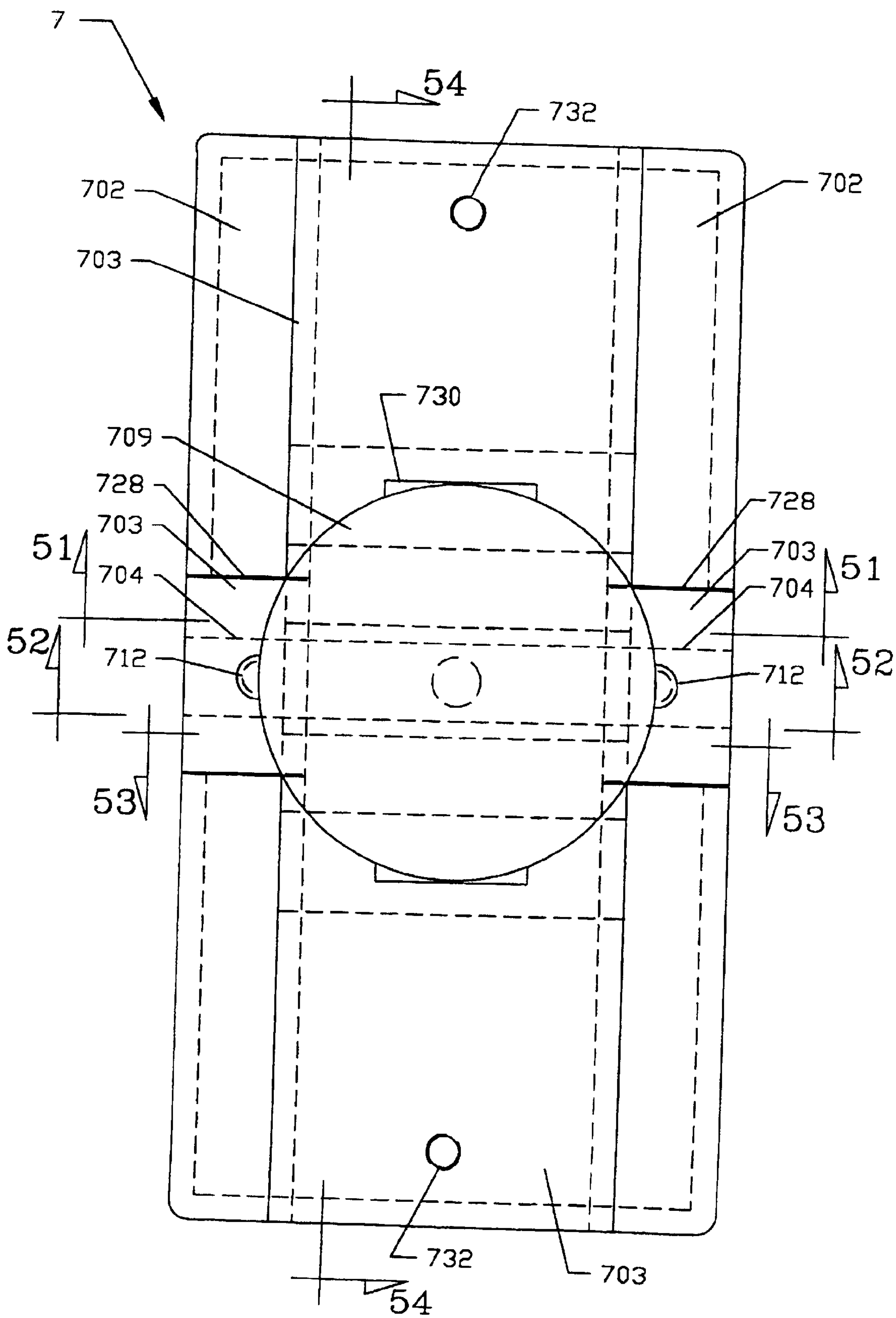
FIG. 48 is a front elevation view of the dimmer switch module.
Figure 49:
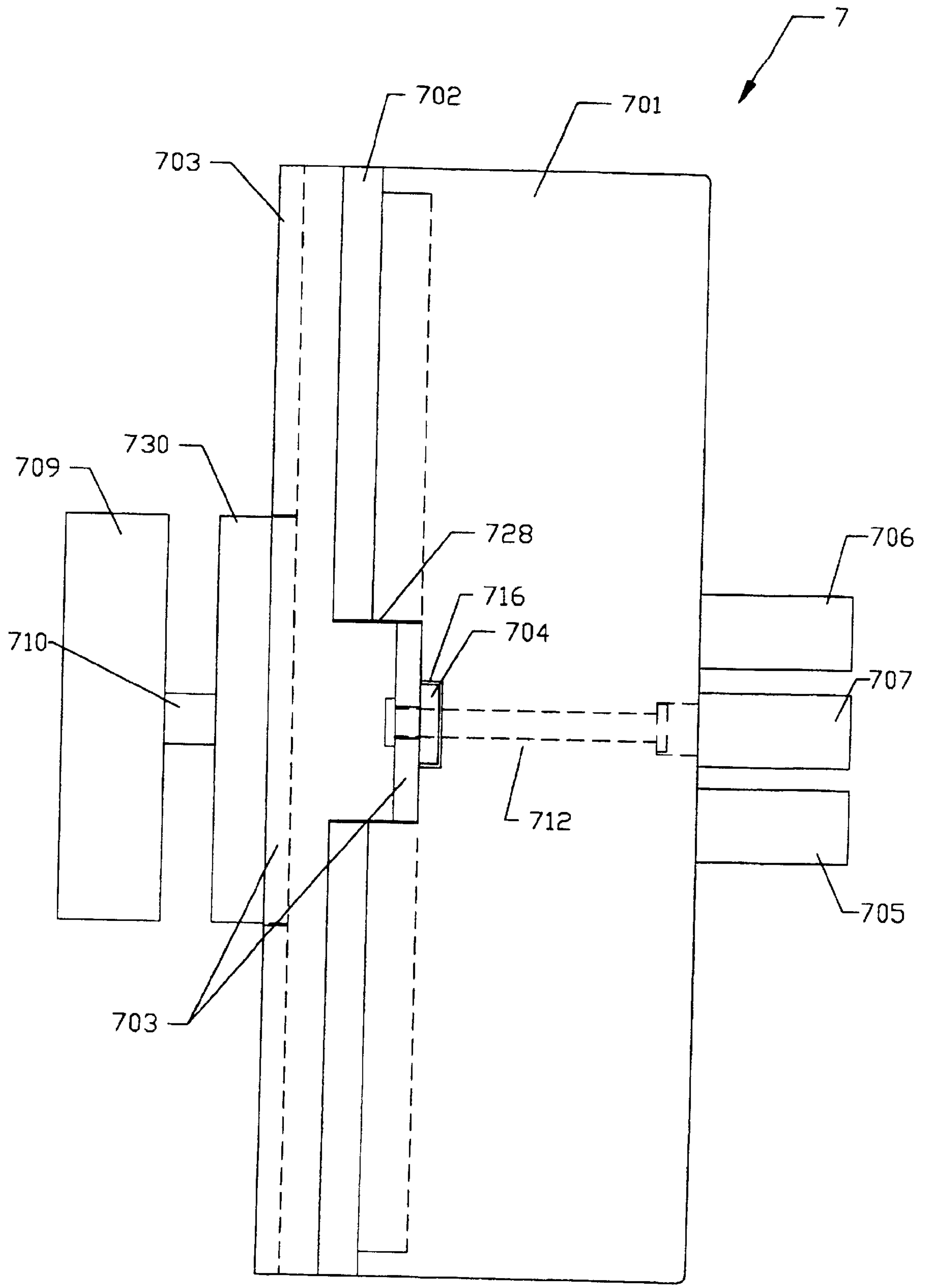
FIG. 49 is a side elevation view of the dimmer switch module.
Figure 50:
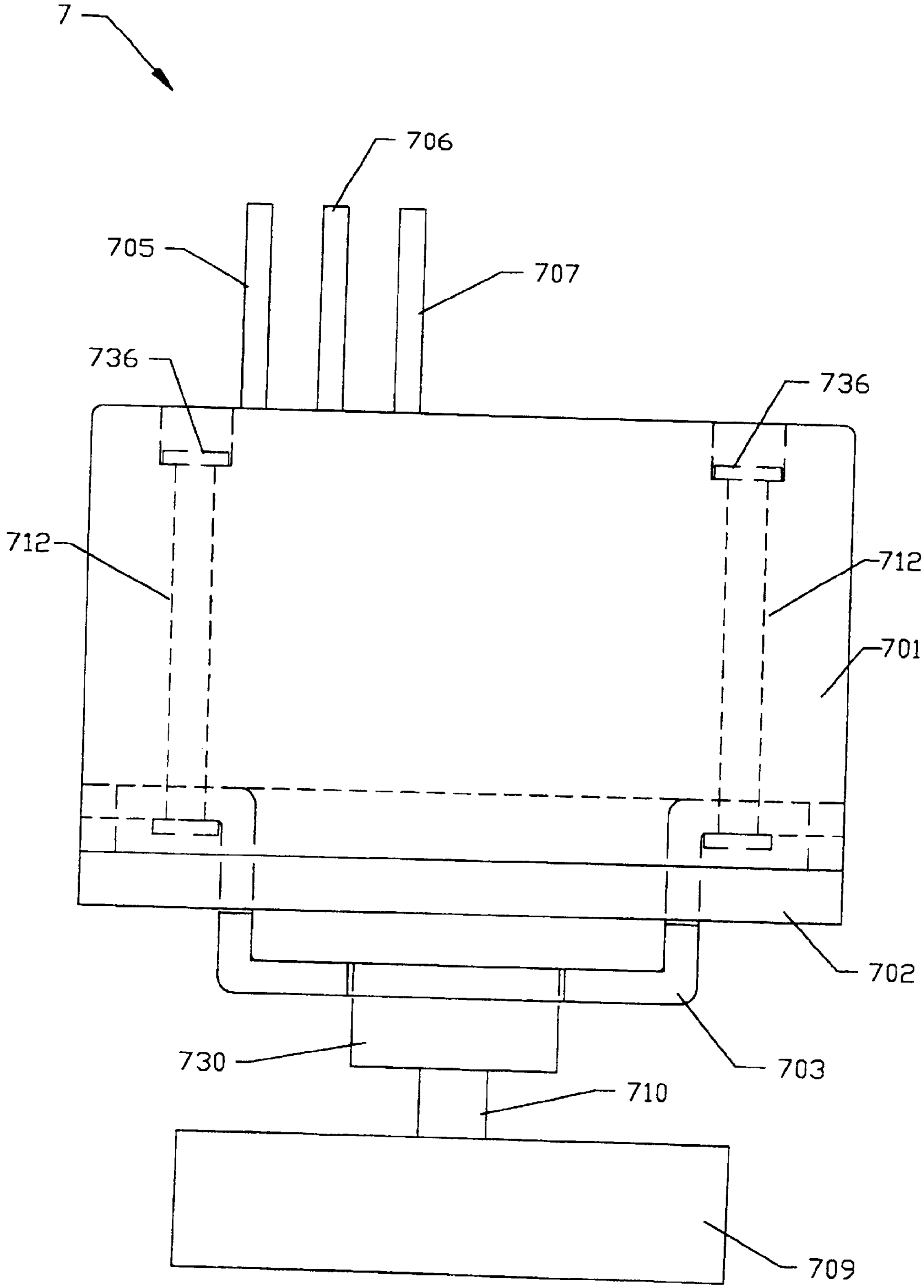
FIG. 50 is a plan view of the dimmer switch module.
Figure 51:
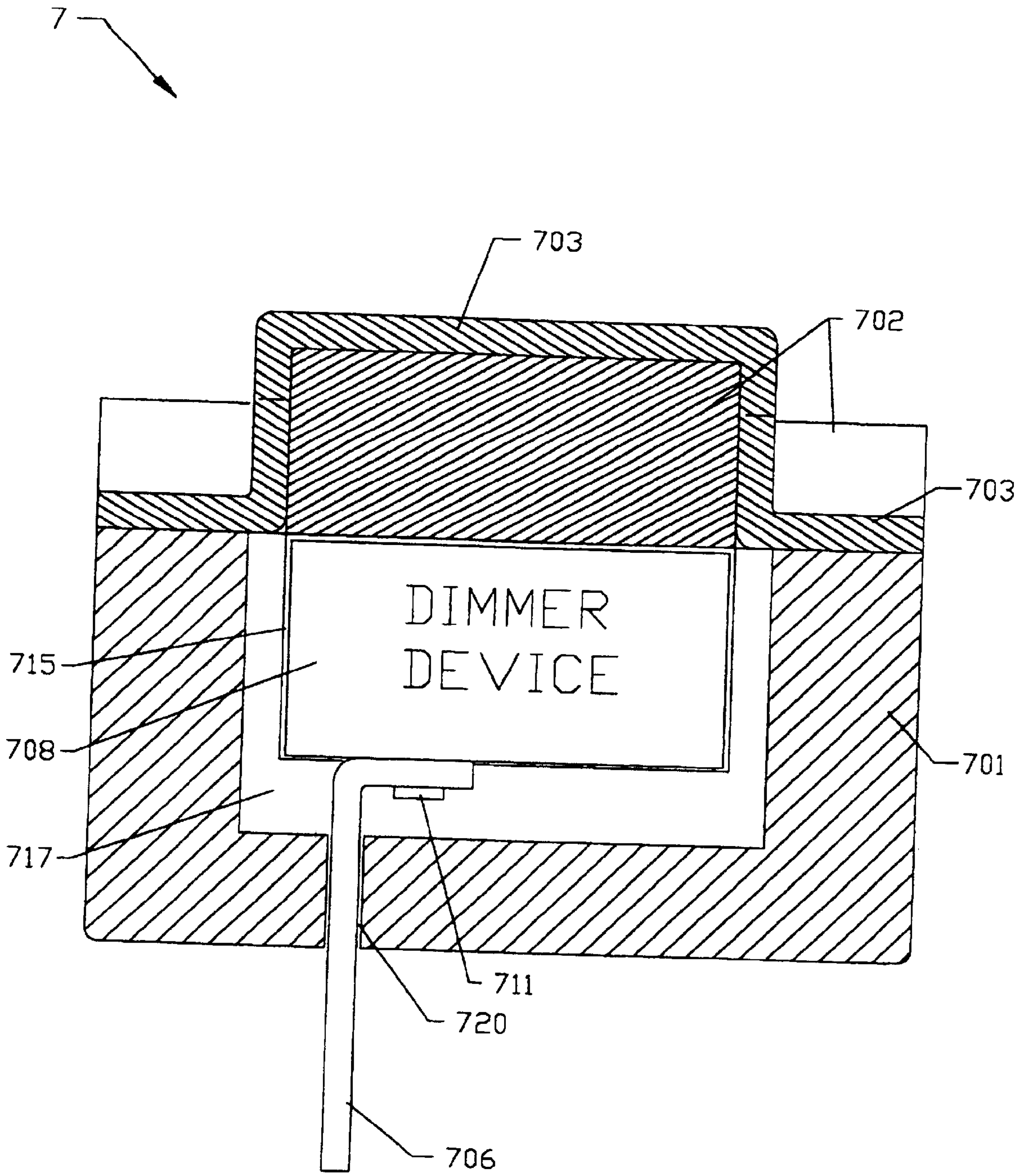
FIG. 51 is a horizontal section view taken along line 51—51 of FIG. 48.
Figure 52:
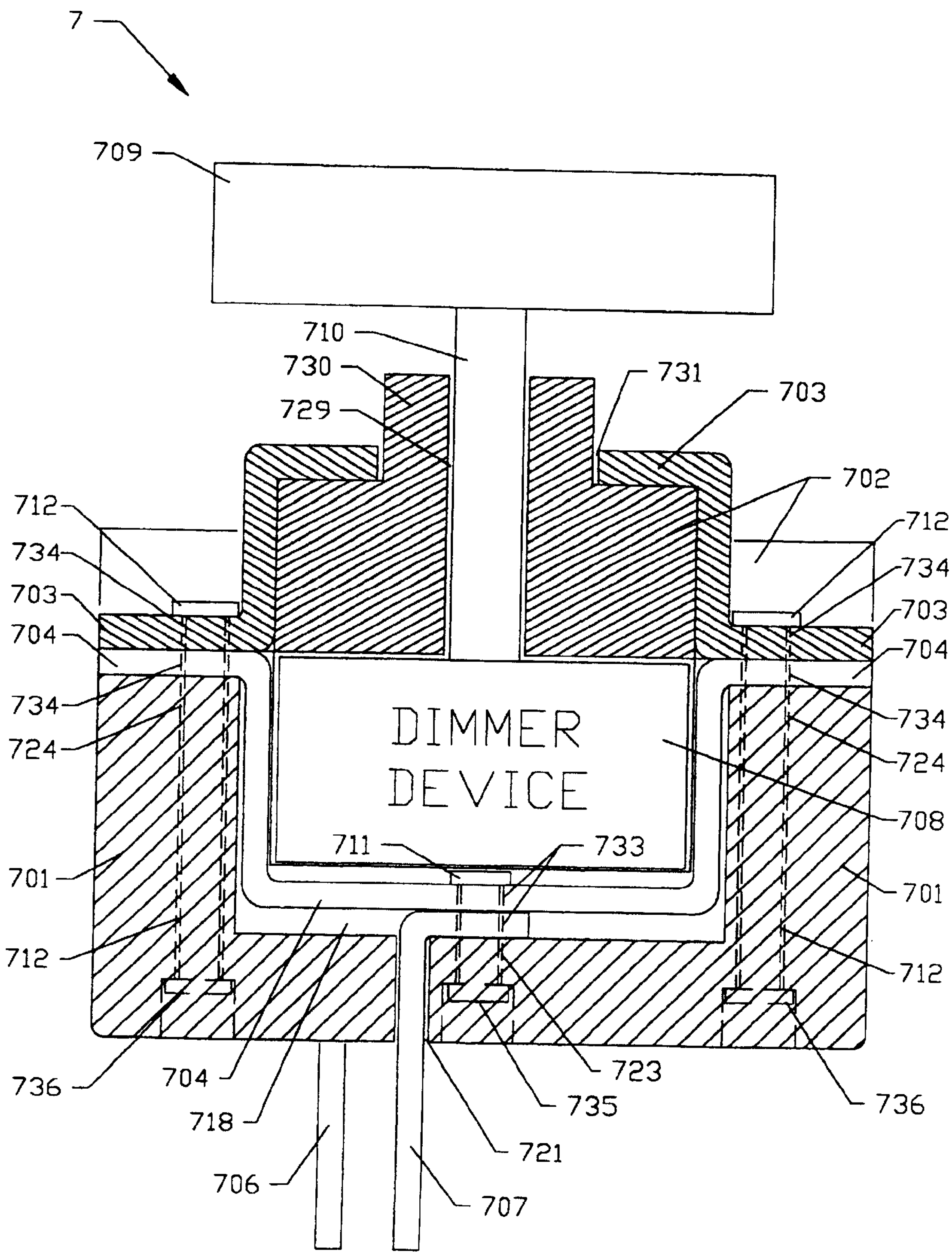
FIG. 52 is a horizontal section view taken along line 52—52 of FIG. 48.
Figure 53:
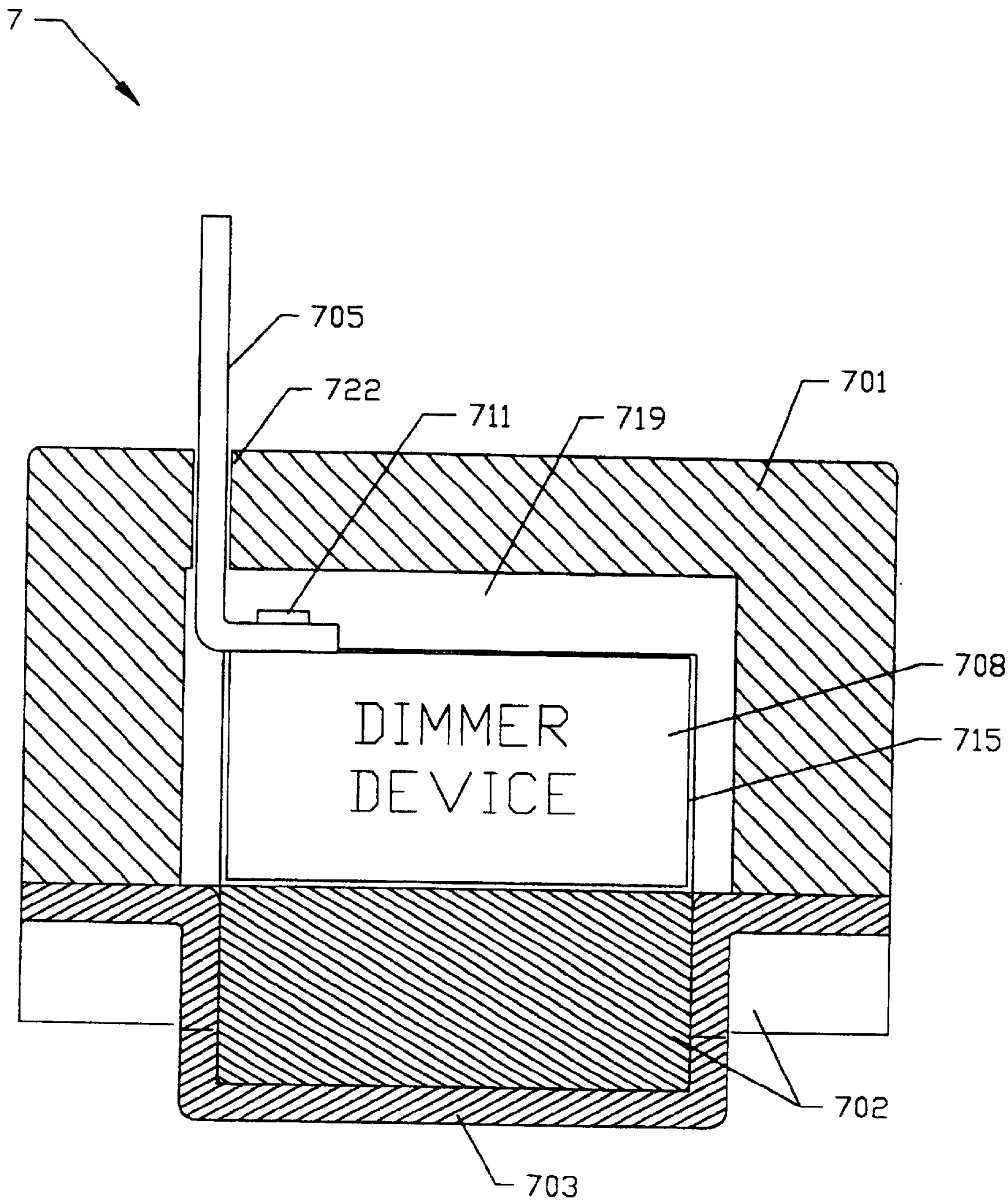
FIG. 53 is a horizontal section view taken along line 53—53 of FIG. 48.
Figure 54:
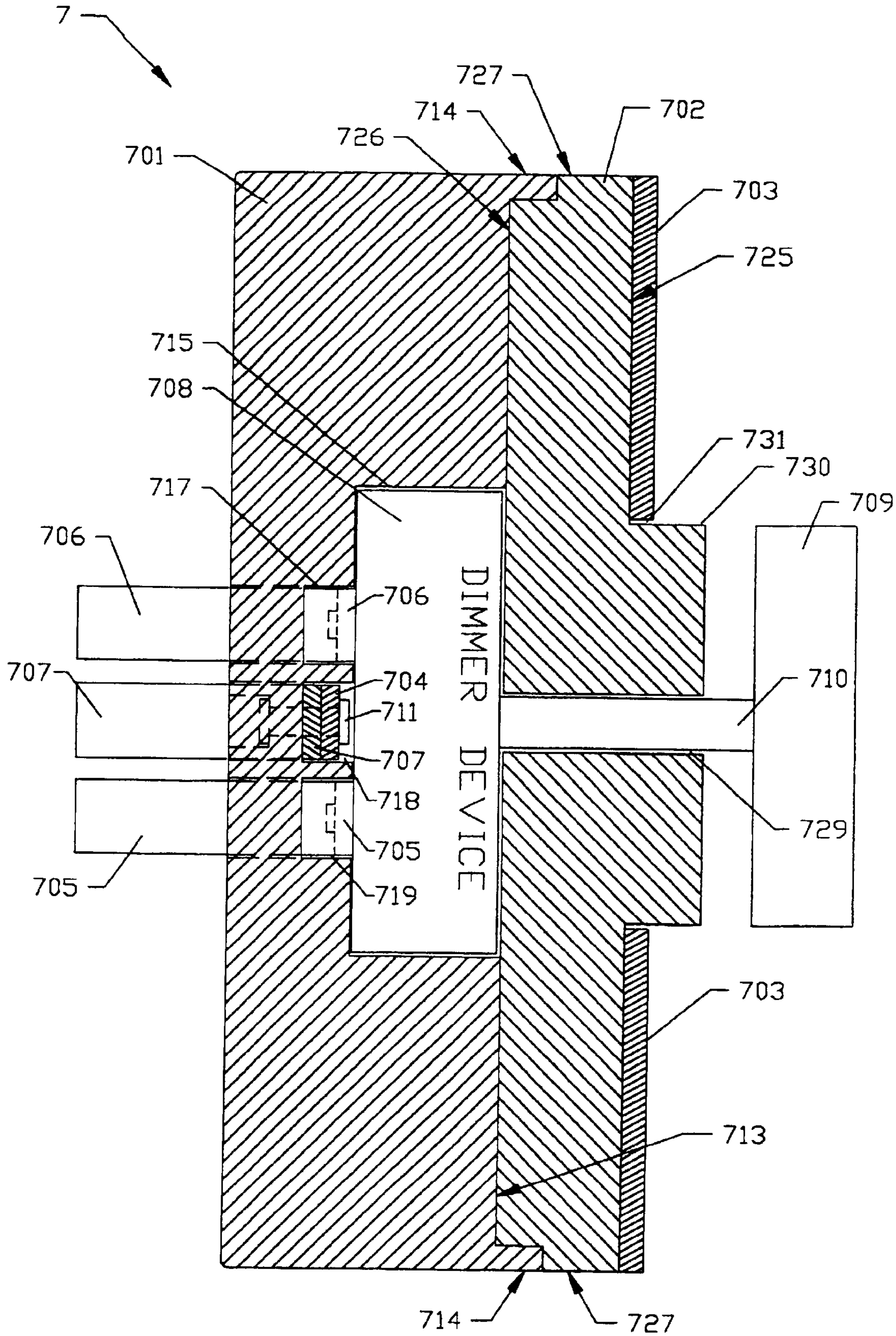
FIG. 54 is a vertical section view taken along line 54—54 of FIG. 48.
Figure 55:
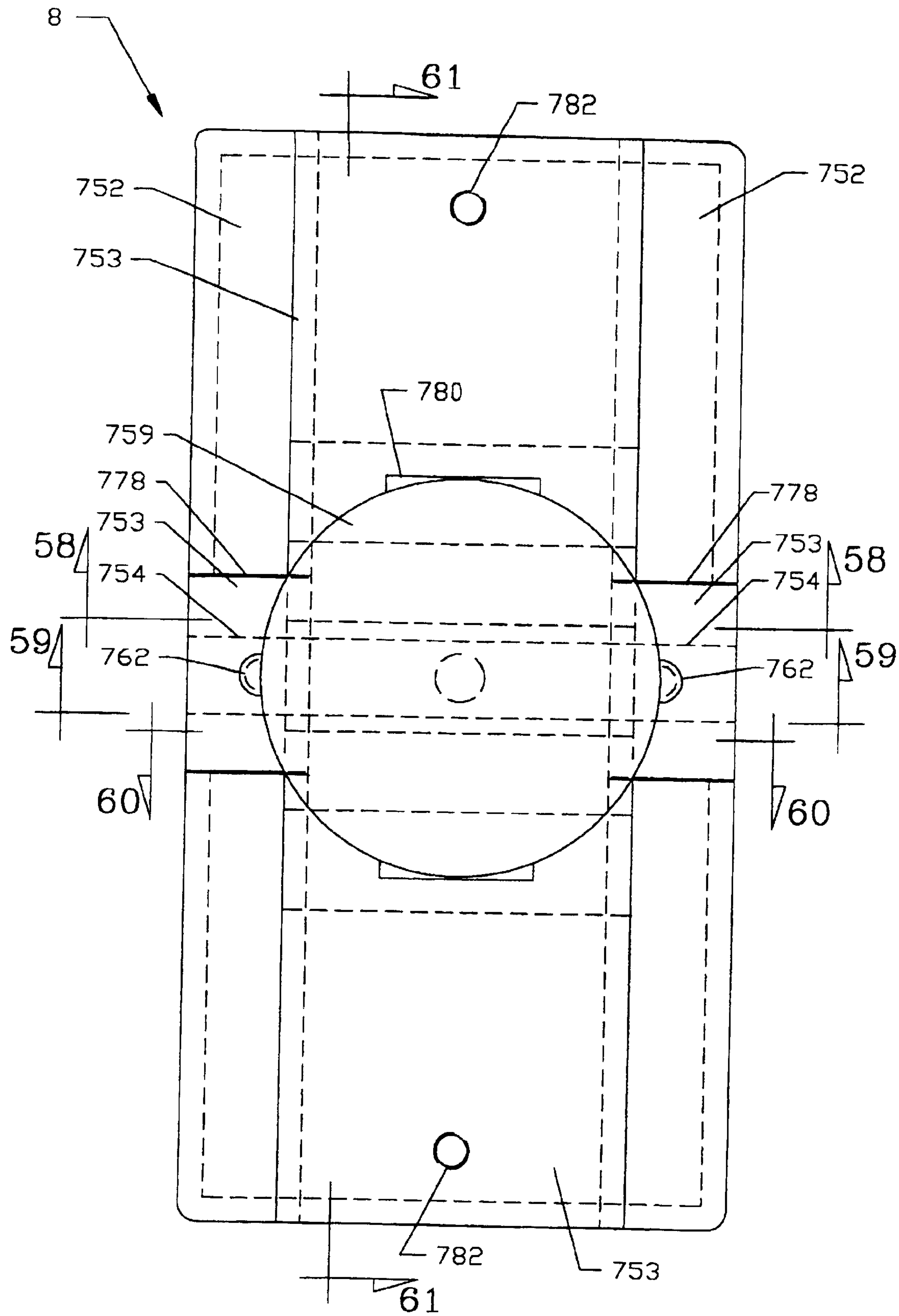
FIG. 55 is a front elevation view of the fan-control switch module.
Figure 56:
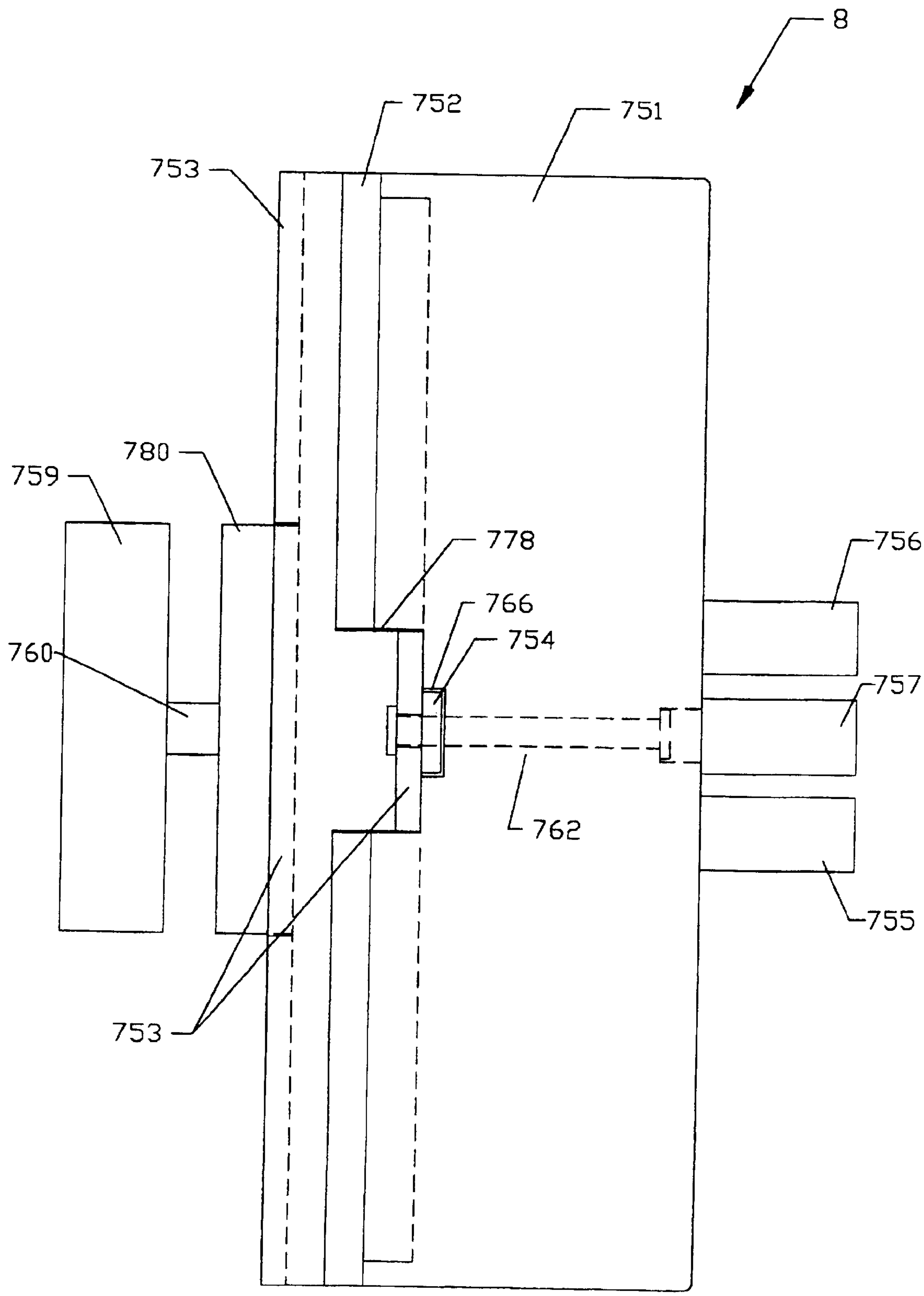
FIG. 56 is a side elevation view of the fan-control switch module.
Figure 57:
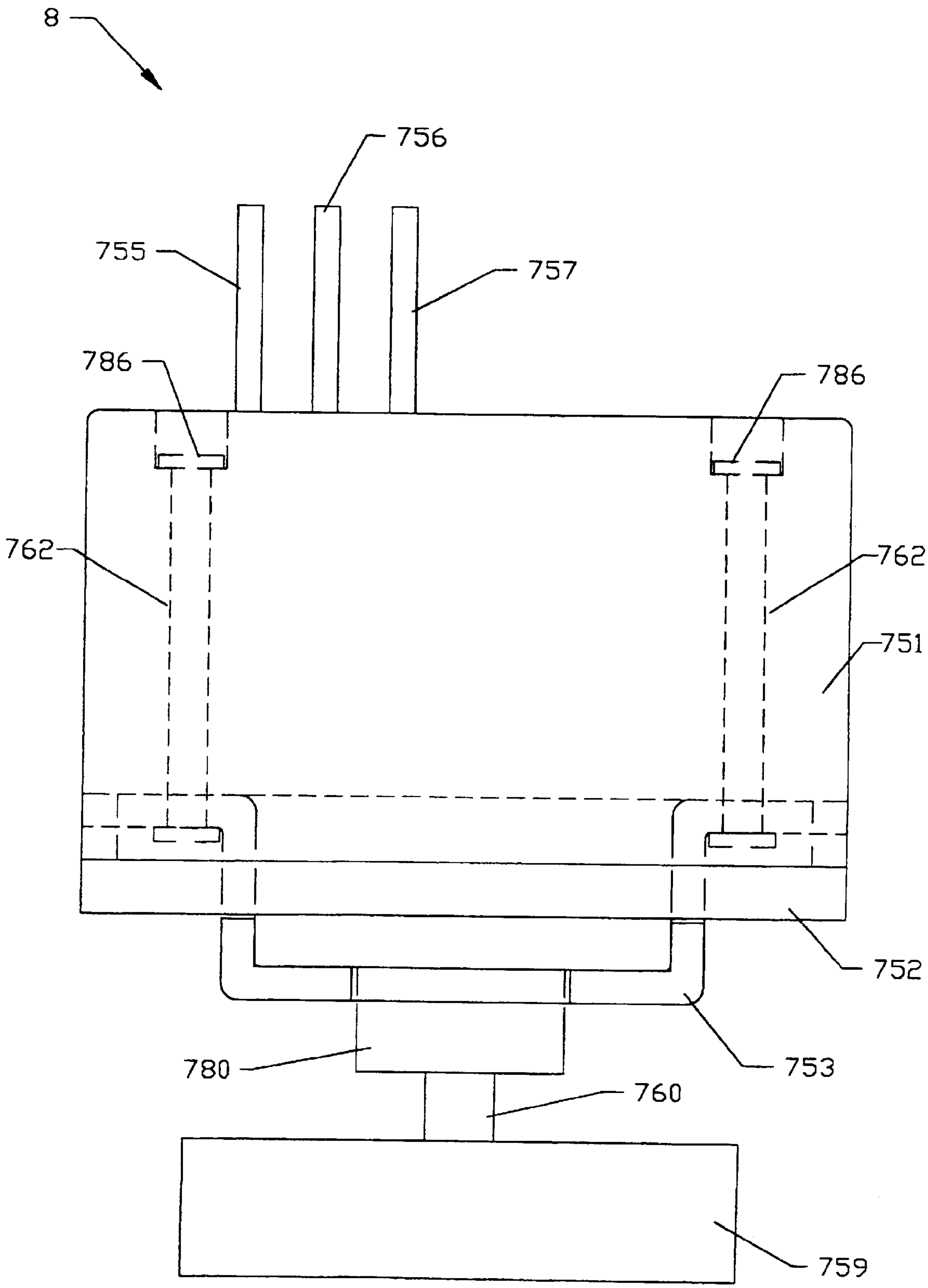
FIG. 57 is a plan view of the fan-control switch module.
Figure 58:
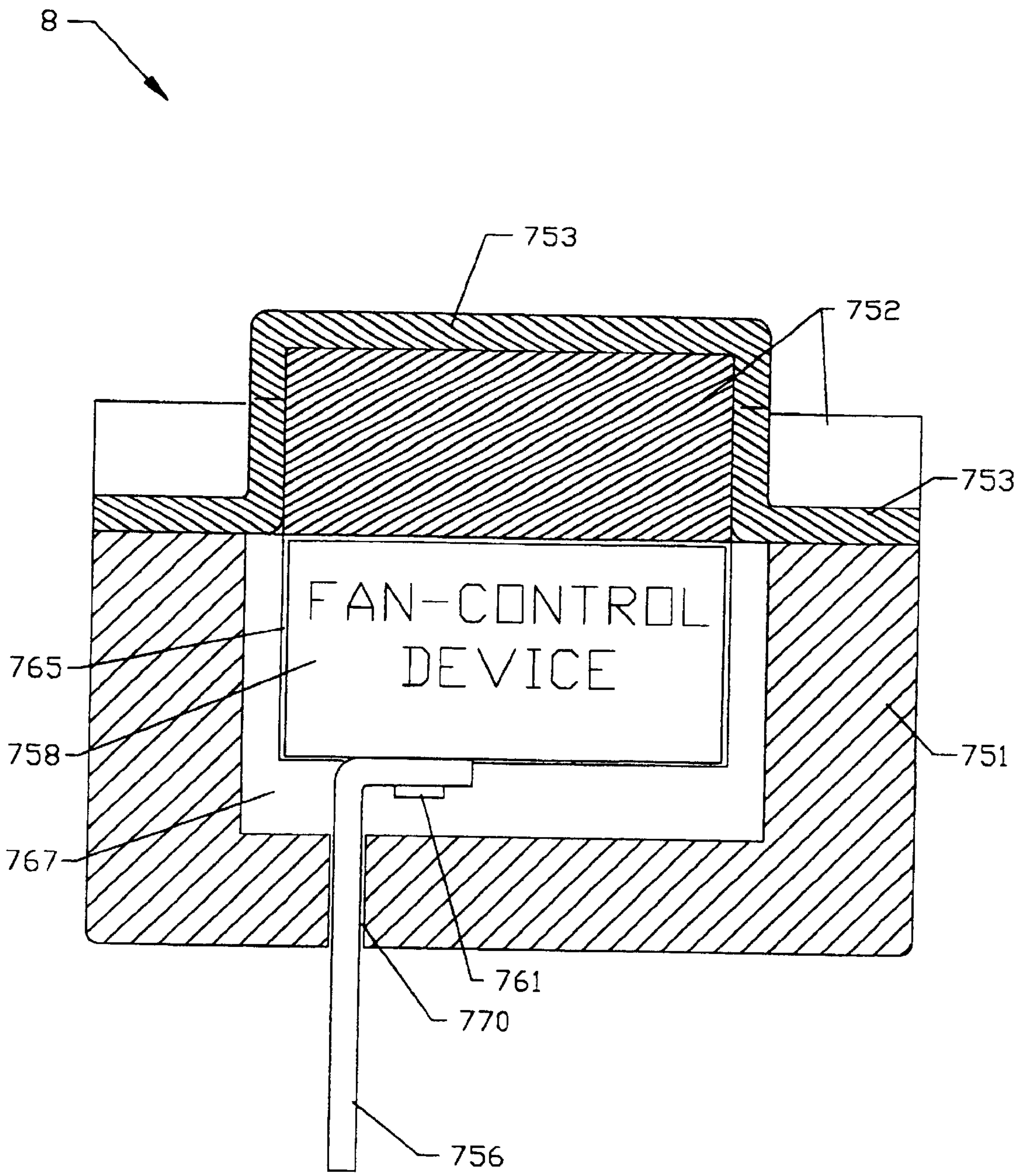
FIG. 58 is a horizontal section view taken along line 58—58 of FIG. 55.
Figure 59:
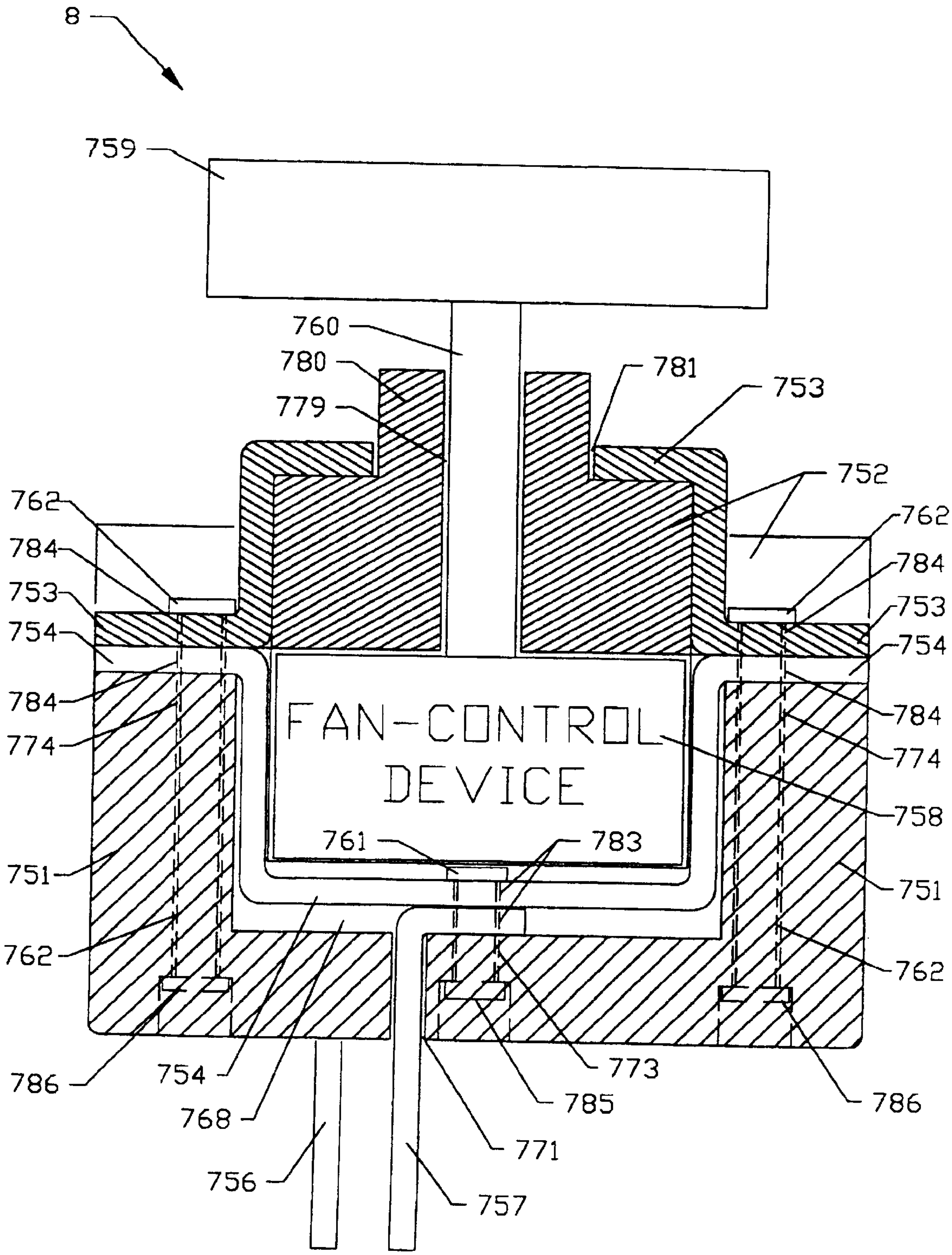
FIG. 59 is a horizontal section view taken along line 59—59 of FIG. 55.
Figure 60:
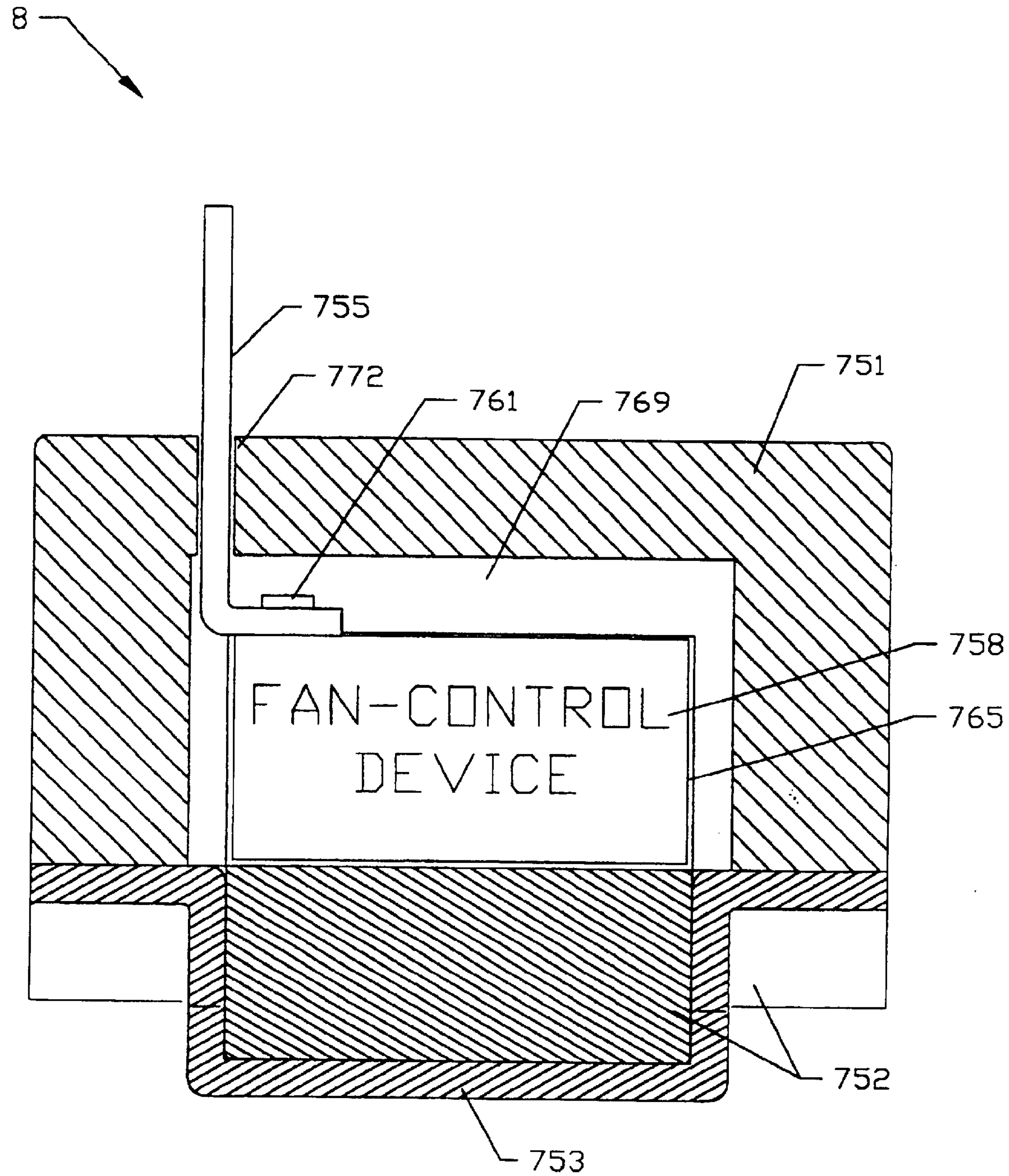
FIG. 60 is a horizontal section view taken along line 60—60 of FIG. 55.
Figure 61:
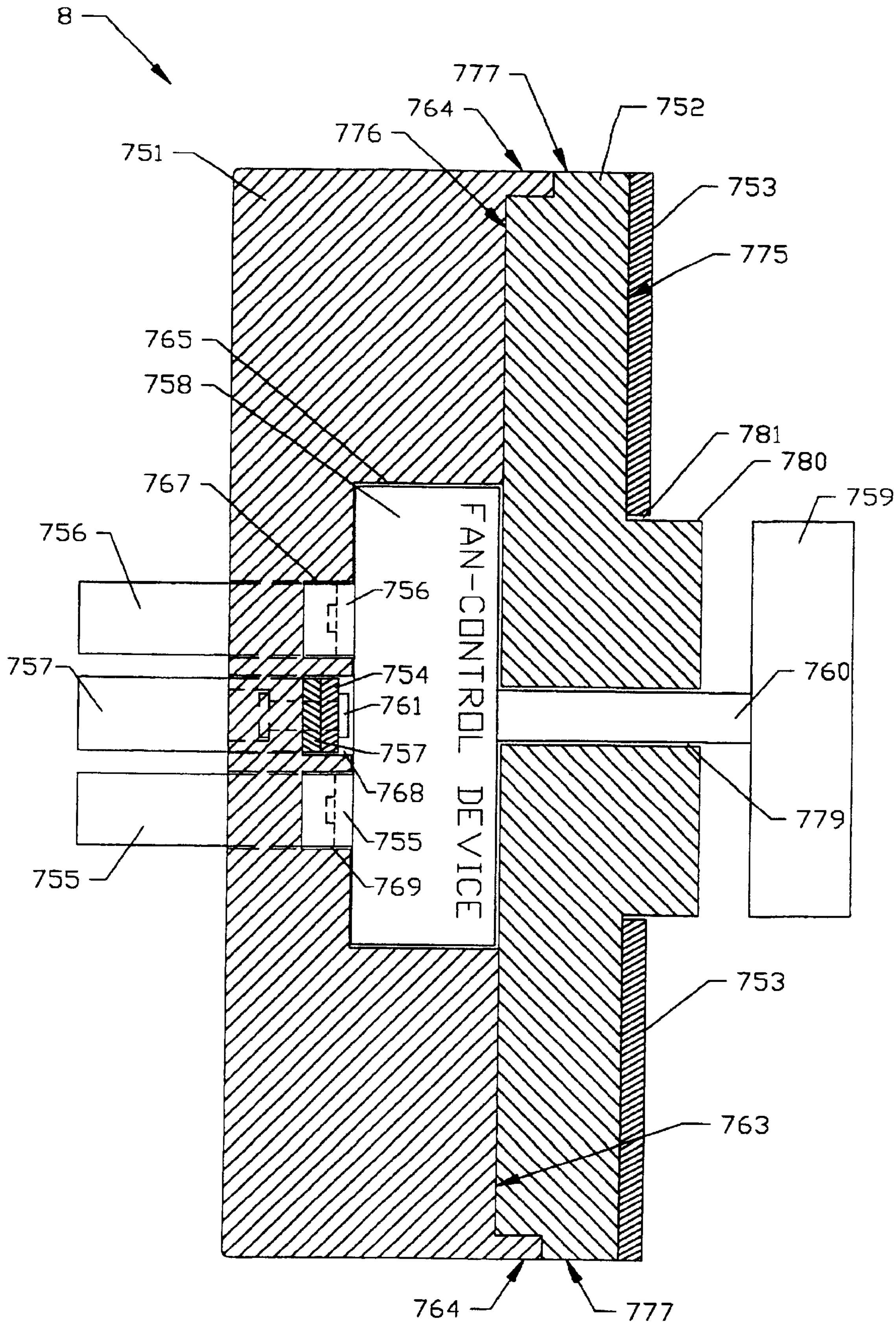
FIG. 61 is a vertical section view taken along line 61—61 of FIG. 55.
Figure 62:
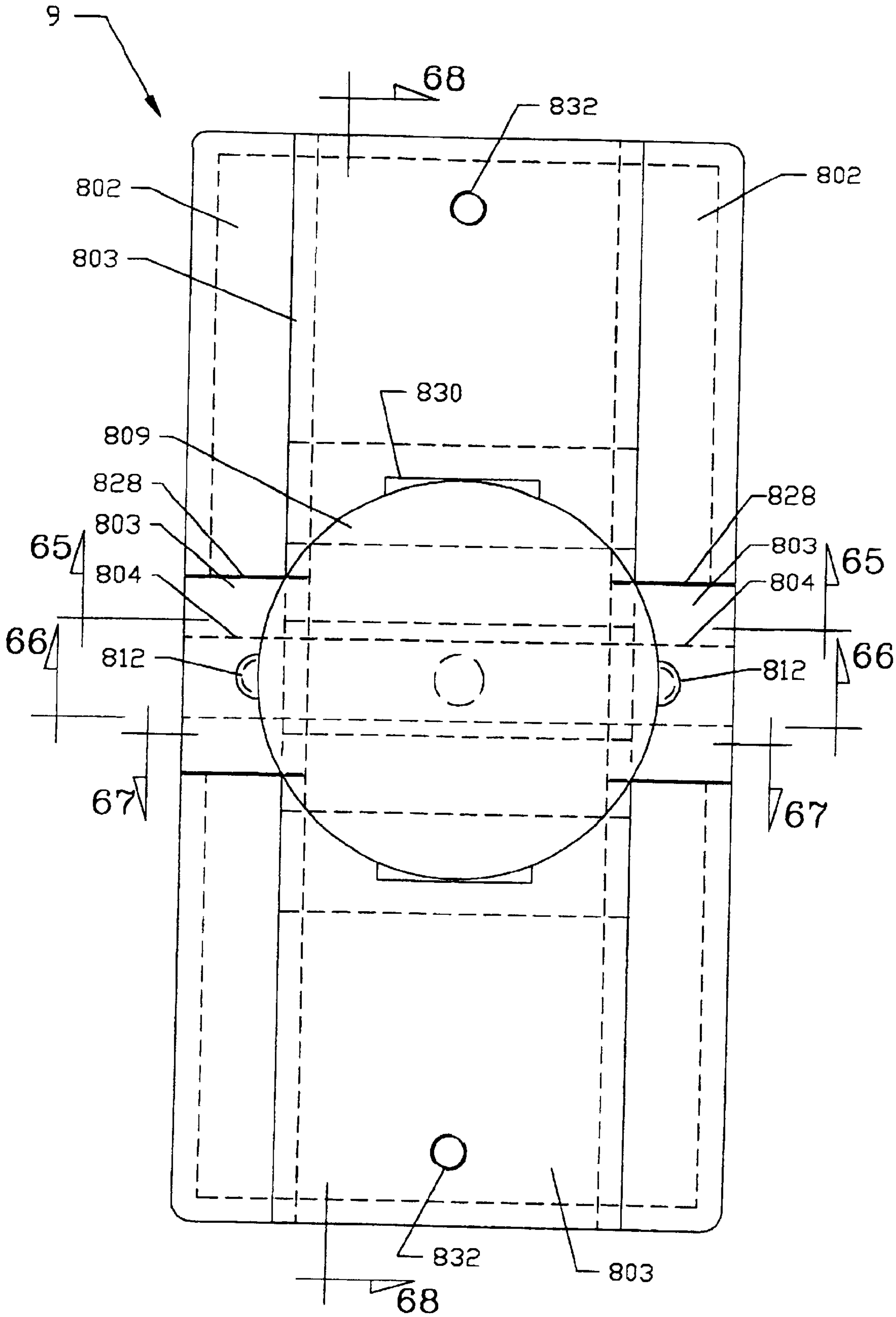
FIG. 62 is a front elevation view of the timer switch module.
Figure 63:
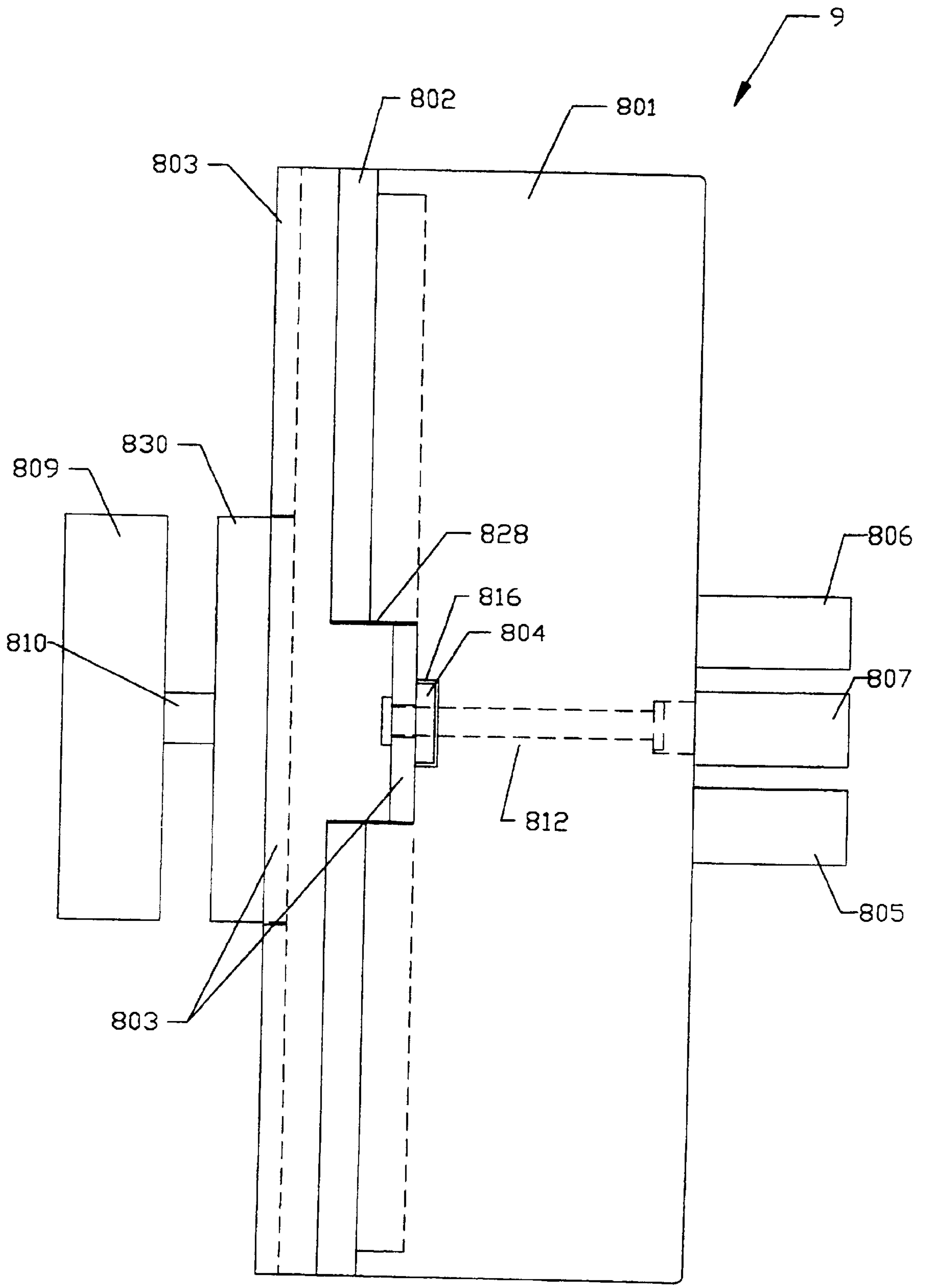
FIG. 63 is a side elevation view of the timer switch module.
Figure 64:
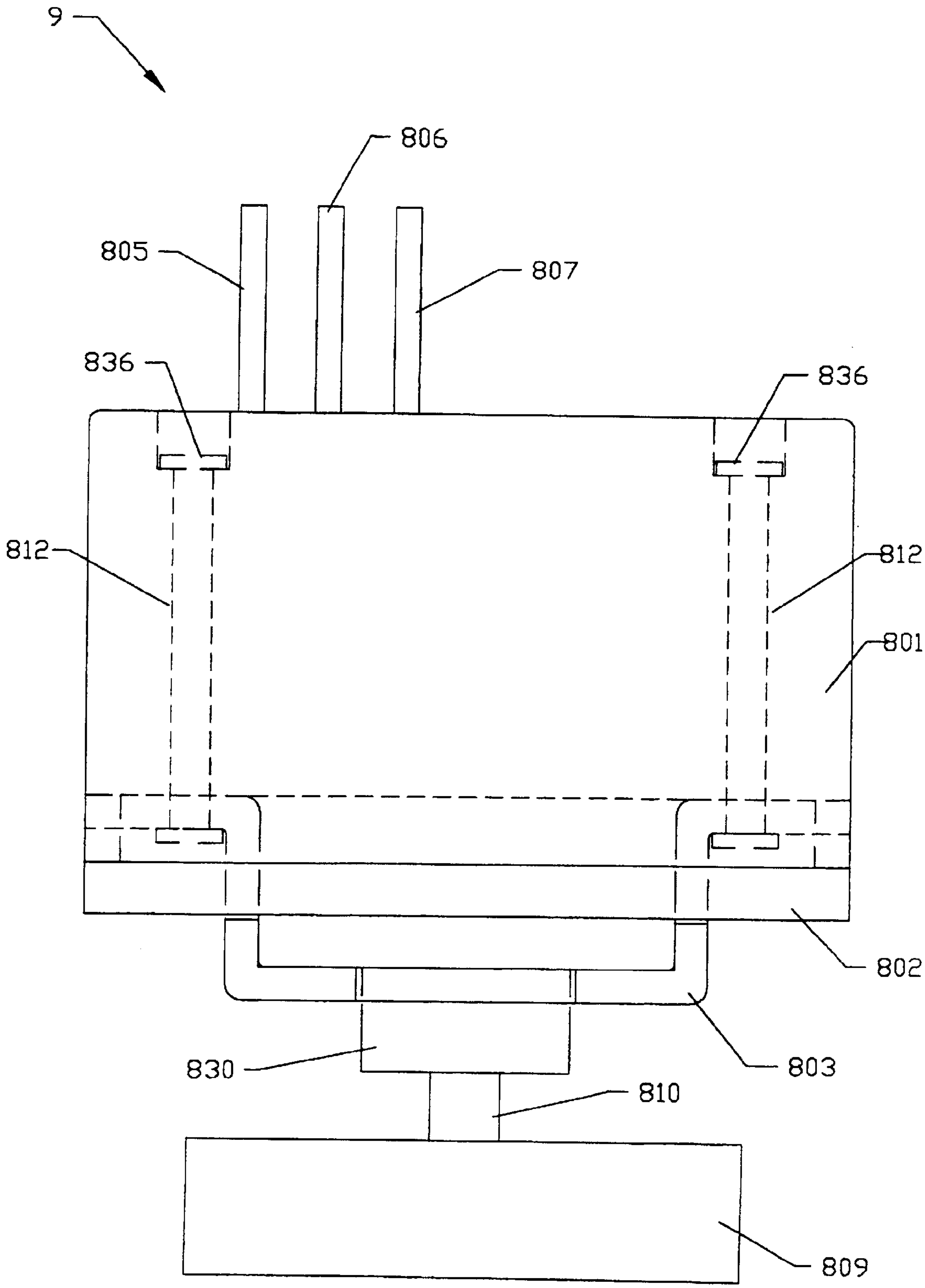
FIG. 64 is a plan view of the timer switch module.
Figure 65:
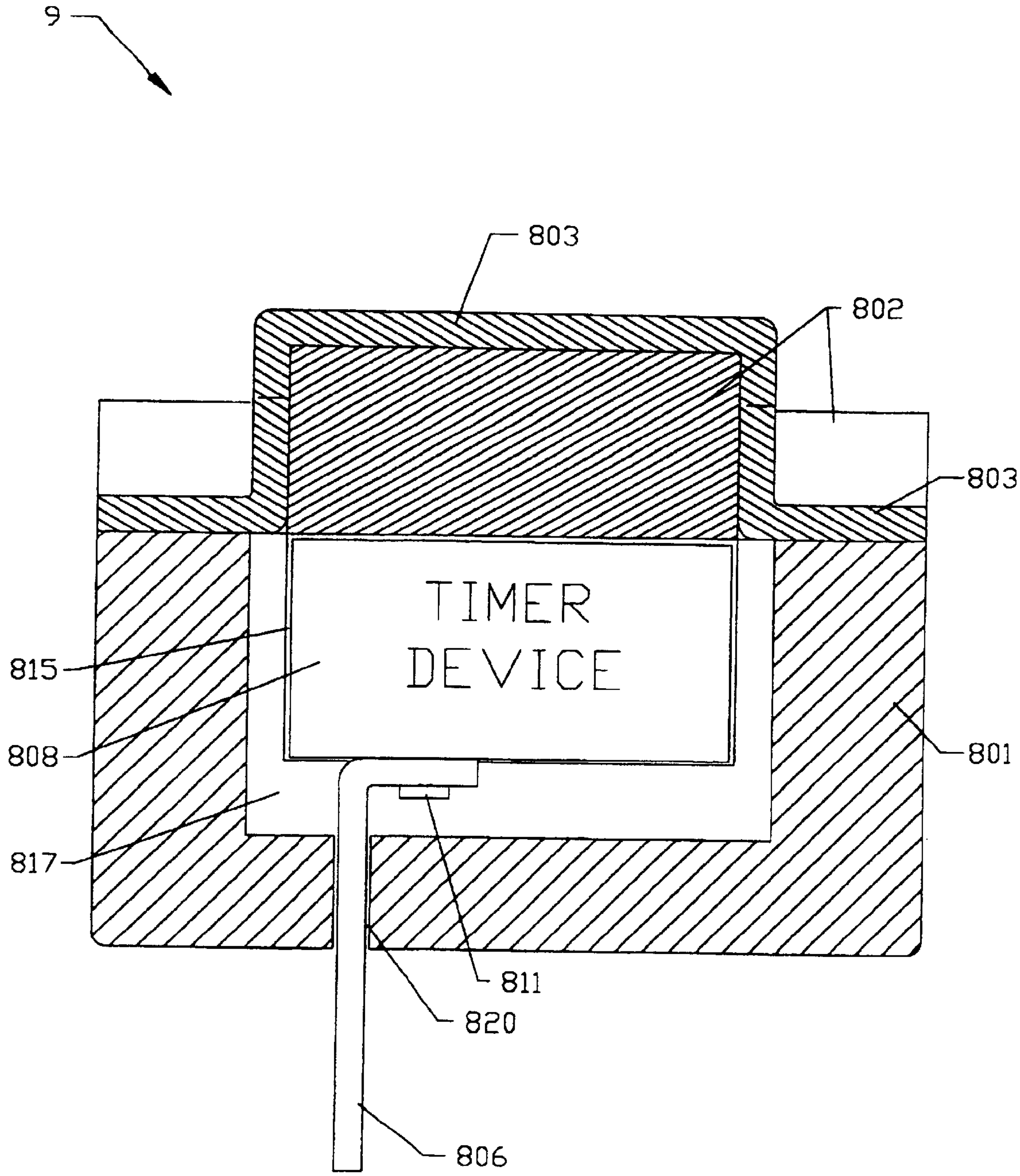
FIG. 65 is a horizontal section view taken along line 65—65 of FIG. 62.
Figure 66:
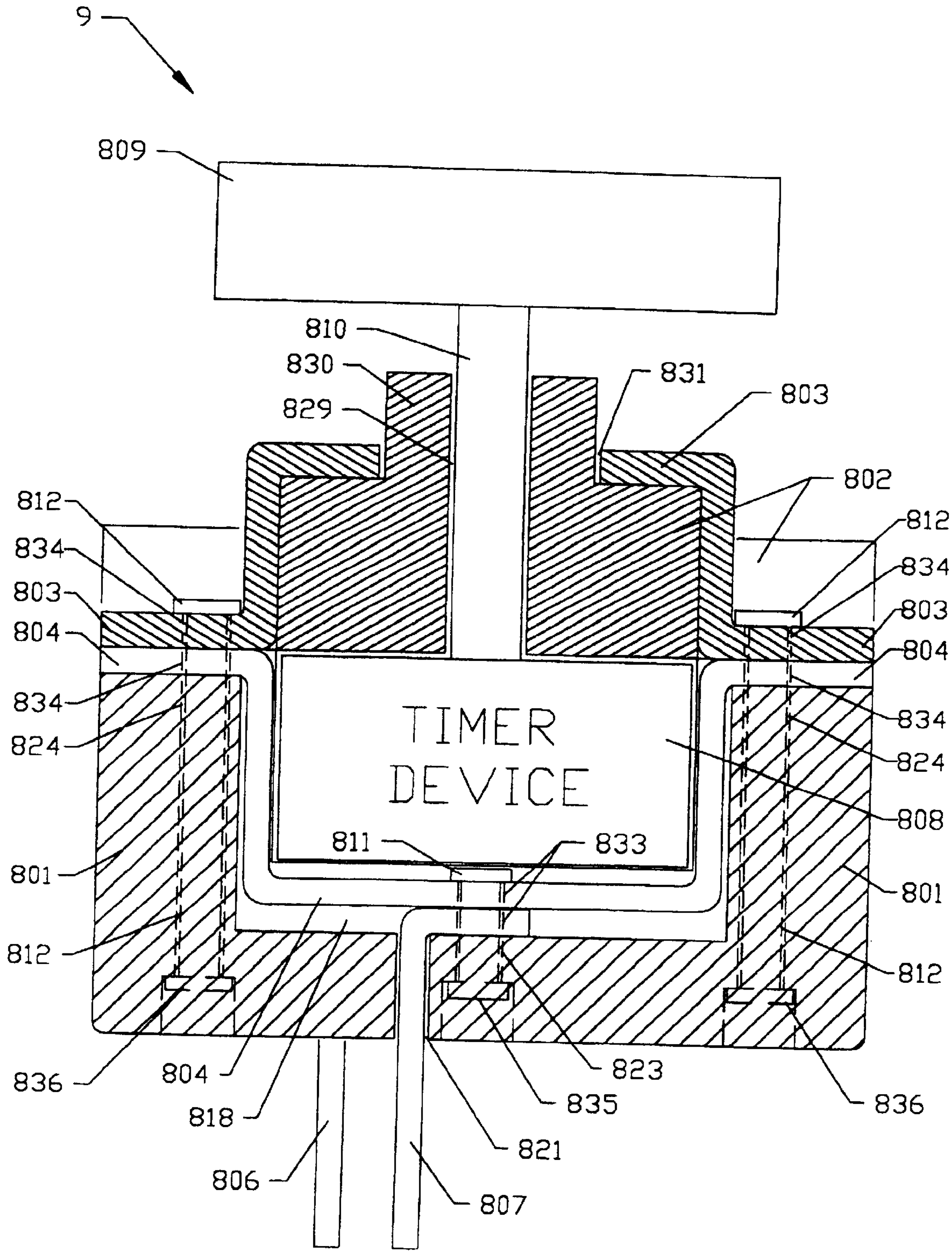
FIG. 66 is a horizontal section view taken along line 66—66 of FIG. 62.
Figure 67:
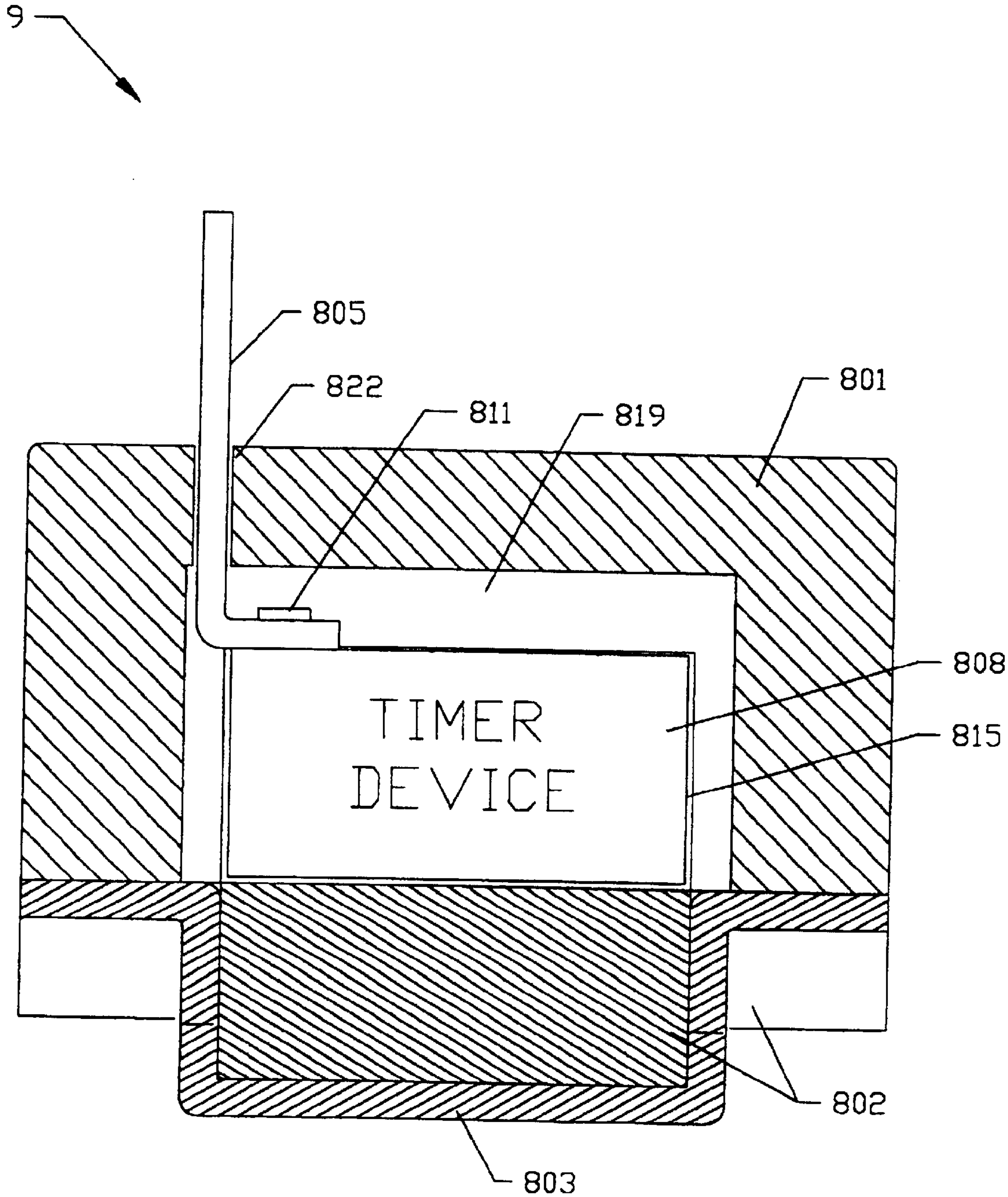
FIG. 67 is a horizontal section view taken along line 67—67 of FIG. 62.
Figure 68:
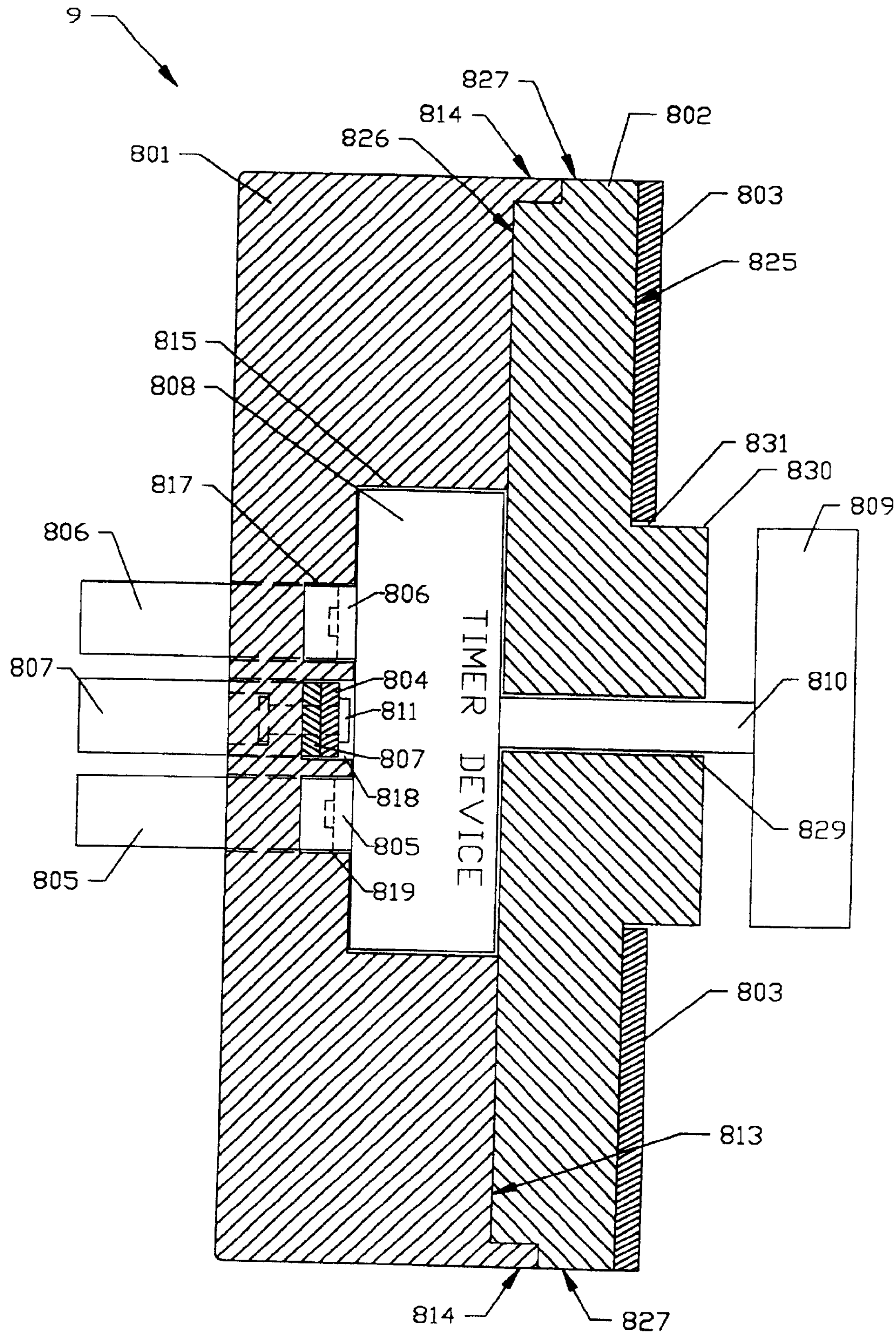
FIG. 68 is a vertical section view taken along line 68—68 of FIG. 62.
Figure 69:
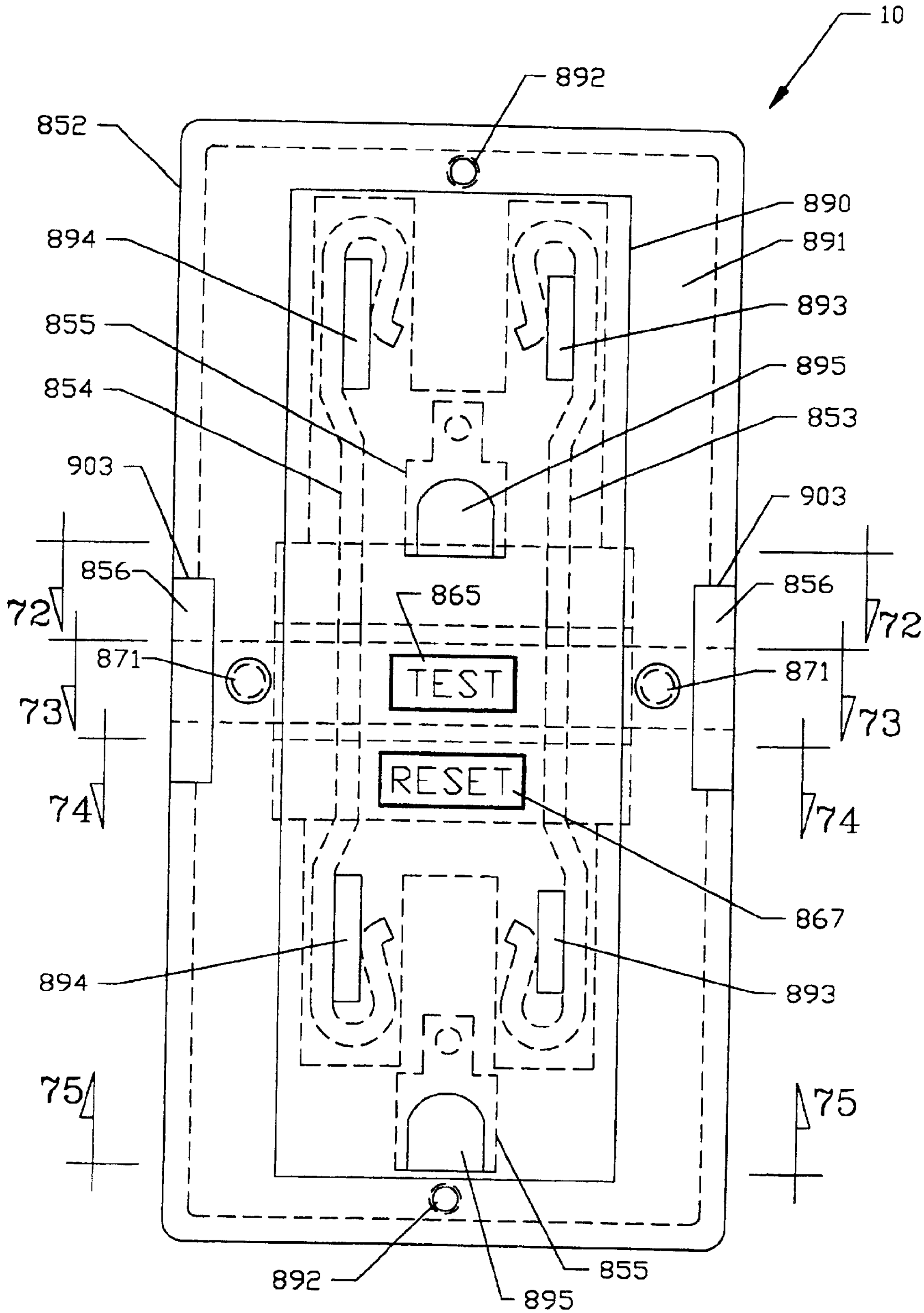
FIG. 69 is a front elevation view of the GFCI receptacle module.
Figure 70:
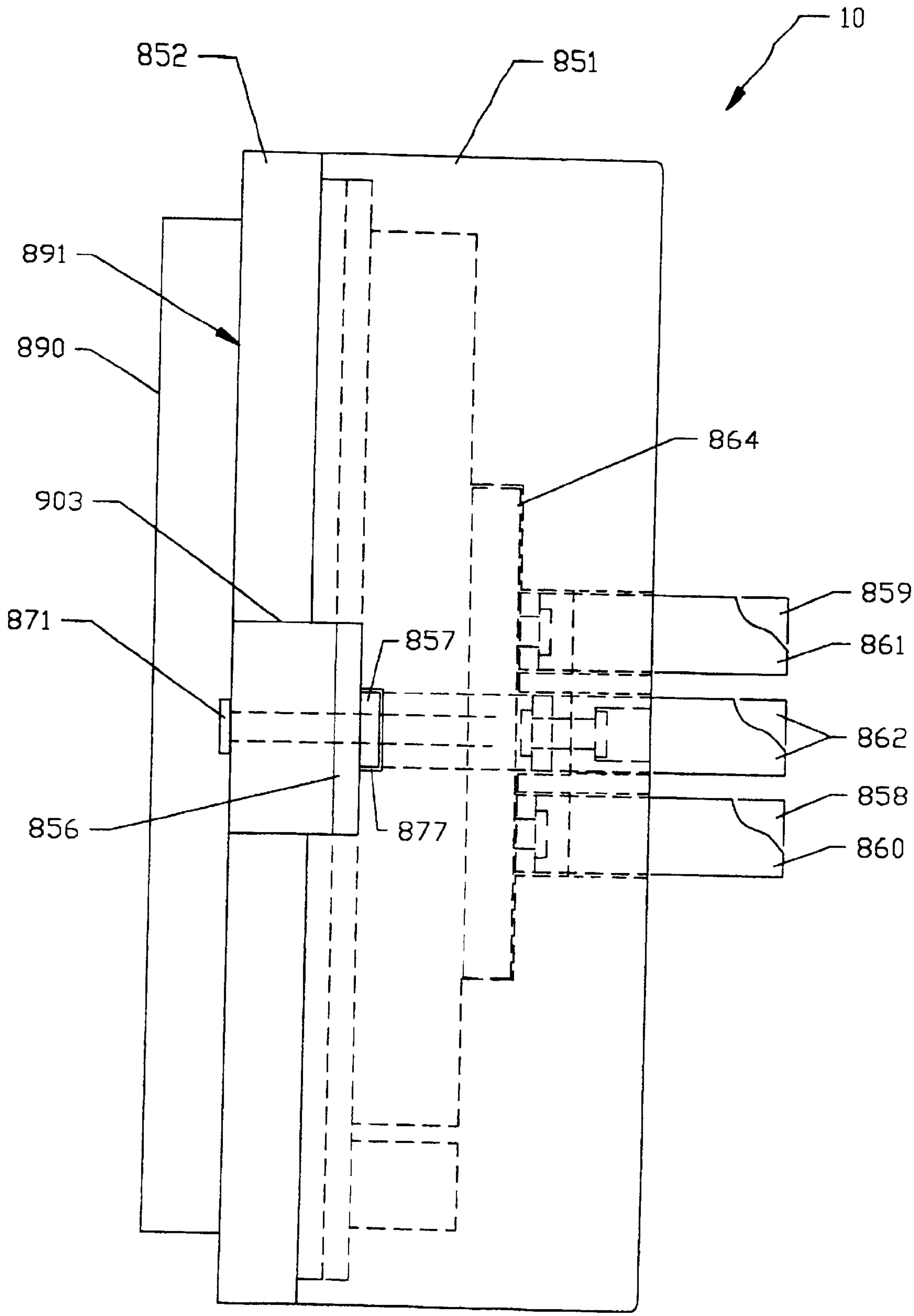
FIG. 70 is a side elevation view of the GFCI receptacle module.
Figure 71:
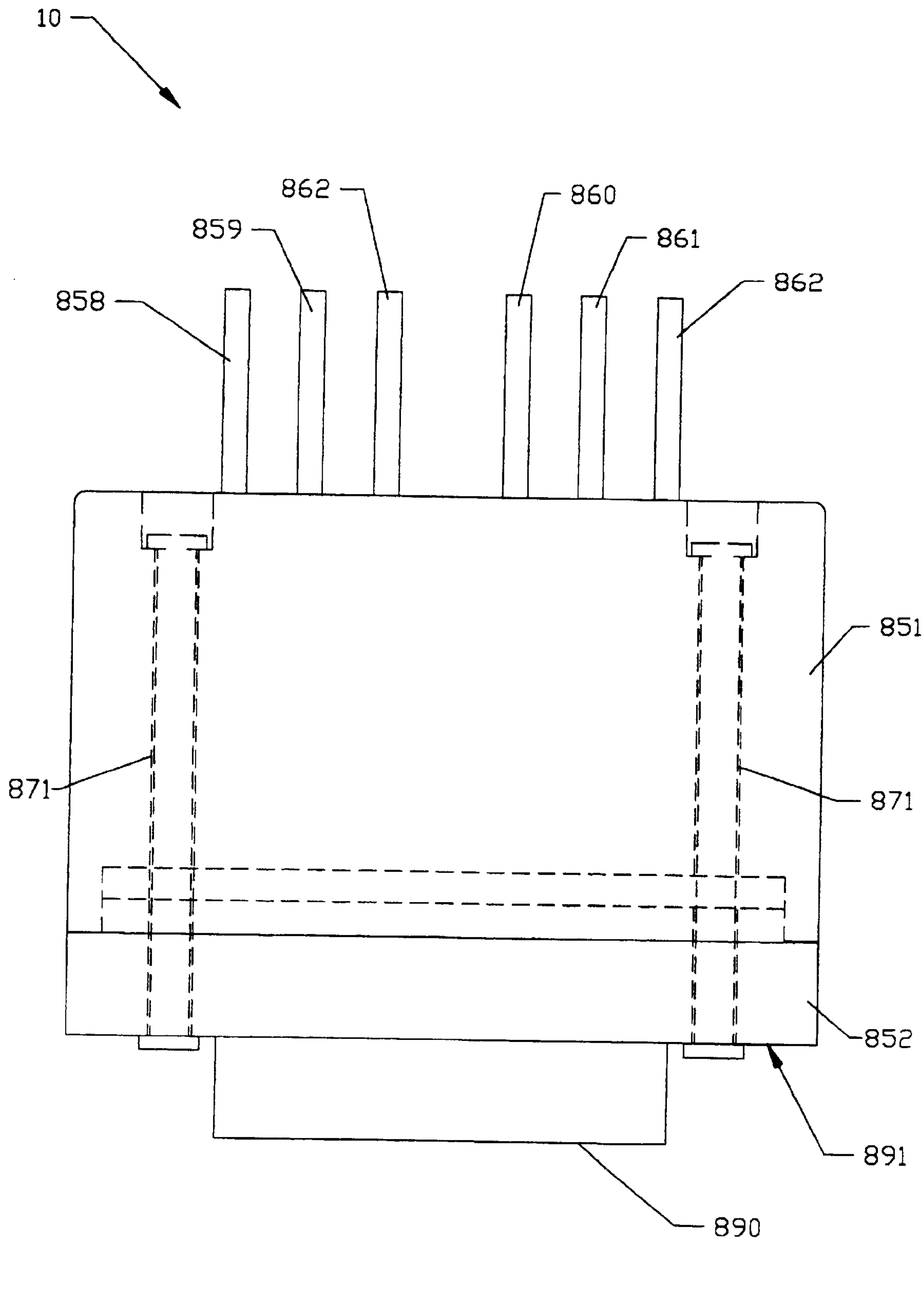
FIG. 71 is a plan view of the GFCI receptacle module.
Figure 72:
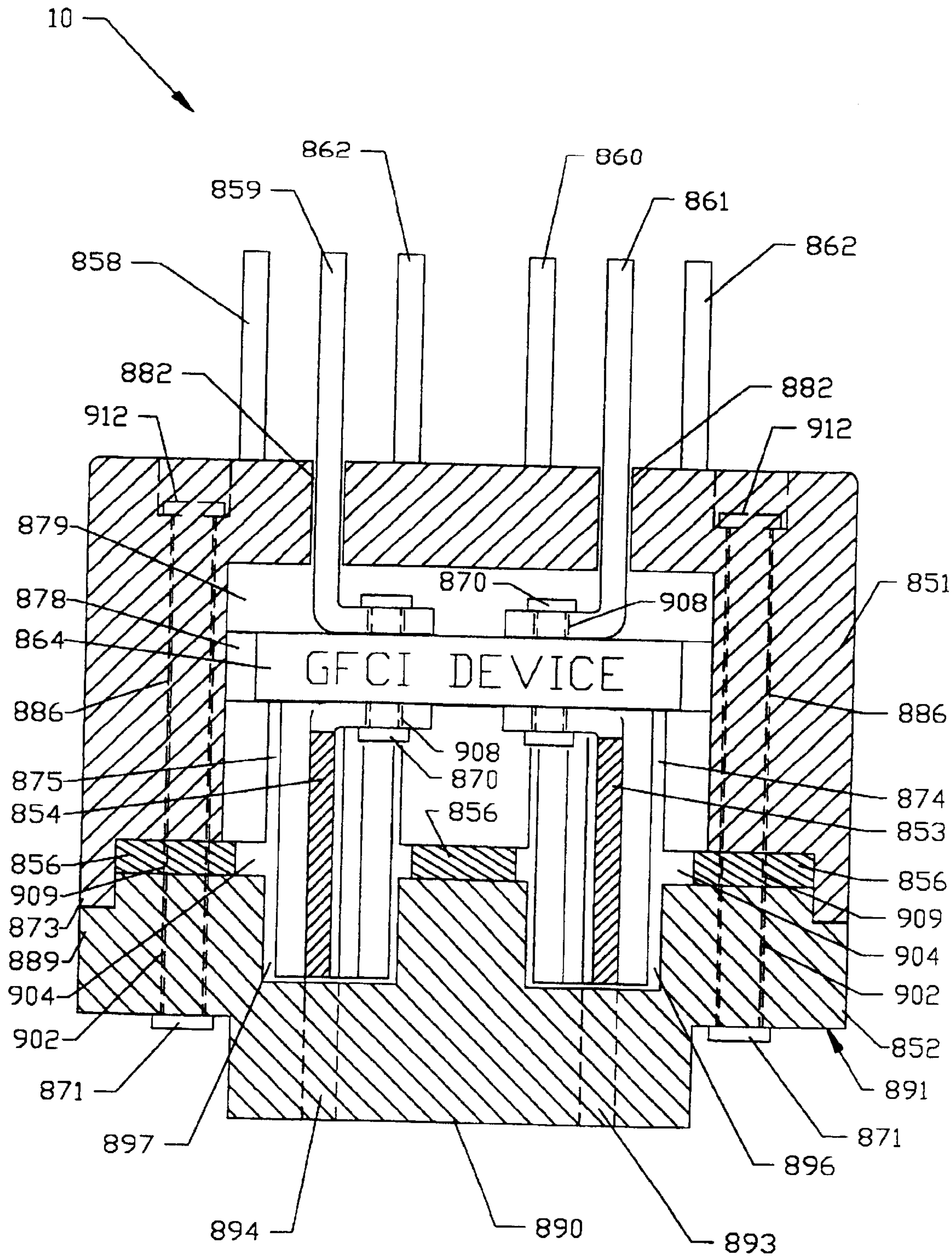
FIG. 72 is a horizontal section view taken along line 72—72 of FIG. 69.
Figure 73:
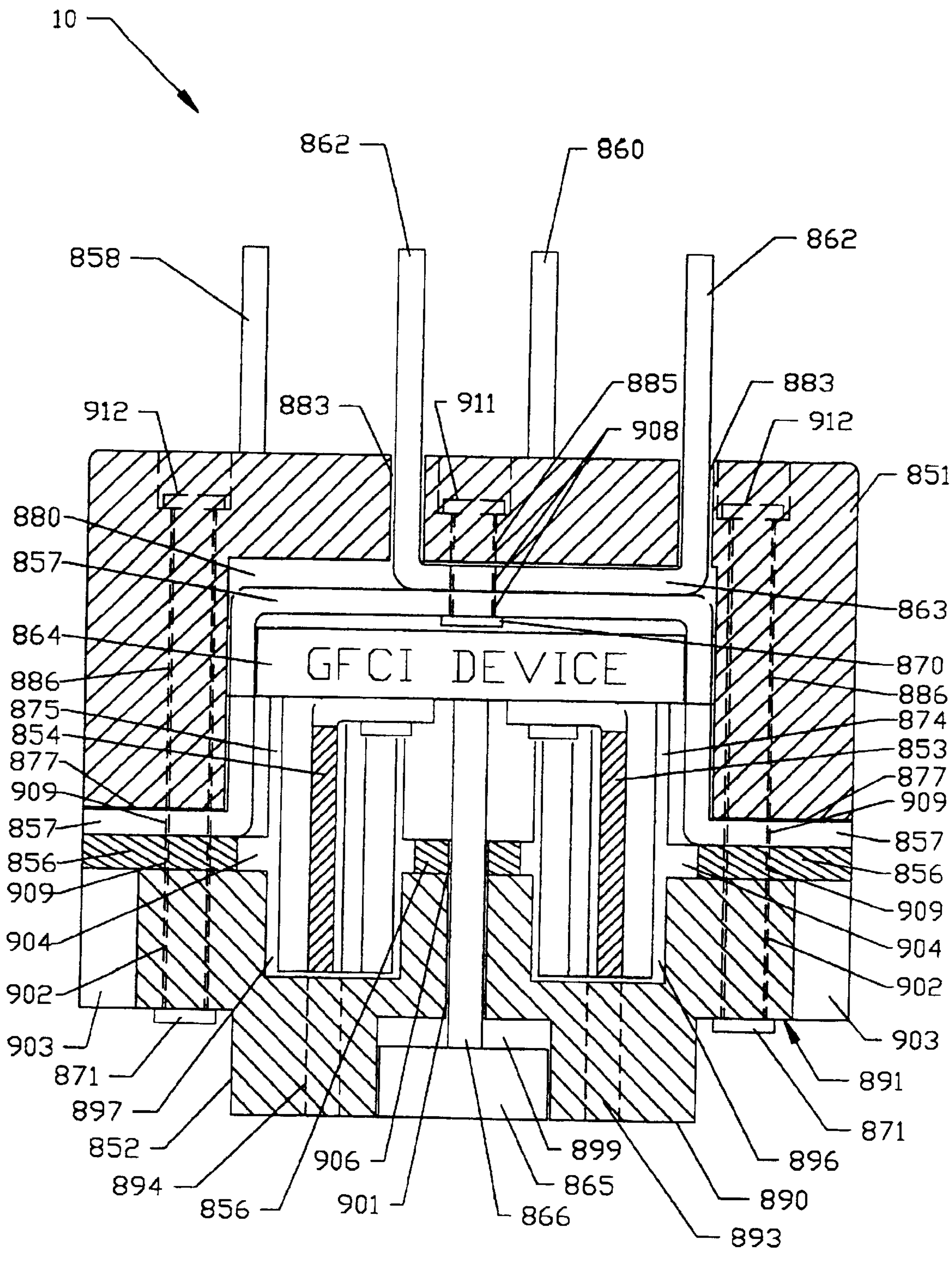
FIG. 73 is a horizontal section view taken along line 73—73 of FIG. 69.
Figure 74:
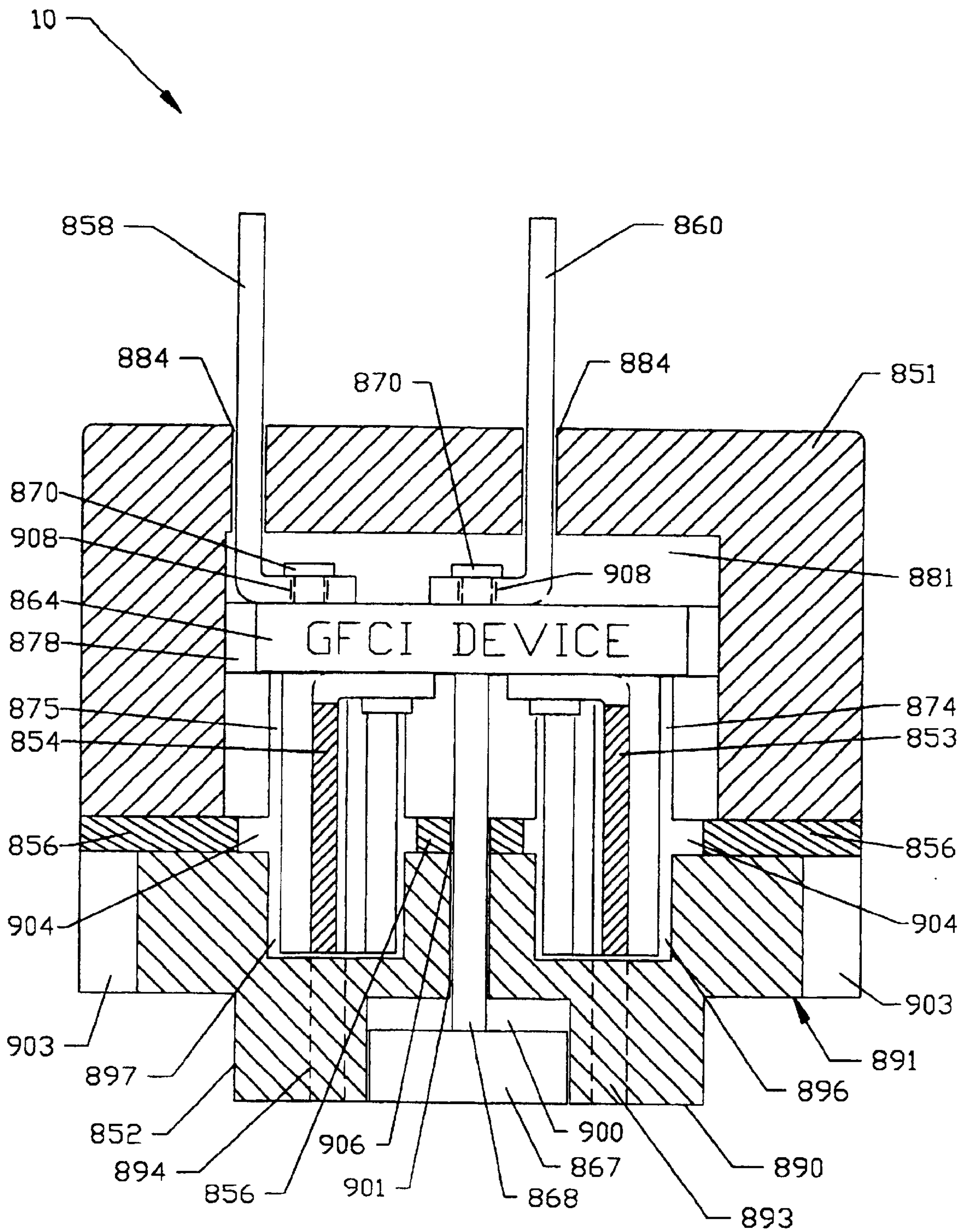
FIG. 74 is a horizontal section view taken along line 74—74 of FIG. 69.
Figure 75:
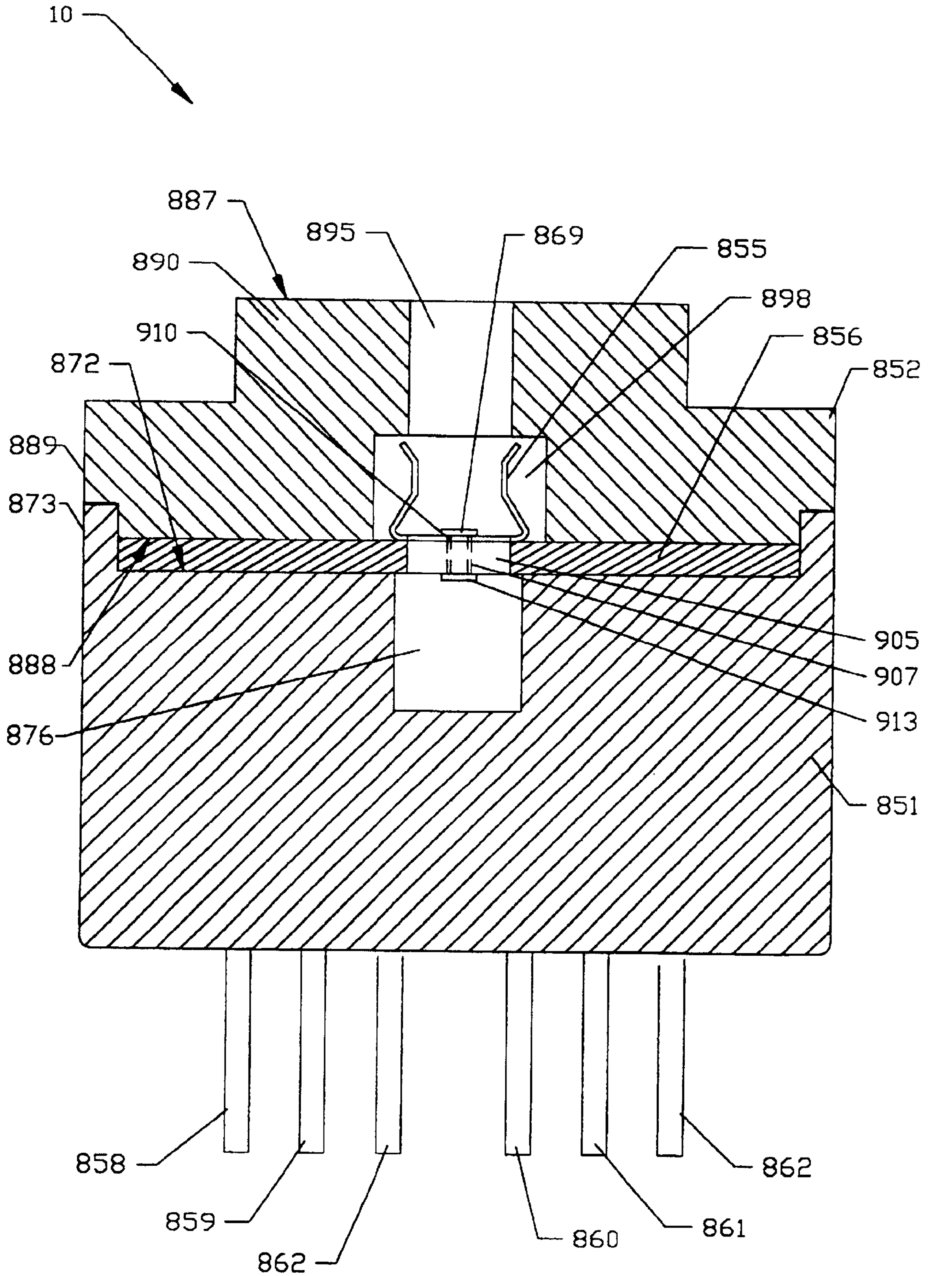
FIG. 75 is a horizontal section view taken along line 75—75 of FIG. 69.
Figure 76:
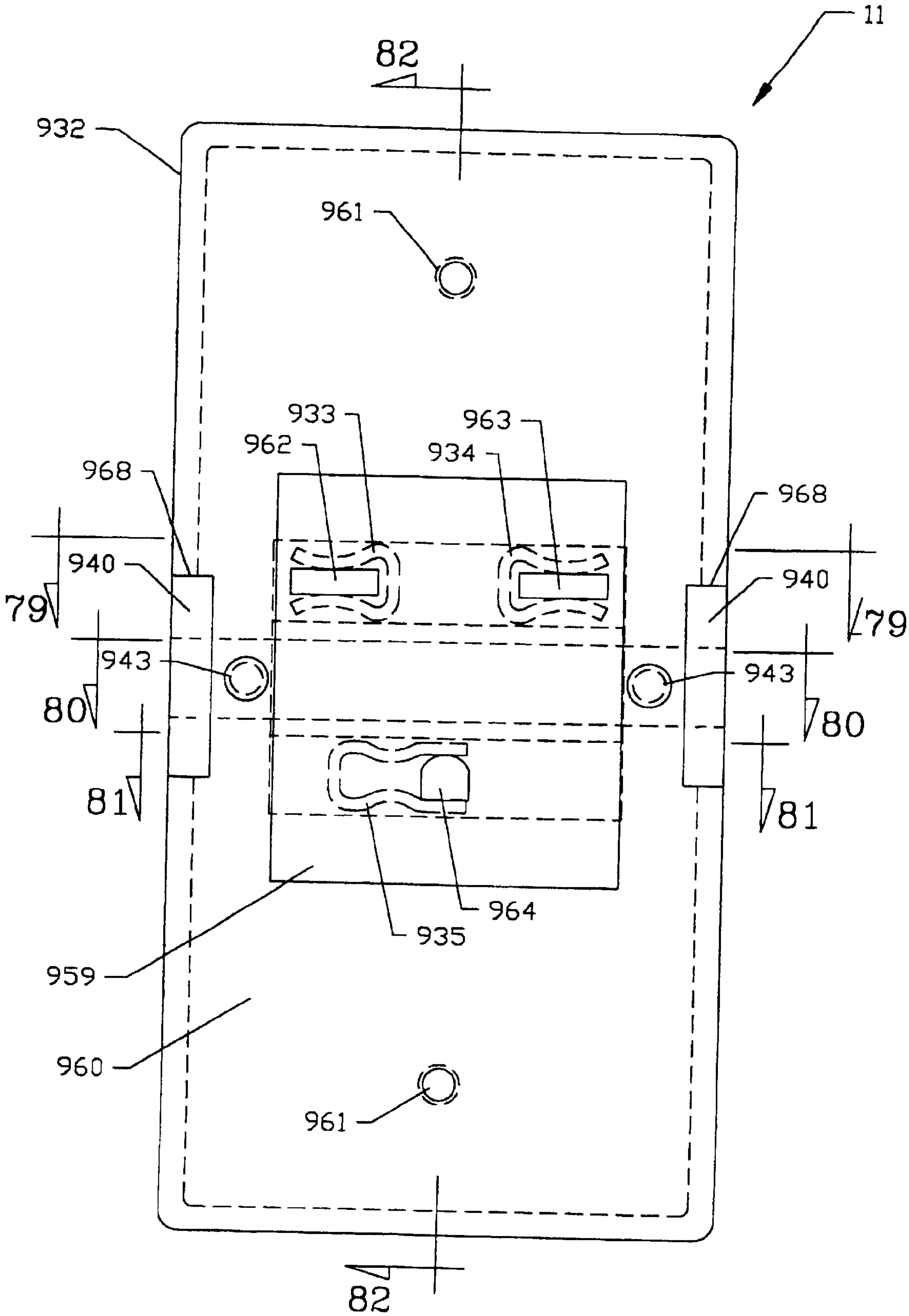
FIG. 76 is a front elevation view of the 240 volt receptacle module.
Figure 77:
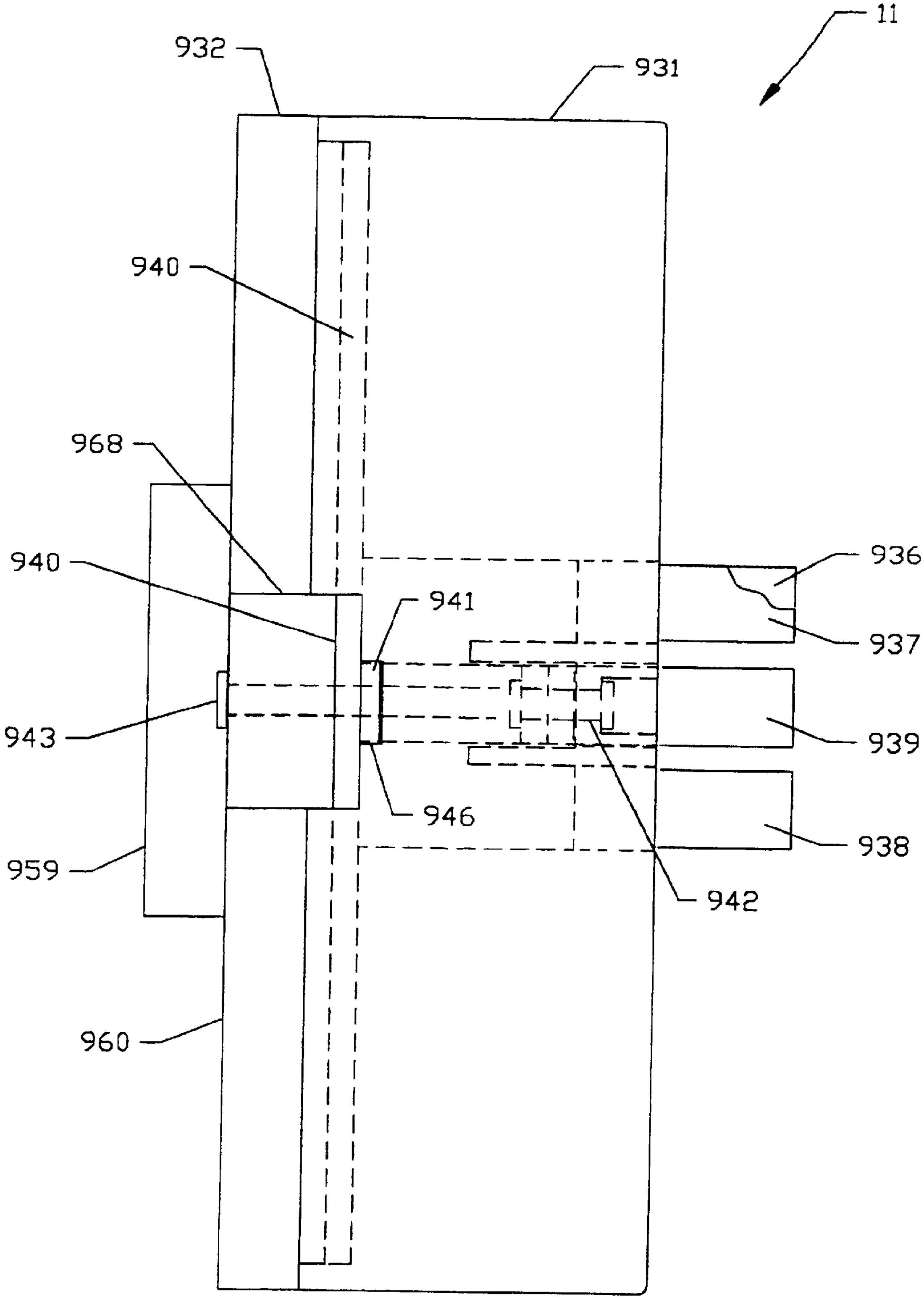
FIG. 77 is a side elevation view of the 240 volt receptacle module.
Figure 78:
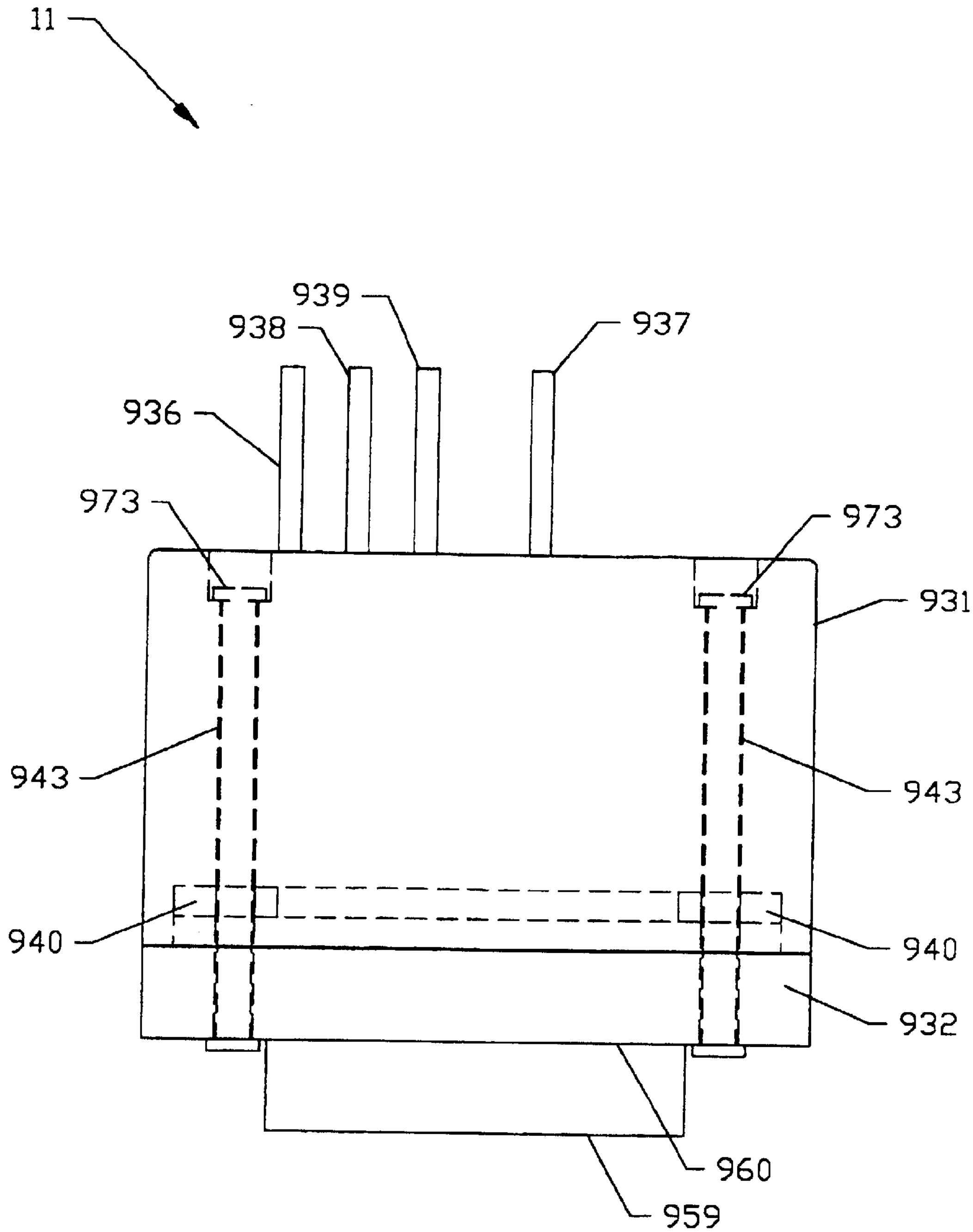
FIG. 78 is a plan view of the 240 volt receptacle module.
Figure 79:
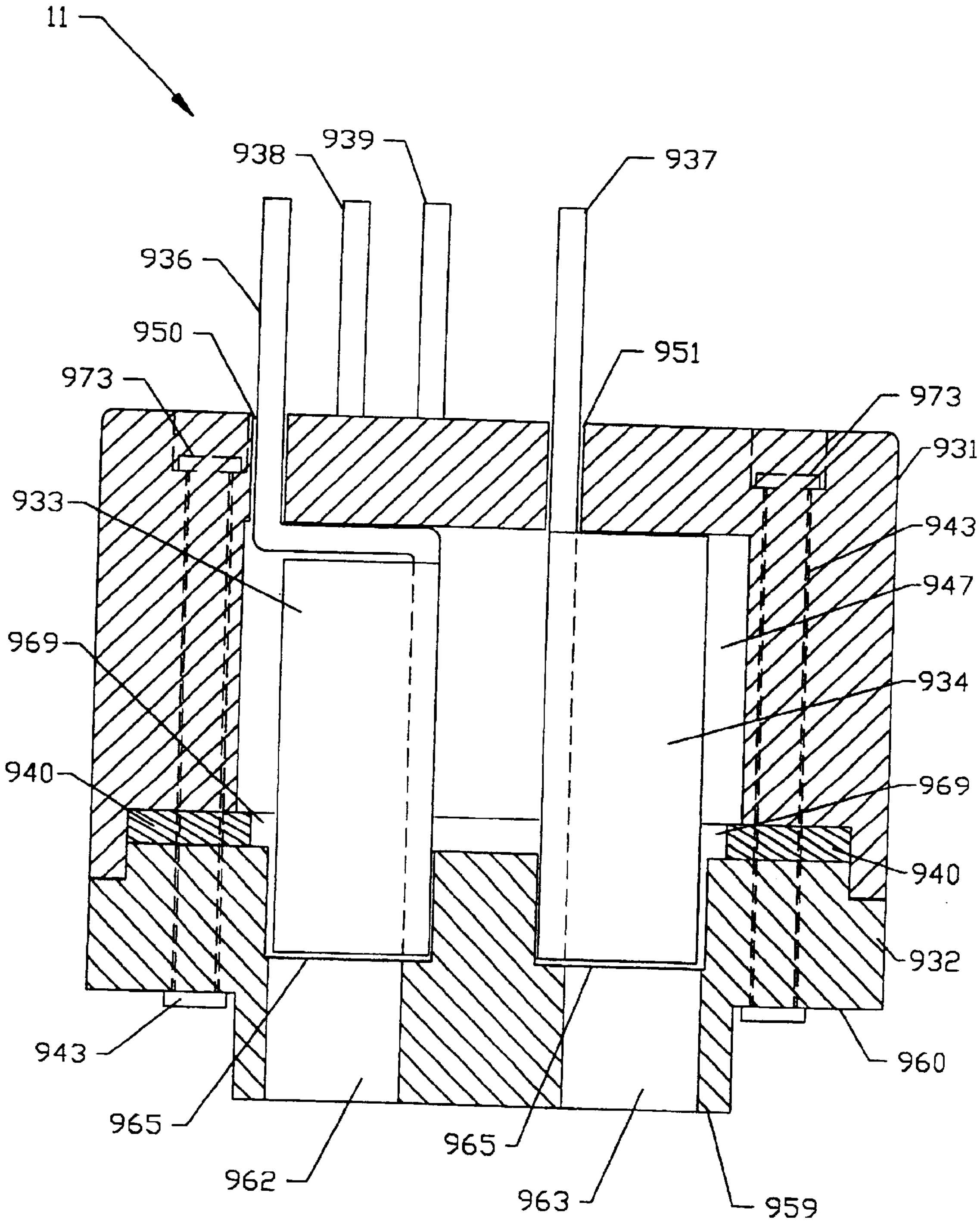
FIG. 79 is a horizontal section view taken along line 79—79 of FIG. 76.
Figure 80:
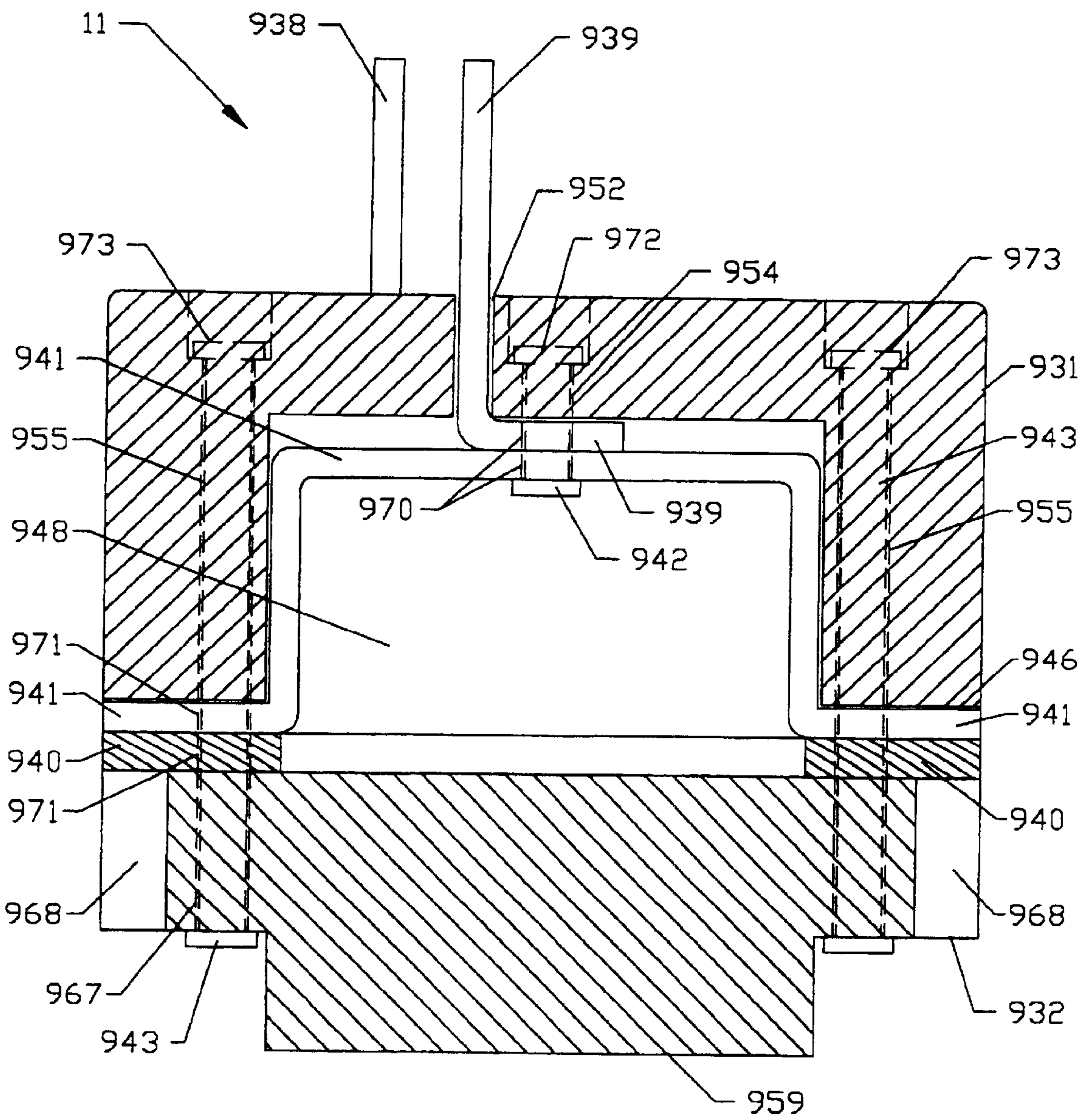
FIG. 80 is a horizontal section view taken along line 80—80 of FIG. 76.
Figure 81:
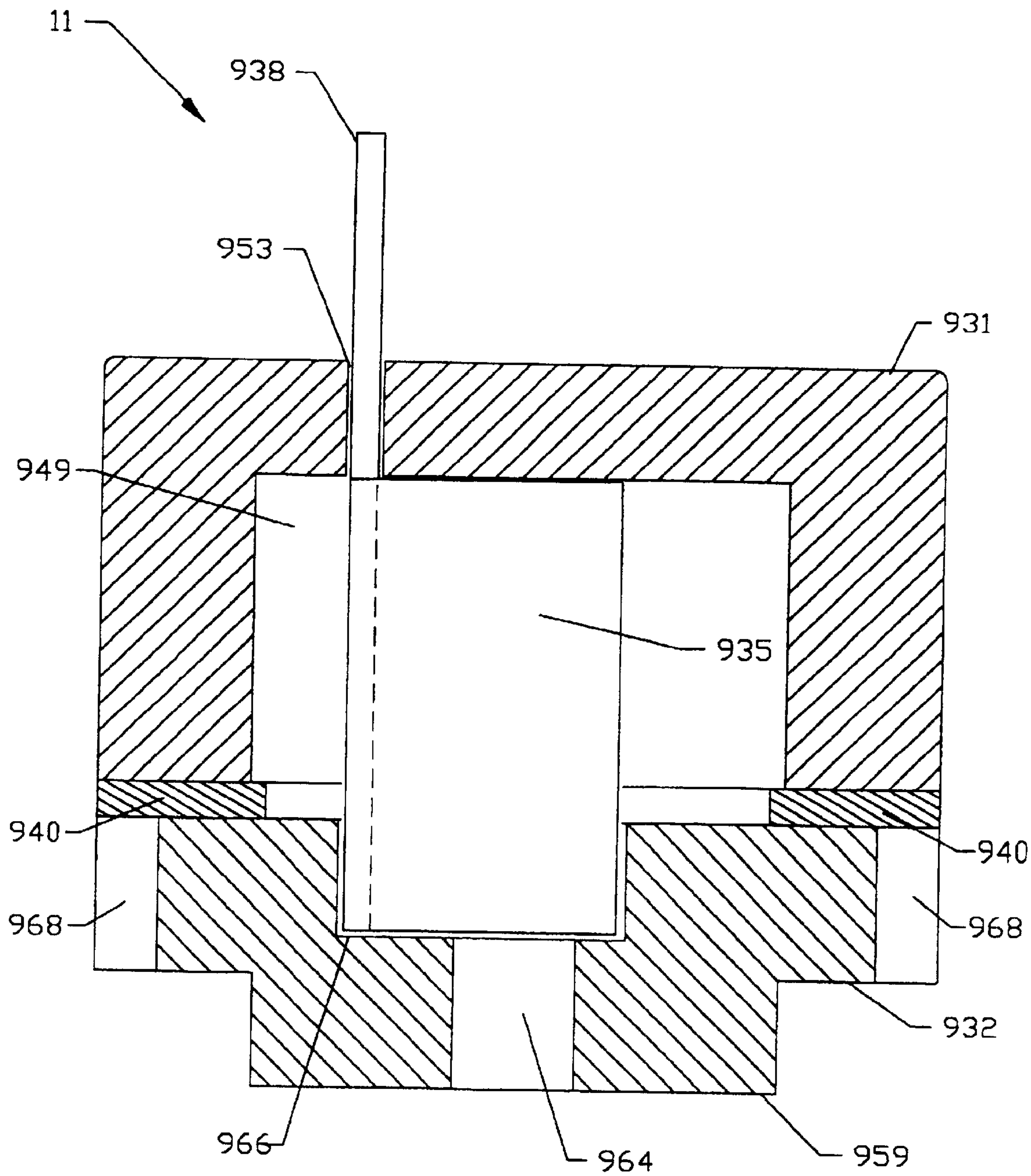
FIG. 81 is a horizontal section view taken along line 81—81 of FIG. 76.
Figure 82:
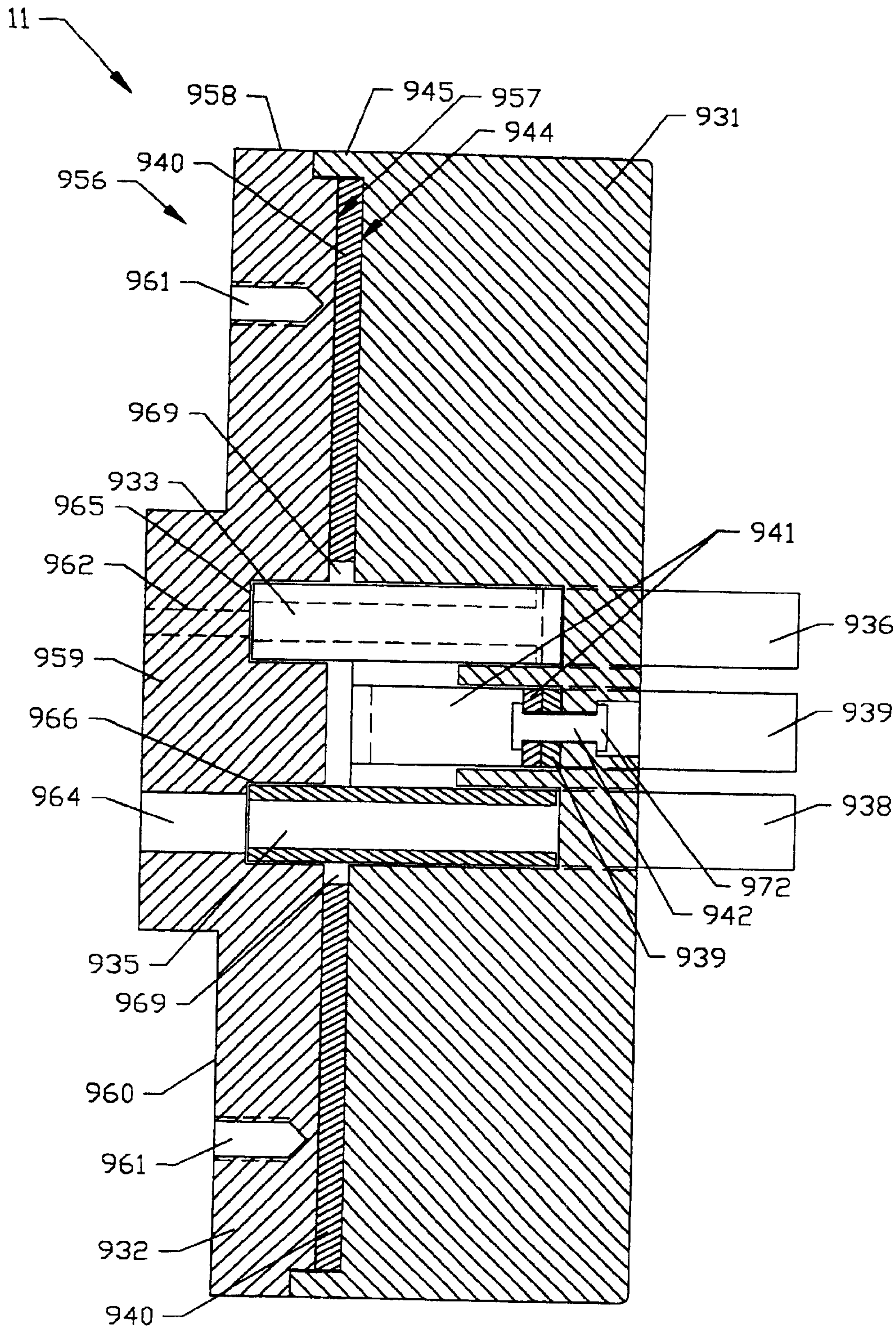
FIG. 82 is a vertical section view taken along line 82—82 of FIG. 76.
Figure 83:
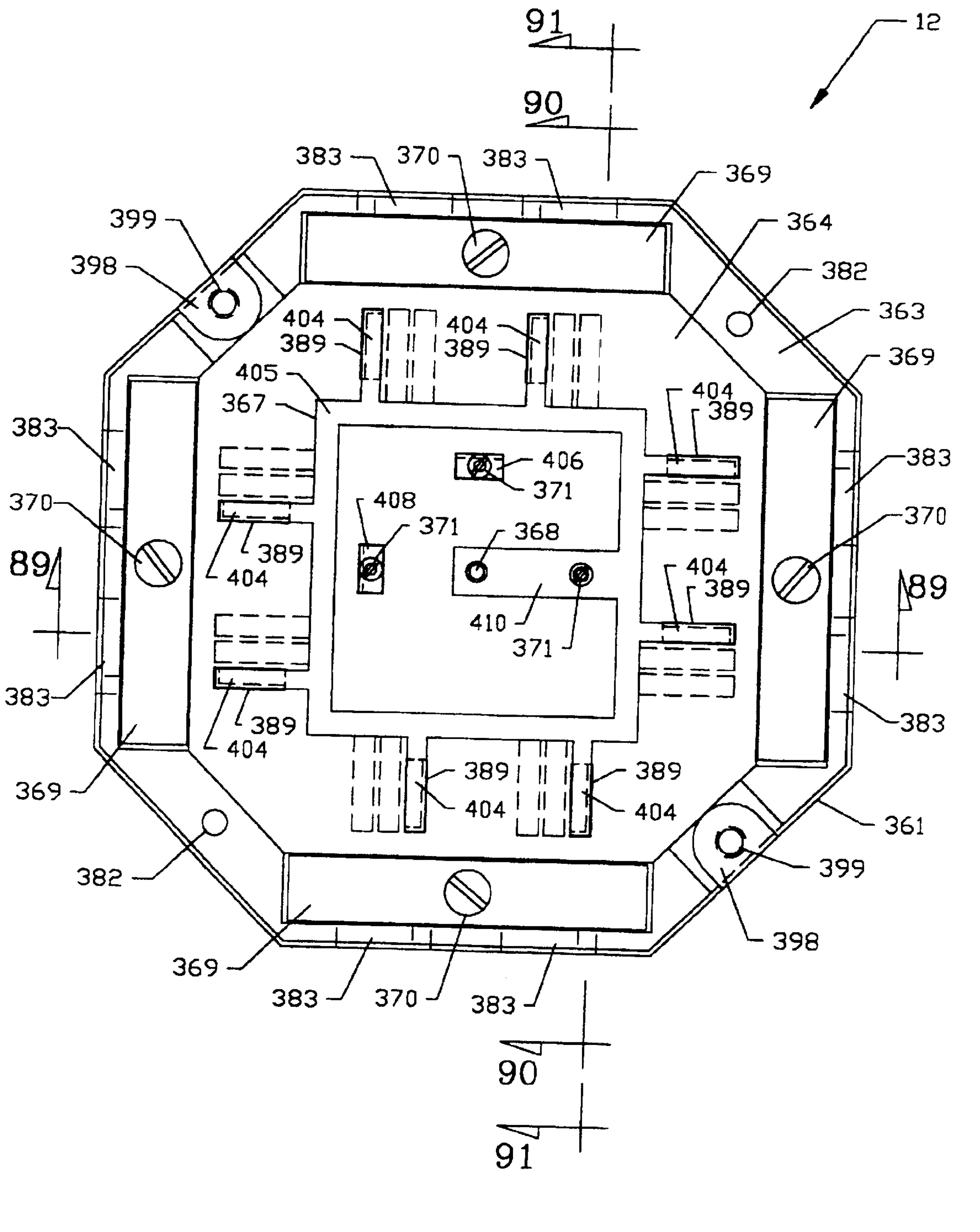
FIG. 83 is a front elevation view of the junction box.
Figure 84:
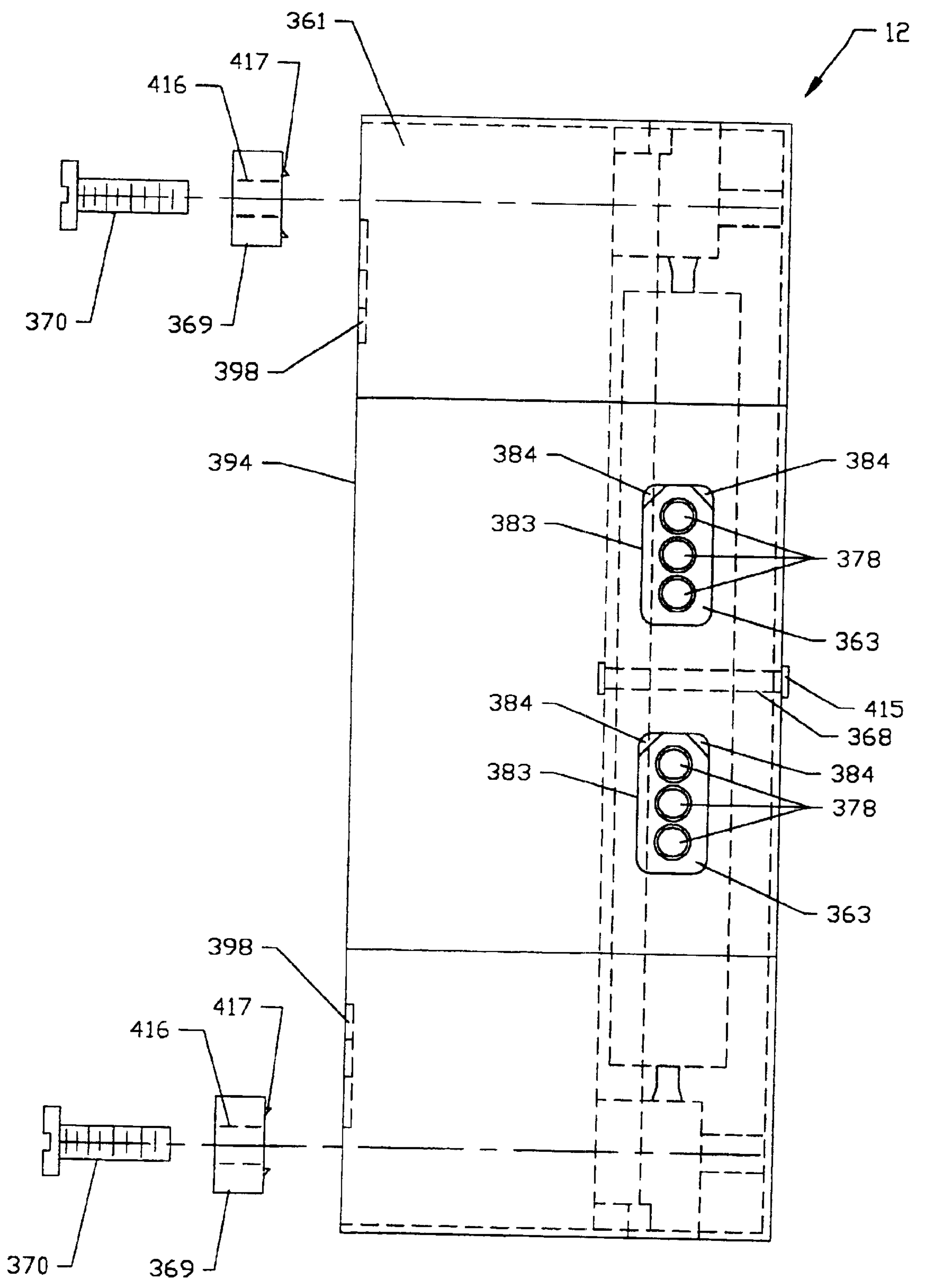
FIG. 84 is a side elevation view of the junction box.

The electrical box 21 may be constructed of steel or plastic. A cable hole 65 is provided in the top end 61 and bottom end 62 of the electrical box 21 and located in alignment with the cable ports 39, 42 of the wiring module base 23. Two rivet holes 63 are provided in the back wall 59 of the electrical box 21 to accommodate the rivets 32. Two mounting holes 64 are provided in each sidewall 60 of the electrical box 21 for mounting purposes. Plastic construction of the electrical box 21 permits the wiring module base 23 to be molded with the electrical box 21 as one piece, as shown in FIG. 6.

Figure 3:
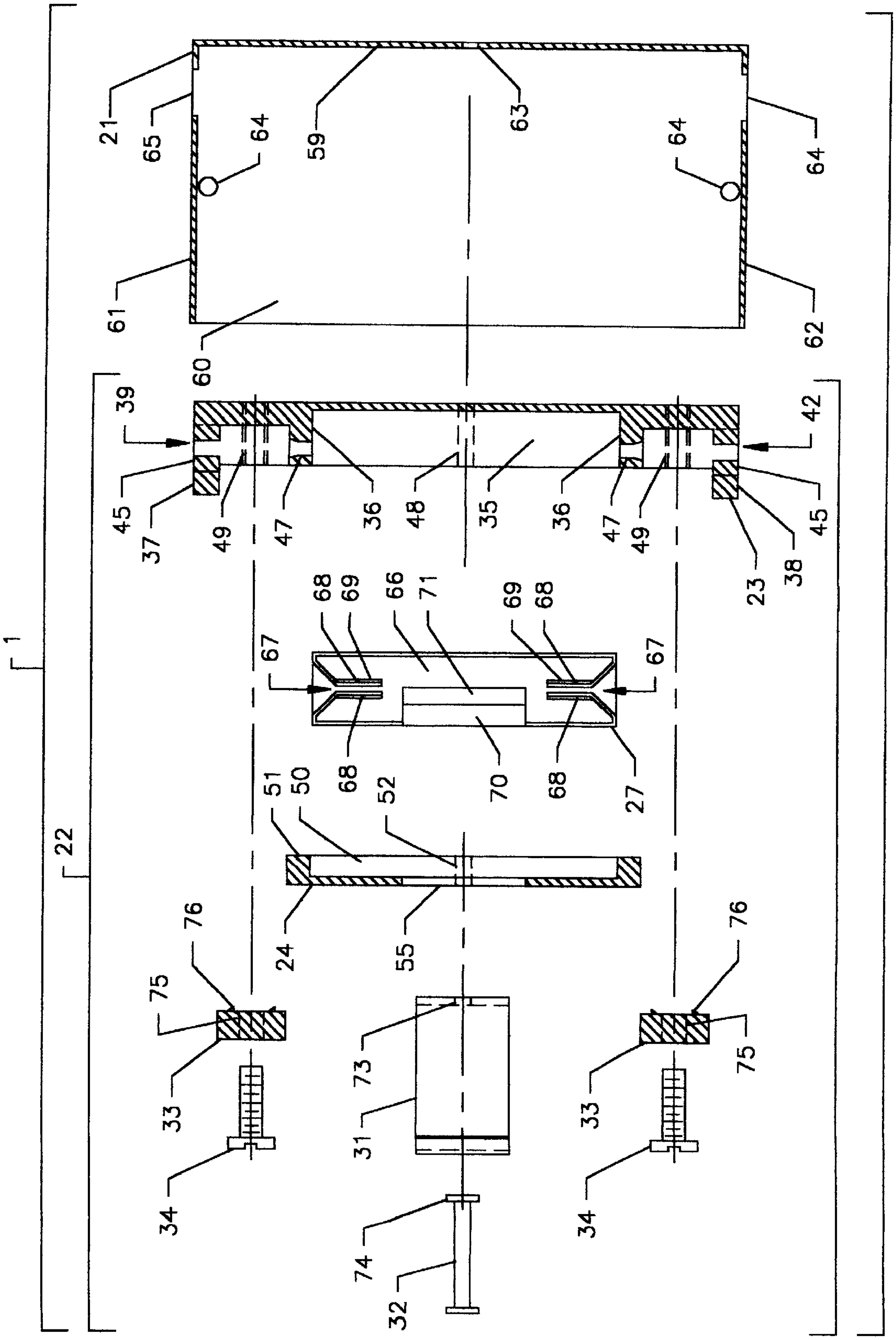
FIG. 3 is a vertical section view taken along line 3—3 of FIG. 1 shown in exploded form.
Figure 4:
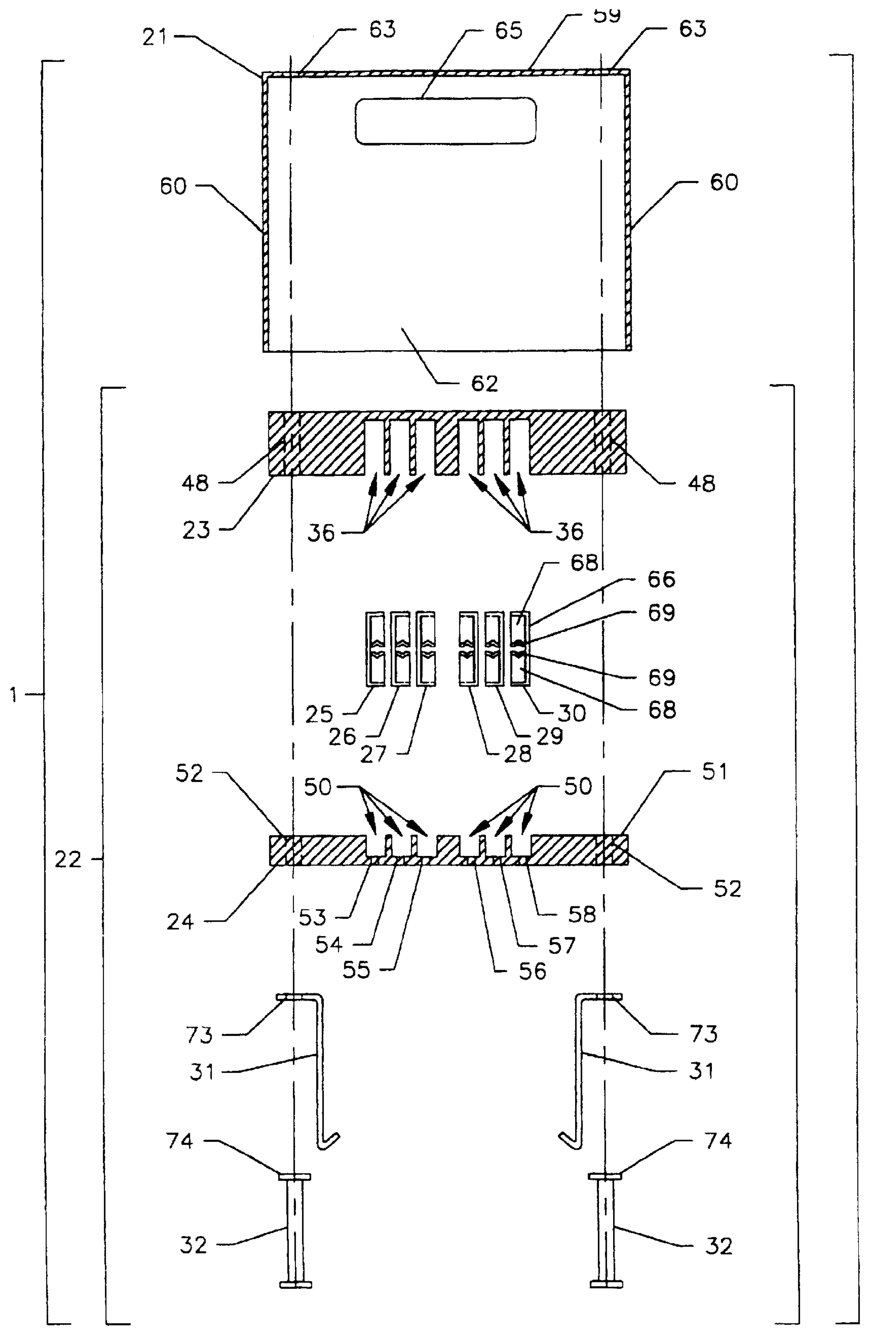
FIG. 4 is a horizontal section view taken along line 4—4 of FIG. 1 shown in exploded form.
Figure 5:
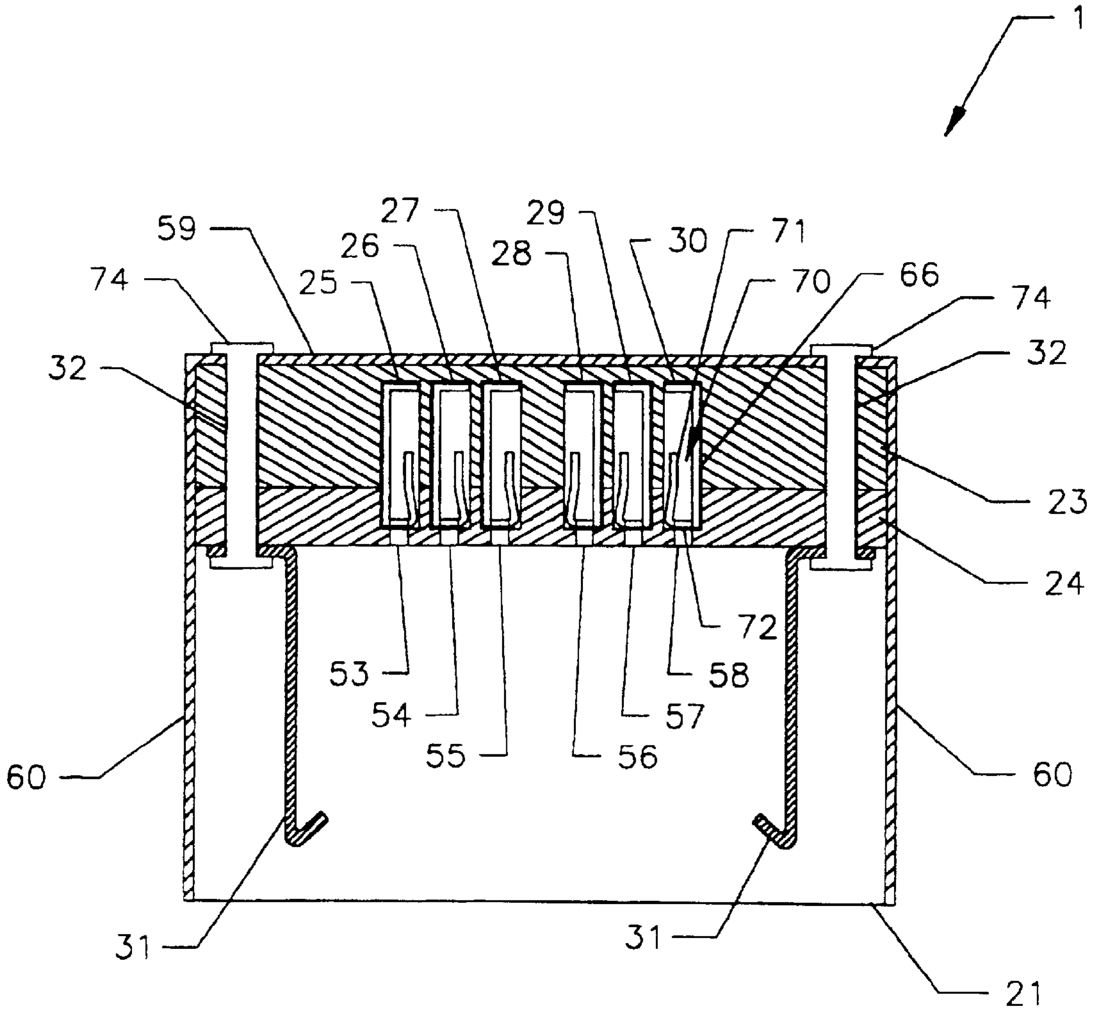
FIG. 5 is a horizontal section view taken along line 5—5 of FIG. 1.

Assembly of the wallbox 1 is easily seen in FIGS. 3 and 4. The wiring module base 23 is inserted into the electrical box 21. The six wire adapters 25, 26, 27, 28; 29, 30 are positioned into the wire adapter cavities 35 of the wiring module base 23. The wiring module cover 24 is then placed on top of the wiring module base 23. The rivets 32 are inserted through the rivet holes 73 of the spring clips 31, through the rivet holes 52 of the wiring module cover 24, through the rivet holes 48 of the wiring module base 23, and through the rivet holes 63 of the electrical box 21 where the rivet head 74 is expanded as it draws the components tightly together and secures the wallbox 1 as one assembly. Two screws 34 are inserted through the mounting holes 75 of each cable clamp 33 and into the threaded holes 49 of the wiring module base 23.

Referring to FIGS. 7 through 13, there is provided a receptacle module 2. The primary components of the receptacle module 2 are the receptacle module base 81, receptacle module cover 82, positive plug adapter 83, neutral plug adapter 84, two ground plug adapters 85, grounding plate 86, grounding bar 87, positive blade assembly 88, neutral blade assembly 89, and ground blade assembly 90.

The receptacle module base 81 is constructed of plastic, or otherwise a non-conductive material. The receptacle module base 81 provides a positive plug adapter cavity 96, a neutral plug adapter cavity 97, and three blade conductor cavities 100, 101, 102. The upper blade conductor cavity 100 is provided with two blade slots, 103, the middle blade conductor cavity 101 is provided with two blade slots 104, and the lower blade conductor cavity 102 is provided with two blade slots 105. Each of the three blade conductor cavities 100, 101, 102 are also provided with one rivet hole 106. The front surface 94 of the receptacle module base 81 is recessed relative to the outer edges 95 to accommodate the grounding plate 86 and the receptacle module cover 82. The front surface 94 contains two recessed cavities 99 to accommodate the grounding bar 87 and one ground plug cavity 98 to provide clearance under the ground plug adapter 85.

The receptacle module cover 82 is also constructed of plastic, or otherwise a non-conductive material. The front side 108 of the receptacle module cover 82 provides a wallplate mounting surface 112 which is recessed relative to the two receptacle faces 111. The receptacle faces 111 are shaped to industry standards to accommodate a standard electrical plug 136 and wallplate 134. Each receptacle race 111 provides a positive plug slot 114, a neutral plug slot 115, and a ground plug slot 116. The back side 109 of the receptacle module cover 82 provides a positive plug adapter cavity 117, a neutral plug adapter cavity 118, and two ground plug adapter cavities 119. The outer edges 110 of the receptacle module cover 82 are recessed on the back side 109 to accommodate the receptacle module base 81. The outer edges 110 are also provided with two spring-clip notches 121. The receptacle module cover 82 provides a threaded hole 113 to accommodate the wallplate mounting screw 135.

The positive plug adapter 83, neutral plug adapter 84, two ground plug adapters 85, grounding bar 87 positive blade assembly 88, neutral blade assembly 89, and ground blade assembly 90 are each of a one-piece formed construction as shown in FIGS. 7 through 13, and constructed of a copper alloy, or otherwise a conductive material. The positive blade assembly 88 provides two blade conductors 131, the neutral blade assembly 89 provides two blade conductors 132, and the ground blade assembly 90 provides two blade conductors 133.

The grounding plate 86 is constructed of steel and shaped to accommodate the receptacle module base 81. The grounding plate 86 provides two large openings 122 to avoid interference with the positive plug adapter 83 and the neutral plug adapter 84, and two holes 123 provide clearance under the ground plug adapters 85.

Assembly of the receptacle module 2 is performed as follows. The ground blade assembly 90 is fully inserted into the middle blade-conductor cavity 101 of the receptacle module base 81 until the blade conductors 133 protrude through the blade slots 104. The grounding bar 87 is then inserted into the middle blade-conductor cavity 101 until it is fully seated against the ground blade assembly 90. A short rivet 92 is then inserted through the rivet hole 125 of the grounding bar 87, through the rivet hole 125 of the ground blade assembly 90, and through the rivet hole 106 of the receptacle module base 81 where the rivet head 128 is expanded as it draws the components tightly together. The positive blade assembly 88 is fully inserted into the lower blade conductor cavity 102 of the receptacle module base 81 until the blade conductors 131 protrude through the blade slots 105. The positive plug adapter 83 is then inserted into the positive plug adapter cavity 96 until it is fully seated against the positive blade assembly 88. A short rivet 92 is then inserted through the rivet hole 125 of the positive plug adapter 83, through the rivet hole 125 of the positive blade assembly 88, and through the rivet hole 106 of the receptacle module base 81 where the rivet head 128 is expanded as it draws the components tightly together. The neutral blade assembly 89 is fully inserted into the upper blade-conductor cavity 100 of the receptacle module base 81 until the blade conductors 132 protrude through the blade slots 103. The neutral plug adapter 84 is then inserted into the neutral plug adapter cavity 97 until it is fully seated against the neutral blade assembly 89. A short rivet 92 is then inserted through the rivet hole 125 of the neutral plug adapter 84, through the rivet hole 125 of the neutral blade assembly 89, and through the rivet hole 106 of the receptacle module base 81 where the rivet head 128 is expanded as it draws the components tightly together. Each of the two ground plug adapters 85 are attached to the grounding plate 86 with a small rivet 91. The small rivet 91 is inserted through the rivet hole 127 of the ground plug adapter 85 and through the rivet hole 124 of the grounding plate 86 where the rivet head 130 is expanded as it draws the components tightly together. The grounding plate 86 is then inserted into the receptacle module base 81 until it is seated against the front surface 94. The receptacle module cover 82 is then placed onto the receptacle module base 81 until the back side 109 is seated against the grounding plate 86 and the outer edges 110 of the receptacle module cover 82 are nestled in the outer edges 95 of the receptacle module base 81, as the positive plug adapter 83, neutral plug adapter 84, and ground plug adapters 85, are nestled in the positive plug adapter cavity 117, neutral plug adapter cavity 118, and ground plug adapter cavities 119 of the receptacle module cover 82, respectively. Each of the two long rivets 93 are inserted through the rivet holes 120 of the receptacle module cover 82, through the rivet holes 126 in the grounding plate 86, through the rivet holes 126 in the grounding bar 87, and through the rivet holes 107 in the receptacle module base 81 where the rivet head 129 is expanded as it draws the components tightly together and secures the receptacle module 2 as one assembly.

Referring to FIGS. 14 through 19, there is provided a ganging module 3. The primary components of the ganging module 3 are the ganging module base 141, ganging module cover 142, grounding plate 143, grounding bar 144, positive blade assembly 145, neutral blade assembly 146, and ground blade assembly 147.

The ganging module base 141 is constructed of plastic, or otherwise a non-conductive material. The ganging module base 141 provides three blade-conductor cavities 153, 154, 155. The upper blade-conductor cavity 153 is provided with two blade slots 156, the middle blade-conductor cavity 154 is provided with two blade slots 157, and the lower blade-conductor cavity 155 is provided with two blade slots 158. Each of the three blade-conductor cavities 153, 154, 155 are also provided with one rivet hole 159. The front surface 150 of the ganging module base 141 is recessed relative to the outer edges 151 to accommodate the grounding plate 143 and the ganging module cover 142. The front surface 150 contains two recessed cavities 152 to accommodate the grounding bar 144.

The ganging module cover 142 is also constructed of plastic, or otherwise a non-conductive material. The front side 161 of the ganging module cover 142 provides a wallplate mounting surface 164. The outer edges 163 of the ganging module cover 142 are recessed on the back side 162 to accommodate the ganging module base 141. The outer edges 163 are also provided with two spring clip notches 167. The ganging module cover 142 provides a threaded hole 165 to accommodate the wallplate mounting screw 176.

The grounding bar 144, positive blade assembly 145, neutral blade assembly 146, and ground blade assembly 147 are each of a one-piece formed construction as shown in FIGS. 14 through 19, and constructed of a copper alloy, or otherwise a conductive material. The positive blade assembly 145 provides two blade conductors 172, the neutral blade assembly 146 provides two blade conductors 173, and the ground blade assembly 147 provides two blade conductors 174. The grounding plate 143 is constructed of steel and shaped to accommodate the ganging module base 141.

Assembly of the ganging module 3 is performed as follows. The ground blade assembly 147 is fully inserted into the middle blade-conductor cavity 154 of the ganging module base 141 until the blade conductors 174 protrude through the blade slots 157. The grounding bar 144 is then inserted into the middle blade-conductor cavity 154 until it is fully seated against the ground blade assembly 147. A short rivet 148 is then inserted through the rivet hole 168 of the grounding bar 144, through the rivet hole 168 of the ground blade assembly 147, and through the rivet hole 159 of the ganging module base 141 where the rivet head 170 is expanded as it draws the components tightly together. The positive blade assembly 145 is fully inserted into the lower blade-conductor cavity 155 of the ganging module base 141 until the blade conductors 172 protrude through the blade slots 158. A short rivet 148 is then inserted through the rivet hole 168 of the positive blade assembly 145, and through the rivet hole 159 of the ganging module base l41 where the rivet head 170 is expanded as it draws the components tightly together. The neutral blade assembly 146 is fully inserted into the upper blade-conductor cavity 153 of the ganging module base 141 until the blade conductors 173 protrude through the blade slots 156. A short rivet 148 is then inserted through the rivet hole 168 of the neutral blade assembly 146, and through the rivet hole 159 of the ganging module base 141 where the rivet head 170 is expanded as it draws the components tightly together. The grounding plate 143 is then inserted into the ganging module base 141 until it is seated against the front surface 150. The ganging module cover 142 is then placed onto the ganging module base 141 until the back side 162 is seated against the grounding plate 143 and the outer edges 163 of the ganging module cover 142 are nestled in the outer edges 151 of the ganging module base 141. Each of the two long rivets 149 are inserted through the rivet holes 166 of the ganging module cover 142, through the rivet holes 169 in the grounding plate 143, through the rivet holes 169 in the grounding bar 144 and through the rivet holes 160 in the ganging module base 141 where the rivet head 171 is expanded as it draws the components tightly together and secures the ganging module 3 as one assembly.

Referring to FIGS. 20 through 27, there is provided a 2-way-switch module 4. The primary, components of the 2-way-switch module 4 are the switch module base 181, switch module cover 182, grounding plate 183, grounding bar 184, switch-arm assembly 185, switch-contact assembly 186, ground blade conductor 187, spring retainer 188, compression spring 189, and the lever 190.

The switch module base 181 is constructed of plastic, or otherwise a non-conductive material. The switch module base 181 provides two switch-arm cavities 195, 196 and two switch-contact cavities 197, 198. The switch module base 181 also provides three blade-conductor cavities 200, 201, 202, The upper blade-conductor cavity 200 is provided with one blade slot 203, the middle blade-conductor cavity 201 is provided with one blade slot 204, and the lower blade-conductor cavity 202 is provided with one blade slot 205. The middle blade-conductor cavity 201 is also provided with one rivet hole 206. The front surface 193 of the switch module base 181 is recessed relative to the outer edges 194 to accommodate the switch module cover 182. The front surface 193 contains two recessed cavities 199 to accommodate the grounding bar 184

The switch module cover 182 is also constructed of plastic, or otherwise a non-conductive material. The outer edges 210 of the switch module cover 182 are provided with two spring-clip notches 213 and the front side 208 is shaped to accommodate the grounding plate 183. The outer edges 210 of the switch module cover 182 are recessed on the back side 209 to accommodate the switch module base 181. The back side 209 of the switch module cover 182 provides a switch-arm cavity 211, a switch-contact cavity 212, and a lever cavity 214. The lever cavity 214 provides two pivot rod sockets 215 and a lever handle slot 216.

The grounding bar 184, switch-arm assembly 185, switch-contact assembly 186, ground blade conductor 187, and spring retainer 188 are each of a one-piece formed construction as shown in FIGS. 20 through 27, and constructed of a copper alloy, or otherwise a conductive material. The switch-arm assembly 185 provides a blade conductor 227 and a switch-arm 225. The switch-arm 225 provides a contact tip 226 which is constructed of a silver alloy for longer wear life, The switch-contact assembly 186 provides a blade conductor 228 and a contact tip 226.

The grounding plate 183 is constructed of steel and shaped to accommodate the switch module cover 182. The grounding plate 183 provides a hole 218 to accommodate the lever bezel 217 on the switch module cover 182. The grounding plate 183 also provides two threaded holes 219 located to conform to industry standards and accommodate a standard switch wallplate 234.

The lever 190 is of a one-piece molded plastic construction, or otherwise a non-conductive material. The lever 190 consists of a handle 220 which is attached to a pivot rod 221. The ends 224 of the pivot rod 221 are slanted to assist assembly. The spring actuator 223 and the switch-arm actuator 222 are attached to the pivot rod 221 opposite from the handle 220.

Assembly of the 2-way-switch module 4 is performed as follows. The ground blade conductor 187 is fully inserted into the middle blade-conductor cavity 201 of the switch module base 181 until it protrudes through the blade slot 204. The grounding bar 184 is then inserted into the middle blade-conductor cavity 201 until it is fully seated against the ground blade conductor 187. The spring retainer 188 is inserted into the middle blade-conductor cavity 201 until it is seated against the grounding bar 184. A short rivet 191 is then inserted through the rivet hole 229 of the spring retainer 188, through the rivet hole 229 of the grounding bar 184, through the rivet hole 229 of the ground blade conductor 187, and through the rivet hole 206 of the switch module base 181 where the rivet head 231 is expanded as it draws the components tightly together. The switch-arm assembly 185 is fully inserted into the left switch-arm cavity 195 and the lower blade-conductor cavity 202 of the switch module base 181 until the blade conductor 227 protrudes through the blade slot 205. The switch-contact assembly 186 is fully inserted into the left switch-contact cavity 197 and the upper blade-conductor cavity 200 of the switch module base 181 until the blade conductor 228 protrudes through the blade slot 203. The compression spring 189 is inserted into the spring retainer 188. The lever 190 is inserted into the lever cavity 214 of the switch module cover 182 until the pivot-rod ends 224 snap into the pivot-rod sockets 215. The switch module cover 182 is then placed onto the switch module base 181 until the back side 209 of the switch module cover 182 is seated against the front surface 193 of the switch module base 181 and the outer edges 210 of the switch module cover 182 are nestled in the outer edges 194 of the switch module base 181 with the spring actuator 223 of the lever 190 properly engaged with the compression spring 189 and the switch-arm assembly 185 and the switch-contact assembly 186 nestled in the switch-arm cavity 211 and the switch-contact cavity 212 of the switch module cover 182, respectively. The grounding plate 183 is then placed over the switch module cover 182. Each of the two long rivets 192 are inserted through the rivet holes 230 in the grounding plate 183, through the rivet holes 230 in the grounding bar 184, and through the rivet holes 207 in the switch module base 181 where the rivet head 232 is expanded as it draws the components tightly together and secures the 2-way-switch module 4 as one assembly.

Referring to FIGS. 28 through 37, there is provided a 3-way-switch module 5. The primary components of the 3-way-switch module 5 are the switch module base 241, switch module cover 242, grounding plate 243, grounding bar 244, switch-arm assembly 245, left switch-contact assembly 246, right switch-contact assembly 247, ground blade conductor 248, spring retainer 249, compression spring 250, and the lever 251.

The switch module base 241 is constructed of plastic, or otherwise a non-conductive material. The switch module base 241 provides two switch-arm cavities 256, 257 and two switch-contact cavities 258, 259. The switch module base 241 also provides three blade-conductor cavities 261, 262, 263. The upper blade-conductor cavity 261 is provided with two blade slots 264, 265, the middle blade-conductor cavity 262 is provided with one blade slot 266, and the lower blade-conductor cavity 263 is provided with one blade slot 267. The middle blade-conductor cavity 262 is also provided with one rivet hole 268. The front surface 254 of the switch module base 241 is recessed relative to the outer edges 255 to accommodate the switch module cover 242. The front surface 254 contains two recessed cavities 260 to accommodate the grounding bar 244.

The switch module cover 242 is also constructed of plastic, or otherwise a non-conductive material. The outer edges 272 of the switch module cover 242 are provided with two spring-clip notches 275 and the front side 270 is shaped to accommodate the grounding plate 243. The outer edges 272 of the switch module cover 242 are recessed on the back side 271 to accommodate the switch module base 241. The back side 271 of the switch module cover 242 provides a switch-arm cavity 273, a switch-contact cavity 274, and a lever cavity 276. The lever cavity 276 provides two pivot rod sockets 277 and a lever handle slot 278.

The grounding bar 244, switch-arm assembly 245, left switch-contact assembly 246, right switch-contact assembly 247, ground blade conductor 248, and spring retainer 249 are each of a one-piece formed construction as shown in FIGS. 28 through 37, and constructed of a copper alloy, or otherwise a conductive material. The switch-arm assembly 245 is provided with a blade conductor 291 and two switch arms 288, 289. The two switch arms 288, 289 are each provided with a contact tip 290 which is constructed of a silver alloy for longer wear life. The left switch-contact assembly 246 and the right switch-contact assembly 247 each provide a blade conductor 292, 293 and a contact tip 290.

The grounding plate 243 is constructed of steel and shaped to accommodate the switch module cover 242. The grounding plate 243 provides a hole 280 to accommodate the lever bezel 279 on the switch module cover 242. The grounding plate 243 also provides two threaded holes 281 located to conform to industry standards and accommodate a standard switch wallplate 234.

The lever 251 is of a one-piece molded plastic construction, or otherwise a non-conductive material. The lever 251 consists of a handle 282 which is attached to a pivot rod 283. The ends 287 of the pivot rod 283 are slanted to assist assembly. The spring actuator 286 and the two switch-arm actuators 284, 285 are attached to the pivot rod 283 opposite from the handle 282.

Assembly of the 3-way-switch module 5 is performed as follows. The ground blade conductor 248 is fully inserted into the middle blade-conductor cavity 262 of the switch module base 241 until it protrudes through the blade slot 266. The grounding bar 244 is then inserted into the middle blade-conductor cavity 262 until it is fully seated against the ground blade conductor 248. The spring retainer 249 is inserted into the middle blade conductor cavity 262 until it is seated against the grounding bar 244. A short rivet 252 is then inserted through the rivet hole 294 of the spring retainer 249, through the rivet hole 294 of the grounding bar 244, through the rivet hole 294 of the ground blade conductor 248, and through the rivet hole 268 of the switch module base 241 where the rivet head 296 is expanded as it draws the components tightly together. The switch-arm assembly 245 is fully inserted into the switch-arm cavities 256, 257 and the lower blade-conductor cavity 263 of the switch module base 241 until the blade conductor 291 protrudes through the blade slot 267. The left switch-contact assembly 246 is fully inserted into the left switch-contact cavity 258 and the upper blade-conductor cavity 261 of the switch module base 241 until the blade conductor 292 protrudes through the left blade slot 264. The right switch-contact assembly 247 is fully inserted into the right switch-contact cavity 259 and the upper blade-conductor cavity 261 of the switch module base 241 until the blade conductor 293 protrudes through the right blade slot 265. The compression spring 250 is inserted into the spring retainer 249. The lever 251 is inserted into the lever cavity 276 of the switch module cover 242 until the pivot-rod ends 287 snap into the pivot-rod sockets 277. The switch module cover 242 is then placed onto the switch module base 241 until the back side 271 of the switch module cover 242 is seated against the front surface 254 of the switch module base 241 and the outer edges 272 of the switch module cover 242 are nestled in the outer edges 255 of the switch module base 241 with the spring actuator 286 of the lever 251 properly engaged with the compression spring 250 and the switch-arm assembly 245 and the switch-contact assemblies 246, 247 nestled in the switch-arm cavity 273 and the switch-contact cavity 274 of the switch module cover 242, respectively. The grounding plate 243 is then faced over the switch module cover 242. Each of the two long rivets 253 are inserted through the rivet holes 295 in the grounding plate 243, through the rivet holes 295 in the grounding bar 244, and through the rivet holes 269 in the switch module base 241 where the rivet head 297 is expanded as it draws the components tightly together and secures the 3-way-switch module 5 as one assembly.

Referring to FIGS. 38 through 47, there is provided a 4-way-switch module 6. The primary components of the 4-way-switch module 6 are the switch module base 301, switch module cover 302, grounding plate 303, grounding bar 304, left switch-arm assembly 305, right switch-arm assembly 306, left switch-contact assembly 307, right switch-contact assembly 308, ground blade conductor 309, spring retainer 310, compression spring 311, and tie lever 312.

The switch module base 301 is constructed of plastic, or otherwise a non-conductive material. The switch module base 301 provides two switch-arm cavities 317, 318 and two switch-contact cavities 319, 320. The switch module base 301 also provides three blade-conductor cavities 322, 323, 324. The upper blade-conductor cavity 322 is provided with two blade slots 325, 326, the middle blade-conductor cavity 323 is provided with one blade slot 327, and the lower blade-conductor cavity 324 is provided with two blade slots 328, 329. The three blade-conductor cavities 322, 323, 324 are each provided with one rivet hole 330. The front surface 315 of the switch module base 301 is recessed relative to the outer edges 316 to accommodate the switch module cover 302. The front surface 315 contains two recessed cavities 321 to accommodate the grounding bar 304.

The switch module cover 302 is also constructed of plastic, or otherwise a non-conductive material. The outer edges 334 of the switch module cover 302 are provided with two spring-clip notches 337 and the front side 332 is shaped to accommodate the grounding plate 303. The outer edges 334 of the switch module cover 302 are recessed on the back side 333 to accommodate the switch module base 301. The back side 333 of the switch module cover 302 provides a switch-arm cavity 335, a switch-contact cavity 336, and a lever cavity 338. The lever cavity 338 provides two pivot rod sockets 339 and a lever handle slot 340.

The grounding bar 304, left switch-arm assembly 305, right switch-arm assembly 306, left switch-contact assembly 307, right switch-contact assembly 308, ground blade conductor 309, and spring retainer 310 are each of a one-piece formed construction as shown in FIGS. 38 through 47, and constructed of a copper alloy, or otherwise a conductive material. The switch-arm assemblies 305, 306 are each provided with a blade conductor 353, 354 and a switch arm 350, 351. The two switch arms 350, 351 are each provided with a contact tip 352 which is constructed of a silver alloy for longer wear life. The left switch-contact assembly 307 and the right switch-contact assembly 308 each provide a blade conductor 355, 356 and a contact tip 352.

The grounding plate 303 is constructed of steel and shaped to accommodate the switch module cover 302. The grounding plate 303 provides a hole 342 to accommodate the lever bezel 341 on the switch module cover 302. The grounding plate 303 also provides two threaded holes 343 located to conform to industry standards and accommodate a standard switch wallplate 234.

The lever 312 is of a one-piece molded plastic construction, or otherwise a non-conductive material. The lever 312 consists of a handle 344 which is attached to a pivot rod 345. The ends 349 of the pivot rod 345 are slanted to assist assembly. The spring actuator 348 and the two switch-arm actuators 346, 347 are attached to the pivot rod 345 opposite from the handle 344.

Assembly of the 4-way-switch module 6 is performed as follows. The ground blade conductor 309 is fully inserted into the middle blade-conductor cavity 323 of the switch module base 301 until it protrudes through the blade slot 327. The grounding bar 304 is then inserted into the middle blade-conductor cavity 323 until it is fully seated against the ground blade conductor 309. The spring retainer 310 is inserted into the middle blade-conductor cavity 323 until it is seated against the grounding bar 304. A short rivet 313 is then inserted through the rivet hole 357 of the spring retainer 310, through the rivet hole 357 of the grounding bar 304, through the rivet hole 357 of the ground blade conductor 309, and through the rivet hole 330 of the switch module base 301 where the rivet head 359 is expanded as it draws the components tightly together. The left switch-contact assembly 307 is fully inserted into the left switch-contact cavity 319 and the upper blade-conductor cavity 322 of the switch module base 301 until the blade conductor 355 protrudes through the left blade slot 325. A short rivet 313 is then inserted through the rivet hole 357 of the left switch-contact assembly 307, and through the rivet hole 330 of the switch module base 301 where the rivet head 359 is expanded as it draws the components tightly together. The right switch-arm assembly 306 is fully inserted into the right switch-arm cavity 318 and the lower blade-conductor, cavity 324 of the switch module base 301 until the blade conductor 354 protrudes through the right blade slot 329. A short rivet 313 is then inserted through the rivet hole 357 of the right switch-arm assembly 306, and through the rivet hole 330 of the switch module base 301 where the rivet head 359 is expanded as it draws the components tightly together. The left switch-arm assembly 305 is fully inserted into the left switch-arm cavity 317 and the lower blade-conductor cavity 324 of the switch module base 301 until the blade conductor 353 protrudes through the left blade slot 328. The right switch-contact assembly 308 is fully inserted into the right switch-contact cavity 320 and the upper blade-conductor cavity 322 of the switch module base 301 until the blade conductor 356 protrudes through the right blade slot 326. The compression spring 311 is inserted into the spring retainer 310 The lever 312 is inserted into the lever cavity 338 of the switch module cover 302 until the pivot-rod ends 349 snap into the pivot-rod sockets 339. The switch module cover 302 is then placed onto the switch module base 301 until the back side 333 of the switch module cover 302 is seated against the front surface 315 of the switch module base 301 and the outer edges 334 of the switch module cover 302 are nestled in the outer edges 316 of the switch module base 301 with the spring actuator 348 of the lever 312 properly engaged with the compression spring 311 and the switch-arm assemblies 305, 306 and the switch-contact assemblies 307, 308 nestled in the switch-arm cavity 335 and the switch-contact cavity 336 of the switch module cover 302, respectively. The grounding plate 303 is then placed over the switch module cover 302. Each of the two long rivets 314 are inserted through the rivet holes 358 in the grounding plate 303, through the rivet holes 358 in the grounding bar 304, and through the rivet holes 331 in the switch module base 301 where the rivet head 360 is expanded as it draws the components tightly together and secures the 4-way-switch module 6 as one assembly.

Referring to FIGS. 48 through 54, there is provided a dimmer switch module 7. The primary components of the dimmer switch module 7 are the switch module base 701, switch module cover 702, grounding plate 703, grounding bar 704, source-positive blade conductor 705, return-positive blade conductor 706, ground blade conductor 707, dimmer device 708, and the control knob 709.

The switch module base 701 is constructed of plastic, or otherwise a non-conductive material. The switch module base 701 provides a dimmer device cavity 715 and three blade-conductor cavities 717, 718, 719. The upper blade-conductor cavity 717 is provided with one blade slot 720, the middle blade-conductor cavity 718 is provided with one blade slot 721, and the lower blade-conductor cavity 719 is provided with one blade slot 722. The middle blade-conductor cavity 718 is also provided with one rivet hole 723. The front surface 713 of the switch module base 701 is recessed relative to the outer edges 714 to accommodate the switch module cover 702. The front surface 713 contains two recessed cavities 716 to accommodate the grounding bar 704.

The switch module cover 702 is also constructed of plastic, or otherwise a non-conductive material. The outer edges 727 of the switch module cover 702 are provided with two spring-clip notches 728 and the front side 725 is shaped to accommodate the grounding plate 703. The outer edges 727 of the switch module cover 702 are recessed on the back side 726 to accommodate the switch module base 701. The switch module cover 702 is provided with a shaft hole 729 to accommodate the control shaft 710 of the dimmer device 708.

The grounding bar 704, source-positive blade conductor 705, return-positive blade conductor 706, and ground blade conductor 707 are each of a one-piece formed construction as shown in FIGS. 48 through 54, and constructed of a copper alloy, or otherwise a conductive material.

The grounding plate 703 is constructed of steel and shaped to accommodate the switch module cover 702. The grounding plate 703 provides a hole 731 to accommodate the knob bezel 730 on the switch module cover 702, The grounding plate 703 also provides two threaded holes 732 located to conform to industry standards and accommodate a standard switch wallplate 738.

The dimmer device 708 is old art and therefore is not shown in detail. The dimmer device 708 controls the electrical current and voltage from the source-positive blade conductor 705 to the return-positive blade conductor 706. The dimmer device 708 is adapted with a control shaft 710 which rotates relative to the dimmer device 708. When the control shaft 710 is rotated to the extreme counter-clockwise location, the dimmer device 708 is in the "off" position and no electrical current may travel from the source-positive blade conductor 705 to the return-positive blade conductor 706. When the control shaft 710 is rotated in the clockwise direction and comes off the extreme counter-clockwise location, the dimmer device 708 is in the "on" position and electrical current may travel from the source-positive blade conductor 705 to the return-positive blade conductor 706. As the control shaft 710 is further rotated in the clockwise direction, the dimmer device 708 varies the electrical voltage from the source-positive blade conductor 705 to the return-positive blade conductor 706, thereby providing a means to adjust the light intensity of light fixtures. A control knob 709 press-fits onto the control shaft 710. The control knob 709 is of a one-piece molded plastic construction, or otherwise a non-conductive material.

Assembly of the dimmer switch module 7 is performed as follows. The ground blade conductor 707 is fully inserted into the middle blade-conductor cavity 718 of the switch module base 701 until it protrudes through the blade slot 721. The grounding bar 704 is then inserted into the middle blade-conductor cavity 718 until it is fully seated against the ground blade conductor 707. A short rivet 711 is then inserted through the rivet hole 733 of the grounding bar 704, through the rivet hole 733 of the ground blade conductor 707, and through the rivet hole 723 of the switch module base 701 where the rivet head 735 is expanded as it draws the components tightly together. The source-positive blade conductor 705 and the return-positive blade conductor 706 are attached to the dimmer device 708 with short rivets 7 11. The dimmer device 708 is then inserted into the module base 701 as the source-positive blade conductor 705 is inserted into the lower blade-conductor cavity 719 of the switch module base 701 and the return-positive blade conductor 706 is inserted into the upper blade-conductor cavity 717. The dimmer device 708 is fully seated into the dimmer device cavity 715 of the module base 701 as the source-positive blade conductor 705 protrudes through the lower blade slot 722 and the return-positive blade conductor 706 protrudes through the upper blade slot 720. The switch module cover 702 is then placed onto the switch module base 701 until the back side 726 of the switch module cover 702 is seated against the front surface 713 of the switch module base 701 and the outer edges 727 of the switch module cover 702 are nestled in the outer edges 714 of the switch module base 701 with the control shaft 710 of the dimmer device 708 penetrating through the shaft hole 729 in the switch module cover 702. The grounding plate 703 is then placed over the switch module cover 702. Each of the two long rivets 712 are inserted through the rivet holes 734 in the grounding plate 703, through the rivet holes 734 in the grounding bar 704, and through the rivet holes 724 in the switch module base 701 where the rivet head 736 is expanded as it draws the components tightly together and secures the dimmer switch module 7 as one assembly. The control knob 709 is press-fitted onto the control shaft 710 of the dimmer device 708.

Referring to FIGS. 55 through 61, there is provided a fan-control switch module 8. The primary components of the fan-control switch module 8 are the switch module base 751, switch module cover 752, grounding plate 753, grounding bar 754, source-positive blade conductor 755, return-positive blade conductor 756, ground blade conductor 757, fan-control device 758, and the control knob 759.

The switch module base 751 is constructed of plastic, or otherwise a non-conductive material. The switch module base 751 provides a fan-control device cavity 765 and three blade-conductor cavities 767, 768, 769. The upper blade-conductor cavity 767 is provided With one blade slot 770, the middle blade-conductor cavity 768 is provided with one blade slot 771, and the lower blade-conductor cavity 769 is provided with one blade slot 772. The middle blade-conductor cavity 768 is also provided with one rivet hole 773. The front surface 763 of the switch module base 751 is recessed relative to the outer edges 764 to accommodate the switch module cover 752. The front surface 763 contains two recessed cavities 766 to accommodate the grounding bar 754.

The switch module cover 752 is also constructed of plastic, or otherwise a non-conductive material. The outer edges 777 of the switch module cover 752 are provided with two spring-clip notches 778 and the front side 775 is shaped to accommodate the grounding plate 753. The outer edges 777 of the switch module cover 752 are recessed on the back side 776 to accommodate the switch module base 751. The switch module cover 752 is provided with a shaft hole 779 to accommodate the control shaft 760 of the fan-control device. 758.

The grounding bar 754, source-positive blade conductor 755, return-positive blade conductor 756, and ground blade conductor 757 are each of a one-piece formed construction as shown in FIGS. 55 through 61, and constructed of a copper alloy, or otherwise a conductive material.

The grounding plate 753 is constructed of steel and shaped to accommodate the switch module cover 752. The grounding plate 753 provides a hole 781 to accommodate the knob bezel 780 on the switch module cover 752. The grounding plate 753 also provides two threaded holes 782 located to conform to industry standards and accommodate a standard switch wallplate 738.

The fan-control device 758 is old art and therefore is not shown in detail. The fan-control device 758 controls the electrical current and voltage from the source-positive blade conductor 755 to the return-positive blade conductor 756. The fan-control device 758 is adapted with a control shaft 760 which rotates relative to the fan-control device 758.

When the control shaft 760 is rotated to the extreme counter-clockwise location, the fan-control device 758 is in the "off" position and no electrical current may travel from the source-positive blade conductor 755 to the return-positive blade conductor 756. When the control shaft 760 is rotated in the clockwise direction and comes off the extreme counter-clockwise location, the fan-control device 758 is in the "on" position and electrical current may travel from the source-positive blade conductor 755 to the return-positive blade conductor 756. As the control shaft 760 is further rotated in the clockwise direction, the fan-control device 758 varies the electrical voltage from the source-positive blade conductor 755 to the return-positive blade conductor 756, thereby providing a means to adjust the speed of electric fans. A control knob 759 press-fits onto the control shaft 760. The control knob 759 is of a one-piece molded plastic construction, or otherwise a non-conductive material.

Assembly of the fan-control switch module 8 is performed as follows. The ground blade conductor 757 is fully inserted into the middle blade-conductor cavity 768 of the switch module base 751 until it protrudes through the blade slot 771. The grounding bar 754 is then inserted into the middle blade-conductor cavity 768 until it is fully seated against the ground blade conductor 757. A short rivet 761 is then inserted through the rivet hole 783 of the grounding bar 754, through the rivet hole 783 of the ground blade conductor 757, and through the rivet hole 773 of the switch module base 751 where the rivet head 785 is expanded as it draws the components tightly together. The source-positive blade conductor 755 and the return-positive blade conductor 756 are attached to the fan-control device 758 with short rivets 761. The fan-control device 758 is then inserted into the module base 751 as the source-positive blade conductor 755 is inserted into the lower blade-conductor cavity 769 of the switch module base 751 and the return-positive blade conductor 756 is inserted into the upper blade-conductor cavity 767. The fan-control device 758 is fully seated into the fan-control device cavity 765 of the module base 751 as the source-positive blade conductor 755 protrudes through the lower blade slot 772 and the return-positive blade conductor 756 protrudes through the upper blade slot 770. The switch module cover 752 is then placed onto the switch module base 751 until the back side 776 of the switch module cover 752 is seated against the front surface 763 of the switch module base 751 and the outer edges 777 of the switch module cover 752 are nestled in the outer edges 764 of the switch module base 751 with the control shaft 760 of the fan-control device 758 penetrating through the shaft hole 779 in the switch module cover 752. The grounding plate 753 is then placed over the switch module cover 752. Each of the two long rivets 762 are inserted through the rivet holes 784 in the grounding plate 753, through the rivet holes 784 in the grounding bar 754, and through the rivet holes 774 in the switch module base 751 where the rivet head 786 is expanded as it draws the components tightly together and secures the fan-control switch module 8 as one assembly. The control knob 759 is press-fitted onto the control shaft 760 of the fan-control device 758.

Referring to FIGS. 62 through 68, there is provided a timer switch module 9. The primary components of the timer switch module 9 are the switch module base 801, switch module cover 802, grounding plate 803, grounding bar 804, source-positive blade conductor 805, return-positive blade conductor 806, ground blade conductor 807, timer device 808, and the control knob 809.

The switch module base 801 is constructed of plastic, or otherwise a non-conductive material. The switch module base 801 provides a timer device cavity 815 and three blade-conductor cavities 817, 818, 819. The upper blade-conductor cavity 817 is provided with one blade slot 820, the middle blade-conductor cavity 818 is provided with one blade slot 821, and the lower blade-conductor cavity 819 is provided with one blade slot 822. The middle blade-conductor cavity 818 is also provided with one rivet hole 823. The front surface 813 of the switch module base 801 is recessed relative to the outer edges 814 to accommodate the switch module cover 802. The front surface 813 contains two recessed cavities 816 to accommodate the grounding bar 804.

The switch module cover 802 is also constructed of plastic, or otherwise a non-conductive material. The outer edges 827 of the switch module cover 802 are provided with two spring-clip notches 828 and the front side 825 is shaped to accommodate the grounding plate 803. The outer edges 827 of the switch module cover 802 are recessed on the back side 826 to accommodate the switch module base 801. The switch module cover 802 is provided with a shaft hole 829 to accommodate the control shaft 810 of the timer device 808.

The grounding bar 804, source-positive blade conductor 805, return-positive blade conductor 806, and ground blade conductor 807 are each of a one-piece formed construction as shown in FIGS. 62 through 68, and constructed of a copper alloy, or otherwise a conductive material.

The grounding plate 803 is constructed of steel and shaped to accommodate the switch module cover 802. The grounding plate 803 provides a hole 831 to accommodate the knob bezel 830 on the switch module cover 802. The grounding plate 803 also provides two threaded holes 832 located to conform to industry standards and accommodate a standard switch wallplate 738.

The timer device 808 is old art and therefore is riot shown in detail. The timer device 808 controls the electrical current from the source-positive blade conductor 805 to the return-positive blade conductor 806. The timer device 808 is adapted with a control shaft 810 which rotates relative to the timer device 808. When the control shaft 810 is rotated to the extreme counter-clockwise location, the timer device 808 is in the "off" position and no electrical current may travel from the source-positive blade conductor 805 to the return-positive blade conductor 806. When the control shaft 810 is rotated in the clockwise direction and comes off the extreme counter-clockwise location, the timer device 808 is in the "on" position and electrical current may travel from the source-positive blade conductor 805 to the return-positive blade conductor 806. The time duration that the timer device 808 will remain "on" is dependent on how far the control shaft 810 is rotated in the clockwise direction. As the control shaft 810 is further rotated in the clockwise direction, the time duration increases that the timer device 808 will allow the electrical current to travel from the source-positive blade conductor 805 to the return-positive blade conductor 806, thereby providing a means to adjust the time for electrical appliances to turn off automatically. The control shaft 810 is rotated clockwise manually and returns to the extreme counter-clockwise location automatically by the timer device 808 as the time duration expires. A control knob 809 press-fits onto the control shaft 810. The control knob 809 is of a one-piece molded plastic construction, or otherwise a non-conductive material.

Assembly of the timer switch module 9 is performed as follows. The ground blade conductor 807 is fully inserted into the middle blade-conductor cavity 818 of the switch module base 801 until it protrudes through the blade slot 821. The grounding bar 804 is then inserted into the middle blade-conductor cavity 818 until it is fully seated against the ground blade conductor 807. A short rivet 811 is then inserted thorough the rivet hole 833 of the grounding bar 804, through the rivet hole 833 of the ground blade conductor 807, and through the rivet hole 823 of the switch module base 801 where the rivet head 835 is expanded as it draws the components tightly together. The source-positive blade conductor 805 and the return-positive blade conductor 806 are attached to the timer device 808 with short rivets 811. The timer device 808 is then inserted into the module base 801 as the source-positive blade conductor 805 is inserted into the lower blade-conductor cavity 819 of the switch module base 801 and the return-positive blade conductor 806 is inserted into the upper blade-conductor cavity 817. The timer device 808 is fully seated into the timer device cavity 815 of the module base 801 as the source-positive blade conductor 805 protrudes through the lower blade slot 822 and the return-positive blade conductor 806 protrudes through the upper blade slot 820. The switch module cover 802 is then placed onto the switch module base 801 until the back side 826 of the switch module cover 802 is seated against the front surface 813 of the switch module base 801 and the outer edges 827 of the switch module cover 802 are nestled in the outer edges 814 of the switch module base 801 with the control shaft 810 of the timer device 808 penetrating through the shaft hole 829 in the switch module cover 802. The grounding plate 803 is then placed over the switch module cover 802. Each of the two long rivets 812 are inserted through the rivet holes 834 in the grounding plate 803, through the rivet holes 834 in the grounding bar 804, and through the rivet holes 824 in the switch module base 801 where the rivet head 836 is expanded as it draws the components tightly together and secures the timer switch module 9 as one assembly. The control knob 809 is press-fitted onto the control shaft 810 of the timer device 808.

Referring to FIGS. 69 through 75, there is provided a GFCI receptacle module 10. The primary components of the GFCI receptacle module 10 are the receptacle module base 851, receptacle module cover 852, positive plug adapter 853, neutral plug adapter 854, two ground plug adapters 855, grounding plate 856, grounding bar 857, source-positive blade conductor 858, source-neutral blade conductor 859, GFCI-positive blade conductor 860, GFCI-neutral blade conductor 861, the ground blade assembly 863, GFCI device 864, the Test pushbutton 865, and the Reset pushbutton 867.

The receptacle module base 851 is constructed of plastic, or otherwise a non-conductive material. The front surface 872 of the receptacle module base 851 is recessed relative to the outer edges 873 to accommodate the grounding plate 856 and the receptacle module cover 852. The front surface 872 contains two recessed cavities 877 to accommodate the grounding bar 857 and one ground plug cavity 876 to provide clearance under the ground plug adapter 855.

The receptacle module cover 852 is also constructed of plastic, or otherwise a nonconductive material. The front side 887 of the receptacle module cover 852 provides a wallplate mounting surface 891 which is recessed relative to the GFCI-receptacle face 890. The GFCI-receptacle face 890 is shaped to industry standards to accommodate a standard electrical plug 918 and GFCI-wallplate 916. The GFCI-receptacle face 890 provides positive plug slots 893, neutral plug slots 894, and ground plug slots 895. The back side 888 of the receptacle module cover 852 provides a positive plug adapter cavity 896, a neutral plug adapter cavity 897, and two ground plug adapter cavities 898. The outer edges 889 of the receptacle module cover 852 are recessed on the back side 888 to accommodate the receptacle module base 851. The outer edges 889 are also provided with two spring-clip notches 903. The receptacle module cover 852 provides two threaded holes 892 to accommodate the wallplate mounting screws 917.

The positive plug adapter 853, neutral plug adapter 854, two ground plug adapters 855, grounding bar 857, blade conductors 858, 859, 860, 861, and ground blade assembly 863 are each of a one-piece formed construction as shown in FIGS. 69 through 75, and constructed of a copper alloy, or otherwise a conductive material. The ground blade assembly 863 provides two ground blade conductors 862.

The grounding plate 856 is constructed of steel and shaped to accommodate the receptacle module base 851. The grounding plate 856 provides two large openings 904 to avoid interference with the positive plug adapter 853 and the neutral plug adapter 854, and two holes 905 provide clearance under the ground plug adapters 855.

The ground fault circuit interrupt (GFCI) device 864 is old art and therefore is not shown in detail. The GFCI device 864 is a safety device which monitors the electrical current through the positive conductors relative to the electrical current through the neutral conductors to detect a leakage current to ground or "ground fault condition", indicating stray electrical current and possible electrocution of a person. Upon detection of a ground fault condition, the GFCI device 864 trips, thereby interrupting the electrical current. The GFCI device 864 is adapted with a "Test" pushbutton shaft 866 which permits the GFCI device 864 to be tested by simulating a ground fault condition, and a "Reset" pushbutton shaft 868 which resets the GFCI device 864 after it has been tripped. The "Test" pushbutton 865 and "Reset" pushbutton 867 are of a one-piece plastic construction and are adapted to press-fit onto the pushbutton shafts 866, 868.

Assembly of tie GFCI-receptacle module 10 is performed as follows. The ground blade assembly 863 is fully inserted into the middle blade-conductor cavity 880 of the receptacle module base 851 until the blade conductors 862 protrude through the blade slots 883. The grounding bar 857 is then inserted into the middle blade-conductor cavity 880 until it is fully seated against the ground blade assembly 863 and the grounding bar cavity 877 of the receptacle module base 851. A short rivet 870 is then inserted through the rivet hole 908 of the grounding bar 857, through the rivet hole 908 of the ground blade assembly 863, and through the rivet hole 885 of the receptacle module base 851 where the rivet head 911 is expanded as it draws the components tightly together. The source-positive blade conductor 858, source-neutral blade conductor 859, the GFCI-positive blade conductor 860, and the GFCI-neutral blade conductor 861 are secured to the GFCI device 864 with short rivets 870. The GFCI device 864 is then inserted into the receptacle module base 851 such that the source-neutral blade conductor 859 and the GFCI-neutral blade conductor 861 are inserted into the upper blade conductor cavity 879 and the source-positive blade conductor 858 and the GFCI-positive blade conductor 860 are inserted into the lower blade conductor cavity 881. The GFCI device 864 is fully seated into the GFCI device cavity 878 of the receptacle module base 851 as the source-neutral blade conductor 859 and the GFCI-neutral blade conductor 861 protrude through the upper blade slots 882 and the source-positive blade conductor 858 and the GFCI-positive blade conductor 860 protrude through the lower blade slots 884. The positive plug adapter 853 is then inserted into the positive plug adapter cavity 874 until it is fully seated against the GFCI device 865. A short rivet 870 is then inserted through the rivet hole 908 of the positive plug adapter 853 and secures the positive plug adapter 853 to the GFCI device 864. The neutral plug adapter 854 is then inserted into the neutral plug adapter cavity 875 until it is fully seated against the GFCI device 864. A short rivet 870 is then inserted through the rivet hole 908 of the neutral plug adapter 854 and secures the neutral plug adapter 854 to the GFCI device 864. Each of the two ground plug adapters 855 are attached to the grounding plate 856 with a small rivet 869. The small rivet 869 is inserted through the rivet hole 910 of the ground plug adapter 855 and through the rivet hole 907 of the grounding plate 856 where the rivet head 913 is expanded as it draws the components tightly together. The grounding plate 856 is then inserted into the receptacle module base 851 until it is seated against the front surface 872 as the pushbutton shafts 866, 868 of the GFCI device 864 protrude through the shaft clearance holes 906 of the grounding plate 856. The receptacle module cover 852 is then placed onto the receptacle module base 851 until the back side 888 is seated against the grounding plate 856 and the outer edges 889 of the receptacle module cover 852 are nestled in the outer edges 873 of the receptacle module base 851. The pushbutton shafts 866, 868 of the GFCJ device 864 protrude through the shaft clearance holes 901 of the receptacle module cover 852 and the positive plug adapter 853, neutral plug adapter 854, and ground plug adapters 855 are nestled in the positive plug adapter cavity 896, neutral plug adapter cavity 897, and ground plug adapter cavities 898, respectively. Each of the two long rivets 871 are inserted through the rivet holes 902 of the receptacle module cover 852, through the rivet holes 909 in the grounding plate 856, through the rivet holes 909 in the grounding bar 857, and through the rivet holes 886 in the receptacle module base 851 where the rivet head 912 is expanded as it draws the components tightly together and secures the GFCI receptacle module 10 as one assembly. The "Test" pushbutton 865 is inserted into the "Test" pushbutton cavity 899 and press-fitted onto the "Test" pushbutton shaft 866. Likewise, the "Reset" pushbutton 867 is inserted into the "Reset" pushbutton cavity 900 and press-fitted onto the "Reset" pushbutton shaft 868.

Referring to FIGS. 76 through 82 there is provided a 240 volt receptacle module 11. The primary components of the 240 volt receptacle module 11 are the module base 931, module cover 932, left positive plug adapter 933, right positive plug adapter 934, neutral plug adapter 935, grounding plate 940, grounding bar 941, and the ground blade conductor 939.

The module base 931 is constructed of plastic, or otherwise a non-conductive material. The module base 931 provides three blade conductor cavities 947, 948, 949. The upper blade conductor cavity 947 is provided with two blade slots 950, 951, the middle blade conductor cavity 948 is provided with one blade slot 952; and the lower blade conductor cavity 949 is provided with one blade slot 953. The middle blade conductor cavity 948 is provided with one rivet hole 954. The front surface 944 of the module base 931 is recessed relative to the outer edges 945 to accommodate the grounding plate 940 and the module cover 932. The front surface 944 contains two recessed cavities 946 to accommodate the grounding bar 941.

The module cover 932 is also constructed of plastic, or otherwise a non-conductive material. The front side 956 of the module cover 932 provides a wallplate mounting surface 960 which is recessed relative to the receptacle face 959. The receptacle face 959 provides a left positive plug slot 962, a right positive plug slot 963, and a neutral plug slot 964. The plug slots 962, 963, 964 are located to accommodate a standard 240 volt plug. Various standard 240 volt plugs are available and the arrangement of the plug slots 962, 963, 964 is selected for the purposes of this disclosure and it is not intended to imply that the present invention is restricted to this arrangement. The back side 957 of the module cover 932 provides two positive plug adapter cavities 965 and a neutral plug adapter cavity 966. The outer edges 958 of the module cover 932 are recessed on the back side 957 to accommodate the receptacle module base 931. The outer edges 958 are also provided with two spring-clip notches 968. The module cover 932 provides two threaded holes 961 to accommodate the wallplate mounting screws 976.

The positive plug adapters 933, 934, neutral plug adapter 935, grounding bar 941, and ground blade conductor 939 are each of a one-piece formed construction as shown in FIGS. 76 through 82, and constructed of a copper alloy, or otherwise a conductive material. The positive plug adapters 933, 934 and neutral plug adapter 935 are each provided with a blade conductor 936, 937, 938.

The grounding plate 940 is constructed of steel and shaped to accommodate the receptacle module base 931. The grounding plate 940 provides one large opening 969 to avoid interference with the plug adapters 933, 934, 935.

Assembly of the 240 volt receptacle module 11 is performed as follows. The ground blade conductor 939 is fully inserted into the middle blade-conductor cavity 948 of the module base 931 until it protrudes through the blade slot 952. The grounding bar 941 is then inserted into the middle blade-conductor cavity 948 until it is fully seated against the ground blade conductor 939. A short rivet 942 is then inserted through the rivet hole 970 of the grounding bar 941, through the rivet hole 970 of the ground blade conductor 939, and through the rivet hole 954 of the module base 931 where the rivet head 972 is expanded as it draws the components tightly together. The left positive plug adapter 933 is fully inserted into the upper blade-conductor cavity 947 of the module base 931 as the blade conductor 936 protrudes through the left blade slot 950. Likewise, the right positive plug adapter 934 is fully inserted into the upper blade-conductor cavity 947 as the blade conductor 937 protrudes through the right blade slot 951. The neutral plug adapter 935 is then inserted into the lower blade-conductor cavity 949 as the blade conductor 938 protrudes through the blade slot 953. The grounding plate 940 is then inserted into the module base 931 until it is seated against the front surface 944. The module cover 932 is then placed onto the module base 931 until the back side 957 is seated against the grounding plate 940 and the outer edges 958 of the module cover 932 are nestled in the outer edges 945 of the module base 931, as the positive plug adapters 933, 934 and the neutral plug adapter 935 are nestled in the positive plug adapter cavities 965 and the neutral plug adapter cavity 966 of the module cover 932, respectively. Each of the two long rivets 943 are inserted through the rivet holes 967 of the module cover 932, through the rivet holes 973 in the grounding plate 940, through the rivet holes 973 in the grounding bar 941, and through the rivet holes 955 in the module base 931 where the rivet head 973 is expanded as it draws the components tightly together and secures the 240 volt receptacle module 11 as one assembly.

Referring to FIGS. 83 through 91, there is provided a junction box 12. The two principal components of the junction box 12 are the electrical box 361 and the wiring module 362. The wiring module 362 is comprised of a base 363, cover 364, positive wire adapter 365, neutral wire adapter 366, ground wire adapter 367, three terminal screws 371, rivet 368, four cable clamps 369, and four cable clamp screws 370.

The wiring module base 363 is constructed of plastic, or otherwise a non-conductive material. Two 3-conductor cable ports 383 are provided in the four sides 379 of the wiring module base 363. Each 3-conductor cable port 383 is rectangular shaped and contains two end-projections 384 to create a specific interior profile. The wiring module base 363 provides one center cavity 372 to accommodate the positive wire adapter 365 and the neutral wire adapter 366. Twenty four socket cavities 374, 375, 376 are located around the perimeter of the center cavity 372. A wire entrance hole 378 is provided at the end 377 of each socket cavity 374, 375, 376. The wiring module base 363 provides one rivet hole 380, two mounting holes 382, and four threaded holes 381.

The wire adapters 365, 366, 367 are each of a one-piece formed construction and constructed of a copper alloy, or otherwise a conductive material. The positive wire adapter 365 provides eight wire pressure-sockets 400 attached to the positive wire adapter base 401 and located in alignment with the positive socket cavities 374 in the wiring module base 363. A terminal tab 406 is also attached to the positive wire adapter base 401 which provides a threaded hole 407. The neutral wire adapter 366 provides eight wire pressure-sockets 402 attached to the neutral wire adapter base 403 and located in alignment with the neutral socket cavities 375 in the wiring module base 363. A terminal tab 408 is also attached to the neutral wire adapter base 403 which provides a threaded hole 409. The ground wire adapter 367 provides eight wire pressure-sockets 404 attached to the ground wire adapter base 405 and located in alignment with the ground socket cavities 376 in the wiring module base 363. A terminal tab 410 is also attached to the ground wire adapter base 405 which provides a threaded hole 411 and a rivet hole 412. The wire-pressure-sockets 400, 402, 403 are created by two opposing tabs 413 which are formed closely together and flexible such that the tabs 413 exert pressure on a wire that is larger than the space between the tabs 413, as the wire is inserted. The tabs 413 are each provided with an indentation 414 to provide maximum contact with the wire.

The wiring module cover, 364 is constructed of plastic, or otherwise a non-conductive material. The back side 387 of the wiring module cover 364 provides twenty-four socket cavities 386 located around the perimeter of a center cavity 385. The wiring module cover 364 also provides one rivet hole 388, eight ground socket holes 389, two terminal clearance holes 390, and a screw clearance hole 391. The four cable clamps 369 may be constructed of aluminum or plastic and are provided with ridges 417 to increase the clamping effectiveness. The cable clamps 369 are also provided with one mounting hole 416.

Figure 91:
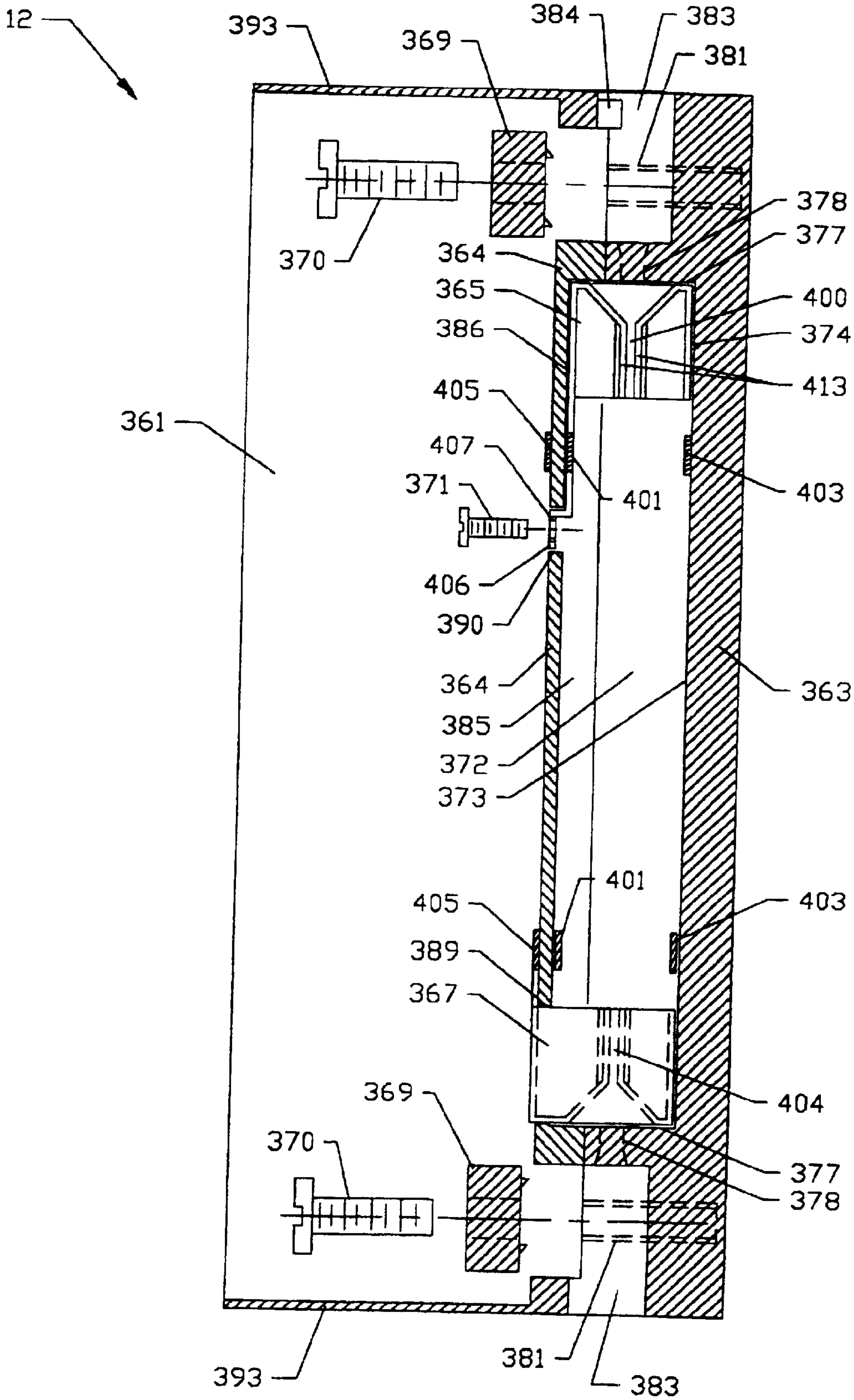
FIG. 91 is a vertical section view taken along line 91—91 of FIG. 83 shown with the electrical box molded with the willing module base as one piece.
Figure 92:
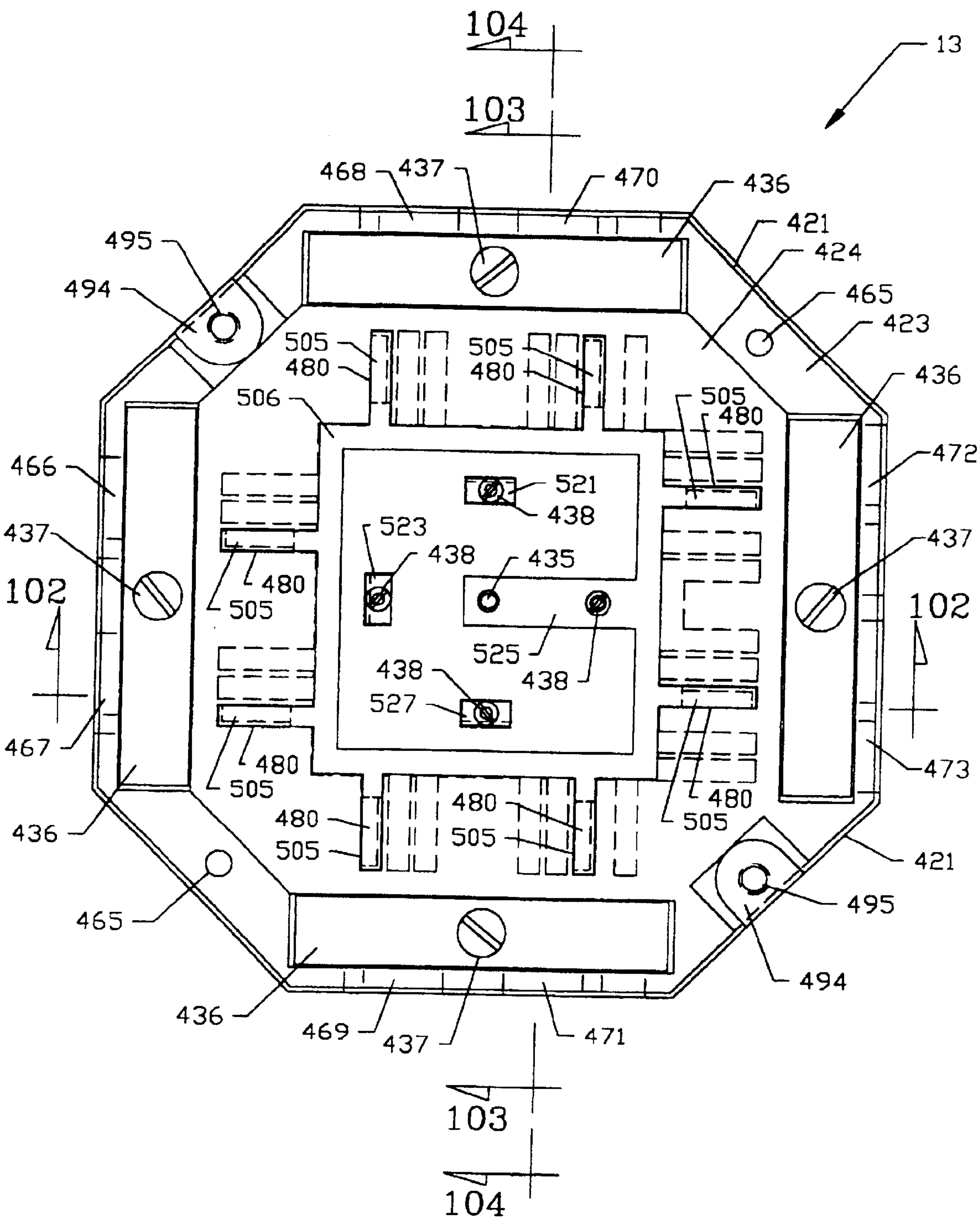
FIG. 92 is a front elevation view of the light box.
Figure 93:
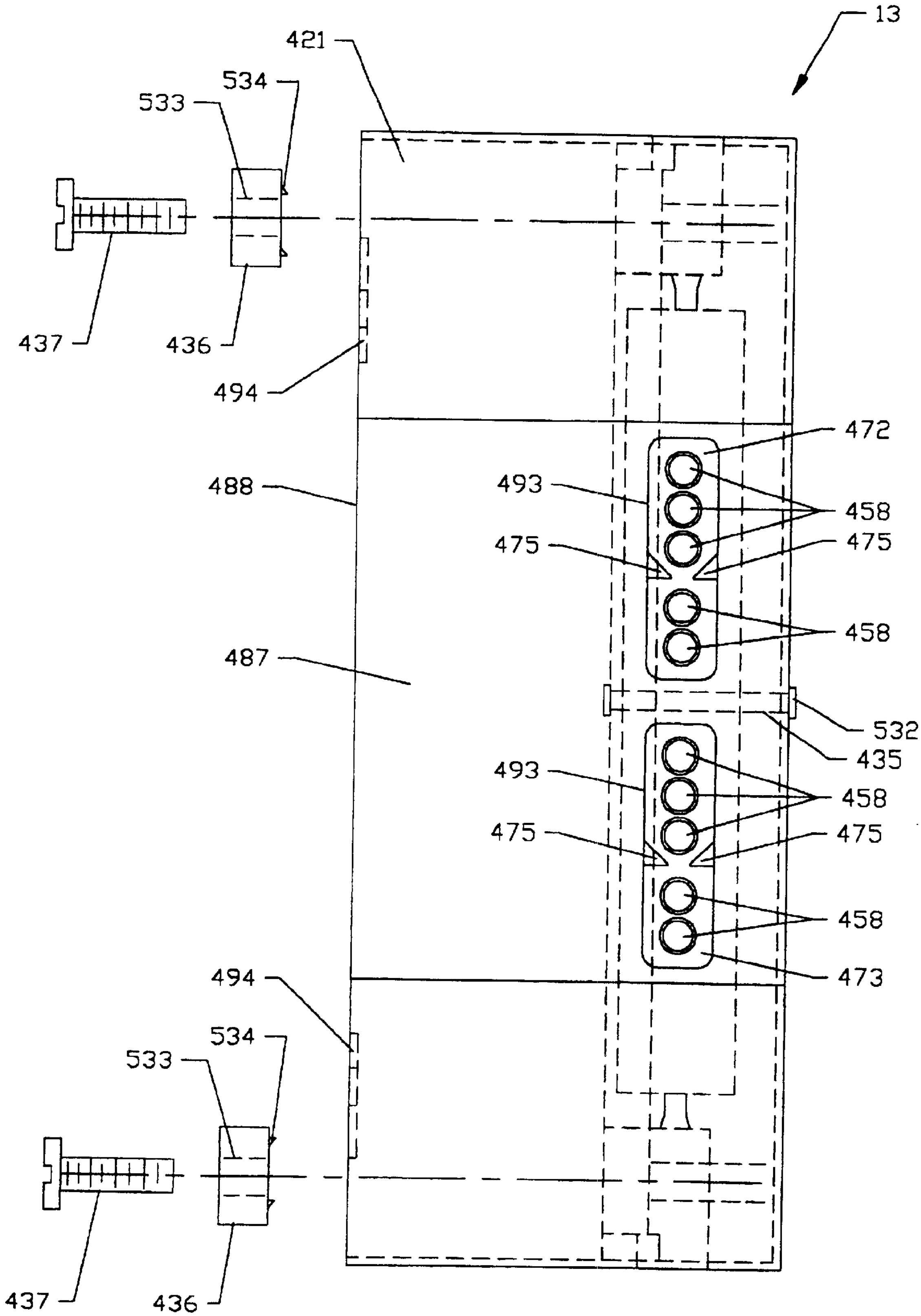
FIG. 93 is a right-side elevation view of the light box.
Figure 94:
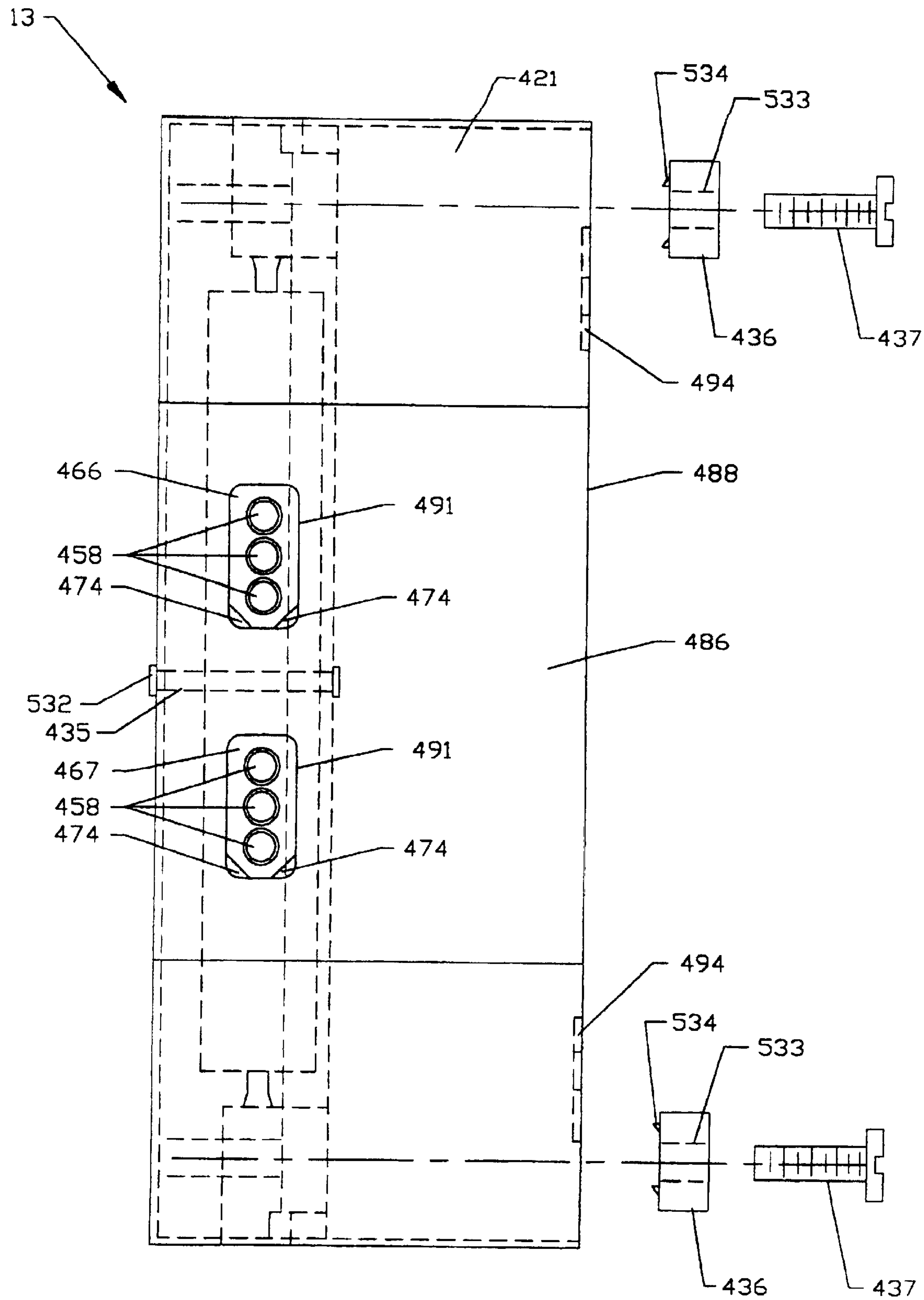
FIG. 94 is a left-side elevation view of the light box.
Figure 95:
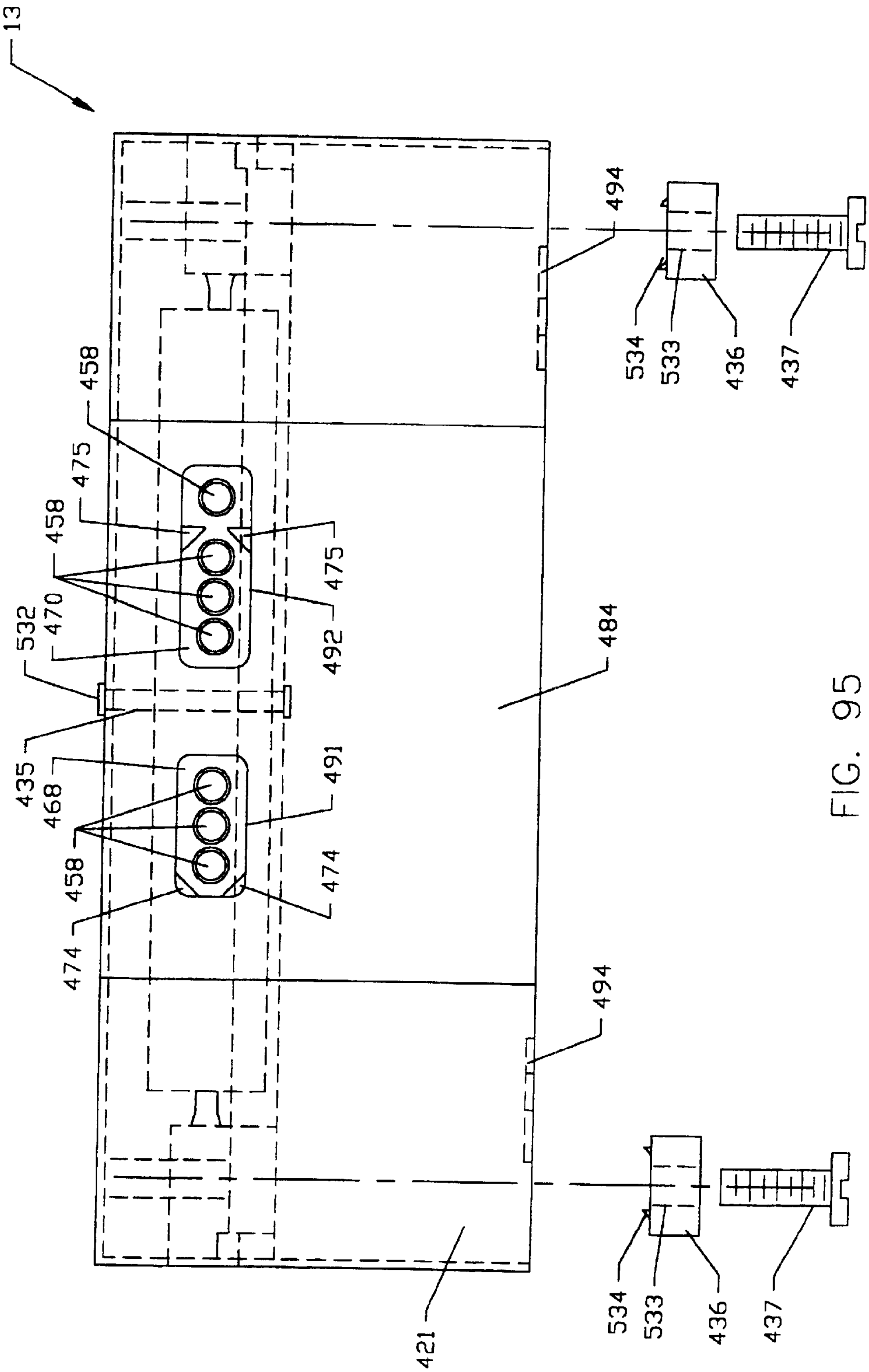
FIG. 95 is a plan view of the light box.
Figure 96:
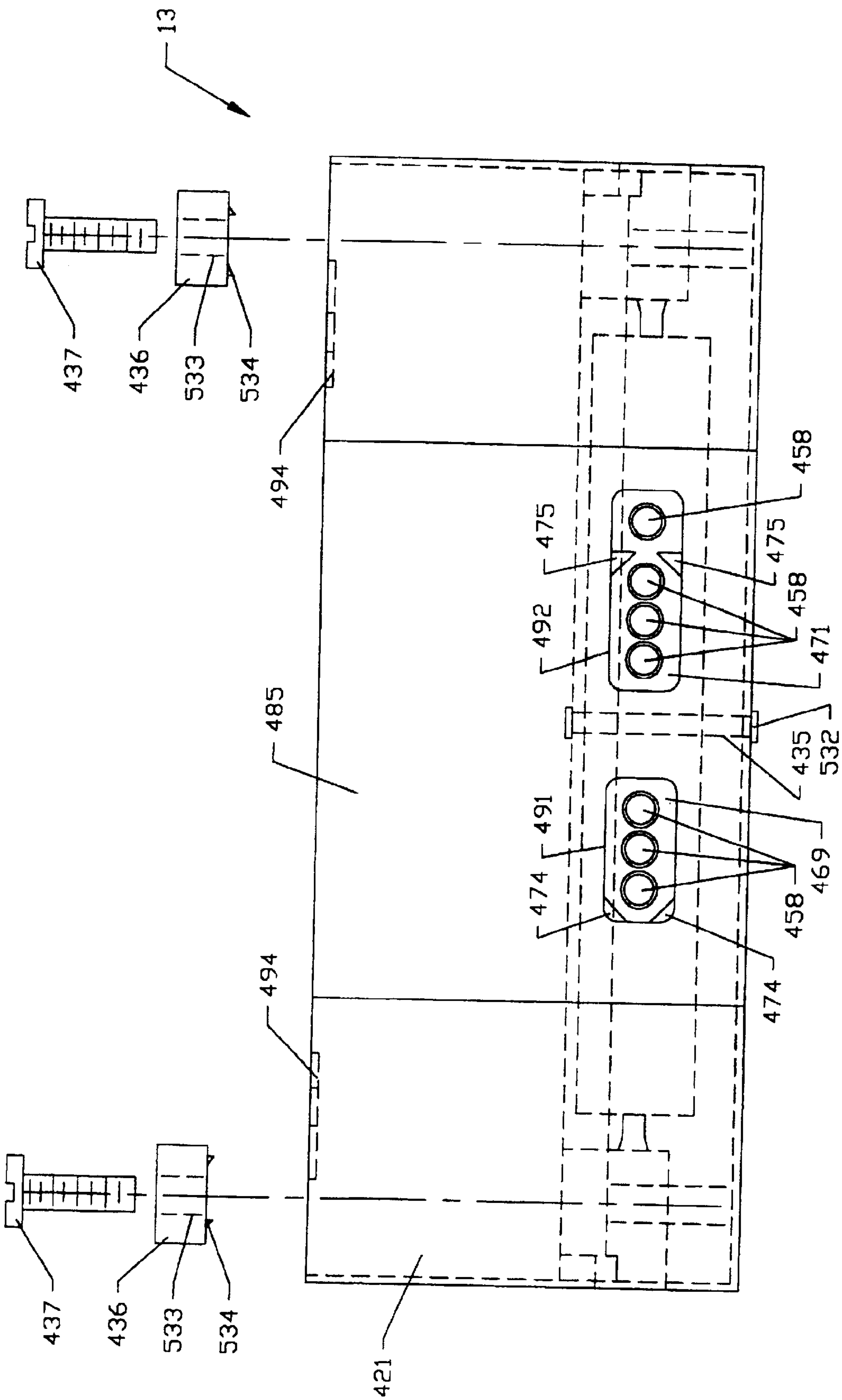
FIG. 96 is a bottom view of the light box.

The electrical box 361 may be constructed of steel or plastic. Two cable holes 397 are provided in each of the four sidewalls 393 of the electrical box 361. The cable holes 397 are located in alignment with the 3-conductor cable ports 383 of the wiring module base 363. A rivet hole 395 is provided in the back wall 392 of the electrical box 361 to accommodate the rivet 368. Two mounting holes 396 are also provided in the back wall 392 for mounting purposes. Two fixture mounting tabs 398 are provided at the outer edges 394 of the electrical box 361. Each of the two fixture mounting tabs 398 are provided with a threaded hole 399 which are located to industry standards to accommodate standard fixtures and cover plates. Plastic construction of the electrical box 361 permits the wiring module base 363 to be molded with the electrical box 361 as one piece, as shown in FIG. 91.

Figure 85:
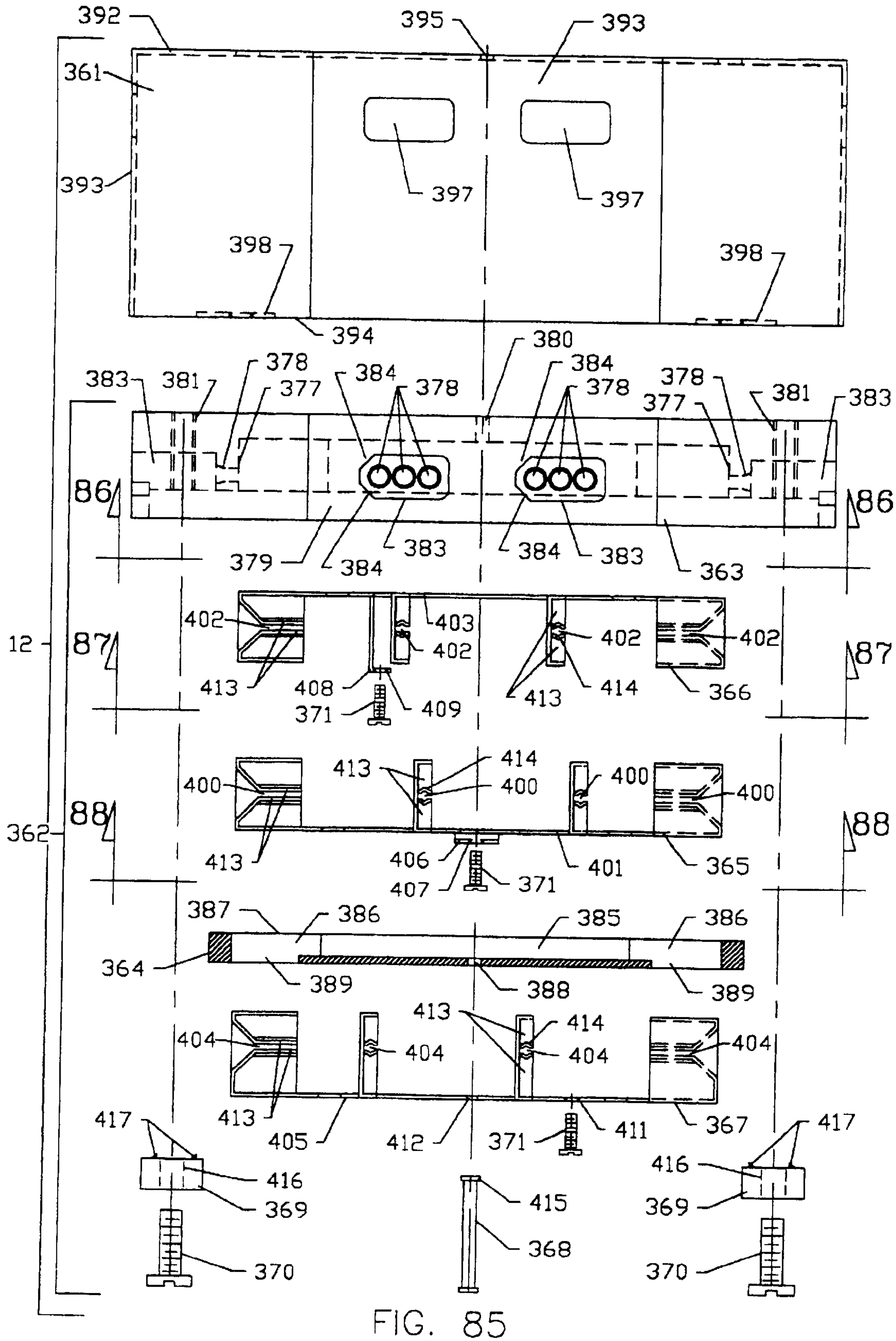
FIG. 85 is a plan view of the junction box shown in exploded form.
Figure 86:
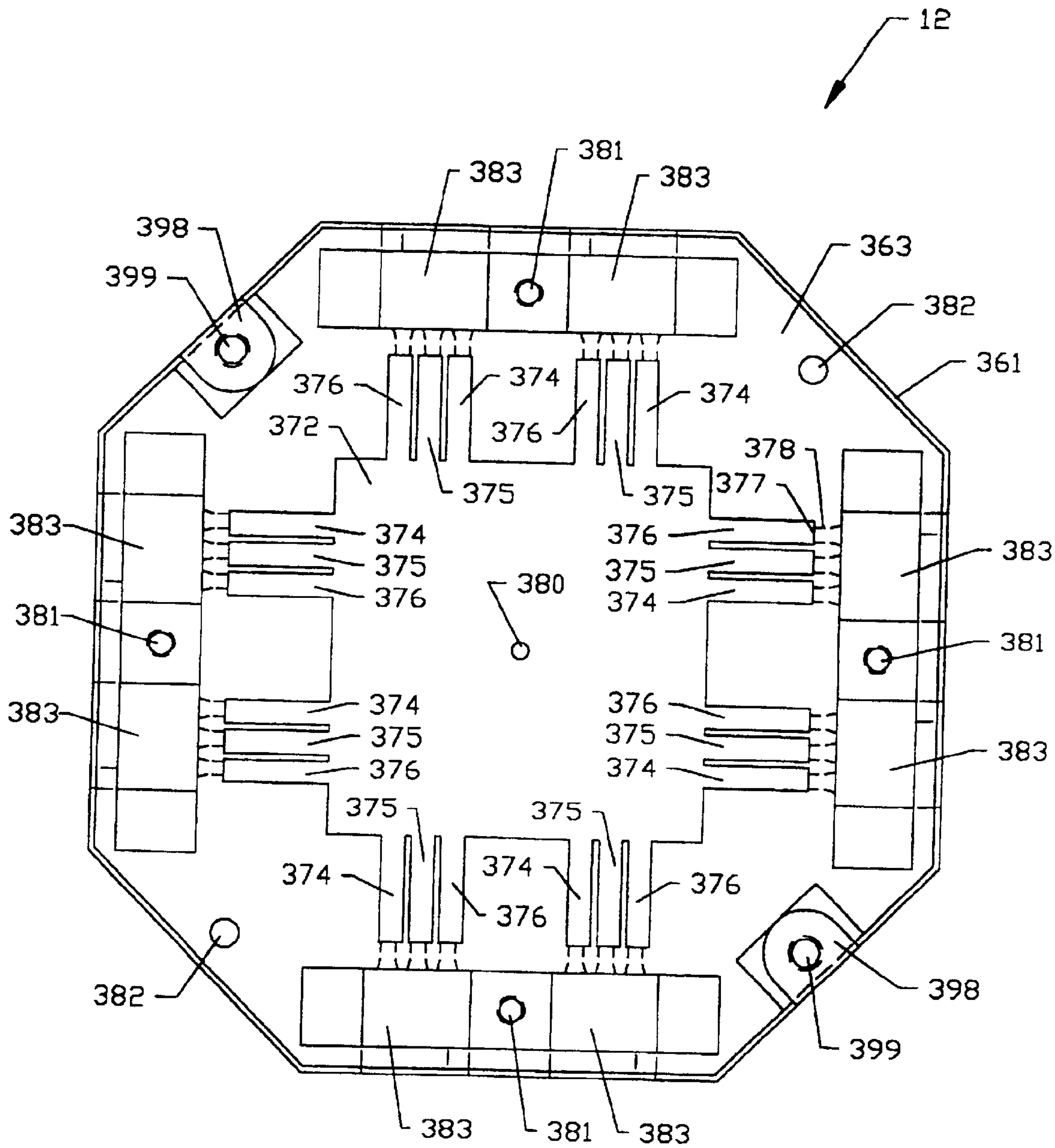
FIG. 86 is a horizontal section view taken along line 86—86 of FIG. 85.
Figure 87:
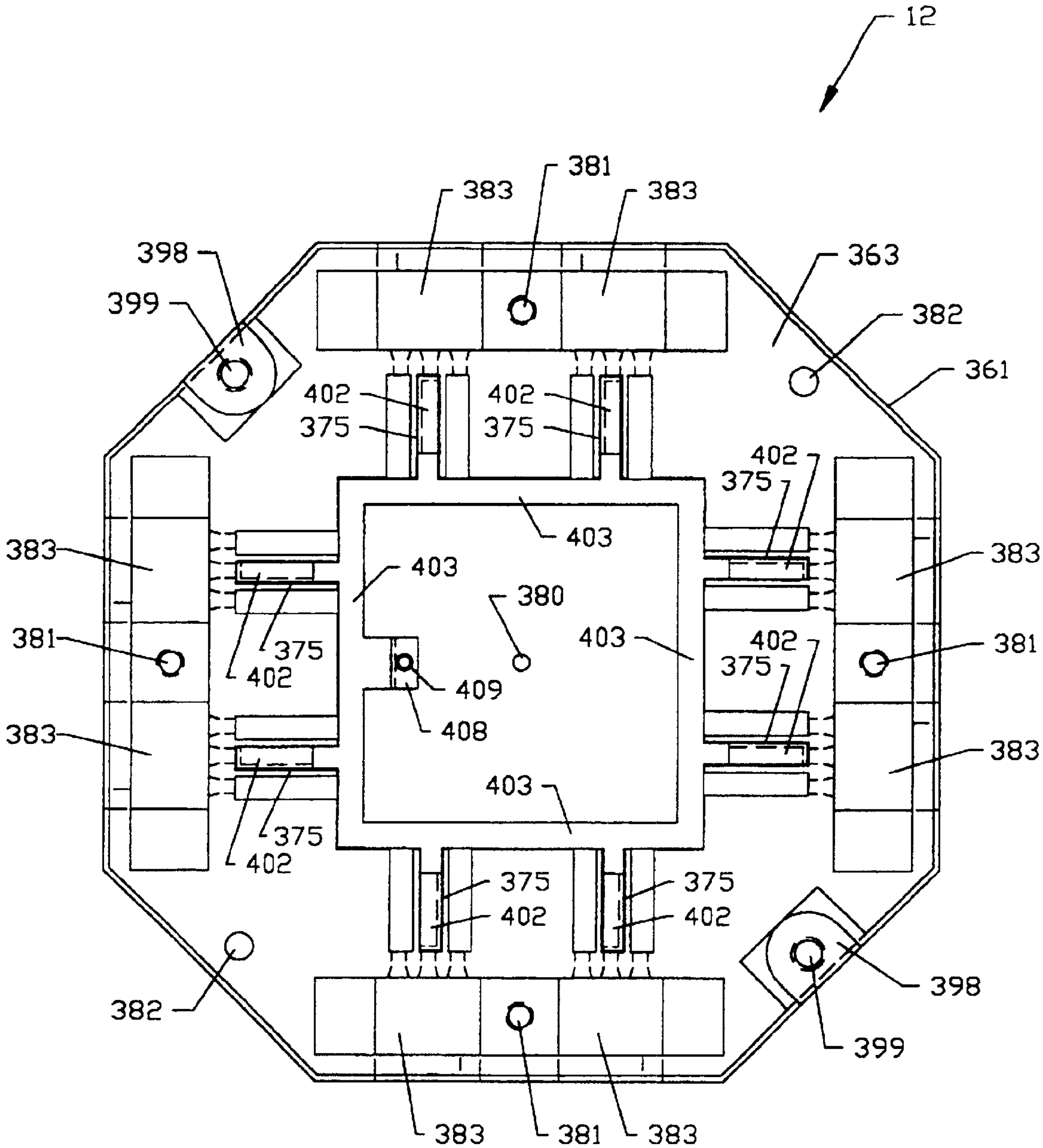
FIG. 87 is a horizontal section view taken along line 87—87 of FIG. 85.
Figure 88:
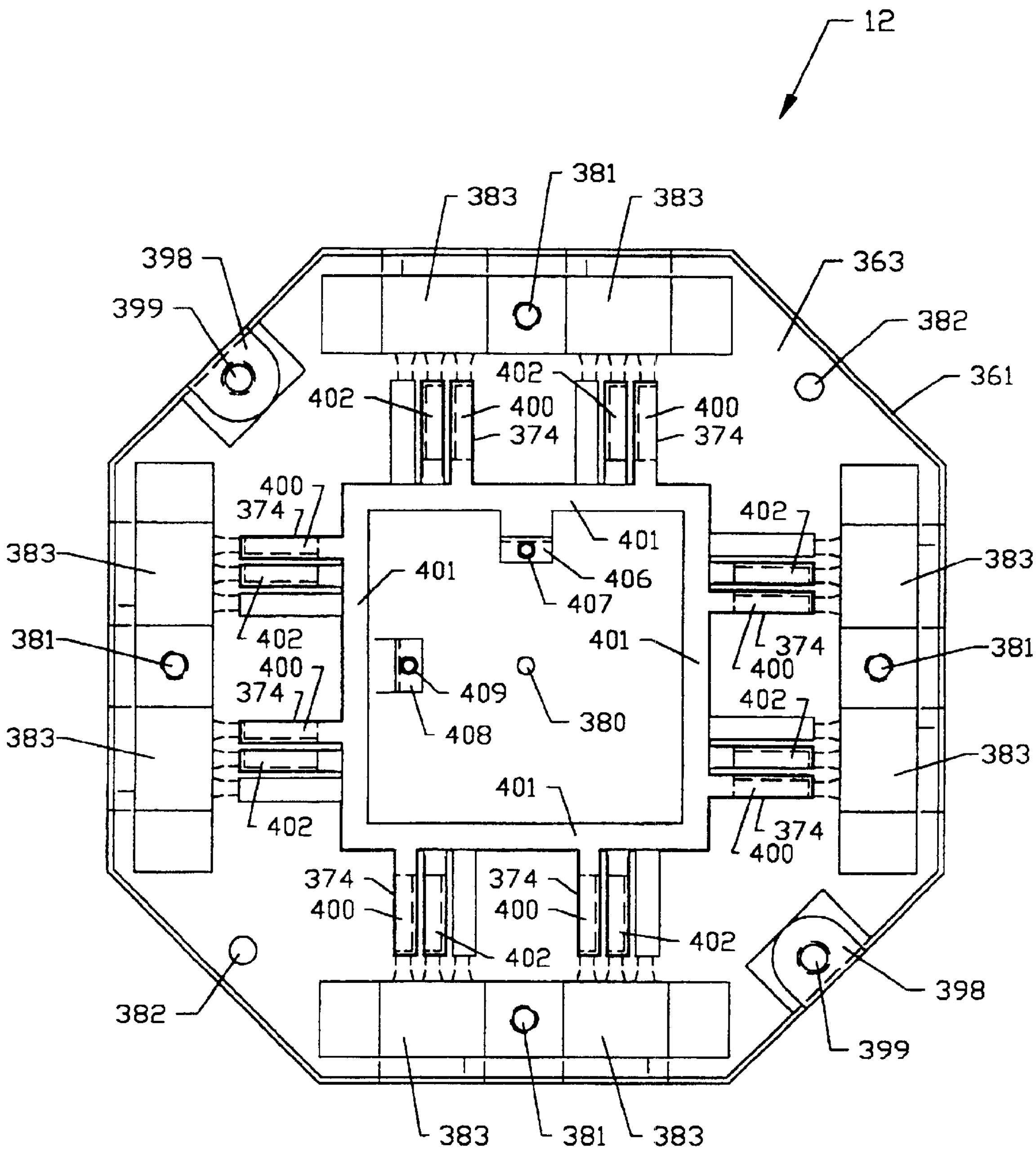
FIG. 88 is a horizontal section view taken along line 88—88 of FIG. 85.
Figure 89:
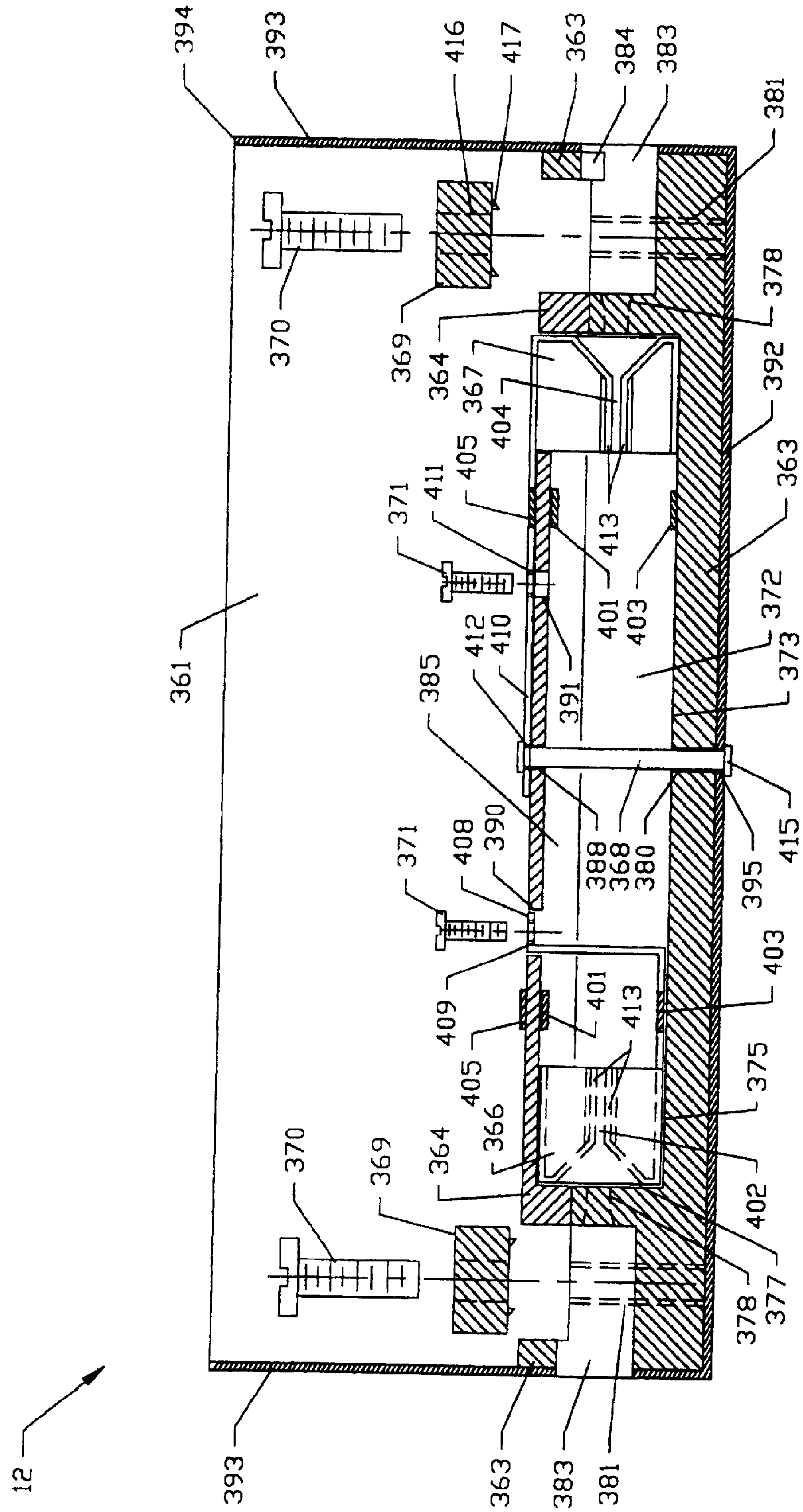
FIG. 89 is a horizontal section view taken along line 89—89 of FIG. 83.
Figure 90:
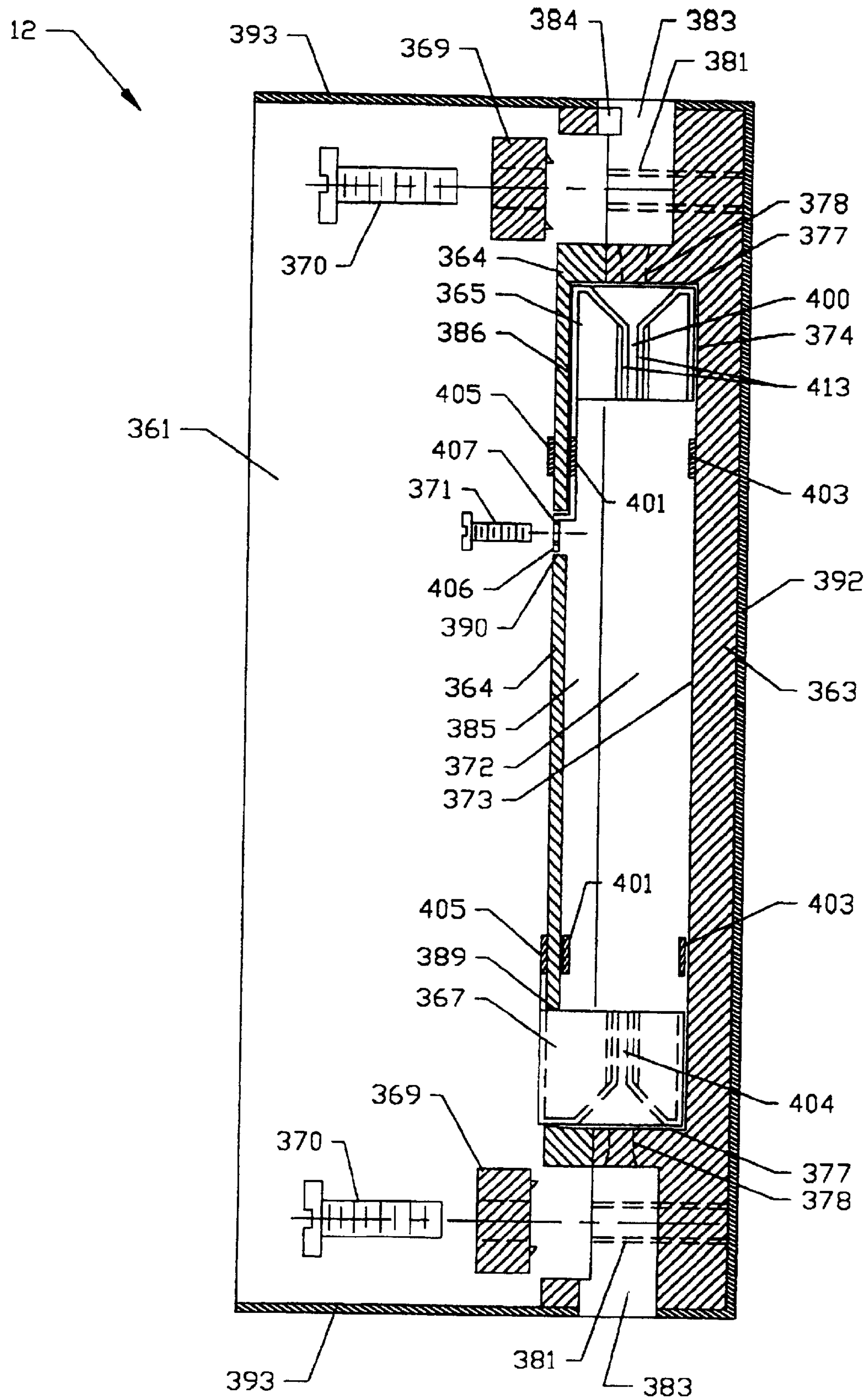
FIG. 90 is a vertical section view taken along line 90—90 of FIG. 83.

Assembly of the junction box 12 is easily seen in FIG. 85. The wiring module base 363 is inserted into the electrical box 361. The neutral wire adapter 366 is fully inserted into the center cavity 372 of the wiring module base 363 such that the neutral wire pressure-sockets 402 are inserted into the neutral socket cavities 375 and the neutral wire adapter base 4403 is at the bottom 373 of the center cavity 372. The positive wire adapter 365 is fully inserted into the center cavity 372 of the wiring module base 363 such that the positive wire pressure-sockets 400 are inserted into the positive socket cavities 374 and the positive wire adapter base 401 is at the top of the wiring module base 363. The wiring module cover 364 is then placed on top of the wiring module base 363. The ground wire adapter 367 is inserted into the wiring module cover 364 such that the ground wire pressure-sockets 404 penetrate through the ground socket holes 389 and into the ground socket cavities 376 of the wiring module base 363. The rivet 368 is inserted through the rivet hole 412 of the ground wire adapter 367, through the rivet hole 388 of the wiring module cover 364, through the rivet hole 380 of the wiring module base 363, and through the rivet hole 395 of the electrical box 361 where the rivet head 415 is expanded as it draws the components tightly together and secures the junction box 12 as one assembly. A terminal screw 371 is inserted into each of the threaded holes 407, 409, 411 of the wire adapters 365, 366, 367. One of the four screws 370 is inserted through the mounting hole 416 of each cable clamp 369 and into the threaded holes 381 of the wiring module base 363.

Referring to FIGS. 92 through 104, there is provided a light box 13. The two principal components of the light box 13 are the electrical box 421 and the wiring module 422. The wiring module 422 is comprised of a base 423, cover 424, ten wire adapters 425, 426, 427, 428, 429, 430, 431, 432, 433, 434, four terminal screws 438, rivet 435, four cable clamps 436, and four cable clamp screws 437.

The wiring module base 423 is constructed of plastic, or otherwise a non-conductive material. The top side 459 and bottom side 460 of the wiring module base 423 are each provided with one 3-conductor cable port 468, 469 and one 4-conductor cable port 470, 471. The right side 462 of the wiring module base 423 is provided with two 5-conductor cable ports 472, 473. The left side 461 of the wiring module base 423 is provided with two 3-conductor cable ports 466, 467. Each 3-conductor cable port 466, 467, 468, 469 is rectangular shaped with end-projections 474 to create a specific interior profile. Each 4-conductor cable port 470, 471 and 5-conductor cable port 472, 473 is rectangular shaped with center-projections 475 to create a specific interior profile. The wiring module base 423 provides one center cavity 439 to accommodate the wire adapters 425, 426, 428–434. Thirty socket cavities 441–456 arc located around the perimeter of the center cavity 439. A wire entrance hole 458 is provided at the end 457 of each socket cavity 441–456. The wiring module base 423 provides one rivet hole 463, two mounting holes 465, and four threaded holes 464.

The ten wire adapters 425–434 are each of a one-piece formed construction and constructed of a copper alloy, or otherwise a conductive material. The positive wire adapter 425 provides three wire pressure-sockets 501 attached to the positive wire adapter base 502 and located in alignment with the positive socket cavities 441 in the wiring module base 423. A terminal tab 521 is also attached to the positive wire adapter base 502 which provides a threaded hole 522. The neutral wire adapter 426 provides four wire pressure-sockets 503 attached to the neutral wire adapter base 504 and located in alignment with the neutral socket cavities 442 in the wiring module base 423. A terminal tab 523 is also attached to the neutral wire adapter base 504 which provides a threaded hole 524. The ground wire adapter 427 provides eight wire pressure-sockets 505 attached to the ground wire adapter base 506 and located in alignment with the ground socket cavities 443 in the wiring module base 423. A terminal tab 525 is also attached to the ground wire adapter base 506 which provides a threaded hole 526 and a rivet hole 529. The light wire adapter 428 provides three wire pressure-sockets 507 attached to the light wire adapter base 508 and located in alignment with the light socket cavities 444 in the wiring module base 423. A terminal tab 527 is also attached to the light wire adapter base 508 which provides a threaded hole 528. Switch wire adapter-AD 429 provides two wire pressure-sockets 509, 512 located such that wire pressure-socket-A 509 and wire pressure-socket-D 512 are in alignment with socket cavity-A 445 and socket cavity-D 448 in the wiring module base 423, respectively. Switch wire adapter-BC 450 provides two wire pressure-sockets 510, 511 located such that wire pressure-socket-B 510 and wire pressure-socket-C 511 are in alignment with socket cavity-B 446 and socket cavity-C 447 in the wiring module base 423, respectively. Switch wire adapter-EH 431 provides two wire pressure-sockets 513, 516 located such that wire pressure-socket-E 513 and wire pressure-socket-H 516 are in alignment with socket cavity-E 449 and socket cavity-H 452 in the wiring module base 423, respectively. Switch wire adapter-FG 432 provides two wire pressure-sockets 514, 515 located such that wire pressure-socket-F 514 and wire pressure-socket-G 515 are in alignment with socket cavity-F 450 and socket cavity-G 451 in the wiring module base 423, respectively. Switch wire adapter-JM 433 provides two wire pressure-sockets 517, 520 located such that wire pressure-socket-J 517 and wire pressure-socket-M 520 are in alignment with socket cavity-J 453 and socket cavity-M 456 in the wiring module base 423, respectively. Switch wire adapter-KL 434 provides two wire pressure-sockets 518, 519 located such that wire pressure-socket-K 518 and wire pressure-socket-L 519 are in alignment with socket cavity-K 454 and socket cavity-L 455 in the wiring module base 423, respectively. The wire pressure-sockets 501, 503, 505, 507, 509–520, are created by two opposing tabs 530 which are formed closely together and flexible such that the tabs 530 exert pressure on a wire that is larger than the space between the tabs 530, as the wire is inserted. The tabs 530 are each provided with an indentation 531 to provide maximum contact with the wire.

The wiring module cover 424 is constructed of plastic, or otherwise a non-conductive material. The back side 478 of the wiring module cover 424 provides thirty socket cavities 477 located around the perimeter of a center cavity 476. The wiring module cover 424 also provides one rivet hole 479, eight ground socket holes 480, three terminal tab clearance holes 481, and a screw clearance hole 482. The four cable clamps 436 may be constructed of aluminum or plastic and are provided with ridges 534 to increase the clamping effectiveness. The cable clamps 436 are also provided with one mounting hole 533.

Figure 104:
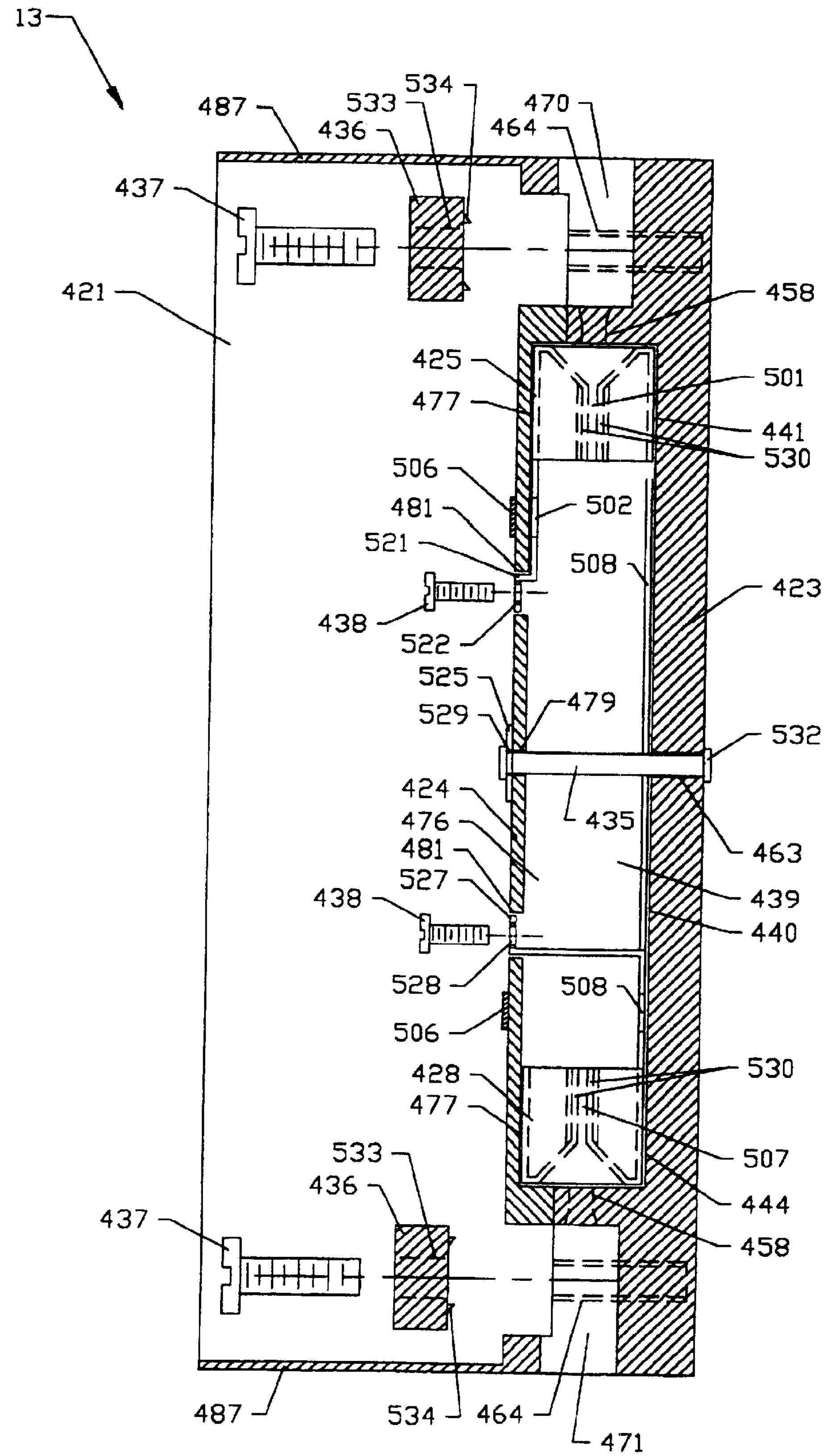
FIG. 104 is a vertical section view taken along line 104—104 of FIG. 92 shown with the electrical box molded with the wiring module base as one piece.

The electrical box 421 may be constructed of steel or plastic. The top side 484 and bottom side 485 of the electrical box 421 are each provided with one 3-conductor cable hole 491 and one 4-conductor cable hole 492. The right side 487 of the electrical box 421 is provided with two 5-conductor cable holes 493. The left side 486 of the electrical box 421 is provided with two 3-conductor cable holes 491. The cable holes 491, 492, 493 are located in alignment with the cable ports 466–473 of the wiring module base 423. A rivet hole 489 is provided in the back wall 483 of the electrical box 421 to accommodate the rivet 435. Two mounting holes 490 are also provided in the back wall 483 for mounting purposes. Two fixture mounting tabs 494 are provided at the outer edge 488 of the electrical box 421. Each of the two fixture mounting tabs 494 are provided with a threaded hole 495 which are located to industry standards to accommodate standard fixtures and cover plates. Plastic construction of the electrical box 421 permits the wiring module base 423 to be molded with the electrical box 421 as one piece, as shown in FIG. 104.

Figure 97:
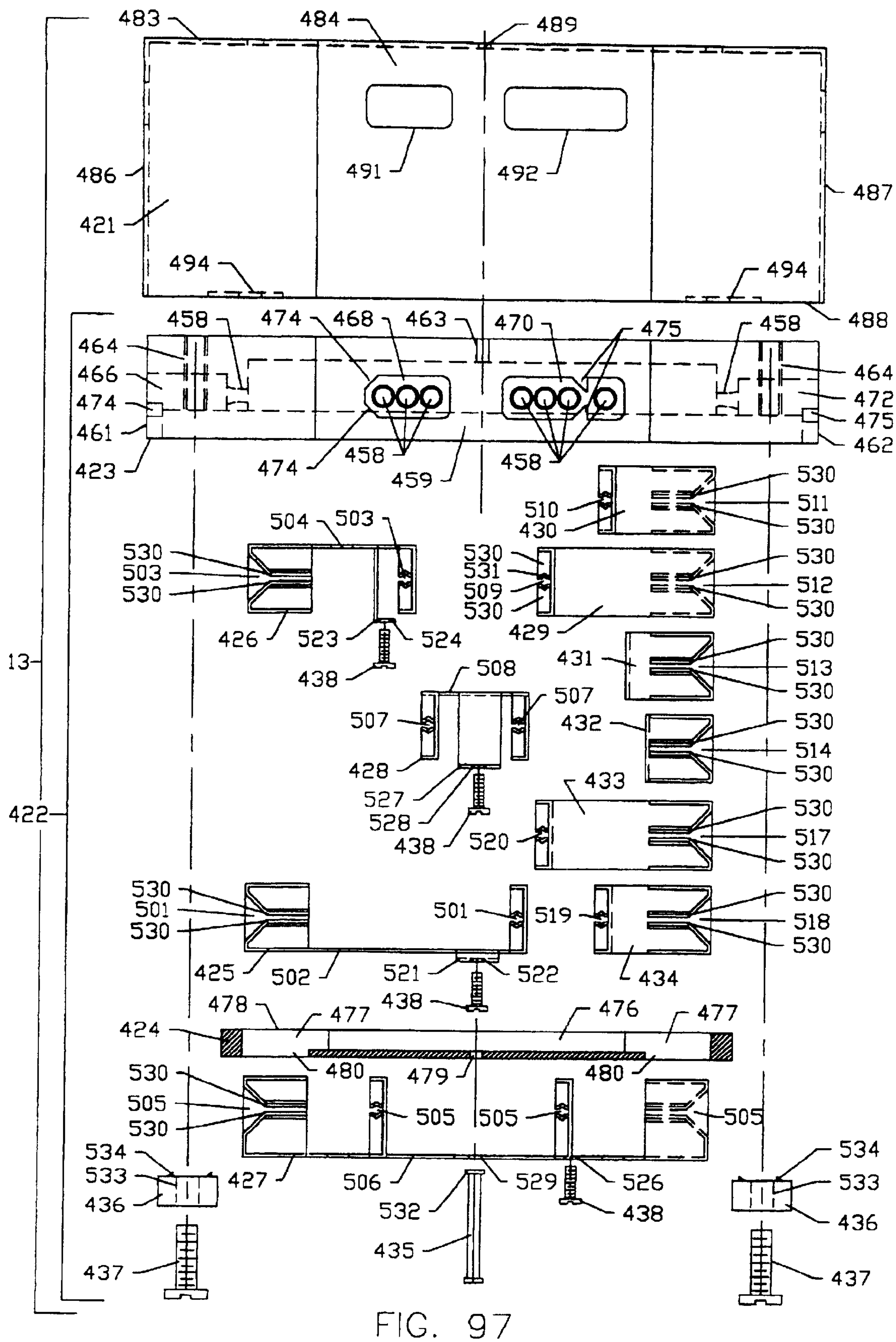
FIG. 97 is a plan view of the light box shown in exploded form.
Figure 98:
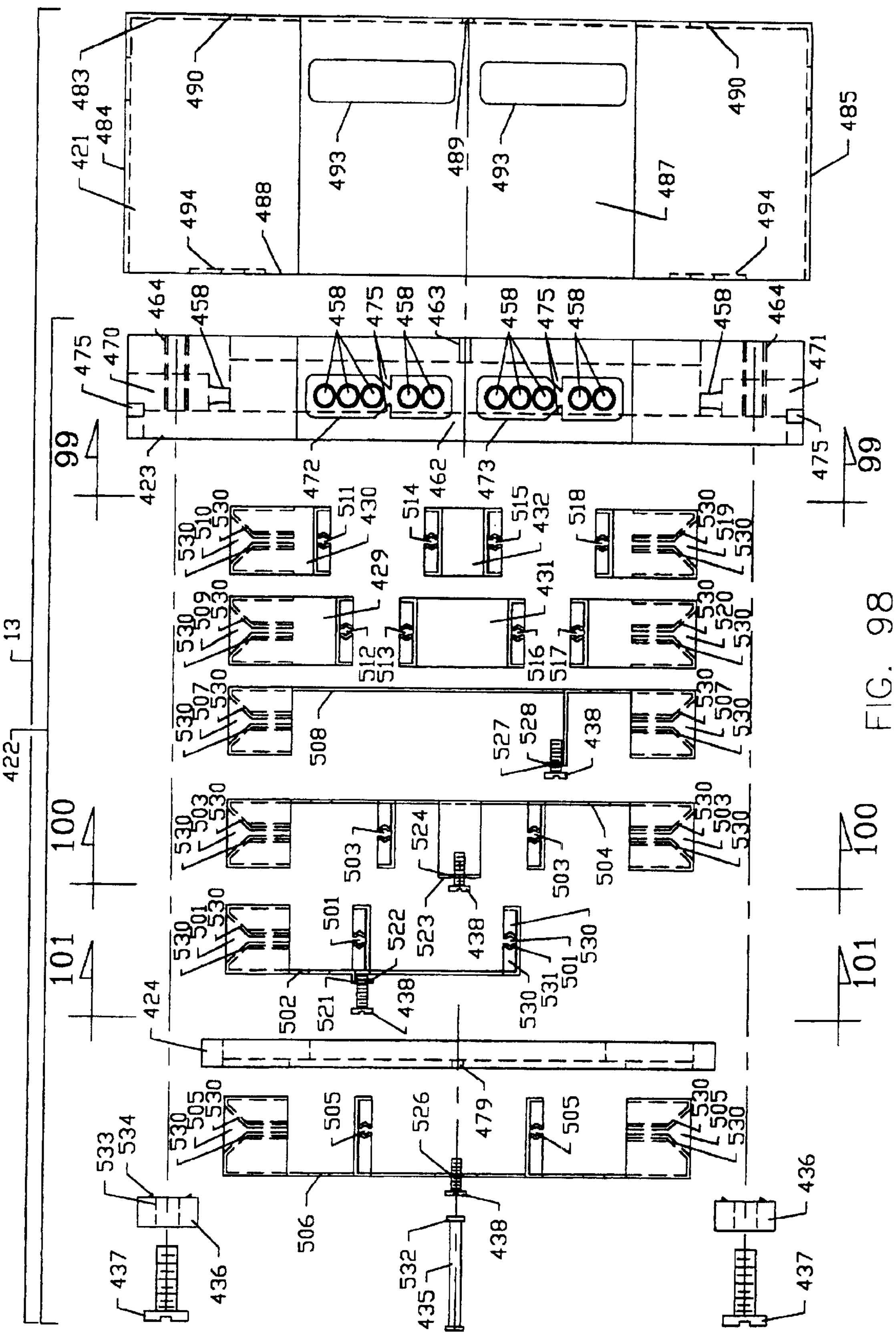
FIG. 98 is a right-side view of the light box shown in exploded form.
Figure 99:
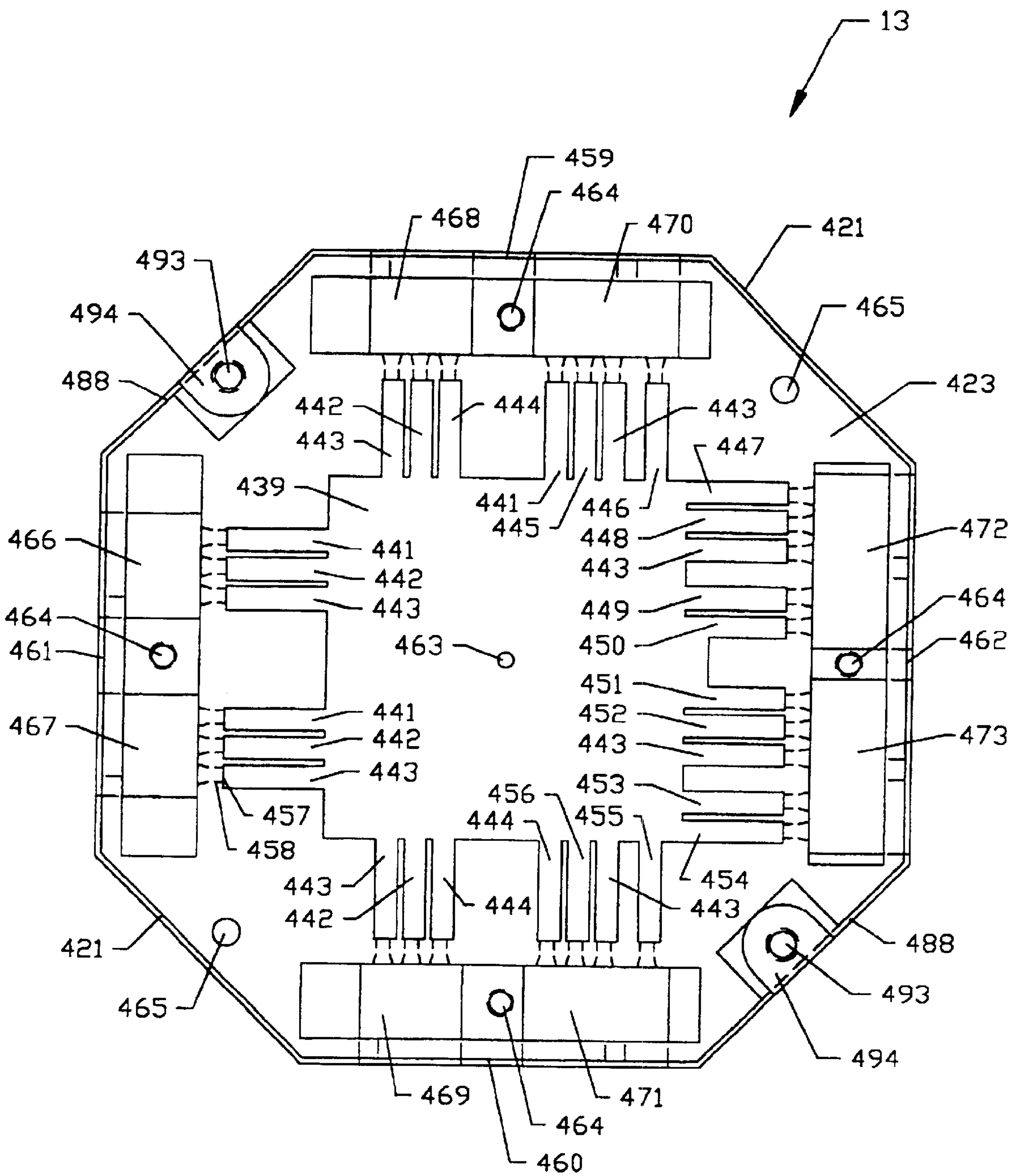
FIG. 99 is a vertical section view taken along line 99—99 of FIG. 98.
Figure 100:
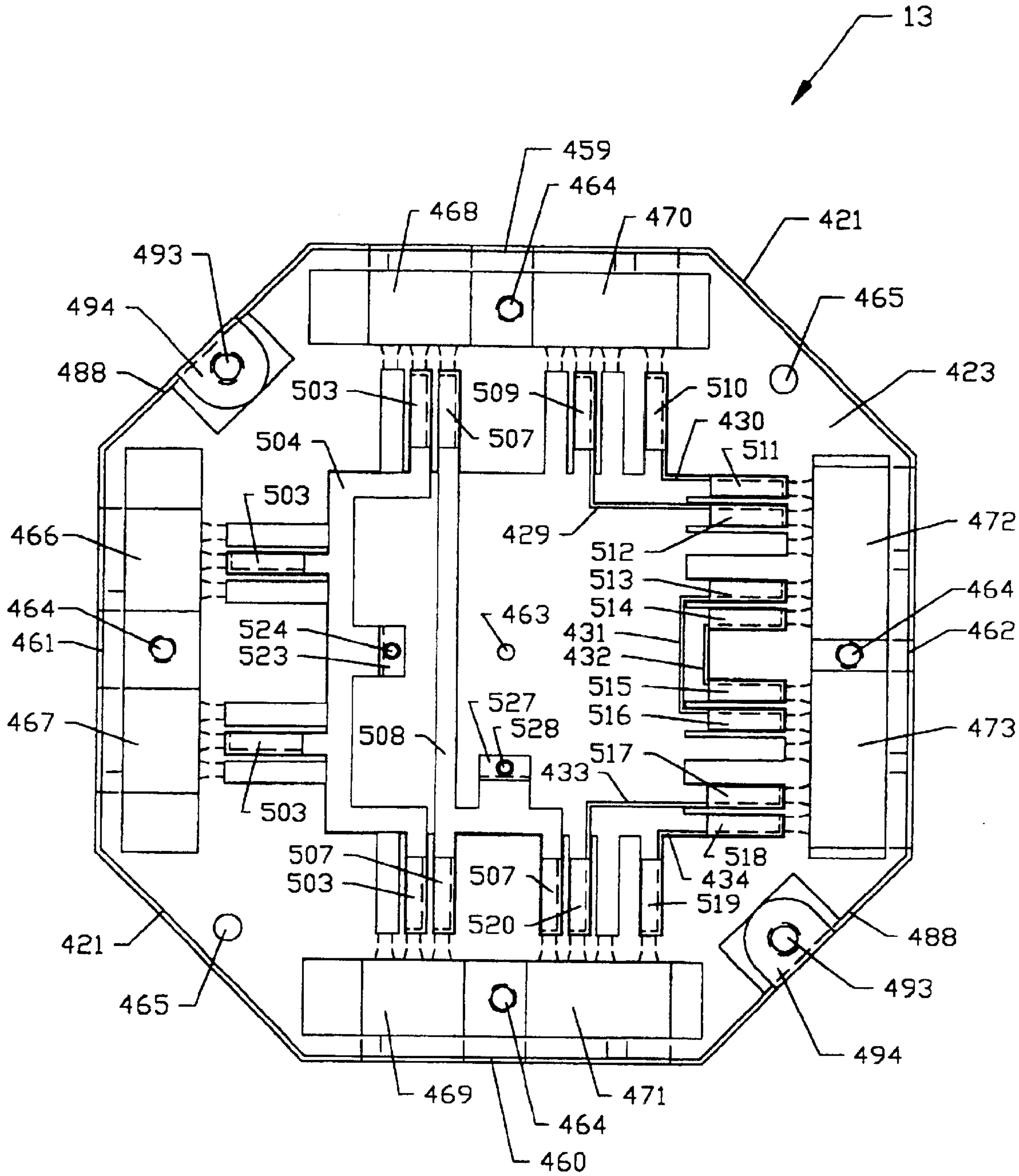
FIG. 100 is a vertical section view taken along line 100—100 of FIG. 98.
Figure 101:
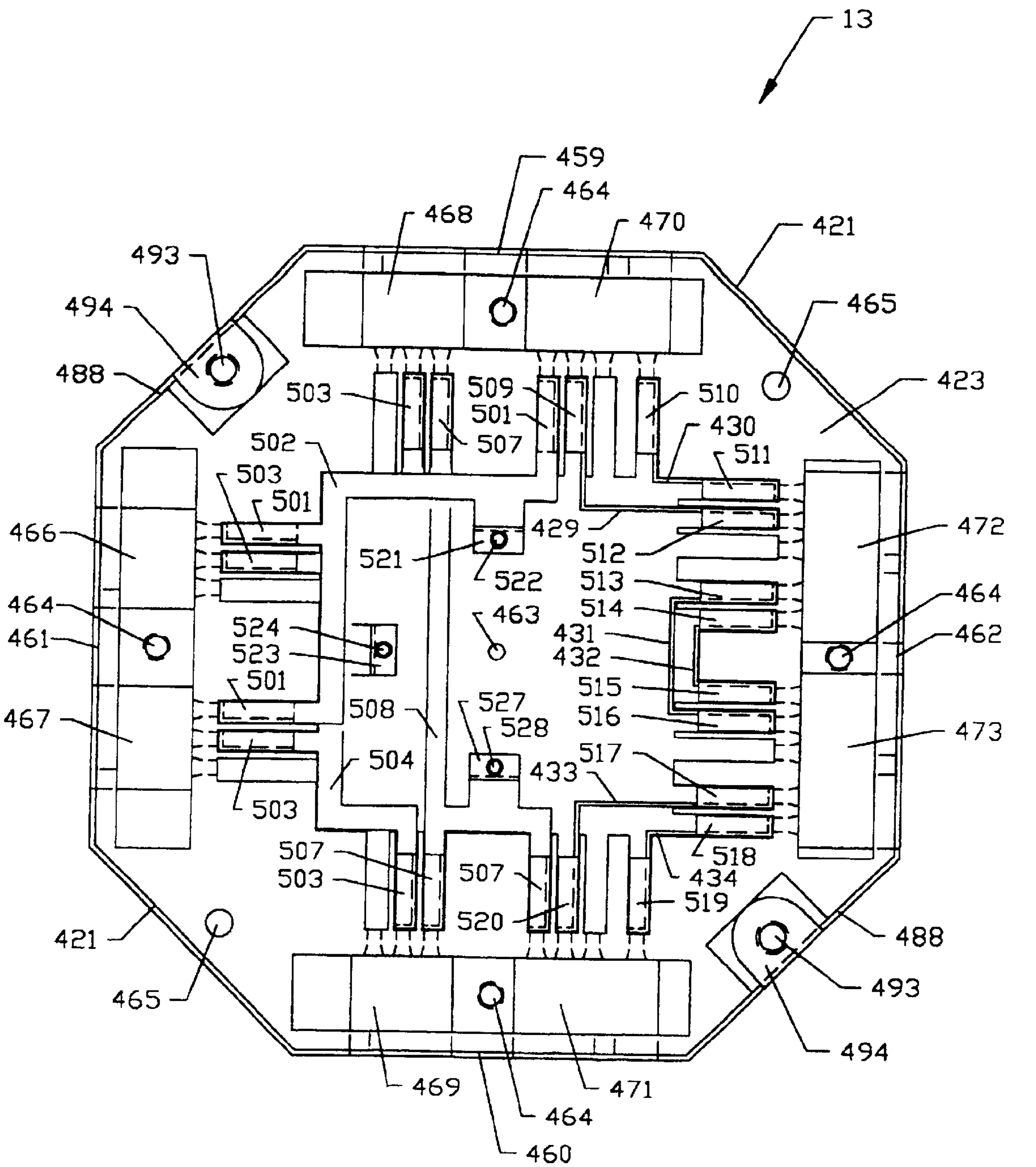
FIG. 101 is a vertical section view taken along line 101—101 of FIG. 98.
Figure 102:
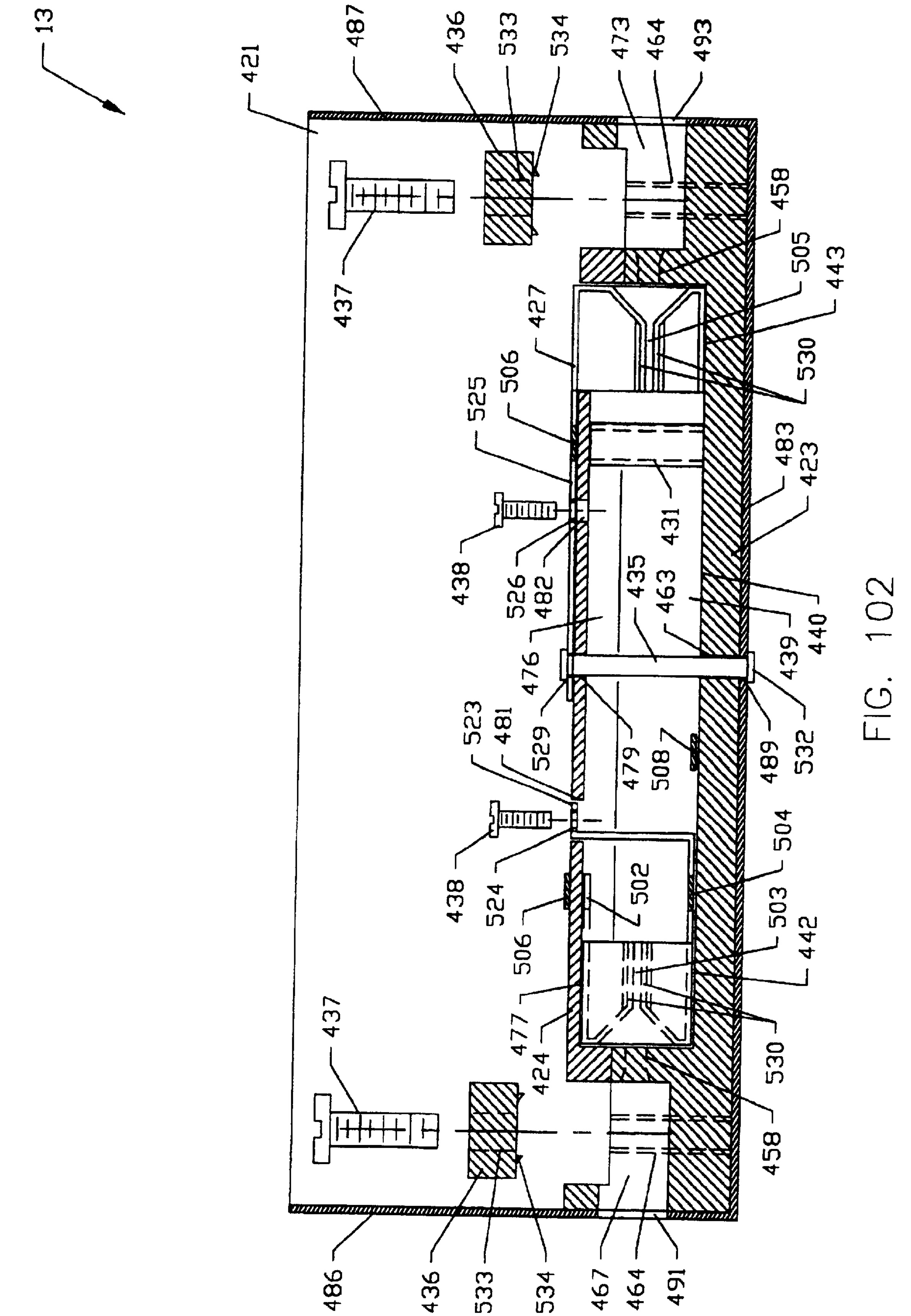
FIG. 102 is a horizontal section view taken along line 102—102 of FIG. 92.
Figure 103:
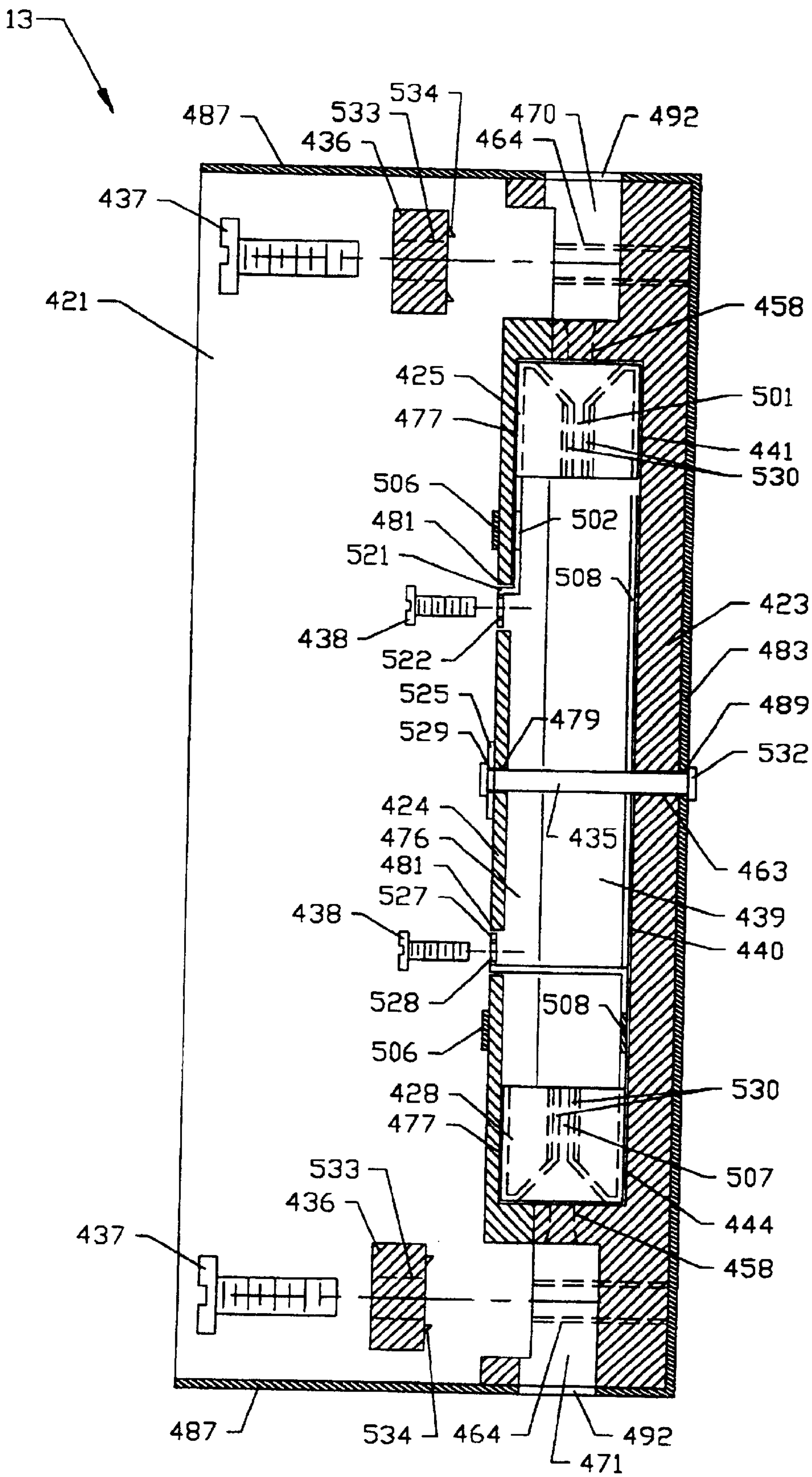
FIG. 103 is a vertical section view taken along line 103—103 of FIG. 92.

Assembly of the light box 13 is easily seen in FIGS. 97 and 98. The wiring module base 423 is inserted into the electrical box 421. The neutral wire adapter 426 is fully inserted into the center cavity 439 of the wiring module base 423 such that the neutral wire pressure-sockets 503 are inserted into the neutral socket cavities 442 and the neutral wire adapter base 504 is at the bottom 440 of the center cavity 439. The light wire adapter 428 is fully inserted into the center cavity 439 of the wiring module base 423 such that the light wire pressure-sockets 507 are inserted into the light socket cavities 444 and the light wire adapter base 508 is at the bottom 440 of the center cavity 439. The switch wire adapters 429–434 are fully inserted into the center cavity 439 of the wiring module base 423 such that the wire pressure-sockets 509–520, are inserted into their respective socket cavities 445–456. The positive wire adapter 425 is fully inserted into the center cavity 439 of the wiring module base 423 such that the positive wire pressure-sockets 501 are inserted into the positive socket cavities 441 and the positive wire adapter base 502 is at the front of the wiring module base 423. The wiring module cover 424 is then placed onto the wiring module base 423. The ground wire adapter 427 is inserted into the wiring module cover 424 such that the ground wire pressure-sockets 505 penetrate through the ground socket holes 480 and into the ground socket cavities 443 of the wiring module base 423. The rivet 435 is inserted through the rivet hole 529 of the ground wire adapter 427, through the rivet hole 479 of the wiring module cover 424, through the rivet hole 463 of the wiring module base 423, and through the rivet hole 489 of the electrical box 421 where the rivet head 532 is expanded as it draws the components tightly together and secures the light box 13 as one assembly. A terminal screw 438 is inserted into each of the threaded holes 522, 524, 526, 528 of the wire adapters 425, 426, 427, 428. One of the four screws 437 is inserted through the screw hole 533 of each cable clamp 436 and into the threaded holes 464 of the wiring module base 423.

Figure 105:
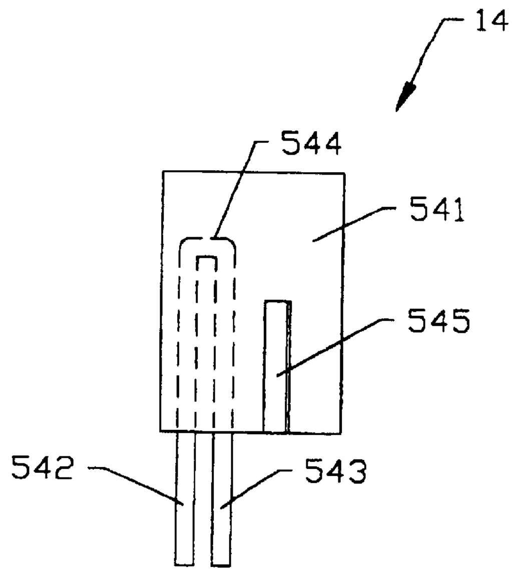
FIG. 105 is a front elevation view of the 2-wire jumper.
Figure 106:
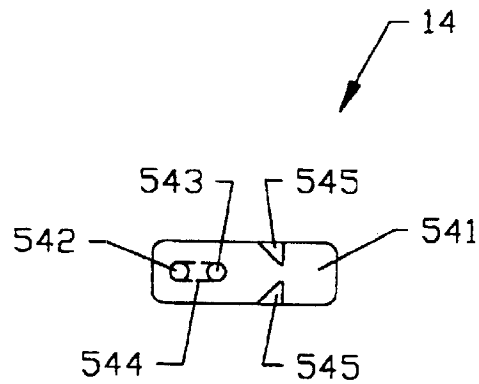
FIG. 106 is a bottom view of the 2-wire jumper.

Referring to FIGS. 105 and 106, there is provided a 2-wire jumper 14. The handle 541 is constructed of plastic, or otherwise a non-conductive material. Jumper-NP 544 is constructed of copper wire and formed as shown in FIG. 105 to provide exterior wire-N 542 and exterior wire-P 543. The jumper-NP 544 is molded into the handle 541. The handle 541 is provided with two center-projection grooves 545 to create a specific exterior profile. The specific exterior profile and the location of the exterior wires 542, 543 provides a slip-fit with the 4-conductor cable ports 470, 471 in the wiring module base 423 of the light box 13, as seen in FIG. 196.

Figure 107:
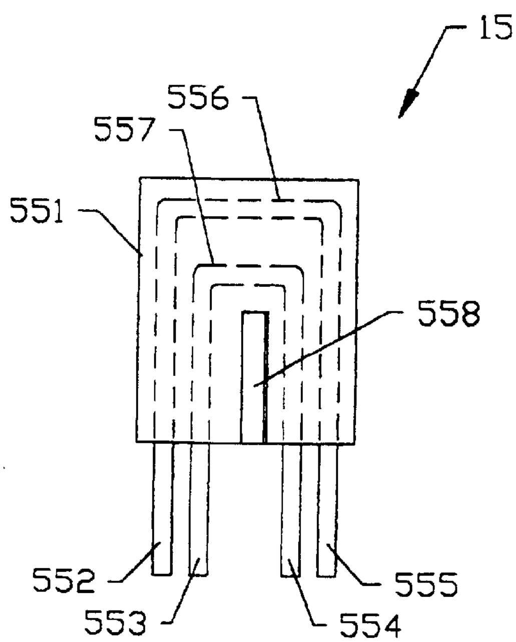
FIG. 107 is a front elevation view of the 4-wire jumper.
Figure 108:
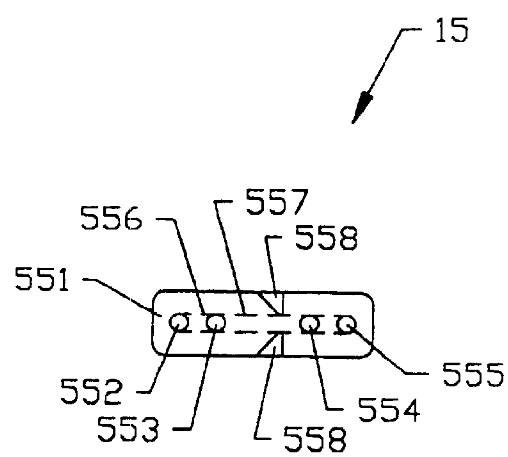
FIG. 108 is a bottom view of the 4-wire jumper.

Referring to FIGS. 107 and 108, there is provided a 4-wire jumper 15. The handle 551 is constructed of plastic, or otherwise a non-conductive material. Jumper-RU 556 and jumper-ST 557 are constructed of copper wire. Jumper-RU 556 is formed as shown in FIG. 107 to provide exterior wire-R 552 and exterior wire-U 555. Jumper-ST 557 is formed as shown in FIG. 107 to provide exterior wire-S 553 and exterior wire-T 554. Jumper-RU 556 and jumper-ST 557 are molded into the handle 551. The handle 551 is provided with two center-projection grooves 558 to create a specific exterior profile. The specific exterior profile and the location of the exterior wires 552, 553, 554, 555 provides a slip-flit with the 5-conductor cable ports 472, 473 in the wiring module base 423 of the light box 13, as seen in FIG. 194.

Figure 109:
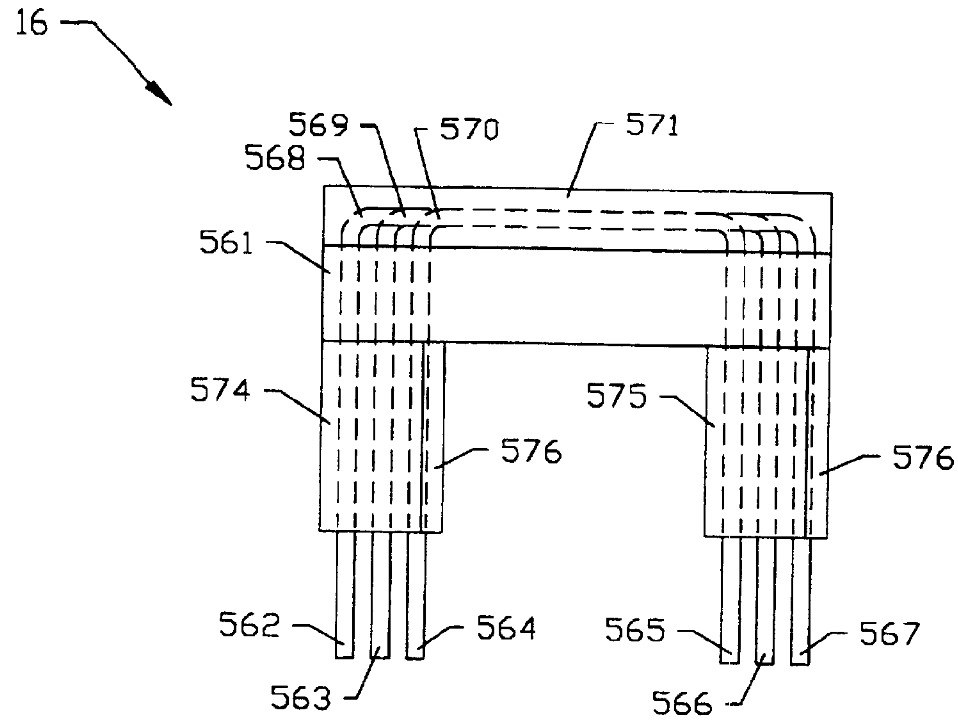
FIG. 109 is a front elevation view of the wallbox jumper.
Figure 110:
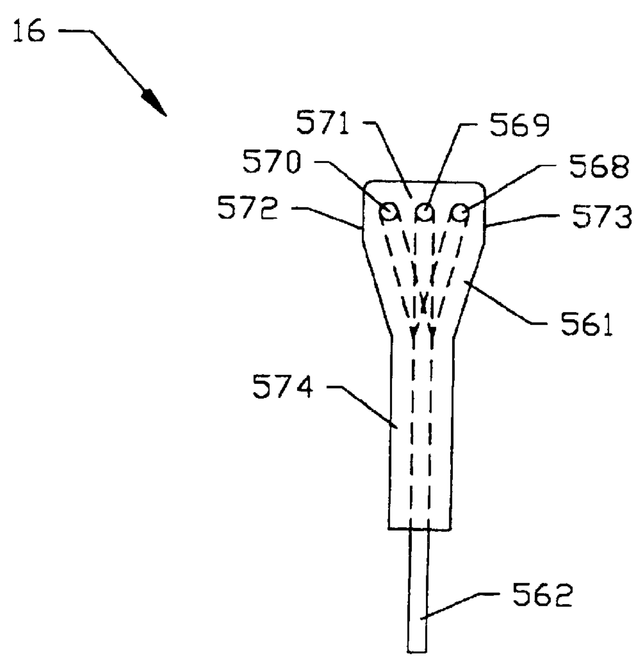
FIG. 110 is a side elevation view of the wallbox jumper.
Figure 111:
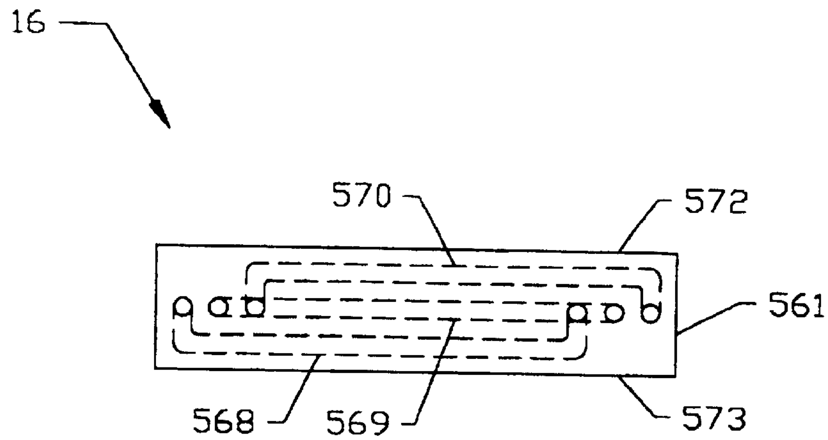
FIG. 111 is a plan view of the wallbox jumper.
Figure 112:
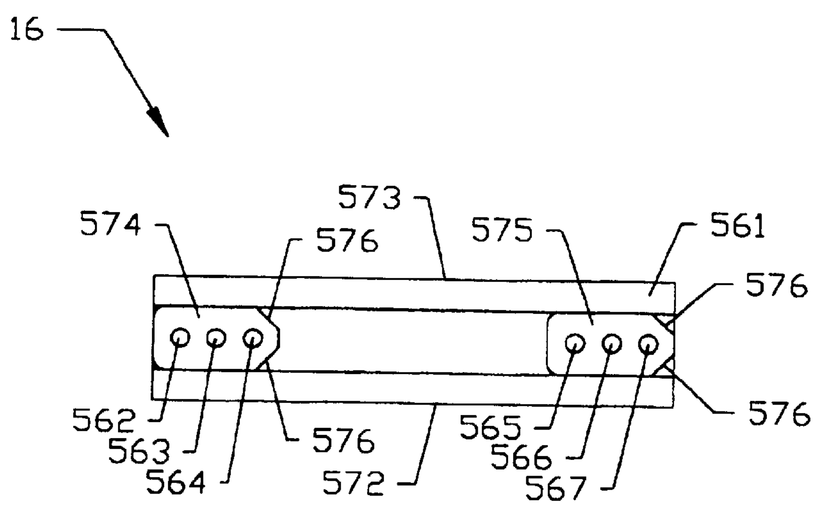
FIG. 112 is a bottom view of the wallbox jumper.

Referring to FIGS. 109 through 112, there is provided a wallbox jumper 16. The handle 561 is constructed of plastic, or otherwise a non-conductive material. Jumper-GK 568, jumper-HL 569, and jumper-JM 570 are constructed of copper wire. Jumper-GK 568 is formed as shown in FIGS. 109 and 110 to provide exterior wire-G 562 and exterior wire-K 565. Jumper-HL 569 is formed as shown in FIGS. 109 and 110 to provide exterior wire-H 563 and exterior wire-L 566. Jumper-JM 570 is formed as shown in FIGS. 109 and 110 to provide exterior wire-J 564 and exterior wire-M 567. Jumper-GK 568, jumper-HL 569, and jumper-JM 570 are molded into the handle 561. The handle top 571 provides jumper-GK 568 bent toward the handle front-side 573 and jumper-JM 570 bent toward the handle back-side 572 to avoid jumper-HL 569. The handle 561 is provided with two extensions 574, 575. Each handle extension 574, 575 is provided with two end-projection chamfers 576 to create a specific exterior profile. The specific exterior profile of the left handle extension 574 and the location of the exterior wires 562, 563, 564 provide for a slip-fit into the right half 41 of the top cable port 39 in the wiring module base 23 of the wallbox 1, as seen in FIG. 132. The specific exterior profile of the right handle extension 575 and the location of the exterior wires 565, 566, 567 provide for a slip-fit into the left half 40 of the top cable port 39 in the wiring module base 23 of the wallbox 1, as seen in FIG. 132.

Figure 113:
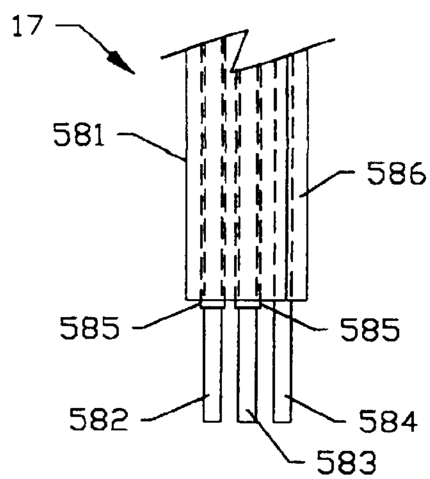
FIG. 113 is a front elevation view of the 3-conductor cable.
Figure 114:
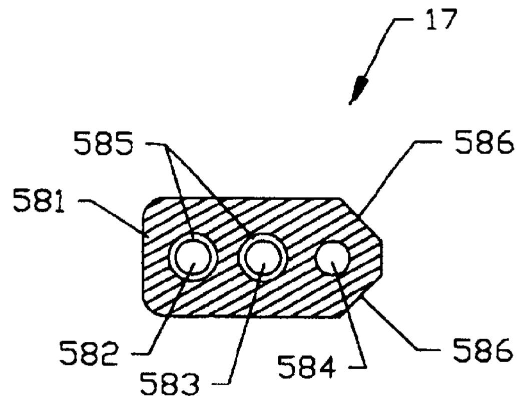
FIG. 114 is a cross-section view of the 3-conductor cable.
Figure 120:
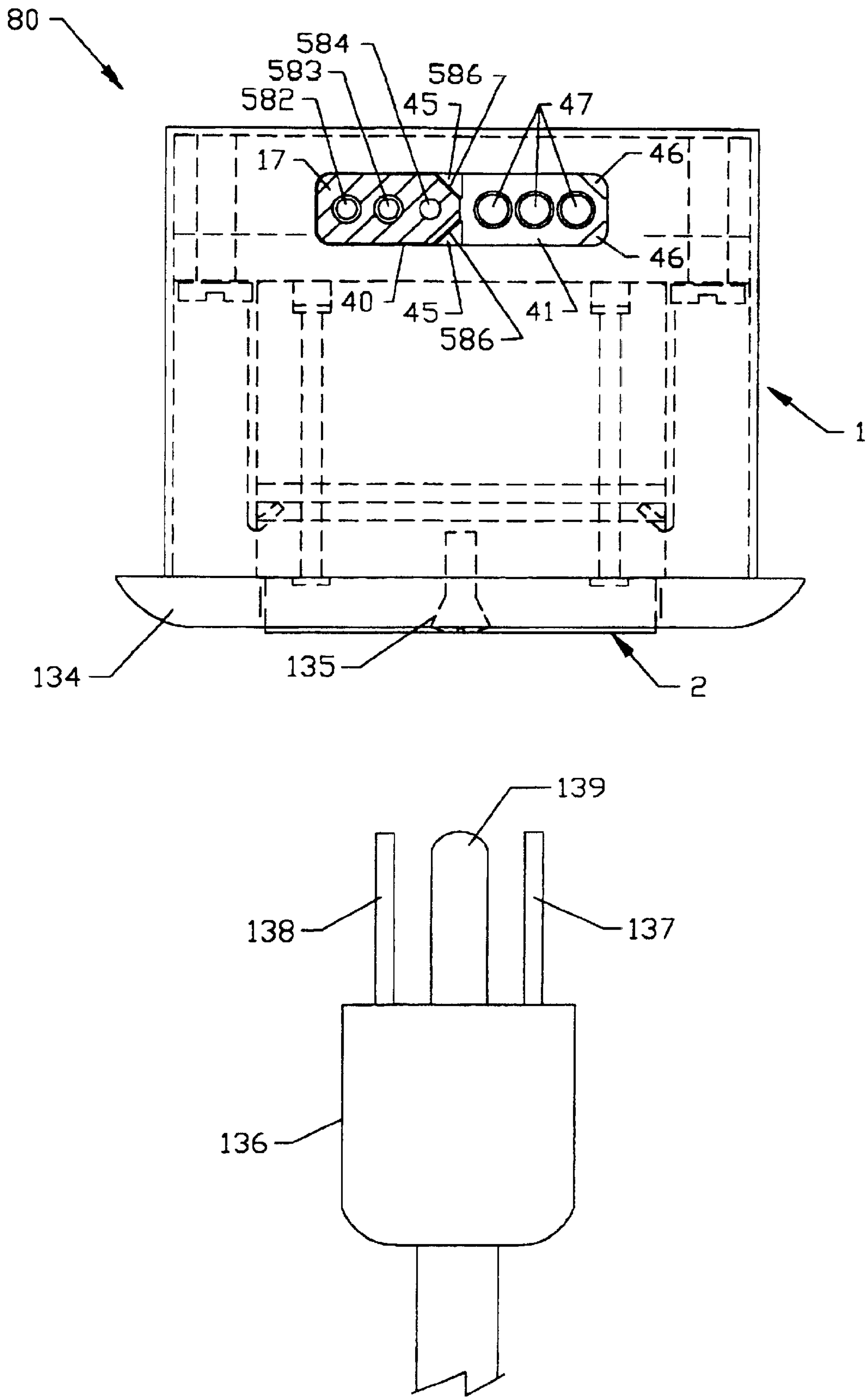
Figure 121:
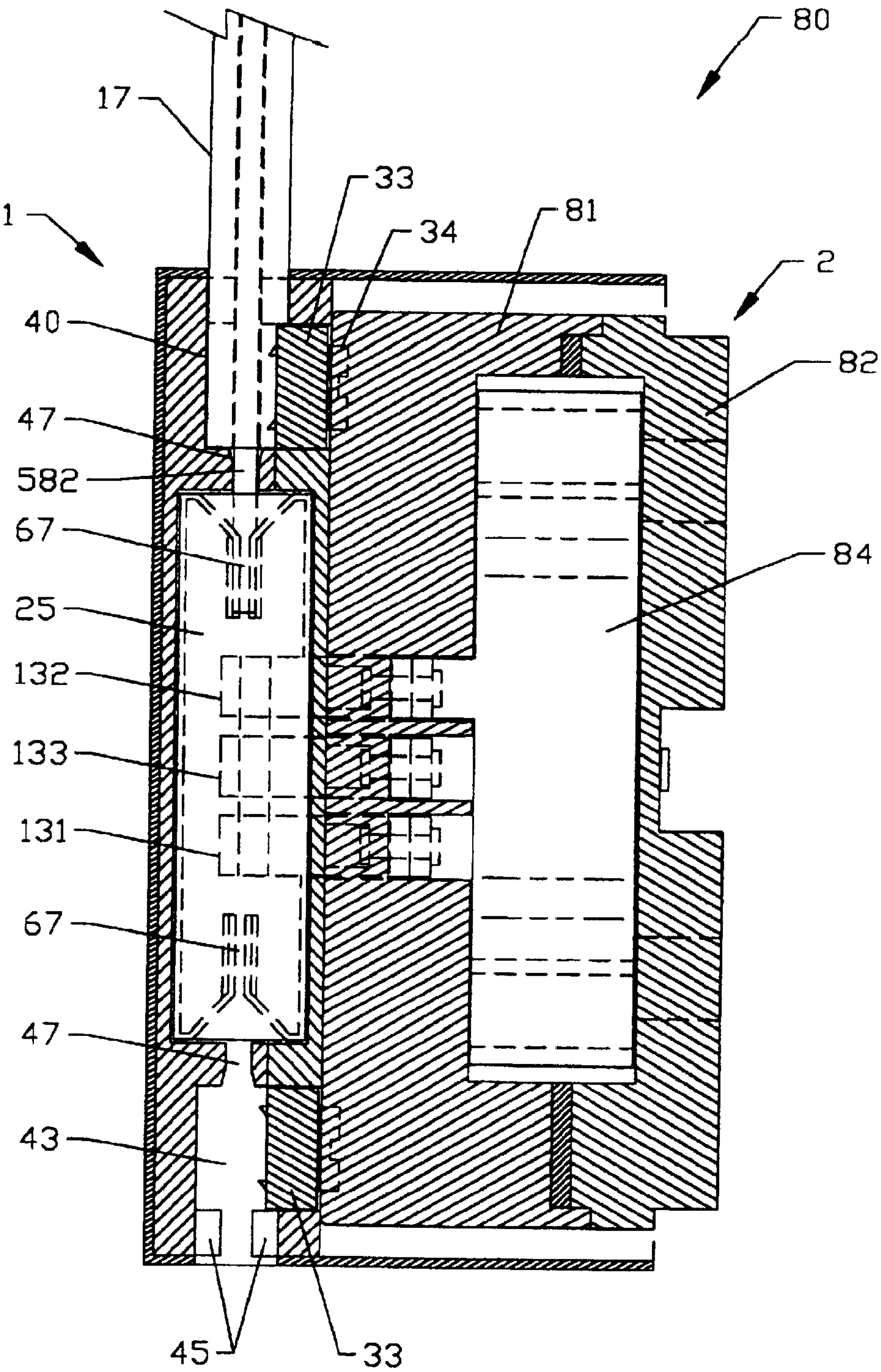

Referring to FIGS. 113 and 114, there is provided a 3-conductor cable 17. The cable sheath 581 is constructed of polyurethane, or otherwise a durable elastomer. The 3-conductor cable 17 contains two insulated wire conductors 582, 583 and one ground wire conductor 584. The insulated wire conductors 582, 583 are each provided with an individual wire insulation sheath 585 for additional protection. The cable sheath 581 is extruded with two end-projection chamfers 586 to provide a specific exterior profile. The wire conductors 582, 583, 584 are located in the cable sheath 581 relative to the specific exterior profile such that the 3-conductor cable 17 provides a slip-fit with the 3-conductor cable ports 466–469 in the wiring module base 423 of the light box 13, as seen in FIGS. 193 and 195; also, with the cable ports 383 in the wiring module base 363 of the junction box 12, as seen in FIG. 190; and with the cable ports 39, 42 in the wiring module base 23 of the wallbox 1, as seen in FIG. 120.

Figure 115:
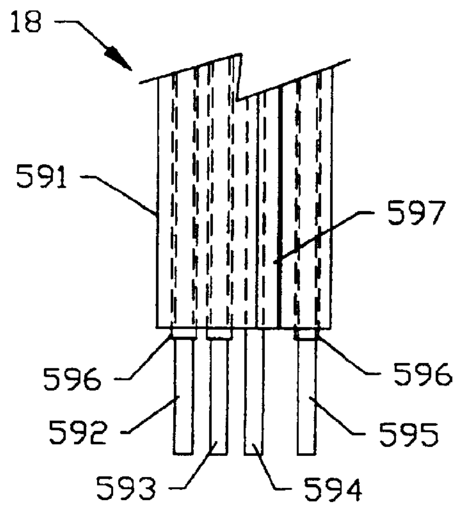
FIG. 115 is a front elevation view of the 4-conductor cable.
Figure 116:
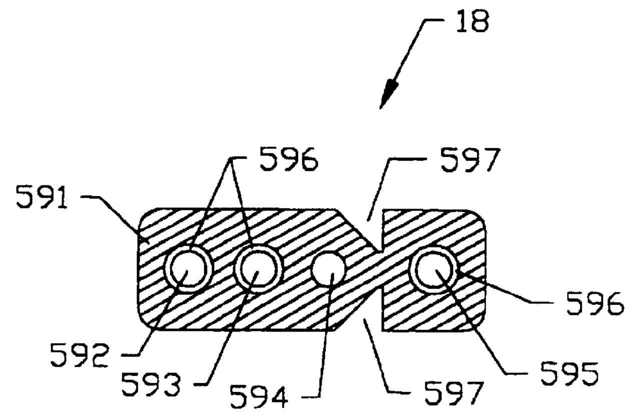
FIG. 116 is a cross-section view of the 4-conductor cable.

Referring to FIGS. 115 and 116, there is provided a 4-conductor cable 18. The cable sheath 591 is constructed of polyurethane, or otherwise a durable elastomer. The 4-conductor cable 18 contains three insulated wire conductors 592, 593, 595 and one ground wire conductor 594. The insulated wire conductors 592, 593, 595 are provided with an individual wire insulation sheath 596 for additional protection. The cable sheath 591 is extruded with two center-projection grooves 597 to provide a specific exterior profile. The wire conductors 592–595 are located in the cable sheath 591 relative to the specific exterior profile such that the 4-conductor cable 18 provides a slip-fit with the 4-conductor cable ports 470, 471 in the wiring module base 423 of the light box 13, as seen in FIGS. 199 and 200, also, with the cable ports 39, 42 in the wiring module base 23 of the wallbox 1, as seen in FIG. 141.

Figure 117:
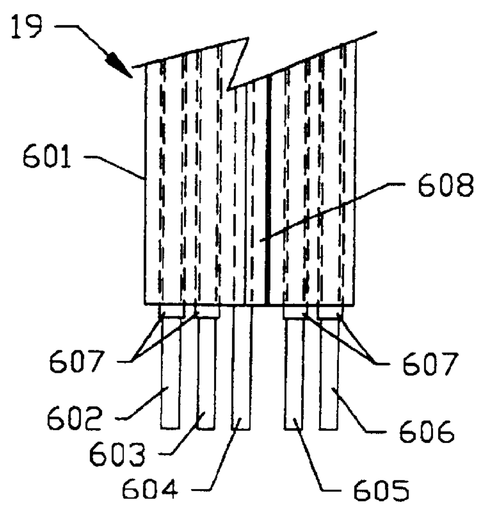
FIG. 117 is a front elevation view of the 5-conductor cable.

Referring to FIGS. 117 and 118, there is provided a 5-conductor cable 19. The cable sheath 601 is constructed of polyurethane, or otherwise a durable elastomer. The 5-conductor cable 19 contains four insulated wire conductors 602, 603, 605, 606 and one ground wire conductor 604. The insulated wire conductors 602, 603, 605, 606 are provided with an individual wire insulation sheath 607 for additional protection. The cable sheath 601 is extruded with two center-projection grooves 608 to provide a specific exterior profile. The wire conductors 602–606 are located in the cable sheath 601 relative to the specific exterior profile such that the 5-conductor cable 19 provides a slip-fit with the 5-conductor cable ports 472, 473 in the wiring module base 423 of the light box 13, as seen in FIG. 206; also, with the cable ports 39, 42 in the wiring module base 23 of the wallbox 1, as seen in FIG. 150.

In operation, the present invention is illustrated in FIGS. 119 through 211.

Referring to FIGS. 119 through 124, there is provided a receptacle circuit 80 which illustrates the use and operation of the receptacle module 2. The receptacle circuit 80 is comprised of a wallbox 1, a receptacle module 2, and a 3-conductor cable 17. The 3-conductor cable 17 provides electrical power to the wallbox 1 and is shown inserted into the left half 40 of the top cable port 39. The specific exterior profile of the 3-conductor cable 17 and the specific interior profile of the top cable port 39 permits connection in one orientation only to the left half 40 or right half 41, as seen in FIG. 120. The 3-conductor cable 17 may also be connected to the left half 43 or right half 44 of the bottom cable port 42 in the same manner. Wire conductor-A 582 of the 3-conductor cable 17 serves as the positive conductor, wire conductor-B 583 serves as the neutral conductor, and wire conductor-C 584 serves as the ground conductor. As the 3-conductor cable 17 is inserted into the left half 40, 43 of either the top cable port 39 or the bottom cable port 42, the three wire conductors 582, 583, 584 protrude through the wire entrance holes 47 of the wiring module base 23 and into the wire-pressure sockets 67 of the wire adapters 25, 26, 27; with wire conductor-A 582 connected to wire adapter-A 25, wire conductor-B 583 connected to wire adapter-B 26, and wire conductor-C 584 connected to wire adapter-C 27. When the 3-conductor cable 17 is inserted into the right half 41, 44 of either the top cable port 39 or the bottom cable port 42, the three wires 582, 583, 584 protrude through the wire entrance holes 47 of the wiring module base 23 and into the wire-pressure sockets 67 of the wire adapters 28, 29, 30; with wire conductor-A 582 connected to wire adapter-D 28, wire conductor-B 583 connected to wire adapter-E 29, and wire conductor-C 584 connected to wire adapter-F 30. The cable sheath 581 is stripped from the end of the 3-conductor cable 17 before being fully inserted into the cable port 28, 42 and secured by means of the cable clamp 33 and cable clamp screws 34.

Figure 124:
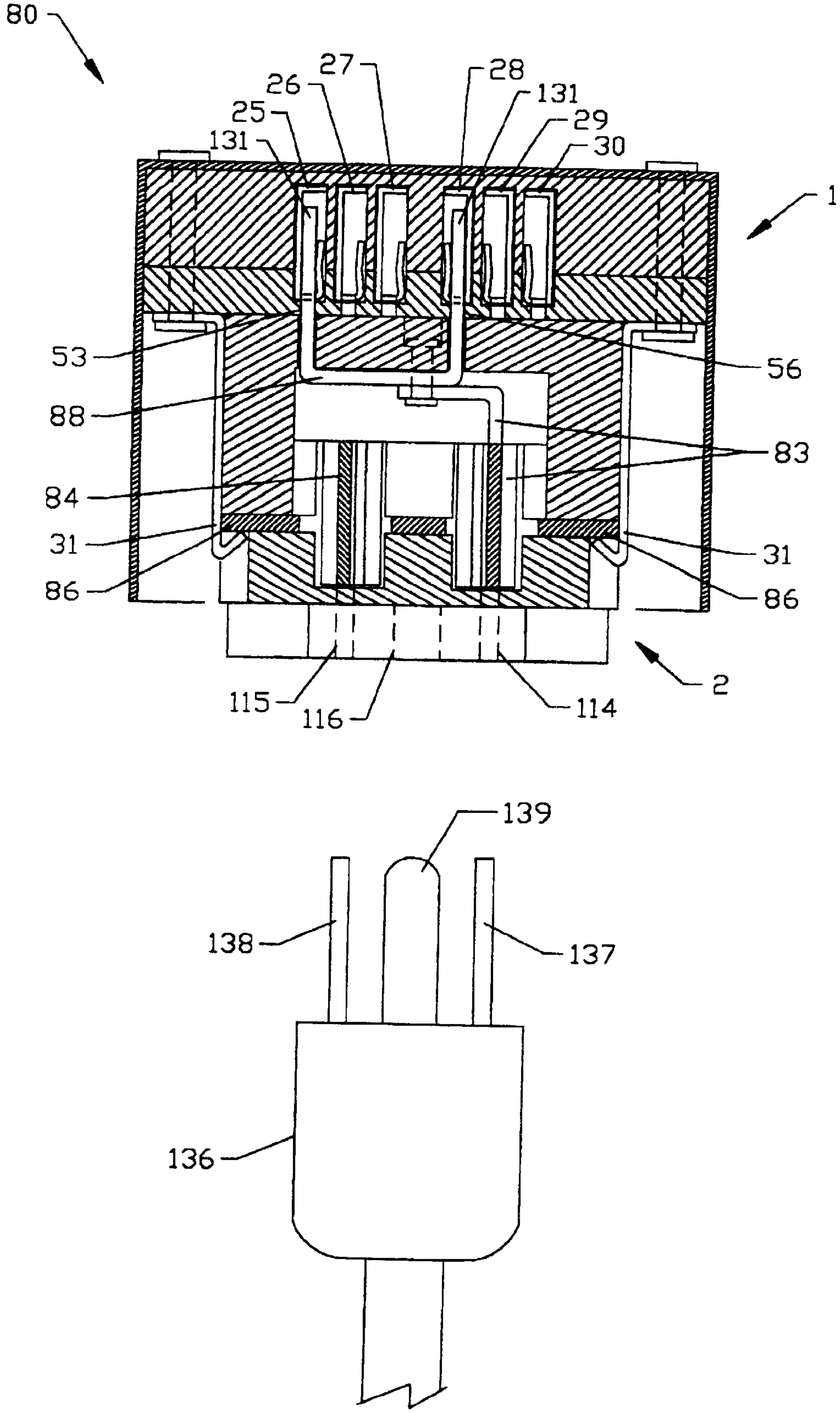
Figure 125:
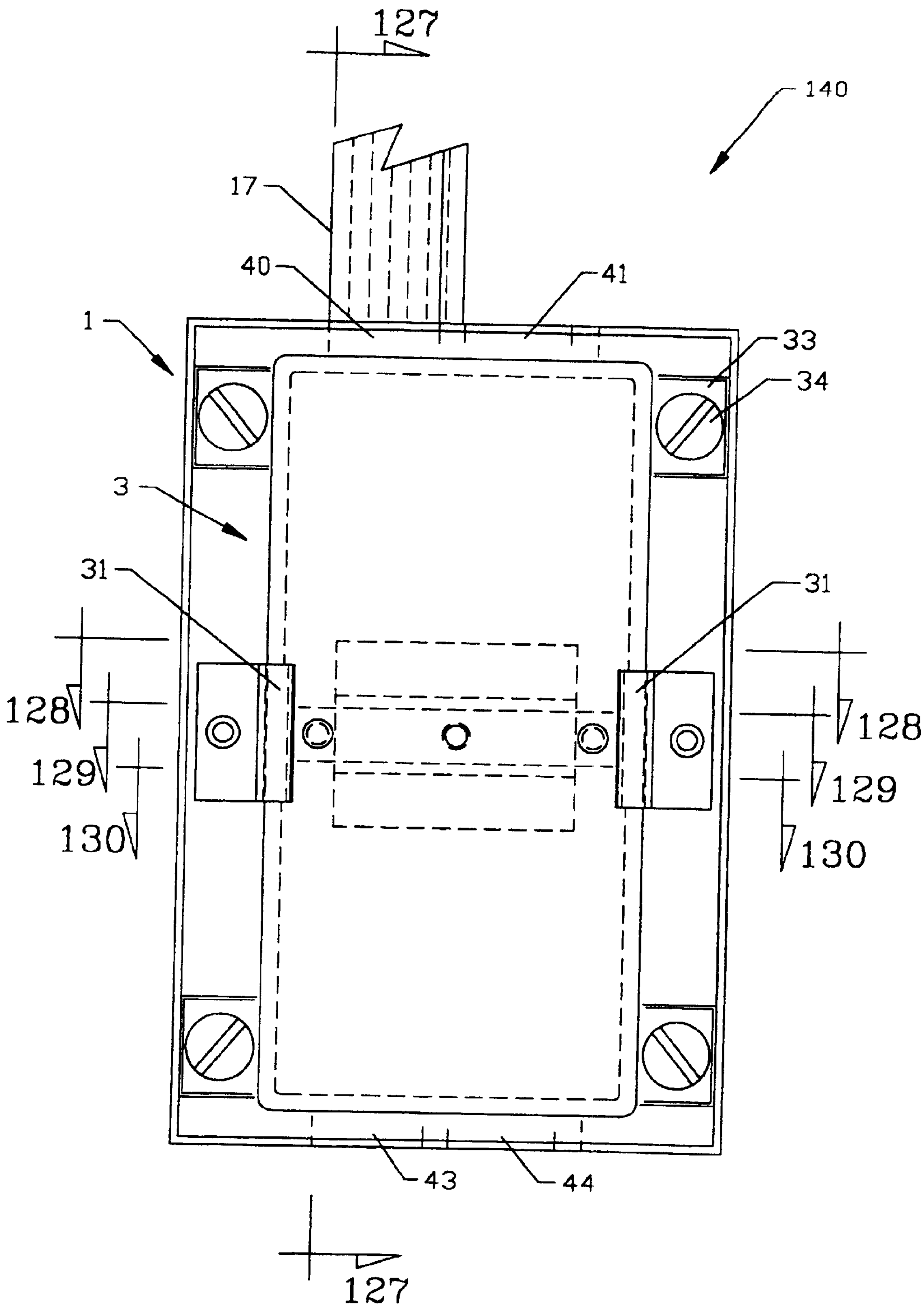

The receptacle module 2 is inserted into the wallbox 1 until the spring clips 31 snap over the grounding plate 86 of the receptacle module 2. As the receptacle module 2 is inserted into the wallbox 1, the positive blade conductors 131 protrude through blade slot-A 53 and blade slot-D 56 of the wiring module cover 24 and into the blade-pressure sockets 70 of wire adapter-A 25 and wire adapter-D 28, respectively. The positive blade conductors 131 thereby connect wire adapter-A 25 to wire adapter-D 28 and to the positive plug adapter 83, as seen in FIG. 124.

Figure 122:
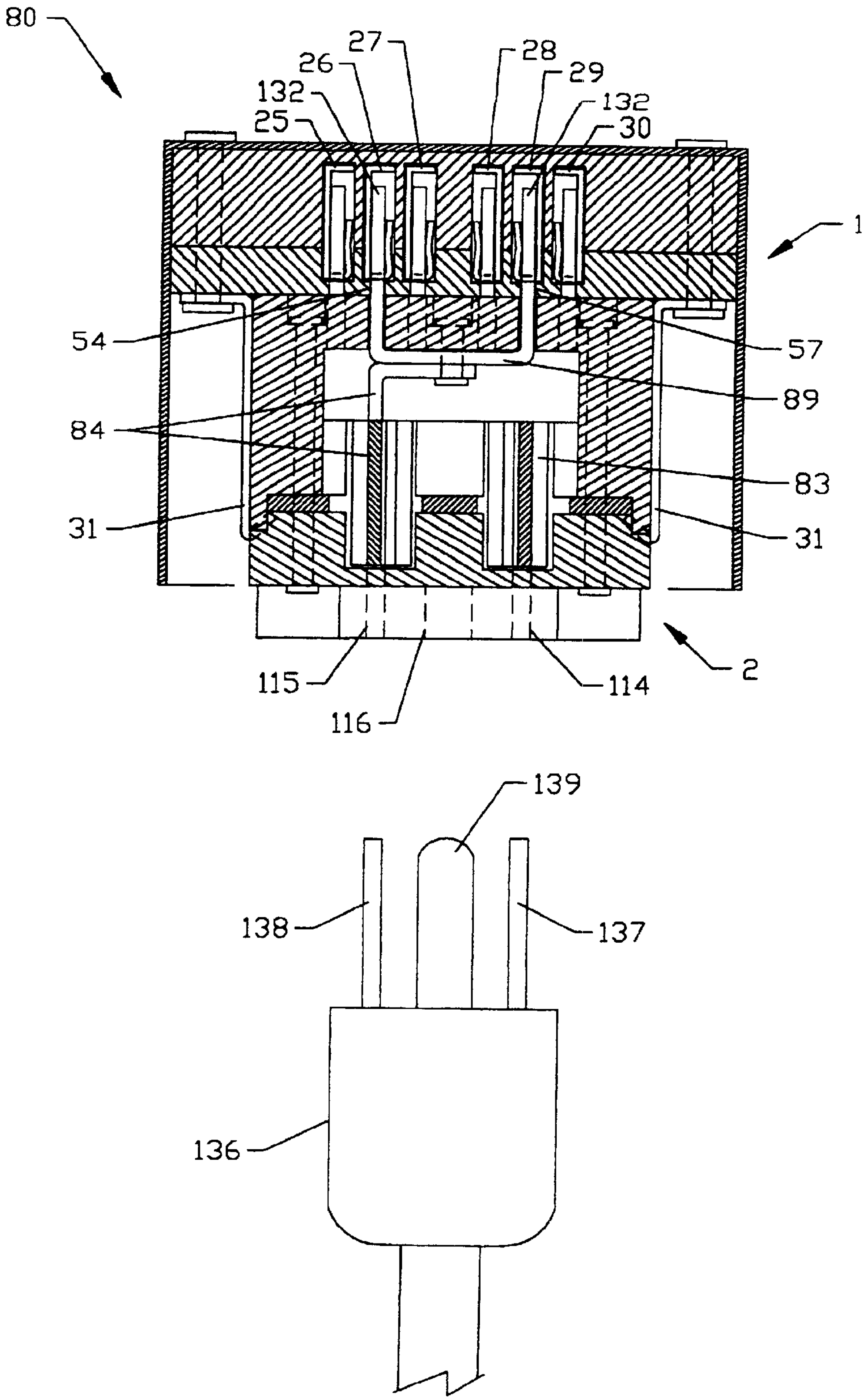

Likewise, as the receptacle module 2 is inserted into the wallbox 1, the neutral blade conductors 132 protrude through blade slot-B 54 and blade slot-E 57 of the wiring module cover 24 and into the blade-pressure sockets 70 of wire adapter-B 26 and wire adapter-E 29, respectively. The neutral blade conductors 132 thereby connect wire adapter-B 26 to wire adapter-E 29 and to the neutral plug adapter 84, as seen in FIG. 122.

Figure 123:
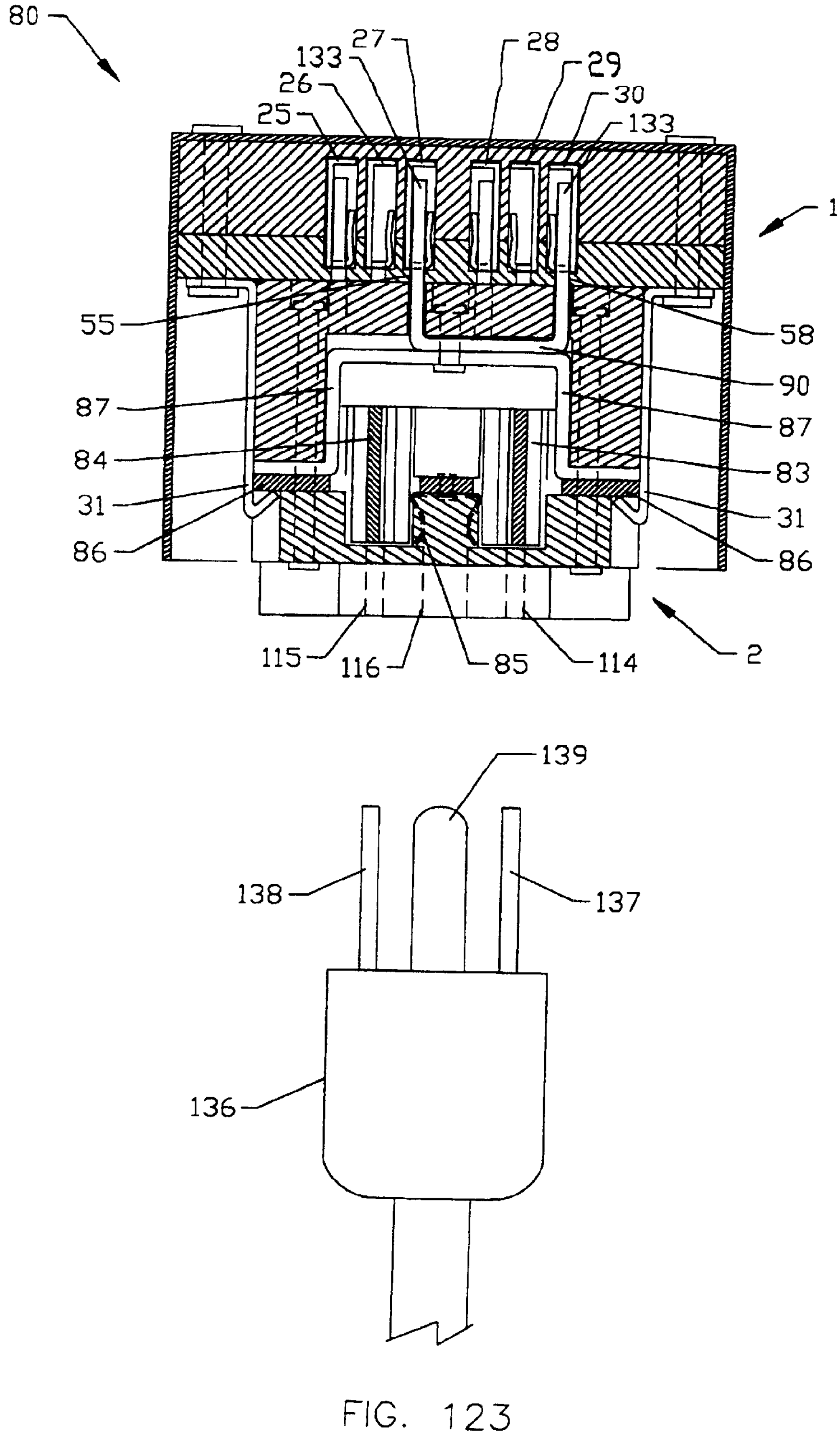

Also, as the receptacle module 2 is inserted into the wallbox 1, the ground blade conductors 133 protrude through blade slot-C 55 and blade slot-F 58 of the wiring module cover 24 and into the blade-pressure sockets 70 of wire adapter-C 27 and wire adapter-F 30, respectively. The ground blade conductors 133 thereby connect wire adapter-C 27 to wire adapter-F 30 and to the grounding bar 87, as seen in FIG. 123. The grounding bar 87 is connected to the grounding plate 86 to which are attached the ground plug adapters 85. The grounding plate 86 is in contact with the spring clips 31 which are connected to the electrical box 21 by means of the rivets 32, thereby grounding the electrical box 21.

Functionally, it can be seen from the foregoing discussion that the assembly of the electrical components 1, 2, 17, in itself, self-configures the receptacle circuit 80 and self-distributes a dedicated earth ground to the components. The electrical power is supplied to the wallbox 1 by means of a 3-conductor cable 17 connected to the left half 40 of the top cable port 39. Continuity is provided between the positive plug adapter 83 of the receptacle module 2 and wire conductor-A 582 of the 3-conductor cable 17. Continuity is also provided between the neutral plug adapter 84 and wire conductor-B 583, and between the ground plug adapters 85 and wire conductor-C 584 of the 3-conductor cable 17. When a standard electrical plug 136 is inserted into the receptacle face 111 of the receptacle module 2, the positive blade 137 of the electrical plug 136 is inserted into the positive plug adapter 83, thereby providing the electrical plug 136 with a positive conductor. Likewise, the neutral blade 138 of the electrical plug 136 is inserted into the neutral plug adapter 84, thereby providing the electrical plug 136 with a neutral conductor. Also, the ground blade 139 of the electrical plug 136 is inserted into the ground plug adapter 85, thereby providing the electrical plug 136 with a grounded conductor. It can also be seen that continuity is provided between wire conductor-C 584 of the 3-conductor cable 17 and the grounding plate 86 of the receptacle module 2 as well as the electrical box 21, thereby grounding the receptacle module 2 and the electrical box 21.

A 3-conductor cable 17 may be connected to the left half 43 and tie right half 44 of the bottom cable port 42, and to the right half 41 of the top cable port 39 to provide electrical power for other circuits; with wire conductor-A 582 of the 3-conductor cables 17 serving as the positive conductor, wire conductor-B 583 serving as the neutral conductor, and wire conductor-C 584 serving as the ground conductor. A standard wallplate 134 is mounted to the receptacle module 2 with one mounting screw 135.

Figure 126:
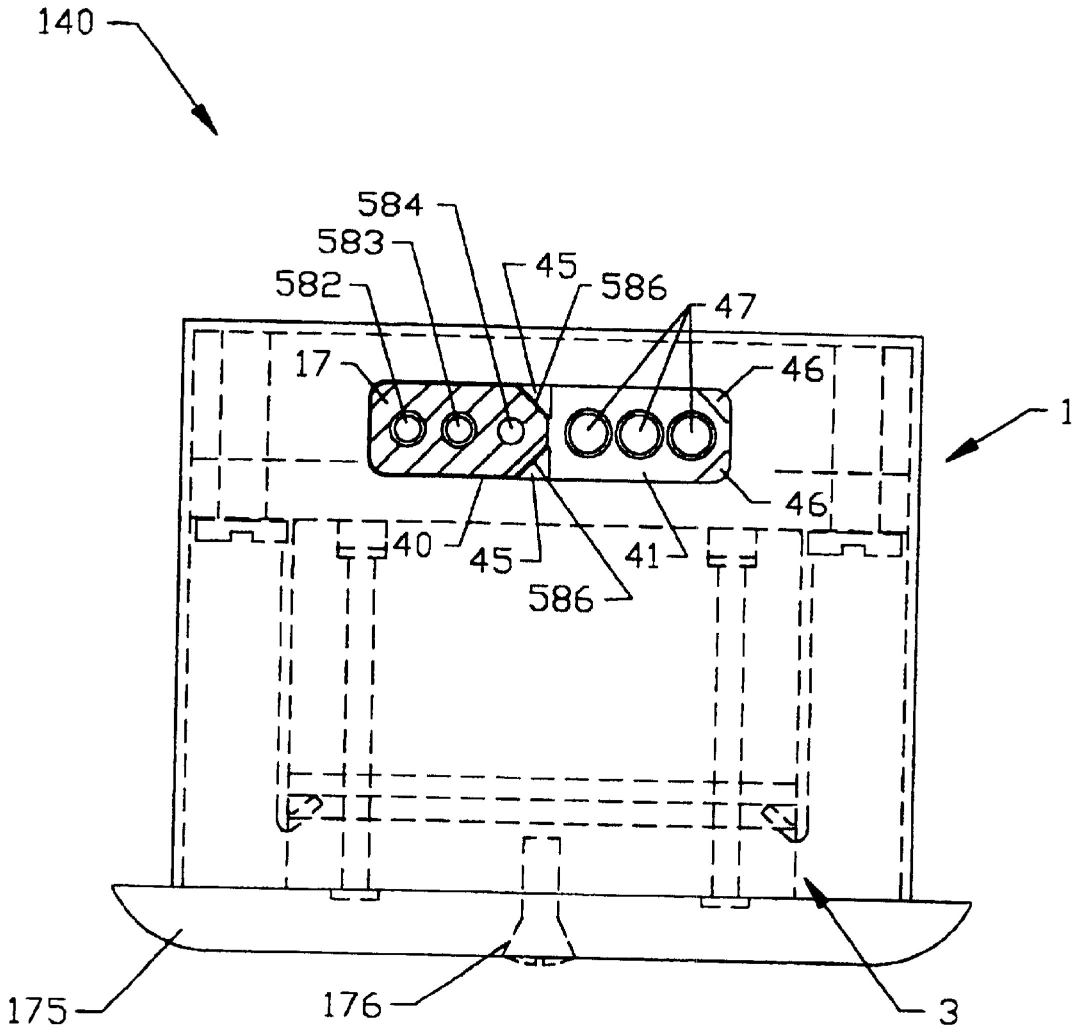
Figure 127:
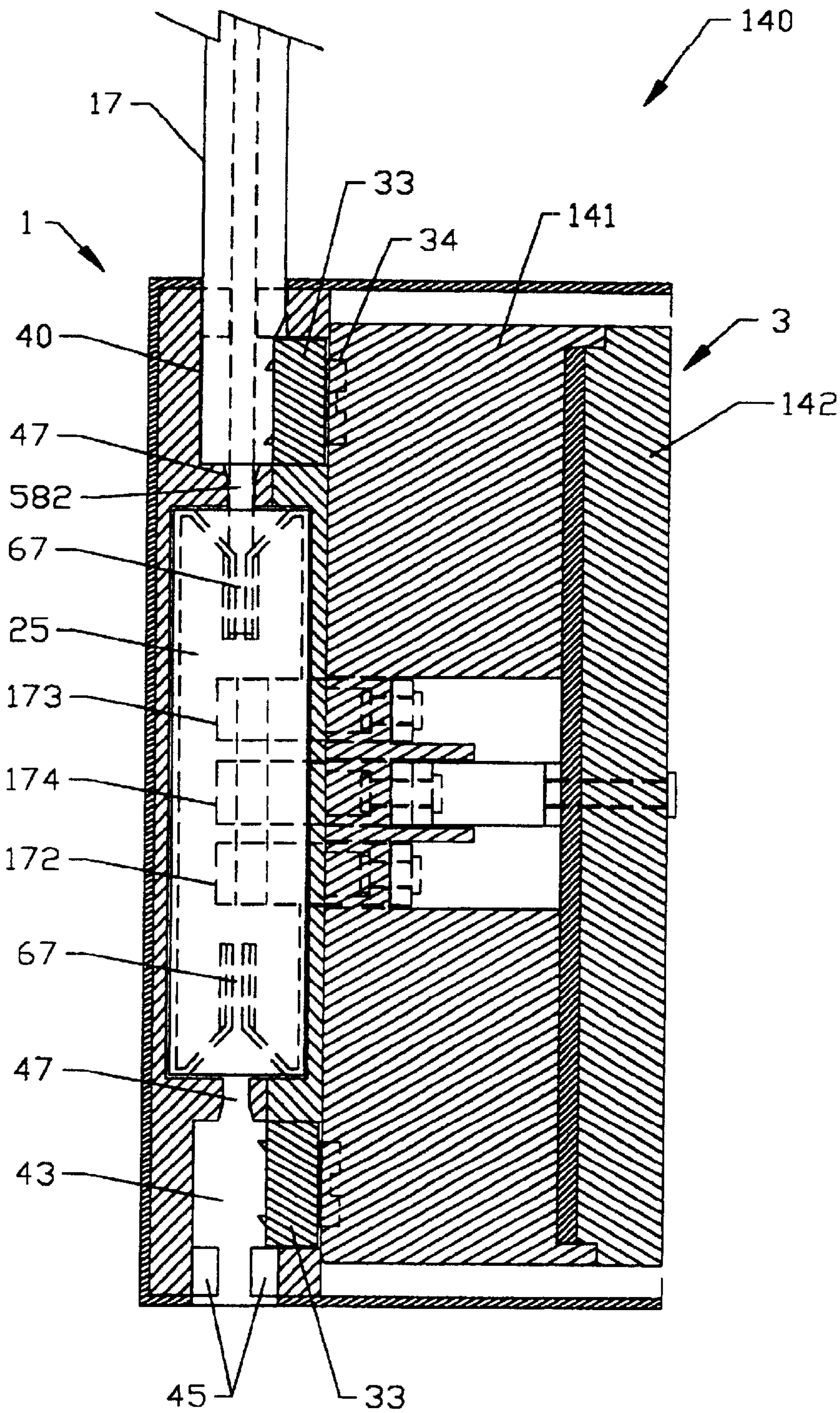

Referring to FIGS. 125 through 130, there is provided a ganging module circuit 140 which illustrates the use and operation of the ganging module 3. The ganging module 3 is used with a wallbox 1 to create additional electrical circuits from one electrical circuit. The ganging module circuit 140 is comprised of a wallbox 1, a ganging module 3, and a 3-conductor cable 17. The 3-conductor cable 17 provides electrical power to the wallbox 1 and is shown inserted into the left half 40 of the top cable port 39. The specific exterior profile of the 3-conductor cable 17 and the specific interior profile of the top cable port 39 permits connection in one orientation only to the left half 40 or right half 41, as seen in FIG. 126. The 3-conductor cable 17 may also be connected to the left half 43 or right half 44 of the bottom cable port 42 in the same manner. Wire conductor-A 582 of the 3-conductor cable 17 serves as the positive conductor, wire conductor-B 583 serves as the neutral conductor, and wire conductor-C 584 serves as the ground conductor. As the 3-conductor cable 17 is inserted into the left half 40, 43 of either the top cable port 39 or the bottom cable port 42, the three wire conductors 582, 583, 584 protrude through the wire entrance holes 47 of the wiring module base 23 and into the wire-pressure sockets 67 of the wire adapters 25, 26, 27; with wire conductor-A 582 connected to wire adapter-A 25, wire conductor-B 583 connected to wire adapter-B 26, and wire conductor-C 584 connected to wire adapter-C 27. When the 3-conductor cable 17 is inserted into the right half 41, 44 of either the top cable port 39 or the bottom cable port 42, the three wires 582, 583, 584 protrude through the wire entrance holes 47 of the wiring module base 23 and into the wire-pressure sockets 67 of the wire adapters 28, 29, 30, with wire conductor-A 582 cotuiected to wire adapter-D 28, wire conductor-B 583 connected to wire adapter-E 29, and wire conductor-C 584 connected to wire adapter-F 30. The cable sheath 581 is stripped from the end of the 3-conductor cable 17 before being fully inserted into the cable port 28, 42 and secured by means of the cable clamp 33 and the cable clamp screws 34.

Figure 130:
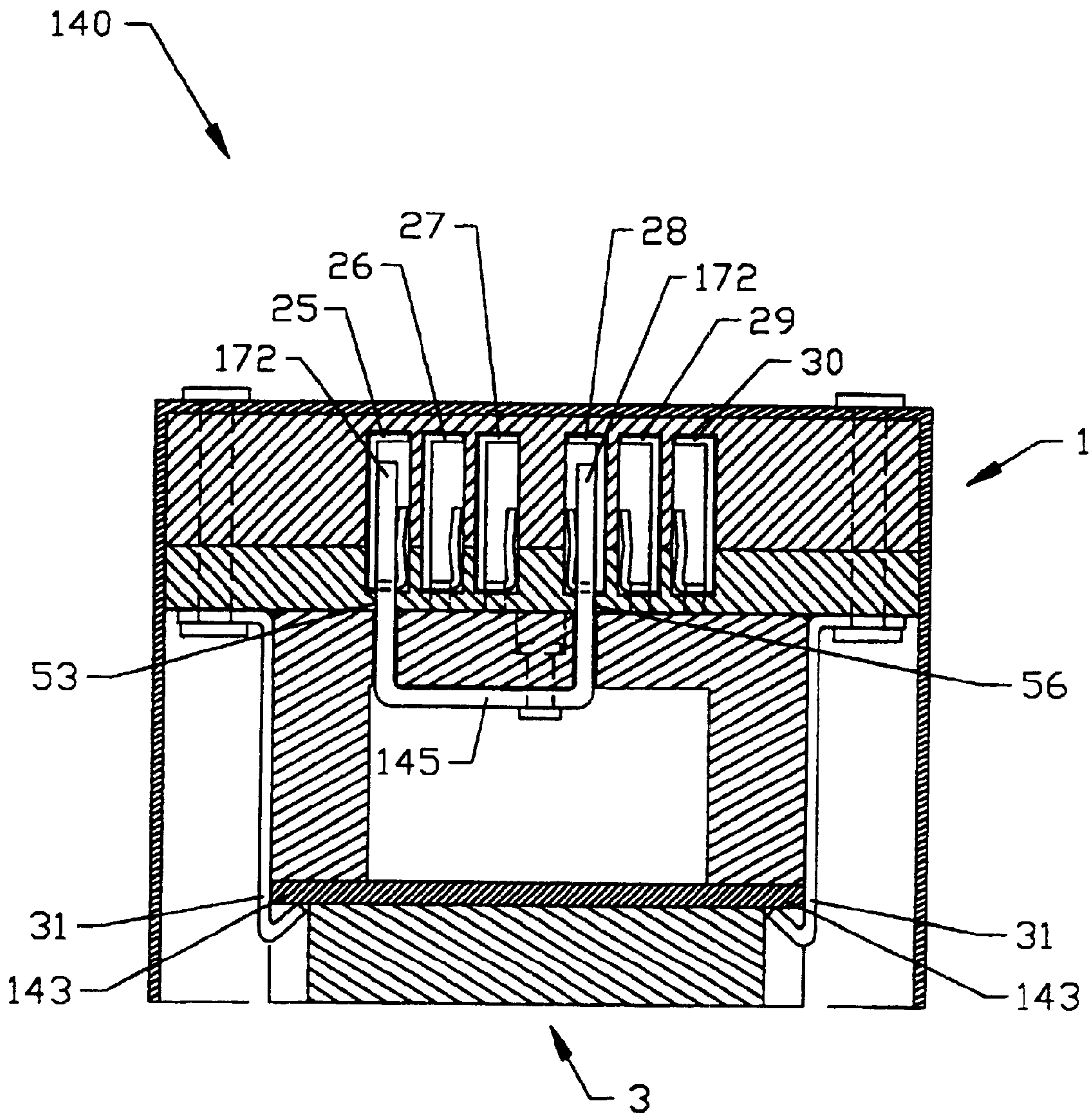

The ganging module 3 is inserted into the wallbox 1 until the spring clips 31 snap over the grounding plate 143 of the ganging module 3. As the ganging module 3 is inserted into the wallbox 1, the positive blade conductors 172 protrude through blade slot-A 53 and blade slot-D 56 of the wiring module cover 24 and into the blade-pressure sockets 70 of wire adapter-A 25 and wire adapter-D 28, respectively. The positive blade conductors 172 thereby connect wire adapter-A 25 to wire adapter-D 28, as seen in FIG. 130.

Figure 128:
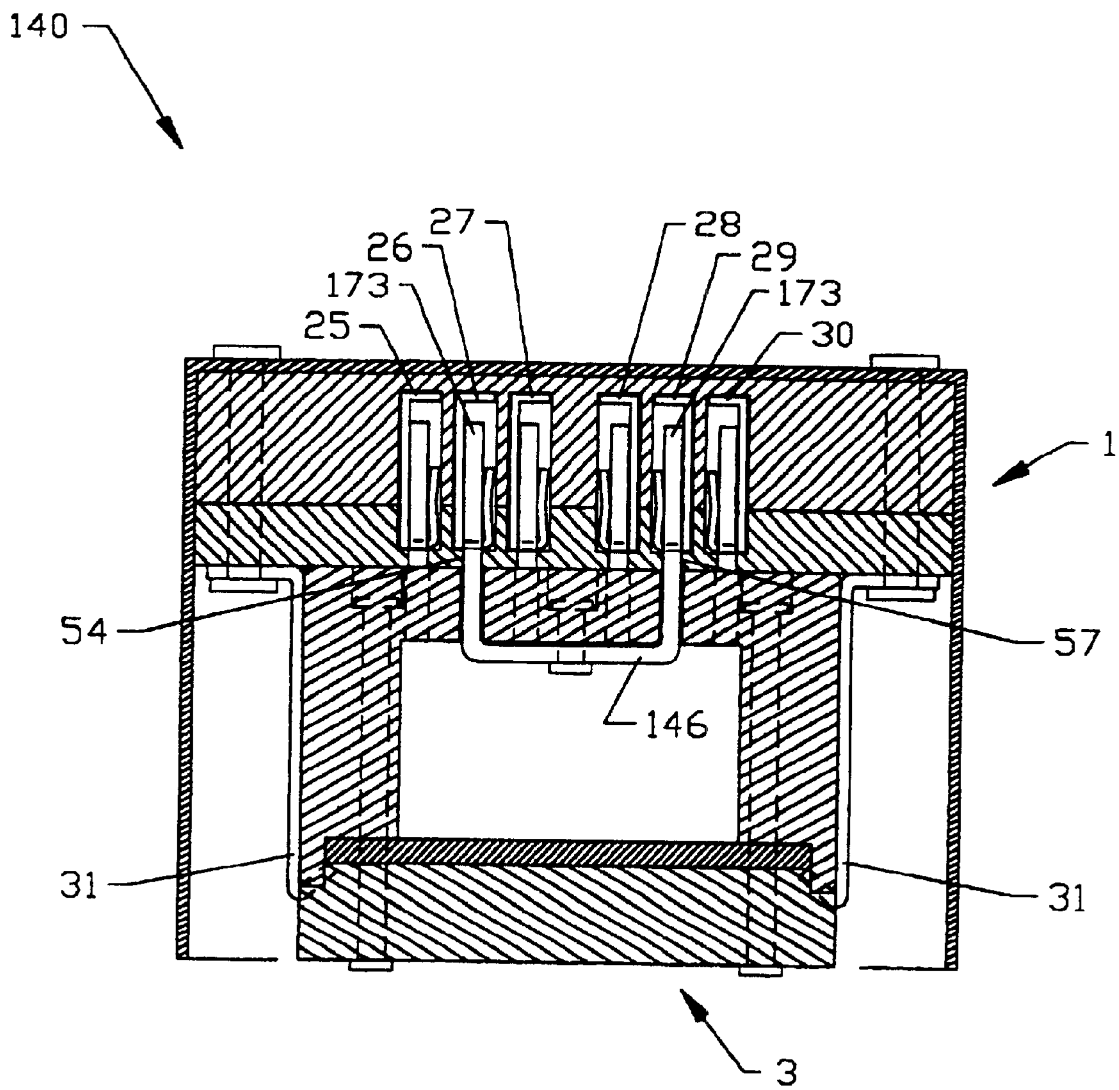

Likewise, as the ganging module 3 is inserted into the wallbox 1, the neutral blade conductors 173 protrude through blade slot-B 54 and blade slot-E 57 of the wiring module cover 24 and into the blade-pressure sockets 70 of wire adapter-B 26 and wire adapter-E 29, respectively. The neutral blade conductors 173 thereby connect wire adapter-B 26 to wire adapter-E 29, as seen in FIG. 128.

Figure 129:
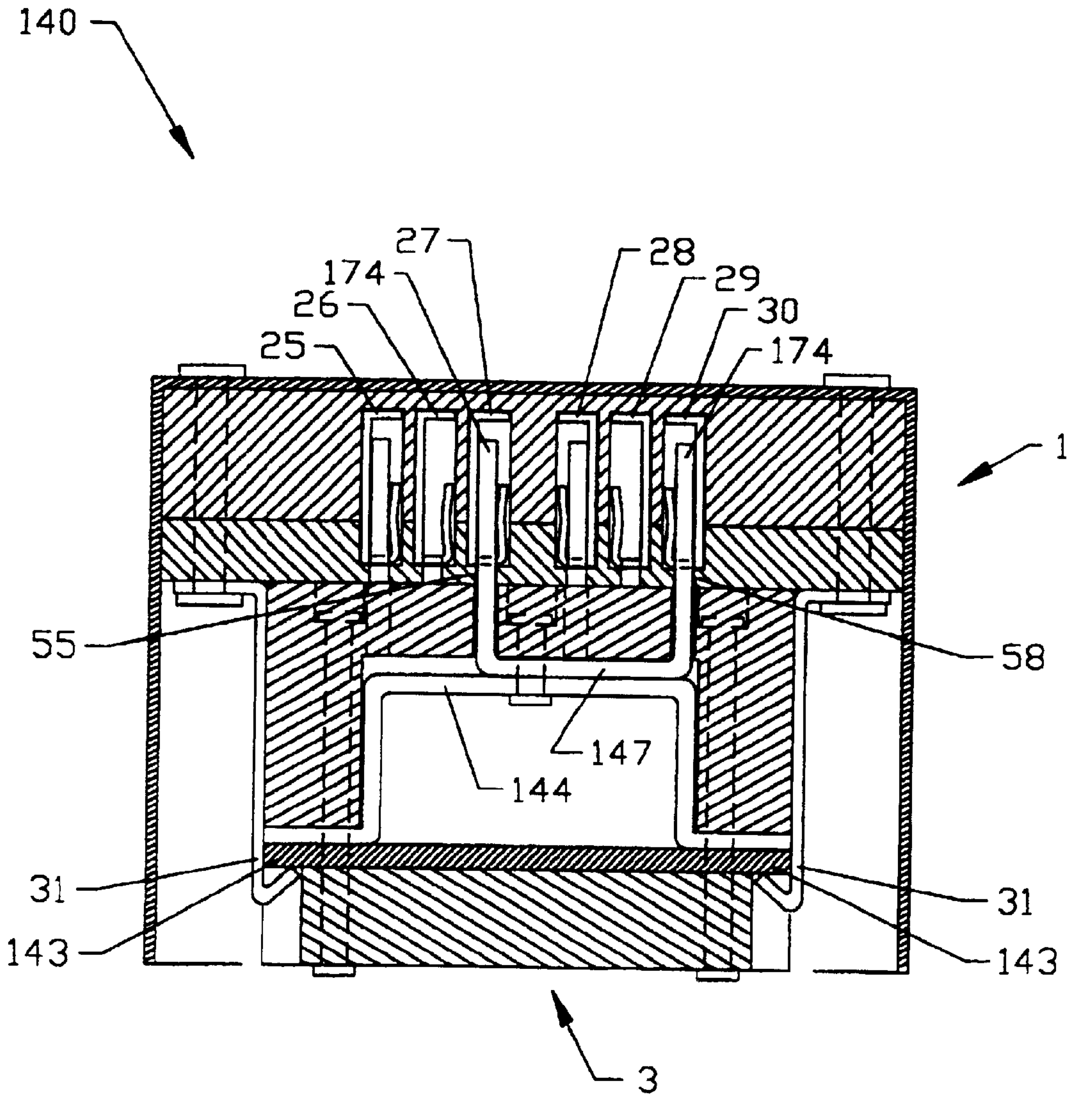

Also, as the ganging module 3 is inserted into the wallbox 1, the ground blade conductors 174 protrude through blade slot-C 55 and blade slot-F 58 of the wiring module cover 24 and into the blade-pressure sockets 70 of wire adapter-C 27 and wire adapter-F 30, respectively. The ground blade conductors 174 thereby connect wire adapter-C 27 to wire adapter-F 30 and to the grounding bar 144, as seen in FIG. 129. The grounding bar 144 is connected to the grounding plate 143 which is in contact with the spring clips 31. The spring clips 31 are corrected to the electrical box 21 by means of the rivets 32, thereby grounding the electrical box 21.

Functionally, it can be seen from the foregoing discussion that the assembly of the electrical components 1, 3, 17, in itself, self-configures the ganging module circuit 140 and self-distributes a dedicated earth ground to the components. The electrical power is supplied to the wallbox 1 by means of a 3-conductor cable 17 connected to the left half 40 of the top cable port 39. Continuity is provided between wire conductor-C 584 of the 3-conductor cable 17 and the grounding plate 143 of the ganging module 3 as well as the electrical box 21, thereby grounding the ganging module 3 and the electrical box 21. A 3-conductor cable 17 may be connected to the left half 43 and the right half 44 of the bottom cable port 42, and to the right half 41 of the top cable port 39 to provide electrical power for other circuits, with wire conductor-A 582 of the 3-conductor cables 17 serving as the positive conductor, wire conductor-B 583 serving as the neutral conductor, and wire conductor-C 584 serving as the ground conductor. A wallplate 175 is mounted to the ganging module 3 with one mounting screw 176.

Referring to FIGS. 131 and 132, the use and operation of the wallbox jumper 16 is illustrated. The wallbox jumper 16 is used to electrically connect two adjacent wallboxes 1 and may only be used with wallboxes 1 which contain a receptacle module 2 or a ganging module 3.

The 3-conductor cable 17 provides electrical power to the left wallbox 1 and is shown inserted into the left half 40 of the top cable port 39. The specific exterior profile of the 3-conductor cable 17 and the specific interior profile of the top cable port 39 permits connection in one orientation only, as seen in FIG. 132. Wire conductor-A 582 of the 3-conductor cable 17 serves as the positive conductor, wire conductor-B 583 serves as the neutral conductor, and wire conductor-C 584 serves as the ground conductor. As the 3-conductor cable 17 is inserted into the left half 40 of the top cable port 39, the three wires 582, 583, 584 protrude through the wire entrance holes 47 of the wiring module base 23 and into the wire-pressure sockets 67 of the wire adapters 25, 26, 27, with wire conductor-A 582 connected to wire adapter-A 25, wire conductor-B 583 connected to wire adapter-B 26, and wire conductor-C 584 connected to wire adapter-C 27.

The left handle extension 574 of the wallbox jumper 16 is shown inserted into the right half 41 of the top cable port 39 of the left wallbox 1 and the right handle extension 575 is inserted into the left half 40 of the top cable port 39 of the right wallbox 1. The specific exterior profile of the handle extensions 574, 575 and the specific interior profile of the top cable ports 39 permits connection in one orientation only, as seen in FIG. 132. Jumper-GK 568 of the wallbox jumper 16 serves as the positive conductor, jumper-HL 569 serves as the neutral conductor, and jumper-JM 570 serves as the ground conductor. As the left handle extension 574 is inserted into the right half 41 of the top cable port 39 of the left wallbox 1, the three wires 562, 563, 564 protrude through the wire entrance holes 47 of the wiring module base 23 and into the wire-pressure sockets 67 of the wire adapters 28, 29, 30; with wire-G 562 connected to wire adapter-D 28, wire-H 563 connected to wire adapter-E 29, and wire-J 564 connected to wire adapter-F 30. As the right handle extension 575 is inserted into the left half 40 of the top cable port 39 of the right wallbox 1, the three wires 565, 566, 567 protrude through the wire entrance holes 47 of the wiring module base 23 and into the wire-pressure sockets 67 of the wire adapters 25, 26, 27; with wire-K 565 connected to wire adapter-A 25, wire-L 566 connected to wire adapter-B 26, and wire-M 567 connected to wire adapter-C 27.

Functionally, it can be seen from previous discussion that when a receptacle module 2 or a ganging module 3 is inserted into the wallbox 1, continuity is provided between wire adapter-A 25 and wire adapter-D 28, between wire adapter-B 26 and wire adapter-E 29, and between wire adapter-C 27 and wire adapter-F 30, of each wallbox 1. Therefore, the wallbox jumper 16 provides continuity between wire adapter-A 25 of the right wallbox 1 and wire conductor-A 582 of the 3-conductor cable 17 connected to the left half 40 of the top cable port 39 of the left wallbox 1, thereby providing the right wallbox 1 with a positive conductor. Likewise, the wallbox jumper 16 provides continuity between wire adapter-B 26 of the right wallbox 1 and a wire conductor-B 583 of the 3-conductor cable 17, thereby providing the right wallbox 1 with a neutral conductor. Also, the wallbox jumper 16 provides continuity between wire adapter-C 27 of the right wallbox 1 and wire conductor-C 584 of the 3-conductor cable 17, thereby providing the right wallbox 1 with a grounded conductor.

A 3-conductor cable 17 may be connected to the left half 43 and the right half 44 of the bottom cable port 42 of both wallboxes 1, and to the right half 41 of the top cable port 39 of the right wallbox 1 to provide electrical power for other circuits; with wire conductor-A 582 of the 3-conductor cables 17 serving as the positive conductor, wire conductor-B 583 serving as the neutral conductor, and wire conductor-C 584 serving as the ground conductor. The cable sheath 581 is stripped from the end of the 3-conductor cables 17 before being fully inserted into the cable port 39, 42 and secured by means of the cable clamp 33 and the cable, clamp screws 34. The wallbox jumper 16 is also secured by means of the cable clamp 33 and the cable clamp screws 34.

Referring to FIGS. 133 through 139, there is provided a 2-way-switch circuit 180 which illustrates the use and operation of the 2-way-switch module 4. The 2-way-switch circuit 180 is comprised of a wallbox 1, a 2-way-switch module 4, and a 3-conductor cable 17. The 3-conductor cable 17 provides the connection from the light box 13 to the wallbox 1 and is shown inserted into the left half 40 of the top cable port 39 of the wallbox 1. The specific exterior profile of the 3-conductor cable 17 and the specific interior profile of the top cable port 39 permits connection in one orientation only, as seen in FIG. 134. The 3-conductor cable 17 may also be connected to the bottom cable port 42 in the same manner. Wire conductor-A 582 of the 3-conductor cable 17 serves as the source-positive conductor, wire conductors-B 583 serves as the return-positive conductor, and wire conductor-C 584 serves as the ground conductor. As the 3-conductor cable 17 is inserted into the left half 40, 43 of either the top cable port 39 or the bottom cable port 42, the three wires 582, 583, 584 protrude through the wire entrance holes 47 of the wiring module base 23 and into the wire-pressure sockets 67 of the wire adapters 25, 26, 27; with wire conductor-A 582 connected to wire adapter-A 25, wire conductor-B 583 connected to wire adapter-B 26, and wire conductor-C 584 connected to wire adapter-C 27. The cable sheath 581 is stripped from the end of the 3-conductor cable 17 before being fully inserted into the cable port 39, 42 and secured by means of the cable clamp 33 and the cable clamp screws 34.

The 2-way-switch module 4 is inserted into the wallbox 1 until the spring clips 31 snap over the grounding plate 183 of the 2-way-switch module 4. As the 2-way-switch module 4 is inserted into the wallbox 1, the switch-arm blade conductor 227 of the switch-arm assembly 185 protrudes through blade slot-A 53 of the wiring module cover 24 and into the blade-pressure socket 70 of wire adapter-A 25, as seen in FIG. 139.

Likewise, as the 2-way-switch module 4 is inserted into the wallbox 1, the switch-contact blade conductor 228 of the switch-contact assembly 186 protrudes through blade slot-B 54 of the wiring module cover 24 and into the blade-pressure socket 70 of wire adapter-B 26, as seen in FIG. 137.

Also, as the 2-way-switch module 4 is inserted into the wallbox 1, the ground blade conductor 187 protrudes through blade slot-C 55 of the wiring module cover 24 and into the blade-pressure socket 70 of wire adapter-C 27, as seen in FIG. 138. The ground blade conductor 187 is connected to the grounding bar 184 which is connected to the grounding plate 183. The grounding plate 183 is in contact with the spring clips 31 which are connected to the electrical box 21 by means of the rivets 31, thereby grounding the electrical box 21.

Functionally, it can be seen from the foregoing discussion that the assembly of the electrical components 1, 4, 17, in itself, self-configures the 2-way-switch circuit 180 and self-distributes a dedicated earth ground to the components. It can be seen from FIG. 136 that when the switch lever 190 is in the up position, the switch-arm actuator 222 allows the switch arm 225 of the switch-arm assembly 185 to make contact with the contact tip 226 of the switch-contact assembly 186, thereby providing continuity from wire conductor-A 582 to wire conductor-B 583 of the 3-conductor cable 17. The continuity between wire conductor-A 582 and wire conductor-B 583 is interrupted when the switch lever 190 is in the down position as the switch-arm actuator 222 forces the switch arn 225 away from the contact tip 226 of the switch-contact assembly 186, as seen in FIG. 135. It can also be seen that continuity is provided between wire conductor-C 584 of the 3-conductor cable 17 and the grounding plate 183 of the 2-way-switch module 4 as well as the electrical box 21, thereby grounding the 2-way-switch module 4 and the electrical box 21. The compression spring 189 provides quick action to reduce arcing and increase switch life. A standard wallplate 234 is mounted to the 2-way-switch module 4 with two mounting screws 235.

Referring to FIGS. 140 through 148, there is provided a 3-way-switch circuit 240 which illustrates the use and operation of the 3-way-switch module 5. The 3-way-switch circuit 240 is comprised of a wallbox 1, a 3-way-switch module 5, and a 4-conductor cable 18. The 4-conductor cable 18 provides the connection from the light box 13 to the wallbox 1 and is shown inserted into the top cable port 39 of the wallbox 1. The specific exterior profile of the 4-conductor cable 18 and the specific interior profile of the top cable port 39 permits connection in one orientation only, as seen in FIG. 141. The 4-conductor cable 18 may also be connected to the bottom cable port 42 in the same manner. Wire conductor-A 592, wire conductor-B 593, and wire conductor-D 595 of the 4-conductor cable 18 serve as the source-positive and return-positive conductors, and wire conductor-C 594 serves as the ground conductor. As the 4-conductor cable 18 is inserted into either the top cable port 39 or the bottom cable port 42, the four wires 592, 593, 594, 595 protrude through the wire entrance holes 47 of the wiring module base 23 and into the wire-pressure sockets 67 of the wire adapters 25, 26, 27, 28; with wire conductor-A 592 connected to wire adapter-A 25, wire conductor-B 593 connected to wire adapter-B 26, wire conductor-C 594 connected to wire adapter-C 27, and wire conductor-D 595 connected to wire adapter-D 28. The cable sheath 591 is stripped from the end of the 4-conductor cable 18 before being fully inserted into the cable port 39, 42 and secured by means of the cable clamp 33 and the cable clamp screws 34.

The 3-way-switch module 5 is inserted into the wallbox 1 until the spring clips 31 snap over the grounding plate 243 of the 3-way-switch module 5. As the 3-way-switch module 5 is inserted into the wallbox 1, the blade conductor 291 of the switch-arm assembly 245 protrudes through blade slot-A 53 of the wiring module cover 24 and into the blade-pressure socket 70 of wire adapter-A 25, as seen in FIG. 148.

Likewise, as the 3-way-switch module 5 is inserted into the wallbox 1, the blade conductor 292 of the left switch-contact assembly 246 protrudes through blade slot-B 54 of the wiring module cover 24 and into the blade-pressure socket 70 of wire adapter-B 26, as seen in FIG. 146. The blade conductor 293 of the right switch-contact assembly 247 protrudes through blade slot-D 56 of the wiring module cover 24 and into the blade-pressure socket 70 of wire adapter-D 28.

Also, as the 3-way-switch module 5 is inserted into the wallbox 1, the ground blade conductor 248 protrudes through blade slot-C 55 of the wiring module cover 24 and into the blade-pressure socket 70 of wire adapter-C 27, as seen in FIG. 147. The ground blade conductor 248 is connected to the grounding bar 244 which is connected to the grounding plate 243. The grounding plate 243 is in contact with the spring clips 31 which are connected to the electrical box 21 by means of the rivets 32, thereby grounding the electrical box 21.

Functionally, it can be seen from the foregoing discussion that the assembly of the electrical components 1, 5, 18, in itself, self-configures the 3-way-switch circuit 240 and self-distributes a dedicated earth ground to the components. It can be seen from FIGS. 143 and 145 that when the switch lever 251 is in the up position, the left switch-arm actuator 284 allows the left switch arm 288 of the switch-arm assembly 245 to make contact with the contact tip 290 of the left switch-contact assembly 246 as the right switch-arm actuator 285 forces the right switch arm 289 away from the contact tip 290 of the right switch-contact assembly 247, thereby providing continuity from wire conductor-A 592 to wire conductor-B 593 and interrupting continuity between wire conductor-A 592 and wire conductor-D 595 of the 4-conductor cable 18. When the switch lever 251 is in the down position, the right switch-arm actuator 285 allows the right switch arm 289 of the switch-arm assembly 245 to make contact with the contact tip 290 of the right switch-contact assembly 247 as the left switch-arm actuator 284 forces the left switch arm 288 away from the contact tip 290 of the left switch-contact assembly 246, thereby providing continuity from wire conductor-A 592 to wire conductor-D 595 and interrupting continuity between wire conductor-A 592 and wire conductor-B 593 of the 4-conductor cable 18, as seen in FIGS. 142 and 144. It can also be seen that continuity is provided between wire conductor-C 594 of the 4-conductor cable 18 and the grounding plate 243 of the 3-way-switch module 5 as well as the electrical box 21, thereby grounding the 3-way-switch module 5 and the electrical box 21. The compression spring 250 provides quick action to reduce arcing and increase switch life. A standard wallplate 234 is mounted to the 3-way-switch module 5 with two mounting screws 235.

Referring to FIGS. 149 through 157, there is provided a 4-way-switch circuit 300 which illustrates the use and operation of the 4-way-switch module 6. The 4-way-switch circuit 300 is comprised of a wallbox 1, a 4-way-switch module 6, and a 5-conductor cable 19. The 5-conductor cable 19 provides the connection from the light box 13 to the wallbox 1 and is shown inserted into the top cable port 39 of the wallbox 1. The specific exterior profile of the 5-conductor cable 19 and the specific interior profile of the top cable port 39 permits connection in one orientation only, as seen in FIG. 150. The 5-conductor cable 19 may also be connected to the bottom cable port 42 in the same manner. Wire conductor-A 602 and wire conductor-B 603 of the 5-conductor cable 19 serve as the source-positive conductors, wire conductor-D 605 and wire conductor-E 606 serve as the return-positive conductors, and wire conductor-C 604 serves as the ground conductor. As the 5-conductor cable 19 is inserted into either the top cable port 39 or the bottom cable port 42, the five wires 602, 603, 604, 605, 606 protrude through the wire entrance holes 47 of the wiring module base 23 and into the wire-pressure sockets 67 of the wire adapters. 25, 26, 27, 28, 29, with wire conductor-A 602 connected to wire adapter-A 25, wire conductor-B 603 connected to wire adapter-B 26, wire conductor-C 604 connected to wire adapter-C 27, wire conductor-D 605 connected to wire adapter-D 28, and wire conductor-E 606 connected to wire adapter-E 29. The cable sheath 601 is stripped from the end of the 5-conductor cable 19 before being fully inserted into the cable port 39, 42 and secured by means of the cable clamp 33 and the cable clamp screws 34.

The 4-way-switch module 6 is inserted into the wallbox 1 until the spring clips 31 snap over the grounding plate 303 of the 4-way-switch module 6. As the 4-way-switch module 6 is inserted into the wallbox 1, the blade conductor 353 of the left switch-arm assembly 305 protrudes through blade slot-A 53 of the wiring module cover 24 and into the blade-pressure socket 70 of wire adapter-A 25, as seen in FIG. 157. The blade conductor 354 of the right switch-arm assembly 306 protrudes through blade slot-B 54 of the wiring module cover 24 and into the blade-pressure socket 70 of wire adapter-B 26.

Likewise, as the 4-way-switch module 6 is inserted into the wallbox 1, the blade conductor 355 of the left switch-contact assembly 307 protrudes through blade slot-D 56 of the wiring module cover 24 and into the blade-pressure socket 70 of wire adapter-D 28, as seen in FIG. 155. The blade conductor 356 of the right switch-contact assembly 308 protrudes through blade slot-E 57 of the wiring module cover 24 and into the blade-pressure socket 70 of wire adapter-E 29.

Also, as the 4-way-switch module 6 is inserted into the wallbox 1, the ground blade conductor 309 protrudes through blade slot-C 55 of the wiring module cover 24 and into the blade-pressure socket 70 of wire adapter-C 27, as seen in FIG. 156. The ground blade conductor 309 is connected to the grounding bar 304 which is connected to the grounding plate 303. The grounding plate 303 is in contact with the spring clips 31 which are connected to the electrical box 21 by means of the rivets 32, thereby grounding the electrical box 21.

Functionally, it can be seen from the foregoing discussion that the assembly of the electrical components 1, 6, 19, in itself, self-configures the 4-way-switch circuit 300 and self-distributes a dedicated earth ground to the components. It can be seen from FIGS. 152 and 154 that when the switch lever 312 is in the up position, the left switch-arm actuator 346 allows the switch arm 350 of the left switch-arm assembly 305 to make contact with the contact tip 352 of the right switch-contact assembly 308 as the right switch-arm actuator 347 forces the switch arm 351 of the right switch-arm assembly 306 to make contact with the contact tip 352 of the left switch-contact assembly 307, thereby providing continuity from wire conductor-A 602 to wire conductor-E 606 and from wire conductor-B 603 to wire conductor-D 605 of the 5-conductor cable 19. When the switch lever 312 is in the down position, the left switch-arm actuator 346 forces the switch arm 350 of the left switch-arm assembly 305 to make contact with the contact tip 352 of the left switch-contact assembly 307 as the right switch-arm actuator 347 allows the switch arm 351 of the right switch-arm assembly 306 to make contact with the contact tip 352 of the right switch-contact assembly 308, thereby providing continuity from wire conductor-A 602 to wire conductor-D 605 and from wire conductor-B 603 to wire conductor-E 606, as seen in FIGS. 151 and 153. It can also be seen that continuity is provided between wire conductor-C 604 of the 5-conductor cable 19 and the grounding plate 303 of the 4-way-switch module 6 as well as the electrical box 21, thereby grounding the 4-way-switch module 6 and the electrical box 21. The compression spring 311 provides quick action to reduce arcing and increase switch life. A standard wallplate 234 is mounted to the 4-way-switch module 6 with two mounting screws 235.

Referring to FIGS. 158 through 163, there is provided a dimmer switch circuit 700 which illustrates the use and operation of the dimmer switch module 7. The dimmer switch circuit 700 is comprised of a wallbox 1, a dimmer switch module 7, and a 3-conductor cable 17. The 3-conductor cable 17 provides the electrical connection to the wallbox 1 and is shown inserted into the left half 40 of the top cable port 39 of the wallbox 1. The specific exterior profile of the 3-conductor cable 17 and the specific interior profile of the top cable port 39 permits connection in one orientation only, as seen in FIG. 159. The 3-conductor cable 17 may also be connected to the bottom cable port 42 in the same manner. Wire conductor-A 582 of the 3-conductor cable 17 serves as the source-positive conductor, wire conductor-B 583 serves as the return-positive conductor, and wire conductor-C 584 serves as the ground conductor. As the 3-conductor cable 17 is inserted into the left half 40, 43 of either the top cable port 39 or the bottom cable port 42, the three wires 582, 583, 584 protrude through the wire entrance holes 47 of the wiring module base 23 and into the wire-pressure sockets 67 of the wire adapters 25, 26, 27; with wire conductor-A 582 connected to wire adapter-A 25, wire conductor-B 583 connected to wire adapter-B 26, and wire conductor-C 584 connected to wire adapter-C 27. The cable sheath 581 is stripped from the end of the 3-conductor cable 17 before being fully inserted into the cable port 39, 42 and secured by means of the cable clamp 33 and the cable clamp screws 34.

The dimmer switch module 7 is inserted into the wallbox 1 until the spring clips 31 snap over the grounding plate 703 of the dimmer switch module 7. As the dimmer switch module 7 is inserted into the wallbox 1, the source-positive blade conductor 705 protrudes through blade slot-A 53 of the wiring module cover 24 and into the blade-pressure socket 70 of wire adapter-A 25, as seen in FIG. 163.

Likewise, as the dimmer switch module 7 is inserted into the wallbox 1, the return-positive blade conductor 706 protrudes through blade slot-B 54 of the wiring module cover 24 and into the blade-pressure socket 70 of wire adapter-B 26, as seen in FIG. 161.

Also, as the dimmer switch module 7 is inserted into the wallbox 1, the ground blade conductor 707 protrudes through blade slot-C 55 of the wiring module cover 24 and into the blade-pressure socket 70 of wire adapter-C 27, as seen in FIG. 162. The ground blade conductor 707 is connected to the grounding bar 704 which is connected to the grounding plate 703. The grounding plate 703 is in contact with the spring clips 31 which are connected to the electrical box 21 by means of the rivets 31, thereby grounding the electrical box 21.

Functionally, it can be seen from the foregoing discussion that the assembly of the electrical components 1, 7, 17, in itself, self-configures the dimmer switch circuit 700 and self-distributes a dedicated earth ground to each component. It can also be seen that the dimmer device 708 controls the electrical current and voltage from the source-positive blade conductor 705 to the return-positive blade conductor 706, thereby providing continuity from wire conductor-A 582 to wire conductor-B 583 of the 3-conductor cable 17. The continuity between wire conductor-A 582 and wire conductor-B 583 is interrupted when the control shaft 710 is rotated to the extreme counter-clockwise location where the dimmer device 708 is in the "off" position. When the control shaft 710 is rotated in the clockwise direction and comes off the extreme counter-clockwise location, the dimmer device 708 is in the "on" position and electrical current may travel from wire conductor-A 582 to wire conductor-B 583 of the 3-conductor cable 17. As the control shaft 710 is further rotated in the clockwise direction, the dimmer device 708 varies the electrical voltage from the wire conductor-A 582 to wire conductor-B 583, thereby providing a means to adjust the light intensity of light fixtures. It can also be seen that continuity is provided between wire conductor-C 584 of the 3-conductor cable 17 and the grounding plate 703 of the dimmer switch module 7 as well as the electrical box 21, thereby grounding the dimmer switch module 7 and the electrical box 21. A standard wallplate 738 is mounted to the dimmer switch module 7 with two mounting screws 739.

Referring to FIGS. 164 through 169, there is provided a fan-control switch circuit 750 which illustrates the use and operation of the fan-control switch module 8. The fan-control switch circuit 750 is comprised of a wallbox 1, a fan-control switch module 8, and a 3-conductor cable 17. The 3-conductor cable 17 provides the electrical connection to the wallbox 1 and is shown inserted into the left half 40 of the top cable port 39 of the wallbox 1. The specific exterior profile of the 3-conductor cable 17 and the specific interior profile of the top cable port 39 permits connection in one orientation only, as seen in FIG. 165. The 3-conductor cable 17 may also be connected to the bottom cable port 42 in the same manner. Wire conductor-A 582 of the 3-conductor cable 17 serves as the source-positive conductor, wire conductor-B 583 serves as the return-positive conductor, and wire conductor-C 584 serves as the ground conductor. As the 3-conductor cable 17 is inserted into the left half 40, 43 of either the top cable port 39 or the bottom cable port 42, the three wires 582, 583, 584 protrude through the wire entrance holes 47 of the wiring module base 23 and into the wire-pressure sockets 67 of the wire adapters 25, 26, 27, with wire conductor-A 582 connected to wire adapter-A 25, wire conductor-B 583 connected to wire adapter-B 26, and wire conductor-C 584 connected to wire adapter-C 27. The cable sheath 581 is stripped from the end of the 3-conductor cable 17 before being fully inserted into the cable port 39, 42 and secured by means of the cable clamp 33 and the cable clamp screws 34.

The fan-control switch module 8 is inserted into the wallbox 1 until the spring clips 31 snap over the grounding plate 753 of the fan-control switch module 8. As the fan-control switch module 8 is inserted into the wallbox 1, the source-positive blade conductor 755 protrudes through blade slot-A 53 of the wiring module cover 24 and into the blade-pressure socket 70 of wire adapter-A 25, as seen in FIG. 169.

Likewise, as the fan-control switch module 8 is inserted into the wallbox 1, the return-positive blade conductor 756 protrudes through blade slot-B 54 of the wiring module cover 24 and into the blade-pressure socket 70 of wire adapter-B 26, as seen in FIG. 167.

Also, as the fan-control switch module 8 is inserted into the wallbox 1, the ground blade conductor 757 protrudes through blade slot-C 55 of the wiring module cover 24 and into the blade-pressure socket 70 of wire adapter-C 27, as seen in FIG. 168. The ground blade conductor 757 is connected to the grounding bar 754 which is connected to the grounding plate 753. The grounding plate 753 is in contact with the spring clips 31 which are connected to the electrical box 21 by means of the rivets 31, thereby grounding the electrical box 21.

Functionally, it can be seen from the foregoing discussion that the assembly of the electrical components 1, 8, 17, in itself, self-configures the fan-control switch circuit 750 and self-distributes a dedicated earth ground to each component. It can also be seen that the fan-control device 758 controls the electrical current and voltage from the source-positive blade conductor 755 to the return-positive blade conductor 756, thereby providing continuity from wire conductor-A 582 to wire conductor-B 583 of the 3-conductor cable 17. The continuity between wire conductor-A 582 and wire conductor-B 583 is interrupted when the control shaft 760 is rotated to the extreme counter-clockwise location where the fan-control device 758 is in the "off" position. When the control shaft 760 is rotated in the clockwise direction and comes off the extreme counter-clockwise location, the fan-control device 758 is in the "on" position and electrical current may travel from wire conductor-A 582 to wire conductor-B 583 of the 3-conductor cable 17. As the control shaft 760 is further rotated in the clockwise direction, the fan-control device 758 varies the electrical voltage from the wire conductor-A 582 to wire conductor-B 583, thereby providing a means to adjust the speed of electric fans and other electric motors. It can also be seen that continuity is provided between wire conductor-C 584 of the 3-conductor cable 17 and the grounding plate 753 of the fan-control switch module 8 as well as the electrical box 21, thereby grounding the fan-control switch module 8 and the electrical box 21. A standard wallplate 738 is mounted to the fan-control switch module 8 with two mounting screws 739.

Referring to FIGS. 170 through 175, there is provided a timer switch circuit 800 which illustrates the use, and operation of the timer switch module 9. The timer switch circuit 800 is comprised of a wallbox 1, a timer switch module 9, and a 3-conductor cable 17. The 3-conductor cable 17 provides the electrical connection to the wallbox 1 and is shown inserted into the left half 40 of the top cable port 39 of the wallbox 1. The specific exterior profile of the 3-conductor cable 17 and the specific interior profile of the top cable port 39 permits connection in one orientation only, as seen in FIG. 171. The 3-conductor cable 17 may also be connected to the bottom cable port 42 in the same manner. Wire conductor-A 582 of the 3-conductor cable 17 serves as the source-positive conductor, wire conductor-B 583 serves as the return-positive conductor, and wire conductor-C 584 serves as the ground conductor. As the 3-conductor cable 17 is inserted into the left half 40, 43 of either the top cable port 39 or the bottom cable port 42, the three wires 582, 583, 584 protrude through the wire entrance holes 47 of the wiring module base 23 and into the wire-pressure sockets 67 of the wire adapters 25, 26, 27, with wire conductor-A 582 connected to wire adapter-A 25, wire conductor-B 583 connected to wire adapter-B 26, and wire conductor-C 584 connected to wire adapter-C 27. The cable sheath 581 is stripped from the end of the 3-conductor cable 17 before being fully inserted into the cable port 39, 42 and secured by means of the cable clamp 33 and the cable clamp screws 34.

The timer switch module 9 is inserted into the wallbox 1 until the spring clips 31 snap over the grounding plate 803 of the timer switch module 9. As the timer switch module 9 is inserted into the wallbox 1, the source-positive blade conductor 805 protrudes through blade slot-A 53 of the wiring module cover 24 and into the blade-pressure socket 70 of wire adapter-A 25, as seen in FIG. 175.

Likewise, as the timer switch module 9 is inserted into the wallbox 1, the return-positive blade conductor 806 protrudes through blade slot-B 54 of the wiring module cover 24 and into the blade-pressure socket 70 of wire adapter-B 26, as seen in FIG. 173.

Also, as the timer switch module 9 is inserted into the wallbox 1, the ground blade conductor 807 protrudes through blade slot-C 55 of the wiring module cover 24 and into the blade-pressure socket 70 of wire adapter-C 27, as seen in FIG. 174. The ground blade conductor 807 is connected to the grounding bar 804 which is connected to the grounding plate 803. The grounding plate 803 is in contact with the spring clips 31 which are connected to the electrical box 21 by means of the rivets 31, thereby grounding the electrical box 21.

Functionally, it can be seen from the foregoing discussion that the assembly of the electrical components 1, 9, 17, in itself, self-configures the timer switch circuit 800 and self-distributes a dedicated earth ground to each component. It can also be seen that the timer device 808 controls the electrical current from the source-positive blade conductor 805 to the return-positive blade conductor 806, thereby providing continuity from wire conductor-A 582 to wire conductor-B 583 of the 3-conductor cable 17. The continuity between wire conductor-A 582 and wire conductor-B 583 is interrupted when the control shaft 810 is rotated to the extreme counter-clockwise location where the timer device 808 is in the "off" position. When the control shaft 810 is rotated in the clockwise direction and comes off the extreme counter-clockwise location, the timer device 808 is in the "on" position and electrical current may travel from wire conductor-A 582 to wire conductor-B 583 of the 3-conductor cable 17. The time duration that the timer device 808 will remain "on" is dependent on how far the control shaft 810 is rotated in the clockwise direction. As the control shaft 810 is further rotated in the clockwise direction, the time duration increases that the timer device 808 will allow the electrical current to travel from wire conductor-A 582 to wire conductor-B 583, thereby providing a means to adjust the time for electrical appliances to turn off automatically. The control shaft 810 is rotated clockwise manually and returns to the extreme counter-clockwise location automatically by the timer device 808 as the time duration expires. It can also be seen that continuity is provided between wire conductor-C 584 of the 3-conductor cable 17 and the grounding plate 803 of the timer switch module 9 as well as the electrical box 21, thereby grounding the timer switch module 9 and the electrical box 21. A standard wallplate 738 is mounted to the timer switch module 9 with two mounting screws 739.

Referring to FIGS. 176 through 182, there is provided a GFCI-receptacle circuit 850 which illustrates the use and operation of the GFCI-receptacle module 10. The GFCI-receptacle circuit 850 is comprised of a wallbox 1, a GFCI-receptacle module 10, and 3-conductor cables 17. The specific exterior profile of the 3-conductor cables 17 and the specific interior profile of the top cable port 39 permits connection in one orientation only to the left half 40 or right half 41, as seen in FIG. 177.

The 3-conductor cable 17 shown inserted into the left half 40 of the top cable port 39 provides electrical power to the wallbox 1. The 3-conductor cable 17 may also be connected to the left half 43 of the bottom cable port 42 in the same manner. Wire conductor-A 582 of the 3-conductor cable 17 serves as the positive conductor, wire conductor-B 583 serves as the neutral conductor, and wire conductor-C 584 serves as the ground conductor. As the 3-conductor cable 17 is inserted into the left half 40, 43 of either the top cable port 39 or the bottom cable port 42, the three wire conductors 582, 583, 584 protrude through the wire entrance holes 47 of the wiring module base 23 and into the wire-pressure sockets 67 of the wire adapters 25, 26, 27; with wire conductor-A 582 connected to wire adapter-A 25, wire conductor-B 583 connected to wire adapter-B 26, and wire conductor-C 584 connected to wire adapter-C 27. The cable sheath 581 is stripped from the end of the 3-conductor cable 17 before being fully inserted into the cable port 39, 42 and secured by means of the cable clamp 33 and the cable clamp screws 34.

The GFCI receptacle module 10 is inserted into the wallbox 1 until the spring clips 31 snap over the grounding plate 856 of the GFCI receptacle module 10. As the GFCI receptacle module 10 is inserted into the wallbox 1, the source-positive blade conductor 858 and the GFCI-positive blade conductor 860 protrude through blade slot-A 53 and blade slot-D 56 of the wiring module cover 24 and into the blade-pressure sockets 70 of wire adapter-A 25 and wire adapter-D 28, respectively. The source-positive blade conductor 858 thereby connects wire adapter-A 25 to the GFCI device 864 and the GFCI-positive blade conductor 860 connects wire adapter-D 28 to the GFCI device 864, as seen in FIG. 181. Therefore, continuity is provided between wire conductor-A 582 of the 3-conductor cable 17 inserted into the left half 40 of the top cable port 39 and the positive plug adapter 853 of the GFCI-receptacle module 10, via the GFCI device 864. Continuity is also provided between wire conductor-A 582 of the 3-conductor cable 17 inserted into the left half 40 of the top cable port 39 and wire adapter-D 28, via the GFCI device 864.

Likewise, as the GFCI receptacle module 10 is inserted into the wallbox 1, the source-neutral blade conductor 859 and the GFCI-neutral blade conductor 861 protrude through blade slot-B 54 and blade slot-E 57 of the wiring module cover 24 and into the blade-pressure sockets 70 of wire adapter-B 26 and wire adapter-E 29, respectively. The source-neutral blade conductor 859 thereby connects wire adapter-B 26 to the GFCI device 864 and, the GFCI-neutral blade conductor 861 connects wire adapter-E 29 to the GFCI device 864, as seen in FIG. 179. Therefore, continuity is provided between wire conductor-B 583 of the 3-conductor cable 17 inserted into the left half 40 of the top cable port 39 and the neutral plug adapter 854 of the GFCI-receptacle module 108, via the GFCI device 864. Continuity is also provided between wire conductor-B 583 of the 3-conductor cable 17 inserted into the left half 40 of the top cable port 39 and wire adapter-E 29, via the GFCI device 864.

Also, as the GFCI receptacle module 10 is inserted into the wallbox 1, the ground blade conductors 862 protrude through blade slot-C 55 and blade slot-F 58 of the wiring module cover 24 and into the blade-pressure sockets 70 of wire adapter-C 27 and wire adapter-F 30, respectively. The ground blade conductors 862 thereby connect wire adapter-C 27 to wire adapter-F 30 and to the grounding bar 857, as seen in FIG. 180. The grounding bar 857 is connected to the grounding plate 856 to which are attached the ground plug adapters 855. Therefore, continuity is provided between wire conductor-C 584 of the 3-conductor cable 17 inserted into the left half 40 of the top cable port 39 and the ground plug adapters 855 of the GFCI-receptacle module 10, as well as the grounding plate 856. The grounding plate 856 is in contact with the spring clips 31 which are connected to the electrical box 21 by means of the rivets 32, thereby grounding the electrical box 21.

The 3-conductor cable 17 shown inserted into the right half 41 of the top cable port 39 provides GFCI electrical power to other electrical circuits. The 3-conductor cable 17 may also be connected to the right half 44 of the bottom cable port 42 in the same manner. As the 3-conductor cable 17 is inserted into the right half 41, 44 of either the top cable port 39 or the bottom cable port 42, the three wires 582, 583, 584 protrude through the wire entrance holes 47 of the wiring module base 23 and into the wire-pressure sockets 67 of the wire adapters 28, 29, 30; with wire conductor-A 582 connected to wire adapter-D 28, wire conductor-B 583 connected to wire adapter-E 29, and wire conductor-C 584 connected to wire adapter-F 30. Therefore, wire conductor-A 582 of the 3-conductor cable 17 serves as the GFCI-positive conductor, wire conductor-B 583 serves as the GFCI-neutral conductor, and wire conductor-C 584 serves as the ground conductor.

As a standard electrical plug 918 is inserted into the receptacle face 890 of the GFCI receptacle module 2, the positive blade 919 of the electrical plug 918 is inserted into the positive plug adapter 853, thereby providing the electrical plug 918 with a GFCI-positive conductor. Likewise, the neutral blade 920 of the electrical plug 918 is inserted into the neutral plug adapter 854, thereby providing the electrical plug 918 with a GFCI-neutral conductor. Also, the ground blade 921 of the electrical plug 918 is inserted into the ground plug adapter 855, thereby providing the electrical plug 918 with a grounded conductor.

A 3-conductor cable 17 may be connected to the left half 43 of the bottom cable port 42 to provide electrical power for other circuits; with wire conductor-A 582 of the 3-conductor cables 17 serving as the positive conductor, wire conductor-B 583 serving as the neutral conductor, and wire conductor-C 584 serving as the ground conductor. A 3-conductor cable 17 may also be connected to the right half 44 of the bottom cable port 42 to provide GFCI-electrical power for other circuits; with wire conductor-A 582 of the 3-conductor cables 17 serving as the GFCI-positive conductor, wire conductor-B 583 serving as the GFCI-neutral conductor, and wire conductor-C 584 serving as the ground conductor. A standard wallplate 916 is mounted to the GFCI receptacle module 10 with two mounting screws 917.

Functionally, it can be seen from the foregoing discussion that the assembly of the electrical components 1, 10, 17, in itself, self-configures the GFCI-receptacle circuit 850 and self-distributes a dedicated earth ground to the components. When an appliance to which the electrical plug 918 is connected requires electrical power, electrical current travels from wire conductor-A 582 of the 3-conductor cable 17 inserted into the left half 40 of the top cable port 39, through wire adapter-A 25, through the source-positive blade conductor 858, through the GFCI device 864, through the positive plug adapter 853, and into the positive-blade 919 of the electrical plug 918. The electrical current returns from the appliance through the neutral blade 920 of the electrical plug 918, through the neutral plug adapter 854, through the GFCI device 864, through the source-neutral blade conductor 859, through wire adapter-B 26, and into wire conductor-B 583 of the 3-conductor cable 17 inserted into the left half 40 of the top cable port 39.

When the 3-conductor cable 17 inserted into the right half 41 of the top cable port 39 requires electrical power, electrical current travels from wire conductor-A 582 of the 3-conductor cable 17 inserted into the left half 40 of the top cable port 39, through wire adapter-A 25, through the source-positive blade conductor 858, through the GFCI device 864, through the GFCI-positive blade conductor 860, through wire adapter-D 28, and into wire conductor-A 582 of the 3-conductor cable 17 inserted into the right half 41 of the top cable port 39. The electrical current returns from the 3-conductor cable 17 inserted into the right half 41 of the top cable port 39 through wire conductor-B 583, through the GlFCI-neutral blade conductor 861, through the GFCI device 864, through the source-neutral blade conductor 859, through wire adapter-B 26, and into wire conductor-B 583 of the 3-conductor cable 17 inserted into the left half 40 of the top cable port 39.

The GFCI device 864 monitors the electrical current through the source-positive blade conductor 858 relative to the electrical current through the source-neutral blade conductor 859 to detect a leakage current to ground or "ground fault condition", indicating stray electrical current and possible electrocution of a person. Upon detection of a ground fault condition, the GFCI device 864 trips, thereby interrupting the electrical current to the positive plug adapter 853 and the GFCI-positive blade conductor 860. The GFCI receptacle module 10 may be tested periodically by pressing the "Test" pushbutton 865 which simulates a ground fault condition. After a ground fault condition has occurred, or after testing, the GFCJ receptacle module 10 may be reset by pressing the "Reset" pushbutton 867 which resets the GFCI device 864 after it has been tripped.

Referring to FIGS. 183 through 188, there is provided a 240 volt receptacle circuit 930 which illustrates the use and operation of the 240 volt receptacle module 11. The 240 volt receptacle circuit 930 is comprised of a wallbox 1, a 240 volt receptacle module 11, and a 4-conductor cable 18. The 4-conductor cable 18 provides 240 volt electrical power to the wallbox 1 and is shown inserted into the top cable port 39. The 240 volts is nominal and the actual voltage is dependent on the power source. The specific exterior profile of the 4-conductor cable 18 and the specific interior profile of the top cable port 39 permits connection in one orientation only, as seen in FIG. 184. The 4-conductor cable 18 may also be connected to the bottom cable port 42 in the same manner. Wire conductor-A 142 of the 4-conductor cable 18 serves as the left positive conductor, wire conductor-B 143 serves as the neutral conductor, wire conductor-C 144 serves as the ground conductor, and wire conductor-D 145 serves as the right positive conductor. As the 4-conductor cable 18 is inserted into either the top cable port 39 or the bottom cable port 42, the four wires 142, 143, 144, 145 protrude through the wire entrance holes 47 of the wiring module base 23 and into the wire-pressure sockets 67 of the wire adapters 25, 26, 27, 28, with wire conductor-A 142 connected to wire adapter-A 25, wire conductor-B 143 connected to wire adapter-B 26, wire conductor-C 144 connected to wire adapter-C 27, and wire conductor-D 145 connected to wire adapter-D 28. The cable sheath 141 is stripped from the end of the 4-conductor cable 18 before being fully inserted into the cable port 28, 42 and secured by means of the cable clamp 33 and cable clamp screws 34.

The 240 volt receptacle module 11 is inserted into the wallbox 1 until the spring clips 31 snap over the grounding plate 940 of the 240 volt receptacle module 11. As the 240 volt receptacle module 11 is inserted into the wallbox 1, the blade conductor 936 of the left positive plug adapter 933 protrudes through blade slot-A 53 of the wiring module cover 24 and into the blade-pressure socket 70 of wire adapter-A 25. The blade conductor 936 thereby connects wire adapter-A 25 to the left positive plug adapter 933, as seen in FIG. 188.

Likewise, as the 240 volt receptacle module 11 is inserted into the wallbox 1, the blade conductor 937 of the right positive plug adapter 934 protrudes through blade slot-D 56 of the wiring module cover 24 and into the blade-pressure socket 70 of wire adapter-D 28. The blade conductor 937 thereby connects wire adapter-D 28 to the right positive plug adapter 934, as seen in FIG. 188.

Likewise, as the 240 volt receptacle module 11 is inserted into the wallbox 1, the blade conductor 938 of the neutral plug adapter 935 protrudes through blade slot-B 54 of the wiring module cover 24 and into the blade-pressure socket 70 of wire adapter-B 26. The blade conductor 938 thereby connects wire adapter-B 26 to the neutral plug adapter 935, as seen in FIG. 186.

Also, as the 240 volt receptacle module 11 is inserted into the wallbox 1, the ground blade conductor 939 protrudes through blade slot-C 55 of the wiring module cover 24 and into the blade-pressure socket 70 of wire adapter-C 27. The ground blade conductor 939 thereby connects wire adapter-C 27 to the grounding bar 941, as seen in FIG. 187. The grounding bar 941 is connected to the grounding plate 940 which is in contact with the spring clips 31. The spring clips 31 are connected to the electrical box 21 by means of the rivets 32, thereby grounding the electrical box 21.

Functionally, it can be seen from the foregoing discussion that the assembly of the electrical components 1, 11, 18, in itself, self-configures the 240-volt receptacle circuit 930 and self-distributes a dedicated earth ground to the components. The electrical power is supplied to the wallbox 1 by means of a 4-conductor cable 18 connected to the top cable port 39. Continuity is provided between the left positive plug adapter 933 of the 240 volt receptacle module 11 and wire conductor-A 142 of the 4-conductor cable 18, between the neutral plug adapter 935 and wire conductor-B 143, between the grounding plate 940 and wire conductor-C 144; and between the right positive plug adapter 934 and wire conductor-D 145. When a standard electrical plug 977 is inserted into the receptacle face 959 of the 240 volt receptacle module 11, the left positive blade 978 of the electrical plug 977 is inserted into the left positive plug adapter 933 and the right positive blade 979 is inserted into the right positive plug adapter 934, thereby providing the electrical plug 977 with two positive conductors. Likewise, the neutral blade 980 of the electrical plug 977 is inserted into the neutral plug adapter 935, thereby providing the electrical plug 977 with a neutral conductor. It can also be seen that continuity is provided between wire conductor-C 144 of the 4-conductor cable 18 and the grounding plate 940 of the 240 volt receptacle module 11 as well as the electrical box 21, thereby grounding the 240 volt receptacle module 11 and the electrical box 21. A wallplate 975 is mounted to the 240 volt receptacle module 11 with twp mounting screws 976.

Referring to FIGS. 189 through 191, the operation and use of the junction box 12 is illustrated. Electrical power is provided to the junction box 12 by means of a 3-conductor cable 17 inserted into any cable port 383 of the junction box 12, as seen in FIG. 189. Wire conductor-A 582 of the 3-conductor cable 17 serves as the positive conductor, wire conductor-B 583 serves as the neutral conductor, and wire conductor-C 584 serves as the ground conductor. As the 3-conductor cable 17 is inserted into the cable port 383, the three wires 582, 583, 584 protrude through the wire entrance holes 378 of the wiring module base 363 and into the wire-pressure sockets 400, 402, 404 of the wire adapters 365, 366, 367, with wire conductor-A 582 connected to the positive wire adapter 365, wire conductor-B 583 connected to the neutral wire adapter 366, and wire conductor-C 584 connected to the ground wire adapter 367. It can be easily seen from FIG. 191 that a 3-conductor cable 17 may be connected to any of the remaining cable ports 383 in the same manner to provide electrical power for another circuit, with wire conductor-A 582 connected to the positive wire adapter 365, wire conductor-B 583 connected to the neutral wire adapter 366, and wire conductor-C 584 connected to the ground wire adapter 367; thereby providing each 3-conductor cable 17 with a positive conductor, a neutral conductor, and a grounded conductor. The specific exterior profile of the 3-conductor cable 17 and the specific interior profile of the cable ports 383 permits connection in one orientation only, as seen in FIG. 190. The ground wire adapter 367 is connected to the electrical box 361 by means of the rivet 368, thereby grounding the electrical box 361. The positive wire adapter 365, the neutral wire adapter 366, and the ground wire adapter 367 each provide a terminal screw 371 for wire connection, if required.

The cable sheath 581 is stripped from the ends of the 3-conductor cable 17 before being fully inserted into the cable ports 383. The 3-conductor cables 17 are secured by means of the cable clamps 369 and the cable clamp screws 370.

Referring to FIGS. 192 through 210, the operation and use of the light box 13 is illustrated. Electrical power is provided to the light box 13 by means of the 3-conductor cable 17 inserted into cable port-A 466, as seen in FIG. 192. Wire conductor-A 582 of the 3-conductor cable 17 serves as the positive conductor, wire conductor-B 583 serves as the neutral conductor, and wire conductor-C 584 serves as the ground conductor. As the 3-conductor cable 17 is inserted into cable port-A 466, the three wires 582, 583, 584 protrude through the wire entrance holes 458 of the wiring module base 423 and into the wire-pressure sockets 501, 503, 505 of the wire adapters 425, 426, 427; with wire conductor-A 582 connected to the positive wire adapter 425, wire conductor-B 583 connected to the neutral wire adapter 426, and wire conductor-C 584 connected to the ground wire adapter 427. A 3-conductor cable 17 may be connected to cable port-B 467 in the same manner to provide electrical power for another circuit, with wire conductor-A 582 connected to the positive wire adapter 425, wire conductor-B 583 connected to the neutral wire adapter 426, and wire conductor-C 584 connected to the ground wire adapter 427. The specific exterior profile of the 3-conductor cable 17 and the specific interior profile of cable port-A 466 and cable port-B 467 permits connection in one orientation only, as seen in FIG. 193.

Referring to FIGS. 192 through 197, the light box 13 is shown wired for a 2-way-lighting circuit 535. A 2-way-lighting circuit 535 is utilized when only one switch location is desired. A 2-way-switch circuit 180 is connected to cable port-E 470 by means of a 3-conductor cable 17. The 3-conductor cable 17 provides the connection from the light box 13 to a 2-way-switch module 4 mounted in a wallbox 1, as illustrated in FIGS. 133 through 139. The specific exterior profile of the 3-conductor cable 17 and the specific interior profile of cable port-E 470 permits connection in one orientation only, as seen in FIG. 195. Wire conductor-A 582 of the 3-conductor cable 17 serves as the source-positive conductor, wire conductor-B 583 serves as the return-positive conductor, and wire conductor-C 584 serves as the ground conductor. As the 3-conductor cable 17 is inserted into cable port-E 470, the three wires 582, 583, 584 protrude through the wire entrance holes 458 of the wiring module base 423 and into the wire-pressure sockets 501, 509, 505 of the wire adapters 425, 429, 427; with wire conductor-A 582 connected to the positive wire adapter 425, wire conductor-B 583 connected to wire adapter-AD 429, and wire conductor-C 584 connected to the ground wire adapter 427.

A 4-wire-jumper 15 is shown inserted into cable port-G 472 and cable port-H 473 of the light box 13. The 4-wire jumper 15 simulates a 4-way-switch circuit 300. The specific exterior profile of the 4-wire jumper 15 and the specific interior profile of the cable ports 472, 473 permits connection in one orientation only, as seen in FIG. 194. As the 4-wire jumper 15 is inserted into cable port-G 472, the four wires 552, 553, 554, 555 protrude through the wire entrance holes 458 of the wiring module base 423 and into the wire-pressure sockets 511, 512, 513, 514 of the wire adapters 429, 430, 431, 432; with wire-R 552 connected to wire adapter-BC 430, wire-S 553 connected to wire adapter-AD 429, wire-T 554 connected to wire adapter-EH 431, and wire-U 555 connected to wire adapter-FG 432. As the 4-wire jumper 15 is inserted into cable port-H 473, the four wires 552, 553, 554, 555 protrude through the wire entrance holes 458 of the wiring module base 423 and into the wire-pressure sockets 515, 516, 517, 518 of the wire adapters 431, 432, 433, 434, with wire-R 552 connected to the wire adapter-FG 432, wire-S 553 connected to wire adapter-EH 431, with wire-T 554 connected to the wire adapter-JM 433, and wire-U 555 connected to wire adapter-KL 434.

A 2-wire jumper 14 is shown inserted into cable port-F 471 of the light box 13. The 2-wire jumper 14 simulates a 2-way-switch circuit 180. The specific exterior profile of the 2-wire jumper 14 and the specific interior profile of cable port-F 471 permits connection in one orientation only, as seen in FIG. 196. As the 2-wire jumper 14 is inserted into6 cable port-F 471, the two wires 542, 543 protrude through the wire entrance holes 458 of the wiring module base 423 and into the wire-pressure sockets 507, 520 of the wire adapters 428, 433; with wire-N 542 connected to the light wire adapter 428, and wire-P 543 connected to wire adapter-JM 433.

Functionally, it can be seen from the foregoing discussion that the assembly of the electrical components, in itself, self-configures the 2-way-lighting circuit 535. It can be seen from FIG. 197 that a positive conductor is connected to the positive wire adapter 425 of the light box 13 by means of wire conductor-A 582 of the 3-conductor cable 17 connected to cable port-A 466. Wire conductor-A 582 of the 3-conductor cable 17 connected to cable port-E is connected to the positive wire adapter 425 and serves as the source-positive conductor to the 2-way-switch module 4. When the lever 190 of the 2-way-switch module 4 is in the up position, continuity is provided between wire conductor-A 582 and wire conductor-B 583, as illustrated in FIGS. 133 through 139. Wire conductor-B 583 serves as the return-positive conductor and is connected to wire adapter-AD 429. Jumper-ST 557 of the 4-wire jumper 15 inserted into cable port-G 472 provides continuity between wire adapter-AD 429 and wire adapter-EH 431. Jumper-ST 557 of the 4-wire jumper 15 inserted into cable port-H 473 provides continuity between wire adapter-EH 431 and wire adapter-JM 433. Jumper-NP 544 of the 2-wire jumper 14 inserted into cable port-F 471 provides continuity between wire adapter-JM 433 and the light wire adapter 428. Therefore, when the lever 190 of the 2-way switch module 4 is in the up position, continuity is provided between the light wire adapter 428 and wire conductor-A 582 of the 3-conductor cable 17 connected to cable port-A 466, thereby connecting a positive conductor to the light wire adapter 428. When the lever 190 of the 2-way-switch module 4 is in the down position, the continuity is interrupted, as illustrated in FIGS. 133 through 139. The light wire adapter 428 provides a terminal screw 438 to accommodate the positive wire of a light fixture.

Referring to FIGS. 198 through 201, the light box 13 is shown wired for a 3-way-lighting circuit 536. A 3-waylighting circuit 536 is utilized when two switch locations are desired. A 3-way-switch circuit 240 is connected to cable port-E 470 and cable port-F 471 by means of a 4-conductor cable 18. The 4-conductor cable 18 provides the connection from the light box 13 to a 3-way-switch module 5 mounted in a wallbox 1, as illustrated in FIGS. 140 through 148. The specific exterior profile of the 4-conductor cable 18 and the specific interior profile of cable port-E 470 and cable port-F 471 permits connection in one orientation only, as seen in FIGS. 199 and 200. Wire conductor-A 592 of the 4-conductor cable 18 connected to cable port-E 470 serves as die source-positive conductor, wire conductor-B 593 and wire conductor-D 595 serve as the return-positive conductors, and wire conductor-C 594 serves as the ground conductor. As the 4-conductor cable 18 is inserted into cable port-E 470, the four wires 592, 593, 594, 595 protrude through the wire entrance holes 458 of the wiring module base 423 and into the wire-pressure sockets 501, 509, 505, 510 of the wire adapters 425, 429, 427, 430, with wire conductor-A 592 connected to the positive wire adapter 425, wire conductor-B 593 connected to wire adapter-AD 429, wire conductor-C 594 connected to the ground wire adapter 427, and wire conductor-D 595 connected to wire adapter-BC 430. Wire conductor-A 592 of the 4-conductor cable 18 connected to cable port-F 471 serves as the return-positive conductor, wire conductor-B 593 and wire conductor-D 595 serve as the source-positive conductors, and wire conductor-C 594 serves as the ground conductor. As the 4-conductor cable 18 is inserted into cable port-F 471, the four wires 592, 593, 594, 595 protrude through the wire entrance holes 458 of the wiring module base 423 and into the wire-pressure sockets 508, 520, 505, 519 of the wire adapters 428, 433, 427, 434; with wire conductor-A 592 connected to the light wire adapter 428, wire conductor-B 593 connected to wire adapter-JM 433, wire conductor-C 594 connected to the ground wire adapter 427, and wire conductor-D 595 connected to wire adapter-KL 434.

A 4-wire-jumper 15 is shown inserted into cable port-G 472 and cable port-H 473 of the light box 13 in the same manner as for the 2-way lighting circuit 535 discussed previously.

Functionally, it can be seen from the foregoing discussion that the assembly of the electrical components, in itself, self-configures the 3-way-lighting circuit 536. It can be seen from FIG. 201 that a positive conductor is connected to the positive wire adapter 425 of the light box 13 by means of wire conductor-A 582 of the 3-conductor cable 17 connected to cable port-A 466. Wire conductor-A 592 of the 4-conductor cable 18 connected to cable port-E 470 is connected to the positive wire adapter 425 and serves as the source-positive conductor to the 3-way-switch module 5. When the lever 251 of the 3-way-switch module 5 is in the up position, continuity is provided between wire conductor-A 592 and wire conductor-B 593, as illustrated in FIGS. 140 through 148. When the lever 251 of the 3-way-switch module 5 is in the down position, continuity is provided between wire conductor-A 592 and wire conductor-D 595. Wire conductor-B 593 and wire conductor-D 595 serve as the return-positive conductors with wire conductor-B 593 connected to wire adapter-AD 429 and wire conductor-D 595 connected to wire adapter-BC 430. Jumper-ST 557 of the 4-wire jumper 15 inserted into cable port-G 472 provides continuity between wire adapter-AD 429 and wire adapter-EH 431; and jumper-RU 556 provides continuity between wire adapter-BC 430 and wire adapter-FG 432. Jumper-ST 557 of the 4-wire jumper 15 inserted into cable port-H 473 provides continuity between wire adapter-EH 431 and wire adapter-JM 433; and jumper-RU 556 provides continuity between wire adapter-FG 432 and wire adapter-KL 434. Depending on the position of the lever 251 of the 3-way-switch module 5 connected to cable port-E 470, either wire conductor-B 593 or wire conductor-D 595 of the 4-conductor cable 18 connected to cable port-F 471 serve as the source-positive conductor to the 3-way-switch module 5; with wire conductor-B 593 connected to wire adapter-JM 433 and wire conductor-D 595 connected to wire adapter-KL 434. Wire conductor-A 592 is connected to the light wire adapter 428 and serves as the return-positive conductor. When the lever 251 of the 3-way-switch module 5 is in the up position, continuity is provided between wire conductor-A 592 and wire conductor-B 593, as illustrated in FIGS. 140 through 148. When the lever 251 of the 3-way-switch module 5 is in the down position, continuity is provided between wire conductor-A 592 and wire conductor-D 595. Therefore, when the lever 251 of both 3-way-switch modules 5 is either in the up position or the down position, continuity is provided between the light wire adapter 428 and wire conductor-A 582 of the 3-conductor cable 17 connected to cable port-A 466, thereby connecting a positive conductor to the light wire adapter 428. When the lever 251 of either 3-way-switch module 5 is in the down position and the lever 251 of the other 3-way-switch module 5 is in the up position, the continuity is interrupted. The light wire adapter 428 provides a terminal screw 438 to accommodate the positive wire of a light fixture.

Referring to FIGS. 202 through 204, the light box 13 is shown wired for a 4-way-lighting circuit 537. A 4-way-lighting circuit 537 is utilized when more than two switch locations are desired. A 3-way-switch circuit 240 is connected to cable port-E 470 and to cable port-F 471 of the light box 13 in the same manner as for the 3-way-lighting circuit 536 discussed previously. Also, a 4-wire-jumper 15 is shown inserted into cable port-H 473 of the light box 13 in the same manner as for the 2-way-lighting circuit 535 discussed previously.

A 4-way-switch circuit 300 is connected to cable port-G 472 by means of a 5-conductor cable 19. The 5-conductor cable 19 provides the connection from the light box 13 to a 4-way-switch module 6 mounted in a wallbox 1, as illustrated in FIGS. 149 through 157. The specific exterior profile of the 5-conductor cable 19 and the specific interior profile of cable port-G 472 permits connection in one orientation only, as seen in FIG. 203. Wire conductor-A 602 and wire conductor-B 603 of the 5-conductor cable 19 serve as the source-positive conductors, wire conductor-D 605 and wire conductor-E 606 serve as the return-positive conductors, and wire conductor-C 604 serves as the ground conductor. As the 5-conductor cable 19 is inserted into cable port-G 472, the five wires 602, 603, 604, 605, 606 protrude through the wire entrance holes 458 of the wiring module base 423 and into the wire-pressure sockets 511, 512, 505, 513, 514 of the wire adapters 429, 430, 427, 431, 432, with wire conductor-A 602 connected to wire adapter-BC 430, wire conductor-B 603 connected to wire adapter-AD 429, wire conductor-C 604 connected to the ground wire adapter 427, wire conductor-D 605 connected to wire adapter-EH 431, and wire conductor-E 606 connected to wire adapter-FG 432.

Functionally, it can be seen from the foregoing discussion that the assembly of the electrical components, in itself, self-configures the 4-way-lighting circuit 537. It can be seen from FIG. 204 that a positive conductor is connected to the positive wire adapter 425 of the light box 13 by means of wire conductor-A 582 of the 3-conductor cable 17 connected to cable port-A 466. Wire conductor-A 592 of the 4-conductor cable 18 connected to cable port-E 470 is connected to the positive wire adapter 425 and serves as the source-positive conductor to the 3-way-switch module 5. When the lever 251 of the 3-way-switch module 5 is in the up position, continuity is provided between wire conductor-A 592 and wire conductor-B 593, as illustrated in FIGS. 140 through 148. When the lever 251 of the 3-way-switch module 5 is in the down position, continuity is provided between wire conductor-A 592 and wire conductor-D 595. Wire conductor-B 593 and wire conductor-D 595 serve as the return-positive conductors with wire conductor-B 593 connected to wire adapter-AD 429 and wire conductor-D 595 connected to wire adapter-BC 430. Depending on the position of the lever 251 of the 3-way-switch module 5 connected to cable port-E 470, either wire conductor-A 602 or wire conductor-B 603 of the 5-conductor cable 19 connected to cable port-G 472 serve as the source-positive conductor to the 4-way-switch module 6; with wire conductor-A 602 connected to wire adapter-BC 430 and wire conductor-B 603 connected to wire adapter-AD 429. Wire conductor-D 605 and wire conductor-E 606 of the 5-conductor cable 19 serve as the return-positive conductors with wire conductor-D 605 connected to wire adapter-EH 431 and wire conductor-E 606 connected to wire adapter-FG 432. When the lever 312 of the 4-way-switch module 6 is in the up position, continuity is provided between wire conductor-A 602 and wire conductor-E 606, as well as between wire conductor-B 603 and wire conductor-D 605, as illustrated in FIGS. 149 through 157. When the lever 312 of the 4-way-switch module 6 is in the down position, continuity is provided between wire conductor-A 602 and wire conductor-D 605, as well as between wire conductor-B 603 and wire conductor-E 606. Jumper-ST 557 of the 4-wire jumper 15 inserted into cable port-H 473 provides continuity between wire adapter-EH 431 and wire adapter-JM 433; and jumper-RU 556 provides continuity between wire adapter-FG 432 and wire adapter-KL 434. Depending on the position of the lever 251 of the 3-way-switch module 5 connected to cable port-E 470 and the position of the lever 312 of the 4-way-switch module 6 connected to cable port-G 472, either wire conductor-B 593 or wire conductor-D 595 of the 4-conductor cable 18 connected to cable port-F 471 serve as the source-positive conductor to the 3-way-switch module 5; with wire conductor-B 593 connected to wire adapter-JM 433 and wire conductor-D 595 connected to wire adapter-KL 434. Wire conductor-A 592 is connected to the light wire adapter 428 and serves as the return-positive conductor. When the lever 251 of the 3-way-switch module 5 is in the up position, continuity is provided between wire conductor-A 592 and wire conductor-B 593, as illustrated in FIGS. 140 through 148. When the lever 251 of the 3-way-switch module 5 is in the down position, continuity is provided between wire conductor-A 592 and wire conductor-D 595. Therefore, when the lever 251 of both 3-way-switch modules 5 is either in the up position or the down position and the lever 312 of the 4-way-switch module 6 is in the up position, continuity is provided between the light wire adapter 428 and wire conductor-A 582 of the 3-conductor cable 17 connected to cable port-A 466, thereby connecting a positive conductor to the light wire adapter 428. When the lever 251 of either 3-way-switch module 5 is in the down position and the lever 251 of the other 3-way-switch module 5 is in the up position with the lever 312 of the 4-way-switch module 6 in the up position, the continuity is interrupted. When the lever 251 of either 3-way-switch module 5 is in the down position and the lever 251 of the other 3-way-switch module 5 is in the up position with the lever 312 of the 4-way-switch module 6 also in the down position, the continuity is restored. In summary, changing the position of any of the levers 251, 312 of the switch modules 5, 6 will change the status of the continuity to either interrupted or restored. The light wire adapter 428 provides a terminal screw 438 to accommodate the positive wire of a light fixture.

Referring to FIGS. 205 through 207, the light box 13 is shown wired for a 4-way-lighting circuit 537 using two 4-way-switch circuits 300. A 3-way-switch circuit 240 is connected to cable port-E 470 and to cable port-F 471 of the light box 13, as well as a 4-way-switch circuit 300 connected to cable port-G 472, in the same manner as for the 4-way-lighting circuit 537 discussed above.

A 4-way-switch circuit 300 is also connected to cable port-H 473 by means of a 5-conductor cable 19. The 5-conductor cable 19 provides the connection from the light box 13 to a 4-way-switch module 6 mounted in a wallbox 1, as illustrated in FIGS. 149 through 157. The specific exterior profile of the 5-conductor cable 19 and the specific interior profile of cable port-H 473 permits connection in one orientation only, as seen in FIG. 207. Wire conductor-A 602 and wire conductor-B 603 of the 5-conductor cable 19 serve as the source-positive conductors, wire conductor-D 605 and wire conductor-E 606 serve as the return-positive conductors, and wire conductor-C 604 serves as the ground conductor. As the 5-conductor cable 19 is inserted into cable port-H 473, the five wires 602, 603, 604, 605, 606 protrude through the wire entrance holes 458 of the wiring module base 423 and into the wire-pressure sockets 515, 516, 505, 517, 518 of the wire adapters 432, 431, 427, 433, 434, with wire conductor-A 602 connected to wire adapter-FG 432, wire conductor-B 603 connected to wire adapter-EM 431, wire conductor-C 604 connected to the ground wire adapter 427, wire conductor-D 605 connected to wire adapter-JM 433, and wire conductor-E 606 connected to wire adapter-KL 434.

Functionally, it can be seen from the foregoing discussion and from FIG. 207 that a positive conductor is connected to the positive wire adapter 425 of the light box 13 by means of wire conductor-A 582 of the 3-conductor cable 17 connected to cable port-A 466. Wire conductor-A 592 of the 4-conductor cable 18 connected to cable port-E 470 is connected to the positive wire adapter 425 and serves as the source-positive conductor to the 3-way-switch module 5. When the lever 251 of the 3-way-switch module 5 is in the up position, continuity is provided between wire conductor-A 592 and wire conductor-B 593, as illustrated in FIGS. 140 through 148. When the lever 251 of the 3-way-switch module 5 is in the down position, continuity is provided between wire conductor-A 592 and wire conductor-D 595. Wire conductor-B 593 and wire conductor-D 595 serve as the return-positive conductors with wire conductor-B 593 connected to wire adapter-AD 429 and wire conductor-D 595 connected to wire adapter-BC 430. Depending on the position of the lever 251 of the 3-way-switch module 5 connected to cable port-E 470, either wire conductor-A 602 or wire conductor-B 603 of the 5-conductor cable 19 connected to cable port-G 472 serve as the source-positive conductor to the 4-way-switch module 6; with wire conductor-A 602 connected to wire adapter-BC 430 and wire conductor-B 603 connected to wire adapter-AD 429. Wire conductor-D 605 and wire conductor-E 606 of the 5-conductor cable 19 serve as the return-positive conductors with wire conductor-D 605 connected to wire adapter-EH 431 and wire conductor-E 606 connected to wire adapter-FG 432. When the lever 312 of the 4-way-switch module 6 is in the up position, continuity is provided between wire conductor-A 602 and wire conductor-E 606, as well as between wire conductor-B 603 and wire conductor-D 605, as illustrated in FIGS. 149 through 157. When the lever 312 of the 4-way-switch module 6 is in the down position, continuity is provided between wire conductor-A 602 and wire conductor-D 605, as well as between wire conductor-B 603 and wire conductor-E 606. Depending on the position of the lever 251 of the 3-way-switch module 5 connected to cable port-E 470 and the position of the lever 312 of the 4-way-switch module 6 connected to cable-port-G 472, either wire conductor-A 602 or wire conductor-B 603 of the 5-conductor cable 19 connected to cable port-H 473 serve as the source-positive conductor to the 4-way-switch module 6, with wire conductor-A 602 connected to wire adapter-FG 432 and wire conductor-B 603 connected to wire adapter-EH 431. Wire conductor-D 605 and wire conductor-E 606 of the 5-conductor cable 19 serve as the return-positive conductors with wire conductor-D 605 connected to wire adapter-JM 433 and wire conductor-E 606 connected to wire adapter-KL 434. When the lever 312 of the 4-way-switch module 6 is in the up position, continuity is provided between wire conductor-A 602 and wire conductor-E 606, as well as between wire conductor-B 603 and wire conductor-D 605, as illustrated in FIGS. 149 through 157. When the lever 312 of the 4-way-switch module 6 is in the down position, continuity is provided between wire conductor-A 602 and wire conductor-D 605, as well as between wire conductor-B 603 and wire conductor-E 606. Depending on the position of the lever 251 of the 3-way-switch module 5 connected to cable port-E 470 and the position or the lever 312 of the 4-way-switch module 6 connected to cable-port-G 472 and cable port-H 473, either wire conductor-B 593 or wire conductor-D 595 of the 4-conductor cable 18 connected to cable port-F 471 serve as the source-positive conductor to the 3-way-switch module 5; with wire conductor-B 593 connected to wire adapter-JM 433 and wire conductor-D 595 connected to wire adapter-KL 434. Wire conductor-A 592 is connected to the light wire adapter 428 and serves as the return-positive conductor. When the lever 251 of the 3-way-switch module 5 is in the up position, continuity is provided between wire conductor-A 592 and wire conductor-B 593, as illustrated in FIGS. 140 through 148. When the lever 251 of the 3-way-switch module 5 is in the down position, continuity is provided between wire conductor-A 592 and wire conductor-D 595. Therefore, when the lever 251 of both 3-way-switch modules 5 is either in the up position or the down position and the lever 312 of both 4-way-switch modules 6 is in the up position or the down position, continuity is provided between the light wire adapter 428 and wire conductor-A 582 of the 3-conductor cable 17 connected to cable port-A 466, thereby connecting a positive conductor to the light wire adapter 428. When the lever 251 of either 3-way-switch module 5 is in the down position and the lever 251 of the other 3-way-switch module 5 is in the up position with the lever 312 of both 4-way-switch modules 6 in the up position or the down position, the continuity is interrupted. When the lever 251 of either 3-way-switch module 5 is in the down position and the lever 251 of the other 3-way-switch module 5 is in the up position with the lever 312 of one 4-way-switch module 6 in the down position and the lever 312 of one 4-way-switch module 6 in the up position, the continuity is restored. In summary, changing the position of any of the levers 251, 312 of the switch modules 5, 6 will change the status of the continuity to either interrupted or restored. The light wire adapter 428 provides a terminal screw 438 to accommodate the positive wire of a light fixture.

The light box 13 provides a means to operate additional light boxes 13 from the same switch circuits. A 3-conductor cable 17 is shown connected to cable port-C 468 of the light box 13 and provides the connection from the light box 13 to another light box 13 if more than one light fixture is to be operated with the same switch circuits. The specific exterior profile of the 3-conductor cable 17 and the specific interior profile of cable port-C 468 permits connection in one orientation only, as seen in FIG. 195. Wire conductor-A 582 of the 3-conductor cable 17 serves as the light-positive conductor, wire conductor-B 583 serves as the neutral conductor, and wire conductor-C 584 serves as the ground conductor. As the 3-conductor cable 17 is inserted into cable port-C 468, the three wires 582, 583, 584 protrude through the wire entrance holes 458 of the wiring module base 423 and into the wire-pressure sockets 507, 503, 505 of the wire adapters 428, 426, 427; with wire conductor-A 582 connected to the light wire adapter 428, wire conductor-B 583 connected to the neutral wire adapter 426, and wire conductor-C 584 connected to the ground wire adapter 427. A 3-conductor cable 17 may also be connected to cable port-D 469 in the same manner. The 3-conductor cable 17 is connected to cable port-C 468 or cable port-D 469 of the additional light box 13 in the same manner, as seen in FIGS. 208 through 210.

It is easily seen from FIGS. 192 through 210 that the assembly of the electrical components, in itself, self-distributes a dedicated earth ground to each component. Wire conductor-C 584, 594, 604 of any cable 17, 18, 19 connected to any cable port 466, 467, 468, 469, 470, 471, 472, 473 is connected to the ground wire adapter 427 of the light box 13, thereby providing the cables 17, 18, 19 with a grounded conductor. The ground wire adapter 427 is connected to the electrical box 421 by means of the rivet 435, thereby grounding the electrical box 421. The ground wire adapter 427 provides a terminal screw 438 to accommodate the ground wire of a light fixture.

The neutral wire adapter 426 also provides a terminal screw 438 to accommodate the neutral wire of a light fixture. The positive wire adapter 425 provides a terminal screw 438 to supply a positive connection irrelevant to the switch circuits. The cable sheath 581, 591, 601 is stripped from the ends of the cables 17, 18, 19 before being fully inserted into the cable ports 466, 467, 468, 469, 470, 471, 472, 473. The cables 17, 18, 19, as well as the 2-wire jumper 14 and 4-wire jumpers 15, are each secured by means of the cable clamps 436 and the cable clamp screws 437.

Referring to FIG. 211, there is provided an electrical circuit 20 utilizing some of the modular electrical components which comprise the present invention. This electrical circuit 20 is given as an example only to illustrate the electrical components and it is not intended to imply that the present invention is limited to this electrical circuit 20 as there are an unlimited number of electrical circuit configurations which may be constructed with the present invention.

Electrical power is supplied to the junction box 12 by means of the 3-conductor cable 17. The junction box 12 creates seven additional power supply circuits.

The junction box 12 provides electrical power to the receptacle circuit 80 by means of the 3-conductor cable 17. The 3-conductor cable 17 is connected to the wallbox 1 into which the receptacle module 2 is installed. The wallbox 1 creates three additional power supply circuits. The wallbox jumper 16 provides electrical power to the adjacent wallbox 1 which also contains a receptacle module 2.

The junction box 12 provides electrical power to the GFCI-receptacle circuit 850 by means of the 3-conductor cable 17. The 3-conductor cable 17 is connected to the wallbox 1 into which the GFCI-receptacle module 10 is installed. The wallbox 1 creates two additional GFCI power supply circuits.

The junction box 12 provides electrical power to the ganging-module circuit 140 by means of the 3-conductor cable 17. The 3-conductor cable 17 is connected to the wallbox 1 into which the ganging module 3 is installed. The wallbox 1 creates three additional power supply circuits.

The junction box, 12 provides electrical power, by means of the 3-conductor cable 17, to a 2-way-lighting circuit 535 in which a 2-way-switch module 4 is utilized. The 3-conductor cable 17 is connected to the light box 13. A 2-way-switch module 4 is connected to the light box 13 by means of the 3-conductor cable 17. The 2-way-switch module 4 is installed into a wallbox 1 to which the 3-conductor cable 17 is connected. One 2-wire jumper 14 and two 4-wire jumpers 15 are installed into the light box 13 to simulate unused switch circuits. The light box 13 creates one additional power supply circuit.

The junction box 12 provides electrical power, by means of the 3-conductor cable 17, to another 2-way-lighting circuit 535 in which a dimmer switch module 7 is utilized. The 3-conductor cable 17 is connected to the light box 13. A dimmer switch module 7 is connected to the light box 13 by means of the 3-conductor cable 17. The dimmer switch module 7 is installed into a wallbox 1 to which the 3-conductor cable 17 is connected. One 2-wire jumper 14 and two 4-wire jumpers 15 are installed into the light box 13 to simulate unused switch circuits. The light box 13 creates one additional power supply circuit. The same lighting circuit may be illustrated utilizing the fan-control switch module 8 or the timer switch module 9 in lieu of the dimmer switch module 7.

The junction box 12 provides electrical power to the 3-way-lighting circuit 536 by means of the 3-conductor cable 17. The 3-conductor cable 17 is connected to the light box 13. Two 3-way-switch modules 5 are connected to the light box 13 by means of 4-conductor cables 18. The 3-way-switch modules 5 are each installed into a wallbox 1 to which the 4-conductor cable 18 is connected. Two 4-wire jumpers 15 are installed into the light box 13 to simulate unused switch circuits. The light box 13 creates one additional power supply circuit.

The ganging-module circuit 140 provides electrical power to the 4-way-lighting circuit 537 by means of the 3-conductor cable 17. The 3-conductor cable 17 is connected to the light box 13. Two 3-way-switch modules 5 are connected to the light box 13 by means of 4-conductor cables 18 The 3-way-switch modules 5 are each installed into a wallbox 1 to which the 4-conductor cable 18 is connected. Two 4-way-switch modules 6 are also connected to the light box 13 by means of 5-conductor cables 19. The 4-way-switch modules 6 are each installed into a wallbox 1 to which the 5-conductor cable 19 is connected. The light box 13 creates one additional power supply circuit. The light box 13 is connected to a second light box 13 by means of a 3-conductor cable 17. The two light boxes 13 operate in unison.

The present invention may be provided in other modified forms without departing from the spirit and scope of the invention. The foregoing description is provided to illustrate one embodiment of the invention for purposes of this disclosure and it is intended to cover all changes and modifications which do not depart from the spirit and scope of this invention.

INDUSTRIAL APPLICABILITY

The components which comprise the present invention may be manufactured as described previously using typical modern manufacturing facilities and practices. The cost of production for some of the components may be higher than that of conventional components. However, it is believed that the lower installation costs will offset the higher initial costs to the consumer while providing a superior electrical system which is safer and conducive to future additions and/or modifications. The modular electrical system may be used in residential structures as well as commercial buildings. The components may be marketed and distributed in the same manner as conventional components are distributed currently.

What is claimed is:

1. A Ground Fault Circuit Interrupt (GFCI) electrical circuit comprising:

an electrical cable for supplying electrical power to said GFCI electrical circuit, said electrical cable including two or more current carrying wire conductors;

a GFCI receptacle module for supplying GFCI electrical power to electrical appliances, said GFCI receptacle adapted to receive a standard electrical plug of said electrical appliances; and a wallbox adapted to receive said GFCI receptacle module, said wallbox including a wiring module having a plurality of electrical conductors for electrically connecting said GFCI receptacle module disposed in said wallbox to said wire conductors of said electrical cable, said wiring module having a plurality of first terminal members connectable to said wire conductors of said electrical cable, and a plurality of second terminal members, said GFCI receptacle module including a plurality of electrical conductors extending outwardly therefrom; said plurality of electrical conductors releasably connecting to said plurality of second terminal members of said wiring module as said GFCI receptacle module is inserted into said wallbox, said conductors being maintained in electrical communication with said wire conductors of said electrical cable by said wiring module when said GFCI receptacle module is disposed in said wallbox; said GFCI receptacle module further including a GFCI device for detecting a ground fault condition and interrupting electrical power supplied through said GFCI receptacle module when the ground fault condition is detected.

2. The Ground Fault Circuit Interrupt (GFCI) electrical circuit as set forth in claim 1 wherein said electrical conductors extending outwardly from said GFCI receptacle module include at least one positive conductor and one neutral conductor, said positive conductor being maintained in electrical communication with a positive current carrying wire conductor of said cable by said wiring module, said neutral conductor being maintained in electrical communication with a neutral current carrying wire conductor of said cable by said wiring module.

3. The Ground Fault Circuit Interrupt (GFCI) electrical circuit as set forth in claim 2 wherein said electrical cable further includes a ground wire conductor and said electrical conductors extending outwardly from said GFCI receptacle module further include at least one ground conductor; said ground conductor being maintained in electrical communication with said ground wire conductor of said cable by said wiring module.

4. The Ground Fault Circuit Interrupt (GFCI) electrical circuit as set forth in claim 3 wherein said electrical conductors extending outwardly from said GFCI receptacle module are blade conductors.

5. The Ground Fault Circuit Interrupt (GFCI) electrical circuit as set forth in claim 3 further including one or more electrical cables for supplying GFCI electrical power to additional circuits, said electrical cables including a GFCI-positive current carrying wire conductor, a GFCI-neutral current carrying wire conductor, and a ground wire conductor; and said electrical conductors extending outwardly from said GFCI receptacle module further including at least one GFCI-positive conductor, one GFCI-neutral conductor, and a second ground conductor; said GFCI-positive conductor being maintained in electrical communication with said GFCI-positive current carrying wire conductor of said cables by said wiring module, said GFCI-neutral conductor being maintained in electrical communication with said GFCI-neutral current carrying wire conductor of said cables by said wiring module, and said second ground conductor being maintained in electrical communication with said ground wire conductor of said cables by said wiring module.

6. The Ground Fault Circuit Interrupt (GFCI) electrical circuit as set forth in claim 5 wherein said electrical conductors extending outwardly from said GFCI receptacle module are blade conductors.

7. The Ground Fault Circuit Interrupt (GFCI) electrical circuit as set forth in claim 5 wherein said wallbox includes one or more cable ports to receive said electrical cable for supplying electrical power to said GFCI electrical circuit and one or more cable ports to receive one of said cables for supplying GFCI electrical power to said additional circuits.

8. The Ground Fault Circuit Interrupt (GFCI) electrical circuit as set forth in claim 7 wherein said cables have a predefined exterior profile and said cable ports associated with said wallbox have dimensions corresponding to the exterior profile of said cables, said cable ports being shaped to allow for insertion of said cables into said cable ports in only one orientation, thereby restricting connection of each wire conductor of each cable inserted into each cable port to a preselected one of said electrical conductors of said GFCI receptacle module.

9. The Ground Fault Circuit Interrupt (GFCI) electrical circuit as set forth in claim 5 wherein said additional circuits supplied with GFCI electrical power include one or more 120 volt receptacle modules, said 120 volt receptacle modules thereby providing GFCI electrical power to electrical appliances.

10. The Ground Fault Circuit Interrupt (GFCI) electrical circuit as set forth in claim 3 further including a second wallbox, said second wallbox being located adjacent to the wallbox containing said GFCI receptacle module; and further including a wallbox jumper for supplying GFCI electrical power to said second wallbox, said wallbox jumper including a GFCI-positive current carrying wire conductor, a GFCI-neutral current carrying wire conductor, and a ground wire conductor; and said electrical conductors extending outwardly from said GFCI receptacle module further including at least one GFCI-positive conductor, one GFCI-neutral conductor, and a second ground conductor; said GFCI-positive conductor being maintained in electrical communication with said GFCI-positive current carrying wire conductor of said wallbox jumper by said wiring module, said GFCI-neutral conductor being maintained in electrical communication with said GFCI-neutral current carrying wire conductor of said wallbox jumper by said wiring module, and said second ground conductor being maintained in electrical communication with said ground wire conductor of said wallbox jumper by said wiring module.

11. The Ground Fault Circuit Interrupt (GFCI) electrical circuit as set forth in claim 10 wherein said second wallbox supplied with GFCI electrical power includes a 120 volt receptacle disposed therein, said 120 volt receptacle thereby providing GFCI electrical power to electrical appliances.

12. A Ground Fault Circuit Interrupt (GFCI) receptacle outlet comprising:

a GFCI receptacle module for supplying power to electrical appliances and a wallbox adapted to receive said GFCI receptacle module ; said wallbox including a wiring module having a plurality of terminal members; said GFCI receptacle module being adapted with electrical conductors extending outwardly thereform; said electrical conductors providing an electrical interface with said wallbox and releasably connecting to said plurality of terminal members of said wiring module as said GFCI receptacle module is inserted into said wallbox; said GFCI receptacle module including a GFCI device for detecting a ground fault condition and interrupting power supplied through said GFCI receptacle module when the ground fault condition is detected.

13. The Ground Fault Circuit Interrupt (GFCI) receptacle outlet as set forth in claim 12 wherein said electrical conductors extending outwardly from said GFCI receptacle module include at least one positive conductor, one neutral conductor, and one ground conductor.

14. The Ground Fault Circuit Interrupt (GFCI) receptacle outlet as set forth in claim 13 wherein said electrical conductors extending outwardly from said GFCI receptacle module further include at least one GFCI-positive conductor, one GFCI-neutral conductor, and a second ground conductor.

15. The Ground Fault Circuit Interrupt (GFCI) receptacle outlet as set forth in claim 14 wherein said electrical conductors extending outwardly from said GFCI receptacle module are blade conductors.

16. A Ground Fault Circuit Interrupt (GFCI) receptacle module for supplying power to an electrical appliance, comprising; a housing including a mechanical interface adapted to receive a standard electrical plug of said electrical appliance; a GFCI device for detecting a ground fault condition and interrupting power supply through said GFCI receptacle module when the ground fault condition is detected; and a plurality of blade type electrical conductors extending outwardly from said housing.

* * * * *